United States Patent
Fudemoto et al.

(10) Patent No.: US 9,415,636 B2
(45) Date of Patent: Aug. 16, 2016

(54) TIRE, AND TIRE MANUFACTURING METHOD

(75) Inventors: Hiroyuki Fudemoto, Yokohama (JP); Takashi Harada, Yokohama (JP); Yoshihide Kouno, Kodaira (JP); Seiji Kon, Kodaira (JP); Keiichi Hasegawa, Kodaira (JP); Munenori Iizuka, Kodaira (JP); Takayuki Yako, Kodaira (JP); Kunio Machida, Kodaira (JP)

(73) Assignee: BRIDGESTONE CORPORATION, Tokyo (JP)

( * ) Notice: Subject to any disclaimer, the term of this patent is extended or adjusted under 35 U.S.C. 154(b) by 234 days.

(21) Appl. No.: 13/818,531

(22) PCT Filed: Aug. 25, 2011

(86) PCT No.: PCT/JP2011/069223
§ 371 (c)(1),
(2), (4) Date: Apr. 17, 2013

(87) PCT Pub. No.: WO2012/026547
PCT Pub. Date: Mar. 1, 2012

(65) Prior Publication Data
US 2013/0206301 A1    Aug. 15, 2013

(30) Foreign Application Priority Data

| Aug. 25, 2010 | (JP) | 2010-188900 |
|---|---|---|
| Aug. 25, 2010 | (JP) | 2010-188901 |
| Aug. 25, 2010 | (JP) | 2010-188902 |
| Aug. 25, 2010 | (JP) | 2010-188903 |
| Aug. 25, 2010 | (JP) | 2010-188915 |
| Aug. 25, 2010 | (JP) | 2010-188918 |
| Aug. 25, 2010 | (JP) | 2010-188919 |
| Aug. 25, 2010 | (JP) | 2010-188922 |
| Aug. 25, 2010 | (JP) | 2010-188923 |
| Sep. 10, 2010 | (JP) | 2010-203676 |
| Sep. 10, 2010 | (JP) | 2010-203732 |
| Nov. 18, 2010 | (JP) | 2010-258040 |
| Nov. 18, 2010 | (JP) | 2010-258041 |
| Aug. 25, 2011 | (JP) | 2011-183311 |

(51) Int. Cl.
*B60C 9/20* (2006.01)
*B60C 5/00* (2006.01)
(Continued)

(52) U.S. Cl.
CPC . *B60C 1/00* (2013.01); *B60C 5/007* (2013.01); *B60C 5/01* (2013.01); *B60C 9/22* (2013.01); *Y10T 152/10495* (2015.01)

(58) Field of Classification Search
CPC .......... B60C 1/0041; B60C 5/00; B60C 9/00; B60C 9/18; B60C 9/22
See application file for complete search history.

(56) References Cited

U.S. PATENT DOCUMENTS 3,608,605 A * 9/1971 Cole .............................. 152/533
3,888,291 A * 6/1975 Herzlich et al. ............ 152/209.5
(Continued)

FOREIGN PATENT DOCUMENTS

| AT | 383541 | * 7/1987 |
| CN | 101171300 A | 4/2008 |

(Continued)

OTHER PUBLICATIONS

Machine translation of AT 383541, 1987.*
(Continued)

*Primary Examiner* — Justin Fischer
(74) *Attorney, Agent, or Firm* — Sughrue Mion, PLLC

(57) ABSTRACT

Provided is a tire having at least a circular tire frame formed of a thermoplastic resin material, the tire including a reinforcing cord member that forms a reinforcing cord layer on the outer circumference of the tire frame, and the thermoplastic resin material including at least a polyamide-based thermoplastic elastomer.

6 Claims, 14 Drawing Sheets

(51) Int. Cl.
  *B60C 1/00*  (2006.01)
  *B60C 9/22*  (2006.01)
  *B60C 5/01*  (2006.01)

(56) References Cited

U.S. PATENT DOCUMENTS

| | | | |
|---|---|---|---|
| 3,956,546 A * | 5/1976 | Neville et al. | 428/43 |
| 3,977,453 A * | 8/1976 | Coran et al. | 152/323 |
| 4,289,186 A * | 9/1981 | Wilde | 152/379.3 |
| 7,964,286 B2 * | 6/2011 | Smith et al. | 428/450 |
| 2001/0041762 A1 | 11/2001 | Ikawa et al. | |
| 2010/0263777 A1 | 10/2010 | Sakai et al. | |
| 2010/0276047 A1 * | 11/2010 | Kleber et al. | 152/378 R |
| 2011/0290387 A1 | 12/2011 | Pennequin et al. | |

FOREIGN PATENT DOCUMENTS

| | | |
|---|---|---|
| JP | S54-162307 A | 12/1979 |
| JP | 59-34904 A | 2/1984 |
| JP | S61-136539 A | 6/1986 |
| JP | 03-143701 A | 6/1991 |
| JP | H05-116504 A | 5/1993 |
| JP | H06-16008 A | 1/1994 |
| JP | 7-113004 A | 5/1995 |
| JP | 2000-248172 A | 9/2000 |
| JP | 2001-250421 A | 9/2001 |
| JP | 2002080644 A | 3/2002 |
| JP | 2003064262 A | 3/2003 |
| JP | 2003-104005 A | 4/2003 |
| JP | 2003-104008 A | 4/2003 |
| JP | 3462503 B2 | 11/2003 |
| JP | 2004-346273 A | 12/2004 |
| JP | 2004352789 A | 12/2004 |
| JP | 2005-323339 A | 11/2005 |
| JP | 2006-071027 A | 3/2006 |
| JP | 2006-117796 A | 5/2006 |
| JP | 2006206821 A | 8/2006 |
| JP | 2007-70447 A | 3/2007 |
| JP | 2007069745 A | 3/2007 |
| JP | 2007-077382 A | 10/2007 |
| JP | 2007-277382 A | 10/2007 |
| JP | 2008-106166 A | 5/2008 |
| JP | 2008-133437 A | 6/2008 |
| JP | 2008-260887 A | 10/2008 |
| JP | 2008-308083 A | 12/2008 |
| JP | 2009-143003 A | 7/2009 |
| JP | 2009-263456 A | 11/2009 |
| JP | 2009-286183 A | 12/2009 |
| JP | 201053495 A | 3/2010 |
| JP | 2010-77207 A | 4/2010 |
| JP | 2010-091051 A | 4/2010 |
| JP | 2010-111174 A | 5/2010 |
| JP | 2010-111817 A | 5/2010 |
| JP | 2010-188633 A | 9/2010 |
| WO | 2005/105913 A1 | 11/2005 |
| WO | 2009/084660 A1 | 7/2009 |
| WO | 2010031855 A1 | 3/2010 |
| WO | 2010/095654 A1 | 8/2010 |

OTHER PUBLICATIONS

Notice of Reasons for Rejection issued May 20, 2014 in corresponding Japanese Patent Application No. 2010-188923 with translation.
Notice of Reasons for Rejection issued May 20, 2014 in corresponding Japanese Patent Application No. 2010-188902 with translation.
Notice of Reasons for Rejection issued Feb. 3, 2015 in Japanese Patent Application No. 2010-258041 with translation.
Frist Notice of Reasons for Rejection issued Dec. 16, 2014 in Chinese Patent Application No. 201180051358.1 with translation.
International Search Report of PCT/JP2011/069223 dated Dec. 6, 2011.
Notice of Reasons for Rejection issued Dec. 9, 2014 in Japanese Patent Application No. 2010-203732 with translation.
Decision of Refusal issued Jan. 6, 2015 in Japanese Patent Application No. 2010-188923 with translation.
Notice of Reasons for Rejection issued Jan. 6, 2015 in Japanese Patent Application No. 2010-188902 with translation.
Communication (Decision of Dismissal of Amendment) dated Sep. 29, 2015, issued by the Japan Patent Office in corresponding Japanese Application No. 2010-258041.
Communication (Decision on Refusal) dated Sep. 29, 2015, issued by the Japan Patent Office in corresponding Japanese Application No. 2010-258041.
Communication (Decision of Declination of Amendment) dated Aug. 25, 2015, issued by the Japan Patent Office in corresponding Japanese Application No. 2010-188902.
Communication (Decision of Refusal) dated Aug. 25, 2015, issued by the Japan Patent Office in corresponding Japanese Application No. 2010-188902.
Communication (Notice of Reasons for Rejection) dated Aug. 25, 2015, issued by the Japan Patent Office in corresponding Japanese Application No. 2011-253082.
Communication dated Dec. 8, 2015, issued by the Japan Patent Office in corresponding Japanese Application No. 2014-252365.
Notice of Reasons for Rejection issued Apr. 22, 2014 in corresponding Japanese Patent Application No. 2010-203676 with translation.
Notice of Reasons for Rejection issued Apr. 22, 2014 in corresponding Japanese Patent Application No. 2010-203732 with translation.
Notice of Reasons for Rejection issued Apr. 22, 2014 in corresponding Japanese Patent Application No. 2010-188919 with translation.
Notice of Reasons for Rejection issued May 7, 2014 in corresponding Japanese Patent Application No. 2010-258041 with partial translation.
Notice of Reasons for Rejection issued May 7, 2014 in corresponding Japanese Patent Application No. 2010-188903 with partial translation.

* cited by examiner

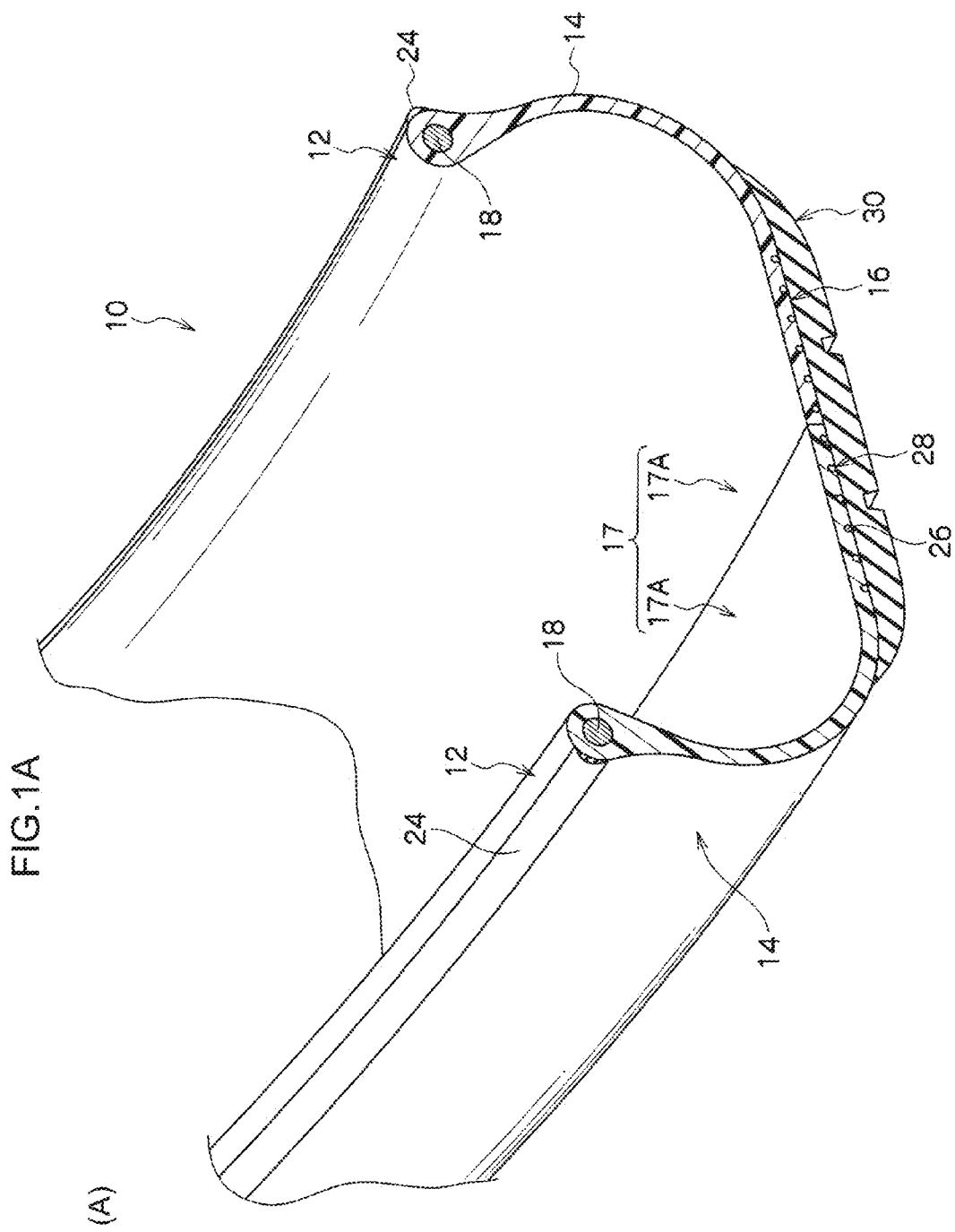

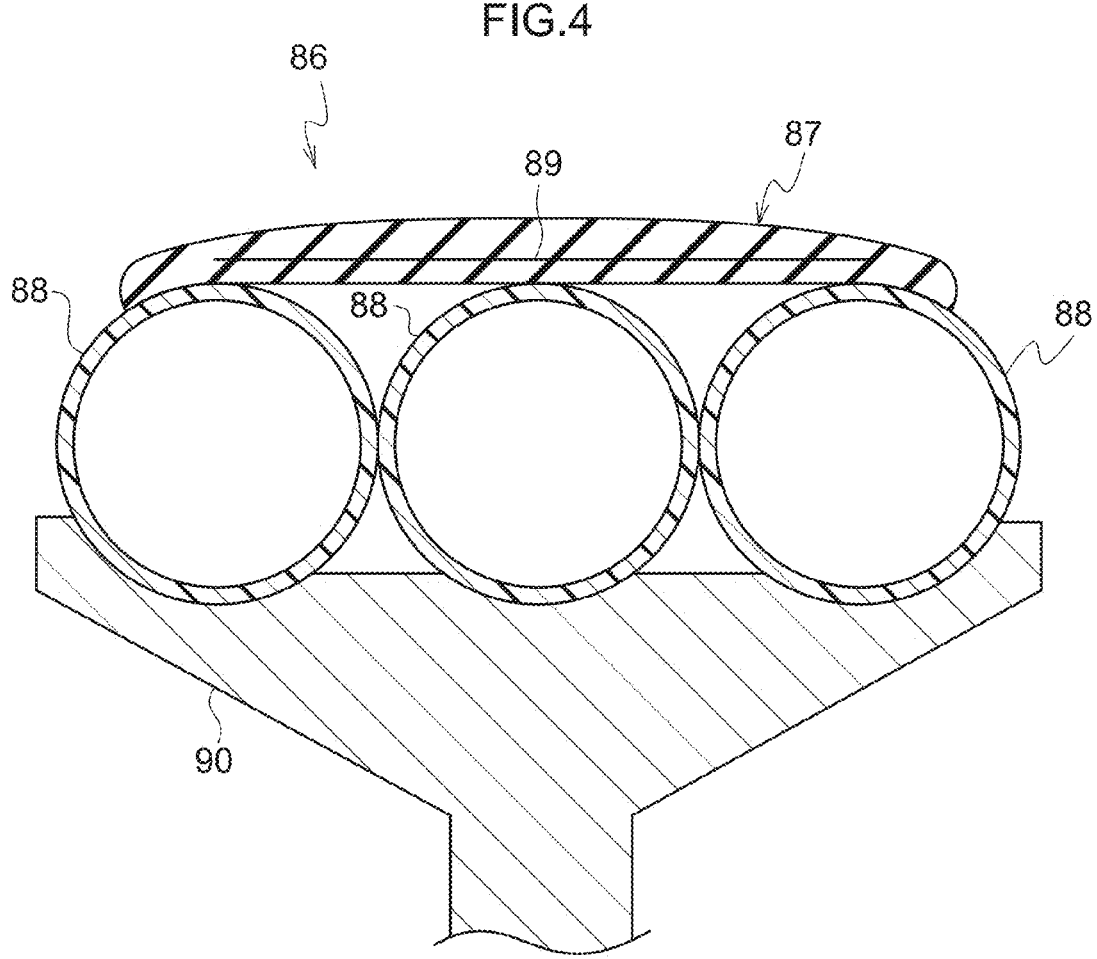

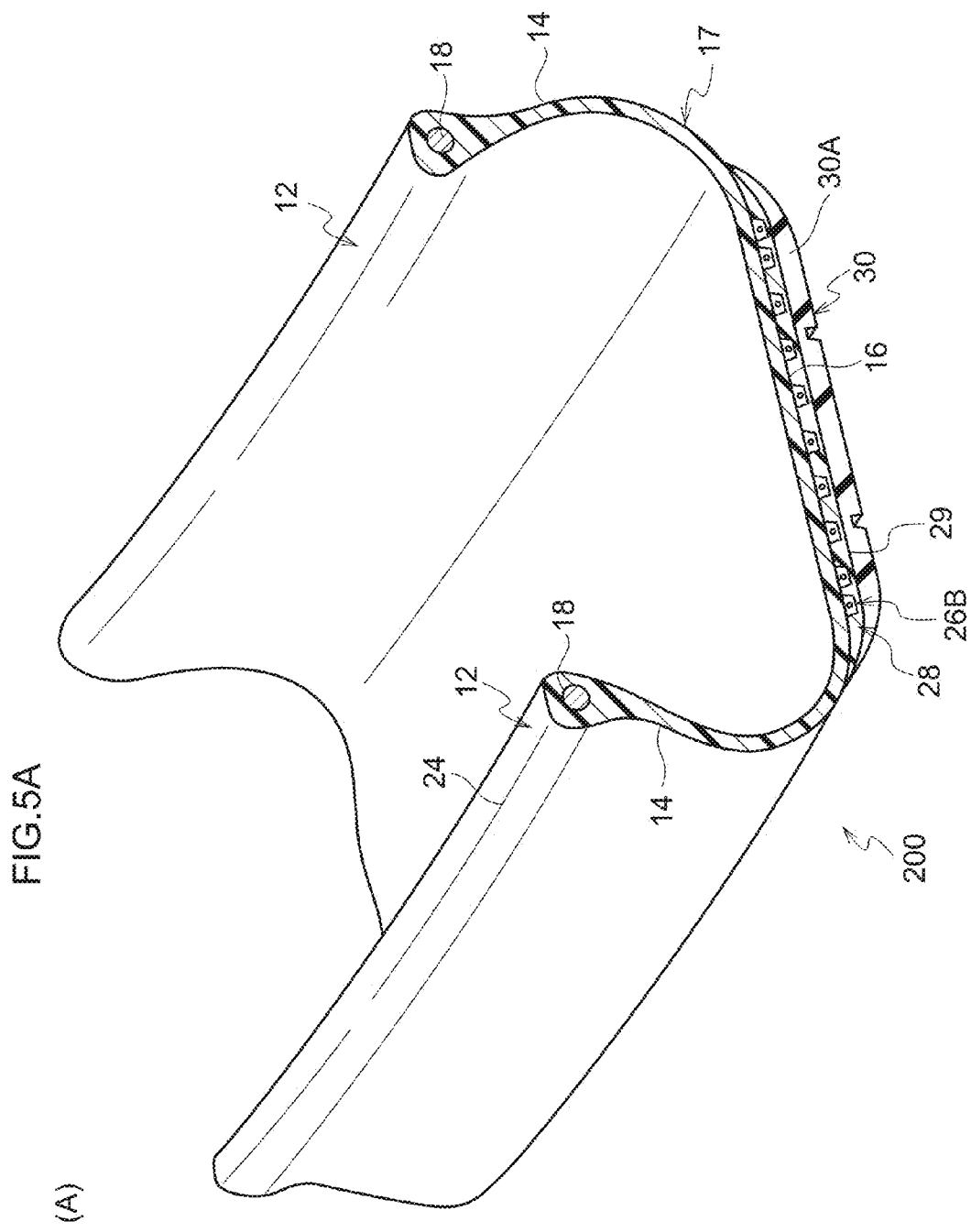

TIRE, AND TIRE MANUFACTURING METHOD

TECHNICAL FIELD

The present invention relates to a tire for being fitted on the rim, and more particularly, to a tire in which at least a portion is formed of a thermoplastic material, and a method for producing the same.

BACKGROUND ART

Conventionally, in vehicles such as passenger cars, pneumatic tires constructed from rubber, organic fiber materials, steel members, and the like have been used.

In recent years, an investigation is conducted to use resin materials, particularly thermoplastic resins and thermoplastic elastomers as the tire materials, in view of weight reduction, ease of molding, and easy recycling.

For example, Japanese Patent Application Publication (JP-A) No. 2003-104008 and JP-A No. 03-143701 disclose pneumatic tires formed by using thermoplastic polymer materials.

In JP-A No. 03-143701, a reinforcing layer in which a reinforcing cord is helically wound continuously in the circumferential direction of the tire is provided on the outer surface in the tire radial direction at the tread bottom of the tire main body (tire frame), to improve the resistance to cutting or resistance to puncture of the tire main body.

DISCLOSURE OF INVENTION

Technical Problem

Tires that in which a thermoplastic polymer material is used can be produced easily and inexpensively compared to the conventional tires made of rubber. However, when the tire frame is formed of a uniform thermoplastic polymer material which is not equipped with a reinforcing member such as a carcass ply, there is room for improvement from the viewpoint of the resistance to stress, internal pressure and the like, compared to the conventional tires made of rubber (see, for example, JP-A No. 2003-104008).

Furthermore, conventional rubber tires cannot be easily recycled, and recycling applications thereof are limited, for example, incinerating the tires, or crushing the tires to be used in the material for road pavement. On the other hand, tires in which a thermoplastic polymer material is used have an advantage that the degree of freedom of the applications is high, even from the viewpoint of recycling.

In JP-A No. 03-143701, a reinforcing layer in which a reinforcing cord is helically wound continuously in the circumferential direction of the tire is provided on the outer surface in the tire radial direction of the tread bottom of the tire main body (tire frame) to improve the resistance to cutting or the resistance to puncture of the tire main body. However, when a reinforcing layer in which a reinforcing cord is helically wound directly around a tire frame formed of a thermoplastic polymer material, is formed, and a tread is formed on the outer side in the radial direction of the reinforcing layer, even though an adhesive is used for the reinforcing cord, it cannot be said that sufficient adhesiveness is provided, and there may be air remaining around the reinforcing cords. As such, if air remains around the reinforcing cord, the reinforcing cord may move at the time of driving and cause detachment between the members. Thus, there is room for an improvement from the viewpoint of the durability of tires. Furthermore, since the region around the reinforcing cord is all covered with a cushion rubber, detachment of the reinforcing cord and the like may occur as a result of the difference in the hardness of materials between the tire main body and the region around the reinforcing cord.

Also, when a tire is produced by using a thermoplastic polymer material, it is demanded to realize a performance (required characteristics of the tire) that is comparable to that of the conventional rubber tires, while realizing low cost by increasing the production efficiency. For example, when a thermoplastic resin material is used as the material for a tire frame, it can be considered, from the viewpoint of production efficiency and the like, to form the tire frame by injecting a polymer material into a mold by injection molding as described in JP-A No. 03-143701. Accordingly, as the thermoplastic polymer material, it is desirable to select a material which is excellent in the durability obtainable when the material is produced into a tire, and in the handleability at the time of molding (manufacturability) (first, third, fourth, and seventh to thirteenth aspects of the present invention as described below).

Furthermore, for example, a tire is required to have strong resistance to impact; however, it is requested that tires formed by using a thermoplastic polymer material also have impact resistance that is equal to or higher than the impact resistance of conventional tires made of rubber (second aspect of the present invention as described below).

Furthermore, regarding the characteristics required of tires, for example, factors such as having an elastic modulus in a certain range, having a low dynamic loss factor at 30° C., 20 Hz and a shear strain of 1% (coefficient of rolling: tan δ (hereinafter, may be simply referred to as "tan δ")), having excellent heat resistance, and the like respectively constitute important characteristics. However, decrease in the tan δ value and increase in the elastic modulus in a polymer material are usually in a contradictory relationship. Accordingly, it is desired to develop a tire which can achieve a good balance between these characteristics at a high level (fifth aspect of the present invention as described below).

Also, on the other hand, use of a thermoplastic resin material in a tire tends to further increase the electrostatic property of the tire surface. Since electrostatic charging of a tire may cause the occurrence of discharge, and adhesion of fine dust and the like to the tire surface, a tire in which a thermoplastic resin material is used and which has a superior antistatic ability is desired. However, no such tire has been provided yet (sixth aspect as described below).

The present invention was achieved in view of the various circumstances described above.

An object according to a first aspect of the present invention is to provide a tire which is formed using a thermoplastic polymer material and exhibits excellent durability and manufacturability.

An object according to a second aspect of the present invention is to provide a tire which is formed using a thermoplastic polymer material and exhibits excellent durability, manufacturability and impact resistance.

An object according to a third aspect of the present invention is to provide a tire which is formed using a thermoplastic resin material and has excellent tensile elasticity and fracture properties, and a method for producing this tire.

An object according to a fourth aspect of the present invention is to provide a tire which is formed using a thermoplastic resin material and exhibits excellent steering stability with small rolling resistance.

An object according to a fifth aspect of the present invention is to provide a tire which is formed using a thermoplastic polymer material, is highly elastic, has a low loss factor, and exhibits excellent heat resistance.

An object according to a sixth aspect of the present invention is to provide a tire which is formed using a thermoplastic resin material and has an excellent antistatic performance.

An object according to a seventh aspect of the present invention is to provide a tire which is formed using a thermoplastic resin material, and in which even if the elastic modulus is increased, an increase in rolling resistance can be suppressed.

An object according to an eighth aspect of the present invention is to provide a tire which is formed using a resin material, and in which an elastic modulus in a suitable range can be obtained and an increase in rolling resistance can be suppressed.

An object according to a ninth aspect of the present invention is to provide a tire which is formed using a resin material and in which impact resistance can be enhanced.

An object according to a tenth aspect of the present invention is to provide a tire which is formed using a thermoplastic resin material, has high durability at the time of driving since air is prevented from remaining in a region around the reinforcing cord member, and is not easily affected by temperature change.

An object according to an eleventh aspect of the present invention is to provide a tire which is formed using a thermoplastic resin material and has excellent impact resistance, and in which the temperature dependency of the tensile yield strength is suppressed.

An object according to a twelfth aspect of the present invention is to provide a tire which is formed using a thermoplastic resin material and has excellent impact resistance and fracture properties, and a method for producing a tire with excellent productivity.

An object according to a thirteenth aspect of the present invention is to provide a tire which is formed using a thermoplastic resin material, and has excellent impact resistance since air is prevented from remaining in a region around the reinforcing cords.

Solution to Problem

The means for solving the problem of the first aspect is as follows.

(1-1) The tire of the first aspect of the present invention is a tire including at least a circular tire frame formed of a thermoplastic resin material, in which the tire includes a reinforcing cord member that forms a reinforcing cord layer on the outer circumference of the tire frame, and the thermoplastic resin material includes at least a polyamide-based thermoplastic elastomer.

The reinforcing cord layer may be wound around the outer circumference of the tire frame in the circumferential direction, or may also be wound around the outer circumference in a crossing manner.

The tire of the first aspect of the present invention includes a circular tire frame formed of a thermoplastic resin material including a polyamide-based thermoplastic elastomer. The "polyamide-based thermoplastic elastomer" means a thermoplastic resin material which is formed of a copolymer including a polymer constituting a hard segment that is crystalline and has a high melting point, and a polymer constituting a soft segment that is non-crystalline and has a low glass transition temperature, and which has an amide bond (—CONH—) in the main chain of the polymer constituting the hard segment. Furthermore, the "thermoplastic resin" means a resin having thermoplasticity, and does not encompass conventional vulcanized rubbers such as natural rubber or synthetic rubbers. Polyamide-based thermoplastic elastomers have an advantage that when used as a material for forming tire frames, the elastomers have heat resistance and also exhibit excellent tensile modulus of elasticity, tensile strength and fracture strain. Also, when a thermoplastic resin material including a polyamide-based thermoplastic elastomer is used in a tire frame, the structure of the tire can be simplified as compared with the conventional tires made of rubber, and as a result, weight reduction of the tire can be realized. Therefore, when a tire frame is formed using the thermoplastic resin material, the abrasion resistance and durability of the tire can be enhanced. In addition, since a thermoplastic resin material including a polyamide-based thermoplastic elastomer can have the melting point set to near 100° C. to 250° C., it is easy to handle the resin material, and energy consumption at the time of forming a tire frame can be suppressed, while productivity can be increased.

In an embodiment of the tire of the first aspect of the present invention, the reinforcing cord member is wound around the outer circumference of a tire frame formed of a thermoplastic resin material including a polyamide-based thermoplastic elastomer, and thus a reinforcing cord layer is formed. When a reinforcing cord layer is formed on the outer circumference of the tire frame, the resistance to puncture and resistance to cutting of the tire, and the rigidity in the circumferential direction of the tire (tire frame) are increased. Also, as the rigidity in the circumferential direction is increased, creeping (a phenomenon in which plastic deformation of the tire frame increases with time under a constant stress) in the tire frame formed of a thermoplastic material is suppressed.

Furthermore, a polyamide-based thermoplastic elastomer can easily penetrate not only between the fibers of the reinforcing cord member itself, but also between twisted cords in the case where the reinforcing cord member has a twisted-fiber structure, due to the low melt viscosity of the elastomer. Accordingly, the polyamide-based thermoplastic elastomer has high adhesiveness to reinforcing cord members, and has excellent fixing performance such as welding strength. Also, when the reinforcing cord member is an organic fiber, since the polyamide-based thermoplastic elastomer that forms the tire frame can be welded to the reinforcing cord member, high welding properties and excellent fixing performance are obtained. Further, since a polyamide-based thermoplastic elastomer exhibits excellent elongation, the fracture properties are excellent. Therefore, for example, the phenomenon in which air remains in the region around the reinforcing cord members in the reinforcing cord winding step (incorporation of air) can be suppressed. If the polyamide-based thermoplastic elastomer has high adhesiveness and welding properties to the reinforcing cords, and incorporation of air into the surroundings of the reinforcing cord members is suppressed, the movement of the reinforcing cord members due to, for example, a force applied during driving can be effectively suppressed. Thereby, for example, even in the case where a tire-constituting members is provided so as to cover the entirety of the reinforcing cord members in the outer circumference of the tire frame, since the movement of the reinforcing cord members is suppressed, detachment or the like between these members (including the tire frame) is prevented from occurring, and durability of the tire is enhanced.

(1-2) The tire of the first aspect of the present invention can be configured such that the reinforcing cord layer contains a resin material. As such, when the reinforcing cord layer contains a resin material, the difference in hardness between the tire and the reinforcing cord layer can be decreased as compared with the case where the reinforcing cord member is fixed with a cushion rubber, and therefore, the reinforcing cord member can be adhered and fixed to the tire frame further. Thereby, the incorporation of air as described above can be effectively prevented, and the movement of the reinforcing cord member at the time of driving can be effectively suppressed. Furthermore, when the reinforcing cord member is a steel cord, if an attempt is made to separate the reinforcing cords from the cushion rubber at the time of disposal of the tire, while it is difficult to separate a vulcanized rubber from the reinforcing cord only by heating, a resin material can be separated from the reinforcing cord member by heating only. Therefore, it is advantageous in view of recyclability of the tire. Furthermore, a resin material usually has a lower loss factor (tan δ) compared to vulcanized rubbers. Accordingly, if the reinforcing cord layer contains a large amount of a resin material, the rolling properties of the tire can be enhanced. Moreover, a resin having a relatively high elastic modulus compared to vulcanized rubbers is advantageous in that the resin has high in-plane shear rigidity, and also exhibits excellent steering stability at the time of tire driving, and excellent abrasion resistance.

In regard to the first aspect of the present invention, if the expression "resin" is used alone, the "resin" is a concept which encompasses thermoplastic resins (including thermoplastic elastomers) and thermosetting resins, and does not encompass vulcanized rubbers.

When the reinforcing cord layer contains a resin material, from the viewpoint of increasing the pull-out properties (difficulty to be pulled out) of the reinforcing cords, the reinforcing cord members are preferably covered by a resin material over 20% or more of the surface, and more preferably 50% or more of the surface. Also, the content of the resin material in the reinforcing cord layer is preferably 20 mass % or more, and more preferably 50 mass % or more, relative to the total amount of the materials that constitute the reinforcing cord layer excluding the reinforcing cords, from the viewpoint of increasing the pull-out properties of the reinforcing cord.

In order to configure the reinforcing cord layer to include a resin material, for example, the reinforcing cord layer can be formed in a configuration such that when viewed from a cross-section of the tire frame along the axial direction, at least a portion of the reinforcing cord member is embedded in the outer circumference of the tire frame that is formed of a thermoplastic resin material. In this case, the thermoplastic resin material including a polyamide-based thermoplastic elastomer of the outer circumference of the tire frame in which the reinforcing cord member is embedded corresponds to the resin material as a component of the reinforcing cord layer, and the polyamide-based thermoplastic elastomer (thermoplastic resin material) forming the tire frame and the reinforcing cord member constitute the reinforcing cord layer. Furthermore, in order to configure the reinforcing cord layer to include a resin material, a coated cord member obtained by coating a reinforcing cord with a resin material of the same kind as or a different from the resin material that forms the tire frame, may be wound in the circumferential direction of the tire frame. The "same kind" as used for resin material means a situation in which both are ester-based resin materials, or both are styrene-based resin materials, or the like.

(1-3) The tire of the first aspect of the present invention can be configured such that the melting point of the thermoplastic resin material including a polyamide-based thermoplastic elastomer is 100° C. to 250° C. As such, when the melting point of the thermoplastic resin material including a polyamide-based thermoplastic elastomer is adjusted to 100° C. to 250° C., a balance can be achieved between durability as the tire performance, and manufacturability in view of reducing the production cost.

(1-4) The tire of the first aspect of the present invention can be configured such that the content ratio of the polyamide-based thermoplastic elastomer in the thermoplastic resin material is 50 mass % to 100 mass %. When the content of the polyamide-based thermoplastic elastomer in the thermoplastic resin material is 50 mass % to 100 mass %, the performance of the polyamide-based thermoplastic elastomer can be sufficiently exhibited, and a balance can be achieved between durability as the tire performance, and handleability or manufacturability in view of reducing the production cost.

The tire of the first aspect of the present invention can be produced by a production method which includes a tire frame piece forming step of forming a tire frame piece for constituting a portion of a circular tire frame, using a thermoplastic resin material including at least a polyamide-based thermoplastic elastomer; a tire frame piece bonding step of forming the tire frame by fusing two or more of the tire frame pieces, which make a pair, by applying heat to bonding surfaces of the tire frame pieces; and a reinforcing cord member winding step of winding a reinforcing cord members around the outer circumference of the tire frame in the circumferential direction to form a reinforcing cord layer.

In the production method described above, tire frame pieces of the circular tire frame are formed using a thermoplastic resin material including a polyamide-based thermoplastic elastomer. Since the polyamide-based thermoplastic elastomer can have its melting point set to about 100° C. to 250° C., for example, it is not necessary to carry out a process of fusing the tire frame pieces at or above 300° C., and the process of fusing can be carried out at a relatively low temperature. As such, since the process of fusing can be carried out at a relatively low temperature, from the viewpoint of energy availability or the like, the tire productivity can be increased. Furthermore, when tire frame pieces in which a thermoplastic resin material including a polyamide-based thermoplastic elastomer are fused to form a tire frame, sufficient adhesive strength between the tire frame pieces can be obtained, and the performance of the frame itself is not deteriorated by the temperature at the time of fusion. Therefore, durability at the time of driving, such as the resistance to puncture or abrasion resistance of the tire thus produced can be increased.

The production method can be configured such that in the tire frame piece bonding step, the bonding surface of the tire frame piece is heated to a temperature equal to or higher than the melting point of the thermoplastic resin material that constitutes the tire frame piece (for example, melting point +10° C. to +150° C.).

As such, when the bonding surface of the divided body is heated to a temperature higher than or equal to the melting point of the thermoplastic resin material that constitutes the tire frame piece, since fusion between the tire frame pieces can be sufficiently achieved, productivity of the tire can be increased, while durability of the tire is enhanced.

The means for solving the problem of the second aspect is as follows.

(2-1) The tire of the second aspect of the present invention is a tire including at least a circular tire frame formed of a thermoplastic resin material, in which the tire includes a reinforcing cord member that forms a reinforcing cord layer on the outer circumference of the tire frame, and the thermoplastic resin material includes at least a polyamide-based thermoplastic elastomer and an elastomer other than the polyamide-based thermoplastic elastomer (hereinafter, referred to as "other elastomer" in relation to the second embodiment of the present invention).

The reinforcing cord layer may be wound in the circumferential direction of the outer circumference of the tire frame, or may be wound around the outer circumference in a crossing manner.

The tire of the second aspect of the present invention includes a circular tire frame formed of a thermoplastic resin material including a polyamide-based thermoplastic elastomer and another elastomer. Here, the "polyamide-based thermoplastic elastomer" has the same definition as that used in the first aspect of the present invention as described above.

The other elastomer means a thermoplastic resin material formed of a copolymer including a polymer constituting a hard segment that is crystalline and has a high melting point, or a hard segment that has high cohesive force, and a polymer constituting a soft segment that is non-crystalline and has a low glass transition temperature, in which the polymer constituting the hard segment is a polymer other than a polyamide having amide bonds (—CONH—) in the main chain, for example, a polyurethane-based thermoplastic elastomer, a polyolefin-based thermoplastic elastomer (including an olefin copolymer such as an olefin-methacrylic acid copolymer or an olefin-acrylate copolymer), a polystyrene-based thermoplastic elastomer, a polyester-based thermoplastic elastomer and the like obtainable by polymerizing urethane, styrene, an olefin, and a polyester, respectively. The thermoplastic resin for the second aspect of the present invention has the same definition as that used in the present invention according to the first aspect as described above. A thermoplastic resin material including a polyamide-based thermoplastic elastomer and another elastomer has heat resistance and also exhibits excellent tensile modulus of elasticity, tensile strength and fracture strain. Furthermore, when a thermoplastic resin material including a polyamide-based thermoplastic elastomer and another elastomer is used in the tire frame, the structure of the tire can be simplified as compared to the conventional rubber tires, and as a result, weight reduction of the tire can be realized. Therefore, when a tire frame is formed using the thermoplastic resin material, abrasion resistance and durability of the tire can be increased. On the other hand, in the case where a polyamide-based thermoplastic elastomer is used alone, when an attempt is made to adjust the elastic modulus, it is necessary to control the ratio of the hard segment and the soft segment. On the contrary, when a polyamide-based thermoplastic elastomer and another elastomer are used in combination, the elastic modulus of the thermoplastic resin material can be easily adjusted by adjusting the content ratio of the two components, as compared to the case of using a polyamide-based thermoplastic elastomer alone. Therefore, since the elastic modulus of the thermoplastic resin material can be easily set to a desired range, the resin material is excellent in view of the production cost, and impact resistance can be easily enhanced.

In an embodiment of the tire of the second aspect of the present invention, a reinforcing cord member is wound around the outer circumference of a tire frame formed of a thermoplastic resin material including a polyamide-based thermoplastic elastomer and another elastomer, to form a reinforcing cord layer. When the reinforcing cord layer is formed on the outer circumference of the tire frame, the resistance to puncture and resistance to cutting of the tire, and the rigidity in the circumferential direction of the tire (tire frame) are increased. Also, as the rigidity in the circumferential direction is increased, creeping (a phenomenon in which plastic deformation of the tire frame increases with time under a constant stress) in the tire frame formed of a thermoplastic material is suppressed.

Furthermore, a polyamide-based thermoplastic elastomer can easily penetrate not only between the fibers of the reinforcing cord member itself, but also between twisted cords in the case where the reinforcing cord member has a twisted-fiber structure, due to the low melt viscosity of the elastomer. Accordingly, the polyamide-based thermoplastic elastomer has high adhesiveness to reinforcing cord member, and has excellent fixing performance such as welding strength. Also, when the reinforcing cord member is an organic fiber, since the polyamide-based thermoplastic elastomer that forms the tire frame can be welded to the reinforcing cord member, high welding properties and excellent fixing performance are obtained. Further, since a polyamide-based thermoplastic elastomer exhibits excellent elongation, the fracture properties are excellent. Therefore, when a thermoplastic resin material including a polyamide-based thermoplastic elastomer and another elastomer is used, for example, the phenomenon in which air remains in the surroundings of the reinforcing cord members in the reinforcing cord winding step (incorporation of air) can be suppressed. If the thermoplastic resin material has high adhesiveness and welding properties to the reinforcing cord, and incorporation of air into the surroundings of the reinforcing cord members is suppressed, the movement of the reinforcing cord member due to, for example, a force applied during driving can be effectively suppressed. Thereby, for example, even in the case where a tire-constituting member is provided so as to cover the entirety of the reinforcing cord members in the outer circumference of the tire frame, since the movement of the reinforcing cord members is suppressed, detachment or the like between these members (including the tire frame) is prevented from occurring, and durability of the tire is enhanced.

(2-2) The tire of the second aspect of the present invention can be configured such that the reinforcing cord layer contains a resin material. As such, when the reinforcing cord layer contains a resin material, the difference in hardness between the tire and the reinforcing cord layer can be decreased as compared with the case where the reinforcing cord members are fixed with a cushion rubber, and therefore, the reinforcing cord members can be adhered and fixed to the tire frame further. Thereby, the incorporation of air as described above can be effectively prevented, and the movement of the reinforcing cord member at the time of driving can be effectively suppressed. Furthermore, when the reinforcing cord member is a steel cord, if an attempt made to separate the reinforcing cord from the cushion rubber at the time of disposal of the tire, while it is difficult to separate a vulcanized rubber from the reinforcing cord only by heating, a resin material can be separated from the reinforcing cord member by heating only. Therefore, it is advantageous in view of recyclability of the tire. Furthermore, a resin material usually has a lower loss factor (tan δ) compared to vulcanized rubbers. Accordingly, if the reinforcing cord layer contains a large amount of a resin material, the rolling properties of the tire can be enhanced. Moreover, a resin having a relatively high elastic modulus compared to vulcanized rubbers is advantageous in that the resin has high in-plane shear rigidity, and also exhibits excellent steering stability at the time of tire driving, and excellent abrasion resistance.

Here, if the expression "resin" is used alone, the "resin" has the same definition as that used in the first aspect of the present invention described above.

When the reinforcing cord layer contains a resin material, from the viewpoint of increasing the pull-out properties (difficulty to be pulled out) of the reinforcing cords, the reinforcing cord members are preferably covered by a resin material over 20% or more of the surface, and more preferably 50% or more of the surface. Also, the content of the resin material in the reinforcing cord layer is preferably 20 mass % or more, and more preferably 50 mass % or more, relative to the total amount of the materials that constitute the reinforcing cord layer excluding the reinforcing cords, from the viewpoint of increasing the pull-out properties of the reinforcing cords.

In order to configure the reinforcing cord layer to include a resin material, for example, the reinforcing cord layer can be formed in a configuration such that when viewed from a cross-section of the tire frame along the axial direction, at least a portion of the reinforcing cord member is embedded in the outer circumference of the tire frame that is formed of a thermoplastic resin material. In this case, the thermoplastic resin material including a polyamide-based thermoplastic elastomer and another elastomer in the outer circumference of the tire frame in which the reinforcing cord member is embedded, corresponds to the resin material as a component of the reinforcing cord layer, and the polyamide-based thermoplastic elastomer (thermoplastic resin material) forming the tire frame and the reinforcing cord member constitute the reinforcing cord layer. Furthermore, in order to configure the reinforcing cord layer to include a resin material, a coated cord member obtained by coating a reinforcing cord with a resin material of the same kind as or different from the resin material that forms the tire frame, may be wound in the circumferential direction of the tire frame. The "same kind" as used for resin material means a situation in which both are ester-based resin materials, or both are styrene-based resin materials, or the like.

(2-3) The tire of the second aspect of the present invention can be configured such that the mass ratio (x:y) of the polyamide-based thermoplastic elastomer (x) and the other elastomer (y) in the thermoplastic resin is 95:5 to 60:40. As such, when the mass ratio (x:y) of the polyamide-based thermoplastic elastomer (x) and the other elastomer (y) is set to 95:5 to 60:40, a good balance can be easily achieved between the welding properties between the reinforcing cord members and the tire frame, and the impact resistance of the tire.

(2-4) The tire of the second aspect of the present invention can be configured such that the other elastomer is any one selected from a polyurethane-based thermoplastic elastomer, a polyolefin-based thermoplastic elastomer, a polystyrene-based thermoplastic elastomer, of a polyester-based thermoplastic elastomer. When the other elastomer in the thermoplastic resin material is any one selected from a polyurethane-based thermoplastic elastomer, a polyolefin-based thermoplastic elastomer, a polystyrene-based thermoplastic elastomer, or a polyester-based thermoplastic elastomer, the performance of the polyamide-based thermoplastic elastomer can be sufficiently exhibited, and also, a balance between durability and impact resistance of the tire can be easily achieved.

The tire of the second aspect of the present invention can be produced by a production method which includes a tire frame piece forming step of forming a tire frame piece for constituting a portion of a circular tire frame, using a thermoplastic resin material including at least a polyamide-based thermoplastic elastomer and the another elastomer; a tire frame piece bonding step of forming a tire frame by fusing two or more of the tire frame pieces, which make a pair, by applying heat to bonding surfaces of the tire frame piece; and a reinforcing cord member winding step of winding a reinforcing cord member around the outer circumference of the tire frame in the circumferential direction to form a reinforcing cord layer.

In the production method described above, tire frame pieces of the circular tire frame can be formed by using a thermoplastic resin material including a polyamide-based thermoplastic elastomer and another r elastomer. Since the polyamide-based thermoplastic elastomer can have its melting point set to about 100° C. to 250° C., for example, it is not necessary to carry out a process of fusing the tire frame pieces at or above 300° C., and the process of fusing can be carried out at a relatively low temperature. As such, since the process of fusing can be carried out at a relatively low temperature, deterioration of the resin can be prevented, and from the viewpoint of energy availability or the like, the tire productivity can be increased. Furthermore, a tire frame piece in which a thermoplastic resin material including a polyamide-based thermoplastic elastomer and the another elastomer is used is such that when tire frame pieces are fused to form a tire frame, sufficient adhesive strength between the tire frame pieces is obtained, and the performance of the frame itself is not deteriorated by the temperature at the time of fusion. Therefore, durability at the time of driving, such as the resistance to puncture or abrasion resistance of the tire thus produced can be increased.

The production method can be configured such that in the tire frame piece bonding step, the bonding surface of the tire frame piece is heated to a temperature equal to or higher than the melting point of the thermoplastic resin material that constitutes the tire frame piece (for example, melting point +10° C. to +150° C.).

As such, when the bonding surface of the divided body is heated to a temperature higher than or equal to the melting point of the thermoplastic resin material that constitutes the tire frame piece, since fusion between the tire frame pieces can be sufficiently achieved, productivity of the tire can be increased, while durability of the tire is enhanced.

The means for solving the problem of the third aspect is as follows.

(3-1) The tire of the third aspect of the present invention is a tire including at least a circular tire frame formed of a thermoplastic resin material, in which the thermoplastic resin material includes a polyamide-based thermoplastic elastomer, and an acid-modified elastomer obtained by acid-modifying a thermoplastic elastomer other than the polyamide-based thermoplastic elastomer, or a mixture of a thermoplastic elastomer other than the polyamide-based thermoplastic elastomer and an acid-modified elastomer obtained by acid-modifying the elastomer other than the polyamide-based thermoplastic elastomer.

That is, the tire of the third aspect of the present invention includes a circular tire frame formed of a specific thermoplastic resin material, and the specific thermoplastic resin material includes at least 1) a combination of a polyamide-based thermoplastic elastomer and an acid-modified elastomer obtained by acid-modifying a thermoplastic elastomer other than the polyamide-based thermoplastic elastomer, or 2) a combination of a polyamide-based thermoplastic elastomer, a thermoplastic elastomer other than a polyamide-based thermoplastic elastomer, and an acid-modified elastomer obtained by acid-modifying a thermoplastic elastomer other than a polyamide-based thermoplastic elastomer.

Hereinafter, the "thermoplastic elastomer" refers to a thermoplastic resin material formed of a copolymer that includes a polymer constituting a hard segment that is crystalline and has a high melting point or a hard segment that has high cohesive force power, and a polymer constituting a soft segment that is non-crystalline and has a low glass transition temperature.

The "polyamide-based thermoplastic elastomer" has the same definition as that used in the first aspect of the present invention as described above.

In the third aspect of the present invention, the "thermoplastic elastomer other than a polyamide-based thermoplastic elastomer" means a thermoplastic elastomer which does not include an amide bond (—CONH—) in the main chain of the polymer constituting the hard segment, among thermoplastic elastomers. Hereinafter, a thermoplastic elastomer other than a polyamide-based thermoplastic elastomer will also be referred to as "other thermoplastic elastomer".

In the third aspect of the present invention, the "acid-modified elastomer obtained by acid-modifying a thermoplastic elastomer other than a polyamide-based thermoplastic elastomer" means a thermoplastic elastomer obtained by bonding a compound having an acidic group to a thermoplastic elastomer other than a polyamide-based thermoplastic elastomer (other thermoplastic elastomer). In addition, the "thermoplastic elastomer other than a polyamide-based thermoplastic elastomer" (other thermoplastic elastomer) does not encompass an acid-modified elastomer obtained by acid-modifying another thermoplastic elastomer.

The thermoplastic resin in the third aspect of the present invention has the same definition as that used in the present invention according to the first aspect as described above.

A polyamide-based thermoplastic elastomer is advantageous in that the thermoplastic elastomer has heat resistance, and also exhibits excellent tensile modulus of elasticity, tensile strength, and fracture strain. Furthermore, as the thermoplastic resin material includes an acid-modified elastomer, since the elasticity of the resin material does not become too strong, and the thermoplastic resin material is flexible, the tensile modulus of elasticity can be decreased, and impact resistance can be improved. Furthermore, even if the resin material is fractured, the resin material is not easily torn off and ruptured, and the resin material easily forms a stretched state. Accordingly, regarding the tire performance, even when the tire is damaged, puncture does not easily occur, and rupture of the tire can be avoided.

(3-2) The tire of the third aspect of the present invention can be configured such that the acid value of the thermoplastic resin material is equal to or greater than 0.1 mg-$CH_3ONa$/g but less than 2.2 mg-$CH_3ONa$/g.

As such, when the acid value of the thermoplastic resin material is adjusted to the range described above, particularly, the melt viscosity of the thermoplastic resin material does not increase excessively, and since excellent fluidity is obtained, injection molding properties are superior. Accordingly, the production efficiency of the tire increases. Therefore, a balance can be achieved between tensile elasticity and fracture properties as the tire performance, and manufacturability in view of the injection molding properties.

The thermoplastic resin material has a sea-island structure having a sea phase, which is a matrix phase formed of a polyamide-based thermoplastic elastomer, and an island phase, which is a dispersed phase formed of an acid-modified elastomer, or an acid-modified elastomer and another thermoplastic elastomer (unmodified). In regard to the sea-island structure, as the acid value is higher, the island phase tends to be smaller, and as the acid value is lower, the island phase tends to be larger. When the acid value of the acid-modified elastomer is in the range described above, the island phase is finely dispersed in the thermoplastic resin, and impact resistance, tensile elasticity, and fracture properties are enhanced.

(3-3) The tire of the third aspect of the present invention can be configured such that the ratio of the mass of the polyamide-based thermoplastic elastomer in the thermoplastic resin material, and the total mass of the acid-modified elastomer and the thermoplastic elastomer other than a polyamide-based thermoplastic elastomer (mass of the polyamide-based thermoplastic elastomer:total mass of the acid-modified elastomer and the thermoplastic elastomer other than a polyamide-based thermoplastic elastomer) is from 90:10 to 60:40.

When the ratio of the mass of the polyamide-based thermoplastic elastomer in the thermoplastic resin material in the thermoplastic resin material and the total mass of the acid-modified elastomer and the thermoplastic elastomer other than a polyamide-based thermoplastic elastomer is adjusted to the range described above, the performance of the thermoplastic resin material can be sufficiently exhibited, and the tensile elasticity and fracture properties as the tire performance can be further enhanced.

(3-4) The tire of the third aspect of the present invention can be configured such that the content of the polyamide-based thermoplastic elastomer in the thermoplastic resin material is 55 mass % to 95 mass %.

When the content of the polyamide-based thermoplastic elastomer in the thermoplastic resin material is in the range described above, the performance of the thermoplastic resin material can be sufficiently exhibited, and the tensile elasticity and fracture properties as the tire performance can be further enhanced.

Furthermore, the tire of the third aspect of the present invention may also include, in addition to the tire frame formed of a thermoplastic resin material, a reinforcing cord member that is wound around the outer circumference of the tire frame formed of a thermoplastic resin material to form a reinforcing cord layer.

When the reinforcing cord member is wound in the circumferential direction around the outer circumference of the tire frame formed of a thermoplastic resin material to form a reinforcing cord layer, the resistance to puncture and resistance to cutting of the tire, and the rigidity in the circumferential direction of the tire (tire frame) are increased. Meanwhile, as the rigidity in the circumferential direction is increased, creeping (a phenomenon in which plastic deformation of the tire frame increases with time under a constant stress) in the tire frame formed of a thermoplastic material is suppressed.

(3-5) The method for producing a tire of the third aspect of the present invention includes a tire frame piece forming step of forming a tire frame piece for constituting a portion of a circular tire frame, using a thermoplastic resin material including at least a polyamide-based thermoplastic elastomer, and an acid-modified elastomer obtained by acid-modifying a thermoplastic elastomer other than the polyamide-based thermoplastic elastomer, or a mixture of a thermoplastic elastomer other than the polyamide-based thermoplastic elastomer and an acid-modified elastomer obtained by acid-modifying the elastomer other than the polyamide-based thermoplastic elastomer; and a tire frame piece bonding step of forming a tire frame by fusing two or more of the tire frame pieces, which make a pair, by applying heat to the bonding surfaces of the tire frame pieces.

The method for producing a tire of the third aspect of the present invention forms a tire frame piece of a circular tire frame, using a thermoplastic resin material. Since the thermoplastic resin material has excellent tensile elasticity and fracture properties, the riding quality of a car using a tire thus produced is excellent, and the resistance to bursting and resistance to puncture of the tire can be enhanced.

(3-6) The method for producing a tire of the third aspect of the present invention can be configured such that the acid value of the thermoplastic resin material is equal to or greater than 0.1 mg-$CH_3ONa$/g but less than 2.2 mg-$CH_3ONa$/g.

As such, when the acid value of the thermoplastic resin material is adjusted to the range described above, particularly, the melt viscosity of the thermoplastic resin material does not increase excessively, and since fluidity is excellent, injection molding properties are superior. Therefore, the production efficiency of the tire increases, and it is also preferable from an environmental viewpoint such as energy saving.

(3-7) The method for producing a tire of the third aspect of the present invention can be configured so as to include a process of performing injection molding using the thermoplastic resin material in the tire frame piece forming step.

Since a thermoplastic resin material having an acid value of the thermoplastic resin material of equal to or greater than 0.1 mg-CH3ONa/g but less than 2.2 mg-CH3ONa/g has excellent injection molding properties, productivity of the tire can be increased.

The means for solving the problem of the fourth aspect is as follows.

(4-1) The tire of the fourth aspect of the present invention is a tire including a circular tire frame formed of a thermoplastic resin material, in which the thermoplastic resin material includes a thermoplastic elastomer including a hard segment and a soft segment in the molecule thereof, and needle-shaped crystal grains having a fiber length of 1 μm to 500 μm and a fiber diameter of 0.01 μm to 10.0 μm (hereinafter, also appropriately referred to as "specific needle-shaped crystal grains").

(4-2) In regard to the tire of the fourth aspect of the present invention, it is preferable that the content of the specific needle-shaped crystal grains relative to the total mass of the thermoplastic resin material that forms the tire frame be in the range of 0.1 mass % to 10 mass %.

(4-3) In regard to the tire of the fourth aspect of the present invention, it is preferable that the needle-shaped crystal grains contained in the thermoplastic resin material are inorganic particles selected from a metal oxide, a metal nitride, a metal carbonate, a metal silicate, a metal titanate, a metal sulfate, or a metal borate.

(4-4) In regard to the tire of the fourth aspect of the present invention, it is preferable that the thermoplastic elastomer included in the thermoplastic resin material be a thermoplastic elastomer selected from a polyamide-based thermoplastic elastomer, a polyester-based thermoplastic elastomer, or a polystyrene-based thermoplastic elastomer.

The means for solving the problem of the fifth aspect is as follows.

(5-1) The tire of the fifth aspect of the present invention is a tire including at least a circular tire frame formed of a resin material, in which the resin material includes a thermoplastic elastomer including a hard segment and a soft segment in the molecule thereof, and a resin having a glass transition temperature that is higher than the glass transition temperature of the hard segment.

The tire of the fifth aspect of the present invention includes a circular tire frame formed of a resin material including a thermoplastic elastomer including a hard segment and a soft segment in the molecule thereof, and a resin having a glass transition temperature (Tg) that is higher than the glass transition temperature of the hard segment (hereinafter, may be referred to as "specific resin according to the fifth aspect of the present invention"). In regard to the tire of the fifth aspect of the present invention, since the tire frame is formed of the resin material, a vulcanization process that is an essential process for the conventional tires made of rubber is not essential, and the tire frame can be molded by, for example, injection molding. Therefore, simplification of the production process, time shortening, cost reduction, and the like can be promoted. Furthermore, when a resin material is used in the tire frame, the structure of the tire can be simplified as compared with the conventional tires made of rubber, and as a result, weight reduction of the tire can be realized. Accordingly, abrasion resistance and durability of the tire in which a tire frame is formed of the tire material can be enhanced.

The "thermoplastic elastomer" has the same definition as that used in the present invention according to the third aspect as described above. In order to increase the elastic modulus of the thermoplastic elastomer (for example, the tensile modulus of elasticity defined in JIS K7113:1995), increasing the content ratio of the hard segment in the elastomer may be considered. However, when the content ratio of the hard segment is increased in order to increase the elastic modulus of the thermoplastic elastomer, the loss factor (tan δ) of the thermoplastic elastomer also increases along therewith.

Furthermore, in order to enhance the heat resistance (temperature dependency of deflection under load, the elastic modulus, and the like) of the tire frame, using a thermoplastic elastomer having a high glass transition temperature or a thermoplastic elastomer having a high elastic modulus can be considered. However, as explained above, these thermoplastic elastomers also undergo an increase in the tan δ value.

In the tire of the fifth aspect of the present invention, the resin material that forms the tire frame includes the specific resin according to the fifth aspect of the present invention, which has a glass transition temperature (Tg) higher than that of the hard segment, in addition to the thermoplastic elastomer. Therefore, as compared with the case of using the thermoplastic elastomer as a single substance, an increase in the elastic modulus can be achieved while the tan δ value of the tire frame is maintained low. Thereby, a tire having a low rolling resistance and a high elastic modulus can be provided. Furthermore, since the elastic modulus can be increased while the tan δ value of the tire frame is maintained low, heat resistance of the tire frame can also be increased.

(5-2) In regard to the tire of the fifth aspect of the present invention, a resin having a glass transition temperature that is higher by 20° C. or more than the glass transition temperature of the hard segment of the thermoplastic elastomer can be used as the resin. The tire of the fifth aspect of the present invention can sufficiently exhibit an effect of increasing the elastic modulus, by adjusting the difference between the glass transition temperature of the hard segment of the thermoplastic elastomer and the glass transition temperature of the resin, to 20° C. or more.

The difference ($Tg_1$-$Tg_2$) between the glass transition temperature of the hard segment ($Tg_1$) and the glass transition temperature of the specific resin according to the fifth aspect of the present invention ($Tg_2$) is preferably 20° C. to 200° C., and more preferably 30° C. to 80° C.

(5-3) In regard to the tire of the fifth aspect of the present invention, the mass ratio (x+y:z) of the soft segment (z) of the thermoplastic elastomer with respect to the total amount (x+y) of the hard segment (x) of the thermoplastic elastomer and the resin (y) can be adjusted to 10:90 to 90:10.

When the mass ratio (x+y:z) is in the range of 10:90 to 90:10, the effect of increasing the elastic modulus while maintaining the tan δ value of the tire frame low can be sufficiently exhibited.

The mass ratio (x+y:z) is preferably 40:60 to 80:20.

(5-4) The tire of the fifth aspect of the present invention can be configured such that the thermoplastic elastomer is at least one selected from a polyamide-based thermoplastic elastomer or a polyester-based elastomer.

(5-5) The tire of the fifth aspect of the present invention can be configured such that the resin is at least one selected from polyphenylene ether, polyphenylene sulfide, polyethylene terephthalate, polybutylene terephthalate, polyethylene naphthalate, polybutylene naphthalate, polytrimethylene terephthalate, polycarbonate, and polyallylate.

Furthermore, regarding the combination of the thermoplastic elastomer and the resin, at least one selected from a combination of a polyamide-based elastomer and polyphenylene ether; a combination of a polyamide-based thermoplastic elastomer and polyphenylene ether; a combination of a polyamide-based thermoplastic elastomer and any one of polyphenylene sulfide, polyethylene terephthalate, polybutylene terephthalate, polyethylene naphthalate, polybutylene naphthalate, polytrimethylene terephthalate, polycarbonate or polyallylate; and a combination of a polyester-based thermoplastic elastomer and any one of polyphenylene ether, polyphenylene sulfide, polyethylene terepthalate, polybutylene terephthalate, polyethylene naphthalate, polybutylene naphthalate, polytrimethylene terephthalate, polycarbonate, or polyallylate, is preferred.

The means for solving the problem of the sixth aspect is as follows.

(6-1) The tire of the sixth aspect of the present invention is a tire including a circular tire frame formed of a thermoplastic resin material, in which the tire frame has a volume resistivity in the range of $1.0 \times 10^6$ to $1.0 \times 10^{10}$.

(6-2) In the tire of the sixth aspect of the present invention, it is preferable that the tire frame include an antistatic material.

(6-3) In the tire of the sixth aspect of the present invention, it is preferable that the thermoplastic resin material include a thermoplastic elastomer.

(6-4) In the tire of the sixth aspect of the present invention, it is preferable that the antistatic material be a phosphoric acid ester-based ionic conductor.

The means for solving the problem of the seventh aspect is as follows.

(7-1) The tire of the seventh aspect of the present invention is a tire including at least a circular tire frame formed of a thermoplastic resin material, in which the thermoplastic resin material includes a thermoplastic elastomer including a hard segment and a soft segment in the molecule thereof, and a resin of the same kind as the hard segment, which is other than the thermoplastic elastomer.

Here, the "thermoplastic elastomer" is a thermoplastic resin material including a hard segment and a soft segment in the molecule thereof, and has the same definition as that used in the third aspect of the present invention as described above. The "resin of the same kind as the hard segment" included in the thermoplastic elastomer refers to a resin having a skeleton that is common with the skeleton constituting the main chain of the hard segment included in the thermoplastic elastomer. Meanwhile, the resin in the seventh aspect of the present invention has the same definition as that used in the first aspect of the present invention as described above. The thermoplastic elastomer also does not encompass conventional vulcanized rubbers such as natural rubber or synthetic rubbers.

Hereinafter, a resin of the same kind as the hard segment included in the thermoplastic elastomer, which is other than the thermoplastic elastomer, is also simply referred to as "specific resin according to the seventh aspect of the present invention".

When the specific resin according to the seventh aspect of the present invention has a skeleton that is common with the skeleton constituting the main chain of the hard segment carried by the thermoplastic elastomer, the affinity between the specific resin according to the seventh aspect of the present invention and the hard segment of the thermoplastic elastomer increases. Therefore, as the thermoplastic resin material includes the thermoplastic elastomer of the constitution described above and the specific resin according to the seventh aspect of the present invention, the specific resin according to the seventh aspect of the present invention is compatible with the hard segment of the thermoplastic elastomer and is localized in the hard segment of the thermoplastic elastomer. Thus, the region of the hard segment increases.

Therefore, in a thermoplastic resin containing the specific resin according to the seventh aspect of the present invention and a thermoplastic elastomer, it is believed that it is not such that simply the two components are included, and the specific resin according to the seventh aspect of the present invention is uniformly dispersed in the thermoplastic elastomer, and exhibit the respective properties of the specific resin according to the seventh aspect of the present invention and the thermoplastic elastomer, but that the elastic modulus of the thermoplastic resin material increases due to increase in the region of the hard segment of the thermoplastic elastomer.

Since the rolling resistance of a tire is caused by vibration at approximately 10 Hz to 100 Hz at near 50° C., when the viscoelasticity of the tire is measured, the magnitude of the rolling resistance can be expressed by tan δ at 30° C. to 50° C.

A tire formed using a resin material composed only of a thermoplastic elastomer has a tendency that when the number of hard segment regions of the thermoplastic elastomer is increased to increase the elastic modulus, the loss tangent (tan δ) increases. Specifically, when the ratio of the hard segment and the soft segment of the thermoplastic elastomer is changed to increase the elastic modulus, the peak of tan δ of the thermoplastic elastomer in the measurement of viscoelasticity is shifted to the higher temperature side, and the tan δ value at 30° C. to 50° C. tends to increase.

When the loss tangent (tan δ) of the resin material increases, the energy loss (heat generation) occurring upon deformation at the time of tire rolling tends to increase, and the rolling resistance tends to increase. Accordingly, a car using a tire which uses such a resin material as a raw material tends to have a large fuel consumption. That is, in a tire formed by using a resin material that is composed only of a thermoplastic elastomer, if the elastic modulus of the resin material is increased for the purpose of enhancing the resistance to deformation of the tire, the tan δ value of the resin material also increases at the same time. Therefore, it has been difficult to realize low fuel consumption.

On the contrary, when a tire frame is produced using the thermoplastic resin material according to the seventh aspect of the present invention having the constitution described above, and thus a tire is formed, even if the elastic modulus of the thermoplastic resin material increases, the tan δ value does not easily increase. This is thought to be because when the specific resin according to the seventh aspect of the present invention is compatible with the hard segment of the thermoplastic elastomer, the region of the hard segment itself increases, and in the measurement of viscoelasticity, a shift of the peak of tan δ of the thermoplastic resin material is suppressed. As a result, it is speculated that although a peak of tan δ of the specific resin according to the seventh aspect of the present invention appears, the tan δ is suppressed in overall.

Thus, it is thought that in the seventh aspect of the present invention, even though the elastic modulus of the thermoplastic resin material increases, the tan δ value does not easily increase.

(7-2) The tire of the seventh aspect of the present invention can be configured such that the elastic modulus of the resin is 100 MPa or greater.

As such, when the elastic modulus of the resin that is easily compatible with the hard segment included in the thermoplastic elastomer is adjusted to the range described above, the elastic modulus of the hard segment of the thermoplastic elastomer can be further increased. Therefore, a thermoplastic resin material having even higher elastic modulus can be obtained. As a result, a tire having a higher elastic modulus can be obtained.

(7-3) The tire of the seventh aspect of the present invention can be configured such that the mass ratio of the thermoplastic elastomer and the resin (the thermoplastic elastomer:the resin) is 95:5 to 50:50.

When the content of the thermoplastic elastomer in the thermoplastic resin material is in the range described above, the performance of the thermoplastic resin material can be sufficiently exhibited, and tensile characteristics such as tensile elasticity and breaking strength as the tire performance can be enhanced.

(7-4) The tire of the seventh aspect of the present invention can be configured such that the content of the thermoplastic elastomer in the thermoplastic resin material is 50 mass % to 95 mass %.

When the content of the thermoplastic elastomer in the thermoplastic resin material is in the range described above, the performance of the thermoplastic resin material can be sufficiently exhibited, and tensile characteristics such as tensile elasticity and breaking strength as the tire performance can be further enhanced.

(7-5) It can be configured such that the thermoplastic elastomer is a polyamide-based thermoplastic elastomer, and the resin is a polyamide-based resin.

Here, the "polyamide-based thermoplastic elastomer" has the same definition as that used in the first aspect of the present invention as described above. Furthermore, the polyamide-based resin refers to a thermoplastic resin including an amide bond (—CONH—) in the main chain thereof.

As such, regarding the specific resin according to the seventh aspect of the present invention of the polyamide-based thermoplastic elastomer, it is preferable to use a resin having a skeleton (amide bonds) that is common with the skeleton (amide bonds) constituting the main chain of the molecular chain of the hard segment included in the polyamide-based thermoplastic elastomer, that is, a polyamide-based resin. A polyamide-based thermoplastic elastomer has an advantage that the elastomer has heat resistance, and also exhibits excellent tensile modulus of elasticity, tensile strength, and fracture strain. Therefore, when a polyamide-based resin is used in combination as the specific resin according to the seventh aspect of the present invention, an effect of further suppressing rolling resistance can be exhibited, and a tire having satisfactory durability and exhibits low fuel consumption can be obtained.

Furthermore, the tire of the seventh aspect of the present invention may further include a reinforcing cord member that is wound around the outer circumference of the tire frame formed of the thermoplastic resin material to form a reinforcing cord member layer, in addition to the tire frame formed of a thermoplastic resin material.

When the reinforcing cord member is wound around the outer circumference of the tire frame formed of a thermoplastic resin material to form the reinforcing cord member layer, the resistance to puncture, the resistance to cutting of the tire, and the rigidity in the circumferential direction of the tire (tire frame) are enhanced. Furthermore, as the rigidity in the circumferential direction is increased, creeping (a phenomenon in which plastic deformation of the tire frame increases with time under a constant stress) in the tire frame formed of a thermoplastic material is suppressed.

The means for solving the problem of the eighth aspect is as follows.

(8-1) The tire of the eighth aspect of the present invention is a tire at least including a circular tire frame formed of a resin material, in which the resin material includes at least a thermoplastic elastomer, and a resin which is other than the thermoplastic elastomer, has a glass transition temperature of 20° C. or lower, and has an elastic modulus greater than the elastic modulus of the thermoplastic elastomer.

Here, the "thermoplastic elastomer" has the same definition as that used in the third aspect of the present invention as described above.

Furthermore, the "resin" in the eighth aspect of the present invention has the same definition as that used in the present invention according to the first aspect as described above. The thermoplastic elastomer also does not encompass conventional vulcanized rubbers such as natural rubber, or a synthetic rubber.

Hereinafter, a resin which is other than the thermoplastic elastomer, has a glass transition temperature of 20° C. or lower, and has an elastic modulus greater than the elastic modulus of the thermoplastic elastomer, is also simply referred to as a "specific resin according to the eighth aspect of the present invention."

When the resin material includes the specific resin according to the eighth aspect of the present invention having a glass transition temperature in the range described above, in addition to the thermoplastic elastomer, an increase in rolling resistance can be suppressed.

Regarding a tire formed by using a resin material composed only of a thermoplastic elastomer, as the elastic modulus of the resin material increases, the energy loss caused by a hysteresis loss occurring upon deformation of the tire increases. Therefore, the rolling resistance tends to be large, and the energy loss (heat generation) also tends to increase. The rolling resistance of the tire can be estimated from the loss tangent (tan δ) of the material that constitutes the tire, and for example, as the rolling resistance of the tire increases, the tan δ value of the material constituting the tire tends to increase.

Furthermore, since rolling resistance of a tire is caused by vibration at approximately 10 Hz to 100 Hz at near 50° C., for measuring the viscoelasticity of the tire, the magnitude of the rolling resistance can be expressed by tan δ at 30° C. to 50° C.

A tire formed by using a resin material composed only of a thermoplastic elastomer has a tendency that when the number of hard segment regions of the thermoplastic elastomer is increased to increase the elastic modulus, the loss tangent (tan δ) increases. Specifically, when the ratio of the hard segment and the soft segment of the thermoplastic elastomer is changed to increase the elastic modulus, the peak of tan δ of the thermoplastic elastomer in the measurement of viscoelasticity tends to be shifted to the higher temperature side, and the tan δ value at 30° C. to 50° C. tends to increase. If the loss tangent (tan δ) of a resin material increases, the energy loss (heat generation) occurring upon deformation at the time of tire rolling tends to increase, and the rolling resistance tends to increase. Accordingly, a car using a tire in which such a resin material is used as a raw material tends to have high fuel consumption.

That is, in a tire formed using a resin material that is composed only of a thermoplastic elastomer, if the elastic modulus of the resin material is increased for the purpose of enhancing the resistance to deformation of the tire, the tan δ value of the resin material also increases at the same time. Therefore, it has been difficult to realize a decrease of the rolling resistance.

On the other hand, when a tire frame is produced by using a resin material of the constitution described above, and a tire is formed thereof, the resin material has a desired elastic modulus, and the tan δ value can be suppressed to a low level. As a result, it is thought that in the eighth aspect of the present invention, a suitable elastic modulus is obtained, and also, a decrease in the rolling resistance of the tire can be realized.

(8-2) The tire of the eighth aspect of the present invention can be configured such that the resin (specific resin according to the eighth aspect of the present invention) is an acid-modified resin.

As such, when the resin material includes a thermoplastic elastomer and the specific resin according to the eighth aspect of the present invention that has been acid-modified, the resin material has a sea-island structure including a sea phase formed of a thermoplastic elastomer and an island phase formed of an acid-modified resin, or a structure in which the specific resin according to the eighth aspect of the present invention is dispersed in a thermoplastic elastomer. When the interaction of the phase interface between the sea phase and the island phase or the phase interface between the thermoplastic elastomer and the specific resin according to the eighth aspect of the present invention is weak, fluidity of the resin material increases, and excellent injection molding properties are obtained. Since an acid-modified resin has an acid-modified site in the molecule, the interaction with the thermoplastic elastomer is strong as compared with a resin that is not acid-modified.

On the other hand, in regard to the sea-island structure, there is a tendency that as the acid value of the resin that is acid-modified is higher, the island phase is smaller, and as the acid value is lower, the island phase is larger.

(8-3) The tire of the eighth aspect of the present invention can be configured such that in regard to the configuration of (8-2), the acid-modified resin is an acid-modified polyolefin resin (for example, an acid-modified polypropylene, an acid-modified polyethylene, an acid-modified ethylene-propylene copolymer, or an ethylene-vinyl acetate copolymer).

As such, when the particular resin according to the eighth aspect of the present invention is as described above, the tensile characteristics such as tensile elasticity and breaking strength as the tire performance can be enhanced.

(8-4) The tire of the eighth aspect of the present invention can be configured such that in regard to the configuration of (8-2) or (8-3), the resin material further includes a resin that is other than the thermoplastic elastomer and is not acid-modified.

As such, when the resin material includes a thermoplastic elastomer, the specific resin according to the eighth aspect of the present invention that is acid-modified, and a resin that is not acid-modified, the acid value can be adjusted, the tensile characteristics such as tensile elasticity and breaking strength can be enhanced while fluidity is suppressed, and excellent injection molding properties are obtained.

(8-5) The tire of the eighth aspect of the present invention can be configured such that in regard to the configuration of (8-4), the resin that is not acid-modified is at least one selected from polyolefin resins (for example, polypropylene, polyethylene, and an ethylene-propylene copolymer).

As such, when the resin that is not acid-modified is such as described above, the resin that is not acid-modified is compatible with the acid-modified resin, and injection molding at the time of tire production can be enhanced.

Furthermore, the resin that is not acid-modified is preferably a resin of the same kind as the acid-modified resin that is used together with the resin that is not acid-modified. The "same kind" as used herein means that two resins have a skeleton in which the skeleton that constitutes the main chain of the resin is common. A resin of the same kind for an acid-modified polypropylene corresponds to, for example, polypropylene, and a resin of the same kind for an acid-modified polyethylene corresponds to, for example, polyethylene.

(8-6) The tire of the eighth aspect of the present invention can be configured such that the resin (specific resin according to the eighth aspect of the present invention) is a resin that is not acid-modified.

(8-7) The tire of the eighth aspect of the present invention can be configured such that in regard to the configuration of (8-6), the resin that is not acid-modified is at least one selected from polyolefin resins (for example, polypropylene, polyethylene, and an ethylene-propylene copolymer).

(8-8) The tire of the eighth aspect of the present invention can be configured such that the thermoplastic elastomer is at least one selected from a polyamide-based thermoplastic elastomer, a polyester-based thermoplastic elastomer, a polystyrene-based thermoplastic elastomer, or a polyurethane-based thermoplastic elastomer.

The polyamide-based thermoplastic elastomer, polyester-based thermoplastic elastomer, polystyrene-based thermoplastic elastomer, and polyurethane-based thermoplastic elastomer are advantageous in that the elastomers have heat resistance, and also exhibit excellent tensile modulus of elasticity, tensile strength, and fracture strain. Furthermore, when a resin material including at least one selected from the polyamide-based thermoplastic elastomer, polyester-based thermoplastic elastomer, polyurethane-based thermoplastic elastomer or polystyrene-based thermoplastic elastomer is used in the tire frame, the structure of the tire can be simplified as compared with conventional rubber tires, and as a result, weight reduction of the tire can be realized. Therefore, when the tire frame is formed, a car using a tire that employs such a resin material as the raw material exhibits improved fuel efficiency.

The means for solving the problem of the ninth aspect is as follows.

(9-1) The tire of the ninth aspect of the present invention is a tire including at least a circular tire frame formed of a resin material, in which the resin material includes at least a first thermoplastic elastomer, a resin which is other than the first thermoplastic elastomer and has a glass transition temperature of 20° C. or lower, and a second thermoplastic elastomer which is other than the first thermoplastic elastomer and which includes a hard segment of the same kind as the resin.

Here, the "thermoplastic elastomer" has the same definition as that used in the third aspect of the present invention described above.

Furthermore, "thermoplastic elastomer including a hard segment of the same kind as the resin" refers to a thermoplastic elastomer including a hard segment which has a skeleton that is common with the skeleton constituting the main chain of the resin. The "resin" in the present invention according to the ninth aspect has the same definition as that used in the first aspect of the present invention described above. However, the thermoplastic elastomer used in the ninth aspect of the present invention encompasses conventional vulcanized rubbers such as natural rubber or synthetic rubbers.

Hereinafter, a resin that is other than a thermoplastic elastomer and has a glass transition temperature of 20° C. or lower will be simply referred to as a "specific resin according to the ninth aspect of the present invention".

It is thought that since the second thermoplastic elastomer includes a hard segment having a skeleton that is common with the skeleton constituting the main chain of the specific resin according to the ninth aspect of the present invention, the affinity between the specific resin according to the ninth aspect of the present invention and the hard segment of the second thermoplastic elastomer increases. Therefore, it is thought that compatibility between the specific resin according to the ninth aspect of the present invention of the configuration described above and the second thermoplastic elastomer may be obtained, and these two components are uniformly dispersed in the resin material.

Furthermore, it is thought that as the resin material further includes a second thermoplastic elastomer in addition to the first thermoplastic elastomer and the specific resin according to the ninth aspect of the present invention, the thermoplastic resin material is imparted with flexibility, and as a result, impact resistance is improved.

Also, a tire formed using a resin material that is composed only of the first thermoplastic elastomer has a tendency that since the energy loss caused by a hysteresis loss occurring as a result of tire deformation increases as the elastic modulus of the relevant resin material increases, a large rolling resistance is obtained, and the energy loss (heat generation) also increases. The rolling resistance of the tire can be estimated from the loss tangent (tan δ) of the material constituting the tire, and for example, as the rolling resistance of the tire is larger, the tan δ value of the material that constitutes the tire tends to increase.

That is, regarding a tire formed by using a resin material composed of the first thermoplastic elastomer alone, when the elastic modulus of the resin material is increased for the purpose of enhancing impact resistance and the like of the tire is increased, the tan δ value of the resin material also increases. Therefore, it has been difficult to realize the decrease of rolling resistance.

On the contrary, when a tire frame is produced by using a thermoplastic resin material having the constitution described above, and thus a tire is formed, the resin material has a desired elastic modulus, and the tan δ value can be suppressed to a low level. As a result, it is thought that in the ninth aspect of the present invention, a suitable elastic modulus is obtained, and also, a decrease in the rolling resistance of the tire can be realized.

(9-2) The tire of the ninth aspect of the present invention can be configured such that the resin (specific resin according to the ninth aspect of the present invention) is an acid-modified resin.

As such, when the resin material includes the first thermoplastic elastomer and the specific resin according to the ninth aspect of the present invention that is acid-modified, the resin material has a sea-island structure including a sea phase formed of a thermoplastic elastomer and an island phase formed of an acid-modified resin, or a structure in which the specific resin according to the ninth aspect of the present invention is dispersed in a thermoplastic elastomer. When the interaction of the phase interface between the sea phase and the island phase or the phase interface between the thermoplastic elastomer and the specific resin according to the ninth aspect of the present invention is weak, fluidity of the resin material increases, and excellent injection molding properties are obtained. Since an acid-modified resin has an acid-modified site in the molecule, the interaction with the thermoplastic elastomer is strong as compared with a resin that is not acid-modified.

On the other hand, in regard to the sea-island structure, there is a tendency that as the acid value of the resin that is acid-modified is higher, the island phase is smaller, and as the acid value is lower, the island phase is larger.

(9-3) The tire of the ninth aspect of the present invention can be configured such that in regard to the configuration of (9-2), the acid-modified resin is at least one selected from acid-modified polyolefin resins (for example, an acid-modified polypropylene, an acid-modified polyethylene, an acid-modified ethylene-propylene copolymer, and an ethylene-vinyl acetate copolymer).

As such, when the acid-modified resin is such as described above, the tensile characteristics such as tensile elasticity and breaking strength as the tire performance can be enhanced.

(9-4) The tire of the ninth aspect of the present invention can be configured such that in regard to the configuration of (9-3), the second thermoplastic elastomer is an olefin-based thermoplastic elastomer.

As such, it is thought that when the olefin-based thermoplastic elastomer as the second thermoplastic elastomer has a hard segment having a skeleton that is common with the skeleton constituting the main chain of the acid-modified polyolefin as the specific resin according to the ninth aspect of the present invention, the affinity between the acid-modified polyolefin and the hard segment of the olefin-based thermoplastic elastomer increases, compatibility between the two components is obtained, and these two components are uniformly dispersed in the resin material.

Furthermore, it is thought that when the resin material further includes an olefin-based thermoplastic elastomer as the second thermoplastic elastomer in addition to the first thermoplastic elastomer and the specific resin according to the ninth aspect of the present invention, the thermoplastic resin material is imparted with flexibility, and as a result, impact resistance is enhanced.

(9-5) The tire of the ninth aspect of the present invention can be configured such that in regard to the configurations of (9-2) to (9-4), the resin material further includes a resin that is other than the first thermoplastic elastomer and the second thermoplastic elastomer and is not acid-modified.

As such, when the resin material includes the first thermoplastic elastomer, the specific resin according to the ninth aspect of the present invention that is acid-modified, the second thermoplastic elastomer, and a resin that is not acid-modified, the tensile characteristics such as tensile elasticity and breaking strength as the tire performance can be enhanced.

(9-6) The tire of the ninth aspect of the present invention can be configured such that in regard to the configuration of (9-5), the resin that is not acid-modified is at least one selected from olefin resins (for example, polypropylene, polyethylene, and an ethylene-propylene copolymer).

As such, when the resin that is not acid-modified is such as described above, the tensile characteristics such as tensile elasticity and breaking strength as the tire performance can be further enhanced.

Furthermore, the resin that is not acid-modified is preferably a resin of the same kind as the acid-modified resin that is used in combination. The "same kind" as used herein means that the skeleton constituting the main chain of the two resins have a skeleton in common with each other. For example, with respect to an acid-modified polypropylene, polypropylene is a same kind thereof, and, with respect to an acid-modified polyethylene, polyethylene is a same kind thereof.

(9-7) The tire of the ninth aspect of the present invention can be configured such that in regard to the configuration of (9-6), the acid-modified resin is an acid-modified polyolefin, the resin that is not acid-modified is polypropylene, and the second thermoplastic elastomer is an olefin-based thermoplastic elastomer containing polypropylene.

As such, it is thought that when the olefin-based thermoplastic elastomer containing polypropylene as the second thermoplastic elastomer has a hard segment having a skeleton that is common with the skeleton constituting the main chain of the acid-modified polyolefin as the specific resin according to the ninth aspect of the present invention and is common with the skeleton constituting the main chain of polypropylene as the resin that is not acid-modified, the affinity of the acid-modified polyolefin, polypropylene, and the hard segment of the olefin-based thermoplastic elastomer containing polypropylene increases, and compatibility of these is obtained so that the polymers are more uniformly dispersed in the resin material.

(9-8) The tire of the ninth aspect of the present invention can be configured such that the first thermoplastic elastomer is at least one selected from a polyamide-based thermoplastic elastomer, a polyester-based thermoplastic elastomer, a polyurethane-based thermoplastic elastomer, and a polystyrene-based thermoplastic elastomer.

The polyamide-based thermoplastic elastomer, polyester-based thermoplastic elastomer, polyurethane-based thermoplastic elastomer and polystyrene-based thermoplastic elastomer are advantageous in that the elastomers have heat resistance, and also exhibit excellent tensile modulus of elasticity, tensile strength and fracture strain. Furthermore, when a resin material including at least one selected from a polyamide-based thermoplastic elastomer, a polyester-based thermoplastic elastomer, a polyurethane-based thermoplastic elastomer and a polystyrene-based thermoplastic elastomer is used in the tire frame, the structure of the tire can be simplified as compared with conventional rubber tires, and as a result, weight reduction of the tire can be realized. Therefore, when a tire frame is formed using the resin material, a car using a tire in which such a resin material is used as the raw material exhibits improved fuel efficiency.

The means for solving the problem of the tenth aspect is as follows.

(10-1) The tire of the tenth aspect of the present invention is a tire including at least a circular tire frame formed of a thermoplastic resin material, in which the tire includes a reinforcing cord member that forms a reinforcing cord layer on the outer circumference of the tire frame, and the thermoplastic resin material including at least a polyamide-based thermoplastic elastomer and a polyester-based thermoplastic elastomer.

The reinforcing cord layer may be wound around the outer circumference of the tire frame in the circumferential direction, or may be wound around the outer circumference in a crossing manner.

The tire of the tenth aspect of the present invention includes a circular tire frame formed of a thermoplastic resin material including a polyamide-based thermoplastic elastomer and a polyester-based thermoplastic elastomer. Here, the "polyamide-based thermoplastic elastomer" has the same definition as that used in the first aspect of the present invention as described above.

The "polyester-based thermoplastic elastomer" has the same definition as that used in the second aspect of the present invention described above.

The thermoplastic resin according to the tenth aspect of the present invention means a resin having thermoplasticity, and does not encompass conventional vulcanized rubbers such as natural rubber or synthetic rubbers.

The thermoplastic resin material including a polyamide-based thermoplastic elastomer and a polyester-based thermoplastic elastomer has excellent durability. More specifically, the resin material has heat resistance, and also exhibits excellent tensile modulus of elasticity, tensile strength and fracture strain. Therefore, when a tire frame is formed using the resin material, the tire obtains excellent durability and manufacturability. Furthermore, since the structure can be simplified, weight reduction can be expected.

Furthermore, since the thermoplastic resin material including a polyamide-based thermoplastic elastomer and a polyester-based thermoplastic elastomer exhibits less temperature dependency of tensile yield strength, the resin material exhibits less deformation or change in hardness that is caused by temperature fluctuation in the use environment, and has a high deflection temperature under load. Therefore, the influence of the use temperature environment for the tire can be decreased, and the tire can be used in an environment of a wide range of temperatures.

On the other hand, when the polyamide-based thermoplastic elastomer is used alone, in the case of adjusting the elastic modulus, it is necessary to control the ratio of the hard segment and the soft segment. In this regard, when a polyamide-based thermoplastic elastomer and a polyester thermoplastic elastomer are used in combination, the elastic modulus of the thermoplastic resin composition can be easily adjusted by adjusting the content ratio of the two components, as compared with the case of using a polyamide-based thermoplastic elastomer alone. Therefore, the elastic modulus of the thermoplastic resin material can be easily set to a desired range.

In an embodiment of the tire of the tenth aspect of the present invention, a reinforcing cord member is wound around the outer circumference of a tire frame formed of a thermoplastic resin material including a polyamide-based thermoplastic elastomer and a polyester-based thermoplastic elastomer, and thus a reinforcing cord layer is formed. When a reinforcing cord layer is formed on the outer circumference of the tire frame, the resistance to puncture and resistance to cutting of the tire, and the rigidity in the circumferential direction of the tire (tire frame) are enhanced. In addition, when the rigidity in the circumferential direction is increased, creeping (a phenomenon in which plastic deformation of the tire frame increases with time under a constant stress) in the tire frame formed of a thermoplastic material is suppressed.

Furthermore, a polyamide-based thermoplastic elastomer has high adhesiveness to the reinforcing cord members, and also exhibits excellent fixing performance such as welding strength. Therefore, when a thermoplastic resin material including a polyamide-based thermoplastic elastomer and a polyester-based thermoplastic elastomer is used, for example, the phenomenon in which air remains in the surroundings of the reinforcing cord members in the reinforcing cord winding step (incorporation of air) can be suppressed. If the thermoplastic resin material has high adhesiveness and welding properties to the reinforcing cord, and incorporation of air into the surroundings of the reinforcing cord members is suppressed, the movement of the reinforcing cord member due to, for example, a force applied during driving can be effectively suppressed. Thereby, for example, even in the case where a tire component member is disposed so as to cover the entirety of the reinforcing cord member in the outer circumference of the tire frame, since the movement of the reinforcing cord member is suppressed, detachment or the like between these members (including the tire frame) is prevented from occurring, and durability of the tire is enhanced.

(10-2) The tire of the tenth aspect of the present invention can be configured such that the reinforcing cord layer contains a resin material. As such, when the reinforcing cord layer contains a resin material, the difference in hardness between the tire and the reinforcing cord layer can be decreased as compared with the case of fixing the reinforcing cord member with a cushion rubber, the reinforcing cord members can be further adhered and fixed to the tire frame. Thereby, the incorporation of air described above can be effectively prevented, and the movement of the reinforcing cord member at the time of driving can be effectively suppressed. Here, the "resin material" is a concept including thermoplastic resins (including thermoplastic elastomers) and thermosetting resins, and does not encompass vulcanized rubbers.

When the reinforcing cord layer contains a resin material, from the viewpoint of increasing the pull-out properties (difficulty to be pulled out) of the reinforcing cord member, the reinforcing cord member is preferably covered by a resin material over 20% or more of the surface thereof, and more preferably 50% or more of the surface thereof. Also, the content of the resin material in the reinforcing cord layer is preferably 20 mass % or more, and more preferably 50 mass % or more, relative to the total amount of the materials that constitute the reinforcing cord layer excluding the reinforcing cord, from the viewpoint of increasing the pull-out properties of the reinforcing cords.

In order to configure the reinforcing cord layer to include a resin material, for example, the reinforcing cord layer can be formed in a configuration such that when viewed from a cross-section of the tire frame along the axial direction, at least a portion of the reinforcing cord member is embedded in the outer circumference of the tire frame that is formed of a thermoplastic resin material. In this case, the thermoplastic resin material including a polyamide-based thermoplastic elastomer and a polyester-based thermoplastic elastomer of the outer circumference of the tire frame in which the reinforcing cord member is embedded corresponds to the resin material as a component of the reinforcing cord layer, and the polyamide-based thermoplastic elastomer forming the tire frame and the reinforcing cord member constitute the reinforcing cord layer. Furthermore, in order to configure the reinforcing cord layer to include a resin material, a coated cord member obtained by coating a reinforcing cord with a resin material of the same kind as or different from the resin material that forms the tire frame, may be wound in the circumferential direction of the tire frame. The "same kind" as used for resin material means a situation in which both are ester-based resin materials, or both are styrene-based resin materials, or the like.

(10-3) The tire of the tenth aspect of the present invention can be configured such that the mass ratio (x:y) of the polyamide-based thermoplastic elastomer (x) and the polyester-based thermoplastic elastomer (y) in the thermoplastic resin is 95:5 to 50:50. As such, when the mass ratio (x:y) of the polyamide-based thermoplastic elastomer (x) and the polyester-based thermoplastic elastomer (y) is set to 95:5 to 50:50, durability of the tire is further enhanced, and a tire which is not easily deformed by temperature change can be obtained.

(10-4) The tire of the tenth aspect of the present invention can be configured such that the total content of the polyamide-based thermoplastic elastomer and the polyester-based thermoplastic elastomer in the thermoplastic resin material is 50 mass % to 100 mass %. By employing the configuration described above, the performance that can be exhibited by a combination of a polyamide-based thermoplastic elastomer and a polyester-based thermoplastic elastomer can be further enhanced.

The tire of the tenth aspect of the present invention can be produced by a production method which includes a tire frame piece forming step of forming a tire frame piece for constituting a portion of a circular tire frame using a thermoplastic resin material including at least a polyamide-based thermoplastic elastomer and a polyester-based thermoplastic elastomer; a tire frame piece bonding step of forming the tire frame by fusing two or more of the tire frame pieces that make a pair, by applying heat to the bonding surface of the tire frame piece; and a reinforcing cord member winding step of winding a reinforcing cord member around the outer circumference of the tire frame in the circumferential direction, and forming a reinforcing cord layer.

In the production method described above, a tire frame piece of a circular tire frame can be formed using a thermoplastic resin material including a polyamide-based thermoplastic elastomer and a polyester-based thermoplastic elastomer. The polyamide-based thermoplastic elastomer included in the thermoplastic resin material can have the melting point set to about 100° C. to 250° C., and the polyester-based thermoplastic elastomer can have the melting point set to about 100° C. to 260° C. Therefore, for example, it is not necessary to carry out the tire frame piece bonding step at or above 300° C., and the bonding step can be carried out at a relatively low temperature.

Therefore, deterioration of the resin can be prevented, and deformation of the tire frame piece can be suppressed. Accordingly, the product yield can be increased, and productivity of the tire can be increased.

Furthermore, tire frame pieces that a thermoplastic resin material including a polyamide-based thermoplastic elastomer are bonded to form a tire frame, the adhesive strength between the tire frame pieces is sufficient, and the performance of the frame itself is not deteriorated by the temperature at the time of bonding. Therefore, durability at the time of driving such as the resistance to puncture or heat resistance of the tire thus produced can be enhanced.

The means for solving the problem of the eleventh aspect is as follows.

(11-1) The tire of the eleventh aspect of the present invention is a tire including at least a circular tire frame formed of a thermoplastic resin material, in which the thermoplastic resin material includes a polyamide-based thermoplastic elastomer, and at least one copolymer selected from an olefin-(meth)acrylate copolymer or a metal crosslinked product (ionomer) of an olefin-(meth)acrylic acid copolymer.

Here, the "thermoplastic elastomer" has the same definition as that used in the first aspect of the present invention described above.

Also, the "polyamide-based thermoplastic elastomer" has the same definition as that used in the first aspect of the present invention described above.

The resin in the eleventh aspect of the present invention means a resin having a thermoplastic resin (including thermoplastic elastomers) or a thermosetting resin, and does not encompass conventional vulcanized rubbers such as natural rubber or synthetic rubbers. The thermoplastic elastomer also does not encompass conventional vulcanized rubbers such as natural rubber or synthetic rubbers.

The "at least one copolymer selected from an olefin-(meth) acrylate copolymer or a metal crosslinked product of an olefin-(meth)acrylic acid copolymer" is also referred to as a specific copolymer.

Meanwhile, "(meth)acrylic acid" means at least one of acrylic acid or methacrylic acid, and "(meth)acrylate" means at least one of acrylate or methacrylate.

When the thermoplastic resin material according to the eleventh aspect of the present invention includes a specific copolymer and a polyamide thermoplastic elastomer, the thermoplastic resin material has excellent impact resistance. Furthermore, since the thermoplastic resin material of the eleventh aspect of the present invention that includes a polyamide-based thermoplastic elastomer and a specific copolymer has less temperature dependency of the tensile yield strength, the deformation or change in hardness due to temperature fluctuation of the use environment is suppressed. Therefore, when a tire is formed by using a thermoplastic resin material of the eleventh aspect of the present invention, the influence of the use temperature environment on the tire can be reduced, and the tire can be used in an environment of a wide range of temperature.

In the case of using a polyamide-based thermoplastic elastomer alone, when an attempt is made to adjust the elastic modulus, it is necessary to control the ratio of the hard segment and the soft segment. In this regard, when a polyamide-based thermoplastic elastomer and a specific copolymer are used in combination, the elastic modulus of the thermoplastic resin material can be easily adjusted by adjusting the content ratio of the two components, compared to the case of using a polyamide-based thermoplastic elastomer alone.

Furthermore, in order to cause the thermoplastic resin material to have yield strength, it can be considered to use a polyamide-based thermoplastic elastomer and an olefin-based resin such as polyethylene in mixture (blend). However, since the olefin-based resin (for example, polyethylene) does not have a polar group, even if the olefin-based resin is blended with the polyamide-based thermoplastic elastomer, the affinity is poor. Thus, by copolymerizing a polyolefin with a monomer having a polar group, and thus introducing a polar group into the molecule, the polyolefin-based resin can be made to have affinity with a polyamide-based thermoplastic elastomer. As such, when a polyolefin is copolymerized with acrylic acid or methacrylic acid as a monomer having a polar group, the affinity of the copolymer thus obtained and a polyamide-based thermoplastic elastomer is improved, but there have been cases in which the yield strength of the thermoplastic resin material including the copolymer and the polyamide-based thermoplastic elastomer depends on temperature.

In this regard, when a monomer obtained by esterifying or metal-ionizing acrylic acid or methacrylic acid is used instead of acrylic acid or methacrylic acid, and a copolymer of the monomer obtained by esterifying or metal-ionizing acrylic acid or methacrylic acid with polyethylene is used as a copolymer that is used in combination with a polyamide-based thermoplastic elastomer, the impact resistance of the thermoplastic resin material including the copolymer and the polyamide-based thermoplastic elastomer can be increased, and temperature dependency of the yield strength can be suppressed.

(11-2) The tire of the eleventh aspect of the present invention can be configured such that the mass ratio (x:y) of the polyamide-based thermoplastic elastomer (x) and the specific copolymer (y) is 95:5 to 50:50.

When the content of the polyamide-based thermoplastic elastomer in the thermoplastic resin material is in the range described above, the performance of the thermoplastic resin material can be sufficiently exhibited, and the tensile characteristics such as tensile elasticity and breaking strength as the tire performance can be enhanced.

(11-3) The tire of the eleventh aspect of the present invention can be configured such that the total content of the polyamide-based thermoplastic elastomer and the specific copolymer in the thermoplastic resin material is 50 mass % to 100 mass %.

When the total content of the polyamide-based thermoplastic elastomer and the specific copolymer in the thermoplastic resin material is in the range described above, the performance of the thermoplastic resin material can be sufficiently exhibited, and the tensile characteristics such as tensile elasticity and breaking strength as the tire performance can be further enhanced.

(11-4) It can be configured such that the olefin-(meth)acrylate copolymer is an ethylene-(meth)acrylate copolymer.

When the olefin-(meth)acrylate copolymer is an ethylene-(meth)acrylate copolymer, flexibility of the thermoplastic resin material can be further enhanced, and impact resistance as the tire performance can be further enhanced.

(11-5) It can be configured such that the metal crosslinked product of the olefin-(meth)acrylic acid copolymer is a metal crosslinked product of an ethylene-(meth)acrylic acid copolymer.

When the metal crosslinked product of the olefin-(meth)acrylic acid copolymer is a metal crosslinked product of an ethylene-(meth)acrylic acid copolymer, flexibility of the thermoplastic resin material can be further enhanced, and impact resistance as the tire performance can be further enhanced.

Furthermore, the tire of the eleventh aspect of the present invention may include a reinforcing cord member that is wound around the outer circumference of a tire frame formed of a thermoplastic resin material to form a reinforcing cord member layer, in addition to a tire frame formed of a thermoplastic resin material.

When the reinforcing cord member is wound around the outer circumference of the tire frame formed of a thermoplastic resin material to form a reinforcing cord member layer, the resistance to puncture and resistance to cutting of the tire and the rigidity in the circumferential direction of the tire (tire frame) are enhanced. Furthermore, when the rigidity in the circumferential direction is enhanced, creeping (a phenomenon in which plastic deformation of the tire frame increases with time under a constant stress) in the tire frame formed of a thermoplastic material is suppressed.

The means for solving the problem of the twelfth aspect is as follows.

(12-1) The tire of the twelfth aspect of the present invention is a tire including at least a circular tire frame formed of a thermoplastic resin material, in which the thermoplastic resin material includes a polyamide-based thermoplastic elastomer, an olefin-(meth)acrylic acid copolymer, and an acid-modified copolymer formed by acid-modifying an olefin-(meth)acrylate copolymer.

Here, the "thermoplastic elastomer" has the same definition as that used in the first aspect of the present invention described above.

Furthermore, the "polyamide-based thermoplastic elastomer" has the same definition as that used in the first aspect of the present invention described above.

In addition, the resin according to the twelfth aspect of the present invention means a thermoplastic or thermosetting resin, and does not encompass conventional vulcanized rubbers such as natural rubber or synthetic rubbers. The thermoplastic elastomer also does not encompass conventional vulcanized rubbers such as natural rubber or synthetic rubbers.

Furthermore, the "olefin-(meth)acrylic acid copolymer" refers to a copolymer containing a (meth)acrylic acid-derived partial structure in the olefin repeating unit. "(Meth)acrylic acid" means at least one of acrylic acid or methacrylic acid.

The "acid-modified copolymer formed by acid-modifying an olefin-(meth)acrylate copolymer" refers to a copolymer obtained by bonding a compound having an acidic group to a copolymer containing a (meth)acrylate-derived partial structure in an olefin repeating unit. "(Meth)acrylate" means at least one of acrylate and methacrylate.

The "olefin-(meth)acrylic acid copolymer" is referred to as a specific copolymer, and the "acid-modified copolymer obtained by acid-modifying an olefin-(meth)acrylate copolymer" is also referred to as a specific acid-modified copolymer.

Here, the olefin that constitutes an olefin repeating unit in the specific copolymer and the specific acid-modified copolymer is preferably ethylene, propylene, or 1-butene, and ethylene is more preferred.

Since the thermoplastic resin material in the twelfth aspect of the present invention includes the specific copolymer, the specific acid-modified copolymer, and a polyamide-based thermoplastic elastomer, the thermoplastic resin material exhibits excellent injection molding properties, impact resistance and fracture properties.

In the case of using a polyamide-based thermoplastic elastomer alone, when an attempt is made to adjust the elastic modulus, it is necessary to control the ratio of the hard segment and the soft segment. Furthermore, when the thermoplastic resin material includes a polyamide-based thermoplastic elastomer and the specific copolymer, the resin material tends to break in a lamellar form when stretched. In this regard, when at least three components of a polyamide-based thermoplastic elastomer, the specific copolymer and the specific acid-modified copolymer are used in combination, the elastic modulus of the thermoplastic resin material can be easily adjusted by adjusting the content ratio of the three components, and the state of fracture when stretched can be improved, as compared with the case of using a polyamide-based thermoplastic elastomer alone.

(12-2) The tire of the twelfth aspect of the present invention can be configured such that the mass ratio (x:y+z) of the polyamide-based thermoplastic elastomer (x), the olefin-(meth)acrylic acid copolymer (specific copolymer; y) and the acid-modified copolymer (specific acid-modified copolymer; z) is 95:5 to 50:50.

When the mass ratio of the polyamide-based thermoplastic elastomer, the olefin-(meth)acrylic acid copolymer and the acid-modified copolymer in the thermoplastic resin material is in the range described above, the performance of the thermoplastic resin material can be sufficiently exhibited, and the tensile characteristics such as tensile elasticity and breaking strength as the tire performance can be enhanced.

In addition, the tire of the twelfth aspect of the present invention can be configured such that the mass ratio (y:z) of the olefin-(meth)acrylic acid copolymer (specific copolymer; y) and the acid-modified copolymer (specific acid-modified copolymer; z) is 95:5 to 20:80.

When the mass ratio of the specific copolymer and the specific acid-modified copolymer in the thermoplastic resin material is in the range described above, the performance of the thermoplastic resin material can be sufficiently exhibited, and the tensile characteristics such as tensile elasticity and breaking strength as the tire performance can be enhanced.

(12-3) The tire of the twelfth aspect of the present invention can be configured such that the total content of the polyamide-based thermoplastic elastomer, the olefin-(meth)acrylic acid copolymer (specific copolymer) and the acid-modified copolymer (specific acid-modified copolymer) in the thermoplastic resin material is 50 mass % to 100 mass %.

When the total content of the polyamide-based thermoplastic elastomer, the specific copolymer, and the specific acid-modified copolymer in the thermoplastic elastomer is in the range described above, the performance of the thermoplastic resin material can be sufficiently exhibited, and the tensile characteristics such as tensile elasticity and breaking strength as the tire performance can be further enhanced.

Furthermore, the tire of the twelfth aspect of the present invention may include a reinforcing cord member that is wound around the outer circumference of a tire frame formed of a thermoplastic resin material to form a reinforcing cord layer, in addition to the tire frame formed of a thermoplastic resin material.

When the reinforcing cord member is wound around the outer circumference of a tire frame formed of a thermoplastic resin material to form a reinforcing cord member layer, the resistance to puncture and resistance to cutting of the tire, and the rigidity in the circumferential direction of the tire (tire frame) are enhanced. In addition, when the rigidity in the circumferential direction is enhanced, creeping (a phenomenon in which plastic deformation of the tire frame increases with time under a constant stress) in the tire frame formed of a thermoplastic material is suppressed.

(12-4) The tire of the twelfth aspect of the present invention can be configured such that the olefin-(meth)acrylic acid copolymer is an ethylene-(meth)acrylic acid copolymer, and the acid-modified copolymer is an acid-modified copolymer obtained by acid-modifying an ethylene-(meth)acrylate copolymer.

When the configuration described above is employed, the performance of the thermoplastic resin material can be sufficiently exhibited, and the tensile characteristics such as tensile elasticity and breaking strength as the tire performance can be enhanced.

(12-5) The method for producing a tire of the twelfth aspect of the present invention includes at least a tire frame piece forming step of forming a tire frame piece for constituting a portion of a circular tire frame using a thermoplastic resin material including a polyamide-based thermoplastic elastomer, an olefin-(meth)acrylic acid copolymer, and an acid-modified copolymer obtained by acid-modifying an olefin-(meth)acrylate copolymer; and a tire frame piece bonding step of forming a tire frame by fusing two or more of the tire frame pieces, which make a pair, by applying heat to the bonding surface of the tire frame piece.

In the method for producing a tire of the twelfth aspect of the present invention, a tire frame piece of the circular tire frame is formed using a thermoplastic resin material. Since the thermoplastic resin material according to the twelfth aspect of the present invention includes the polyamide-based thermoplastic elastomer, the specific copolymer, and the specific acid-modified copolymer, the resin material exhibits excellent fluidity. Therefore, injection molding using the thermoplastic resin material can be easily carried out. Therefore, productivity of the tire can be enhanced.

This is thought to be because of the following.

Due to the acid group carried by the specific acid-modified copolymer, the miscibility between the polyamide-based thermoplastic elastomer and the specific copolymer is increased, so that when the polyamide-based thermoplastic elastomer is formed into a sea phase, and the specific copolymer is formed into an island phase, the sea-island structure can be easily formed. It is thought that in such a sea-island structure, the specific acid-modified copolymer is present in the interface between the island phase and the sea phase and thus increases the affinity between the sea phase and the island phase. When the affinity between the sea phase and the island phase increases, the thermoplastic resin material has increased viscosity; however, when the thermoplastic resin material includes the specific copolymer, the affinity can be adjusted, and excellent fluidity is obtained. Therefore, it is thought that injection molding can be easily carried out.

(12-6) The method for producing a tire of the twelfth aspect of the present invention can be configured such that the olefin-(meth)acrylic acid copolymer is an ethylene-(meth)acrylic acid copolymer, and the acid-modified copolymer is an acid-modified copolymer obtained by acid-modifying an ethylene-(meth)acrylate copolymer.

When the configuration described above is employed, the performance of the thermoplastic resin material can be sufficiently exhibited, and a tire having excellent tensile characteristics such as tensile elasticity and breaking strength as the tire performance can be produced.

The means for solving the problem of the thirteenth aspect is as follows.

(13-1) The tire of the thirteenth aspect of the present invention is a tire including at least a circular tire frame formed of a thermoplastic resin material, in which the tire includes a reinforcing cord member that forms a reinforcing cord layer on the outer circumference of the tire frame, and the thermoplastic resin material includes at least a polyamide-based thermoplastic elastomer and a rubber.

The reinforcing cord layer may be wound around the outer circumference of the tire frame in the circumferential direction, or may be wound around the outer circumference in a crossing manner.

The tire of the thirteenth aspect of the present invention includes a circular tire frame formed of a thermoplastic resin material including a polyamide-based thermoplastic elastomer and a rubber.

Here, the "thermoplastic elastomer" has the same definition as that used in the first aspect of the present invention described above.

The "polyamide-based thermoplastic elastomer" has the same definition as that used in the first aspect of the present invention described above.

A "rubber" is a polymer compound having elasticity, but in the thirteenth aspect of the present invention, the rubber is distinguished from the thermoplastic elastomer described above.

In the thermoplastic elastomer, a hard segment which is crystalline and has a high melting point behaves as a pseudo-crosslinking point, and elasticity is exhibited. On the other hand, the rubber has, for example, double bonds in the molecular chain, and produces a three-dimensional network structure when crosslinked by added sulfur or the like (vulcanized), thereby exhibiting elasticity. Therefore, when a thermoplastic elastomer is heated, the hard segment melts, and when a thermoplastic elastomer is cooled, the hard segment reproduces pseudo-crosslinking points again. Thus, recycling is enabled. On the other hand, a rubber produces a three-dimensional structure when crosslinked (vulcanized) and loses fluidity, so that recycling is difficult even if heated. However, a rubber that is not crosslinked behaves like a thermoplastic elastomer.

The thermoplastic resin in the thirteenth aspect of the present invention a means a resin having thermoplasticity, and does not encompass conventional vulcanized rubbers such as natural rubber or synthetic rubbers. However, the "thermoplastic resin material" in the thirteenth aspect of the present invention means a material including at least a thermoplastic resin, and encompasses a material including a rubber in addition to a thermoplastic resin.

The thermoplastic resin material according to the thirteenth aspect of the invention is flexible and has excellent impact resistance. The thermoplastic resin material is also excellent in tensile characteristics such as tensile modulus of elasticity and tensile strength. Therefore, when a tire frame is formed of the thermoplastic resin material, the durability and manufacturability of the tire become excellent. Furthermore, since the structure can be simplified, there is an advantage that weight reduction can be expected.

On the other hand, in the case of using a polyamide-based thermoplastic elastomer alone, when an attempt is made to adjust the elastic modulus, it is necessary to control the ratio of the hard segment and the soft segment. In this regard, when a polyamide-based thermoplastic elastomer and a rubber are used in combination, the elastic modulus of the thermoplastic resin material can be easily adjusted by adjusting the content ratio of the two components, compared to the case of using a polyamide-based thermoplastic elastomer alone.

Since the rolling resistance of a tire is caused by vibration at approximately 10 Hz to 100 Hz at near 50° C., for measuring the viscoelasticity of the tire, the magnitude of the rolling resistance can be expressed by tan δ at 30° C. to 50° C. When the tan δ value at 30° C. to 50° C. is small, the rolling resistance of the tire also tends to become small.

Here, in the case of using a polyamide-based thermoplastic elastomer alone, when the dynamic viscoelasticity is measured, a peak of tan δ originating from the polyamide-based thermoplastic elastomer can be seen, and as the elastic modulus of the polyamide-based thermoplastic elastomer increases, the peak value tends to shift to the higher temperature side. For example, when the dynamic viscoelasticity of UBESTA XPA9055X1 manufactured by Ube Industries, Ltd. is measured, a peak is detected at near 10° C.

On the other hand, when the dynamic viscoelasticity of a rubber is measured, a peak is generally detected at −10° C. or lower. Therefore, when a polyamide-based thermoplastic elastomer and a rubber are mixed, the peak height originating from the polyamide-based thermoplastic elastomer is decreased depending on the mixing proportions, and the peak height originating from the rubber increases. However, since the peak position of the rubber is −10° C. or lower, the influence on the tan δ value at 30° C. to 50° C. is reduced, and therefore, the tan δ value is decreased as a whole.

In an embodiment of the tire of the thirteenth aspect of the present invention, a reinforcing cord member is wound around the outer circumference of the tire frame formed of a thermoplastic resin material including a polyamide-based thermoplastic elastomer and a rubber, to form a reinforcing cord layer. When a reinforcing cord layer is formed around the outer circumference of the tire frame, the resistance to puncture and resistance to cutting of the tire, and the rigidity in the circumferential direction of the tire (tire frame) are enhanced. Meanwhile, when the rigidity in the circumferential direction is increased, creeping (a phenomenon in which plastic deformation of the tire frame increases with time under a constant stress) in the tire frame formed of a thermoplastic material is suppressed.

Furthermore, a polyamide-based thermoplastic elastomer can easily penetrate not only between the fibers of the reinforcing cord member itself, but also between twisted cords in the case where the reinforcing cord member has a twisted-fiber structure, due to the low melt viscosity of the elastomer. Accordingly, the polyamide-based thermoplastic elastomer has high adhesiveness to reinforcing cord member, and has excellent fixing performance such as welding strength. Also, when the reinforcing cord member is an organic fiber, since the polyamide-based thermoplastic elastomer that forms the tire frame can be welded to the reinforcing cord member, high welding properties and excellent fixing performance are obtained. Further, since a polyamide-based thermoplastic elastomer exhibits excellent elongation, the fracture properties are excellent. Therefore, when a thermoplastic resin material including a polyamide-based thermoplastic elastomer and another elastomer is used, for example, the phenomenon in which air remains in the surroundings of the reinforcing cord members in the reinforcing cord winding step (incorporation of air) can be suppressed. If the polyamide-based thermoplastic elastomer has high adhesiveness and welding properties to the reinforcing cords, and incorporation of air into the surroundings of the reinforcing cord members is suppressed, the movement of the reinforcing cord member due to, for example, a force applied during driving can be effectively suppressed. Thereby, for example, even in the case where a tire-constituting member is provided so as to cover the entirety of the reinforcing cord member in the outer circumference of the tire frame, since the movement of the reinforcing cord member is suppressed, detachment or the like between these members (including the tire frame) is prevented from occurring, and durability of the tire is enhanced.

(13-2) The thermoplastic resin material may further include a thermoplastic elastomer that has good affinity with the rubber. Particularly, when the thermoplastic resin material includes an acid modification product as the thermoplastic elastomer having good affinity with the rubber, the rubber can be finely dispersed in the thermoplastic resin material. Furthermore, it is speculated that the tensile strength is enhanced by the interaction between the polyamide-based thermoplastic elastomer and the acid-modified sites, and even if fractured, the resin material undergoes ductile fracture, so that brittle fracture or lamellar fracture does not easily occur.

The phrase "having good affinity with rubber" implies that when a thermoplastic elastomer is mixed with a rubber, the molecular skeleton of the rubber and the molecular skeleton of the thermoplastic elastomer are similar, and the rubber is in a state of being incorporated into the dispersed particles of the thermoplastic elastomer, or the thermoplastic elastomer is in a state of being incorporated into the dispersed particles of the rubber.

However, not all of the thermoplastic elastomer and the rubber in the thermoplastic resin material need to be in the state described above, and the thermoplastic elastomer and the rubber in the thermoplastic resin material may be partially in the state described above.

(13-3) The tire of the thirteenth aspect of the present invention can be configured such that the reinforcing cord layer contains a resin material. As such, when a resin material is contained in the reinforcing cord layer, the difference in hardness between the tire and the reinforcing cord layer can be decreased as compared to the case of fixing the reinforcing cord member with a cushion rubber, and therefore, the reinforcing cord member can be adhered and fixed to the tire frame further. Thereby, the incorporation of air can be effectively prevented, and the movement of the reinforcing cord at the time of driving can be effectively suppressed. Here, the "resin material" in the thirteenth aspect of the present invention is a material including at least a resin, and this material may also include not only a resin, but also a rubber or an inorganic compound. Meanwhile, the "resin" is a concept which encompasses a thermoplastic resin (including a thermoplastic elastomer) and a thermosetting resin, and does not encompass a rubber (including a vulcanized rubber) or an inorganic compound.

When the reinforcing cord layer contains a resin material, from the viewpoint of increasing the pull-out properties (difficulty to be pulled out) of the reinforcing cord, the reinforcing cord is preferably covered by a resin material over 20% or more of the surface, and more preferably 50% or more of the surface. Also, the content of the resin material in the reinforcing cord layer is preferably 20 mass % or more, and more preferably 50 mass % or more, relative to the total amount of the materials that constitute the reinforcing cord layer excluding the reinforcing cords, from the viewpoint of increasing the pull-out properties of the reinforcing cords.

In order to configure the reinforcing cord layer to include a resin material, for example, the reinforcing cord layer can be formed in a configuration such that when viewed from a cross-section of the tire frame along the axial direction, at least a portion of the reinforcing cord member is embedded in the outer circumference of the tire frame that is formed of a thermoplastic resin material. In this case, the thermoplastic resin material including a polyamide-based thermoplastic elastomer and a rubber of the outer circumference of the tire frame in which the reinforcing cord member is embedded corresponds to the resin material that constitutes the reinforcing cord layer, and the thermoplastic resin material forming the tire frame and the reinforcing cord member constitute the reinforcing cord layer. Furthermore, in order to configure the reinforcing cord layer to include a resin material, a coated cord member obtained by coating a reinforcing cord with a resin material of the same kind as or different from the resin material that forms the tire frame, may be wound in the circumferential direction of the tire frame. The "same kind" as used for resin material means a situation in which both are ester-based resin materials, or both are styrene-based resin materials, or the like.

(13-4) The tire of the thirteenth aspect of the present invention can be configured such that the mass ratio (x:y) of the polyamide-based thermoplastic elastomer (x) and the rubber (y) in the thermoplastic resin material is 95:5 to 50:50. As such, when the mass ratio (x:y) of the polyamide-based thermoplastic elastomer (x) and the rubber (y) is adjusted to 95:5 to 50:50, the performance that can be exhibited by the combination of the polyamide-based thermoplastic elastomer and the rubber can be further enhanced.

However, when the thermoplastic resin material includes a thermoplastic elastomer other than a polyamide-based thermoplastic elastomer, the tire can be configured such that the mass ratio (x:y') between the total (y') of the rubber and the thermoplastic elastomer other than the polyamide-based thermoplastic elastomer and of the polyamide-based thermoplastic elastomer (x) is 95:5 to 50:50.

(13-5) The tire of the thirteenth aspect of the present invention can be configured such that the mass ratio (x:y+z) of the polyamide-based thermoplastic elastomer (x), the rubber (y) and the thermoplastic elastomer having good affinity with the rubber (z) in the thermoplastic resin material is 95:5 to 50:50. As such, when the mass ratio (x:y+z) of the polyamide-based thermoplastic elastomer (x), the rubber (y) and the thermoplastic elastomer other than the polyamide-based thermoplastic elastomer (z) is adjusted to 95:5 to 50:50, the performance that can be exhibited by the combination of the polyamide-based thermoplastic elastomer and the rubber can be further enhanced.

(13-6) The tire of the thirteenth aspect of the present invention can be configured such that the total content of the polyamide-based thermoplastic elastomer and the rubber in the thermoplastic resin material is 50 mass % to 100 mass %. When the configuration described above is employed, the performance that can be exhibited by the combination of the polyamide-based thermoplastic elastomer and the rubber can be further enhanced.

However, when the thermoplastic resin material includes a thermoplastic elastomer other than the polyamide-based thermoplastic elastomer, the tire can be configured such that the total amount of the polyamide-based thermoplastic elastomer, the rubber, and the thermoplastic elastomer other than the polyamide-based thermoplastic elastomer is 50 mass % to 100 mass %.

(13-7) The tire of the thirteenth aspect of the present invention can be configured such that the total content of the polyamide-based thermoplastic elastomer, the rubber, and the thermoplastic elastomer having good affinity with the rubber in the thermoplastic resin material is 50 mass % to 100 mass %. When the configuration described above is employed, the performance that can be exhibited by the combination of the polyamide-based thermoplastic elastomer and the rubber can be further enhanced.

When the configuration described above is employed, the performance that can be exhibited by the combination of the polyamide-based thermoplastic elastomer and the rubber can be further enhanced.

Effects of the Invention

According to the first aspect of the present invention, a tire in which air is prevented from remaining in a region around the reinforcing cord, and which has high durability at the time of driving and exhibits excellent productivity, can be provided.

According to the second aspect of the present invention, a tire in which air is prevented from remaining in a region around the reinforcing cord, and which has high durability at the time of driving and exhibits excellent manufacturability and impact resistance, can be provided.

According to the third aspect of the present invention, a tire which is formed using a thermoplastic resin material and has excellent tensile elasticity and fracture properties, and a method for producing this tire can be provided.

According to the fourth aspect of the present invention, a tire which is formed using a thermoplastic resin material and exhibits excellent steering stability with small rolling resistance can be provided.

According to the fifth aspect the present invention, a tire which is highly elastic, has a low loss factor, and exhibits excellent heat resistance can be provided.

According to the sixth aspect of the present invention, a tire which is formed using a thermoplastic resin material and has excellent antistatic performance can be provided.

According to the seventh aspect of the present invention, a tire which is formed using a thermoplastic resin material, and in which even if the elastic modulus is increased, an increase in rolling resistance can be suppressed, can be provided.

According to the eighth aspect of the present invention, a tire which is formed using a resin material, and in which an elastic modulus in a preferable range is obtained and an increase in rolling resistance can be suppressed, can be provided.

According to the ninth aspect of the present invention, a tire which is formed using a resin material and can have enhanced impact resistance, can be provided.

According to the tenth aspect of the present invention, a tire which has high durability at the time of driving since air is prevented from remaining in a region around the reinforcing cord member, and which is not easily affected by temperature change, can be provided.

According to the eleventh aspect of the present invention, a tire which is formed using a thermoplastic resin material and has excellent impact resistance, and in which the temperature dependency of the tensile yield strength is suppressed, can be provided.

According to the twelfth aspect of the present invention, a tire which is formed using a thermoplastic resin material and has excellent impact resistance and fracture properties, and a method for producing a tire with excellent productivity, can be provided.

According to the thirteenth aspect of the present invention, a tire which has excellent impact resistance since air is prevented from remaining in a region around the reinforcing cord, can be provided.

BRIEF DESCRIPTION OF DRAWINGS

FIG. 1A is a perspective view illustrating a partial cross-section of a tire according to an embodiment of the present invention.

FIG. 4 is a cross-sectional view of a tire according to another embodiment of the present invention.

FIG. 5A is a perspective view illustrating a partial cross-section of a tire according to the embodiment of the present invention.

BEST MODE FOR CARRYING OUT THE INVENTION

Invention According to First Aspect

Figure 1B:
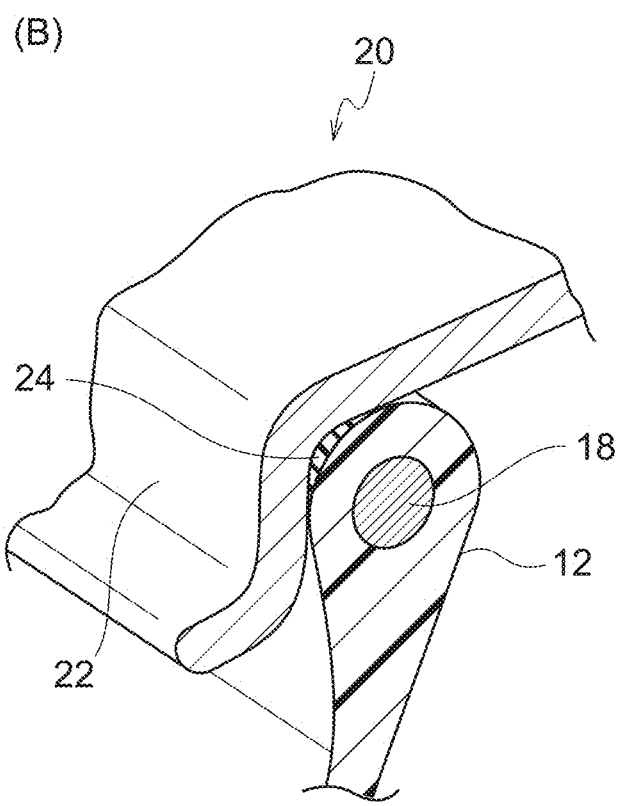
FIG. 1B is a cross-sectional view illustrating a bead portion fitted onto a rim in the embodiment of the present invention.

First, a thermoplastic resin material containing a polyamide-based thermoplastic elastomer and forming a tire frame and a resin material forming a reinforcing cord layer in the present invention according to a first aspect will be described, and specific embodiments of a tire of the first aspect of the invention will then be described with reference to the drawings.

[Thermoplastic Resin Including Polyamide-Based Thermoplastic Elastomer]

The tire of the first aspect of the invention has a tire frame formed from a thermoplastic resin material that includes at least a polyamide-based thermoplastic elastomer.

Here, the "polyamide-based thermoplastic elastomer" means a thermoplastic resin material made from a copolymer having a polymer constituting a hard segment that is crystalline and has a high melting point and a polymer constituting a soft segment that is non-crystalline and has a low glass transition temperature, the thermoplastic resin material having an amide bond (—CONH—) in the main chain of the polymer constituting the hard segment. Examples of the polyamide-based thermoplastic elastomer include amide-based thermoplastic elastomers (TPA), etc. as specified in JIS K6418:2007, and polyamide-based elastomers, etc. described in JP-A No. 2004-346273.

The polyamide-based thermoplastic elastomer may be a material in which at least a polyamide constitutes a crystalline hard segment having a high melting point and another polymer (for example, a polyester or a polyether) constitutes a non-crystalline soft material having a low glass transition temperature. Further, in the polyamide-based thermoplastic elastomer, a chain extending agent such as a dicarboxylic acid may be used in addition to the hard segment and the soft segment. Examples of the polyamide for forming the hard segment include a polyamide produced using a monomer represented by the following general formula (1) or (2).

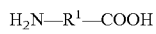

H$_2$N—R$^1$—COOH  General Formula (1)

In General Formula (1), R$^1$ represents a hydrocarbon molecular chain having 2 to 20 carbon atoms or an alkylene group having 2 to 20 carbon atoms.

General Formula (2)

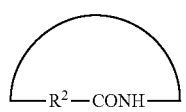

In General Formula (2), R$^2$ represents a hydrocarbon molecular chain having 3 to 20 carbon atoms or an alkylene group having 3 to 20 carbon atoms.

In General Formula (1), R$^1$ is preferably a hydrocarbon molecular chain having 3 to 18 carbon atoms or an alkylene group having 3 to 18 carbon atoms, more preferably a hydrocarbon molecular chain having 4 to 15 carbon atoms or an alkylene group having 4 to 15 carbon atoms, and particularly preferably a hydrocarbon molecular chain having 10 to 15 carbon atoms or an alkylene group having 10 to 15 carbon atoms. Further, in General Formula (2), R$^2$ is preferably a hydrocarbon molecular chain having 3 to 18 carbon atoms or an alkylene group having 3 to 18 carbon atoms, more preferably a hydrocarbon molecular chain having 4 to 15 carbon atoms or an alkylene group having 4 to 15 carbon atoms, and particularly preferably a hydrocarbon molecular chain having 10 to 15 carbon atoms or an alkylene group having 10 to 15 carbon atoms.

Examples of the monomer represented by General Formula (1) or (2) include an ω-aminocarboxylic acid and a lactam. Further, examples of the polyamide that forms the hard segment include a polycondensate of a ω-aminocarboxylic acid or a lactam, and a copolycondensate of a diamine and a dicarboxylic acid.

Examples of the ω-aminocarboxylic acid include aliphatic ω-aminocarboxylic acids having 5 to 20 carbon atoms, such as 6-aminocaproic acid, 7-aminoheptanoic acid, 8-aminooctanoic acid, 10-aminocapric acid, 11-aminoundecanoic acid, and 12-aminododecanoic acid. Further, examples of the lactam include aliphatic lactams having 5 to 20 carbon atoms, such as lauryllactam, ε-caprolactam, undecalactam, ω-enantholactam, and 2-pyrrolidone.

Examples of the diamine include diamine compounds, for example, aliphatic diamines having 2 to 20 carbon atoms, such as ethylenediamine, trimethylenediamine, tetramethylenediamine, hexamethylenediamine, heptamethylenediamine, octamethylenediamine, nonamethylenediamine, decamethylenediamine, undecamethylenediamine, dodecamethylenediamine, 2,2,4-trimethylhexamethylenediamine, 2,4,4-trimethylhexamethylenediamine, 3-methylpentamethylenediamine, and methaxylenediamine. Further, the dicarboxylic acid may be represented by HOOC—(R$^3$)m-COOH (R$^3$: a hydrocarbon molecular chain having 3 to 20 carbon atoms, m: 0 or 1), and examples thereof include aliphatic dicarboxylic acids having 2 to 20 carbon atoms, such as oxalic acid, succinic acid, glutaric acid, adipic acid, pimelic acid, suberic acid, azelaic acid, sebacic acid, and dodecanedioic acid.

A polyamide obtained by ring-opening polycondensation of lauryllactam, ε-caprolactam, or udecanelactam can preferably be used as the polyamide that forms the hard segment.

The polymer that forms the soft segment may be, for example, a polyester or a polyether, and examples thereof include polyethylene glycol, polypropylene glycol, polytetramethylene ether glycol, and an ABA-type triblock polyether. These may be used singly or in combination of two or more kinds thereof. A polyether diamine obtained by allowing terminals of a polyether with ammonia or the like, for example, may also be used.

Here, the "ABA-type triblock polyether" means a polyether represented by the following General Formula (3).

General Formula (3)

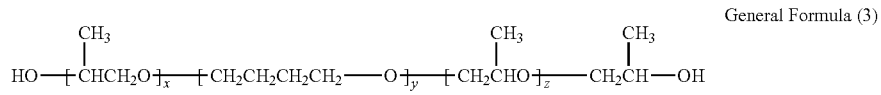

In General Formula (3), x and z each independently represent an integer of 1 to 20. y represents an integer of 4 to 50.

In General Formula (3), x and z are each preferably an integer of 1 to 18, more preferably an integer of 1 to 16, particularly preferably an integer of 1 to 14, and most preferably an integer of 1 to 12. Further, in General Formula (3), y is each preferably an integer of 5 to 45, more preferably an integer of 6 to 40, particularly preferably an integer of 7 to 35, and most preferably an integer of 8 to 30.

Examples of the combination of the hard segment and the soft segment include any combination of any of the hard segments described above and any of the soft segments described above. Among these, a combination of a ring-opening polycondensate of lauryllactam with polyethylene glycol, a combination of a ring-opening polycondensate of lauryllactam with polypropylene glycol, a combination of a ring-opening polycondensate of lauryllactam with polytetramethylene ether glycol, and a combination of a ring-opening polycondensate of lauryllactam with an ABA-type triblock polyether are preferable, and a combination of a ring-opening polycondensate of lauryllactam with an ABA-type triblock polyether is particularly preferable.

The number average molecular weight of the polymer constituting the hard segment (polyamide) is preferably from 300 to 15,000, from the viewpoint of melt moldability. Further, the number average molecular weight of the polymer constituting the soft segment is preferably from 200 to 6,000, from the viewpoints of toughness and low-temperature flexibility. Further, the mass ratio (x:y) of the hard segment (x) to the soft segment (y) is preferably from 50:50 to 90:10, and more preferably from 50:50 to 80:20, from the viewpoint of melt moldability.

The polyamide-based thermoplastic elastomer can be synthesized by copolymerizing a polymer that forms the hard segment and a polymer that forms the soft segment, using known methods.

Commercially available products such as UBESTA XPA series (for example, XPA9063X1, XPA9055X1, XPA9048X2, XPA9048X1, XPA9040X1, and XPA9040X2) from Ube Industries, Ltd. and VESTAMID series (for example, E40-S3, E47-S1, E47-S3, E55-S1, E55-S3, EX9200, and E50-R2) from Daicel-Evonik Ltd. can be used as the polyamide-based thermoplastic elastomer.

The melting point of the thermoplastic resin material containing a polyamide-based thermoplastic elastomer is, approximately, usually 100° C. to 350° C., and preferably 100° C. to 250° C. From the viewpoint of the productivity of tires, the melting point is preferably approximately from 120° C. to 250° C., and more preferably from 130° C. to 200° C. For example, in a case in which a frame of a tire is formed by fusion of divided bodies (frame pieces) thereof, the heating temperature for the bonding section can be set to be equal to or higher than the melting point of the thermoplastic resin material that forms the tire frame, by using a thermoplastic resin material containing a polyamide-based thermoplastic elastomer having a melting point of 120 to 250° C. as described above. Since a thermoplastic resin material containing a polyamide-based thermoplastic elastomer is used in the tire of the first aspect of the invention, the bonding strength between the tire frame pieces is sufficient even in the case of a frame fused in the temperature range of 120° C. to 250° C. Therefore, the tire of the first aspect of the invention has excellent durability at the time of driving, such as puncture resistance and abrasion resistance. Further, the heating temperature is preferably a temperature that is 10° C. to 150° C. higher, and more preferably 10° C. to 100° C. higher, than the melting point of the thermoplastic resin material containing a polyamide-based thermoplastic elastomer for forming the tire frame pieces.

Furthermore, in the first aspect of the invention, the content ratio of the polyamide-based thermoplastic elastomer in the thermoplastic resin material is not particularly limited, and is preferably 50 to 100% by mass or more, and more preferably 90 to 100% by mass, with respect to the total amount of the thermoplastic resin material. When the content ratio of the polyamide-based thermoplastic elastomer is 50% by mass to 100% by mass with respect to the total amount of the thermoplastic resin material, the characteristics of the polyamide-based thermoplastic elastomer can sufficiently be exerted, and the durability or productivity of the tire can be improved. The thermoplastic resin material may contain, if desired, rubber, other thermoplastic elastomers, thermoplastic resins, various fillers (for example, silica, calcium carbonate, and clay), and various additives such as anti-aging agents, oils, plasticizers, colorants, weather resistant agents, and reinforcing agents.

In the first aspect of the invention, the thermoplastic resin material containing a polyamide-based thermoplastic elastomer has a tensile modulus of elasticity (hereinafter, "elastic modulus" in this specification means a tensile modulus of elasticity unless specifically indicated otherwise) as defined in JIS K7113:1995 of preferably 100 MPa to 1000 MPa, more preferably 100 MPa to 800 MPa, and still more preferably 100 MPa to 700 MPa. When the tensile modulus of elasticity of the thermoplastic resin material is 100 to 1000 MPa, fitting onto a rim can be carried out efficiently while maintaining the shape of the frame of the tire.

In the first aspect of the invention, the thermoplastic resin material containing a polyamide-based thermoplastic elastomer preferably has a tensile yield strength as defined in JIS K7113:1995 of equal to or higher than 5 MPa, more preferably 5 MPa to 20 MPa, and still more preferably 5 MPa to 17 MPa. When the tensile yield strength of the thermoplastic resin material is equal to or higher than 5 MPa, resistance to deformation caused by a load applied to a tire during traveling or the like can be achieved.

In the first aspect of the invention, the thermoplastic resin material containing a polyamide-based thermoplastic elastomer preferably has a tensile yield elongation as defined in JIS K7113:1995 of equal to or higher than 10%, more preferably 10% to 70%, and still more preferably 15% to 60%. When the tensile yield elongation of the thermoplastic resin material is equal to or higher than 10%, the elastic region is large, and the fittability onto a rim is improved.

In the first aspect of the invention, the thermoplastic resin material containing a polyamide-based thermoplastic elastomer preferably has a tensile elongation at break as defined in JIS K7113:1995 of equal to or higher than 50%, more preferably equal to or higher than 100%, still more preferably equal to or higher than 150%, and particularly preferably equal to or higher than 200%. When the tensile elongation at break of the thermoplastic resin material is equal to or higher than 50%, fittability onto a rim is excellent, and resistance to breaking at collision can be obtained.

In the first aspect of the invention, the thermoplastic resin material containing a polyamide-based thermoplastic elastomer preferably has a deflection temperature under load (under a load of 0.45 MPa) as defined in ISO 75-2 or ASTM D648 of equal to or higher than 50° C., more preferably 50° C. to 150° C., and still more preferably 50° C. to 130° C. When the deflection temperature under load of the thermoplastic resin material is equal to or higher than 50° C., deformation of a tire frame can be suppressed even in cases in which vulcanization is performed during the production of a tire.

[Resin Material as Component of Reinforcing Cord Layer]

The tire according to the first aspect of the invention may be configured to include a resin material in the reinforcing cord layer. When a resin material is included in the reinforcing cord layer as described above, a difference in hardness between the tire and the reinforcing cord layer can be decreased, and, therefore, the reinforcing cord member can be more tightly adhered and fixed to the tire frame, compared with a case in which the reinforcing cord member is fixed using a cushion rubber. The concept of a simple expression "resin", such as that described above, encompasses thermoplastic resins (including thermoplastic elastomers) as well as thermosetting resins, but does not encompass vulcanized rubbers.

In a case in which the reinforcing cord member is a steel cord, and in which an attempt is made to separate the reinforcing cord member from the cushion rubber at the time of disposal of the tire, vulcanized rubbers are difficult to separate from the reinforcing cord member only by heating; in contrast, resin materials can be separated from the reinforcing cord member only by heating, which is advantageous in terms of recyclability of the tire. Resin materials usually have a loss factor (tan δ) lower than that of vulcanized rubbers. Accordingly, when the reinforcing cord layer contains a large amount of resin material, the rolling properties of the tire can be enhanced. Resin materials, having a higher elastic modulus relative to vulcanized rubbers, are advantageous in that the resin materials have high in-plane shear stiffness, and also provide excellent steering stability and excellent abrasion resistance at the time of traveling with the tire.

Examples of the thermosetting resin which may be used in the reinforcing cord layer include phenol resins, urea resins, melamine resins, epoxy resins, polyamide resins, polyester resins, etc.

Examples of the thermoplastic resin include urethane resins, olefin resins, vinyl chloride resins, polyamide resins, and polyester resins.

Examples of the thermoplastic elastomer include amide-based thermoplastic elastomers (TPA), polyester-based thermoplastic elastomers (TPC), polyolefin-based thermoplastic elastomers (TPO), polystyrene-based thermoplastic elastomers (TPS), polyurethane-based thermoplastic elastomers (TPU), thermoplastic cross-linked rubbers (TPV), and other thermoplastic elastomers (TPZ), which are defined in JIS K6418:2007. It is preferable to use a thermoplastic elastomer, in consideration of elasticity necessary for traveling and moldability for production.

The "same kind" as used for resin material means a situation in which both are ester-based resin materials, or both are styrene-based resin materials, or the like.

The elastic modulus (the tensile modulus of elasticity defined in JIS K7113:1995) of the resin material used in the reinforcing cord layer is preferably set to be within a range of 0.1 times to 10 times the elastic modulus of the thermoplastic resin that forms the tire frame. When the elastic modulus of the resin material is equal to or lower than 10 times the elastic modulus of the thermoplastic resin material that forms the tire frame, the crown portion is not excessively rigid, and the fittability onto a rim is facilitated. When the elastic modulus of the resin material is equal to or higher than 0.1 times the elastic modulus of the thermoplastic resin material that forms the tire frame, the resin as a component of the reinforcing cord layer is not excessively soft, the belt in-plane shear stiffness is excellent, and cornering force is improved.

When a resin material is contained in the reinforcing cord layer, it is preferable that 20% or more of the surface of the reinforcing cord member is covered with the resin material, and it is more preferable that 50% or more of the surface of the reinforcing cord member is covered with the resin material, from the viewpoint of improving the drawing properties (resistance to drawing) of the reinforcing cord. From the viewpoint of improving the drawing properties of the reinforcing cord, the content of the resin material in the reinforcing cord layer is preferably equal to or higher than 20 wt %, and more preferably equal to or higher than 50 wt %, with respect to the total content of the materials, other than the reinforcing cord, that constitute the reinforcing cord layer.

Embodiment 1-1

A tire according to Embodiment 1-1 of the tire of the first aspect of the invention will be described below with reference to the drawings.

A tire 10 according to this embodiment will be described below. FIG. 1A is a perspective view illustrating a cross-section of a part of a tire according to one embodiment of the invention. FIG. 1B is a cross-sectional view of a bead portion fitted to a rim. As shown in FIG. 1, the tire 10 according to this embodiment has substantially the same cross-sectional shape as those of conventional general rubber pneumatic tires.

As shown in FIG. 1A, the tire 10 includes a tire case 17 composed of: a pair of bead portions 12 each contacting with a bead seat 21 and a rim flange 22 of a rim 20 shown in FIG. 1B; side portions 14 that extend from the bead portions 12 toward the outer side in the tire radial direction; and a crown portion 16 (outer peripheral portion) that connect the outer end in the tire radial direction of one side portion 14 and the outer end in the tire radial direction of the other side portion 14.

The tire case 17 according to the present embodiment is formed of a polyamide-based thermoplastic elastomer ("UBESTA XPA9055X1" manufactured by Ube Industries, Ltd., melting point: 162° C.). Although the tire case 17 according to the present embodiment is formed of a single thermoplastic resin material (a polyamide-based thermoplastic elastomer), the first aspect of the invention is not limited to this configuration, and thermoplastic resin materials having different characteristics may be used for the respective portions of the tire case 17 (such as the side portions 14, the crown portion 16, and the bead portions 12), similarly to conventional general rubber pneumatic tires. A reinforcing material (such as fiber, cord, unwoven fabric, and woven fabric which are formed of a polymer material or a metal) may be disposed to be embedded in the tire case 17 (such as in the bead portions 12, in the side portions 14, or in the crown portion 16) so as to reinforce the tire case 17 with the reinforcing material.

The tire case 17 according to the present embodiment is formed by bonding a pair of tire case half parts (tire frame pieces) 17A formed of a polyamide-based thermoplastic elastomer to each other. The tire case half parts 17A is formed by placing circular tire case half parts 17A that have the same shape and that are obtained by molding one bead portion 12, one side portion 14, and a half-width of the crown portion 16 as an integral body by injection molding or the like, to face each other, and bonding the half parts to each other at the tire equatorial plane portion. The tire case 17 is not limited to that obtained by bonding two members, and may be formed by bonding three or more members.

Each tire case half part 17A formed of a polyamide-based thermoplastic elastomer can be molded by, for example, vacuum molding, pressure molding, injection molding, or melt casting. Accordingly, when compared with a conventional case in which the tire case is molded from rubber, it is not necessary to perform vulcanization, as a result of which the production process can remarkably be simplified, and the molding time can be saved.

In the present embodiment, the tire case half parts 17A have a symmetric shape, that is, one tire case half part 17A and the other tire case half part 17A have the same shape; therefore, there is an advantage in that the tire case half parts 17A can be molded using only one type of mold.

In the present embodiment, as shown in FIG. 1B, an annular bead core 18 formed of a steel cord is embedded in each bead portion 12, similarly to conventional general pneumatic tire. However, the first aspect of the invention is not limited to this configuration; the bead core 18 may be omitted as long as the rigidity of the bead portions 12 is ensured and there is no problem in fitting to the rim 20. Other than the steel cord, the bead core may be formed of an organic fiber cord, a resin-coated organic fiber cord, a hard resin, or the like.

In the present embodiment, an annular sealing layer 24 formed of a material having higher sealing properties than those of the polyamide-based thermoplastic elastomer constituting the tire case 17, for example rubber, is provided on a part of the bead portion 12 that contacts the rim 20 or at least on a part of the bead portion 12 that contacts the rim flange 22 of the rim 20. The sealing layer 24 may also be provided in a part in which the tire case 17 (the bead portion 12) and the bead seat 21 contact each other. A material softer than the polyamide-based thermoplastic elastomer that constitutes the tire case 17 may be used as the material having higher sealing properties than those of the polyamide-based thermoplastic elastomer that constitutes the tire case 17. It is preferable to use, as a rubber usable for the sealing layer 24, the same kind of rubber as a rubber used on the outer surface of a bead portion of a conventional general rubber pneumatic tire. When the sealing between the bead portion 12 and the rim 20 can be ensured only with the polyamide-based thermoplastic elastomer, the rubber sealing layer 24 may be omitted, or other thermoplastic resins (thermoplastic elastomers) having higher sealing properties than those of the polyamide-based thermoplastic elastomer may be used. Examples of other thermoplastic resins include resins such as a polyurethane-based resin, a polyolefin-based resin, a polystyrene-based resin, and a polyester resin, and a blend of any of these resins with a rubber or an elastomer. Thermoplastic elastomers can also be used, and examples thereof include a polyester-based thermoplastic elastomer, a polyurethane-based thermoplastic elastomer, a polystyrene-based thermoplastic elastomer, and a polyolefin-based thermoplastic elastomer, and any combination of these elastomers and a blend of any of these elastomers with a rubber.

As shown in FIG. 1, in the crown portion 16, a reinforcing cord 26 having higher rigidity than that of the polyamide-based thermoplastic elastomer constituting the tire case 17 is wound in the circumferential direction of the tire case 17. The reinforcing cord 26 is helically wound to form a reinforcing cord layer 28 in a state in which at least a part of the reinforcing cord 26 is embedded in the crown portion 16 in a cross-sectional view taken along the axial direction of the tire case 17. A tread 30 formed of a material, such as rubber, having higher abrasion resistance than that of the polyamide-based thermoplastic elastomer constituting the tire case 17 is disposed on the outer circumference side in the tire radial direction of the reinforcing cord layer 28.

Figure 2:
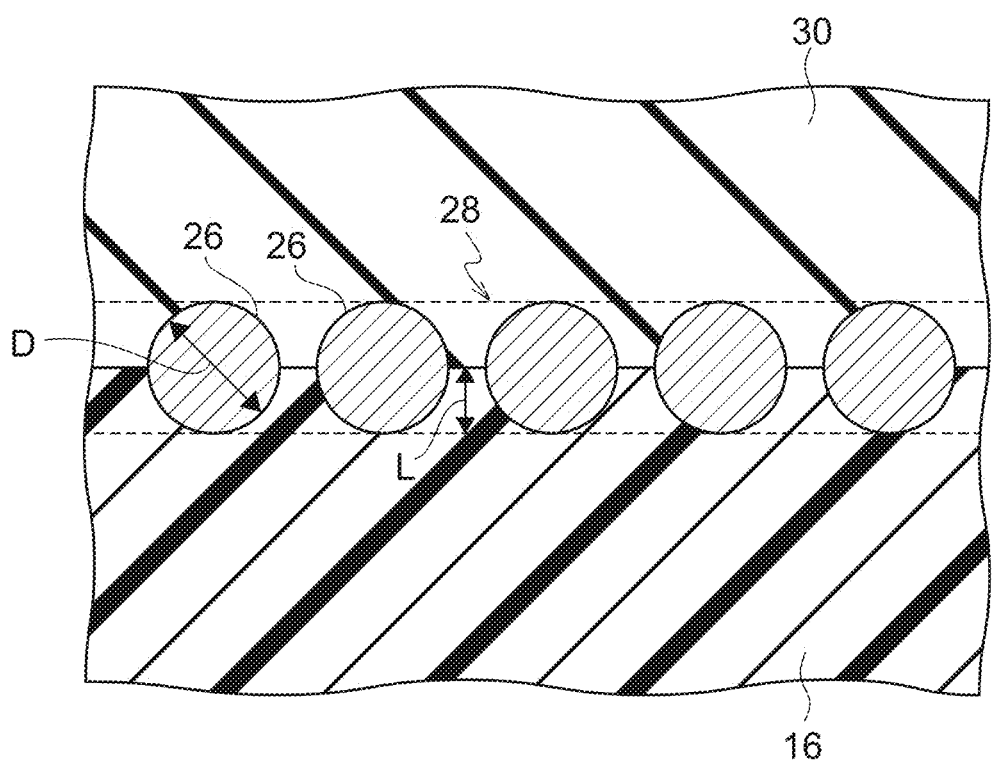
FIG. 2 is a cross-sectional view taken along a tire rotation axis, which illustrates a state where a reinforcing cord is embedded in a crown portion of a tire case of the tire according to the embodiment of the present invention.

The reinforcing cord layer 28 formed by the reinforcing cord 26 will be described below with reference to FIG. 2. FIG. 2 is a cross-sectional view taken along the tire rotation axis, which illustrates a state in which the reinforcing cord is embedded in the crown portion of the tire case of the tire according to Embodiment 1-1. As shown in FIG. 2, the reinforcing cord 26 is helically wound in a state in which at least a part of the reinforcing cord 26 is embedded in the crown portion 16 in a cross-sectional view taken along the axial direction of the tire case 17, and, together with a part of the outer circumferential portion of the tire case 17, forms the reinforcing cord layer 28 specified by the dotted lines in FIG. 2. The part of the reinforcing cord 26 that is embedded in the crown portion 16 is in close contact with the polyamide-based thermoplastic elastomer constituting the crown portion 16 (the tire case 17). A monofilament (single filament) of a metal fiber, an organic fiber, or the like, or a multifilament (stranded filament) in which fibers are stranded, such as a steel cord composed of steel fibers, may be used as the reinforcing cord 26. In the present embodiment, a steel cord is used as the reinforcing cord 26.

The embedding depth L in FIG. 2 represents the depth of embedding of the reinforcing cord 26 in the tire case 17 (the crown portion 16) in the tire rotation axis direction. The depth of embedding L of the reinforcing cord 26 in the crown portion 16 is preferably equal to or greater than $\frac{1}{5}$ of the diameter D of the reinforcing cord 26, and more preferably more than $\frac{1}{2}$ of the diameter D of the reinforcing cord 26. It is most preferable that the entire reinforcing cord 26 be embedded in the crown portion 16. When the depth of embedding L of the reinforcing cord 26 is more than $\frac{1}{2}$ of the diameter D of the reinforcing cord 26, the reinforcing cord 26 is difficult to drop off from the embedded portion due to the dimensions of the reinforcing cord 26. When the reinforcing cord 26 is entirely embedded in the crown portion 16, the surface (the outer circumferential surface) becomes flat, whereby entry of air into an area around the reinforcing cord can be suppressed even when a member is placed on the crown portion 16 in which the reinforcing cord 26 is embedded. The reinforcing cord layer 28 corresponds to a belt disposed on the outer circumferential surface of a carcass of a conventional rubber pneumatic tire.

As described above, the tread 30 is disposed on the outer circumferential side in the tire radial direction of the reinforcing cord layer 28. It is preferable that the same kind of rubber as that used for conventional rubber pneumatic tires is used as the rubber used for the tread 30. It is also possible to use, instead of the tread 30, a tread formed of another kind of thermoplastic resin material which has higher abrasion resistance than that of the polyamide-based thermoplastic elastomer constituting the tire case 17. In the tread 30, a tread pattern composed of plural grooves is formed on the contact surface that comes into contact with a road surface, similarly to conventional rubber pneumatic tires.

A method of producing a tire of the first aspect of the invention will be described below.

(Tire Case Forming Step)

First, tire case half parts supported by thin metal support rings are arranged to face each other. Subsequently, a mold for bonding, which is not shown in the drawings, is placed so as to contact the outer circumferential surface of a portion at which the tire case half parts are contacted with each other. Here, the mold for bonding is configured to pressurize a region at or around the bonding section (the contact portion) of the tire case half parts A with a predetermined pressure. Then, the region at or around the bonding section of the tire case half parts is pressurized at a temperature equal to or higher than the melting point of the thermoplastic resin material that constitutes the tire case. When the bonding section of the tire case half parts is heated and pressurized by the mold for bonding, the bonding section is melted, and the tire case half parts are fused with each other, as a result of which the members are integrated to form the tire case 17. Although the bonding section of the tire case half parts is heated using the mold for bonding in the present embodiment, the invention according to the first aspect is not limited to this configuration; heating of the bonding section may be carried out using, for example, a separately-provided high-frequency heater, or the tire case half parts may be bonded by softening or melting the bonding section, in advance, via application of hot air, irradiation of infrared rays or the like, and pressurizing the bonding section using the mold for bonding.

(Reinforcing Cord Member Winding Step)

Figure 3:
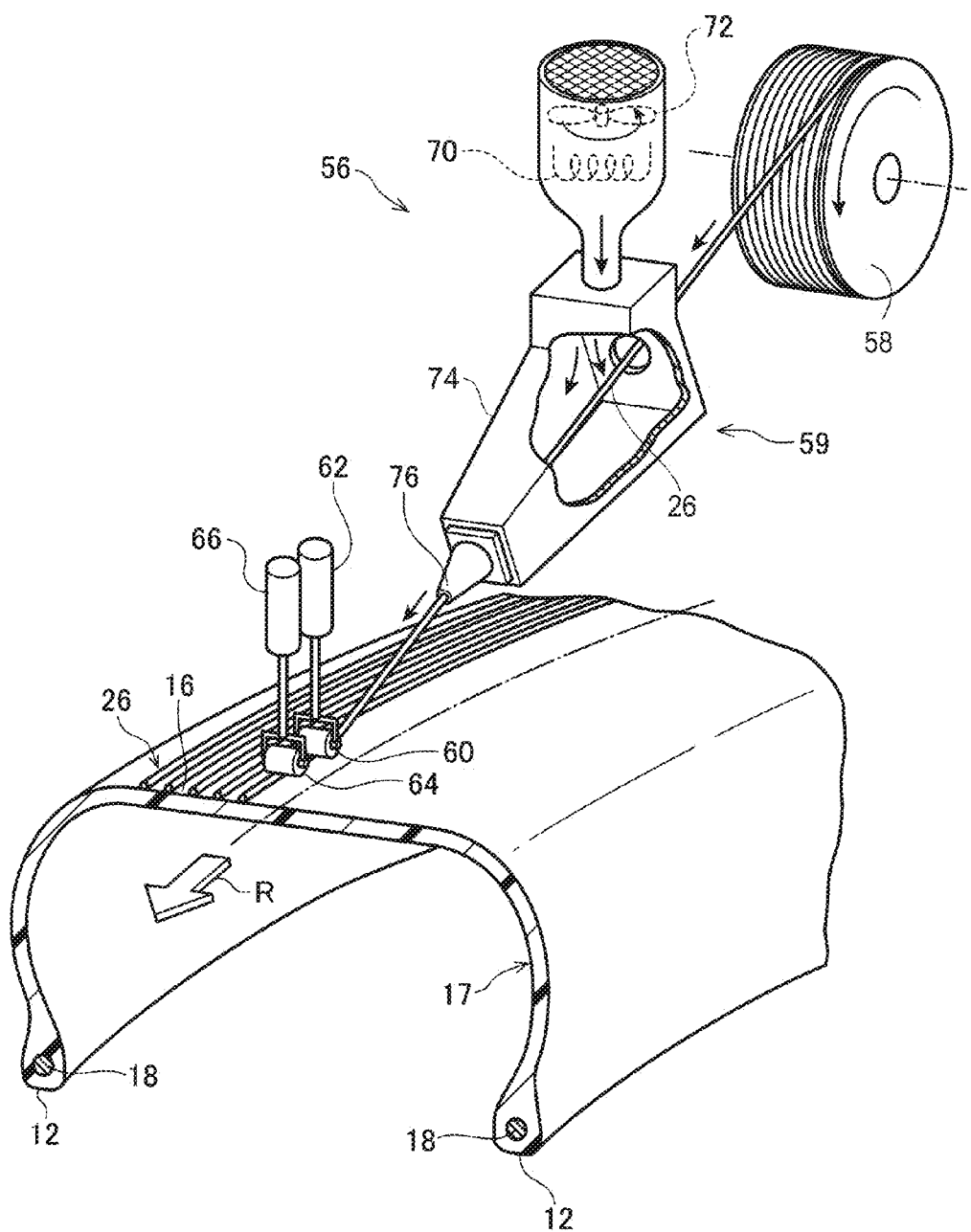
FIG. 3 is a diagram illustrating an operation of embedding the reinforcing cord in the crown portion of the tire case by the use of a cord heating apparatus and rollers.

Next, a reinforcing cord winding step will be described below using FIG. 3. FIG. 3 is an explanatory diagram explaining an operation of embedding the reinforcing cord in the crown portion of the tire case using a cord heating device and rollers. In FIG. 3, a cord feeding apparatus 56 includes a reel 58 on which a reinforcing cord 26 is wound, a cord heating device 59 disposed at the downstream side in the cord feeding direction of the reel 58, a first roller 60 disposed at the downstream side in the reinforcing cord 26 feeding direction, a first cylinder unit 62 for moving the first roller 60 in directions in which the first roller comes into contact with and get away from the outer circumferential surface of the tire, a second roller 64 disposed at the downstream side in the reinforcing cord 26 feeding direction of the first roller 60, and a second cylinder unit 66 for moving the second roller 64 in directions in which the first roller comes into contact with and get away from the outer circumferential surface of the tire. The second roller 64 can be used as a cooling roller formed of metal. In the present embodiment, the surface of the first roller 60 or the second roller 64 is coated with a fluororesin (TEFLON (registered trademark) in the case of the present embodiment) with a view to suppressing adhesion of the melted or softened polyamide-based thermoplastic elastomer. Although the cord feeding apparatus 56 is configured to have two rollers of the first roller 60 and the second roller 64 in the present embodiment, the first aspect of the invention is not limited to this configuration, and the cord feeding apparatus may be configured to have only one of these rollers (that is, a single roller).

The cord heating device 59 includes a heater 70 and a fan 72 that generate hot air. The cord heating device 59 includes a heating box 74 into which hot air is supplied and in which the reinforcing cord 26 passes through the inside space thereof, and an discharge port 76 through which the heated reinforcing cord 26 is discharged.

In this step, first, the temperature of the heater 70 of the cord heating device 59 is increased, and the air around the heater 70 heated by the heater 70 is sent to the heating box 74 by an air current generated by the rotation of the fan 72. Then, the reinforcing cord 26 drawn out from the reel 58 is fed to the inside of the heating box 74 of which the inner space is heated with hot air, whereby the reinforcing cord 25 is heated (for example, to increase the temperature of the reinforcing cord 26 to be about 100° C. to about 200° C.). The heated reinforcing cord 26 passes through the discharge port 76, and is helically wound, with a constant tension, around the outer circumferential surface of the crown portion 16 of the tire case 17 rotating in the direction of arrow R in FIG. 3. Here, as a result of the heated reinforcing cord 26 coming into contact with the outer circumferential surface of the crown portion 16, the polyamide-based thermoplastic elastomer at the contact portion is melted or softened, and at least a part of the heated reinforcing cord 26 is embedded in the outer circumferential surface of the crown portion 16. In this process, since the heated reinforcing cord 26 is embedded in the melted or softened polyamide-based thermoplastic elastomer, the polyamide-based thermoplastic elastomer and the reinforcing cord 26 get into a state in which no space is left between the polyamide-based thermoplastic elastomer and the reinforcing cord 26, that is, in a tightly-contacted state. Accordingly, the incorporation of air into the portion in which the reinforcing cord 26 is embedded is suppressed. By heating the reinforcing cord 26 to a temperature higher than the melting point of the polyamide-based thermoplastic elastomer of the tire case 17, the melting or softening of the polyamide-based thermoplastic elastomer in the portion contacting the reinforcing cord 26 is promoted. By employing this configuration, embedding of the reinforcing cord 26 in the outer circumferential surface of the crown portion 16 is facilitated, and the incorporation of air can effectively be suppressed.

The depth L of embedding of the reinforcing cord 26 can be adjusted by the heating temperature for the reinforcing cord 26, the tension applied to the reinforcing cord 26, the pressure applied from the first roller 60, etc. In the present embodiment, the depth L of embedding of the reinforcing cord 26 is set to be equal to or greater than $1/5$ of the diameter D of the reinforcing cord 26. The depth L of embedding of the reinforcing cord 26 is more preferably more than $1/2$ of the diameter D, and it is still more preferable that the entire reinforcing cord 26 is embedded.

In this way, a reinforcing cord layer 28 is formed on the outer circumference side of the crown portion 16 of the tire case 17 by winding the heated reinforcing cord 26 on the outer circumferential surface of the crown portion 16 such that the heated reinforcing cord 26 is embedded in the outer circumferential surface of the crown portion 16.

A belt-shaped vulcanized tread 30 is wound on the outer circumferential surface of the tire case 17 for one revolution, and the tread 30 is bonded to the outer circumferential surface of the tire case 17 using, for example, an adhesive. For example, precured treads known thus far for use in retreaded tires may be used as the tread 30. This step is a step similar to a step of bonding a precured tread to the outer circumferential surface of a casing of a retreaded tire.

A tire 10 can be completed by bonding a sealing layer 24 formed of a vulcanized rubber to the bead portion 12 of the tire case 17 using, for example, an adhesive.

(Effects)

In the tire 10 according to the present embodiment, since the tire case 17 is formed of a polyamide-based thermoplastic elastomer, the tire 10 has excellent heat resistance, excellent tensile modulus of elasticity, excellent tensile strength, and excellent fracture strain. In addition, since the tire 10 has a structure simpler than those of conventional rubber tires, the weight thereof is small. Therefore, the tire 10 according to the present embodiment has excellent abrasion resistance and durability. Further, since the polyamide-based thermoplastic elastomer constituting the tire case 17 has a melting point of 162° C., bonding of the tire case half parts 17A can sufficiently be carried out at a temperature of, for example, 250° C. or lower; therefore, energy consumption can be reduced, and the cost incurred for heating can be reduced.

The polyamide-based thermoplastic elastomer has high adhesiveness to the reinforcing cord 26, and has excellent fixing performance such as welding strength. Therefore, a phenomenon (incorporation of air) in which air remains around the reinforcing cord 26 can be suppressed in the reinforcing cord winding step. The high adhesiveness and weldability to the reinforcing cord 26 and suppression of incorporation of air into a region around the reinforcing cord member effectively suppress movement of the reinforcing cord 26 at the time a force is applied during traveling. Accordingly, for example, even in a case in which tire-constituting members are disposed on the outer circumference of the tire frame so as to cover the entire reinforcing cord member, the movement of the reinforcing cord member is suppressed, whereby separation between the members (including the tire frame), for example, is suppressed, and the durability of the tire 10 is improved.

In the tire 10 according to the present embodiment, since the reinforcing cord 26 having higher rigidity than that of the polyamide-based thermoplastic elastomer is helically wound on the outer circumferential surface of the crown portion 16 of the tire case 17 formed of a thermoplastic resin material in the circumferential direction, puncture resistance, cutting resistance, and rigidity in the circumferential direction of the tire 10 are improved. The improved rigidity in the circumferential direction of the tire 10 prevents creeping of the tire case 17 formed of a thermoplastic resin material.

In a cross-sectional view taken along the axial direction of the tire case 17 (the cross-section shown in FIG. 1), at least a part of the reinforcing cord 26 is embedded in the outer circumferential surface of the crown portion 16 of the tire case 17 formed of the polyamide-based thermoplastic elastomer, and is in close contact with the polyamide-based thermoplastic elastomer, as a result of which incorporation of air during production is suppressed, and movement of the reinforcing cord 26 due to, for example, a force applied at the time of traveling is suppressed. Accordingly, separation between the reinforcing cord 26, the tire case 17, and the tread 30 is suppressed, and the durability of the tire 10 is improved.

As shown in FIG. 2, since the depth L of embedding of the reinforcing cord 26 is set to be equal to or greater than ⅕ of the diameter D thereof, incorporation of air during production is effectively suppressed, and movement of the reinforcing cord 26 due to a force applied at the time of traveling is further suppressed.

In a case in which the reinforcing cord layer 28 is configured to include the polyamide-based thermoplastic elastomer as described above, the reinforcing cord 26 can be made to more tightly contact the tire case 17 and fixed to the tire case 17 since the difference in hardness between the tire case 17 and the reinforcing cord layer 28 can be made smaller than that in a case in which the reinforcing cord 26 is fixed using a cushion rubber. Accordingly, the incorporation of air mentioned above can effectively be prevented, and the movement of the reinforcing cord member at the time of traveling can effectively be suppressed.

In a case in which the reinforcing cord 26 is a steel cord, the reinforcing cord 26 can easily be separated from the polyamide-based thermoplastic elastomer by heating and recovered at the time of disposing of the tire, and, therefore, there is an advantage from the viewpoint of recyclability of the tire 10. Further, since the polyamide-based thermoplastic elastomer has a lower loss factor (tan δ) compared with vulcanized rubbers, inclusion of a large amount of polyamide-based thermoplastic elastomer in the reinforcing cord layer 28 makes it possible to enhance the rolling properties of the tire. Compared with vulcanized rubbers, the polyamide-based thermoplastic elastomer has advantages in terms of high in-plane shear stiffness, excellent steering stability at the time of traveling with the tire, and excellent abrasion resistance.

Since the tread 30 that contacts a road surface is formed of a rubber material having higher abrasion resistance than that of the polyamide-based thermoplastic elastomer, the abrasion resistance of the tire 10 is improved.

Since the annular bead core 18 formed of a metal material is embedded in the bead portion 12, the tire case 17 is strongly fixed to the rim 20, i.e., the tire 10 is strongly fixed to the rim 20, similarly to conventional rubber pneumatic tires.

Since the sealing layer 24 formed of a rubber material having higher sealing ability than the polyamide-based thermoplastic elastomer is disposed in a region of the bead portion 12 that contacts the rim 20, sealing between the tire 10 and the rim 20 is improved. Therefore, compared with a case in which sealing is carried out with the rim 20 and the polyamide-based thermoplastic elastomer, air leakage from the tire is further suppressed. Further, provision of the sealing layer 24 also improves fittability to the rim.

Although a configuration in which the reinforcing cord 26 is heated such that the polyamide-based thermoplastic elastomer in a portion that contacts the heated reinforcing cord 26 is melted or softened is adopted in the embodiment described above, the first aspect of the invention is not limited to this configuration; a hot air generating device may be used, instead of heating the reinforcing cord 26, to heat the outer circumferential surface of the crown portion 16 in which the reinforcing cord 26 is to be embedded, and the reinforcing cord 26 may thereafter be embedded in the crown portion 16.

Although the heat source of the cord heating device 59 includes the heater and the fan in Embodiment 1-1, the first aspect of the invention is not limited to this configuration, and a configuration in which the reinforcing cord 26 is directly heated by radiation heat (for example, infrared rays) may be adopted.

Although a configuration in which a region at which the thermoplastic resin material with the reinforcing cord 26 embedded therein is melted or softened is forcibly cooled with the second roller 64 formed of metal is adopted in Embodiment 1-1, the first aspect of the invention is not limited to this configuration; a configuration in which cold air is directly applied to the region at which the thermoplastic resin material is melted or softened, to forcibly cool and solidify the region at which the thermoplastic resin material is melted or softened may also be adopted.

Although a configuration in which the reinforcing cord 26 is heated is adopted in Embodiment 1-1, a configuration in which the outer circumference of the reinforcing cord 26 is coated with the same thermoplastic resin material as that of the tire case 17, for example, may be adopted. In this case, by heating the coated thermoplastic resin material along with the reinforcing cord 26 when the coated reinforcing cord is wound on the crown portion 16 of the tire case 17, incorporation of air can effectively be suppressed at the time of embedding the reinforcing cord in the crown portion 16.

The tire 10 according to Embodiment 1-1 is a so-called tubeless tire in which an air chamber is formed between the tire 10 and the rim 20 by fitting the bead portion 12 to the rim 20. However, the first aspect of the invention is not limited to this configuration, and a complete tube shape may be adopted.

Helically winding the reinforcing cord 26 is easy from the viewpoint of production. However, a method in which the reinforcing cord 26 is discontinuous in the width direction, for example, may also be contemplated.

Although modes for carrying out the first aspect of the invention are described above with reference to embodiments, the embodiments are merely examples, and may be practiced with various modifications within a range that does not depart from the gist of the first aspect. Of course, the protection scope of the first aspect of the invention is not limited to these embodiments.

Embodiment 1-2

Figure 5B:
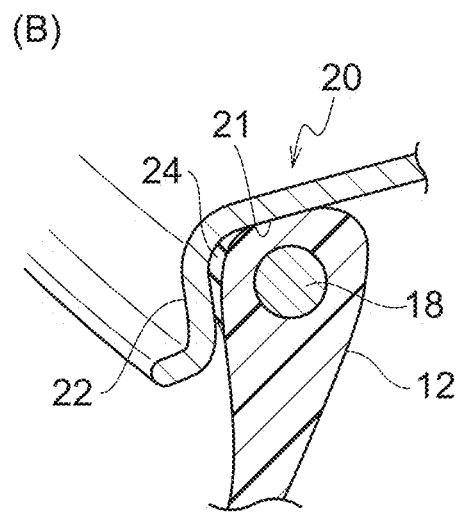
FIG. 5B is a cross-sectional view illustrating a bead portion fitted to a rim in the embodiment of the present invention.
Figure 6:
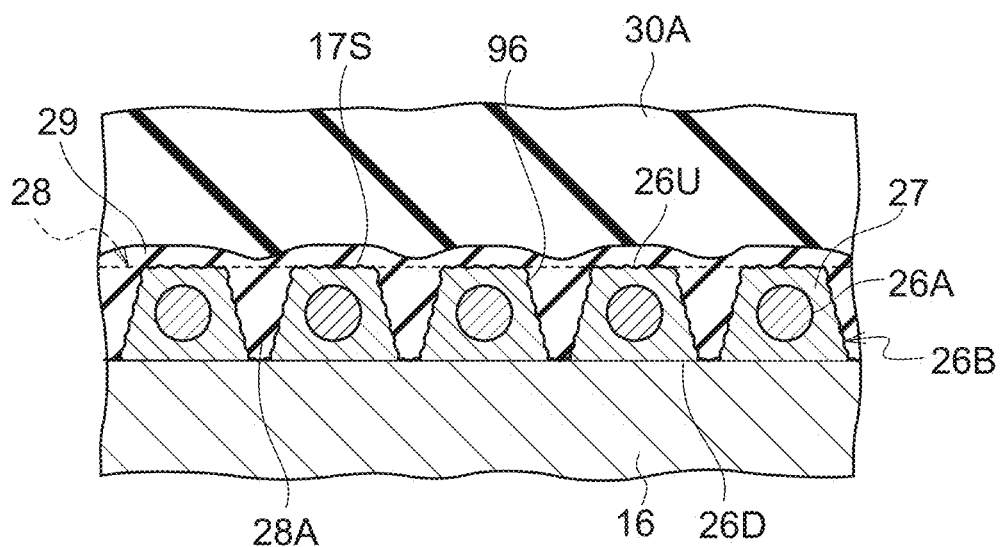
FIG. 6 is a cross-sectional view taken along a tire width direction, which illustrates the region around a reinforcing layer, of the tire according to the embodiment of the present invention.

Embodiment 1-2 of the method for producing a tire and the tire according to the first aspect of the invention will be described below with reference to the drawings. Similarly to Embodiment 1-1, the tire according to this embodiment has substantially the same cross-sectional shape as those of conventional general rubber pneumatic tires. Accordingly, in the following drawings, the same elements as those described in Embodiment 1-1 will be designated by the same reference numerals. FIG. 5A is a cross-sectional view of the tire according to Embodiment 1-2 taken along the tire width direction, and FIG. 5B is an enlarged view of a cross-section, taken along the tire width direction, of a bead portion in a state in which a rim is fitted to the tire according to Embodiment 1-2. FIG. 6 is a cross-sectional view taken along the tire width direction, which illustrates a region around a reinforcing layer of the tire according to Embodiment 1-2.

Similarly to Embodiment 1-1, the tire case 17 of the tire according to Embodiment 1-2 is formed of a polyamide-based thermoplastic elastomer ("UBESTA XPA9055X1" manufactured by Ube Industries, Ltd. with a melting point of 162° C.). In the tire 200 according to the present embodiment, a reinforcing cord layer 28 (indicated by a dotted line in FIG. 6) constituted by a coated cord member 26B wound in the circumferential direction is superposed on the crown portion 16, as shown in FIGS. 5 and 6. The reinforcing cord layer 28 constitutes the outer circumferential portion of the tire case 17, and reinforces the rigidity in the circumferential direction of the crown portion 16. The outer circumferential surface of the reinforcing cord layer 28 is included the outer circumferential surface 17S of the tire case 17.

The coated cord member 26B is formed by a cord member 26A that has higher rigidity than the polyamide-based thermoplastic elastomer forming the tire case 17, and that is coated with a coating resin material 27 as another member than the polyamide-based thermoplastic elastomer forming the tire case 17. In regions in which the coated cord member 26B contacts the crown portion 16, the coated cord member 26B and the crown portion 16 are bonded (for example, welded, or adhered with an adhesive) to each other.

The elastic modulus of the coating resin material 27 is preferably set to be within a range of 0.1 times to 10 times the elastic modulus of the resin material forming the tire case 17. When the elastic modulus of the coating resin material 27 is equal to or less than 10 times the elastic modulus of the thermoplastic resin material forming the tire case 17, the crown portion is not excessively hard, and the fittability to a rim is facilitated. When the elastic modulus of the coating resin material 27 is equal to or higher than 0.1 times the elastic modulus of the thermoplastic resin material forming the tire case 17, the resin constituting the reinforcing cord layer 28 is not excessively soft, and the in-plane shear stiffness of the belt is excellent, whereby the cornering power. In the present embodiment, the same material ("UBESTA XPA9055X1" manufactured by Ube Industries, Ltd. in the present embodiment) as the thermoplastic resin material is used as the coating resin material 27.

As shown in FIG. 6, the coated cord member 26B has a substantially trapezoidal cross-sectional shape. In the following description, the top surface (the outer surface in the tire radial direction) of the coated cord member 26B is designated by reference numeral 26U, and the bottom surface (the inner surface in the tire radial direction) is designated by reference numeral 26D. Although a configuration in which the cross-sectional shape of the coated cord member 26B is substantially trapezoidal is adopted in the present embodiment, the first aspect of the invention is not limited to this configuration; the cross-sectional shape of the coated cord member 26B may be any shape other than a shape in which the width increases from the bottom surface 26D side (the inner side in the tire radial direction) to the top surface 26U side (the outer side in the tire radial direction).

As shown in FIG. 6, since coated cord members 26B are arranged with intervals in the circumferential direction, gaps 28A are formed between adjacent cord members 26B. Accordingly, the outer circumferential surface of the reinforcing cord layer 28 has irregularities, and the outer circumferential surface 17S of the tire case 17 of which the outer circumferential portion is formed of the reinforcing cord layer 28 also has irregularities.

Minute roughening irregularities are uniformly formed on the outer circumferential surface 17S (including irregularities) of the tire case 17, and a cushion rubber 29 is bonded thereon with a bonding agent therebetween. The rubber portion at the inner side in the radial direction of the cushion rubber 29 has flowed into the roughening irregularities.

A tread 30 formed of a material, such as rubber, having higher abrasion resistance than the resin material forming the tire case 17 is bonded onto the cushion rubber 29 (onto the outer circumferential surface of the cushion rubber 29).

The rubber to be used in the tread 30 (a tread rubber 30A) is preferably the same kind of rubber as the rubber used for conventional rubber pneumatic tires. A tread formed of another kind of resin material having higher abrasion resistance than that of the resin material forming the tire case 17 may be used instead of the tread 30. Similarly to conventional rubber pneumatic tires, the tread 30 has a tread pattern (not shown in the drawings) formed by plural grooves on the contact surface with a road surface.

A method of producing a tire according to the present embodiment will be described below.
(Frame Forming Step)

First, tire case half parts 17A are formed in the same way as in Embodiment 1-1, and the tire case half parts are heated and pressurized using a mold for bonding, thereby forming a tire case 17.

(Reinforcing Cord Member Winding Step)

A tire producing apparatus according to the present embodiment is the same as in Embodiment 1-1. In the cord feeding apparatus 56 shown in FIG. 3 as described in Embodiment 1-1, a coated cord member 26B which has a substantially trapezoidal cross-sectional shape, and which is obtained by coating the cord member 26A with the coating resin material 27 (a thermoplastic material in the present embodiment), and which is wound around the reel 58, is used.

First, the temperature of the heater 70 is increased, and the air around the heater 70 heated by the heater 70 is sent to the heating box 74 by an air current generated by the rotation of the fan 72. Then, the coated cord member 26B drawn out from the reel 58 is fed to the inside of the heating box 74 of which the inner space is heated with hot air, whereby the reinforcing cord member is heated (for example, to increase the temperature of the outer circumferential surface of the reinforcing cord member 26B to be equal to or higher than the melting point of the coating resin material 27). Here, as a result of the heating of the coated cord member 26B, the coating resin material 27 becomes melted or softened.

The coated cord member 26B passes through the discharge port 76, and is helically wound, with a constant tension, around the outer circumferential surface of the crown portion

16 of the tire case 17 rotating in a direction of approaching from the paper surface. At this time, the bottom surface 26D of the coated cord member 26B comes into contact with the outer circumferential surface of the crown portion 16. The melted or softened coating resin material 27 at the contact portion spreads on the outer circumferential surface of the crown portion 16, and the coated cord member 26B is welded to the outer circumferential surface of the crown portion 16. Thereby, the bonding strength between the crown portion 16 and the coated cord member 26B is increased.

(Roughening Treatment Step)

Then, in a blasting apparatus not shown in the drawings, a blasting abrasive is shot to the outer circumferential surface 17S of the tire case 17 while the tire case 17 is rotated. The blasting abrasive that has been shot collides with the outer circumferential surface 17S to form minute roughening irregularities with an arithmetic average roughness Ra of 0.05 mm or more on the outer circumferential surface 17S.

By forming minute roughening irregularities on the outer circumferential surface 17S of the tire case 17 in this manner, the outer circumferential surface 17S is made hydrophilic, and the wettability of the below-described adhesive is improved.

(Superposing Step)

A bonding agent is applied to the outer circumferential surface 17S of the tire case 17 that has been subjected to the roughening treatment.

The bonding agent is not particularly limited, and may be, for example, a triazine thiol-based adhesive, a chlorinated rubber-based adhesive, a phenol-based resin adhesive, an isocyanate-based adhesive, a halogenated rubber-based adhesive, a rubber-based adhesive, or the like. The bonding agent is preferably capable of reacting at a temperature (90° C. to 140° C.) at which the cushion rubber 29 can be vulcanized.

Anon-vulcanized cushion rubber 29 is wound, for one revolution, on the outer circumferential surface 17S to which the bonding agent has been applied, and a bonding agent such as a rubber cement composition is applied onto the cushion rubber 29. A vulcanized or semi-vulcanized tread rubber 30A is wound thereon for one revolution, to become to be in the green tire case state.

(Vulcanization Step)

Then, the green tire case is housed in a vulcanization can or a mold, and is vulcanized. In this recess, unvulcanized cushion rubber 29 flows into the roughening irregularities, which have been formed on the outer circumferential surface 17S of the tire case 17 through the roughening treatment. Once the vulcanization is completed, an anchor effect is exerted by the cushion rubber 29 that has flowed into the roughening irregularities, and the bonding strength between the tire case 17 and the cushion rubber 29 is increased. That is, the bonding strength between the tire case 17 and the tread 30 is enhanced due to the presence of the cushion rubber 29.

A tire 200 is completed by adhering a sealing layer 24 formed of a soft material softer than the resin material to the bead portion 12 of the tire case 17 by using an adhesive or the like.

(Effects)

The tire 200 according to the present embodiment has excellent heat resistance, excellent tensile modulus of elasticity, excellent tensile strength, and excellent fracture strain since the tire case 17 is formed of the polyamide-based thermoplastic elastomer. In addition, since the structure thereof is simpler than those of conventional rubber tires, the weight thereof is smaller. Therefore, the tire 200 according to the present embodiment has high abrasion resistance and high durability. The polyamide-based thermoplastic elastomer constituting the tire case 17 has a melting point of 162° C. Thus, the tire case half parts 17A can be sufficiently bonded at, for example, about 250° C., and, therefore, energy consumption can be reduced, and the cost required for heating can be reduced. Further, the polyamide-based thermoplastic elastomer has high adhesiveness to the coated cord member 26B.

In a case in which the reinforcing cord layer 28 is configured to include the coated cord member 26B as described above, the coated cord member 26B can be made to more tightly contact the tire case 17 and fixed to the tire case 17 since the difference in hardness between the tire case 17 and the reinforcing cord layer 28 can be made smaller than that in a case in which the reinforcing cord 26A is fixed simply by using the cushion rubber 29. Accordingly, the incorporation of air mentioned above can effectively be prevented, and the movement of the reinforcing cord member at the time of traveling can effectively be suppressed.

In a case in which the reinforcing cord 26A is a steel cord, the cord member 26A can easily be separated from the coated cord member 26B by heating and recovered at the time of disposing of the tire, and, therefore, there is an advantage from the viewpoint of recyclability of the tire 200. Further, since the polyamide-based thermoplastic elastomer has a lower loss factor (tan δ) compared with vulcanized rubbers, inclusion of a large amount of polyamide-based thermoplastic elastomer in the reinforcing cord layer 28 makes it possible to enhance the rolling properties of the tire. Compared with vulcanized rubbers, the polyamide-based thermoplastic elastomer has advantages in terms of high in-plane shear stiffness, excellent steering stability at the time of traveling with the tire, and excellent abrasion resistance.

In the method for producing a tire according to the present embodiment, when the tire case 17, the cushion rubber 29, and the tread rubber 30A are integrated, the bonding properties (adhesion properties) is improved by the anchor effect since the outer circumferential surface 17S of the tire case 17 has been subjected to the roughening treatment. Further, since the resin material forming the tire case 17 is ploughed due to collision of the blasting abrasive, the wettability of the bonding agent is improved. Therefore, the bonding agent is retained, in a uniformly applied state, on the outer circumferential surface 17S of the tire case 17, whereby the bonding strength between the tire case 17 and the cushion rubber 29 can be ensured.

In particular, even in a case in which irregularities are formed on the outer circumferential surface 17S of the tire case 17, a portion surrounding a recess (walls at the recess, the bottom of the recess) is roughened by allowing the blasting abrasive to collide with the portion surrounding the recess (the gap 28A), whereby the bonding strength between the tire case 17 and the cushion rubber 29 can be ensured.

Since the cushion rubber 29 is superposed on the roughened area of the outer circumferential surface 17S of the tire case 17, the bonding strength between the tire case 17 and the cushion rubber can effectively be ensured.

In the case of vulcanization of the cushion rubber 29 in the vulcanization step, the cushion rubber 29 flows into the roughening irregularities that have been formed on the outer circumferential surface 17S of the tire case 17 through the roughening treatment. Once the vulcanization is completed, an anchor effect is exerted by the cushion rubber 29 that has flowed into the roughening irregularities, and the bonding strength between the tire case 17 and the cushion rubber 29 is enhanced.

In the tire 200 produced by the method for producing a tire, the bonding strength between the tire case 17 and the cushion rubber 29 is ensured. That is, the bonding strength between the tire case 17 and the tread 30 is ensured due to the presence of the cushion rubber 29. Therefore, separation between the outer circumferential surface 17S of the tire case 17 and the cushion rubber 29 in the tire 200 is suppressed at the time of, for example, traveling.

Since the outer circumferential portion of the tire case 17 is formed of the reinforcing cord layer 28, puncture resistance and cutting resistance are improved, compared with a case in which the outer circumferential portion is formed of a member other than the reinforcing cord layer 28.

Since the coated cord member 26B is wound to form the reinforcing cord layer 28, the rigidity in the circumferential direction of the tire 200 is improved. Since the rigidity in the circumferential direction is improved, creeping of the tire case 17 (a phenomenon in which the plastic deformation of the tire case 17 increases with lapse of time under a constant stress) is suppressed, and pressure resistance to air pressure applied from the inner side in the tire radial direction is improved.

Although irregularities are formed on the outer circumferential surface 17S of the tire case 17 in the present embodiment, the first aspect of the invention is not limited to this configuration, and a configuration in which the outer circumferential surface 17S is formed flat may be adopted.

In the tire case 17, a reinforcing cord layer may be formed by covering, with a coating thermoplastic material, the coated cord member that has been wound on the crown portion of the tire case and bonded thereto. In this case, the coating layer can be formed by ejecting the coating thermoplastic material in the melted or softened state onto the reinforcing cord layer 28. The coating layer may be formed without using an extruder, by heating a welding sheet into a melted or softened state, and attaching the welding sheet to the surface (the outer circumferential surface) of the reinforcing cord layer 28.

Although case divided parts (tire case half parts 17A) are bonded to form the tire case 17 in Embodiment 1-2, the first aspect of the invention is not limited to this configuration, and the tire case 17 may be formed as an integrated body using, for example, a mold.

The tire 200 according to Embodiment 1-2 is a so-called tubeless tire in which an air chamber is formed between the tire 200 and the rim 20 by fitting the bead portion 12 to the rim 20. However, the first aspect of the invention is not limited to this configuration, and the tire 200 may have, for example, a complete tube shape.

Although the cushion rubber 29 is interposed between the tire case 17 and the tread 30 in Embodiment 1-2, the first aspect of the invention is not limited to this configuration, and a configuration in which the cushion rubber 29 is not provided may be adopted.

Although a configuration in which the coated cord member 26B is helically wound on the crown portion 16 is adopted in Embodiment 1-2, the first aspect of the invention is not limited to this configuration, and a configuration in which the coated cord member 26B is wound but discontinuous in the width direction may be adopted.

In Embodiment 1-2, a configuration is adopted in which a thermoplastic material is used as the coating resin material 27 that forms the coated cord member 26B, and in which the coating resin material 27 is melted or softened by heating, thereby welding the coated cord member 26B to the outer circumferential surface of the crown portion 16. However, the first aspect of the invention is not limited to this configuration, and a configuration in which the coated cord member 26B is adhered to the outer circumferential surface of the crown portion 16 using an adhesive or the like, without heating the coating resin material 27, may be adopted.

A configuration may be adopted in which the coating resin material 27 that forms the coated cord member 26B is a thermosetting resin, and in which the coated cord member 26B is adhered to the outer circumferential surface of the crown portion 16 using an adhesive or the like, without heating the coated cord member 26B.

A configuration may be adopted in which the coating resin material 27 that forms the coated cord member 26B is a thermosetting resin, and in which the tire case 17 is formed of a thermoplastic resin material. In this case, the coated cord member 26B may be adhered to the outer circumferential surface of the crown portion 16 using an adhesive or the like, or the coated cord member 26B may be welded to the outer circumferential surface of the crown portion 16 by heating a portion of the tire case 17 at which the coated cord member 26B is to be disposed to get into a melted or softened state.

A configuration may be adopted in which the coating resin material 27 that forms the coated cord member 26B is a thermoplastic material, and in which the tire case 17 is formed of a thermoplastic resin material. In this case, the coated cord member 26B may be adhered to the outer circumferential surface of the crown portion 16 using an adhesive or the like, or the coated cord member 26B may be welded to the outer circumferential surface of the crown portion 16 by heating a portion of the tire case 17 at which the coated cord member 26B is to be disposed to get into a melted or softened state as well as heating the coating resin material 27 to get into a melted or softened state. In a case in which both the tire case 17 and the coated cord member 26B are heated to get into a melted or softened state, both materials mix with each other well, thereby increasing the bonding strength. In a case in which each of the resin material that forms the tire case 17 and the coating resin material 27 that forms the coated cord member 26B is a thermoplastic resin material, the thermoplastic resin materials thereof are preferably thermoplastic resin materials of the same kind, and particularly preferably the same thermoplastic material.

The outer circumferential surface 17S of the tire case 17 that has been subjected to the roughening treatment may be subjected to corona treatment, plasma treatment or the like so as to activate the outer circumferential surface 17S and so as to enhance the hydrophilicity, and an adhesive may thereafter be applied thereto.

The sequence employed in the production of the tire 200 is not limited to the sequence described in Embodiment 1-2, and may be modified, as appropriate.

Although modes for carrying out the first aspect of the invention are described above with reference to embodiments, the embodiments are merely examples, and may be practiced with various modifications within a range that does not depart from the gist of the first aspect. Of course, the protection scope of the first aspect of the invention is not limited to these embodiments.

Although specific modes of the first aspect of the invention are described above with reference to Embodiment 1-1 and Embodiment 1-2, the first aspect of the invention is not limited to the modes described above.

Second Aspect of Invention

A thermoplastic resin material that includes a polyamide-based thermoplastic elastomer and an elastomer other than polyamide-based thermoplastic elastomer, and that forms a tire frame, and a resin material that forms a reinforcing cord layer in the second aspect of the invention will be first described, and specific embodiments of a tire according to the second aspect of the invention will be then described with reference to the accompanying drawings.

[Thermoplastic Resin Including Polyamide-Based Thermoplastic Elastomer and Other Elastomer]

The tire according to the second aspect of the invention has a circular tire frame formed from a thermoplastic resin material containing at least a polyamide-based thermoplastic elastomer and another elastomer.

Here, as the "polyamide-based thermoplastic elastomer", the polyamide-based thermoplastic elastomers as described in the first aspect of the invention can be used.

The "elastomer other than polyamide-based thermoplastic elastomer" refers to a thermoplastic resin material formed of a copolymer that includes a polymer constituting a crystalline hard segment having a high melting point or a hard segment having a high cohesive force, and a non-crystalline polymer constituting a soft segment having a low glass transition temperature, in which the polymer constituting the hard segment is a polymer, other than a polyamide having an amide bond (—CONH—) in the main chain, such as a polyurethane, a polystyrene, a polyolefin, a polyester or the like obtained by polymerizing urethane, styrene, olefin, polyester or the like. Examples of the other elastomer include a polyurethane-based thermoplastic elastomer (TPU), a polystyrene-based thermoplastic elastomer (TPS), and a polyolefin-based thermoplastic elastomer (TPO), and a polyester-based thermoplastic elastomer (TPC) as defined in JIS K6418:2007. From the viewpoint of pulling-out properties of a reinforcing cord, it is preferable to use a polyurethane-based elastomer as another elastomer.

—Polyurethane-Based Thermoplastic Elastomer—

The polyurethane-based thermoplastic elastomer may be, for example, a material in which at least a polyurethane constitutes a hard segment forming a pseudo-crosslinking by physical aggregation, and in which another polymer constitutes a non-crystalline soft segment having a low glass transition temperature; the polyurethane-based thermoplastic elastomer may be represented as a copolymer including, for example, a soft segment containing a unit structure represented by the following formula A and a hard segment containing a unit structure represented by the following formula B.

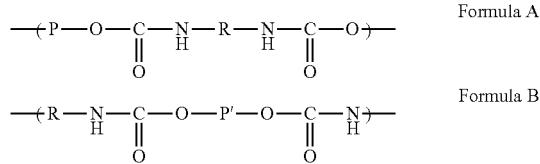

In the formulae, P represents a long-chain aliphatic polyether or a long-chain aliphatic polyester; R represents an aliphatic hydrocarbon, an alicyclic hydrocarbon, or an aromatic hydrocarbon; P' represents a short-chain aliphatic hydrocarbon, an alicyclic hydrocarbon, or an aromatic hydrocarbon.

Examples of the long-chain aliphatic polyether represented by P and the long-chain aliphatic polyester represented by P in Formula A that can be used include those having molecular weights of 500 to 5000. P is derived from a diol compound containing the long-chain aliphatic polyether or long-chain aliphatic polyester represented by P. Examples of the diol compound include polyethylene glycol, polypropylene glycol, polytetramethylene ether glycol, poly(butylene adipate) diol, poly-ε-caprolactone diol, poly(hexamethylene carbonate) diol, and the ABA-type triblock polyether, each of which has a molecular weight within the above range.

These may be used singly, or in combination of two or more thereof.

In Formulae A and B, R is derived from a diisocyanate compound containing the aliphatic hydrocarbon, alicyclic hydrocarbon, or aromatic hydrocarbon represented by R. Examples of an aliphatic diisocyanate compound containing an aliphatic hydrocarbon represented by R include 1,2-ethylene diisocyanate, 1,3-propylene diisocyanate, 1,4-butane diisocyanate, and 1,6-hexamethylene diisocyanate.

Furthermore, examples of a diisocyanate compound containing an alicyclic hydrocarbon represented by R include 1,4-cyclohexane diisocyanate and 4,4-cyclohexane diisocyanate. Further, examples of an aromatic diisocyanate compound containing an aromatic hydrocarbon represented by R include 4,4'-diphenylmethane diisocyanate and tolylene diisocyanate.

These may be used singly, or in combination of two or more thereof.

Examples of the short-chain aliphatic hydrocarbon, alicyclic hydrocarbon, or aromatic hydrocarbon represented by P' in Formula B include those having molecular weights of less than 500. Further, P' is derived from a diol compound containing the short-chain aliphatic hydrocarbon, alicyclic hydrocarbon, or aromatic hydrocarbon represented by P'. Examples of an aliphatic diol compound containing the short-chain aliphatic hydrocarbon represented by P' include glycols and polyalkylene glycols, such as ethylene glycol, propylene glycol, trimethylene glycol, 1,4-butanediol, 1,3-butanediol, 1,5-pentanediol, 1,6-hexanediol, 1,7-heptanediol, 1,8-octanediol, 1,9-nonanediol and 1,10-decanediol.

Examples of an alicyclic diol compound containing the alicyclic hydrocarbon represented by P' include cyclopentane-1,2-diol, cyclohexane-1,2-diol, cyclohexane-1,3-diol, cyclohexane-1,4-diol, and cyclohexane-1,4-dimethanol.

Further, examples of an aromatic diol compound containing the aromatic hydrocarbon represented by P' include hydroquinone, resorcin, chlorohydroquinone, bromohydroquinone, methylhydroquinone, phenylhydroquinone, methoxyhydroquinone, phenoxyhydroquinone, 4,4'-dihydroxybiphenyl, 4,4'-dihydroxydiphenyl ether, 4,4'-dihydroxydiphenylsulfide, 4,4'-dihydroxydiphenylsulfone, 4,4'-dihydroxybenzophenone, 4,4'-dihydroxydiphenylmethane, bisphenolA, 1,1-di(4-hydroxyphenyl)cyclohexane, 1,2-bis(4-hydroxyphenoxy)ethane, 1,4-dihydroxynaphthalene, 2,6-dihydroxynaphthalene, etc.

These may be used singly, or in combination of two or more thereof.

The number average molecular weight of the polymer constituting the hard segment (polyamide) is preferably from 300 to 1,500, from the viewpoint of melt moldability. Further, the number average molecular weight of the polymer constituting the soft segment is preferably from 500 to 20,000, more preferably from 500 to 5,000, and particularly preferably from 500 to 3,000, from the viewpoints of flexibility and thermal stability of the polyurethane-based thermoplastic elastomer. Further, the mass ratio (x:y) of the hard segment (x) to the soft segment (y) is preferably from 15:85 to 90:10, and more preferably from 30:70 to 90:10, from the viewpoint of moldability.

Specifically, as the polyurethane-based thermoplastic elastomer, a copolymer of tolylene diisocyanate (TDI) and polyester-based polyol, a copolymer of TDI and polyether-based polyol, a copolymer of TDI and caprolactone-based polyol, a copolymer of TDI and polycarbonate-based polyol, a copolymer of 4,4'-diphenylmethane diisocyanate (MDI) and polyester-based polyol, a copolymer of MDI and polyether-based polyol, a copolymer of MDI and caprolactone-based polyol, and a copolymer of MDI and polycarbonate-based polyol are preferable, and TDI, and TDI with a polyester-based polyol, TDI with a polyether-based polyol, MDI with a polyester polyol, and MDI with a polyether-based polyol are more preferable.

The polyurethane-based thermoplastic elastomer can be synthesized by copolymerizing a polymer for forming the hard segment and a polymer for forming the soft segment according to known methods. The polyurethane-based thermoplastic elastomer to be used may be, for example, a thermoplastic polyurethane described in JP-A No. 5-331256.

Furthermore, examples of the polyurethane-based thermoplastic elastomer that can be used include commercial products such as ELASTRAN series (for example, ET680, ET880, ET690, ET890, etc.) manufactured by BASF Co., Ltd., KURAMIRON U series (for example, 2000 numbers, 3000 numbers, 8000 numbers, and 9000 numbers) manufactured by Kuraray Co., Ltd., MIRACTRAN series (for example, XN-2001, XN-2004, P390RSUP, P480RSUI, P26MRNAT, E490, E590, and P890) manufactured by Nippon Miractran Co., Ltd.

—Polystyrene-Based Thermoplastic Elastomer—

The polystyrene-based thermoplastic elastomer may be, for example, a material in which at least polystyrene constitutes the hard segment and another polymer (for example, polybutadiene, polyisoprene, polyethylene, hydrogenated polybutadiene, hydrogenated polyisoprene, or the like) constitutes the non-crystalline soft segment having a low glass transition temperature. The polystyrene for forming the hard segment that can be used may be, for example, a polystyrene obtained by a known radical polymerization method or ionic polymerization method, and examples thereof include a polystyrene having anionic living polymerization.

Furthermore, examples of the polymer for forming the soft segment include polybutadiene, polyisoprene, and poly(2,3-dimethylbutadiene).

Examples of the combination of the hard segment and the soft segment described above include any combination of any of the hard segments described above and any of the soft segments described above. Among these, a combination of polystyrene with polybutadiene, and a combination of polystyrene with polyisoprene are preferable. Further, in order to suppress undesired crosslinking reaction of the thermoplastic elastomer, the soft segment is preferably a hydrogenated soft segment.

The number average molecular weight of the polymer constituting the hard segment (polystyrene) is preferably from 5,000 to 500,000, and more preferably from 10,000 to 200,000.

Furthermore, the number average molecular weight of the polymer constituting the soft segment is preferably from 5,000 to 1,000,000, more preferably from 10,000 to 800,000, and particularly preferably from 30,000 to 500,000. In addition, the mass ratio (x:y) of the hard segment (x) to the soft segment (y) is preferably from 5:95 to 80:20, and more preferably from 10:90 to 70:30, from the viewpoint of moldability.

The polystyrene-based thermoplastic elastomer can be synthesized by copolymerizing a polymer for forming the hard segment and a polymer for forming the soft segment according to known methods.

Examples of the polystyrene-based thermoplastic elastomer include a styrene-butadiene-based copolymer [SBS (polystyrene-poly(butylene) block-polystyrene), a SEBS (polystyrene-poly(ethylene/butylene) block-polystyrene)], a styrene-isoprene copolymer [polystyrene-polyisoprene block-polystyrene), a styrene-propylene-based copolymer [SEP (polystyrene-(ethylene/propylene) block), a SEPS (polystyrene-poly(ethylene/propylene) block-polystyrene), an SEEPS (polystyrene-poly(ethylene-ethylene/propylene) block-polystyrene)), and an SEB (polystyrene (ethylene/butylene) block).

Examples of polystyrene-based thermoplastic elastomer that can be used include commercial products such as TAFTEC series (for example, H1031, H1041, H1043, H1051, H1052, H1053, H1082, H1141, H1221, and H1272) manufactured by Asahi Kasei Corporation; and SEBS (8007, 8076, etc.) and SEPS (2002, 2063, etc.) manufactured by Kuraray.

—Polyolefin-Based Thermoplastic Elastomer—

The polyolefin-based thermoplastic elastomer may be, for example, a material in which at least polyolefin constitutes a crystalline hard segment having a high melting point, and in which another polymer (for example, any of the polyolefins described above, or another polyolefin or polyvinyl compound) constitutes a non-crystalline soft segment having a low glass transition temperature. Examples of the polyolefin that forms the hard segment include polyethylene, polypropylene, isotactic polypropylene, polybutene, etc.

Examples of the polyolefin-based thermoplastic elastomer include an olefin—α-olefin random copolymer and an olefin block copolymer, such as a propylene block copolymer, a copolymer of ethylene and propylene, a copolymer of propylene and 1-hexene, a copolymer of propylene and 4-methyl-1-pentene, a copolymer of propylene and 1-butene, a copolymer of ethylene and 1-hexene, a copolymer of ethylene and 4-methyl-pentene, a copolymer of ethylene and 1-butene, a copolymer of 1-butene and 1-hexene, a copolymer of 1-butene and 4-methyl-pentene, a copolymer of ethylene and methacrylic acid, a copolymer of ethylene and methyl methacrylate, a copolymer of ethylene and ethyl methacrylate, a copolymer of ethylene and butyl methacrylate, a copolymer of ethylene and methyl acrylate, a copolymer of ethylene and ethyl acrylate, a copolymer of ethylene and butyl acrylate, a copolymer of propylene and methacrylic acid, a copolymer of propylene and methyl methacrylate, a copolymer of propylene and ethyl methacrylate, a copolymer of propylene and butyl methacrylate, a copolymer of propylene and methyl acrylate, a copolymer of propylene and ethyl acrylate, a copolymer of propylene and butyl acrylate, a copolymer of ethylene and vinyl acetate, and a copolymer of propylene and vinyl acetate.

The polyolefin-based thermoplastic elastomer is preferably a propylene block copolymer, a copolymer of ethylene and propylene, a copolymer of propylene and 1-hexene, a copolymer of propylene and 4-methyl-1-pentene, a copolymer of propylene and 1-butene, a copolymer of ethylene and 1-hexene, a copolymer of ethylene and 4-methyl-pentene, a copolymer of ethylene and 1-butene, a copolymer of ethylene and methacrylic acid, a copolymer of ethylene and methyl methacrylate, a copolymer of ethylene and ethyl methacrylate, a copolymer of ethylene and butyl methacrylate, a copolymer of ethylene and methyl acrylate, a copolymer of ethylene and ethyl acrylate, a copolymer of ethylene and butyl acrylate, a copolymer of propylene and methacrylic acid, a copolymer of propylene and methyl methacrylate, a copolymer of propylene and ethyl methacrylate, a copolymer of propylene and butyl methacrylate, a copolymer of propylene and methyl acrylate, a copolymer of propylene and ethyl acrylate, a copolymer of propylene and butyl acrylate, a copolymer of ethylene and vinyl acetate, or a copolymer of propylene and vinyl acetate, and more preferably a copolymer of ethylene and propylene, a copolymer of propylene and 1-butene, a copolymer of ethylene and 1-butene, a copolymer of ethylene and methyl methacrylate, a copolymer of ethylene and methyl acrylate, a copolymer of ethylene and ethyl acrylate, or a copolymer of ethylene and butyl acrylate.

Two or more polyolefin resins, such as ethylene and propylene, may be used in combination. The content of polyolefin in the polyolefin-based thermoplastic elastomer is preferably from 50% by mass to 100% by mass.

The number average molecular weight of the polyolefin-based thermoplastic elastomer is preferably from 5,000 to 10,000,000. When the number average molecular weight of the polyolefin-based thermoplastic elastomer is in the range of 5,000 to 10,000,000, the thermoplastic resin material has sufficient mechanical properties, and excellent processability. From similar viewpoints, the number average molecular weight is more preferably from 7,000 to 1,000,000, and particularly preferably from 10,000 to 1,000,000. Within these ranges, the mechanical properties and processability of the thermoplastic resin material can further be improved. Further, the number average molecular weight of the polymer constituting the soft segment is preferably from 200 to 6,000 from the viewpoint of toughness and low-temperature flexibility. Further, the mass ratio (x:y) of the hard segment (x) to the soft segment (y) is preferably from 50:50 to 95:15, and more preferably from 50:50 to 90:10, from the viewpoint of moldability.

The polyolefin-based thermoplastic elastomer can be synthesized by copolymerization using known methods.

Examples of polyolefin-based thermoplastic elastomers that can be used include commercial products such as: TAFMER series (for example, A0550S, A1050S, A4050S, A1070S, A4070S, A35070S, A1085S, A4085S, A7090, A70090, MH7007, MH7010, XM-7070, XM-7080, BL4000, BL2481, BL3110, BL3450, P-0275, P-0375, P-0775, P-0180, P-0280, P-0480, and P-0680) manufactured by Mitsui Chemicals, Inc.; NUCREL series (for example, AN4214C, AN4225C, AN42115C, N0903HC, N0908C, AN42012C, N410, N1050H, N1108C, N1110H, N1207C, N1214, AN4221C, N1525, N1560, N0200H, AN4228C, AN4213C, and N035C) and ELVALOY AC series (for example, 1125AC, 1209AC, 1218AC, 1609AC, 1820AC, 1913AC, 2112AC, 2116AC, 2615AC, 2715AC, 3117AC, 3427AC, 3717AC) manufactured by DU PONT-MITSUI POLY CHEMICALS CO., LTD.; ACRYFT series and EVATATE series manufactured by Sumitomo Chemical Co., Ltd.; ULTRASON series manufactured by Tosoh Corporation; etc.

Further examples of polyolefin-based thermoplastic elastomer that can be used include commercial available products PRIME TPO series (for example, E-2900 H, F-3900 H, E-2900, F-3900, J-5900, E-2910, F-3910, J-5910, E-2710, F-3710, J-5910, E-2740, F-3740, R110 MP, R110E, T310E, M142E, etc) manufactured by Prime Polymer Co., Ltd., etc.

—Polyester-Based Thermoplastic Elastomer—

The polyester-based thermoplastic elastomer may be, for example, a material in which at least polyester constitutes the hard segment, and in which another polymer (for example, polyester, polyether, or the like) constitutes the non-crystalline soft segment having a low glass transition temperature.

The polyester for forming the hard segment to be used may be an aromatic polyester. The aromatic polyester can be formed from, for example, an aromatic dicarboxylic acid or ester-forming derivative thereof and an aliphatic diol. The aromatic polyester is preferably a polybutylene terephthalate derived from terephthalic acid and/or dimethyl terephthalate and 1,4-butanediol. Further, the aromatic polyester may be a polyester derived from a dicarboxylic acid component such as isophthalic acid, phthalic acid, naphthalene-2,6-dicarboxylic acid, naphthalene-2,7-dicarboxylic acid, diphenyl-4,4'-dicarboxylic acid, diphenoxyethane dicarboxylic acid, 5-sulfoisophthalic acid, or an ester-forming derivative thereof, and a diol having a molecular weight of 300 or less. Examples of the diol having a molecular weight of 300 or less include: aliphatic diols such as ethylene glycol, trimethylene glycol, pentamethylene glycol, hexamethylene glycol, neopentyl glycol, and decamethylene glycol; alicyclic diols such as 1,4-cyclohexanedimethanol and tricyclodecanedimethylol; and aromatic diols such as xylylene glycol, bis(p-hydroxy) diphenyl, bis(p-hydroxyphenyl)propane, 2,2-bis[4-(2-hydroxyethoxy)phenyl]propane, bis[4-(2-hydroxy)phenyl]sulfone, 1,1-bis[4-(2-hydroxyethoxy)phenyl]cyclohexane, 4,4'-dihydroxy-p-terphenyl, and 4,4'-dihydroxy-p-quarterphenyl. The aromatic polyester may alternatively be a copolymerization polyester formed using two or more of these dicarboxylic acid components and/or two or more of these diol components. Further, polyfunctional carboxylic acid components, polyfunctional oxyacid components, polyfunctional hydroxy components, etc, each of which is tri- or higher-functional, may be copolymerized in an amount in the range of 5% by mol or less.

Examples of the polyester for forming the hard segment include polyethylene terephthalate, polybutylene terephthalate, polymethylene terephthalate, polyethylene naphthalate, and polybutylene naphthalate. Polybutylene terephthalate is preferable.

Furthermore, examples of the polymer for forming the soft segment include aliphatic polyesters and aliphatic polyethers.

Examples of aliphatic polyethers include poly(ethylene oxide) glycol, poly(propylene oxide) glycol, poly(tetramethylene oxide) glycol, poly(hexamethylene oxide) glycol, a copolymer of ethylene oxide and propylene oxide, an ethylene oxide adduct polymer of poly(propylene oxide) glycol, and a copolymer of ethylene oxide and tetrahydrofuran.

Examples of aliphatic polyesters include poly(ε-caprolactone), polyenantholactone, polycaprylolactone, polybutylene adipate, and polyethylene adipate.

Among these aliphatic polyethers and aliphatic polyesters, poly(tetramethylene oxide) glycol, an ethylene oxide adduct of poly(propylene oxide) glycol, poly(ε-caprolactone), polybutylene adipate, polyethylene adipate, etc. are preferable from the viewpoint of the elastic characteristics of the resultant polyester block copolymer.

The number average molecular weight of the polymer (polyester) for forming the hard segment is preferably from 300 to 6,000 from the viewpoint of toughness and low-temperature flexibility. Further, the number average molecular weight of the polymer for forming the soft segment is preferably from 300 to 6,000 from the viewpoint of toughness and low-temperature flexibility. The volume ratio (a:b) of the hard segment (a) to the soft segment (b) is preferably from 99:1 to 20:80, and more preferably from 98:2 to 30:70, from the viewpoint of moldability.

The other elastomer mentioned above can be synthesized by copolymerizing a polymer for forming the hard segment and a polymer for forming the soft segment according to known methods.

The polyester-based thermoplastic elastomer can be synthesized by copolymerizing a polymer for forming the hard segment and a polymer for forming the soft segment according to known methods.

Commercially available products may be used as the polyester-based thermoplastic elastomer. For example, HYTREL series (for example, 3046, 5557, 6347, 4047, 4767) manufactured by DU PONT-TORAY CO., LTD., PELPRENE series (for example, P30B, P40B, P40H, P55B, P70B, P150B, P250B, E450B, P150 M, S1001, S2001, S5001, S6001, S9001) manufactured by TOYOBO CO., LTD., etc., may be used.

A product obtained by acid-modifying a thermoplastic elastomer other than polyamide-based thermoplastic elastomer may be used.

The "product obtained by acid-modifying a thermoplastic elastomer other than polyamide-based thermoplastic elastomer" refer to a product obtained by boding an unsaturated compound having an acidic group such as a carboxylic acid group, a sulfuric acid group, or a phosphoric acid group to the other thermoplastic elastomer. For example, in the case of using an unsaturated carboxylic acid (generally, anhydrous maleic acid) as an unsaturated compound having an acidic group, unsaturated bonding sites of the unsaturated carboxylic acid may be bonded to an olefin-based thermoplastic elastomer (by, for example, graft polymerization).

The compound having an acidic group is preferably a compound having a carboxylic acid group that is a weakly acidic group, from the viewpoint of suppression of deterioration of the polyamide-based thermoplastic elastomer and the thermoplastic elastomer other than polyamide-based thermoplastic elastomer, and examples thereof include acrylic acid, methacrylic acid, itaconic acid, crotonic acid, isocrotonic acid, and maleic acid.

Commercially available products, for example, may be used as the other elastomer.

Commercially available products may be used as the polyurethane-based thermoplastic elastomer, such as ELASTRAN series (for example, ET680, ET880, ET690, and ET890) manufactured by BASF Co., Ltd., KURAMIRON U series (for example, 2000 numbers, 3000 numbers, 8000 numbers, and 9000 numbers) manufactured by Kuraray Co., Ltd., and MIRACTRAN series (for example, XN-2001, XN-2004, P390RSUP, P480RSUI, P26MRNAT, E490, E590, and P890) manufactured by Nippon Miractran Co., Ltd.

Commercially available products may be used as the polystyrene-based thermoplastic elastomer, such as TAFTEC series (for example, H1031, H1041, H1043, H1051, H1052, H1053, H1082, H1141, H1221, and H1272) manufactured by Asahi Kasei Corporation, and SEBS (8007, 8076, etc.) and SEPS (2002, 2063, etc.) manufactured by Kuraray.

Commercially available products may be used as the polyolefin-based thermoplastic elastomer, such as: TAFMER series (for example, A0550S, A1050S, A4050S, A1070S, A4070S, A35070S, A1085S, A4085S, A7090, A70090, MH7007, MH7010, XM-7070, XM-7080, BL4000, BL2481, BL3110, BL3450, P-0275, P-0375, P-0775, P-0180, P-0280, P-0480, and P-0680) manufactured by Mitsui Chemicals, Inc.; NUCREL series (for example, AN4214C, AN4225C, AN42115C, N0903HC, N0908C, AN42012C, N410, N1050H, N1108C, N1110H, N1207C, N1214, AN4221C, N1525, N1560, N0200H, AN4228C, AN4213C, and N035C) and ELVALOY AC series (for example, 1125AC, 1209AC, 1218AC, 1609AC, 1820AC, 1913AC, 2112AC, 2116AC, 2615AC, 2715AC, 3117AC, 3427AC, and 3717AC), manufactured by DU PONT-MITSUI POLY CHEMICALS CO., LTD.; ACRYFT series and EVATATE series manufactured by Sumitomo Chemical Co., Ltd.; and ULTRASON series manufactured by Tosoh Corporation.

Commercially available products such as PRIME TPO series (for example, E-2900 H, F-3900 H, E-2900, F-3900, J-5900, E-2910, F-3910, J-5910, E-2710, F-3710, J-5910, E-2740, F-3740, R110MP, R110E, T310E, and M142E) manufactured by Prime Polymer Co., Ltd. may also be used as the polyolefin-based thermoplastic elastomer.

Commercially available products may be used as the polyester-based thermoplastic elastomer, such as HYTREL series (for example, 3046, 5557, 6347, 4047, 4767) manufactured by DU PONT-TORAY CO., LTD., and PELPRENE series (for example, P30B, P40B, P40H, P55B, P70B, P150B, P280B, P450B, P150 M, S1001, S2001, S5001, S6001, and S9001) manufactured by TOYOBO CO., LTD.

The mass ratio (x:y) of the polyamide-based thermoplastic elastomer (x) to the other elastomer (y) in the thermoplastic resin is preferably from 95:5 to 60:40. When the mass ratio of these elastomers is in the range of 95:5 to 60:40, the polyamide-based elastomer and the other elastomer form a sea-island structure in which are polyamide-based thermoplastic elastomer serves as sea, and, therefore, the elastic modulus of the tire can easily be controlled while maintaining the weldability between the reinforcing cord member and the tire frame by the polyamide-based thermoplastic elastomer, and the durability and impact resistance of the tire can both be obtained. The mass ratio (x:y) of the polyamide-based thermoplastic elastomer (x) to the other elastomer (y) is more preferably from 90:10 to 60:40. In the case of using two or more other elastomers in combination, the total amount of the other elastomers and the total amount of the polyamide-based thermoplastic elastomer form a ratio within the range described above.

The melting point of the thermoplastic resin containing the polyamide-based thermoplastic elastomer and the other elastomer is usually about 100° C. to about 350° C., preferably about 100 to about 250° C., and more preferably 120° C. to 200° C., from the viewpoint of the productivity of tires. In a case in which a thermoplastic resin material containing the polyamide-based thermoplastic elastomer and the other elastomer and having a melting point of 100 to 200° C. as described above is used, and in which, for example, a tire frame is formed by fusing divided parts (frame pieces) thereof, the heating temperature of bonding sections can be set to be equal to or higher than the melting point of the thermoplastic resin material that forms the tire frame. Since the thermoplastic resin material containing the polyamide-based thermoplastic elastomer and the other elastomer is used in the tire according to the second aspect of the invention, the bonding strength between the tire frame pieces is sufficient even in the case of a frame fused in the temperature range of 100° C. to 250° C. Therefore, the tire according to the second aspect of the invention has excellent durability at the time of traveling, such as puncture resistance and abrasion resistance. Further, the heating temperature is preferably a temperature 10° C. to 150° C. higher than, more preferably a temperature 10° C. to 100° C. higher than, the melting point of the thermoplastic resin material that contains the polyamide-based thermoplastic elastomer and the other elastomer, and that forms the tire frame pieces.

Furthermore, in the second aspect of the invention, the total content of the polyamide-based thermoplastic elastomer and the other elastomer in the thermoplastic resin material is not particularly limited, and is preferably from 50% by mass to 100% by mass, more preferably from 90% by mass to 100% by mass, with respect to the total amount of the thermoplastic resin material. When the total content of the polyamide-based thermoplastic elastomer and the other elastomer is from 50% by mass to 100% by mass with respect to the total amount of the thermoplastic resin material, the characteristics of each elastomer can be sufficiently exhibited, and the durability or productivity of the tire can be improved. The thermoplastic resin material may contain, if desired, rubber, other thermoplastic elastomers, thermoplastic resins, various fillers (for example, silica, calcium carbonate, and clay), and various additives such as anti-aging agents, oil, plasticizers, colorants, weather resistant agents, and reinforcing agents.

The resin material can be obtained by compounding the thermoplastic elastomer with the specific resin, adding, if necessary, various additives, and carrying out mixing, as appropriate, using known methods (for example, melt-mixing). The thermoplastic resin material obtained by the melt-mixing may be used after shaped into a pellet shape, if necessary.

In the second aspect of the invention, the tensile modulus of elasticity as defined in JIS K7113:1995 of the thermoplastic resin material containing the polyamide-based thermoplastic elastomer and the other elastomer is preferably from 100 MPa to 1000 MPa, more preferably from 100 MPa to 800 MPa, and particularly preferably from 100 MPa to 700 MPa. When the tensile modulus of elasticity of the thermoplastic resin material is from 100 to 1000 MPa, fitting to a rim can be efficiently carried out while maintaining the shape of the tire frame.

In the second aspect of the invention, the tensile strength at yield as defined in JIS K7113:1995 of the thermoplastic resin material containing the polyamide-based thermoplastic elastomer and the other elastomer is preferably 5 MPa or more, more preferably from 5 MPa to 20 MPa, and even more preferably from 5 MPa to 17 MPa. When the tensile strength at yield of the thermoplastic resin material is 5 MPa or more, deformation due to a load applied to the tire at the time of traveling or the like can be tolerated.

In the second aspect of the invention, the tensile elongation at yield as defined in JIS K7113:1995 of the thermoplastic resin material containing the polyamide-based thermoplastic elastomer and the other elastomer is preferably 10% or more, more preferably from 10 to 70%, and even more preferably from 15 to 60%. When the tensile elongation at yield of the thermoplastic resin material is 10% or more, the elastic region is large, and fittability to a rim can be improved.

In the second aspect of the invention, the tensile elongation at break as defined in JIS K7113:1995 of the thermoplastic resin material containing the polyamide-based thermoplastic elastomer and the other elastomer is preferably 50% or more, more preferably 100% or more, even more preferably 150% or more, and particularly preferably 200% or more. When the tensile elongation at break of the thermoplastic resin material is 50% or more, fittability to a rim is excellent, and resistance to break at collision can be enhanced.

In the second aspect of the invention, the deflection temperature under load (under a load of 0.45 MPa) as defined in ISO75-2 or ASTM D648 of the thermoplastic resin material containing the polyamide-based thermoplastic elastomer and the other elastomer is preferably 50° C. or higher, more preferably 50 to 150° C., and particularly preferably 50 to 130° C. When the deflection temperature under load of the thermoplastic resin material is 50° C. or higher, deformation of the tire frame can be suppressed even when vulcanization is performed during the production of the tire.

[Resin Material as Component of Reinforcing Cord Layer]

The tire according to the second aspect of the invention can be configured to include a resin material in the reinforcing cord layer.

The [Resin Material as Component of Reinforcing Cord Layer] according to the second aspect of the invention is the same as the [Resin Material as Component of Reinforcing Cord Layer] according to the first aspect of the invention described above.

Embodiment 2-1

Hereinafter, a tire according to Embodiment 2-1 of the tire according to the second aspect of the invention will be described with reference to the drawings.

The tire according to Embodiment 2-1 is the same as the tire according to Embodiment 1-1 described above, except for the points discussed below. Therefore, the same or corresponding figures and members will be described using the same reference characters and figures.

The tire case 17 in the present embodiment is formed of a thermoplastic resin material containing a polyamide-based thermoplastic elastomer (UBESTA XPA9055X1 manufactured by Ube Industries, Ltd., melting point: 162° C.) and a polyurethane-based thermoplastic elastomer (ET680 manufactured by BASF Co., Ltd., softening point: 107° C.) in a mass ratio of 75:25. The other details are the same as those of the tire according to Embodiment 1-1 described above, and the production method therefor is also the same.

(Effects)

The tire 10 according to the present embodiment has excellent heat resistance, excellent tensile modulus of elasticity, excellent tensile strength, and excellent fracture strain since the tire case 17 is formed of a thermoplastic resin material containing a polyamide-based thermoplastic elastomer and a polyurethane-based thermoplastic elastomer. In addition, since the structure is simpler than those of conventional rubber tires, the weight thereof is smaller. Therefore, the tire 10 according to the present embodiment has high impact resistance, and has high abrasion resistance and high durability. The thermoplastic resin material that constitutes the tire case 17 and contains the polyamide-based thermoplastic elastomer and the polyurethane-based thermoplastic elastomer has a melting point or a softening point of 200° C. or lower. Thus, the tire case half parts 17A can be sufficiently bonded at, for example, 250° C. or lower, and, therefore, energy consumption can be reduced, and the cost required for heating can be reduced.

The thermoplastic resin material containing the polyamide-based thermoplastic elastomer and the polyurethane-based thermoplastic elastomer has high adhesiveness to the reinforcing cord 26, and has excellent fixing performance such as welding strength. Therefore, a phenomenon (incorporation of air) in which air remains around the reinforcing cord 26 can be suppressed in the reinforcing cord winding step. The high adhesiveness and weldability to the reinforcing cord 26 and suppression of incorporation of air into a region around the reinforcing cord member effectively suppresses movement of the reinforcing cord 26 at the time a force is applied during traveling. Accordingly, for example, even in a case in which tire component members are disposed on the outer circumference of the tire frame so as to cover the entire reinforcing cord member, the movement of the reinforcing cord member is suppressed, whereby separation between the members (including the tire frame), for example, is suppressed, and the durability of the tire 10 is improved.

In the tire 10 according to the present embodiment, since the reinforcing cord 26 having higher rigidity than that of the thermoplastic resin material is helically wound on the outer circumferential surface of the crown portion 16 of the tire case 17 formed of a thermoplastic resin material in the circumferential direction, puncture resistance, cutting resistance, and rigidity in the circumferential direction of the tire 10 are improved. The improved rigidity in the circumferential direction of the tire 10 prevents creeping of the tire case 17 formed of a thermoplastic resin material.

In a cross-sectional view taken along the axial direction of the tire case 17 (the cross-section shown in FIG. 1), at least a part of the reinforcing cord 26 is embedded in the outer circumferential surface of the crown portion 16 of the tire case 17 formed of the thermoplastic resin material, and is in close contact with the thermoplastic resin material, as a result of which incorporation of air during production is suppressed, and movement of the reinforcing cord 26 due to, for example, a force applied at the time of traveling is suppressed. Accordingly, separation between the reinforcing cord 26, the tire case 17, and the tread 30 is suppressed, and the durability of the tire 10 is improved.

In a case in which the reinforcing cord layer 28 is configured to include the polyamide-based thermoplastic elastomer and the polyurethane-based thermoplastic elastomer as described above, the reinforcing cord 26 can be made to more tightly contact the tire case 17 and fixed to the tire case 17 since the difference in hardness between the tire case 17 and the reinforcing cord layer 28 can be made smaller than that in a case in which the reinforcing cord 26 is fixed using a cushion rubber. Accordingly, the incorporation of air mentioned above can effectively be prevented, and the movement of the reinforcing cord member at the time of traveling can effectively be suppressed.

In a case in which the reinforcing cord 26 is a steel cord, the reinforcing cord 26 can easily be separated from the thermoplastic resin material by heating and recovered at the time of disposing of the tire, and, therefore, there is an advantage from the viewpoint of recyclability of the tire 10. Further, since the polyamide-based thermoplastic elastomer has a lower loss factor (tan δ) compared with vulcanized rubbers, inclusion of a large amount of polyamide-based thermoplastic elastomer in the reinforcing cord layer 28 makes it possible to enhance the rolling properties of the tire. Compared with vulcanized rubbers, the polyamide-based thermoplastic elastomer has advantages in terms of high in-plane shear stiffness, excellent steering stability at the time of traveling with the tire, and excellent abrasion resistance.

As shown in FIG. 2, since the depth L of embedding of the reinforcing cord 26 is set to be equal to or greater than ⅕ of the diameter D thereof, incorporation of air during production is effectively suppressed, and movement of the reinforcing cord 26 due to a force applied at the time of traveling is further suppressed.

Since the tread 30 that contacts a road surface is formed of a rubber material having higher abrasion resistance than that of the thermoplastic resin material constituting the tire case, the abrasion resistance of the tire 10 is improved.

Since the annular bead core 18 formed of a metal material is embedded in the bead portion 12, the tire case 17 is strongly fixed to the rim 20, i.e., the tire 10 is strongly fixed to the rim 20, similarly to conventional rubber pneumatic tires.

Since the sealing layer 24 formed of a rubber material having higher sealing ability than the thermoplastic resin material constituting the tire case is disposed in a region of the bead portion 12 that contacts the rim 20, the sealing between the tire 10 and the rim 20 is improved. Therefore, compared with a case in which sealing is carried out with the rim 20 and the polyurethane-based thermoplastic elastomer, air leakage from the tire is further suppressed. Further, provision of the sealing layer 24 also improves fittability to a rim.

Although a configuration in which the reinforcing cord 26 is heated such that the polyamide-based thermoplastic elastomer in a portion that contacts the heated reinforcing cord 26 is melted or softened is adopted in the embodiment described above, the second aspect of the invention is not limited to this configuration; a hot air generating apparatus may be used, instead of heating the reinforcing cord 26, to heat the outer circumferential surface of the crown portion 16 in which the reinforcing cord 26 is to be embedded, and the reinforcing cord 26 may thereafter be embedded in the crown portion 16.

Although the heat source of the cord heating device 59 includes the heater and the fan in Embodiment 2-1, the second aspect of the invention is not limited to this configuration, and a configuration in which the reinforcing cord 26 is directly heated by radiation heat (for example, infrared rays) may be adopted.

Although a configuration in which a region at which the thermoplastic resin material with the reinforcing cord 26 embedded therein is melted or softened is forcibly cooled with the second roller 64 formed of metal is adopted in Embodiment 2-1, the second aspect of the invention is not limited to this configuration; a configuration in which cold air is directly applied to the region at which the thermoplastic resin material is melted or softened, to forcibly cool and solidify the region at which the thermoplastic resin material is melted or softened may also be adopted.

Although a configuration in which the reinforcing cord 26 is heated is adopted in Embodiment 2-1, a configuration in which the outer circumference of the reinforcing cord 26 is coated with the same thermoplastic resin material as that of the tire case 17, for example, may be adopted. In this case, by heating the coated thermoplastic resin material along with the reinforcing cord 26 when the coated reinforcing cord is wound on the crown portion 16 of the tire case 17, incorporation of air can effectively be suppressed at the time of embedding the reinforcing cord in the crown portion 16.

The tire 10 according to Embodiment 2-1 is a so-called tubeless tire in which an air chamber is formed between the tire 10 and the rim 20 by fitting the bead portion 12 to the rim 20. However, the second aspect of the invention is not limited to this configuration, and a complete tube shape may be adopted.

Helical winding the reinforcing cord 26 is easy from the viewpoint of production. However, a method in which the reinforcing cord 26 is discontinuous in the width direction, for example, may also be contemplated.

Although modes for carrying out the second aspect of the invention are described above with reference to embodiments, the embodiments are merely examples, and may be practiced with various modifications within a range that does not depart from the gist of the second aspect. Of course, the protection scope of the second aspect of the invention is not limited to these embodiments.

Embodiment 2-2

A method for producing a tire according to the second aspect of the invention, and a tire according to Embodiment 2-2 will be described below with reference to the drawings. Similarly to Embodiment 2-1, the tire according to the present embodiment has substantially the same cross-sectional shape as those of conventional general rubber pneumatic tires.

The tire according to Embodiment 2-2 is the same as the tire according to Embodiment 1-2 described above, except for the points discussed below. Therefore, the same or corresponding figures and members will be described using the same reference characters and figures.

Similarly to Embodiment 2-1, the tire according to Embodiment 2-2 is configured such that the tire case 17 is formed of a thermoplastic resin material containing a polyamide-based thermoplastic elastomer (UBESTA XPA9055X1 manufactured by Ube Industries, Ltd., melting point: 162° C.) and a polyurethane-based thermoplastic elastomer (ET680 manufactured by BASF Co., Ltd., softening point: 107° C.) in a mass ratio of 75:25. The other details are the same as those of the tire according to Embodiment 1-2 described above, and the production method therefor is also the same.

In the present embodiment, the same material (the mixture of the polyamide-based thermoplastic elastomer (UBESTA XPA9055X1 manufactured by Ube Industries, Ltd.) and the polyurethane-based thermoplastic elastomer (ET680 manufactured by BASF Co., Ltd.) in a mass ratio of 75:25) as the thermoplastic resin material is used as the coating resin material 27.

(Effects)

The tire 200 according to the present embodiment has excellent heat resistance, excellent tensile modulus of elasticity, excellent tensile strength, and excellent fracture strain since the tire case 17 is formed of a thermoplastic resin material containing a polyamide-based thermoplastic elastomer and a polyurethane-based thermoplastic elastomer. In addition, since the structure is simpler than those of conventional rubber tires, the weight thereof is smaller. Therefore, the tire 200 according to the present embodiment has high impact resistance, and has high abrasion resistance and high durability. In the thermoplastic resin material that constitutes the tire case 17, the polyamide-based thermoplastic elastomer having a higher melting point from among the elastomers contained in the thermoplastic resin material has a melting point of 162° C. Thus, the tire case half parts 17A can be sufficiently bonded at, for example, 250° C. or lower, and, therefore, energy consumption can be reduced, and the cost required for heating can be reduced. The polyamide-based thermoplastic elastomer has high adhesiveness to the coated cord member 26B.

In a case in which the reinforcing cord layer 28 is configured to include the coated cord member 26B as described above, the coated cord member 26B can be made to more tightly contact the tire case 17 and fixed to the tire case 17 since the difference in hardness between the tire case 17 and the reinforcing cord layer 28 can be made smaller than that in a case in which the reinforcing cord 26A is fixed using the cushion rubber 29. Accordingly, the incorporation of air mentioned above can effectively be prevented, and the movement of the reinforcing cord member at the time of traveling can effectively be suppressed.

In a case in which the reinforcing cord 26A is a steel cord, the cord member 26A can easily be separated from the coated cord member 26B by heating and recovered at the time of disposing of the tire, and, therefore, there is an advantage from the viewpoint of recyclability of the tire 200. Since the polyamide-based thermoplastic elastomer has a lower loss factor (tan δ) compared with vulcanized rubbers, inclusion of a large amount of polyamide-based thermoplastic elastomer in the reinforcing cord layer 28 makes it possible to enhance the rolling properties of the tire. Compared with vulcanized rubbers, the polyamide-based thermoplastic elastomer has advantages in terms of high in-plane shear stiffness, excellent steering stability at the time of traveling with the tire, and excellent abrasion resistance.

In the method for producing a tire according to the present embodiment, when the tire case 17, the cushion rubber 29, and the tread rubber 30A are integrated, the bonding properties (adhesion properties) is improved by the anchor effect since the outer circumferential surface 17S of the tire case 17 has been subjected to the roughening treatment. Further, since the resin material forming the tire case 17 is ploughed due to collision of the blasting abrasive, the wettability of the bonding agent is improved. Therefore, the bonding agent is retained, in a uniformly applied state, on the outer circumferential surface 17S of the tire case 17, whereby the bonding strength between the tire case 17 and the cushion rubber 29 can be ensured.

In particular, even in a case in which irregularities are formed on the outer circumferential surface 17S of the tire case 17, a portion surrounding a recess (walls at the recess, the bottom of the recess) is roughened by allowing the blasting abrasive to collide with the portion surrounding the recess (the gap 28A), whereby the bonding strength between the tire case 17 and the cushion rubber 29 can be ensured.

Since the cushion rubber 29 is superposed on the roughened area of the outer circumferential surface 17S of the tire case 17, the bonding strength between the tire case 17 and the cushion rubber can effectively be ensured.

In the case of vulcanization of the cushion rubber 29 in the vulcanization step, the cushion rubber 29 flows into the roughening irregularities that have been formed on the outer circumferential surface 17S of the tire case 17 through the roughening treatment. Once the vulcanization is completed, an anchor effect is exerted by the cushion rubber 29 that has flowed into the roughening irregularities, and the bonding strength between the tire case 17 and the cushion rubber 29 is enhanced.

In the tire 200 produced by the method for producing a tire, the bonding strength between the tire case 17 and the cushion rubber 29 is ensured. That is, the bonding strength between the tire case 17 and the tread 30 is ensured due to the presence of the cushion rubber 29. Therefore, separation between the outer circumferential surface 17S of the tire case 17 and the cushion rubber 29 in the tire 200 is suppressed.

Since the outer circumferential portion of the tire case 17 is formed of the reinforcing cord layer 28, puncture resistance and cutting resistance are improved, compared with a case in which the outer circumferential portion is formed of a member other than the reinforcing cord layer 28.

Since the coated cord member 26B is wound to form the reinforcing cord layer 28, the rigidity in the circumferential direction of the tire 200 is improved. Since the rigidity in the circumferential direction is improved, creeping of the tire case 17 (a phenomenon in which the plastic deformation of the tire case 17 increases with lapse of time under a constant stress) is suppressed, and pressure resistance to air pressure applied from the inner side in the tire radial direction is improved.

Although irregularities are formed on the outer circumferential surface 17S of the tire case 17 in the present embodiment, the second aspect of the invention is not limited to this configuration, and a configuration in which the outer circumferential surface 17S is formed flat may be adopted.

In the tire case 17, a reinforcing cord layer may be formed by covering, with a coating thermoplastic material, the coated cord member that has been wound on the crown portion of the tire case and bonded thereto. In this case, the coating layer can be formed by ejecting the coating thermoplastic material in the melted or softened state onto the reinforcing cord layer 28. The coating layer may be formed without using an extruder, by heating a welding sheet into a melted or softened state, and attaching the welding sheet to the surface (the outer circumferential surface) of the reinforcing cord layer 28.

Although case divided parts (tire case half parts 17A) are bonded to form the tire case 17 in Embodiment 2-2, the second aspect of the invention is not limited to this configuration, and the tire case 17 may be formed as an integrated body using, for example, a mold.

The tire 200 according to Embodiment 2-2 is a so-called tubeless tire in which an air chamber is formed between the tire 200 and the rim 20 by fitting the bead portion 12 to the rim 20. However, the second aspect of the invention is not limited to this configuration, and the tire 200 may have, for example, a complete tube shape.

Although the cushion rubber 29 is interposed between the tire case 17 and the tread 30 in Embodiment 2-2, the second aspect of the invention is not limited to this configuration, and a configuration in which the cushion rubber 29 is not provided may be adopted.

Although a configuration in which the coated cord member 26B is helically wound on the crown portion 16 is adopted in Embodiment 2-2, the second aspect of the invention is not limited to this configuration, and a configuration in which the coated cord member 26B is wound but discontinuous in the width direction may be adopted.

In Embodiment 2-2, a configuration is adopted in which a thermoplastic material is used as the coating resin material 27 that forms the coated cord member 26B, and in which the coating resin material 27 is melted or softened by heating, thereby welding the coated cord member 26B to the outer circumferential surface of the crown portion 16. However, the second aspect of the invention is not limited to this configuration, and a configuration in which the coated cord member 26B is adhered to the outer circumferential surface of the crown portion 16 using an adhesive or the like, without heating the coating resin material 27, may be adopted.

A configuration may be adopted in which the coating resin material 27 that forms the coated cord member 26B is a thermosetting resin, and in which the coated cord member 26B is adhered to the outer circumferential surface of the crown portion 16 using an adhesive or the like, without heating the coated cord member 26B.

A configuration may be adopted in which the coating resin material 27 that forms the coated cord member 26B is a thermosetting resin, and in which the tire case 17 is formed of a thermoplastic resin material. In this case, the coated cord member 26B may be adhered to the outer circumferential surface of the crown portion 16 using an adhesive or the like, or the coated cord member 26B may be welded to the outer circumferential surface of the crown portion 16 by heating a portion of the tire case 17 at which the coated cord member 26B is to be disposed to get into a melted or softened state.

A configuration may be adopted in which the coating resin material 27 that forms the coated cord member 26B is a thermoplastic material, and in which the tire case 17 is formed of a thermoplastic resin material. In this case, the coated cord member 26B may be adhered to the outer circumferential surface of the crown portion 16 using an adhesive or the like, or the coated cord member 26B may be welded to the outer circumferential surface of the crown portion 16 by heating a portion of the tire case 17 at which the coated cord member 26B is to be disposed to get into a melted or softened state as well as heating the coating resin material 27 to get into a melted or softened state. In a case in which both the tire case 17 and the coated cord member 26B are heated to get into a melted or softened state, both materials mix with each other well, thereby increasing the bonding strength. In a case in which each of the resin material that forms the tire case 17 and the coating resin material 27 that forms the coated cord member 26B is a thermoplastic material, the thermoplastic materials thereof are preferably thermoplastic materials of the same kind, and particularly the same thermoplastic material.

The outer circumferential surface 17S of the tire case 17 that has been subjected to the roughening treatment may be subjected to corona treatment, plasma treatment or the like so as to activate the outer circumferential surface 17S and so as to enhance the hydrophilicity, and an adhesive may thereafter be applied thereto.

The sequence employed in the production of the tire 200 is not limited to the sequence specified in Embodiment 2-2, and may be modified, as appropriate.

Although modes for carrying out the second aspect of the invention are described above with reference to embodiments, the embodiments are merely examples, and may be practiced with various modifications within a range that does not depart from the gist of the second aspect. Of course, the protection scope of the second aspect of the invention is not limited to these embodiments.

Although specific modes of the second aspect of the invention are described above with reference to Embodiment 2-1 and Embodiment 2-2, the second aspect of the invention is not limited to the modes described above.

Third Aspect of Invention

Next, a thermoplastic resin material that constitutes a tire frame in the third aspect of the invention will be described first, and specific embodiments of a tire according to the third aspect of the invention will then be described with reference to the drawings.

[Thermoplastic Resin Material]

The tire according to the third aspect of the invention includes an circular tire frame formed of a thermoplastic resin material that includes a polyamide-based thermoplastic elastomer and an acid-modified elastomer obtained by acid-modifying a thermoplastic elastomer other than the polyamide-based thermoplastic elastomer or a mixture of a thermoplastic elastomer other than the polyamide-based thermoplastic elastomer and an acid-modified elastomer obtained by acid-modifying the other elastomer.

As described above, the thermoplastic resin material includes at least 1) a combination of a polyamide-based thermoplastic elastomer and an acid-modified elastomer obtained by acid-modifying a thermoplastic elastomer other than polyamide-based thermoplastic elastomer or 2) a combination of a polyamide-based thermoplastic elastomer, a thermoplastic elastomer other than polyamide-based thermoplastic elastomer, and an acid-modified elastomer obtained by acid-modifying a thermoplastic elastomer other than polyamide-based thermoplastic elastomer.

The polyamide-based thermoplastic elastomer, the thermoplastic elastomer (other thermoplastic elastomer) other than polyamide-based thermoplastic elastomer, and the acid-modified elastomer obtained by acid-modifying the thermoplastic elastomer other than polyamide-based thermoplastic elastomer will be described below.

The "thermoplastic elastomer" and the "polyamide-based thermoplastic elastomer" are the same as in the first aspect of the invention.

The "thermoplastic elastomer other than polyamide-based thermoplastic elastomer" (other thermoplastic elastomer) means a thermoplastic elastomer that does not have an amide bond (—CONH—) in the main chain of a polymer constituting a hard segment among thermoplastic elastomers. The scope of the "thermoplastic elastomer other than polyamide-based thermoplastic elastomer" (other thermoplastic elastomer) does not include the below-described acid-modified elastomer obtained by acid-modifying the other thermoplastic elastomer.

Examples of the other thermoplastic elastomer include a polyolefin-based thermoplastic elastomer and a polystyrene-based thermoplastic elastomer.

The polyolefin-based thermoplastic elastomer refers to an elastomer in which the polymer forming the hard segment is polyolefin, and the polystyrene-based thermoplastic elastomer refer to an elastomer in which the polymer forming the hard segment is polystyrene.

More specifically, examples of the polyolefin-based thermoplastic elastomer (non-modified olefin-based thermoplastic elastomer) include A series, such as TAFMER A1050S and A4050S, manufactured by Mitsui Chemicals Inc.

Examples of the polystyrene-based thermoplastic elastomer (non-modified styrene-based thermoplastic elastomer) include H series, such as TUFTEC H1221 and H1052, manufactured by Asahi Kasei Corporation, and G1641H and G1643N manufactured by Kraton Polymers LLC.

"Acid-modifying a thermoplastic elastomer other than polyamide-based thermoplastic elastomer" means that an unsaturated compound having an acid group such as a carboxylic group, a sulfate group, or a phosphate group is bonded to the other thermoplastic elastomer. For example, in the case of using an unsaturated carboxylic acid (generally maleic anhydride) as the unsaturated compound having an acid group, an unsaturated bond site of an unsaturated carboxylic acid may be bonded to an olefin-based thermoplastic elastomer (by, for example, graft polymerization).

The compound having an acid group is preferably a compound having a carboxylic group which is a weak acid group, from the viewpoint of suppression of deterioration of the polyamide-based thermoplastic elastomer and the thermoplastic elastomer other than polyamide-based thermoplastic elastomer, and examples thereof include acrylic acid, methacrylic acid, itaconic acid, crotonic acid, isocrotonic acid, and maleic acid.

Examples of the acid-modified olefin-based thermoplastic elastomer include TAFMER MA8510, MH7007, MH7010, MH7020, MP0610, MP0620, etc. manufactured by Mitsui Chemicals Inc.

Examples of the acid-modified styrene-based thermoplastic elastomer include TUFTEC products such as M1943, M1911, and M1913 manufactured by Asahi Kasei Corporation, and FG1918lG manufactured by Kraton Polymers LLC.

The other thermoplastic elastomer and the acid-modified elastomer are preferably hydrogenated so as to suppress an undesired cross-linking reaction in the thermoplastic resin material. Examples of the other thermoplastic elastomer and the acid-modified elastomer that are hydrogenated (SEBS) include TUFTEC products manufactured by Asahi Kasei Corporation.

In the third aspect of the invention, the thermoplastic resin material may be any thermoplastic resin material that includes an acid-modified elastomer obtained by acid-modifying the other thermoplastic elastomer, and the acid value of the thermoplastic resin material is greater than 0 mg-$CH_3ONa$/g.

Here, the "acid value of the thermoplastic resin material" refers to the total mass of sodium methoxide ($CH_3ONa$) necessary for neutralization of the acid-modified sites of the acid-modified elastomer relative to the total mass of the thermoplastic resin material, and is calculated from Expression (1) when only one acid-modified elastomer is included in the thermoplastic resin material, and is calculated from Expression (2) when two or more acid-modified elastomers are included in the thermoplastic resin material.

$$[(\text{acid value of acid-modified elastomer A}) \times (\text{total mass of acid-modified elastomer A})]/[\text{total mass of thermoplastic resin material}] \quad \text{Expression (1)}$$

$$[(\text{acid value of acid-modified elastomer A}) \times (\text{total mass of acid-modified elastomer A}) + (\text{acid value of acid-modified elastomer B}) \times (\text{total mass of acid-modified elastomer B}) + \ldots ]/[\text{total mass of thermoplastic resin material}] \quad \text{Expression (2)}$$

The acid value of acid-modified elastomer A in Expression (1) and the acid values of acid-modified elastomers A, B, . . . in Expression (2) are each measured as the mass [mg] of sodium methoxide ($CH_3ONa$) consumed in neutralizing titration using sodium methoxide ($CH_3ONa$) with respect to 1 [g] of each acid-modified elastomer.

In the description below, the unit of the acid value of each acid-modified elastomer is also expressed as [mg($CH_3ONa$)/g].

From the viewpoint of injection moldability of the thermoplastic resin material, the acid value of the thermoplastic resin material is preferably equal to or greater than 0.1 mg-$CH_3ONa$/g but less than 2.2 mg-$CH_3ONa$/g, more preferably from 0.1 mg-$CH_3ONa$/g to 2.0 mg-$CH_3ONa$/g, and still more preferably from 0.1 mg-$CH_3ONa$/g to 1.5 mg-$CH_3ONa$/g.

The acid value of the thermoplastic resin material may be controlled by controlling the acid value of the acid-modified elastomer, or by controlling the mixing ratio of the other thermoplastic elastomer and the acid-modified elastomer contained in the thermoplastic resin material.

The thermoplastic resin material has a sea-island structure including a sea phase which is a matrix phase formed of the polyamide-based thermoplastic elastomer and an island phase which is a disperse phase formed of the acid-modified elastomer and the other (unmodified) thermoplastic elastomer. In a case in which the interaction at the phase interface between the sea phase and the island phase is weak, the fluidity of the thermoplastic resin material increases, and excellent injection moldability is exhibited. Since the acid-modified elastomer has an acid-modified site in a molecule, its interaction with the polyamide-based thermoplastic elastomer is stronger as compared with an elastomer that is not acid-modified.

In the sea-island structure, there is a tendency that an increase in the acid value decreases the island phase while a decrease in the acid value enlarges the island phase. An acid value of the acid-modified elastomer within the range described above causes the island phase to be finely dispersed in the thermoplastic resin, thereby remarkably improving the impact resistance of the thermoplastic resin material; further, the melt viscosity of the thermoplastic resin material does not increase excessively, and the injection moldability of the thermoplastic resin material is excellent. Therefore, in the case of forming a tire case using the thermoplastic resin material, the thermoplastic resin needs not be heated to high temperatures, and, therefore, damage to the thermoplastic resin material caused by excessive heating can be reduced.

The island phase of the acid-modified elastomer being finely dispersed in the thermoplastic resin can be confirmed by photographic observation using a SEM (Scanning Electron Microscope).

The acid value of the acid-modified elastomer is preferably higher than 0 mg($CH_3ONa$)/g but equal to or less than 20 mg($CH_3ONa$)/g, more preferably higher than 0 mg($CH_3ONa$)/g but equal to or less than 17 mg($CH_3ONa$)/g, and still more preferably higher than 0 mg($CH_3ONa$)/g but equal to or less than 15 mg($CH_3ONa$)/g.

Regarding the acid value of the acid-modified elastomer, in a case in which one acid-modified elastomer is contained in the thermoplastic resin material, the acid value of the acid-modified elastomer is preferably in the range described above; in a case in which two or more acid-modified elastomers are contained in the thermoplastic resin material, the acid value of each acid-modified elastomer is preferably in the range described above.

The ratio (the mass of the polyamide-based thermoplastic elastomer:the total mass of the other thermoplastic elastomer and the acid-modified elastomer) of the mass of the polyamide-based thermoplastic elastomer and the total mass of the other thermoplastic elastomer and the acid-modified elastomer in the thermoplastic resin material is preferably from 95:5 to 55:45, from the viewpoint of allowing the polyamide-based thermoplastic elastomer to form the sea phase. The ratio is more preferably 90:10 to 60:40.

The content of the polyamide-based thermoplastic elastomer in the thermoplastic resin material in the third aspect of the invention is not particularly limited, but is preferably 55 mass % to 95 mass % and more preferably 60 mass % to 90 mass %, with respect to the total mass of the thermoplastic resin material. When the content of the polyamide-based thermoplastic elastomer is 55 mass % to 95 mass % with respect to the total mass of the thermoplastic resin material, the characteristics of the thermoplastic resin material can sufficiently be exerted, and the tensile modulus of elasticity and the fracture properties of the tire can be improved.

The thermoplastic resin material may contain, if desired, various fillers (such as silica, calcium carbonate, and clay) and various additives such as an anti-aging agent, oils, plasticizers, colorants, weather-resistant agents, and reinforcing agents.

The thermoplastic resin material can be obtained by compounding the polyamide-based thermoplastic elastomer and the acid-modified elastomer (and, further, the other thermoplastic elastomer in a case in which the thermoplastic resin material contains the other thermoplastic elastomer), adding, if necessary, various additives, and carrying out melt-mixing. The mixing ratio of the polyamide-based thermoplastic elastomer, the acid-modified elastomer, and the other thermoplastic elastomer may be the ratio as described above. The resin obtained by melt- and mixing may be used after shaped into a pellet, if necessary.

In the third aspect of the invention, the tensile modulus of elasticity as defined in JIS K7113:1995 of the thermoplastic resin material is preferably 100 MPa to 1000 MPa, more preferably 100 MPa to 800 MPa, and particularly preferably 100 MPa to 700 MPa. When the tensile modulus of elasticity of the thermoplastic resin material is 100 MPa to 1000 MPa, fitting to a rim can be efficiently carried out while maintaining the shape of the tire frame.

In the third aspect of the invention, the tensile strength at yield as defined in JIS K7113:1995 of the thermoplastic resin material is preferably equal to or greater than 5 MPa, more preferably 5 MPa to 20 MPa, and still more preferably 5 MPa to 17 MPa. When the tensile strength at yield of the thermoplastic resin material is equal to or greater than 5 MPa, deformation due to a load applied to the tire at the time of traveling or the like can be tolerated.

In the third aspect of the invention, the tensile elongation at yield as defined in JIS K7113:1995 of the thermoplastic resin material is preferably equal to or higher than 10%, more preferably 10% to 70%, and still more preferably 15% to 60%. When the tensile elongation at yield of the thermoplastic resin material is equal to or higher than 10%, the elastic region is large, and fittability to a rim can be improved.

In the third aspect of the invention, the tensile elongation at break as defined in JIS K7113:1995 of the thermoplastic resin material is preferably equal to or higher than 50%, more preferably equal to or higher than 100%, still more preferably equal to or higher than 150%, and particularly preferably equal to or higher than 200%. When the tensile elongation at break of the thermoplastic resin material is equal to or higher than 50%, fittability to a rim is excellent, and resistance to break at collision can be enhanced.

In the third aspect of the invention, the deflection temperature under load (under a load of 0.45 MPa) as defined in ISO 75-2 or ASTM D648 of the thermoplastic resin material is preferably equal to or higher than 50° C., more preferably 50° C. to 150° C., and still more preferably 50° C. to 130° C. When the deflection temperature under load of the thermoplastic resin material is equal to or higher than 50° C., deformation can be suppressed during a step of vulcanizing a tread or the like.

[Resin Material as Component of Reinforcing Cord Layer]

The tire according to the third aspect of the invention may have a reinforcing cord member which is wound on the outer circumference of the tire frame in the circumferential direction to form a reinforcing cord layer.

The reinforcing cord layer may be configured to include a resin material. When a resin material is included in the reinforcing cord layer as described above, a difference in hardness between the tire and the reinforcing cord layer can be decreased, and, therefore, the reinforcing cord member can be more tightly adhered and fixed to the tire frame, compared with a case in which the reinforcing cord member is fixed using a cushion rubber. The concept of "resin material", such as that described above, encompasses thermoplastic resins (including thermoplastic elastomers) as well as thermosetting resins, but does not encompass vulcanized rubbers.

In a case in which the reinforcing cord member is a steel cord, and in which an attempt is made to separate the reinforcing cord member from the cushion rubber at the time of disposal of the tire, vulcanized rubbers are difficult to separate from the reinforcing cord member only by heating; in contrast, resin materials can be separated from the reinforcing cord member only by heating, which is advantageous in terms of recyclability of the tire. Resin materials usually have a loss factor (tan δ) lower than that of vulcanized rubbers. Accordingly, when the reinforcing cord layer contains a large amount of resin material, the rolling properties of the tire can be enhanced. Resin materials, having a higher elastic modulus relative to vulcanized rubbers, are advantageous in that the resin materials have high in-plane shear stiffness, and also provide excellent steering stability and excellent abrasion resistance at the time of traveling with the tire.

Examples of the thermosetting resin which may be used in the reinforcing cord layer include phenol resins, urea resins, melamine resins, epoxy resins, polyamide resins, polyester resins, etc.

Examples of the thermoplastic resin include urethane resins, olefin resins, vinyl chloride resins, polyamide resins, and polyester resins.

The thermoplastic elastomer and the elastic modulus (the tensile modulus of elasticity as defined in JIS K7113) of the resin material used in the reinforcing cord layer are the same as those described in [Resin Material as Component of Reinforcing Cord Layer] in the first aspect of the invention.

Embodiment 3-1

A tire according to Embodiment 3-1 of the tire according to the third aspect of the invention will be described below with reference to the accompanying drawings.

The tire according to Embodiment 3-1 is the same as the tire according to Embodiment 1-1 described above, except for the points discussed below. Therefore, the same or corresponding drawings and members will be described using the same reference characters and figures.

The tire case 17 according to the present embodiment is formed of a thermoplastic resin material constituted by a mixed material of a polyamide-based thermoplastic elastomer (UBESTA XPA9055X1 manufactured by Ube Industries, Ltd.) and an α-olefin-based thermoplastic elastomer (TAFMER MH7010 manufactured by Mitsui Chemicals Inc.), the thermoplastic resin material having an acid value of 1.11 mg-$CH_3ONa$/g.

The thermoplastic resin material according to the present embodiment includes a polyamide-based thermoplastic elastomer and an acid-modified elastomer obtained by acid-modifying a thermoplastic elastomer other than polyamide-based thermoplastic elastomer. In particular, an acid value of the thermoplastic resin material of equal to or greater than 0.1 mg-$CH_3ONa$/g but less than 2.2 mg-$CH_3ONa$/g results in excellent fluidity of the thermoplastic resin material, provides a melt viscosity that is not excessively high, and therefore provides excellent injection moldability.

The tire case 17 is not limited to a tire case formed by bonding two members, and may be formed by bonding three or more members. The other details are the same as those of the tire according to Embodiment 1-1, and the production method therefor is also the same.

(Effects)

The tire 10 according to the present embodiment, since the tire case 17 is formed of the thermoplastic resin material, the tire case 17 has excellent tensile modulus of elasticity and excellent fracture properties, and, since the structure thereof can be simplified, the tire case 17 has a smaller weight than conventional rubbers. Therefore, the application of the tire 10 according to the present embodiment to a vehicle enables a decrease in the weight of the vehicle, and reduces fuel consumption.

In particular, when the acid value of the thermoplastic resin material used to form the tire case 17 is equal to or greater than 0.1 mg-$CH_3ONa$/g but less than 2.2 mg-$CH_3ONa$/g. the thermoplastic resin material has a sea-island structure in which the polyamide-based thermoplastic elastomer serves as a sea phase, and in which the acid-modified elastomer, or the acid-modified elastomer and the other (unmodified) thermoplastic elastomer serves as an island phase, and in which the island phase is finely dispersed in the thermoplastic resin material; therefore, the impact resistance, tensile elasticity, and fracture properties of the tire 10 are improved.

The polyamide-based thermoplastic elastomer which is a constituent component of the thermoplastic resin material has high adhesiveness to the reinforcing cord 26, and has excellent fixing performance such as welding strength. Therefore, a phenomenon (incorporation of air) in which air remains around the reinforcing cord 26 can be suppressed in the reinforcing cord winding step. The high adhesiveness and weldability to the reinforcing cord 28 and suppression of incorporation of air into a region around the reinforcing cord member effectively suppresses movement of the reinforcing cord 26 at the time a force is applied during traveling. Accordingly, for example, even in a case in which tire component members are disposed on the outer circumference of the tire frame so as to cover the entire reinforcing cord member, the movement of the reinforcing cord member is suppressed, whereby separation between the members (including the tire frame), for example, is suppressed, and the durability of the tire 10 is improved.

In the tire 10 according to the present embodiment, since the reinforcing cord 26 having rigidity higher than that of the thermoplastic resin material is helically wound on the outer circumferential surface of the crown portion 16 of the tire case 17 formed of a thermoplastic resin material in the circumferential direction, puncture resistance, cutting resistance, and rigidity in the circumferential direction of the tire 10 are improved. The improved rigidity in the circumferential direction of the tire 10 prevents creeping of the tire case 17 formed of a thermoplastic resin material.

In a cross-sectional view taken along the axial direction of the tire case 17 (the cross-section shown in FIG. 1), at least a part of the reinforcing cord 26 is embedded in the outer circumferential surface of the crown portion 16 of the tire case 17 formed of the thermoplastic resin material, and is in close contact with the thermoplastic resin material, as a result of which incorporation of air during production is suppressed, and movement of the reinforcing cord 26 due to, for example, a force applied at the time of traveling is suppressed. Accordingly, separation between of the reinforcing cord 26, the tire case 17, and the tread 30 is suppressed, and the durability of the tire 10 is improved.

As shown in FIG. 2, since the depth L of embedding of the reinforcing cord 26 is set to be equal to or greater than ⅕ of the diameter D thereof, it incorporation of air during production is effectively suppressed, and movement of the reinforcing cord 26 due to a force applied thereto at the time of traveling is further suppressed.

In a case in which the reinforcing cord layer 28 is configured to include the thermoplastic resin material as described above, the reinforcing cord 26 can be made to more tightly contact the tire case 17 and fixed to the tire case 17 since the difference in hardness between the tire case 17 and the reinforcing cord layer 28 can be made smaller than that in a case in which the reinforcing cord 26 is fixed using a cushion rubber. Accordingly, the incorporation of air mentioned above can effectively be prevented, and the movement of the reinforcing cord member at the time of traveling can effectively be suppressed. In a case in which the reinforcing cord 26 is a steel cord, the reinforcing cord 26 can easily be separated from the thermoplastic resin material by heating and recovered at the time of disposing of the tire, and, therefore, there is an advantage from the viewpoint of recyclability of the tire 10. Further, the resin material usually has a lower loss factor (tan δ) compared with vulcanized rubbers, inclusion of a large amount of resin material in the reinforcing cord layer makes it possible to enhance the rolling properties of the tire. Resin materials, having a higher elastic modulus relative to vulcanized rubbers, are advantageous in that the resin materials have high in-plane shear stiffness, and also provide excellent steering stability and excellent abrasion resistance at the time of traveling with the tire.

Since the tread 30 that contacts a road surface is formed of a rubber material having higher abrasion resistance than that of the thermoplastic resin material, the abrasion resistance of the tire 10 is improved.

Since the annular bead core 18 formed of a metal material is embedded in the bead portion 12, the tire case 17 is strongly fixed to the rim 20, i.e., the tire 10 is strongly fixed to the rim 20, similarly to conventional rubber pneumatic tires.

Since the sealing layer 24 formed of a rubber material having higher sealing ability than the thermoplastic resin material is disposed in a region of the bead portion 12 that contacts the rim 20, sealing between the tire 10 and the rim 20 is improved. Therefore, compared with a case in which sealing is carried out with the rim 20 and the thermoplastic resin material, air leakage from the tire is further suppressed. Further, provision of the sealing layer 24 also improves fittability to the rim.

Although a configuration in which the reinforcing cord 26 is heated such that the thermoplastic resin material in a portion that contacts the heated reinforcing cord 26 is melted or softened is adopted in the embodiment described above, the third aspect of the invention is not limited to this configuration; a hot air generating device may be used, instead of heating the reinforcing cord 26, to heat the outer circumferential surface of the crown portion 16 in which the reinforcing cord 26 is to be embedded, and the reinforcing cord 26 may thereafter be embedded in the crown portion 16.

Although the heat source of the cord heating device 59 includes the heater and the fan in Embodiment 3-1, the third aspect of the invention is not limited to this configuration, and a configuration in which the reinforcing cord 26 is directly heated by radiation heat (for example, infrared rays) may be adopted.

Although a configuration in which a region at which the thermoplastic resin material with the reinforcing cord 26 embedded therein is melted or softened is forcibly cooled with the second roller 64 formed of metal is adopted in Embodiment 3-1, the third aspect of the invention is not limited to this configuration; a configuration in which cold air is directly applied to the region at which the thermoplastic resin material is melted or softened, to forcibly cool and solidify the region at which the thermoplastic resin material is melted or softened may also be adopted.

Although a configuration in which the reinforcing cord 26 is heated is adopted in Embodiment 3-1, a configuration in which the outer circumference of the reinforcing cord 26 is coated with the same thermoplastic resin material as the tire case 17, for example, may be adopted. In this case, by heating the coated thermoplastic resin material along with the reinforcing cord 26 when the coated reinforcing cord is wound on the crown portion 16 of the tire case 17, incorporation of air can effectively be suppressed at the time of embedding the reinforcing cord in the crown portion 16.

Helically winding the reinforcing cord 26 is easy from the viewpoint of production. However, a method in which the reinforcing cord 26 is discontinuous in the width direction, for example, may also be contemplated.

The tire 10 according to Embodiment 3-1 is a so-called tubeless tire in which an air chamber is formed between the tire 10 and the rim 20 by fitting the bead portion 12 to the rim 20. However, the third aspect of the invention is not limited to this configuration, and a complete tube shape may be adopted.

The complete tube-shaped tire may have a configuration in which, for example, three tire frames each having an annular shape are arranged in the tire width direction, as shown in FIG. 4. FIG. 4 is a cross-sectional view of a tire according to another embodiment. As shown in FIG. 4, a tire 86 includes a tread rubber layer 87, annular hollow tubes (tire frames) 88 formed of the same resin material as described in Embodiment 3-1, a belt (reinforcing cord) 89, and a rim 90. Three tubes 88 are arranged in the tire width direction of the tire 86. The tread rubber layer 87 in which the belt 89 is embedded is bonded to the outer circumferential portions of the tubes 88. The tubes 88 are fitted to the rim 90 having recess portions that engage with the tubes 88. The tire 86 is not provided with a bead core.

Although modes for carrying out the third aspect of the invention are described above with reference to embodiments, the embodiments are merely examples, and may be practiced with various modifications within a range that does not depart from the gist of the third aspect. Of course, the protection scope of the third aspect of the invention is not limited to these embodiments.

Embodiment 3-2

A method for producing a tire according to the third aspect of the invention, and a tire according to Embodiment 3-2 will be described below with reference to the drawings. Similarly to Embodiment 3-1, the tire according to the present embodiment has substantially the same cross-sectional shape as those of conventional general rubber pneumatic tires.

The tire according to Embodiment 3-2 is the same as the tire according to Embodiment 1-2 described above, except for the points discussed below. Therefore, the same or corresponding drawings and members will be described using the same reference characters and figures.

Similarly to Embodiment 3-1, the tire case 17 according to Embodiment 3-2 is formed of a mixed material of a polyamide-based thermoplastic elastomer (UBESTA XPA9055X1 manufactured by Ube Industries, Ltd.) and an α-olefin-based thermoplastic elastomer (TAFMER MH7010" manufactured by Mitsui Chemicals Inc.), the thermoplastic resin material having an acid value of 1.11 mg-$CH_3ONa/g$. The other details are the same as those of the tire according to Embodiment 1-2, and the production method therefor is also the same.

In the present embodiment, the same material (the mixed material (which is a thermoplastic resin material having an acid value of 1.11 mg-$CH_3ONa/g$) of UBESTA XPA9055X1 manufactured by Ube Industries, Ltd. and TAFMER MH7010 manufactured by Mitsui Chemicals Inc.) is used as a coating resin material 27 in the present embodiment.

(Effects)

The tire 200 according to the present embodiment has excellent heat resistance, excellent tensile modulus of elasticity, excellent tensile strength, and excellent fracture strain since the tire case 17 is formed of the thermoplastic resin material. In addition, since the structure thereof can be simplified, the weight thereof is smaller than those of conventional rubber tires. Therefore, the tire 200 according to the present embodiment has high abrasion resistance and high durability.

In a case in which the reinforcing cord layer 28 is configured to include the coated cord member 26B, the coated cord member 26B can be made to more tightly contact the tire case 17 and fixed to the tire case 17 since the difference in hardness between the tire case 17 and the reinforcing cord layer 28 can be made smaller than that in a case in which the reinforcing cord 26A is fixed using only the cushion rubber 29. Accordingly, the incorporation of air mentioned above can effectively be prevented, and the movement of the reinforcing cord member at the time of traveling can effectively be suppressed. In a case in which the reinforcing cord is a steel cord, the cord member 26A can easily be separated and from the coated cord member 26B by heating and recovered at the time of disposing of the tire, and, therefore, there is an advantage from the viewpoint of recyclability of the tire 200. Since resin materials usually have a lower loss factor (tan δ) than that of vulcanized rubbers, inclusion of a large amount of resin material in the reinforcing cord layer makes it possible to enhance the rolling properties of the tire. Resin materials, having a higher elastic modulus relative to vulcanized rubbers, are advantageous in that the resin materials have high in-plane shear stiffness, and also provide excellent steering stability and abrasion resistance at the time of traveling with the tire.

In the method for producing a tire according to the present embodiment, when the tire case 17, the cushion rubber 29, and the tread rubber 30A are integrated, the bonding properties (adhesion properties) is improved by the anchor effect since the outer circumferential surface 17S of the tire case 17 has been subjected to the roughening treatment. Further, since the resin material forming the tire case 17 is ploughed due to collision of the blasting abrasive, the wettability of the adhesive is improved. Therefore, the bonding agent is retained, in a uniformly applied state, on the outer circumferential surface 17S of the tire case 17, whereby the bonding strength between the tire case 17 and the cushion rubber 29 can be ensured.

In particular, even in a case in which irregularities are formed on the outer circumferential surface 17S of the tire case 17, a portion surrounding a recess (walls at the recess, the bottom of the recess) is roughened by allowing the blasting abrasive to collide with the portions surrounding the recess (the gap 28A), whereby the bonding strength between the tire case 17 and the cushion rubber 29 can be enhanced.

Since the cushion rubber 29 is superposed on the roughened area of the outer circumferential surface 17S of the tire case 17, the bonding strength between the tire case 17 and the cushion rubber can effectively be ensured.

In the case of vulcanization of the cushion rubber 29 in the vulcanization step, the cushion rubber 29 flows into the roughening irregularities that have been formed on the outer circumferential surface 17S of the tire case 17 through the roughening treatment. Once the vulcanization is completed, an anchor effect is exerted by the cushion rubber 29 that has flowed into the roughening irregularities, and the bonding strength between the tire case 17 and the cushion rubber 29 is enhanced.

In the tire 200 produced by the method for producing a tire, the bonding strength between the tire case 17 and the cushion rubber 29 is ensured. That is, the bonding strength between the tire case 17 and the tread 30 is ensured due to the presence of the cushion rubber 29. Therefore, separation between the outer circumferential surface 17S of the tire case 17 and the cushion rubber 29 in the tire 200 is suppressed at the time of, for example, traveling.

Since the outer circumferential portion of the tire case 17 is formed of the reinforcing cord layer 28, puncture resistance and cutting resistance are improved, compared with a case in which the outer circumferential portion is formed of a member other than the reinforcing cord layer 28.

Since the coated cord member 26B is wound to form the reinforcing cord layer 28, the rigidity in the circumferential direction of the tire 200 is improved. Since the rigidity in the circumferential direction is improved, creeping of the tire case 17 (a phenomenon in which the plastic deformation of the tire case 17 increases with lapse of time under a constant stress) is suppressed, and pressure resistance to air pressure applied from the inner side in the tire radial direction is improved.

Although irregularities are formed on the outer circumferential surface 17S of the tire case 17 in the present embodiment, the third aspect of the invention is not limited to this configuration, and a configuration in which the outer circumferential surface 17S is formed flat may be adopted.

In the tire case 17, a reinforcing cord layer may be formed by covering, with a coating thermoplastic material, the coated cord member that has been wound on the crown portion of the tire case and bonded thereto. In this case, the coating layer can be formed by ejecting the coating thermoplastic material in the melted or softened state onto the reinforcing cord layer 28. The coating layer may be formed without using an extruder, by heating a welding sheet into a melted or softened state, and attaching the welding sheet to the surface (the outer circumferential surface) of the reinforcing cord layer 28.

Although case divided parts 17A are bonded to form the tire case 17 in Embodiment 3-2, the third aspect of the invention is not limited to this configuration, and the tire case 17 may be formed as an integrated body using, for example, a mold.

The tire 200 according to Embodiment 3-2 is a so-called tubeless tire in which an air chamber is formed between the tire 200 and the rim 20 by fitting the bead portion 12 to the rim 20. However, the third aspect of the invention is not limited to this configuration, and the tire 200 may have, for example, a complete tube shape (for example, the shape shown in FIG. 4).

Although the cushion rubber 29 is interposed between the tire case 17 and the tread 30 in Embodiment 3-2, the third aspect of the invention is not limited to this configuration, and a configuration in which the cushion rubber 29 is not provided may be adopted.

Although a configuration in which the coated cord member 26B is helically wound on the crown portion 16 is adopted in Embodiment 3-2, the third aspect of the invention is not limited to this configuration, and a configuration in which the coated cord member 26B is wound but discontinuous in the width direction may be adopted.

In Embodiment 3-2, a configuration is adopted in which a thermoplastic material is used as the coating resin material 27 that forms the coated cord member 26B, and in which the coating resin material 27 is melted or softened by heating, thereby welding the coated cord member 26B to the outer circumferential surface of the crown portion 16. However, the third aspect of the invention is not limited to this configuration, and a configuration in which the coated cord member 26B is adhered to the outer circumferential surface of the crown portion 16 using an adhesive or the like, without heating the coating resin material 27, may be adopted.

A configuration may be adopted in which the coating resin material 27 forming the coated cord member 26B is a thermosetting resin, and in which the coated cord member 26B is adhered to the outer circumferential surface of the crown portion 16 using an adhesive or the like, without heating the coated cord member 26B.

A configuration may be adopted in which the coating resin material 27 that forms the coated cord member 26B is a thermosetting resin, and in which the tire case 17 is formed of a thermoplastic resin material. In this case, the coated cord member 26B may be adhered to the outer circumferential surface of the crown portion 16 using an adhesive or the like, or the coated cord member 26B may be welded to the outer circumferential surface of the crown portion 16 by heating a portion of the tire case 17 at which the coated cord member 26B is to be disposed to get into a melted or softened state.

A configuration may be adopted in which the coating resin material 27 that forms the coated cord member 26B is a thermoplastic material, and in which the tire case 17 is formed of a thermoplastic resin material. In this case, the coated cord member 26B may be adhered to the outer circumferential surface of the crown portion 16 using an adhesive or the like, or the coated cord member 26B may be welded to the outer circumferential surface of the crown portion 16 by heating a portion of the tire case 17 at which the coated cord member 26B is to be disposed to get into a melted or softened state as well as heating the coating resin material 27 to get into a melted or softened state.

In a case in which both the tire case 17 and the coated cord member 26B are heated to get into a melted or softened state, both materials mix with each other well, thereby increasing the bonding strength. In a case in which each of the resin material that forms the tire case 17 and the coating resin material 27 that forms the coated cord member 26B is a thermoplastic resin material, the thermoplastic materials thereof are preferably thermoplastic materials of the same kind, and particularly preferably the same thermoplastic material.

The outer circumferential surface 17S of the tire case 17 that has been subjected to the roughening treatment may be subjected to corona treatment, plasma treatment or the like so as to activate the outer circumferential surface 17S and so as to enhance the hydrophilicity, and an adhesive may thereafter be applied thereto.

The sequence employed in the production of the tire 200 is not limited to the sequence described in Embodiment 3-2, and may be modified, as appropriate.

Although modes for carrying out the third aspect of the invention are described above with reference to embodiments, the embodiments are merely examples, and may be practiced with various modifications within a range that does not depart from the gist of the third aspect. Of course, the protection scope of the third aspect of the invention is not limited to these embodiments.

Although specific modes of the third aspect of the invention are described above with reference to Embodiment 3-1 and Embodiment 3-2, the third aspect of the invention is not limited to the modes described above.

Fourth Aspect of the Invention

A tire of the fourth aspect of the invention includes a circular tire frame formed of a thermoplastic resin material, and the thermoplastic resin material includes a thermoplastic elastomer including a hard segment and a soft segment in a molecule thereof, and specific needle-shaped crystal grains.

Due to the above described configuration, the tire of the fourth aspect of the invention exhibits high elastic modulus and small rolling resistance.

Here, the "elastic modulus" means a tensile modulus of elasticity defined in JIS K7113:1995, as long as it is not specified differently.

The rolling resistance of the tire of the fourth aspect of the invention can be expressed using tan δ, which is exhibited by the thermoplastic resin material forming the tire, as an index. The loss factor (tan δ) of the thermoplastic resin material is considered to correspond to the magnitude of strain generated in the thermoplastic resin material when a stress is applied to the thermoplastic resin material. Therefore, the larger tan δ of the thermoplastic resin material forming the tire frame means that stain can be more easily generated in the tire when a stress is applied to the tire due to friction between the tire and a road surface at the time of traveling of a vehicle. As the tire generates larger strain, the rolling resistance of the tire becomes larger.

In this description, the "loss factor (tan δ)" is a value calculated by a ratio (G"/G') between the storage shear elastic modulus (G') and the loss shear elastic modulus (G") at 30° C., 20 Hz, and 1% of shearing strain, and is a value representing a degree to which a material absorbs energy (converts into heat) when the material is deformed (hereinafter, also referred to as "tan δ"). Since the larger tan δ causes absorption of more energy, the rolling resistance of the tire increases and consequently serves as a reason of degradation in fuel efficiency of the tire. The tan δ of the thermoplastic elastomer can be measured by the use of a dynamic viscoelasticity measuring apparatus (Dynamic-Mechanical Analysis: DMA).

The tire frame or the like which is a constituent element of the tire of the fourth aspect of the invention, will be described below and then specific embodiments of the tire of the fourth aspect of the invention, will be then described with reference to the accompanying drawings.

[Tire Frame]

The tire frame in the fourth aspect of the invention is formed of a thermoplastic resin material including a thermoplastic elastomer including a hard segment and a soft segment in a molecule, and specific needle-shaped crystal grains.

(Thermoplastic Resin Material)

The thermoplastic resin material in the fourth aspect of the invention includes at least the thermoplastic elastomer and specific needle-shaped crystal grains and may include other components optionally.

Here, the "thermoplastic resin material" in the fourth aspect of the invention means a material including at least a thermoplastic elastomer and specific needle-shaped crystal grains, and a material including other components in addition to these components also belongs to the thermoplastic resin material.

The "thermoplastic elastomer" in the fourth aspect of the invention means a thermoplastic resin formed of a copolymer having a polymer constituting a crystalline hard segment with a high melting point or a hard segment with a high cohesive force and a polymer constituting a non-crystalline soft segment with a low glass transition temperature in a molecule thereof.

The "thermoplastic resin" in the fourth aspect of the invention does not encompass a vulcanized rubber such as conventional natural rubber, synthetic rubber, or the like.

In general, a thermoplastic elastomer having a high elastic modulus has often a high loss factor (tan δ) and it is thus difficult to form a tire frame with high elasticity and small tan δ.

By forming the tire frame of the tire of the invention according to the fourth aspect with the thermoplastic resin material including the thermoplastic elastomer, and needle-shaped crystal grains, it is possible to achieve high elastic modulus while keeping tan δ low. Accordingly, it is possible to provide a tire with small rolling resistance and with a high elastic modulus.

<Needle-Shaped Crystal Grains with Fiber Length of 1 μm to 500 μm and with Fiber Diameter of 0.01 μm to 10.0 μm>

The thermoplastic resin material in the fourth aspect of the invention includes needle-shaped crystal grains (specific needle-shaped crystal grains) with a fiber length of 1 μm to 500 μm and which a fiber diameter of 0.01 μm to 10.0 μm, as well as a thermoplastic elastomer.

The average fiber length (L) of the specific needle-shaped crystal grains is from 1 μm to 500 μm, preferably from 5 μm to 100 μm, and more preferably from 10 μm to 30 μm.

The average fiber diameter (D) of the specific needle-shaped crystal grains is from 0.01 μm to 10.0 μm, preferably from 0.1 μm to 5 μm, and more preferably from 0.5 μm to 1.0 μm.

The aspect ratio (L/D) of the specific needle-shaped crystal grains is from 1 to 50000, preferably from 10 to 1000, and more preferably from 20 to 500.

The average fiber length (L) and the average fiber diameter (D) of the specific needle-shaped crystal grains are values statistically obtained from electron microscope images of sampled particles.

The aspect ratio (L/D) of the specific needle-shaped crystal grains is calculated by dividing the average fiber length (L) by the average fiber diameter (D).

A reinforcing material such as carbon black widely used in the related art as a reinforcing material such as a rubber forming the tire frame enhances the elastic modulus of the tire frame, but also raises tan δ when a stress is applied to the tire. On the contrary, the specific needle-shaped crystal grains in the fourth aspect of the invention can suppress the increase of tan δ while enhancing the elastic modulus of the tire frame.

The specific needle-shaped crystal grains in the fourth aspect of the invention may be organic particles or inorganic particles, but preferably inorganic particles from the viewpoint of enhancement of the elastic modulus. The specific needle-shaped crystal grains which are inorganic particles include needle-shaped monocrystalline particles known as whiskers.

Examples of organic particles which can be used as the specific needle-shaped crystal grains include organic particles containing a polysaccharide material such as cellulose or a lipid material such as triacyl glycerol.

It is preferable that inorganic particles which can be used as the specific needle-shaped crystal grains be selected from metal oxide, metal nitride, metal carbonate, metal silicate, metal titanate, metal sulfate, or metal borate.

Examples of the metal oxide which can be used as the specific needle-shaped crystal grains include silica, alumina, titanium oxide, zinc oxide, magnesium oxide, manganese oxide, lithium oxide, zirconia oxide, and tin oxide.

Examples of the metal nitride which can be used as the specific needle-shaped crystal grains include potassium nitride, sodium nitride, gallium nitride, titanium nitride, and lithium nitride.

Examples of the metal carbonate which can be used as the specific needle-shaped crystal grains include calcium carbonate, magnesium carbonate, lithium carbonate, potassium carbonate, strontium carbonate, and barium carbonate.

Examples of the metal silicate which can be used as the specific needle-shaped crystal grains include calcium silicate, potassium silicate, magnesium silicate, and aluminum silicate.

Examples of the metal titanate which can be used as the specific needle-shaped crystal grains include potassium titanate, sodium titanate, and barium titanate.

Examples of the metal sulfate which can be used as the specific needle-shaped crystal grains include sodium sulfate, calcium sulfate, potassium sulfate, magnesium sulfate, and zinc sulfate.

Examples of the metal borate which can be used as the specific needle-shaped crystal grains include sodium borate, calcium borate, magnesium borate, and aluminum borate.

Among these inorganic particles, inorganic particles selected from metal sulfate, metal borate, or metal titanate can be preferably used from the viewpoint of enhancement in elastic modulus and maintenance of low tan δ, and inorganic particles of metal sulfate can be more preferably used.

A preferable example of the metal sulfate which can be used as the specific needle-shaped crystal grains is magnesium sulfate, and needle-shaped crystal grains of magnesium sulfate expressed by $MgSO_4 \cdot 5Mg(OH)_2 \cdot 3H_2O$ can be used. When large shearing energy is applied thereto by kneading at the time of preparing the thermoplastic resin material forming the tire frame, the needle-shaped crystal grains of magnesium sulfate are decomposed into finer crystal grains and finely and uniformly dispersed in a thermoplastic resin material, whereby it is possible to further enhance the elastic modulus and to maintain low tan δ.

A commercially-available products may be used as the specific needle-shaped crystal grains which are inorganic particles, and examples thereof include "MOS-HIGE" manufactured by Ube Material Industries Ltd., "WHISTATT" manufactured by Otsuka Chemical Co., Ltd., and "AROREX" manufactured by Shikoku Chemicals Corporation.

The specific needle-shaped crystal grains contained in the thermoplastic resin material may be of one kind or of two or more kinds.

The content of the specific needle-shaped crystal grains with respect to the total mass of the thermoplastic resin material is preferably from 0.1 to 10 mass %, more preferably from 0.1 to 5 mass %, and still more preferably from 0.1 to 1 mass %.

<Thermoplastic Elastomer>

The thermoplastic resin material in the fourth aspect of the invention includes a thermoplastic elastomer.

Examples of the thermoplastic elastomer which can be used in the fourth aspect of the invention include a polyamide-based thermoplastic elastomer (TPA), a polyester-based thermoplastic elastomer (TPC), a polyolefin-based thermoplastic elastomer (TPO), a polystyrene-based thermoplastic elastomer (TPS), a polyurethane-based thermoplastic elastomer (TPU), a thermoplastic cross-linked rubber (TPV), and other thermoplastic elastomers (TPZ), which are defined in JIS K6418:2007.

—Polyamide-Based Thermoplastic Elastomer—

Here, as the "polyamide-based thermoplastic elastomer", the same polyamide-based thermoplastic elastomer as described in the first aspect of the invention, may be used.

—Polyester-Based Thermoplastic Elastomer—

Examples of the polyester-based thermoplastic elastomer include materials in which at least polyester constitutes a crystalline hard segment with a high melting point and another polymer (such as polyester and polyether) constitutes a non-crystalline soft segment with a low glass transition temperature. The "polyester-based thermoplastic elastomer" in this embodiment may be the same as described in the second aspect of the invention.

—Polystyrene-Based Thermoplastic Elastomer—

Examples of the polystyrene-based thermoplastic elastomer include materials in which at least polystyrene constitutes a hard segment and another polymer (such as polybutadiene, polyisoprene, polyethylene, hydrogenated polybutadiene, and hydrogenated polyisoprene) constitutes a non-crystalline soft segment with a low glass transition temperature. The "polystyrene-based thermoplastic elastomer" in this embodiment may be the same as described in the second aspect of the invention.

—Polyurethane-Based Thermoplastic Elastomer—

Examples of the polyurethane-based thermoplastic elastomer include materials in which at least polyurethane constitutes a hard segment forming a pseudo-crosslink through physical agglomeration, and another polymer constitutes a non-crystalline soft segment with a low glass transition temperature. The "polyurethane-based thermoplastic elastomer" in this embodiment may be the same as described in the second aspect of the invention.

—Polyolefin-Based Thermoplastic Elastomer—

Examples of the polyolefin-based thermoplastic elastomer include materials in which at least polyolefin constitutes a crystalline hard segment with a high melting point, and another polymer (such as the polyolefin, different polyolefin, and a polyvinyl compound) constitutes a non-crystalline soft segment with a low glass transition temperature. The "polyolefin-based thermoplastic elastomer" in this embodiment may be the same as described in the second aspect of the invention.

An acid-denatured elastomer formed by acid denaturation of a thermoplastic elastomer may be used as the thermoplastic elastomer.

An example of the "acid-denatured elastomer formed by acid denaturation of a thermoplastic elastomer" is an acid-denatured elastomer in which an acid group is introduced into the thermoplastic elastomer using a compound having an acid group. Examples of the compound having an acid group used to acid-modify the thermoplastic elastomer include unsaturated compounds having an acid group such as a carboxylic group, a sulfuric acid group, and a phosphoric acid group. As the unsaturated compound having an acid group, an unsaturated compound having a carboxylic group which is a weak acid group is preferably used from the viewpoint of suppressing the degradation of the thermoplastic elastomer, and examples thereof include an acrylic acid, a methacrylic acid, an itaconic acid, a crotonic acid, an isocrotonic acid, and a maleic acid.

An example of the method of acid denaturation of the thermoplastic elastomer is a method of bonding the unsaturated bonding site of the unsaturated carboxylic acid to the olefin-based thermoplastic elastomer or the styrene-based thermoplastic elastomer through graft polymerization or the like.

The thermoplastic resin material may include two or more kinds of thermoplastic elastomers, but preferably includes one kind of thermoplastic elastomer from the viewpoint of controlling the tire performance of the tire formed using the thermoplastic resin material.

Among the above-mentioned thermoplastic elastomers, the polyamide-based thermoplastic elastomer is preferably used from the viewpoint of excellent tensile modulus of elasticity, tensile strength, and fracture strain and feasibility of fusing at a low temperature. From the viewpoint of excellent tensile modulus of elasticity, tensile strength, and fracture strain, as well as having high heat resistance, and a wide temperature setting range, the polyester-based thermoplastic elastomer is also preferably used. Among these, the polyamide-based thermoplastic elastomer is particularly preferably used as the thermoplastic elastomer in the fourth aspect of the invention.

—Physical Properties of Thermoplastic Elastomer—

The tensile modulus of elasticity, which is defined in JIS K7113:1995, of the thermoplastic resin material in the fourth aspect of the invention is preferably from 100 MPa to 1000 MPa, more preferably from 100 MPa to 800 MPa, and still more preferably from 100 MPa to 700 MPa. When the tensile modulus of elasticity of the thermoplastic resin material is from 100 MPa to 1000 MPa, it is possible to efficiently performing fitting onto a rim while maintaining the shape of a tire frame. The elastic modulus is a value obtained by measuring a dumbbell-shaped sample piece (sample piece No. 5) defined in JIS K6251:1993 at a tensile rate of 200 mm/min by the use of Shimadzu Autograph AGS-J (5 kN) manufactured by Shimadzu Corporation.

The tensile yield strength, which is defined in JIS K7113:1995, of the thermoplastic resin material in the fourth aspect of the invention, is preferably equal to or more than 5 MPa, more preferably from 5 to 20 MPa, and still more preferably from 5 to 17 MPa. When the tensile yield strength of the thermoplastic resin material is equal to or more than 5 MPa, it is possible to resist deformation due to a load applied to a tire during traveling or the like.

The tensile yield elongation, which is defined in JIS K7113:1995, of the thermoplastic resin material in the fourth aspect of the invention is preferably equal to or more than 10%, more preferably from 10% to 70%, and still more preferably from 15% to 60%. When the tensile yield elongation of the thermoplastic resin material is equal to or more than 10%, it is possible to increase an elastic region and to improve fittability onto a rim.

The tensile fracture elongation, which is defined in JIS K7113:1995, of the thermoplastic resin material in the fourth aspect of the invention is preferably equal to or more than 50%, more preferably equal to or more than 100%, still more preferably equal to or more than 150%, and still more preferably equal to or more than 200%. When the tensile fracture elongation of the thermoplastic resin material is equal to or more than 50%, it is possible to improve fittability onto a rim and to suppress fracture due to collision.

The deflection temperature under load (under a load of 0.45 MPa), which is defined in ISO 75-2 or ASTM D648, of the thermoplastic resin material in the fourth aspect of the invention is preferably equal to or higher than 50° C., more preferably from 50° C. to 150° C., and still more preferably from 50° C. to 130° C. When the deflection temperature under load of the thermoplastic resin material is equal to or higher than 50° C., it is possible to suppress deformation of a tire frame in a vulcanization step of a tread or the like.

The content of the thermoplastic elastomer in the thermoplastic resin material in the fourth aspect of the invention is preferably from 40 mass % to 95 mass % and more preferable from 50 mass % to 90 mass %, with respect to the total mass of the thermoplastic resin material, from the viewpoint of sufficient exhibition of performance of the thermoplastic elastomer.

The thermoplastic resin material may optionally contain various additives other than the specific needle-shaped crystal grains as long as they do not impair the effect of the fourth aspect of the invention. Examples of the additives include a filler, an anti-aging agent, oil, a plasticizer, a colorant, a weather resistant agent, and a reinforcing agent.

The thermoplastic resin material can be prepared as a mixture, for example, by mixing the thermoplastic elastomer, the specific needle-shaped crystal grains, and various additives which are optionally used, and melting and kneading the resultant. The thermoplastic resin material can be used optionally in a pellet shaped.

The tire of the fourth aspect of the invention includes a circular tire frame (hereinafter, appropriately also referred to as a "tire case") formed of the above-mentioned thermoplastic resin material. The tire frame may be formed of the thermoplastic resin material into a unified body using various forming methods or may be formed by forming a pair of tire case half parts (tire frame pieces) using various forming methods and then bonding the tire case half parts. From the viewpoint of productivity, it is preferable that the tire frame is formed by bonding a pair of half case cases.

[Reinforcing Cord Layer]

The tire of the fourth aspect of the invention may have a reinforcing cord member which is wound on the outer circumferential portion of the tire frame in the circumferential direction to form a reinforcing cord layer. The [Resin Material of Reinforcing Cord Layer] in the fourth aspect of the invention may be the same as the [Resin Material of Reinforcing Cord Layer] in the invention according to the first aspect.

Specific examples of the tire of the fourth aspect of the invention will be described in more detail below with reference to Embodiments 4-1 and 4-2.

Embodiment 4-1

A tire according to Embodiment 4-1 of the tire of the fourth aspect of the invention will be described below with reference to the accompanying drawings. Here, the tire according to Embodiment 4-1 is the same as described in Embodiment 1-1, except for the following points. Accordingly, the same drawings and members will be described using the same reference numerals and the same drawings.

The tire case 17 according to this embodiment is formed of a thermoplastic resin material which is a mixture of a polyamide-based thermoplastic elastomer ("UBESTA XPA9048" manufactured by Ube Industries, Ltd.) and specific needle-shaped crystal grains ("MOS-HIGE" manufactured by Ube Material Industries Ltd.).

The content of the specific needle-shaped crystal grains in the thermoplastic resin material is 1 mass %.

The tire case 17 according to this embodiment is formed of a thermoplastic resin material including a single thermoplastic elastomer and specific needle-shaped crystal grains, but the invention according to the fourth aspect is not limited to this configuration and the portions (such as the side portion 14, the crown portion 16, and the bead portion 12) of the tire case 17 may be formed of thermoplastic resin materials having different characteristics, similarly to typical conventional rubber pneumatic tires. A reinforcing material (such as fiber, cord, unwoven fabric, and woven fabric which are formed of a polymer material or metal) may be embedded in the tire case 17 (such as the bead portion 12, the side portion 14, and the crown portion 16) to reinforce the tire case 17 with the reinforcing material.

The tire case 17 according to this embodiment is formed by bonding a pair of tire case half parts (tire frame pieces) 17A formed of the thermoplastic resin material including a thermoplastic elastomer and specific needle-shaped crystal grains to each other. The tire case half parts 17A are formed by opposing circular tire case half parts 17A, in each of which one bead portion 12, one side portion 14, and a half-width crown portion 16 are formed as a unified body by injection molding or the like, having the same shape to each other and bonding both tire case half parts to each other at the tire equatorial plane portion. The tire case 17 is not limited to bonding two members, but may be formed by bonding three or more members. The others are the same as the tire according to Embodiment 1-1 and the production method thereof is also the same.

(Effects)

In the tire 10 according to this embodiment, since the tire case 17 is formed of the thermoplastic resin material including a thermoplastic elastomer and specific needle-shaped crystal grains, the loss factor (tan δ) of the tire frame is kept low and the elastic modulus is improved, compared with a case where a thermoplastic resin material including only the thermoplastic elastomer is used. Accordingly, the tire 10 has a high elastic modulus and has reduced rolling resistance. The tire 10 also has excellent heat resistance. Since the tire 10 has a simpler structure than a conventional rubber tire, the weight is smaller. Accordingly, the tire 10 according to this embodiment has excellent abrasion resistance and durability.

In the tire 10 according to this embodiment, since the reinforcing cord 26 having rigidity higher than the resin material is wound on the outer circumferential surface of the crown portion 16 of the tire case 17 formed of a thermoplastic resin material helically in the circumferential direction, puncture resistance, cutting resistance, and rigidity in the circumferential direction of the tire 10 are improved. Since the rigidity in the circumferential direction of the tire 10 is improved, it is possible to prevent creeping of the tire case 17 formed of a thermoplastic resin material.

Since at least a part of the reinforcing cord 26 is embedded in the outer circumferential surface of the crown portion 16 of the tire case 17 formed of the thermoplastic resin material and comes in close contact with the resin material in a cross-sectional view (the cross-section shown in FIG. 1) taken along the axial direction of the tire case 17, the air inclusion at the time of production is suppressed and the movement of the reinforcing cord 26 due to a force applied thereto at the time of traveling is suppressed. Accordingly, it is possible to suppress abrasion of the reinforcing cord 26, the tire case 17 and the tread 30 and thus to improve durability of the tire 10.

In this way, when the reinforcing cord layer 28 is formed to include the resin material, it is possible to reduce the difference in hardness between the tire case 17 and the reinforcing cord layer 28 and thus to further closely contact and fix the reinforcing cord 26 with and to the tire case 17, compared with a case where the reinforcing cord 26 is fixed merely using the cushion rubber. Accordingly, it is possible to effectively prevent the above-mentioned air inclusion and thus to effectively suppress the movement of the reinforcing cord member at the time of traveling.

When the reinforcing cord 26 is a steel cord, the reinforcing cord 26 can be easily separated and recovered from the resin material by heating at the time of disposal of the tire and thus it is advantageous in view of recyclability of the tire 10. The resin material usually has a lower loss factor (tan δ) compared with a vulcanized rubber. Accordingly, when the reinforcing cord layer 28 contains a large amount of resin material, it is possible to enhance the rolling properties of the tire. The resin material is more advantageous in that the resin material has high in-plane shear stiffness and has excellent steering stability and abrasion resistance at the time of traveling with the tire, compared with a vulcanized rubber.

As shown in FIG. 2, since the depth L of embedding of the reinforcing cord 26 is set to be equal to or more than 1/5 of the diameter D thereof, it is possible to effectively suppress the air inclusion at the time of production and to further suppress the movement of the reinforcing cord 26 due to a force applied thereto at the time of traveling.

Since the tread 30 coming in contact with a road surface is formed of a rubber material having abrasion resistance higher than the resin material including first and second thermoplastic elastomers, the abrasion resistance of the tire 10 is enhanced.

Since the annular bead core 18 formed of a metal material is embedded in the bead portion 12, the tire case 17, that is, the tire 10, is strongly retained in the rim 20, similarly to a conventional rubber pneumatic tire.

Since the sealing layer 24 formed of a rubber material having higher sealability than the resin material forming the tire case 17 is disposed in the part of the bead portion 12 coming in contact with the rim 20, the sealability between the tire 10 and the rim 20 is improved. Accordingly, compared with a case where the sealing is performed with the rim 20 and the resin material forming the tire case 17, air leakage from the tire is further suppressed. By disposing the sealing layer 24, fittability onto a rim are also improved.

Although it is stated in Embodiment 4-1 that the reinforcing cord 26 is heated to melt or soften the thermoplastic resin material in the part coming in contact with the heated reinforcing cord 26, the invention according to the fourth aspect is not limited to this configuration, but the outer circumferential surface of the crown portion 16 where the reinforcing cord 26 is to be embedded therein may be heated using a hot air generating device, and then the reinforcing cord 26 may be embedded in the crown portion 16, instead of heating the reinforcing cord 26.

Although the heater and the fan are adopted as the heat source of the cord heating device 59 in Embodiment 4-1, the invention according to the fourth aspect is not limited to this configuration, but the reinforcing cord 26 may be directly heated with radiation heat (for example, infrared rays).

Although the melted or softened portion of the thermoplastic resin material having the reinforcing cord 26 embedded therein is forcibly cooled with the second roller 64 formed of metal in Embodiment 4-1, the invention according to the fourth aspect is not limited to this configuration, but cold air may be directly applied to the melted or softened portion of the thermoplastic resin material to forcibly cool and solidify the melted or softened portion of the thermoplastic resin material.

Although the reinforcing cord 26 is heated in Embodiment 4-1, for example, the outer circumference of the reinforcing cord 26 may be coated with the same thermoplastic resin material as the tire case 17. In this case, by heating the coated thermoplastic resin material along with the reinforcing cord 26 when the coated reinforcing cord is wound on the crown portion 16 of the tire case 17, it is possible to effectively suppress the incorporation of air at the time of embedding the reinforcing cord in the crown portion 16.

The helical winding of the reinforcing cord 26 is easy in production, but it can also be considered that the reinforcing cord 26 is wound discontinuously in the width direction.

The tire 10 according to Embodiment 4-1 is a so-called tubeless tire in which an air chamber is formed between the tire 10 and the rim 20 by fitting the bead portion 12 to the rim 20. However, the invention according to the fourth aspect is not limited to this configuration, but the tire may have a complete tube shape.

In the complete tube-like tire, for example, as shown in FIG. 4, three tire frames having a circular shape may be arranged in the tire width direction. FIG. 4 is a cross-sectional view of a tire according to another embodiment. As shown in FIG. 4, a tire 86 includes a tread rubber layer 87, circular hollow tubes (tire frames) 88 formed of the same resin material as described in Embodiment 4-1, a belt (reinforcing cord) 89, and a rim 90. Three tubes 88 are arranged side by side in the tire width direction of the tire 86. The tread rubber layer 87 in which the belt 89 is embedded is bonded to the outer circumference of the tubes 88. The tubes 88 are fitted to the rim 90 having concave portions engaging with the tubes 88. The tire 86 is not provided with a bead core.

While the invention according to the fourth aspect has been described with reference to the embodiments, the embodiments are only an example and can be modified in various forms without departing from the concept thereof. The scope of the fourth aspect of the invention is not limited to the embodiments.

Embodiment 4-2

An Embodiment 4-2 of the tire of the fourth aspect of the invention will be described below with reference to the accompanying drawings.

Here, the tire according to Embodiment 4-2 is the same as described in Embodiment 1-2, except for the following points. Accordingly, the same drawings and members will be described using the same reference numerals and the same drawings.

Similarly to Embodiment 4-1, the tire case 17 of the tire according to Embodiment 4-2 is formed of a thermoplastic resin material which is a mixture of a polyamide-based thermoplastic elastomer ("UBESTA XPA9048" made by Ube Industries, Ltd.) and specific needle-shaped crystal grains ("MOS-HIGE" made by Ube Material Industries Ltd.).

The content of the specific needle-shaped crystal grains in the thermoplastic resin material is 1 mass %. The other is the same as the tire according to Embodiment 1-2 and the production method thereof is also the same.

(Effects)

In the tire 200 according to this embodiment, since the tire case 17 is formed of the thermoplastic resin material which is a mixture of a polyamide-based thermoplastic elastomer and specific needle-shaped crystal grains, the loss factor (tan δ) of the tire frame is kept low and the elastic modulus is improved, compared with a case where only the polyamide-based thermoplastic elastomer is used. Accordingly, the tire 200 has a high elastic modulus and has reduced rolling resistance. The tire 200 also has excellent heat resistance. Since the tire 200 has a simpler structure than a conventional rubber tire, the weight is smaller. Accordingly, the tire 200 according to this embodiment has excellent abrasion resistance and durability.

In the method for producing a tire according to this embodiment, in unifying the tire case 17, the cushion rubber 29, and the tread rubber 30A, the outer circumferential surface 17S of the tire case 17 has been subjected to a roughening treatment and thus the adhesiveness (bonding properties) is improved by the anchor effect. Since the resin material forming the tire case 17 is indented due to the collision of the blasting abrasive, the wettability of the adhesive is improved. Accordingly, the adhesive is uniformly applied to the outer circumferential surface 17S of the tire case 17 and this state is retained, whereby it is possible to secure the bonding strength between the tire case 17 and the cushion rubber 29.

Particularly, even when unevenness is formed on the outer circumferential surface 17S of the tire case 17, the blasting abrasive is made to collide with the concave portions (the gaps 28A) to perform the roughening treatment on the peripheries (concave walls, concave bottoms) of the concave portions, whereby it is possible to secure the bonding strength between the tire case 17 and the cushion rubber 29.

On the other hand, since the cushion rubber 29 is stacked in the roughened region of the outer circumferential surface 17S of the tire case 17, it is possible to effectively secure the bonding strength between the tire case 17 and the cushion rubber.

When the cushion rubber 29 is vulcanized in the vulcanization step, the cushion rubber 29 flows in the roughened unevenness formed on the outer circumferential surface 17S of the tire case 17 through the roughening treatment. When the vulcanization is completed, an anchor effect is exhibited by the cushion rubber 29 flowing in the roughened unevenness, and the bonding strength between the tire case 17 and the cushion rubber 29 is enhanced.

In the tire 200 produced by this method for producing a tire, the bonding strength between the tire case 17 and the cushion rubber 29 is secured. That is, the bonding strength between the tire case 17 and the tread 30 is secured through the cushion rubber 29. Accordingly, the abrasion of the outer circumferential surface 17S of the tire case 17 of the tire 200 from the cushion rubber 29 is suppressed.

Since the outer circumferential portion of the tire case 17 is formed of the reinforcing cord layer 28, puncture resistance and cutting resistance are improved, compared with a case where the outer circumferential portion is formed of a member other than the reinforcing cord layer 28.

Since the coated cord member 26B is wound to form the reinforcing cord layer 28, the rigidity in the circumferential direction of the tire 200 is improved. Since the rigidity in the circumferential direction is improved, creeping of the tire case 17 (a phenomenon in which the plastic deformation of the tire case 17 increases with the lapse of time under a constant stress) is suppressed and pressure resistance to air pressure from the inside in the tire diameter direction is improved.

When the reinforcing cord layer 28 is formed to include the coated cord member 26B, it is possible to reduce the difference in hardness between the tire case 17 and the reinforcing cord layer 28 and thus to further closely bring and fix the coated cord member 26B in contact with and to the tire case 17, compared with a case where the reinforcing cord 26A is fixed merely using the cushion rubber 29. Accordingly, it is possible to effectively prevent the above-mentioned incorporation of air and thus to effectively suppress the movement of the reinforcing cord member at the time of traveling.

When the reinforcing cord 26A is a steel cord, the cord member 26A can be easily separated and recovered from the coated cord member 26B by heating at the time of disposal of the tire and thus it is advantageous in view of recyclability of the tire 200. The resin material has a lower loss factor (tan δ) compared with a vulcanized rubber. Accordingly, when the reinforcing cord layer 28 contains a large amount of resin material, it is possible to enhance the rolling properties of the tire. The resin material is more advantageous in that the resin material has high in-plane shear stiffness and has excellent steering stability and abrasion resistance at the time of traveling with the tire, compared with a vulcanized rubber.

Although unevenness is formed on the outer circumferential surface 17S of the tire case 17 in this embodiment, the invention according to the fourth aspect is not limited to this configuration, but the outer circumferential surface 17S may be formed to be flat.

In the tire case 17, the coated cord member wound on and bonded to the crown portion of the tire case may be covered with a coating thermoplastic material to form a reinforcing cord layer. In this case, the melted or softened coating thermoplastic material may be ejected onto the reinforcing cord layer 28 to form a coating layer. A welding sheet may be heated into a melted or softened state without using an extruder and may be attached to the surface (the outer circumferential surface) of the reinforcing cord layer 28 to form a coating layer.

Although the tire case half parts 17A are bonded to form the tire case 17 in Embodiment 4-2, the invention according to the fourth aspect is not limited to this configuration, but the tire case 17 may be formed as a unified body using a mold or the like.

The tire 200 according to Embodiment 4-2 is a so-called tubeless tire in which an air chamber is formed between the tire 200 and the rim 20 by fitting the bead portion 12 to the rim 20. However, the invention according to the fourth aspect is not limited to this configuration, but the tire 200 may have, for example, a complete tube shape (for example, the shape shown in FIG. 4).

Although the cushion rubber 29 is interposed between the tire case 17 and the tread 30 in Embodiment 4-2, the invention according to the fourth aspect is not limited to this configuration, but the cushion rubber 29 may not be interposed therebetween.

Although the coated cord member 26B is helically wound on the crown portion 16 in Embodiment 4-2, the invention according to the fourth aspect is not limited to this configuration, but the coated cord member 26B may be wound thereon to be discontinuous in the width direction.

In Embodiment 4-2, a thermoplastic material is used as the coating resin material 27 forming the coated cord member 26B, the coating resin material 27 is melted or softened by heating, and the coated cord member 26B is welded to the outer circumferential surface of the crown portion 16. However, the invention according to the fourth aspect is not limited to this configuration, but the coated cord member 26B may be bonded to the outer circumferential surface of the crown portion 16 using an adhesive or the like without heating the coating resin material 27.

A thermosetting resin may be used as the coating resin material 27 forming the coated cord member 26B, and the coated cord member 26B may be bonded to the outer circumferential surface of the crown portion 16 using an adhesive or the like without heating the coated cord member 26B.

A thermosetting resin may be used as the as the coating resin material 27 forming the coated cord member 26B and the tire case 17 may be formed of a thermoplastic resin material. In this case, the coated cord member 26B may be bonded to the outer circumferential surface of the crown portion 16 using an adhesive or the like, or a part of the tire case 17 in which the coated cord member 26B is embedded may be heated to be in a melted or softened state and the coated cord member 26B may be welded to the outer circumferential surface of the crown portion 16.

A thermoplastic resin may be used as the as the coating resin material 27 forming the coated cord member 26B and the tire case 17 may be formed of a thermoplastic resin material. In this case, the coated cord member 26B may be bonded to the outer circumferential surface of the crown portion 16 using an adhesive or the like, or a part of the tire case 17 in which the coated cord member 26B is embedded may be heated into a melted or softened state, the coating resin material 27 is heated to be in a melted or softened state, and the coated cord member 26B may be welded to the outer circumferential surface of the crown portion 16. When both the tire case 17 and the coated cord member 26B may be heated to be in a melted or softened state, both are mixed with each other well and thus the bonding strength therebetween is improved. When a thermoplastic resin material is used as the resin material forming the tire case 17 and a thermoplastic resin material is used as the coating resin material 27 forming the coated cord member 26B, the same kind of thermoplastic material, particularly, the same thermoplastic material, is preferably used.

The outer circumferential surface 17S of the tire case 17 may be activated to enhance the hydrophilic property by performing a corona treatment or a plasma treatment on the outer circumferential surface having been subjected to the roughening treatment, and then an adhesive may be applied thereto.

The sequence for producing the tire 200 is not limited to the sequence described in Embodiment 4-2, but may be appropriately changed.

While the invention according to the fourth aspect has been described with reference to the embodiments, the embodiments are only an example and can be modified in various forms without departing from the concept thereof. The scope of the fourth aspect of the invention is not limited to the embodiments.

Fifth Aspect of the Invention

A resin material forming a tire frame in the invention according to a fifth aspect will be described, and specific embodiments of a tire of the fifth aspect of the invention will be then described with reference to the accompanying drawings.

[Resin Material]

A tire of the fifth aspect of the invention includes a circular tire frame formed of at least a resin material, and the resin material includes a thermoplastic elastomer including a hard segment and a soft segment in a molecule thereof and a resin of which the glass transition temperature (Tg) is higher than the glass transition temperature of the hard segment.

Here, the "resin material" in this description is a concept which encompasses a thermoplastic resin (including a thermoplastic elastomer) and a thermosetting resin as described above, but does not encompass a vulcanized rubber.

As described above, examples of the thermosetting resin which can be used in the reinforcing cord layer include a phenol resin, a urea resin, a melamine resin, an epoxy resin, a polyamide resin, and a polyester resin.

As described above, examples of the thermoplastic resin include a urethane resin, an olefin resin, a vinylchloride resin, a polyamide resin, and a polyester resin.

As described above, the "thermoplastic elastomer" means a thermoplastic resin material including a copolymer having a polymer constituting a crystalline hard segment with a high melting point or a hard segment with a high cohesive force and a polymer constituting a non-crystalline soft segment with a low glass transition temperature, in a molecule thereof.

Since the tire of the fifth aspect of the invention employs a resin material including a thermoplastic elastomer including a hard segment and a soft segment in a molecule thereof and a resin having a higher glass transition temperature (Tg) than the hard segment, it is possible to keep the loss factor (tan δ) of the tire frame low and to improve the heat resistance thereof.

Figure 10:
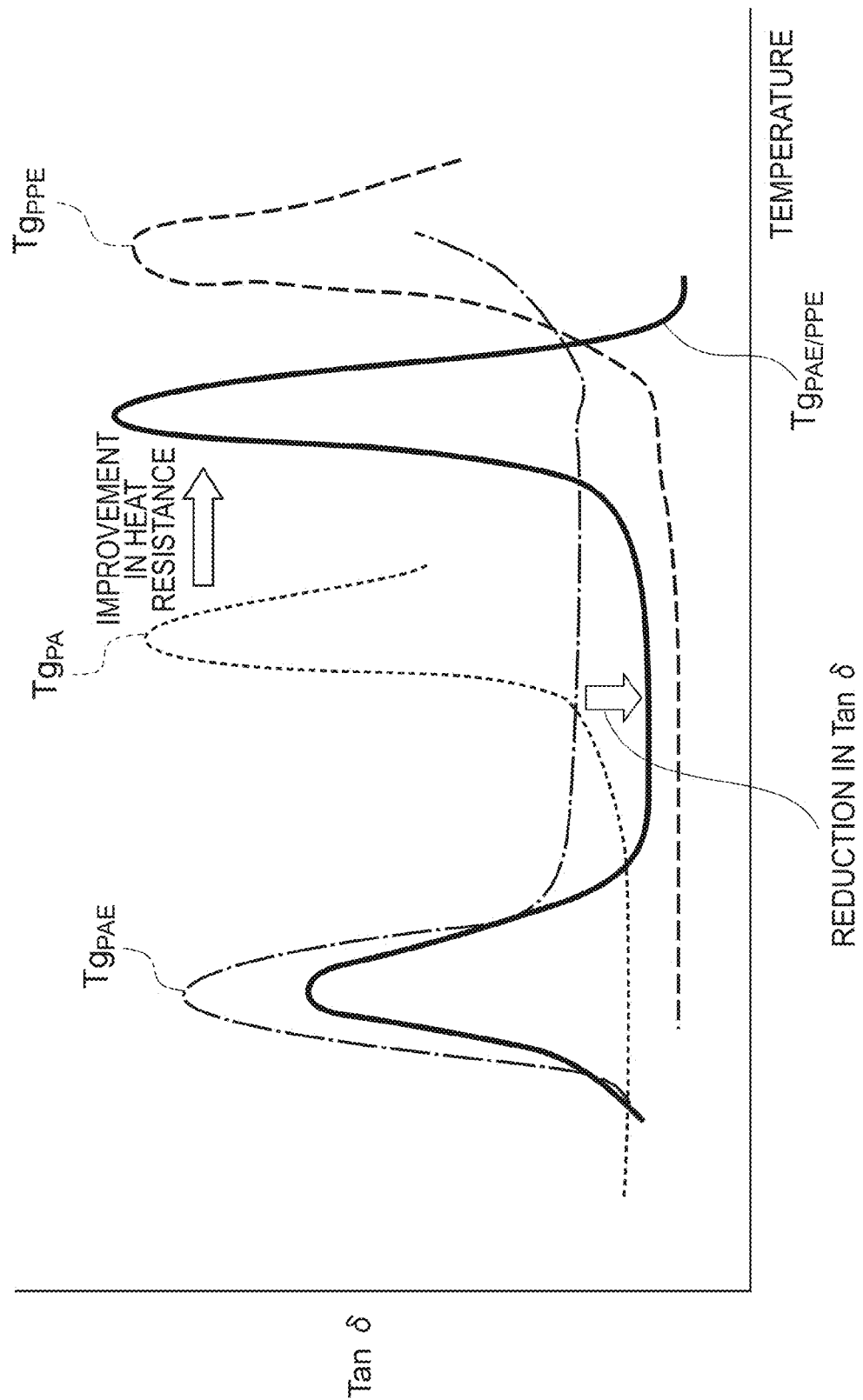
FIG. 10 relates to the fifth aspect of the present invention, and illustrates a relationship between the glass transition temperature and the loss factor (tan δ) in each material.

A case where PAE (polyamide-based thermoplastic elastomer) is used as the thermoplastic elastomer and polyphenylene ether (PPE) is used as a specific resin in the fifth aspect of the invention will be described with reference to FIG. 10. FIG. 10 is a diagram illustrating a relationship between the glass transition temperature and the loss factor (tan δ) in each material. In FIG. 10, a solid line indicating the glass transition temperature ($Tg_{PAE/PPE}$) of PAE/PPE which is an embodiment of the fifth aspect of the invention, a one-dotted line indicating the glass transition temperature ($Tg_{PAE}$) of PAE, a small dotted line indicating the glass transition temperature ($Tg_{PA}$) of polyamide, and a large dotted line indicating the glass transition temperature ($Tg_{PPE}$) of PPE are illustrated, and the glass transition temperatures of the materials are shown as peaks of the lines.

In the fifth aspect of the invention, the resin material in which the thermoplastic elastomer (PAE) and the specific resin (PPE) of the fifth aspect of the invention, that is, PAE/PPE which is an embodiment of the fifth aspect of the invention has a higher glass transition temperature than polyamide constituting the hard segment of the thermoplastic elastomer and it is thus possible to enhance the heat resistance, which can be seen from the comparison of the peak of $Tg_{PA}$ and the peak of $Tg_{PAE/PPE}$ in FIG. 10. In general, when the heat resistance of the thermoplastic elastomer is enhanced, the loss factor (tan δ) also increases therewith. However, the PAE/PPE which is an embodiment of the fifth aspect of the invention can keep the loss factor lower than the thermoplastic elastomer (PAE) and polyamide constituting the hard segment thereof, as indicated by an arrow at the center of FIG. 10. That is, like the resin material in the fifth aspect of the invention, by using the thermoplastic elastomer and the specific resin in the fifth aspect of the invention of which the glass transition temperature is higher than that of the hard segment thereof, it is possible to keep the loss factor (tan δ) low and to enhance the heat resistance of the tire frame.

(Thermoplastic Elastomer)

Examples of the thermoplastic elastomer include a polyamide-based thermoplastic elastomer (TPA), a polyester-based thermoplastic elastomer (TPC), a polyolefin-based thermoplastic elastomer (TPO), a polystyrene-based thermoplastic elastomer (TPS), a polyurethane-based thermoplastic elastomer (TPU), a thermoplastic cross-linked rubber (TPV), and other thermoplastic elastomers (TPZ), which are defined in JIS K6418:2007.

The same kind of resin material in the below description means an aspect of between ester-based resin material and ester-based resin material, an aspect of between styrene-based resin material and styrene-based resin material, and the like.

—Polyamide-Based Thermoplastic Elastomer—

The "polyamide-based thermoplastic elastomer" in this embodiment may be the same polyamide-based thermoplastic elastomer as described in the first aspect of the invention.

—Polystyrene-Based Thermoplastic Elastomer—

Examples of the polystyrene-based thermoplastic elastomer include materials in which at least polystyrene constitutes a hard segment and another polymer (such as polybutadiene, polyisoprene, polyethylene, hydrogenated polybutadiene, and hydrogenated polyisoprene) constitutes a non-crystalline soft segment with a low glass transition temperature. The "polystyrene-based thermoplastic elastomer" in this embodiment may be the same as described in the second aspect of the invention.

—Polyurethane-Based Thermoplastic Elastomer—

Examples of the polyurethane-based thermoplastic elastomer include materials in which at least polyurethane constitutes a hard segment forming a pseudo-crosslink through physical agglomeration and another polymer constitutes a non-crystalline soft segment with a low glass transition temperature. The "polyurethane-based thermoplastic elastomer" in this embodiment may be the same as described in the second aspect of the invention.

—Polyolefin-Based Thermoplastic Elastomer—

Examples of the polyolefin-based thermoplastic elastomer include materials in which at least polyolefin constitutes a crystalline hard segment with a high melting point and another polymer (such as the polyolefin described above, another polyolefin, and a polyvinyl compound) constitutes a non-crystalline soft segment with a low glass transition temperature. The "polyolefin-based thermoplastic elastomer" in this embodiment may be the same as described in the second aspect of the invention.

—Polyester-Based Thermoplastic Elastomer—

Examples of the polyester-based thermoplastic elastomer include materials in which at least polyester constitutes a crystalline hard segment with a high melting point and another polymer (such as polyester and polyether) constitutes a non-crystalline soft segment with a low glass transition temperature. The "polyester-based thermoplastic elastomer" in this embodiment may be the same as described in the second aspect of the invention.

—Physical Properties of Thermoplastic Elastomer—

The thermoplastic elastomer included in the resin material forming the tire frame of the fifth aspect of the invention can be appropriately selected so as to exhibit desired tire performance. Here, the elastic modulus (the tensile modulus of elasticity defined in JIS K7113:1995) of the thermoplastic elastomer included in the resin material is preferably from 1 MPa to 150 Mpa and more preferably from 1 MPa to 60 MPa, in consideration of the viewpoint of tire performance and the viewpoint of the loss factor (tan δ) required for the tire.

Similarly, tan δ of the thermoplastic elastomer in the fifth aspect of the invention is preferably from 0.01 to 0.1 and more preferably from 0.01 to 0.08. Here, the "loss factor (tan δ)" is a value calculated by a ratio (G"/G') between the storage shear elastic modulus (G') and the loss shear elastic modulus (G") at 30° C., 20 Hz, and 1% of shearing strain and is a value representing a degree to which a material absorbs energy (converts into heat) when the material is deformed. Since the larger tan δ causes absorption of more energy, the rolling resistance of the tire increases and consequently serves as a reason of degradation in fuel efficiency of the tire. The value of tan δ of the thermoplastic elastomer can be measured by the use of a dynamic viscoelasticity measuring apparatus (Dynamic-Mechanical Analysis: DMA).

The glass transition temperature (Tg) of the hard segment of the thermoplastic elastomer in the fifth aspect of the invention is preferably from 0° C. to 150° C. and more preferably from 30° C. to 120° C., from the viewpoint of treatment in injection molding and productivity and the value of tan δ.

The glass transition temperature of the hard segment can be measured through differential scanning calorimetry (DSC). In the fifth aspect of the invention, the glass transition temperature of the "hard segment" means the glass transition temperature of a polymer alone that forms the hard segment.

At least one kind selected from a polyamide-based thermoplastic elastomer or a polyester-based thermoplastic elastomer may be preferably used as the thermoplastic elastomer, from the viewpoint of the elastic modulus, tan δ and a combination with a resin to be described later.

More specifically, a thermoplastic elastomer having polyethylene (Tg: −125° C.), polyacetal (Tg: −60° C.), an ethylene vinyl acetate copolymer (Tg: −42° C.), polyurethane (Tg: −20° C.), polypropylene (Tg: 0° C.), polyvinylidene fluoride (Tg: 35° C.), polyamide 6 (so-called nylon 6, Tg: 48° C.), polyamide 12 (so-called nylon 12, Tg: 51° C.), polyamide 46 (so-called nylon 46, Tg: 78° C.), polyamide 66 (so-called nylon 66, Tg: 50° C.), polybutylene terephthalate (Tg: 50° C.), polylactic acid (Tg: 57° C.), polyethylene terephthalate (Tg: 59° C.), a polyacrylonitrile butadiene styrene copolymer (Tg: 80 to 125° C.), polyvinyl chloride (Tg: 87° C.), methyl polymethacrylate (Tg: 90° C.), polystyrene (Tg: 100° C.), polyacrylonitrile (Tg: 104° C.), polyphenylene oxide (PPO, Tg: 104° C. to 120° C.), polyphenylene sulfide (Tg: 92° C.), polytetrafluoroethylene (Tg: 126° C.), polycarbonate (Tg: 150° C.), polyethersulfone (Tg: 230° C.), polyamideimide (Tg: 275° C.), or polyarylate (Tg: 176° C.) as a hard segment may be preferably used, and a thermoplastic elastomer having polyphenylene oxide, polyphenylene sulfide, polybutylene terephthalate, polyethylene terephthalate, polycarbonate, or polyarylate may be more preferably used.

(Specific Resin According to Fifth Aspect of the Invention)

The "specific resin of the fifth aspect of the invention" is a resin of which the glass transition temperature (Tg) is higher than that of the hard segment.

Accordingly, in the tire of which the tire frame is formed of the resin material including the thermoplastic elastomer and the specific resin of the fifth aspect of the invention, it is possible to keep tan δ of the tire frame low and to enhance the elastic modulus. Accordingly, for example, it is possible to enhance the elastic modulus (heat resistance) while reducing the rolling resistance of the tire. When the glass transition temperature of the specific resin of the fifth aspect of the invention is lower than the glass transition temperature of the hard segment, the elastic modulus or the heat resistance of the tire frame cannot be enhanced.

The specific resin of the fifth aspect of the invention is not particularly limited as long as the glass transition temperature thereof is higher than that of the hard segment, and can appropriately employ known resins as long as they do not impair the effect of the fifth aspect of the invention. However, for example, it is preferable to satisfy the following physical properties.

The glass transition temperature (Tg) of the specific resin of the fifth aspect of the invention differs depending on the combination of a thermoplastic elastomer to be used and the specific resin of the fifth aspect of the invention, but is preferably from 0° C. to 300° C. and more preferably from 30° C. to 200° C., from the viewpoint of productivity (treatment) in molding the tire frame.

The glass transition temperature of the specific resin of the fifth aspect of the invention has only to be higher than that of the hard segment of the thermoplastic elastomer. The glass transition temperature ($Tg_1$) of the specific resin of the fifth aspect of the invention is preferably higher, by 20° C. or more, than the glass transition temperature ($Tg_2$) of the hard segment. More specifically, the difference ($Tg_1$-$Tg_2$) between the glass transition temperature ($Tg_1$) of the specific resin of the fifth aspect of the invention and the glass transition temperature ($Tg_2$) of the hard segment differs depending on the combination of the thermoplastic elastomer to be used and the specific resin of the fifth aspect of the invention, but is preferably 20° C. to 200° C. and more preferably 30° C. to 80° C., from the viewpoint of productivity (treatment) in molding the tire frame.

The elastic modulus (the tensile modulus of elasticity defined in JIS K7113:1995) of the specific elastomer of the fifth aspect of the invention is preferably from 100 MPa to 2000 Mpa and more preferably from 400 MPa to 1200 MPa, in consideration of the viewpoint of tire performance and the viewpoint of the loss factor (tan δ) required for the tire.

Similarly, tan δ of the specific resin of the fifth aspect of the invention is preferably from 0.01 to 0.1 and more preferably from 0.01 to 0.06. The value of tan δ of the specific resin of the fifth aspect of the invention can be measured by the use of a dynamic viscoelasticity measuring apparatus (Dynamic-Mechanical Analysis: DMA).

As the specific resin according to the fifth aspect of the present invention, for example, polyphenylene ether (PPE, Tg: 210° C.), polyethylene (Tg: −125° C.), polyacetal (Tg: −60° C.), ethylene vinyl acetate copolymer (Tg: −42° C.), polyurethane (Tg: −20° C.), polypropylene (Tg: 0° C.), polyvinylidene fluoride (Tg: 35° C.), polyamide 6 (so-called nylon 6, Tg: 48° C.), polyamide 12 (so-called nylon 12, Tg: 51° C.), polyamide 46 (so-called nylon 46, Tg: 78° C.), polyamide 66 (so-called nylon 66, Tg: 50° C.), polybutylene terephthalate (Tg: 50° C.), polylactic acid (Tg: 57° C.), polyethylene terephthalate (Tg: 59° C.), a polyacrylonitrile butadiene styrene copolymer (Tg: 80 to 125° C.), polyvinyl chloride (Tg: 87° C.), methyl polymethacrylate (Tg: 90° C.), polystyrene (Tg: 100° C.), polyacrylonitrile (Tg: 104° C.), polyphenylene oxide (PPO, Tg: 104 to 120° C.), polyphenylene sulfide (Tg: 92° C.), polytetrafluoroethylene (Tg: 126° C.), polycarbonate (Tg: 050° C.), polyethersulfone (Tg: 230° C.), and polyamideimide (Tg: 275° C.) are preferred, and polyphenylene ether, polyphenylene sulfide, polyethylene terephthalate, polybutylene terephthalate, polyethylene naphthalate, polybutylene naphthalate, polytrimethylene terephthalate, polycarbonate and polyarylate are more preferred.

Furthermore, as a combination of the thermoplastic elastomer with the specific resin according to the fifth aspect of the present invention, from the viewpoint of increasing the elastic modulus while maintaining a low loss coefficient (Tan δ), in addition to a combination of a polyamide-based thermoplastic elastomer with polyphenylene ether, a combination of a polyamide-based thermoplastic elastomer with any one of polyphenylene sulfide, polyethylene terephthalate, polybutylene terephthalate, polyethylene naphthalate, polybutylene naphthalate, polytrimethylene terephthalate, polycarbonate, polyarylate, and a polystyrene-based resin; and a combination of a polyester-based thermoplastic elastomer with any one of polyphenylene ether, polyphenylene sulfide, polyethylene terephthalate, polybutylene terephthalate, polyethylene naphthalate, polybutylene naphthalate, polytrimethylene terephthalate, polycarbonate, and polyarylate; are preferred.

(Resin Materials)

In the resin material including the thermoplastic elastomer and the specific resin according to the fifth aspect of the present invention, the content ratio between the thermoplastic elastomer and the specific resin according to the fifth aspect of the present invention can be determined on the basis of the mass ratio (x+y:z) of the total (x+y) of the hard segment (x) of the thermoplastic elastomer and the resin (y) with respect to the soft segment of the thermoplastic elastomer (z). The mass ratio (x+y:z) is preferably from 10:90 to 90:10, and more preferably from 40:60 to 80:20. If the mass ratio (x+y:z) is in the range of 10:90 to 90:10, the effect of improving the elastic modulus while maintaining a low Tan δ of the tire frame can be satisfactory obtained.

Moreover, the mass ratio (x:y) between the hard segment (x) of the thermoplastic elastomer and the specific resin (y) according to the fifth aspect of the present invention is preferably from 90:10 to 30:70, and more preferably from 80:20 to 40:60, in view of a balance of the tensile modulus of elasticity and the tan δ, and the processing characteristics due to the difference in the respective melting points.

The melting point of the resin material including the thermoplastic elastomer and the specific resin of the fifth aspect of the invention is usually 100° C. to 350° C. and preferably 100° C. to 250° C. From the viewpoint of productivity of the tire, the melting point is preferably 120° C. to 250° C. and more preferably 150° C. to 200° C. In this way, by using the thermoplastic resin material including a thermoplastic elastomer of which the melting point is 120° C. to 250° C., it is possible to set the heating temperature of the junction thereof to equal to or higher than the melting point of the thermoplastic resin material forming the tire frame, for example, when the tire frame is formed by welding the divided bodies (frame) thereof. Since the tire of the fifth aspect of the invention employs the thermoplastic resin material including the thermoplastic elastomer, the bonding strength between the tire frame pieces is sufficient even in the tire frame welded in the temperature range of 120° C. to 250° C. Accordingly, the tire of the fifth aspect of the invention has superior durability in traveling, such as puncture resistance or abrasion resistance. The heating temperature is preferably a temperature higher, by 10° C. to 150° C., than the melting point of the thermoplastic resin material including the thermoplastic elastomer forming the tire frame pieces and more preferably a temperature higher by 10° C. to 100° C.

The total content of the thermoplastic elastomer and the specific resin of the fifth aspect of the invention in the resin material in the fifth aspect of the invention is not particularly limited, but is preferably equal to or more than 50 mass % and more preferably equal to or more than 90 mass %, with respect to the total content of the resin material. When the total content of the thermoplastic elastomer and the specific resin of the fifth aspect of the invention is 50 mass % to 100 mass % with respect to the total content of the resin material, the effect of use of the thermoplastic elastomer and the specific resin of the fifth aspect of the invention can be satisfactorily exhibited. A rubber, another thermoplastic elastomer, a thermosetting resin, various fillers (such as silica, calcium carbonate, and clay) and various additives such as an anti-aging agent, oil, a plasticizer, a colorant, a weather resistant agent, and a reinforcing agent may be optionally added to the resin material.

The resin material can be obtained by mixing the thermoplastic elastomer and the specific resin of the fifth aspect of the invention, adding various additives thereto optionally, and appropriately mixing the resultant using a known method (such as a melting and mixing method). The thermoplastic resin material obtained by melting and mixing can be optionally used as a pellet shape.

The tensile modulus of elasticity, which is defined in JIS K7113:1995, of the resin material including the thermoplastic elastomer and the specific resin of the fifth aspect of the invention is preferably 100 to 1000 MPa, more preferably 100 to 800 MPa, and still more preferably 100 to 700 MPa. When the tensile modulus of elasticity of the resin material is 100 to 1000 MPa, it is possible to efficiently fit onto a rim while maintaining the shape of a tire frame.

The tensile yield strength, which is defined in JIS K7113:1995, of the resin material including the thermoplastic elastomer and the specific resin of the fifth aspect of the invention is preferably equal to or more than 5 MPa, more preferably 5 to 20 MPa, and still more preferably 5 to 17 MPa. When the tensile yield strength of the resin material is equal to or more than 5 MPa, it is possible to resist deformation due to a load applied to a tire during traveling or the like.

The tensile yield elongation, which is defined in JIS K7113:1995, of the resin material including the thermoplastic elastomer and the specific resin of the fifth aspect of the invention is preferably equal to or more than 10%, more preferably 10% to 70%, and still more preferably 15% to 60%. When the tensile yield elongation of the resin material is equal to or more than 10%, it is possible to increase an elastic region and to improve fittability onto a rim.

The tensile fracture elongation, which is defined in JIS K7113:1995, of the resin material including the thermoplastic elastomer and the specific resin of the fifth aspect of the invention is preferably equal to or more than 50%, more preferably equal to or more than 100%, still more preferably equal to or more than 150%, and still more preferably equal to or more than 200%. When the tensile fracture elongation of the resin material is equal to or more than 50%, it is possible to improve fittability onto a rim and to suppress fracture due to collision.

The deflection temperature under load (under a load of 0.45 MPa), which is defined in ISO 75-2 or ASTM D648, of the resin material including the thermoplastic elastomer and the specific resin of the fifth aspect of the invention is preferably equal to or higher than 50° C., more preferably 50° C. to 150° C., and still more preferably 50° C. to 130° C. When the deflection temperature under load of the resin material is equal to or higher than 50° C., it is possible to suppress deformation of a tire frame even in the case in which a vulcanization step is included in the production of the tire.

Embodiment 5-1

A tire according to Embodiment 5-1 of the tire of the fifth aspect of the invention will be described below with reference to the accompanying drawings. Here, the tire according to Embodiment 5-1 is the same as described in Embodiment 1-1, except for the following points. Accordingly, the same drawings and members will be described using the same reference numerals and the same drawings.

Here, the tire case 17 according to this embodiment is formed of a mixture including a polyamide-based thermoplastic elastomer ("UBESTA XPA9048X1" manufactured by Ube Industries, Ltd. of which the glass transition temperature (Tg) of the hard segment (polyamide 12) is 40° C.) and polyphenylene ether (PPE) ("Xyron 200H" manufactured by Asahi Kasei Chemicals Corporation, Tg: 210° C.) at a mass ratio (x+y:z) of the soft segment (polyether:z) of the thermoplastic elastomer with respect to the total mass (x+y) of the hard segment (polyamide:x) and the resin (PPE:y) of 72:28.

The mass ratio between the hard segment (polyamide 12:x) and the resin (PPE:y) is 48:52.

The tire case 17 according to this embodiment is formed of a single thermoplastic resin material (a polyamide-based thermoplastic elastomer+PPE), but the fifth aspect of the invention is not limited to this configuration and the portions (such as the side portion 14, the crown portion 16, and the bead portion 12) of the tire case 17 may be formed of thermoplastic resin materials having different characteristics, similarly to typical conventional rubber pneumatic tires. A reinforcing material (such as fiber, cord, unwoven fabric, and woven fabric which are formed of a polymer material or metal) may be embedded in the tire case 17 (such as the bead portion 12, the side portion 14, and the crown portion 16) to reinforce the tire case with the reinforcing material.

The tire case 17 according to this embodiment is formed by bonding a pair of tire case half parts (tire frame pieces) 17A formed of the resin material including the polyamide-based thermoplastic elastomer and the PPE, to each other. The tire case 17A is formed by opposing annular tire case half parts 17A, in which one bead portion 12, one side portion 14, and a half-width crown portion 16 are formed as a unified body by injection molding or the like, having the same shape to each other and bonding both tire case half parts to each other at the tire equatorial plane portion. The tire case 17 is not limited to bonding two members, but may be formed by bonding three or more members. The others are the same as the tire according to Embodiment 1-1 and the production method thereof is also the same.

(Effects)

In the tire 10 according to this embodiment, since the tire case 17 is formed of the resin material including the polyamide-based thermoplastic elastomer and the PPE, the loss factor (tan δ) of the tire frame is kept low and the elastic modulus is improved, compared with a case where only the polyamide-based thermoplastic elastomer is used. Accordingly, the tire 10 has superior heat resistance and has reduced rolling resistance. Since the tire 10 has a simpler structure than a conventional rubber tire, the weight is smaller. Accordingly, the tire 10 according to this embodiment has excellent abrasion resistance and durability.

In the tire 10 according to this embodiment, since the reinforcing cord 26 having rigidity higher than the resin material is wound on the outer circumferential surface of the crown portion 16 of the tire case 17 formed of a resin material helically in the circumferential direction, puncture resistance, cutting resistance, and rigidity in the circumferential direction of the tire 10 are improved. Since the rigidity in the circumferential direction of the tire 10 is improved, it is possible to prevent creeping of the tire case 17 formed of a thermoplastic resin material.

Since at least a part of the reinforcing cord 26 is embedded in the outer circumferential surface of the crown portion 16 of the tire case 17 formed of the thermoplastic resin material and comes in close contact with the resin material in a cross-sectional view (the cross-section shown in FIG. 1) taken along the axial direction of the tire case 17, the incorporation of air at the time of production is suppressed and the movement of the reinforcing cord 26 due to a force applied thereto at the time of traveling is suppressed. Accordingly, it is possible to suppress abrasion of the reinforcing cord 26, the tire case 17, and the tread 30 and thus to improve durability of the tire 10.

In this way, when the reinforcing cord layer 28 is formed to include the resin material, it is possible to reduce the difference in hardness between the tire case 17 and the reinforcing cord layer 28 and thus to further closely contact and fix the reinforcing cord 26 with and to the tire case 17, compared with a case where the reinforcing cord 26 is fixed merely using the cushion rubber. Accordingly, it is possible to effectively prevent the above-mentioned incorporation of air and thus to effectively suppress the movement of the reinforcing cord member at the time of traveling.

When the reinforcing cord 26 is a steel cord, the reinforcing cord 26 can be easily separated and recovered from the resin material by heating at the time of disposal of the tire and thus it is advantageous in view of recyclability of the tire 10. The resin material usually has a lower loss factor (tan δ) compared with a vulcanized rubber. Accordingly, when the reinforcing cord layer 28 contains a large amount of resin material, it is possible to enhance the rolling properties of the tire. The resin material is more advantageous in that the resin material has high in-plane shear stiffness and has excellent steering stability and abrasion resistance at the time of traveling with the tire, compared with a vulcanized rubber.

As shown in FIG. 2, since the depth L of embedding of the reinforcing cord 26 is set to be equal to or more than ⅕ of the diameter D thereof, it is possible to effectively suppress the incorporation of air at the time of production and to further suppress the movement of the reinforcing cord 26 due to a force applied thereto at the time of traveling.

Since the tread 30 coming in contact with a road surface is formed of a rubber material having abrasion resistance higher than the resin material including the polyamide-based thermoplastic elastomer and the PPE, the abrasion resistance of the tire 10 is enhanced.

Since the annular bead core 18 formed of a metal material is embedded in the bead portion 12, the tire case 17, that is, the tire 10, is strongly retained in the rim 20, similarly to a conventional rubber pneumatic tire.

Since the sealing layer 24 formed of a rubber material having higher sealability than the resin material forming the tire case 17, is disposed in the part of the bead portion 12 coming in contact with the rim 20, the sealability between the tire 10 and the rim 20 is improved. Accordingly, compared with a case where the sealing is performed with the rim 20 and the resin material forming the tire case 17, air leakage from the tire is further suppressed. By disposing the sealing layer 24, fittability onto a rim are also improved.

Although it is stated in the above embodiment that the reinforcing cord 26 is heated to melt or soften the polyamide-based thermoplastic elastomer+PPE in the part coming in contact with the heated reinforcing cord 26, the fifth aspect of the invention is not limited to this configuration, but the outer circumferential surface of the crown portion 16 in which the reinforcing cord 26 is to be embedded, may be heated using a hot air generating device, and then the reinforcing cord 26 may be embedded in the crown portion 16, instead of heating the reinforcing cord 26.

Although the heat source of the cord heating device 59 includes the heater and the fan in Embodiment 5-1, the fifth aspect of the invention is not limited to this configuration, but the reinforcing cord 26 may be directly heated with radiation heat (for example, infrared rays).

Although the melted or softened portion of the thermoplastic resin material having the reinforcing cord 26 embedded therein is forcibly cooled with the second roller 64 formed of metal in Embodiment 5-1, the fifth aspect of the invention is not limited to this configuration, but cold air may be directly applied to the melted or softened portion of the thermoplastic resin material to forcibly cool and solidify the melted or softened portion of the thermoplastic resin material.

Although the reinforcing cord 26 is heated in Embodiment 5-1, for example, the outer circumference of the reinforcing cord 26 may be coated with the same thermoplastic resin material as the tire case 17. In this case, by heating the coated thermoplastic resin material along with the reinforcing cord 26 when the coated reinforcing cord is wound on the crown portion 16 of the tire case 17, it is possible to effectively suppress the incorporation of air at the time of embedding the reinforcing cord in the crown portion 16.

The helical winding of the reinforcing cord 26 is easy in production, but it can also be considered that the reinforcing cord 26 is wound discontinuously in the width direction.

The tire 10 according to Embodiment 5-1 is a so-called tubeless tire in which an air chamber is formed between the tire 10 and the rim 20 by fitting the bead portion 12 to the rim 20. However, the fifth aspect of the invention is not limited to this configuration, but the tire may have a complete tube shape.

In the complete tube-like tire, for example, as shown in FIG. 4, three tire frames having an circular shape may be arranged in the tire width direction. FIG. 4 is a cross-sectional view of a tire according to another embodiment. As shown in FIG. 4, a tire 86 includes a tread rubber layer 87, circular hollow tubes (tire frames) 88 formed of the same resin material as described in Embodiment 5-1, a belt (reinforcing cord) 89, and a rim 90. Three tubes 88 are arranged side by side in the tire width direction of the tire 86. The tread rubber layer 87 in which the belt 89 is embedded is bonded to the outer peripheral portion of the tubes 88. The tubes 88 are fitted to the rim 90 having concave portions engaging with the tubes 88. The tire 86 is not provided with a bead core.

While the fifth aspect of the invention has been described with reference to the embodiments, the embodiments are only an example and can be modified in various forms without departing from the concept thereof. The scope of the fifth aspect of the invention is not limited to the embodiments.

Embodiment 5-2

A method for producing a tire and Embodiment 5-2 of the tire of the fifth aspect of the invention will be described below with reference to the accompanying drawings. Similarly to Embodiment 5-1, the tire according to this embodiment has substantially the same cross-sectional shape as a typical conventional rubber pneumatic tire.

Here, the tire according to Embodiment 5-2 is the same as described in Embodiment 1-2, except for the following points. Accordingly, the same drawings and members will be described using the same reference numerals and the same drawings.

In the tire according to Embodiment 5-2, similarly to Embodiment 5-1, the tire case 17 is formed of a mixture including a polyamide-based thermoplastic elastomer ("UBESTA XPA9048X1" manufactured by Ube Industries, Ltd. of which the glass transition temperature (Tg) of the hard segment (polyamide 12) is 40° C.) and polyphenylene ether (PPE) ("Xyron 200H" manufactured by Asahi Kasei Chemicals Corporation, Tg: 210° C.), at a mass ratio (x+y:z) of the soft segment (polyether:z) of the thermoplastic elastomer with respect to the total mass (x+y) of the hard segment (polyamide:x) and the resin (PPE:y) of 72:28. The mass ratio between the hard segment (polyamide 12:x) and the resin (PPE:y) is 48:52. The other is the same as the tire according to Embodiment 1-2 and the production method thereof is also the same.

(Effects)

In the tire 200 according to this embodiment, since the tire case 17 is formed of the resin material including the polyamide-based thermoplastic elastomer and the PPE, the loss factor (tan δ) of the tire frame is kept low and the elastic modulus is improved, compared with a case where only the polyamide-based thermoplastic elastomer is used. Accordingly, the tire 10 has superior heat resistance and has reduced rolling resistance. Since the tire 200 has a simpler structure than a conventional rubber tire, the weight is smaller. Accordingly, the tire 200 according to this embodiment has excellent abrasion resistance and durability.

In the method for producing a tire according to this embodiment, in unifying the tire case 17, the cushion rubber 29, and the tread rubber 30A, the outer circumferential surface 17S of the tire case 17 has been subjected to the roughening treatment and thus the adhesiveness (bonding properties) is improved by the anchor effect. Since the resin material forming the tire case 17 is indented due to the collision of the blasting abrasive, the wettability of the adhesive is improved. Accordingly, the adhesive is uniformly applied to the outer circumferential surface 17S of the tire case 17 and this state is retained, whereby it is possible to secure the bonding strength between the tire case 17 and the cushion rubber 29.

Particularly, even when unevenness is formed on the outer circumferential surface 17S of the tire case 17, the blasting abrasive is made to collide with the concave portions (the gaps 28A) to perform the roughening treatment on the peripheries (concave walls, concave bottoms) of the concave portions, whereby it is possible to secure the bonding strength between the tire case 17 and the cushion rubber 29.

On the other hand, since the cushion rubber 29 is stacked in the roughened region of the outer circumferential surface 17S of the tire case 17, it is possible to effectively secure the bonding strength between the tire case 17 and the cushion rubber.

When the cushion rubber 29 is vulcanized in the vulcanization step, the cushion rubber 29 flows in the roughened unevenness formed on the outer circumferential surface 17S of the tire case 17 through the roughening treatment. When the vulcanization is completed, an anchor effect is exhibited by the cushion rubber 29 flowing in the roughened unevenness, and the bonding strength between the tire case 17 and the cushion rubber 29 is enhanced.

In the tire 200 produced by this method for producing a tire, the bonding strength between the tire case 17 and the cushion rubber 29 is secured. That is, the bonding strength between the tire case 17 and the tread 30 is secured through the cushion rubber 29. Accordingly, the abrasion of the outer circumferential surface 17S of the tire case 17 of the tire 200 from the cushion rubber 29 is suppressed.

Since the outer circumferential portion of the tire case 17 is formed of the reinforcing cord layer 28, puncture resistance and cutting resistance are improved, compared with a case where the outer circumferential portion is formed of a member other than the reinforcing cord layer 28.

Since the coated cord member 26B is wound to form the reinforcing cord layer 28, the rigidity in the circumferential direction of the tire 200 is improved. Since the rigidity in the circumferential direction is improved, creeping (a phenomenon in which the plastic deformation of the tire case 17 increases with the lapse of time under a constant stress) is suppressed and pressure resistance to air pressure from the inside in the tire diameter direction is improved.

When the reinforcing cord layer 28 is formed to include the coated cord member 26B, it is possible to reduce the difference in hardness between the tire case 17 and the reinforcing cord layer 28 and thus to further closely bring and fix the coated cord member 26B in contact with and to the tire case 17, compared with a case where the reinforcing cord 26A is fixed merely using the cushion rubber 29. Accordingly, it is possible to effectively prevent the above-mentioned incorporation of air and thus to effectively suppress the movement of the reinforcing cord member at the time of traveling.

When the reinforcing cord 26A is a steel cord, the cord member 26A can be easily separated and recovered from the coated cord member 26B by heating at the time of disposal of the tire and thus it is advantageous in view of recyclability of the tire 200. The resin material has a lower loss factor (tan δ) compared with a vulcanized rubber. Accordingly, when the reinforcing cord layer 28 contains a large amount of resin material, it is possible to enhance the rolling properties of the tire. The resin material is more advantageous in that the resin material has high in-plane shear stiffness and has excellent steering stability and abrasion resistance at the time of traveling with the tire, compared with a vulcanized rubber.

Although unevenness is formed on the outer circumferential surface 17S of the tire case 17 in this embodiment, the fifth aspect of the invention is not limited to this configuration, but the outer circumferential surface 17S may be formed to be flat.

In the tire case 17, the coated cord member wound on and bonded to the crown portion of the tire case may be covered with a coating thermoplastic material to form a reinforcing cord layer. In this case, the melted or softened coating thermoplastic material may be ejected onto the reinforcing cord layer 28 to form a coating layer. A welding sheet may be heated into a melted or softened state without using an extruder and may be attached to the surface (the outer circumferential surface) of the reinforcing cord layer 28 to form a coating layer.

Although the case sub-frames (tire case half parts 17A) are bonded to form the tire case 17 in Embodiment 5-2, the fifth aspect of the invention is not limited to this configuration, but the tire case 17 may be formed as a unified body using a mold or the like.

The tire 200 according to Embodiment 5-2 is a so-called tubeless tire in which an air chamber is formed between the tire 200 and the rim 20 by fitting the bead portion 12 to the rim 20. However, the fifth aspect of the invention is not limited to this configuration, but the tire 200 may have, for example, a complete tube shape (for example, the shape shown in FIG. 4).

Although the cushion rubber 29 is interposed between the tire case 17 and the tread 30 in Embodiment 5-2, the fifth aspect of the invention is not limited to this configuration, but the cushion rubber 29 may not be interposed therebetween.

Although the coated cord member 26B is helically wound on the crown portion 16 in Embodiment 5-2, the fifth aspect of the invention is not limited to this configuration, but the coated cord member 26B may be wound thereon to be discontinuous in the width direction.

In Embodiment 5-2, a thermoplastic material is used as the coating resin material 27 forming the coated cord member 26B, the coating resin material 27 is melted or softened by heating, and the coated cord member 26B is welded to the outer circumferential surface of the crown portion 16. However, the fifth aspect of the invention is not limited to this configuration, but the coated cord member 26B may be bonded to the outer circumferential surface of the crown portion 16 using an adhesive or the like without heating the coating resin material 27.

A thermosetting resin may be used as the coating resin material 27 forming the coated cord member 26B, and the coated cord member 26B may be bonded to the outer circumferential surface of the crown portion 16 using an adhesive or the like without heating the coated cord member 26B.

A thermosetting resin may be used as the as the coating resin material 27 forming the coated cord member 26B and the tire case 17 may be formed of a thermoplastic resin material. In this case, the coated cord member 26B may be bonded to the outer circumferential surface of the crown portion 16 using an adhesive or the like, or a part of the tire case 17 in which the coated cord member 26B is embedded may be heated to be in a melted or softened state and the coated cord member 26B may be welded to the outer circumferential surface of the crown portion 16.

A thermoplastic resin may be used as the as the coating resin material 27 forming the coated cord member 26B and the tire case 17 may be formed of a thermoplastic resin material. In this case, the coated cord member 26B may be bonded to the outer circumferential surface of the crown portion 16 using an adhesive or the like, or a part of the tire case 17 in which the coated cord member 26B is embedded may be heated into a melted or softened state, the coating resin material 27 is heated to be in a melted or softened state, and the coated cord member 26B may be welded to the outer circumferential surface of the crown portion 16. When both the tire case 17 and the coated cord member 26B may be heated to be in a melted or softened state, both are mixed with each other well and thus the bonding strength therebetween is improved. When a thermoplastic resin material is used as the resin material forming the tire case 17 and a thermoplastic resin material is used as the coating resin material 27 forming the coated cord member 26B, the same kind of thermoplastic material, particularly, the same thermoplastic material, is preferably used.

The outer circumferential surface 17S of the tire case 17 may be activated to enhance the hydrophilic property by performing a corona treatment or a plasma treatment on the outer circumferential surface 17S having been subjected to the roughening treatment, and then an adhesive may be applied thereto.

The sequence for producing the tire 200 is not limited to the sequence described in Embodiment 5-2, but may be appropriately changed.

While the fifth aspect of the invention has been described with reference to the embodiments, the embodiments are only an example and can be modified in various forms without departing from the concept thereof. The scope of the fifth aspect of the invention is not limited to the embodiments.

Sixth Aspect of the Invention

The tire of the invention according to a sixth aspect is a tire which has a circular tire frame formed of a thermoplastic resin material and in which a volume resistivity of the tire frame is in the range of $1.0 \times 10^6$ to $1.0 \times 10^{10}$.

The tire of the invention according to the sixth aspect is excellent in antistatic performance by having the above-mentioned configuration.

A tire frame which is a constituent of a tire of the invention according to the sixth aspect will be described, and specific embodiments of a tire of the invention according to the sixth aspect will be then described with reference to the accompanying drawings.

[Tire Frame]

The tire frame in the invention according to the sixth aspect is formed of a thermoplastic resin material and needs to have a volume resistivity in the range of $1.0 \times 10^6$ to $1.0 \times 10^{10}$. The volume resistivity of the tire frame is more preferably $1.0 \times 10^6$ Ω·cm to $5.0 \times 10^9$ Ω·cm and still more preferably $5.0 \times 10^6$ Ω·cm to $5.0 \times 10^9$ Ω·cm.

The volume resistivity in the invention according to the sixth aspect is a value measured using a resistivity meter "HIRESTA UP MCP-HT450" manufactured by Mitsubishi Chemical Analytech Co., Ltd. on the basis of JIS K6911: (1995).

In the invention according to the sixth aspect, the method of controlling the volume resistivity of the tire frame is not particularly limited, but a method of adding an antistatic material to the tire frame is preferable.

<Antistatic Material>

The antistatic material may be an inorganic material or an organic material, as long as it can control the volume resistivity of the tire frame to be in the range of $1.0 \times 10^6$ to $1.0 \times 10^{10}$.

The antistatic material may be a solid or a liquid.

Examples of the antistatic material include conductive polymer materials such as polyaniline, polypyrrole, and polyacetylene; ion conductors such as ammoniums salts such as perchlorate, chlorate, hydrochloride, borate, iodate, borohydrofluoride, sulfate, ethyl sulfate, carboxylate, and sulfonate of tetraethyl ammonium, tetrabutyl ammonium, dodecyl trimethyl ammonium, hexadecyl trimethyl ammonium, octadecyl trimethyl ammonium, benzyl trimethyl ammonium, and denatured aliphatic dimethyl ammonium; perchlorate, chlorate, hydrochloride, borate, iodate, borohydrofluoride, trifluoromethyl sulfate, sulfonate, and phosphoric acid esters of alkaline metals such as lithium, sodium, potassium, calcium, and magnesium, or alkaline earth metals; ionic liquids such as N,N-diethyl-N-methyl-N-(2-methoxyethyl)ammoniumtetrafluoroborate, 1-ethyl-3-methylimidazolium acetate, 1-butyl-3-methylimidazolium dicyanamide, tetrabutylammonium bromide, and trihexyltetradecyl phosphinium chloride; conductive carbons such as Ketien black and acetylene black; carbon black for rubber such as SAF, ISAF, HAF, FEF, GPF, SRF, FT, and MT; conductive carbon materials such as oxidation-treated carbon for ink, pyrolysis carbon, natural graphite, artificial graphite, vapor-grown carbon fiber (VGCF), and carbon nanotubes (CNT); conductive metal oxides such as tin oxide, titanium oxide, and zinc oxide; and metals such as nickel, copper, silver, and germanium.

Among these antistatic materials, ion conductors, carbon black, and ionic liquids are preferred, and carbon black for rubber and ion conductors such as phosphoric acid ester are more preferred, and from the viewpoint of the compatibility of antistatic properties and suppression of an increase in "tan", ion conductors such as phosphoric acid ester are even more preferable.

Examples of the phosphoric acid ester-based ion conductor that can be applied as an antistatic material include the compound represented by the following general formula (a).

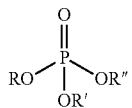

General Formula (a)

In general formula (a), R, R', and R" each independently represent a hydrogen atom or a monovalent substituent. Provided that, at least one of R, R', or R" represents a monovalent substituent.

As the antistatic material, a commercially available product may be used, and examples thereof include Elenite series, for example, Elenite 139, AB-100, 139A, A-73 R, K-320, and TS-897, manufactured by TAKAMATSU OIL&FAT CO., LTD.

The antistatic material contained in the tire skeleton form may be singular or in combination of two or more kinds thereof.

The content rate of the antistatic material is preferably from 1 mass % to 30 mass %, more preferably from 1 mass % to 20 mass %, and even more preferably from 1 mass % to 10 mass %, with respect to the total mass of the thermoplastic resin material that forms a tire frame.

By incorporating the antistatic material as one of the components containing the thermoplastic resin material that forms a tire frame, it can be contained in the tire frame.

The component contained in the thermoplastic resin material may be a thermoplastic resin or any of the components used in combination with the thermoplastic resin.

In the case where a conductive polymer material is applied as the antistatic material, a tire frame may be formed, using a conductive thermoplastic resin as the conductive polymer material, by a thermoplastic resin material including the conductive thermoplastic resin. Examples of the conductive thermoplastic resin include a thermoplastic elastomer provided with conductivity.

When an ion conductor such as phosphoric acid ester is used as the antistatic material, it is possible to suppress an increase in rolling resistance while enhancing the antistatic performance of the tire. When a conductive carbon material such as carbon black is used as the antistatic material, it is possible to exhibit a reinforcing effect of improving the tensile characteristics while enhancing the antistatic performance of the tire.

This effect can solve the problem essential to the case where a thermoplastic resin material is used as the material of the tire frame and it is thus possible to provide a safe tire with high performance.

The rolling resistance of the tire can be expressed using tan δ, which is exhibited by the thermoplastic resin material forming the tire, as an index. The loss factor (tan δ) of the thermoplastic resin material is considered to correspond to the magnitude of strain generated in the thermoplastic resin material when a stress is applied to the thermoplastic resin material. Therefore, the larger tan δ of the thermoplastic resin material forming the tire frame means that stain can be more easily generated in the tire when a stress is applied to the tire due to friction between the tire and a road surface at the time of traveling of a vehicle. As the tire generates larger strain, the rolling resistance of the tire becomes larger.

In this description, the "loss factor (tan δ)" is a value calculated by a ratio (G"/G') between the storage shear elastic modulus (G') and the loss shear elastic modulus (G") at 30° C., 20 Hz, and 1% of shearing strain and is a value representing a degree to which a material absorbs energy (converts into heat) when the material is deformed (hereinafter, also referred to as "tan δ"). Since the larger tan δ causes absorption of more energy, the rolling resistance of the tire increases and consequently serves as a reason of degradation in fuel efficiency of the tire. The tan δ of the thermoplastic elastomer can be measured by the use of a dynamic viscoelasticity measuring apparatus (Dynamic-Mechanical Analysis: DMA).

(Thermoplastic Resin Material)

The tire frame in the invention according to the sixth aspect is formed of a thermoplastic resin material.

The "thermoplastic resin material" in the invention according to the sixth aspect means a material including at least a thermoplastic resin, and the thermoplastic resin material may include components other than the thermoplastic resin.

The "thermoplastic resin" in the invention according to the sixth aspect does not include a vulcanized rubber such as conventional natural rubber or synthetic rubber.

<Thermoplastic Elastomer>

The thermoplastic resin material in the invention according to the sixth aspect includes a thermoplastic elastomer.

The "thermoplastic elastomer" in the invention according to the sixth aspect is a kind of thermoplastic resin as described above, and means a thermoplastic resin including a copolymer having a polymer constituting a crystalline hard segment with a high melting point or a hard segment with a high cohesive force and a polymer constituting a non-crystalline soft segment with a low glass transition temperature in a molecule.

Examples of the thermoplastic elastomer which can be used in the invention according to the sixth aspect include a polyamide-based thermoplastic elastomer (TPA), a polyester-based thermoplastic elastomer (TPC), a polyolefin-based thermoplastic elastomer (TPO), a polystyrene-based thermoplastic elastomer (TPS), a polyurethane-based thermoplastic elastomer (TPU), a thermoplastic cross-linked rubber (TPV), and other thermoplastic elastomers (TPZ), which are defined in JIS K6418:2007.

—Polyamide-Based Thermoplastic Elastomer—

The polyamide-based thermoplastic elastomer is a copolymer including a polymer constituting a crystalline hard segment with a high melting point and a polymer constituting a non-crystalline soft segment with a low glass transition temperature, and means a copolymer in which the main chain of the polymer constituting the hard segment has an amide bond (—CONH—). The "polyamide-based thermoplastic elastomer" in this embodiment may be the same polyamide-based thermoplastic elastomer as described in the first aspect of the invention.

—Polyester-Based Thermoplastic Elastomer—

Examples of the polyester-based thermoplastic elastomer include materials in which at least polyester constitutes a crystalline hard segment with a high melting point and another polymer (such as polyester and polyether) constitutes a non-crystalline soft segment with a low glass transition temperature. The "polyester-based thermoplastic elastomer" in this embodiment may be the same as described in the second aspect of the invention.

—Polystyrene-Based Thermoplastic Elastomer—

Examples of the polystyrene-based thermoplastic elastomer include materials in which at least polystyrene constitutes a hard segment and another polymer (such as polybutadiene, polyisoprene, polyethylene, hydrogenated polybutadiene, and hydrogenated polyisoprene) constitutes a non-crystalline soft segment with a low glass transition temperature. The "polystyrene-based thermoplastic elastomer" in this embodiment may be the same as described in the second aspect of the invention.

—Polyurethane-Based Thermoplastic Elastomer—

Examples of the polyurethane-based thermoplastic elastomer include materials in which at least polyurethane constitutes a hard segment forming a pseudo-crosslink through physical agglomeration and another polymer constitutes a non-crystalline soft segment with a low glass transition temperature. The "polyurethane-based thermoplastic elastomer" in this embodiment may be the same as described in the second aspect of the invention.

—Polyolefin-Based Thermoplastic Elastomer—

Examples of the polyolefin-based thermoplastic elastomer include materials in which at least polyolefin constitutes a crystalline hard segment with a high melting point and another polymer (such as the polyolefin described above, another polyolefin, and a polyvinyl compound) constitutes a non-crystalline soft segment with a low glass transition temperature. The "polyolefin-based thermoplastic elastomer" in this embodiment may be the same as described in the second aspect of the invention.

An acid-denatured elastomer formed by acid denaturation of a thermoplastic elastomer may be used as the thermoplastic elastomer.

An example of the "acid-denatured elastomer formed by acid denaturation of a thermoplastic elastomer" is an acid-denatured elastomer in which an acid group is introduced into the thermoplastic elastomer using a compound having an acid group. Examples of the compound having an acid group used to acid-modify the thermoplastic elastomer include unsaturated compounds having an acid group such as a carboxylic group, a sulfuric acid group, and a phosphoric acid group. As the unsaturated compound having an acid group, an unsaturated compound having a carboxylic group which is a weak acid group can be preferably used from the viewpoint of suppressing of degradation of the thermoplastic elastomer, and examples thereof include an acrylic acid, a methacrylic acid, an itaconic acid, a crotonic acid, an isocrotonic acid, and a maleic acid.

An example of the method of acid denaturation of the thermoplastic elastomer is a method of bonding the unsaturated bonding site of the unsaturated carboxylic acid to the olefin-based thermoplastic elastomer or the polystyrene-based thermoplastic elastomer through graft polymerization or the like.

The thermoplastic resin material may include two or more kinds of thermoplastic elastomers, but preferably includes one kind of thermoplastic elastomer from the viewpoint of controlling the tire performance of the tire formed using the thermoplastic resin material.

Among the above-mentioned thermoplastic elastomers, the polyamide-based thermoplastic elastomer may be preferably used from the viewpoint of excellent tensile modulus of elasticity, tensile strength, and fracture strain and weldability at a low temperature. From the viewpoint of excellent tensile modulus of elasticity, tensile strength, and fracture strain, high heat resistance, and a wide temperature setting range, the polyester-based thermoplastic elastomer may also be preferably used. Among these, the polyamide-based thermoplastic elastomer may be particularly preferably used as the thermoplastic elastomer in the invention according to the sixth aspect.

—Physical Properties of Thermoplastic Elastomer—

The tensile modulus of elasticity, which is defined in JIS K7113:1995, of the thermoplastic resin material in the invention according to the sixth aspect is preferably 100 to 1000 MPa, more preferably 100 to 800 MPa, and still more preferably 100 to 700 MPa. When the tensile modulus of elasticity of the thermoplastic resin material is 100 to 1000 MPa, it is possible to efficiently fit onto a rim while maintaining the shape of a tire frame. The elastic modulus is a value obtained by measuring a dumbbell-shaped sample piece (sample piece No. 5) defined in JIS K6251:1993 at a pulling rate of 200 mm/min by the use of Shimadzu Autograph AGS-J (5 kN) manufactured by Shimadzu Corporation.

The tensile yield strength, which is defined in JIS K7113:1995, of the thermoplastic resin material in the invention according to the sixth aspect is preferably equal to or more than 5 MPa, more preferably 5 to 20 MPa, and still more preferably 5 to 17 MPa. When the tensile yield strength of the thermoplastic resin material is equal to or more than 5 MPa, it is possible to resist deformation due to a load applied to a tire during traveling or the like.

The tensile yield elongation, which is defined in JIS K7113:1995, of the thermoplastic resin material in the invention according to the sixth aspect is preferably equal to or more than 10%, more preferably 10% to 70%, and still more preferably 15% to 60%. When the tensile yield elongation of the thermoplastic resin material is equal to or more than 10%, it is possible to increase an elastic region and to improve fittability onto a rim.

The tensile fracture elongation, which is defined in JIS K7113:1995, of the thermoplastic resin material in the invention according to the sixth aspect is preferably equal to or more than 50%, more preferably equal to or more than 100%, still more preferably equal to or more than 150%, and still more preferably equal to or more than 200%. When the tensile fracture elongation of the thermoplastic resin material is equal to or more than 50%, it is possible to improve fittability onto a rim and to suppress fracture due to collision.

The deflection temperature under load (under a load of 0.45 MPa), which is defined in ISO 75-2 or ASTM D648, of the thermoplastic resin material in the invention according to the sixth aspect is preferably equal to or higher than 50° C., more preferably 50° C. to 150° C., and still more preferably 50° C. to 130° C. When the deflection temperature under load of the thermoplastic resin material is equal to or higher than 50° C., it is possible to suppress deformation of a tire frame in a vulcanization step of a tread or the like.

The content of the thermoplastic elastomer in the thermoplastic resin material in the invention according to the sixth aspect is preferably 40 mass % to 95 mass % and more preferable 50 mass % to 90 mass %, with respect to the total mass of the thermoplastic resin material, from the viewpoint of sufficient exhibition of performance of the thermoplastic elastomer.

The thermoplastic resin material in the invention according to the sixth aspect may optionally contain various additives other than the specific needle-shaped crystal grains in addition to the antistatic material as long as they do not impair the effect of the sixth aspect of the invention. Examples of the additives include a filler, an anti-aging agent, oil, a plasticizer, a colorant, a weather resistant agent, and a reinforcing agent.

The thermoplastic resin material in the sixth aspect of the invention can be prepared as a mixture, for example, by mixing the thermoplastic elastomer, the antistatic material, and various additives which are optionally used, and melting and kneading the resultant. The thermoplastic resin material can be used optionally in a pellet shape.

The tire of the sixth aspect of the invention includes a circular tire frame (hereinafter, appropriately also referred to as a "tire case") formed of the above-mentioned thermoplastic resin material. The tire frame may be formed by molding the thermoplastic resin material into a unified body using various molding methods or may be formed by forming a pair of tire case half parts (tire frame pieces) using various molding methods and then bonding the tire case half parts. From the viewpoint of productivity, it is preferable that the tire frame be formed by bonding a pair of half case cases.

[Reinforcing Cord Layer]

The tire of the sixth aspect of the invention may have a reinforcing cord member which is wound on the outer circumferential portion of the tire frame in the circumferential direction to form a reinforcing cord layer.

The [Resin Material of Reinforcing Cord Layer] in the sixth aspect of the invention may be the same as the [Resin Material of Reinforcing Cord Layer] in the first aspect of the invention.

Specific examples of the tire of the sixth aspect of the invention will be described in more detail below with reference to Embodiments 6-1 and 6-2.

Embodiment 6-1

A tire according to Embodiment 6-1 of the tire of the sixth aspect of the invention will be described below with reference to the accompanying drawings. Here, the tire according to Embodiment 6-1 is the same as described in Embodiment 1-1, except for the following points. Accordingly, the same drawings and members will be described using the same reference numerals and the same drawings.

The tire case 17 according to this embodiment is formed of a thermoplastic resin material which is a mixture of a polyamide-based thermoplastic elastomer ("UBESTA XPA9055X1" manufactured by Ube Industries, Ltd.) and an antistatic material ("ELENITE AB-100" manufactured by Takamatsu Oil & Fat Co., Ltd.). The volume resistivity of the tire case 17 is $2.1 \times 10^9$ Ω·cm.

The tire case 17 according to this embodiment is formed of a thermoplastic resin material including a single thermoplastic elastomer and the antistatic material, but the sixth aspect of the invention is not limited to this configuration and the portions (such as the side portion 14, the crown portion 16, and the bead portion 12) of the tire case 17 may be formed of thermoplastic resin materials having different characteristics, similarly to typical conventional rubber pneumatic tires. A reinforcing material (such as fiber, cord, unwoven fabric, and woven fabric which are formed of a polymer material or metal) may be embedded in the tire case 17 (such as the bead portion 12, the side portion 14, and the crown portion 16) to reinforce the tire case 17 with the reinforcing material. The other is the same as the tire of according to Embodiment 1-1 and the production method thereof is also the same.

(Effects)

In the tire 10 according to this embodiment, since the tire case 17 is formed of the thermoplastic resin material including the polyamide-based thermoplastic elastomer and the phosphoric acid ester-based ion conductor as the antistatic material, the antistatic performance is excellent and the low tan δ characteristics (low loss or low heat-emission) are superior, compared with a case where a thermoplastic resin material including only the thermoplastic elastomer is used. Accordingly, the tire 10 exhibits excellent antistatic performance and has superior rolling resistance. Since the tire 10 has a simpler structure than a conventional rubber tire, the weight is smaller. Accordingly, the tire 10 according to this embodiment has excellent abrasion resistance and durability.

In the tire 10 according to this embodiment, since the reinforcing cord 26 having rigidity higher than the resin material is wound on the outer circumferential surface of the crown portion 16 of the tire case 17 formed of a thermoplastic resin material helically in the circumferential direction, puncture resistance, cutting resistance, and rigidity in the circumferential direction are improved. Since the rigidity in the circumferential direction of the tire 10 is improved, it is possible to prevent creeping of the tire case 17 formed of a thermoplastic resin material.

Since at least a part of the reinforcing cord 26 is embedded in the outer circumferential surface of the crown portion 16 of the tire case 17 formed of the thermoplastic resin material and comes in close contact with the resin material in a cross-sectional view (the cross-section shown in FIG. 1) taken along the axial direction of the tire case 17, the incorporation of air at the time of production is suppressed and the movement of the reinforcing cord 26 due to a force applied thereto at the time of traveling is suppressed. Accordingly, it is possible to suppress abrasion of the reinforcing cord 26, the tire case 17, and the tread 30 and thus to improve durability of the tire 10.

In this way, when the reinforcing cord layer 28 is formed to include the resin material, it is possible to reduce the difference in hardness between the tire case 17 and the reinforcing cord layer 28 and thus to further closely contact and fix the reinforcing cord 26 with and to the tire case 17, compared with a case where the reinforcing cord 26 is fixed merely using the cushion rubber. Accordingly, it is possible to effectively prevent the above-mentioned incorporation of air and thus to effectively suppress the movement of the reinforcing cord member at the time of traveling.

When the reinforcing cord 26 is a steel cord, the reinforcing cord 26 can be easily separated and recovered from the resin material by heating at the time of disposal of the tire and thus it is advantageous in view of recyclability of the tire 10. The resin material usually has a lower loss factor (tan δ) compared with a vulcanized rubber. Accordingly, when the reinforcing cord layer 28 contains a large amount of resin material, it is possible to enhance the rolling properties of the tire. The resin material is more advantageous in that the resin material has high in-plane shear stiffness and has excellent steering stability and abrasion resistance at the time of traveling with the tire, compared with a vulcanized rubber.

As shown in FIG. 2, since the depth L of embedding of the reinforcing cord 26 is set to be equal to or more than ⅕ of the diameter D thereof, it is possible to effectively suppress the incorporation of air at the time of production and to further suppress the movement of the reinforcing cord 26 due to a force applied thereto at the time of traveling.

Since the tread 30 coming in contact with a road surface is formed of a rubber material having abrasion resistance higher than the resin material including first and second thermoplastic elastomers, the abrasion resistance of the tire 10 is enhanced.

Since the annular bead core 18 formed of a metal material is embedded in the bead portion 12, the tire case 17, that is, the tire 10, is strongly retained in the rim 20, similarly to a conventional rubber pneumatic tire.

Since the sealing layer 24 formed of a rubber material having higher sealability than the resin material forming the tire case 17 is disposed in the part of the bead portion 12 coming in contact with the rim 20, the sealability between the tire 10 and the rim 20 is improved. Accordingly, compared with a case where the sealing is performed with the rim 20 and the resin material forming the tire case 17, air leakage from the tire is further suppressed. By disposing the sealing layer 24, fittability onto a rim are also improved.

Although it is stated in Embodiment 6-1 that the reinforcing cord 26 is heated to melt or soften the thermoplastic resin material in the part coming in contact with the heated reinforcing cord 26, the sixth aspect of the invention is not limited to this configuration, but the outer circumferential surface of the crown portion 16 where the reinforcing cord 26 is to be embedded therein may be heated using a hot air generating device, and then the reinforcing cord 26 may be embedded in the crown portion 16, instead of heating the reinforcing cord 26.

Although the heater and the fan are adopted as the heat source of the cord heating device 59 in Embodiment 6-1, the sixth aspect of the invention is not limited to this configuration, but the reinforcing cord 26 may be directly heated with radiation heat (for example, infrared rays).

Although the melted or softened portion of the thermoplastic resin material having the reinforcing cord 26 embedded therein is forcibly cooled with the second roller 64 formed of metal in Embodiment 6-1, the sixth aspect of the invention is not limited to this configuration, but cold air may be directly applied to the melted or softened portion of the thermoplastic resin material to forcibly cool and solidify the melted or softened portion of the thermoplastic resin material.

Although the reinforcing cord 26 is heated in Embodiment 6-1, for example, the outer circumference of the reinforcing cord 26 may be coated with the same thermoplastic resin material as the tire case 17. In this case, by heating the coated thermoplastic resin material along with the reinforcing cord 26 when the coated reinforcing cord is wound on the crown portion 16 of the tire case 17, it is possible to effectively suppress the incorporation of air at the time of embedding the reinforcing cord in the crown portion 16.

The helical winding of the reinforcing cord 26 is easy in production, but it can also be considered that the reinforcing cord 26 is wound discontinuously in the width direction.

The tire 10 according to Embodiment 6-1 is a so-called tubeless tire in which an air chamber is formed between the tire 10 and the rim 20 by fitting the bead portion 12 to the rim 20. However, the sixth aspect of the invention is not limited to this configuration, but the tire may have a complete tube shape.

In the complete tube-like tire, for example, as shown in FIG. 4, three tire frames having a circular shape may be arranged in the tire width direction. FIG. 4 is a cross-sectional view of a tire according to another embodiment. As shown in FIG. 4, a tire 86 includes a tread rubber layer 87, circular hollow tubes (tire frames) formed of the same resin material as described in Embodiment 6-1, a belt (reinforcing cord) 89, and a rim 90. Three tubes 88 are arranged side by side in the tire width direction of the tire 86. The tread rubber layer 87 in which the belt 89 is embedded is bonded to the outer peripheral portion of the tubes 88. The tubes 88 are fitted to the rim 90 having concave portions engaging with the tubes 88. The tire 86 is not provided with a bead core.

While the sixth aspect of the invention has been described with reference to the embodiments, the embodiments are only an example and can be modified in various forms without departing from the concept thereof. The scope of the sixth aspect of the invention is not limited to the embodiments.

Embodiment 6-2

An Embodiment 6-2 of the tire of the sixth aspect of the invention will be described below with reference to the accompanying drawings.

Here, the tire according to Embodiment 6-2 is the same as described in Embodiment 1-2, except for the following points. Accordingly, the same drawings and members will be described using the same reference numerals and the same drawings.

Similarly to Embodiment 6-1, the tire case 17 of the tire according to Embodiment 6-2 is formed of a thermoplastic resin material which is a mixture of a polyamide-based thermoplastic elastomer ("UBESTA XPA9055X1" manufactured by Ube Industries, Ltd.) and an antistatic material ("ELENITE AB-100" manufactured by Takamatsu Oil & Fat Co., Ltd.). The volume resistivity of the tire case 17 is $2.1 \times 10^9$ Ω·cm. The other is the same as the tire according to Embodiment 1-2 and the production method thereof is also the same.

(Effects)

In the tire 200 according to this embodiment, since the tire case 17 is formed of the thermoplastic resin material including the polyamide-based thermoplastic elastomer and the phosphoric acid ester-based ion conductor as the antistatic material, the antistatic performance is excellent and the low tan δ characteristics (low loss or low heat-emission) are superior, compared with a case where a thermoplastic resin material including only the thermoplastic elastomer is used.

Accordingly, the tire 200 exhibits excellent antistatic performance and has superior low tan δ characteristics (low loss or low heat-emission). Since the tire 200 has a simpler structure than a conventional rubber tire, the weight is smaller. Accordingly, the tire 200 according to this embodiment has excellent abrasion resistance and durability.

In the method for producing a tire according to this embodiment, in unifying the tire case 17, the cushion rubber 29, and the tread rubber 30A, the outer circumferential surface 17S of the tire case 17 has been subjected to the roughening treatment and thus the adhesiveness (bonding properties) is improved by the anchor effect. Since the resin material forming the tire case 17 is indented due to the collision of the blasting abrasive, the wettability of the adhesive is improved. Accordingly, the adhesive is uniformly applied to the outer circumferential surface 17S of the tire case 17 and this state is retained, whereby it is possible to secure the bonding strength between the tire case 17 and the cushion rubber 29.

Particularly, even when unevenness is formed on the outer circumferential surface 17S of the tire case 17, the blasting abrasive is made to collide with the concave portions (the gaps 28A) to perform the roughening treatment on the peripheries (concave walls, concave bottoms) of the concave portions, whereby it is possible to secure the bonding strength between the tire case 17 and the cushion rubber 29.

On the other hand, since the cushion rubber 29 is stacked in the roughened region of the outer circumferential surface 17S of the tire case 17, it is possible to effectively secure the bonding strength between the tire case 17 and the cushion rubber.

When the cushion rubber 29 is vulcanized in the vulcanization step, the cushion rubber 29 flows in the roughened unevenness formed on the outer circumferential surface 17S of the tire case 17 through the roughening treatment. When the vulcanization is completed, an anchor effect is exhibited by the cushion rubber 29 flowing in the roughened unevenness, and the bonding strength between the tire case 17 and the cushion rubber 29 is enhanced.

In the tire 200 produced by this method for producing a tire, the bonding strength between the tire case 17 and the cushion rubber 29 is secured. That is, the bonding strength between the tire case 17 and the tread 30 is secured through the cushion rubber 29. Accordingly, the abrasion of the outer circumferential surface 17S of the tire case 17 of the tire 200 from the cushion rubber 29 is suppressed.

Since the outer circumferential portion of the tire case 17 is formed of the reinforcing cord layer 28, puncture resistance and cutting resistance are improved, compared with a case where the outer circumferential portion is formed of a member other than the reinforcing cord layer 28.

Since the coated cord member 26B is wound to form the reinforcing cord layer 28, the rigidity in the circumferential direction of the tire 200 is improved. Since the rigidity in the circumferential direction is improved, creeping of the tire case 17 (a phenomenon in which the plastic deformation of the tire case 17 increases with the lapse of time under a constant stress) is suppressed and pressure resistance to air pressure from the inside in the tire diameter direction is improved.

When the reinforcing cord layer 28 is formed to include the coated cord member 26B, it is possible to reduce the difference in hardness between the tire case 17 and the reinforcing cord layer 28 and thus to further closely bring and fix the coated cord member 26B in contact with and to the tire case 17, compared with a case where the reinforcing cord 26A is fixed merely using the cushion rubber 29. Accordingly, it is possible to effectively prevent the above-mentioned incorporation of air and thus to effectively suppress the movement of the reinforcing cord member at the time of traveling.

When the reinforcing cord 26A is a steel cord, the cord member 26A can be easily separated and recovered from the coated cord member 26B by heating at the time of disposal of the tire and thus it is advantageous in view of recyclability of the tire 200. The resin material has a lower loss factor (tan d) compared with a vulcanized rubber. Accordingly, when the reinforcing cord layer 28 contains a large amount of resin material, it is possible to enhance the rolling properties of the tire. The resin material is more advantageous in that the resin material has high in-plane shear stiffness and has excellent steering stability and abrasion resistance at the time of traveling with the tire, compared with a vulcanized rubber.

Although unevenness is formed on the outer circumferential surface 17S of the tire case 17 in this embodiment, the sixth aspect of the invention is not limited to this configuration, but the outer circumferential surface 17S may be formed to be flat.

In the tire case 17, the coated cord member wound on and bonded to the crown portion of the tire case may be covered with a coating thermoplastic material to form a reinforcing cord layer. In this case, the melted or softened coating thermoplastic material may be ejected onto the reinforcing cord layer 28 to form a coating layer. A welding sheet may be heated into a melted or softened state without using an extruder and may be attached to the surface (the outer circumferential surface) of the reinforcing cord layer 28 to form a coating layer.

Although the tire case half parts 17A are bonded to form the tire case 17 in Embodiment 6-2, the sixth aspect of the invention is not limited to this configuration, but the tire case 17 may be formed as a unified body using a mold or the like.

The tire 200 according to Embodiment 6-2 is a so-called tubeless tire in which an air chamber is formed between the tire 200 and the rim 20 by fitting the bead portion 12 to the rim 20. However, the sixth aspect of the invention is not limited to this configuration, but the tire 200 may have, for example, a complete tube shape (for example, the shape shown in FIG. 4).

Although the cushion rubber 29 is interposed between the tire case 17 and the tread 30 in Embodiment 6-2, the sixth aspect of the invention is not limited to this configuration, but the cushion rubber 29 may not be interposed therebetween.

Although the coated cord member 26B is helically wound on the crown portion 16 in Embodiment 6-2, the sixth aspect of the invention is not limited to this configuration, but the coated cord member 26B may be wound thereon to be discontinuous in the width direction.

In Embodiment 6-2, a thermoplastic material is used as the coating resin material 27 forming the coated cord member 26B, the coating resin material 27 is melted or softened by heating, and the coated cord member 26B is welded to the outer circumferential surface of the crown portion 16. However, the sixth aspect of the invention is not limited to this configuration, but the coated cord member 26B may be bonded to the outer circumferential surface of the crown portion 16 using an adhesive or the like without heating the coating resin material 27.

A thermosetting resin may be used as the coating resin material 27 forming the coated cord member 26B, and the coated cord member may be bonded to the outer circumferential surface of the crown portion 16 using an adhesive or the like without heating the coated cord member 26B.

A thermosetting resin may be used as the as the coating resin material 27 forming the coated cord member 26B and the tire case 17 may be formed of a thermoplastic resin material. In this case, the coated cord member 26B may be bonded to the outer circumferential surface of the crown portion 16 using an adhesive or the like, or a part of the tire case 17 in which the coated cord member 26B is embedded may be heated to be in a melted or softened state and the coated cord member 26B may be welded to the outer circumferential surface of the crown portion 16.

A thermoplastic resin may be used as the as the coating resin material 27 forming the coated cord member 26B and the tire case 17 may be formed of a thermoplastic resin material. In this case, the coated cord member 26B may be bonded to the outer circumferential surface of the crown portion 16 using an adhesive or the like, or a part of the tire case 17 in which the coated cord member 26B is embedded may be heated into a melted or softened state, the coating resin material 27 is heated to be in a melted or softened state, and the coated cord member 26B may be welded to the outer circumferential surface of the crown portion 16. When both the tire case 17 and the coated cord member 26B may be heated to be in a melted or softened state, both are mixed with each other well and thus the bonding strength therebetween is improved. When a thermoplastic resin material is used as the resin material forming the tire case 17 and a thermoplastic resin material is used as the coating resin material 27 forming the coated cord member 26B, the same kind of thermoplastic material, particularly, the same thermoplastic material, is preferably used.

The outer circumferential surface 17S of the tire case 17 may be activated to enhance the hydrophilic property by performing a corona process or a plasma process on the outer circumferential surface 17S having been subjected to the roughening treatment, and then an adhesive may be applied thereto.

The sequence for producing the tire 200 is not limited to the sequence described in Embodiment 6-2, but may be appropriately changed.

While the sixth aspect of the invention has been described with reference to the embodiments, the embodiments are only an example and can be modified in various forms without departing from the concept thereof. The scope of the sixth aspect of the invention is not limited to the embodiments.

Seventh Aspect of the Invention

Next, a thermoplastic resin material as a component of the tire frame according to a seventh aspect of the invention will be described, and, subsequently, a specific embodiment of the tire of the invention according to the seventh aspect will be described using the drawings.

[Thermoplastic Resin Material]

The tire according to the seventh aspect of the invention includes a circular tire frame formed of a thermoplastic resin material, in which the thermoplastic resin material includes a thermoplastic elastomer including a hard segment and a soft segment in a molecule thereof, and a resin of the same kind as the hard segment, which is other than the thermoplastic elastomer.

It is possible to make it difficult for the rolling resistance of the tire to increase even when the elastic modulus of the thermoplastic resin material is large by applying a combination of a thermoplastic elastomer and a resin of the same kind as the hard segment included in the thermoplastic elastomer, which is other than the thermoplastic elastomer, (the specific resin according to the seventh aspect of the invention) as the thermoplastic resin material as a component of the circular tire frame that forms the tire.

Hereinafter, the thermoplastic elastomer and the specific resin according to the seventh aspect of the invention will be described.

[Thermoplastic Elastomer]

The "thermoplastic elastomer" refers to a thermoplastic resin material including a hard segment and a soft segment in the molecule as described above, and, in detail, to a thermoplastic resin material which is an elastic macromolecular compound and is formed of a copolymer having a polymer constituting a hard segment that is crystalline and has a high melting point, and a polymer constituting a soft segment that is non-crystalline and has a low glass transition temperature. Meanwhile, the thermoplastic elastomer does not include vulcanized rubber, such as natural rubber or synthetic rubber of the related art.

Examples of the thermoplastic elastomer include polyamide-based thermoplastic elastomers, polyolefin-based thermoplastic elastomers, polystyrene-based thermoplastic elastomers, polyester-based thermoplastic elastomers and the like.

(Polyamide-Based Thermoplastic Elastomer)

The "polyamide-based thermoplastic elastomer" is an elastic macromolecular compound, and refers to an elastomer that is a thermoplastic resin material formed of a copolymer having a polymer constituting a hard segment that is crystalline and has a high melting point, and a polymer constituting a soft segment that is amorphous and has a low glass transition temperature, and has an amid bond (—CONH—) in the main chain of the polymer constituting the hard segment.

Examples of crystalline polyamide constituting the hard segment include aliphatic polyamides, such as polycaproamide (nylon-6), poly-ω-aminoheptanoic acid (nylon-7), poly-ω-aminononanoic acid (nylon-9), polyundecaneamide (nylon-11), polylauryl lactam (nylon-12), polyethylene diamine adipamide (nylon-2,6), polytetramethylene adipamide (nylon-4,6), polyhexamethylene adipamide (nylon-6,6), polyhexamethylene sebacamide (nylon-6,10), polyhexamethylene dodecamide (nylon-6,12), polyoctamethylene adipamide (nylon-8,6) and polydecamethylene adipamide (nylon-10,8); crystalline aromatic polyamides obtained through a polycondensation reaction between an aromatic diamine, such as meta-xylene diamine or para-xylene diamine, and a dicarboxylic acid, such as adipic acid, suberic acid, sebacic acid, cyclohexane dicarboxylic acid, terephthalic acid or isophthalic acid, or a derivative thereof; and the like.

Among the above, nylon-6, nylon-6,6, nylon-12 and the like are preferable, and nylon-12 is more preferable. As the "polyamide-based thermoplastic elastomer" in the present embodiment, the same polyamide-based thermoplastic elastomer as in the invention according to the above first aspect can be used.

(Polyolefin-Based Thermoplastic Elastomer)

The "polyolefin-based thermoplastic elastomer" is an elastic macromolecular compound, and refers to a thermoplastic resin material formed of a copolymer having a polymer constituting a hard segment that is crystalline and has a high melting point, and a polymer constituting a soft segment that is non-crystalline and has a low glass transition temperature. The "polyolefin-based thermoplastic elastomer" in the embodiment is the same as in the above second aspect of the invention.

(Polystyrene-Based Thermoplastic Elastomer)

The "polystyrene-based thermoplastic elastomer" is an elastic macromolecular compound, and refers to a thermoplastic resin material formed of a copolymer having a polymer constituting the hard segment, and a polymer constituting a soft segment that is non-crystalline and has a low glass transition temperature, in which the polymer constituting the hard segment includes polystyrene and a polystyrene derivative. The "polystyrene-based thermoplastic elastomer" in the embodiment is the same as in the above second aspect of the invention.

(Polyester-Based Thermoplastic Elastomer)

The polyester-based thermoplastic elastomer according to the seventh aspect of the invention is an elastic macromolecular compound, and refers to a thermoplastic resin material formed of a copolymer having a polymer constituting a hard segment that is crystalline and has a high melting point, and a polymer constituting a soft segment that is non-crystalline and has a low glass transition temperature, in which a polyester resin is included as the polymer constituting the hard segment. The "polyester-based thermoplastic elastomer" in the embodiment is the same as in the above second aspect of the invention.

The thermoplastic resin material may include two or more thermoplastic elastomers, but the thermoplastic resin material preferably includes one thermoplastic elastomer from the viewpoint of controlling the tire performances of a tire formed using the thermoplastic resin material.

Among the thermoplastic elastomers described above, the polyamide-based thermoplastic elastomer is preferable since the polyamide-based thermoplastic elastomer has thermal resistance and is excellent in term of tensile modulus of elasticity, tensile strength and fracture strain.

[Resin of the Same Kind (Specific Resin According to the Seventh Aspect of the Invention)]

The thermoplastic resin includes a resin of the same kind as the hard segment included in the thermoplastic elastomer, which is other than the thermoplastic elastomer, (the specific resin according to the seventh aspect of the invention).

The "resin of the same kind as the hard segment" included in the thermoplastic elastomer refers to a resin having a skeleton which is common to the skeleton constituting the main chain of the hard segment included in the thermoplastic elastomer, and the resin according to the seventh aspect of the invention refers to a thermoplastic or thermosetting resin, but does not encompass vulcanized rubber, such as natural rubber or synthetic rubber of the related art.

Specifically, when the thermoplastic elastomer included in the thermoplastic resin material is a polyamide-based thermoplastic elastomer, a polyamide-based resin may be used as the specific resin according to the seventh aspect of the invention; when the thermoplastic elastomer is a polyolefin-based thermoplastic elastomer, a polyolefin-based resin may be used as the specific resin according to the seventh aspect of the invention; and when the thermoplastic elastomer is a polystyrene-based thermoplastic elastomer, a polystyrene-based resin may be used as the specific resin according to the seventh aspect of the invention.

(Polyamide-Based Resin)

The polyamide-based resin refers to a resin having an amide bond (—NHCO—) in the main chain, and may be thermosetting or thermoplastic.

Examples of the polyamide-based resin include aliphatic polyamides, such as polycaproamide (nylon-6), poly-ω-aminoheptanoic acid (nylon-7), poly-ω-aminononanoic acid (nylon-9), polyundecaneamide (nylon-11), polylauryl lactam (nylon-12), polyethylene diamine adipamide (nylon-2,6), polytetramethylene adipamide (nylon-4,6), polyhexamethylene adipamide (nylon-6,6), polyhexamethylene sebacamide (nylon-6,10), polyhexamethylene dodecamide (nylon-6,12), polyoctamethylene adipamide (nylon-8,6) and polydecamethylene adipamide (nylon-10,8); crystalline aromatic polyamides obtained through a polycondensation reaction between an aromatic diamine, such as meta-xylene diamine or para-xylene diamine, and a dicarboxylic acid, such as adipic acid, suberic acid, sebacic acid, cyclohexane dicarboxylic acid, terephthalic acid or isophthalic acid, or a derivative thereof, and the like.

Among the above, nylon-6, nylon-6,6, nylon-12 and the like are preferable, and nylon-12 is more preferable.

Examples of the above polyamide-based resin include UBESTA (for example, 3014U, 3020U or the like) manufactured by Ube Industries, Ltd. and VESTAMID (for example, L1600, L1700 or the like) manufactured by Daicel-Evonik Ltd.

(Polyolefin-Based Resin)

The polyolefin-based resin has a principle chain of a polyolefin, such as ethylene, propylene or 1-butene, and may be thermosetting or thermoplastic.

Examples of the polyolefin-based resin include polyethylene, polypropylene, polybutene, a cyloolefin-based resin, a copolymer of these resins, and the like.

Among the above, from the viewpoint of increasing the elastic modulus of the thermoplastic resin material, polyethylene and polypropylene are preferable, and polypropylene and an ethylene-propylene copolymer are more preferable.

The number average molecular weight of the polyolefin-based resin is preferably 5,000 to 10,000,000 from the viewpoint of melt moldability. When the number average molecular weight is less than 5,000, there is a concern that the mechanical properties of a resin composite may degrade. When the number average molecular weight exceeds 10,000,000, there is a concern that a problem may be caused with the workability of a resin composite. For the same reasons as above, the number average molecular weight of the polyolefin-based resin is 7,000 to 1,000,000. The number average molecular weight of the polyolefin-based resin is particularly preferably 10,000 to 1,000,000. Thereby, the mechanical properties and workability of a resin composite can be further improved.

Examples of the above polyolefin-based resin include commercially available products of PRIME PP (registered trademark) of Prime Polymer Co., Ltd., NOVATEC PP (registered trademark) and WINTEC (registered trademark) of Japan Polypropylene Corporation, and the like.

(Polystyrene-Based Resin)

The polystyrene-based resin refers to a resin including polystyrene, and may be thermosetting or thermoplastic. The polystyrene-based resin may include one or more polymers which are not the polymer that can constitute the soft segment of the polystyrene-based thermoplastic elastomer as copolymerization components.

The number average molecular weight of the polystyrene-based resin is preferably 5,000 to 10,000,000 from the viewpoint of melt moldability. When the number average molecular weight is less than 5,000, there is a concern that the mechanical properties of a resin composite may degrade. When the number average molecular weight exceeds 10,000,000, there is a concern that a problem may be caused with the workability of a resin composite. For the same reasons as above, the number average molecular weight of the polystyrene-based resin is 7,000 to 1,000,000. The number average molecular weight of the polystyrene-based resin is particularly preferably 10,000 to 1,000,000. Thereby, the mechanical properties and workability of a resin composite can be further improved.

Examples of the above polystyrene-based resin that can be used include commercially available products of ZAREK (registered trademark) manufactured by Idemitsu Kosan Co., Ltd., TOYO STYROL (registered trademark) manufactured by Toyo-Styrene Co., Ltd., CEVIAN manufactured by Daicel Polymer Ltd., TECHNO ABS manufactured by Techno Polymer Co., Ltd., and the like.

[Polyester Resin]

The thermoplastic resin material includes a polyester resin other than the thermoplastic elastomer. The polyester-based resin refers to a resin having an ester bond in the main chain.

The polyester resin is not particularly limited, but is preferably a resin of the same kind as the polyester resin included in the hard segment in the polyester-based thermoplastic elastomer, and is more preferably crystalline polyester.

As the crystalline polyester, an aromatic polyester can be used. The aromatic polyester can be formed from, for example, an aromatic dicarboxylic acid or an ester-forming derivative and an aliphatic diol.

Examples of the aromatic polyester include polyethylene terephthalate, polybutylene terephthalate, polystyrene terephthalate, polyethylene naphthalate, polybutylene naphthalate, and the like, and polybutylene terephthalate is preferable.

Examples of the aromatic polyester include polybutylene terephthalate derived from terephthalic acid and/or dimethyl terephthalate and 1,4-butanediol, and, furthermore, the aromatic polyester may be a polyester derived from a dicarboxylic acid component, such as isophthalic acid, phthalic acid, naphthalene-2,6-dicarboxylic acid, naphthalene-2,7-dicarboxylic acid, diphenyl-4,4'-dicarboxylic acid, diphenoxyethane dicarboxylic acid, 5-sulfoisophthalic acid, or an ester-forming derivative thereof and a diol having a molecular weight of 300 or less [for example, an aliphatic diol, such as ethylene glycol, trimethylene glycol, pentamethylene glycol, hexamethylene glycol, neopentyl glycol or decamethylene glycol; an alicyclic diol, such as 1,4-cyclohexane dimethanol or tricyclodecane dimethylol; or an aromatic diol, such as xylene glycol, bis(p-hydroxy)diphenyl, bis(p-hydroxyphenyl)propane, 2,2-bia[4-(2-hydroxyethoxy)phenyl]propane, bis[4-(2-hydroxy)phenyl]sulfone, 1,1-bis[4-(2-hydroxyethoxy)phenyl]cyclohexane, 4,4'-dihydroxy-p-terphenyl or 4,4'-dihydroxy-p-quarterphenyl], or a copolymerized polyester for which two or more of the dicarboxylic acid component and the diol component are used in combination. In addition, a trifunctional or more polyfunctional carboxylic acid component, polyfunctional oxyacid component, polyfunctional hydroxyl component, or the like can be copolymerized within a range of 5 mole % or less.

As the above polyester resin, a commercially available product can be used, and examples thereof include "JURANEX" series (for example, 2000, 2002, and the like) manufactured by Polyplastic Co., Ltd., NOVADURAN series (for example, 5010R5, 5010R3-2, and the like) manufactured by Mitsubishi Engineering Plastics Corporation, "TORECON" series (for example, 1401X06, 1401X31, and the like) manufactured by Toray Industries, Inc., and the like.

In addition, the elastic modulus of the polyester resin is preferably 700 MPa or more, and more preferably from 800 MPa to 3000 MPa from the viewpoint of increasing the elastic modulus of the thermoplastic resin material. Meanwhile, the elastic modulus of the polyester resin refers to the tensile modulus of elasticity regulated in JIS K7113:1995, and the elastic modulus of the specific resin according to the seventh aspect of the invention can be measured using, for example, a precision universal tester AUTOGRAPH manufactured by Shimadzu Corporation.

In addition, the elastic modulus of the specific resin according to the seventh aspect of the invention is preferably 100 MPa or more, more preferably from 100 MPa to 3000 MPa, and still more preferably from 100 MPa to 2000 MPa from the viewpoint of increasing the elastic modulus of the thermoplastic resin material. Meanwhile, the elastic modulus of the specific resin according to the seventh aspect of the invention refers to the tensile modulus of elasticity regulated in JIS K7113:1995, and the elastic modulus of the specific resin according to the seventh aspect of the invention can be measured using, for example, a precision universal tester AUTOGRAPH manufactured by Shimadzu Corporation.

The thermoplastic resin material may include two or more resins. However, at least one of the resins needs to be a resin of the same kind as the hard segment included in the thermoplastic elastomer included in the thermoplastic resin material (the specific resin according to the seventh aspect of the invention). In addition, two or more kinds of the specific resin according to the seventh aspect of the invention may also be included in the thermoplastic resin material; however, since the thermoplastic resin material preferably includes one thermoplastic elastomer as described above, the thermoplastic resin material also preferably includes one kind of the specific resin according to the seventh aspect of the invention.

Since the polyamide-based thermoplastic elastomer is preferably used as the thermoplastic elastomer included in the thermoplastic resin material as described above, the specific resin according to the seventh aspect of the invention is preferably a polyamide-based resin, and more preferably a polyamide-based thermoplastic resin.

In the thermoplastic resin material, the quantitative ratio between the thermoplastic elastomer and the specific resin according to the seventh aspect of the invention (thermoplastic elastomer: the specific resin according to the seventh aspect of the invention) is preferably, by mass standard, 95:5 to 50:50, and more preferably 90:10 to 50:50 from the viewpoint of impact resistance.

In addition, the content of the thermoplastic elastomer in the thermoplastic resin material is preferably from 40 mass % to 95 mass %, and more preferably from 50 mass % to 90 mass % with respect to the total mass of the thermoplastic resin material from the viewpoint of the sufficient development of the performances of the thermoplastic elastomer.

The thermoplastic resin material may contain a variety of fillers (for example, silica, calcium carbonate and clay) and a variety of additives, such as an age inhibitor, oil, a plasticizer, a coloring agent, a weather-resisting agent and a reinforcing material, as desired.

The thermoplastic resin material can be obtained by mixing the thermoplastic elastomer and the specific resin according to the seventh aspect of the invention, adding a variety of additives as necessary, and melting and mixing the components. The mixing ratio between the thermoplastic elastomer and the specific resin according to the seventh aspect of the invention follows the fractions described above. The thermoplastic resin material obtained through melting and mixing can be used in a pellet shape as necessary.

The tensile modulus of elasticity of the thermoplastic resin material according to the seventh aspect of the invention, which is regulated in JIS K7113:1995, is preferably from 100 MPa to 1000 MPa, more preferably from 100 MPa to 800 MPa, and particularly preferably from 100 MPa to 700 MPa. When the tensile modulus of elasticity of the polyamide-based thermoplastic elastomer is from 100 MPa to 1000 MPa, fitting onto a rim can be efficiently carried out while holding the shape of the tire frame.

The tensile yield strength of the thermoplastic resin material according to the seventh aspect of the invention, which is regulated in JIS K7113:1995, is preferably 5 MPa or more, preferably from 5 MPa to 20 MPa, and still more preferably from 5 MPa to 17 MPa. When the tensile yield strength of the thermoplastic resin material is 5 MPa or more, it is possible to withstand deformation caused by a load applied to the tire while travelling and the like.

The tensile yield elongation of the thermoplastic resin material according to the seventh aspect of the invention, which is regulated in JIS K7113:1995, is preferably 10% or more, preferably from 10% to 70%, and still more preferably from 15% to 60%. When the tensile yield elongation of the thermoplastic resin material is 10% or more, it is possible to increase the elastic area and improve fittability onto a rim.

The tensile fracture elongation of the thermoplastic resin material according to the seventh aspect of the invention, which is regulated in JIS K7113:1995, is preferably 50% or more, preferably 100% or more, still more preferably 150% or more, and particularly preferably 200% or more. When the tensile elongation at break of the thermoplastic resin material is 50% or more, it is possible to improve fittability onto a rim and make the thermoplastic resin material resistant to fracture due to collision.

The deflection temperature under load (under a load of 0.45 MPa) of the thermoplastic resin material according to the seventh aspect of the invention, which is regulated in ISO75-2 or ASTM D648, is preferably 50° C. or more, preferably from 50° C. to 150° C., and still more preferably from 50° C. to 130° C. When the deflection temperature under load of the thermoplastic resin material is 50° C. or more, it is possible to suppress deflection in a curing step, such as treading.

[Resin Material as a Component of the Reinforcing Cord Layer]

The tire according to the seventh aspect of the invention may have a reinforcing cord member that is wound on the outer circumferential portion of the tire frame in the circumferential direction so as to form a reinforcing cord layer. The "resin material as a component of the reinforcing cord layer" according to the seventh aspect of the invention is the same as the above "resin material as a component of the reinforcing cord layer" according to the first aspect of the invention.

Embodiment 7-1

Hereinafter, a tier according to Embodiment 7-1 of the tire of the invention according to the seventh aspect will be described according to the drawings. Here, the tire according to Embodiment 7-1 is the same as the above Embodiment 1-1 except for the following facts. Therefore, the same reference signs and drawings will be used in the description regarding the same drawings and members.

The tire case 17 of the present embodiment is formed of a thermoplastic resin material configured of a mixed material of a polyamide-based thermoplastic elastomer ("UBESTA, XPA9055X1" manufactured by Ube Industries, Ltd.) and a polyamide-based thermoplastic resin ("UBESTA, 3014U" manufactured by Ube Industries, Ltd.). In the embodiment, the tire case 17 is formed only of the thermoplastic resin material according to the seventh aspect of the invention, but the invention according to the seventh aspect is not limited to this configuration, and, similarly to an ordinary pneumatic rubber tire of the related art, different thermoplastic resin materials having different characteristics may be used in the respective portions (side portion 14, crown portion 16, bead portion 12, and the like) of the tire case 17. In addition, the tire case 17 may be reinforced using a reinforcing material (a macromolecular material, metal fabric, cord, non-woven fabric, woven fabric, or the like) by embedding and disposing the reinforcing material in the tire case 17 (for example, bead portion 12, side portion 14, crown portion 16, and the like).

The tire case 17 of the embodiment is a pair of mutually-bonded tire case half parts (tire frame pieces) 17A that are formed of the thermoplastic resin material according to the seventh aspect of the invention. The tire case half part 17A is formed by disposing the circular tire case half parts 17A, which each have the same shape and have been formed by integrating a bead portion 12, a side portion 14 and a half-width crown portion 16 through injection molding or the like, so as to face each other, and bonding the tire case half parts 17A at the tire equatorial plane portion. The thermoplastic resin material according to the seventh aspect of the invention includes a polyamide-based thermoplastic elastomer and the specific resin according to the seventh aspect of the invention. Other portions are the same as in the tire according to the above Embodiment 1-1, and the manufacturing method is also the same.

(Effects)

In the tire 10 of the embodiment, since the tire case 17 is formed of the thermoplastic resin material, even when the elastic modulus of the thermoplastic resin material is increased, the tan δ of the thermoplastic resin material is not easily increased, and the rolling resistance of the tire can be suppressed, furthermore, since the tire structure can be simplified, the weight is light compared to rubber of the related art. Therefore, when the tire 10 of the embodiment is applied to an automobile, since the rolling resistance is suppressed, and the weight of the tire can be decreased, it is possible to improve the gas mileage of an automobile in which the tire is used.

In addition, when the thermoplastic resin material includes the polyamide-based thermoplastic elastomer, since the polyamide-based thermoplastic elastomer has a high adhesion to a reinforcing cord 26, and, furthermore, is excellent in terms of fixing performances, such as weld strength, it is possible to particularly suppress a phenomenon in which air remains around the reinforcing cord 26 in a reinforcing cord winding process (incorporation of air). When the adhesion and weldability to the reinforcing cord 26 are high, and, furthermore, air entrance into the periphery of the reinforcing cord member is suppressed, it is possible to effectively suppress the movement of the reinforcing cord 26 due to a force applied or the like while travelling. Thereby, for example, even when a tire-constituting member has been provided so as to cover the entire outer circumferential portion of the tire frame with the reinforcing cord member, since the movement of the reinforcing cord member is suppressed, the separation or the like between the members (including the tire frame) is suppressed, and the durability of the tire 10 is improved.

In addition, in the tire 10 of the embodiment, since the reinforcing cord 26 having a higher stiffness than the thermoplastic resin material is wound in a spiral shape in the circumferential direction on the outer circumferential surface of the crown portion 16 in the tire case 17 formed of the thermoplastic resin material, the puncture resistance, the cutting resistance and the stiffness of the tire 10 in the circumferential direction are improved. Meanwhile, the improvement of the stiffness of the tire 10 in the circumferential direction prevents the creeping in the tire case 17 formed of the thermoplastic resin material.

In addition, in the cross-sectional view of the tire case 17 in the axial direction (the cross section illustrated in FIG. 1), since at least some of the reinforcing cord 26 is embedded in the outer circumferential surface of the crown portion 16 in the tire case 17 formed of the thermoplastic resin material, and is adhered to the thermoplastic resin material, incorporation of air during manufacturing is suppressed, and the movement of the reinforcing cord 26 due to a force applied or the like while travelling is suppressed. Thereby, the separation or the like of the reinforcing cord 26, the tire case 17 and a tread 30 is suppressed, and the durability of the tire 10 is improved.

In addition, since the depth L of embedding of the reinforcing cord 26 is ⅕ or more of the diameter D as illustrated in FIG. 2, incorporation of air during manufacturing is effectively suppressed, and the movement of the reinforcing cord 26 due to a force applied or the like while travelling is further suppressed.

When a reinforcing cord layer 28 is configured so as to include the thermoplastic resin material as described above, since it is possible to decrease the difference in hardness between the tire case 17 and the reinforcing cord layer 28 compared to when the reinforcing cord 26 is fixed using cushion rubber, the reinforcing cord 26 can be further adhered and fixed to the tire case 17. Thereby, the above incorporation of air can be effectively prevented, and it is possible to effectively suppress the movement of the reinforcing cord member during travelling.

Furthermore, when the reinforcing cord is a steel cord, since the reinforcing cord 26 can be easily separated and collected from the thermoplastic resin material through heating when disposing of the tire, it is advantageous in terms of the recycling properties of the tire 10. In addition, the resin material generally has a low loss coefficient (Tan δ) compared to vulcanized rubber. Therefore, when the reinforcing cord layer includes the resin material much, it is possible to improve the rolling properties of the tire. Furthermore, the resin material having a relatively high elastic modulus compared to vulcanized rubber is advantageous that the in-plane shear stiffness is large, and operation feeling or abrasion resistance during tire travelling is also excellent.

In addition, since the tread 30 that comes into contact with road surfaces is formed using a rubber material that is more abrasion-resistant than the thermoplastic resin material, the abrasion resistance of the tire 10 is improved.

Furthermore, since a circular bead core 18 made of a metallic material is embedded in the bead portion 12, similarly to a pneumatic rubber tire of the related art, the tire case 17, that is, the tire 10 is strongly held to a rim 20.

In addition, furthermore, since a sealing layer 24 made of a rubber material having higher sealing properties than the thermoplastic resin material is provided in a portion that comes into contact with the rim 20 of the bead portion 12, the sealing properties between the tire 10 and the rim 20 are improved. Therefore, compared to when the tire is sealed with the rim 20 using the thermoplastic resin material, the air leakage in the tire is further suppressed. In addition, the rim fitting properties are also improved when the sealing layer 24 is provided.

The above embodiment employs a configuration in which the reinforcing cord 26 is heated, and the thermoplastic resin material in the portion with which the heated reinforcing cord 26 comes into contact is melted or softened, but the invention according to the seventh aspect is not limited to this configuration, and the reinforcing cord 26 may be embedded in the crown portion 16 after heating the outer circumferential surface of the crown portion 16, in which the reinforcing cord 26 is to be embedded, using a hot air generating apparatus without heating the reinforcing cord 26.

In addition, in Embodiment 7-1, a heater and a fan are used as the heat source of a cord heating apparatus 59, but the invention according to the seventh aspect is not limited to this configuration, and a configuration in which the reinforcing cord 26 is directly heated using radiation heat (for example, infrared rays or the like) may be employed.

Furthermore, Embodiment 7-1 employs a configuration in which the portion, in which the thermoplastic resin material having the reinforcing cord 26 embedded therein is melted or softened, is forcibly cooled using a second metal roller 64, but the invention according to the seventh aspect is not limited to this configuration, and a configuration in which the portion, in which the thermoplastic resin material is melted or softened, is forcibly cooled and solidified by directly blowing cold air to the portion in which the thermoplastic resin material is melted or softened.

In addition, Embodiment 7-1 employs a configuration in which the reinforcing cord 26 is heated; however, for example, a configuration in which the outer circumference of the reinforcing cord 26 is coated with the same thermoplastic resin material as the tire case 17 may be employed, and, in this case, it is possible to effectively suppress air entrance during embedding in the crown portion 16 by heating the thermoplastic resin material, which is coated with the reinforcing cord 26, when winding the coated reinforcing cord around the crown portion 16 of the tire case 17.

In addition, the spiral winding of the reinforcing cord 26 facilitates the manufacturing, but a method, in which the reinforcing cord 26 is discontinuously formed in the width direction, or the like can be also considered.

The tire 10 of Embodiment 7-1 is a so-called tubeless tire in which an air chamber is formed between the tire 10 and the rim 20 by mounting the bead portion 12 in the rim 20, but the invention according to the seventh aspect is not limited to this configuration, and the tire may have a complete tube shape.

The tire having the complete tube shape may be an aspect in which, for example, three circular-shaped tire frames are disposed in the tire width direction as illustrated in FIG. 4. FIG. 4 is a cross-sectional view of the tire according to other embodiment. As illustrated in FIG. 4, a tire 86 has a tread rubber layer 87, circular-shaped hollow tubes (tire frame) 88 which are formed of the same resin material as in Embodiment 7-1, a belt (reinforcing cord) 89 and a rim 90. Three tubes 88 are disposed in series in the tire width direction of the tire 86. The tread rubber layer 87, in which the belt 89 is embedded, is adhered to the outer circumferential portions of the tubes 88. In addition, the tubes 88 are mounted on the rim 90 having recess portions that engage with the tubes 88. Meanwhile, the bead core is not provided in the tire 86.

Thus far, an embodiment of the invention according to the seventh aspect has been described using the embodiment, but the embodiment is simply an example, and the invention can be carried out with a variety of modifications within the scope of the purport. In addition, it is needless to say that the scope of right of the invention according to the seventh aspect is not limited to the above embodiment.

Embodiment 7-2

Next, a method of manufacturing the tire according to the seventh aspect of the invention and Embodiment 7-2 of the tire will be described according to the drawings. Similarly to the above Embodiment 7-1, the tire of the present embodiment exhibits almost the same cross-sectional shape as an ordinary pneumatic rubber tire of the related art.

Here, the tire according to Embodiment 7-2 is the same as the above Embodiment 1-2 except for the following facts. Therefore, the same reference signs and drawings will be used in the description regarding the same drawings and members.

In the tire of Embodiment 7-2, similarly to the above Embodiment 7-1, the tire case 17 is formed of a mixed material of a polyamide-based thermoplastic elastomer ("UBESTA, XPA9055X1" manufactured by Ube Industries, Ltd.) and a polyamide-based thermoplastic resin ("UBESTA, 3014U" manufactured by Ube Industries, Ltd.). In the tire 200 of the embodiment, the reinforcing cord layer 28 that is formed by winding a coated cord member 26B in the circumferential direction (illustrated in FIG. 6 using a broken line) is superposed on the crown portion 16 as illustrated in FIGS. 5 and 6. The reinforcing cord layer 28 configures the outer circumferential portion of the tire case 17, and reinforces the stiffness of the crown portion 16 in the circumferential direction. Meanwhile, the outer circumferential surface of the reinforced cord layer 28 is included in the outer circumferential surface 17S of the tire case 17.

In addition, the elastic modulus of a resin material for coating 27 is preferably set in a range of 0.1 times to 10 times the elastic modulus of a resin material that forms the tire case 17. When the elastic modulus of the resin material for coating 27 is 10 times or less the elastic modulus of the thermoplastic resin material that forms the tire case 17, the crown portion does not become too hard, and fittability onto a rim are easily achieved. In addition, when the elastic modulus of the resin material for coating 27 is 0.1 times or more the elastic modulus of the thermoplastic resin material that forms the tire case 17, the resin that configures the reinforcing cord layer 28 does not become too soft, and the belt in-plane shear stiffness is excellent whereby the cornering force is improved. Meanwhile, in the embodiment, as the resin material for coating 27, the same material as the thermoplastic resin material (in the embodiment, a mixed material of a polyamide-based thermoplastic elastomer ("UBESTA, XPA9055X1" manufactured by Ube Industries, Ltd.) and a polyamide-based thermoplastic resin ("UBESTA, 3014U" manufactured by Ube Industries, Ltd.) is used. Other portions are the same as in the tire according to the above Embodiment 1-2, and the manufacturing method is also the same.

(Effects)

In the tire 200 of the embodiment, since the tire case 17 is formed of the thermoplastic resin material, even when the elastic modulus of the thermoplastic resin material is increased, the tan δ of the thermoplastic resin material does not easily increase, and the rolling resistance of the tire can be suppressed. Furthermore, since the tire structure can be simplified, the weight is light compared to rubber of the related art. Therefore, since the weight of the tire 200 of the embodiment can be decreased, it is possible to improve the gas mileage of an automobile in which the tire is used.

In addition, when the reinforcing cord layer 28 is configured to include the coated cord member 26B, since it is possible to decrease the difference in hardness between the tire case 17 and the reinforcing cord layer 28 compared to when the reinforcing cord 26A is simply fixed using cushion rubber 29, the coated cord member 26B can be further adhered and fixed to the tire case 17. Thereby, the above incorporation of air can be effectively prevented, and it is possible to effectively suppress the movement of the reinforcing cord member while travelling.

Furthermore, when the reinforcing cord is a steel cord, since the cord member 26A can be easily separated and collected from the coated cord member 26B through heating at the time of disposition of the tire, it is advantageous in terms of the recycling properties of the tire 200. In addition, the resin material generally has a low loss coefficient (Tan δ) compared to vulcanized rubber. Therefore, when the reinforcing cord layer includes the resin material much, it is possible to improve the rolling properties of the tire. Furthermore, the resin material having a relatively high elastic modulus compared to vulcanized rubber has the advantage that the in-plane shear stiffness is large, and operation feeling or abrasion resistance during tire travelling is also excellent.

In the method of manufacturing the tire of the embodiment, when the tire case 17, the cushion rubber 29 and a tread rubber 30A are integrated, since the outer circumferential surface 17S of the tire case 17 has been treated to be coarse, the bonding properties (adhesion) is improved due to the anchor effect. In addition, since the resin material that forms the tire case 17 is dug out by the collision of a blasting abrasive, the wettability of an adhesive is improved. Thereby, a state in which the adhesive is uniformly coated on the outer circumferential surface 17S of the tire case 17 is held, and the bonding strength between the tire case 17 and the cushion rubber 29 can be ensured.

Particularly, even when protrusions and recesses are formed on the outer circumferential surface 17S of the tire case 17, the peripheries of the recess portions (recess walls and recess bottoms) are treated to be coarse by making the blasting abrasive collide with the recess portions (voids 28A), and the bonding strength between the tire case 17 and the cushion rubber 29 can be ensured.

Meanwhile, since the cushion rubber 29 is laminated in the coarsening-treated areas on the outer circumferential surface 17S of the tire case 17, the bonding strength between the tire case 17 and the cushion rubber can be effectively ensured.

When the cushion rubber 29 has been vulcanized in a vulcanizing process, the cushion rubber 29 flows into the coarsened recesses and protrusions formed on the outer circumferential surface 17S of the tire case 17 through the coarsening treatment. In addition, when vulcanization is completed, the anchor effect is developed due to the cushion rubber 29 that has flowed into the coarsened recesses and protrusions so that the bonding strength between the tire case 17 and the cushion rubber 29 is improved.

In the tire 200 manufactured using the above method of manufacturing a tire, the bonding strength between the tire case 17 and the cushion rubber 29 is ensured, that is, the bonding strength between the tire case 17 and the tread 30 is ensured through the cushion rubber 29. Thereby, the separation between the outer circumferential surface 17S of the tire case 17 of the tire 200 and the cushion rubber 29 is suppressed while travelling and the like.

In addition, since the outer circumferential portion of the tire case 17 is configured of the reinforcing cord layer 28, the puncture resistance and the cutting resistance are improved, compared to a tire case having the outer circumferential portion configured of something other than the reinforcing cord layer 28.

In addition, since the reinforcing cord layer 28 is formed by winding the coated cord member 26B, the stiffness of the tire 200 in the circumferential direction is improved. The improvement of the stiffness in the circumferential direction suppresses creeping (a phenomenon in which the plastic deformation of the tire case 17 increases over time under a constant stress) in the tire case 17, and the pressure resistance with respect to the air pressure from the inside in the tire diameter direction is improved.

In the embodiment, the recesses and protrusions are configured on the outer circumferential surface 17S of the tire case 17, but the seventh aspect of the invention is not limited thereto, and a configuration in which the outer circumferential surface 17S is formed to be flat may be employed.

In addition, in the tire case 17, the reinforcing cord layer may be formed such that the coated cord member, which is wound around and bonded to the crown portion of the tire case, is covered with a thermoplastic material for coating. In this case, a coated layer can be formed by discharging a thermoplastic material for coating in a molten or softened state on the reinforcing cord layer 28. In addition, the coated layer may be formed by heating an adhesive sheet into a molten or softened state without using an extruder, and attaching the adhesive sheet to the surface (outer circumferential surface) of the reinforcing cord layer 28.

The above Embodiment 7-2 employs a configuration in which partitioned case bodies (tire case half parts 17A) are bonded so as to form the tire case 17, but the seventh aspect of the invention is not limited thereto, and the tire case 17 may be integrally formed using a mold or the like.

The tire 200 of Embodiment 7-2 is a so-called tubeless tire in which an air chamber is formed between the tire 200 and the rim 20 by mounting the bead portion 12 in the rim 20, but the seventh aspect of the invention is not limited to this configuration, and the tire 200 may have, for example, a complete tube shape (for example, the shape illustrated in FIG. 4).

In Embodiment 7-2, the cushion rubber 29 is disposed between the tire case 17 and the tread 30, but the seventh aspect of the invention is not limited thereto, and a configuration in which the cushion rubber 29 is not disposed may be employed.

In addition, Embodiment 7-2 employs a configuration in which the coated cord member 26B is wound around the crown portion 16 in a spiral shape, but the seventh aspect of the invention is not limited thereto, and a configuration in which the coated cord member 26B is wound around to be discontinuous in the width direction may be employed.

Embodiment 7-2 employs a configuration in which a thermoplastic material is used as the resin material for coating 27 that forms the coated cord member 26B, and the resin material for coating 27 is heated into a molten or softened state so as to weld the coated cord member 26B on the outer circumferential surface of the crown portion 16, but the seventh aspect of the invention is not limited to this configuration, and a configuration in which the coated cord member 26B is welded on the outer circumferential surface of the crown portion 16 using an adhesive or the like without heating the resin material for coating 27 may be employed.

In addition, a configuration in which a thermosetting resin is used as the resin material for coating 27 that forms a coated cord member 26B and the coated cord member 26B is welded on the outer circumferential surface of the crown portion 16 using an adhesive or the like without heating may be employed.

Furthermore, a configuration in which a thermosetting resin is used as the resin material for coating 27 that forms the coated cord member 26B and the tire case 17 is formed of a thermoplastic resin material may be employed. In this case, the coated cord member 26B may be adhered to the outer circumferential surface of the crown portion 16 using an adhesive or the like, or the coated cord member 26B may be welded on the outer circumferential surface of the crown portion 16 by heating the portion provided with the coated cord member 26B of the tire case 17 into a molten or softened state.

In addition, furthermore, a configuration in which a thermoplastic material is used as the resin material for coating 27 that forms the coated cord rubber 26B, and the tire case 17 is formed of a thermoplastic resin material. In this case, the coated cord member 26B may be adhered to the outer circumferential surface of the crown portion 16 using an adhesive or the like, or the coated cord member 26B may be welded on the outer circumferential surface of the crown portion 16 by heating into a molten or softened state the portion of the tire case 17 at which the coated cord member 26B is provided, and heating the resin material for coating 27 into a molten or softened state. Meanwhile, when both the tire case 17 and the coated cord member 26B have been heated into a molten or softened state, since both are well mixed, the bonding strength is improved. In addition, when thermoplastic resin materials are used as both the resin material that forms the tire case 17 and the resin material for coating 27 that forms the coated cord member 26B, the thermoplastic resin materials are preferably the same kind of thermoplastic materials, particularly, the same thermoplastic material.

In addition, furthermore, an adhesive may be coated on the outer circumferential surface 17S of the tire case 17, on which the coarsening treatment has been carried out, after the surface of the outer circumferential surface 17S is activated using a corona treatment, a plasma treatment or the like, thereby increasing hydrophilicity.

In addition, furthermore, the order for manufacturing the tire 200 is not limited to the order in Embodiment 7-2, and may be appropriately changed.

Thus far, an embodiment according to the seventh aspect of the invention has been described using the embodiment, but the embodiment is simply an example, and the invention can be carried out with a variety of modifications within the scope of the purport. In addition, it is needless to say that the scope of right of the invention according to the seventh aspect is not limited to the above embodiment.

Thus far, the specific embodiments of the invention according to the seventh aspect of the invention have been described using Embodiment 7-1 and Embodiment 7-2, but the seventh aspect of the invention is not limited to the above embodiments.

Eighth Aspect of the Invention

Next, a resin material as a component of the tire frame according to an eighth aspect of the invention will be described, and, subsequently, a specific embodiment of the tire according to the eighth aspect of the invention will be described using the drawings.

[Resin Material]

The tire according to the eighth aspect of the invention is a tire including at least a circular tire frame formed of a resin material, and the resin material includes at least a thermoplastic elastomer and a resin which is other than the thermoplastic elastomer, has a glass transition temperature of 20° C. or lower, and has an elastic modulus larger than the elastic modulus of the thermoplastic elastomer.

An elastic modulus can be obtained in a preferable range, and increase of the rolling resistance of the tire can be suppressed by applying a combination of a thermoplastic elastomer and a resin having a glass transition temperature in the above range, which is other than the thermoplastic elastomer, (the specific resin according to the eighth aspect of the invention) as the resin material that is a component of the circular tire frame that forms the tire.

Hereinafter, the thermoplastic elastomer and the specific resin according to the eighth aspect of the invention will be described.

[Thermoplastic Elastomer]

The "thermoplastic elastomer" refers to a resin material including a hard segment and a soft segment in a molecule thereof as described above, and, in detail, to a resin material which is an elastic macromolecular compound and is formed of a copolymer having a polymer constituting a hard segment that is crystalline and has a high melting point or a hard segment forming a pseudo-crosslink through physical agglomeration and a polymer constituting a soft segment that is non-crystalline and has a low glass transition temperature. Meanwhile, the thermoplastic elastomer does not encompass vulcanized rubber, such as natural rubber or synthetic rubber of the related art.

Examples of the thermoplastic elastomer include polyamide-based thermoplastic elastomers, polyester-based thermoplastic elastomer, polyolefin-based thermoplastic elastomers, polyurethane-based thermoplastic elastomers, polystyrene-based thermoplastic elastomers and the like.

(Polyamide-Based Thermoplastic Elastomer)

The "polyamide-based thermoplastic elastomer" is an elastic macromolecular compound, and refers to a resin material which is formed of a copolymer having a polymer constituting a hard segment that is crystalline and has a high melting point, and a polymer constituting a soft segment that is non-crystalline and has a low glass transition temperature, and has an amid bond (—CONH—) in the main chain of the polymer constituting the hard segment.

Examples of crystalline polyamide constituting the hard segment include aliphatic amides, such as polycaproamide (nylon-6), poly-ω-aminoheptanoic acid (nylon-7), poly-ω-aminononanoic acid (nylon-9), polyundecaneamide (nylon-11), polylauryl lactam (nylon-12), polyethylene diamine adipamide (nylon-2,6), polytetramethylene adipamide (nylon-4,6), polyhexamethylene adipamide (nylon-6,6), polyhexamethylene sebacamide (nylon-6,10), polyhexamethylene dodecamide (nylon-6,12), polyoctamethylene adipamide (nylon-8,6) and polydecamethylene adipamide (nylon-10,8); crystalline aromatic polyamides obtained through a polycondensation reaction between an aromatic diamine, such as meta-xylene diamine or para-xylene diamine, and a dicarboxylic acid, such as adipic acid, suberic acid, sebacic acid, cyclohexane dicarboxylic acid, terephthalic acid or isophthalic acid, or a derivative thereof; and the like.

As the "polyamide-based thermoplastic elastomer" in the present embodiment, the same polyamide-based thermoplastic elastomer as the above first aspect of the invention can be used.

(Polyolefin-Based Thermoplastic Elastomer)

Examples of the "polyolefin-based thermoplastic elastomer" include a material in which at least a polyolefin constitutes the hard segment that is crystalline and has a high melting point, and another polymer (for example, the above polyolefin or other polyolefin) constitutes the soft segment that is non-crystalline and has a low glass transition temperature. Examples of the polyolefin that forms the hard segment include polyethylene, polypropylene, isotactic polypropylene, polybutene, and the like. The "polyolefin-based thermoplastic elastomer" in the embodiment is the same as in the above second aspect of the invention.

(Polyurethane-Based Thermoplastic Elastomer)

The "polyurethane-based thermoplastic elastomer" is an elastic macromolecular compound, and refers to a resin material which is formed of a copolymer having a polymer constituting the hard segment forming a pseudo-crosslink through physical agglomeration and a polymer constituting the soft segment that is non-crystalline and has a low glass transition temperature, and has a urethane bond in the main chain of the polymer constituting the hard segment. The "polyurethane-based thermoplastic elastomer" in the embodiment is the same as in the above second aspect of the invention.

(Polystyrene-Based Thermoplastic Elastomer)

Examples of the "polystyrene-based thermoplastic elastomer" include a material in which at least polystyrene constitutes the hard segment, and another polymer (for example, polybutadiene, polyisoprene, polyethylene, hydrogenated polybutadiene, hydrogenated polyisoprene, or the like) constitutes the soft segment that is non-crystalline and has a low glass transition temperature. Among the above, nylon-6, nylon-6,6, nylon-12, and the like are preferable, and nylon-12 is more preferable. The "polyolefin-based thermoplastic elastomer" in the embodiment is the same as in the above second aspect of the invention.

(Polyester-Based Thermoplastic Elastomer)

Examples of the polyester-based thermoplastic elastomer include a material in which at least a polyester constitutes the hard segment that is crystalline and has a high melting point, and another polymer (for example, polyester, polyether, or the like) constitutes the soft segment that is non-crystalline and has a low glass transition temperature. The "polyester-based thermoplastic elastomer" in the embodiment is the same as in the above second aspect of the invention.

The resin material may include two or more thermoplastic elastomers, but the resin material preferably includes one thermoplastic elastomer from the viewpoint of controlling the tire performances of a tire formed using the resin material.

Among the thermoplastic elastomers described above, at least one selected from the polyamide-based thermoplastic elastomers, the polyester-based thermoplastic elastomer, the polystyrene-based thermoplastic elastomers and the polyurethane-based thermoplastic elastomers is preferably used, and, furthermore, the polyamide-based thermoplastic elastomer or the polyester-based thermoplastic elastomer is preferable since the polyamide-based thermoplastic elastomer or the polyester-based thermoplastic elastomer has thermal resistance and is excellent in term of tensile modulus of elasticity, tensile strength and fracture strain, the structure of the tire can be simplified compared to a rubber tire of the related art, and, consequently, reduction in weight of the tire can be realized.

Further, the glass transition temperature (Tg) of the thermoplastic elastomer is preferably from 30° C. to 50° C., and more preferably from 25° C. to 70° C. in order to decrease the influence on the rolling resistance, that is, in order to suppress the tan δ at 30° C. to 50° C. The glass transition temperature can be measured using the same method as for the glass transition temperature in a specific resin according to the eighth aspect of the invention described below.

In addition, the elastic modulus of the thermoplastic elastomer is lower than the elastic modulus of the specific resin according to the eighth aspect of the invention since the elastic modulus of the thermoplastic elastomer is increased by adding the specific resin according to the eighth aspect of the invention, is preferably from 5 MPa to 700 MPa, and more preferably from 10 MPa to 500 MPa. The elastic modulus refers to the tensile modulus of elasticity regulated in JIS K7113:1995, and can be measured using, for example, a precision universal tester AUTOGRAPH manufactured by Shimadzu Corporation.

In addition, the tan δ of the thermoplastic elastomer according to the eighth aspect of the invention is preferably from 0 to 0.1, and more preferably from 0 to 0.07 in order to suppress the tan δ at 30° C. to 50° C. The tan δ can be measured using, for example, ARESIII manufactured by Rheometric Scientific, Inc. under the conditions of 30° C., 20 Hz and 1% of shear distortion.

[The Specific Resin According to the Eighth Aspect of the Invention]

The resin material includes a resin having a glass transition temperature of 20° C. or lower and an elastic modulus larger than the elastic modulus of the thermoplastic elastomer, which is other than the thermoplastic elastomer, (the specific resin according to the eighth aspect of the invention).

Further, the resin according to the eighth aspect of the invention refers to a thermoplastic or thermosetting resin, and does not encompass vulcanized rubber, such as natural rubber or synthetic rubber of the related art.

The glass transition temperature (Tg) is more preferably 15° C. or lower, and particularly preferably 10° C. or lower. Further, the lower limit value is not particularly limited, but the glass transition temperature is preferably equal to or greater than −200° C., and particularly preferably equal to or greater than −150° C.

When the specific resin according to the eighth aspect of the invention having a glass transition temperature of the upper limit value or less is added to the thermoplastic elastomer, and used, the resin material has a desired elastic modulus, and the tan δ can be suppressed at a low level. As a result, in the invention according to the eighth aspect, a preferable elastic modulus can be obtained, and the rolling resistance of the tire can be reduced.

Here, the glass transition temperature of the specific resin according to the eighth aspect of the invention can be measured from the temperature dependency of the dynamic loss (tan δ). For example, the glass transition temperature can be measured using, for example, ARESIII manufactured by Rheometric Scientific, Inc. under the conditions of 10 Hz and 0.2% of shear distortion. Alternatively, the glass transition temperature can be measured using a differential scanning calorimetry (DSC).

As the specific resin according to the eighth aspect of the invention, for example, among the resins listed as examples of the resin which is not modified by an acid (other resin) described below, resins satisfying the glass transition temperature (Tg) and the relationship of the elastic modulus with the thermoplastic elastomer or acid-modified resins described below can be used.

Further, the specific resin according to the eighth aspect of the invention is more preferably an acid-modified resin. The "acid-modified resin" refers to a resin obtained by bonding an unsaturated compound having an acidic group, such as a carboxylic acid group, a sulfuric acid group or a phosphoric acid group, to a resin. For example, when an unsaturated carboxylic acid (generally, maleic acid anhydride) is used as the unsaturated compound having an acidic group, the unsaturated bond portion of the unsaturated carboxylic acid is bonded (for example, graft polymerization) to an olefin-based resin.

When the acid-modified resin is used, the resin material has a sea-island structure having a sea phase constituted of a thermoplastic elastomer and an island phase constituted of the acid-modified resin. When the interaction at the phase interface between the sea phase and the island phase is weak, the fluidity of the resin material is increased, which results in excellent injection moldability. Since the acid-modified resin has an acid-modified portion in the molecule, the interaction with the thermoplastic elastomer is strong, compared to a resin which is not modified by an acid.

The acid-modified resin is preferably a compound having a carboxylic acid group, which is a weak acid group, from the viewpoint of suppressing the deterioration of the thermoplastic elastomer, and examples thereof include acrylic acid, methacrylic acid, itaconic acid, crotonic acid, isocrotonic acid, maleic acid, and the like.

Examples of the acid-modified resin include an acid-modified polyolefin resin and the like. Among the above, acid-modified polyethylene, acid-modified polypropylene, acid-modified ethylene-propylene copolymers, ethylene-vinyl acetate copolymers are preferable.

Examples of the acid-modified polyolefin include ADOMER QF551, QE060, LB548, NE827, QB550 and the like manufactured by Mitsui Chemicals, Inc.

The acid value of the acid-modified resin needs to exceed 0 mg ($CH_3ONa$)/g. The acid value is measured as the mass [mg] of sodium methoxide ($CH_3ONa$) used when neutralization titration is carried out on the respective acid-modified resin 1 [g] using sodium methoxide ($CH_3ONa$).

In the sea-island structure, there is a tendency for the island phase to become smaller as the acid value increases, and there is a tendency for the island phase to become larger as the acid value decreases. By including the acid-modified resin, the island phase is finely dispersed in the thermoplastic elastomer.

Meanwhile, the island phase of the acid-modified resin finely dispersed in the resin material can be confirmed through photograph observation using SEM (a scanning electron microscope).

Further, the elastic modulus of the specific resin according to the eighth aspect of the invention is higher than the elastic modulus of the thermoplastic elastomer in order to increase the elastic modulus. The elastic modulus is preferably from 100 MPa to 3000 MPa, and more preferably from 300 MPa to 2000 MPa. The elastic modulus refers to the tensile modulus of elasticity regulated in JIS K7113:1995, and can be measured using the method described in the above thermoplastic elastomer.

In addition, the tan δ of the specific resin according to the eighth aspect of the invention preferably has a peak of the tan δ at −150° C. to 20° C., and more preferably has a peak at −150° C. to 15° C. in order to decrease the tan δ of the resin material. The tan δ can be measured using the method described in the above thermoplastic elastomer.

Further, the resin material may include two or more kinds of the specific resin according to the eighth aspect of the invention.

[Resin which is not Modified by Acid (Other Resin)]

When the resin material includes the acid-modified resin as the specific resin according to the eighth aspect of the invention, the resin material may further include a resin which is not modified by an acid (other resin) and which is other than the thermoplastic elastomer.

In addition, when the resin material does not include the acid-modified resin as the specific resin according to the eighth aspect of the invention, the resin material may include a resin which is not modified by an acid (other resin, which satisfies the conditions of the specific resin according to the eighth aspect of the invention) as the specific resin according to the eighth aspect of the invention. Further, when the thermoplastic elastomer is a polystyrene-based thermoplastic elastomer, since the polystyrene-based thermoplastic elastomer does not include a polar group, a resin which is not modified by an acid is preferably used as the specific resin according to the eighth aspect of the invention.

The resin which is not modified by an acid refers to a resin having an acid value of 0 mg/g.

Further, the resin in the invention according to the eighth aspect refers to a thermoplastic or thermosetting resin, and does not include vulcanized rubber, such as natural rubber or synthetic rubber of the related art.

As such, when the resin material contains the thermoplastic elastomer, the acid-modified specific resin according to the eighth aspect of the invention, and, furthermore, the resin which is not modified by an acid (other resin), the tensile characteristics as the tire performances, such as tensile elasticity and breaking strength, can be improved.

Examples of the other resin include polyolefin resins and the like. Among the above, polypropylene, polyethylene, ethylene-propylene copolymers, and the like can be exemplified, and polypropylene and ethylene-propylene copolymers are preferable particularly from the viewpoint of improving the tensile characteristics, such as tensile elasticity and breaking strength.

Examples of the polypropylene and the ethylene-propylene copolymers include J-700GP (homopolymer), JP-2000GP (homopolymer), J-466HP (block polymer), J-106MG (homopolymer), J-226T (random polymer) manufactured by Prime Polymer Co., Ltd., NOVATEC EC9EV (block polymer), Wintec WFW4 (random polymer) manufactured by Japan Polypropylene Corporation, and the like.

In addition, the tan δ of other resin preferably has a peak of the tan δ at −150° C. to 20° C., and more preferably has a peak at −150° C. to 15° C. in order to decrease the tan δ of the resin material. The tan δ can be measured in accordance with the method described in the above thermoplastic elastomer.

Further, when the resin material contains the thermoplastic elastomer, the acid-modified specific resin according to the eighth aspect of the invention, and, furthermore, the resin which is not modified by an acid (other resin), the tan δ of the other resin is not particularly limited to the above range.

In addition, the elastic modulus of the specific resin according to the eighth aspect of the invention is higher than the elastic modulus of the thermoplastic elastomer in order to increase the elastic modulus, is preferably from 100 MPa to 3000 MPa, and more preferably from 300 MPa to 2000 MPa. The elastic modulus refers to the tensile modulus of elasticity regulated in JIS K7113:1995, and can be measured in accordance with the method described in the above thermoplastic elastomer.

Further, the resin material may include two or more kinds of the other resin.

[Combination and Ratio]

In the resin material of the invention according to the eighth aspect, the ratio of the total amount of the specific resin according to the eighth aspect of the invention and other resin to the thermoplastic elastomer (the thermoplastic elastomer: the specific resin according to the eighth aspect of the invention+the other resin [mass ratio]) is preferably from 95:5 to 55:45, and more preferably from 95:5 to 60:40 from the viewpoint of making the thermoplastic elastomer form the sea phase in the sea-island structure.

In addition, when both the specific resin according to the eighth aspect of the invention and the other resin are included, the ratio of the other resin to the specific resin according to the eighth aspect of the invention (the specific resin according to the eighth aspect of the invention:the other resin [mass ratio]) is preferably from 100:0 to 5:95, and more preferably from 100:0 to 10:90 from the viewpoint of providing the interaction with the thermoplastic elastomer.

Furthermore, the total content of the thermoplastic elastomer, the specific resin according to the eighth aspect of the invention, and the other resin in the resin material is preferably from 50 mass % to 100 mass % with respect to the total mass of the resin material from the viewpoint of sufficiently developing performances of the thermoplastic elastomer.

The combination of the thermoplastic elastomer, the specific resin according to the eighth aspect of the invention, and the other resin in the resin material of the invention according to the eighth aspect is preferably the following combination.

A combination of the polyamide-based thermoplastic elastomer and the acid-modified polyolefin resin A combination of the polyamide-based thermoplastic elastomer, the acid-modified polyolefin resin and polypropylene A combination of the polyamide-based thermoplastic elastomer, the acid-modified polyolefin resin and an ethylene-propylene copolymer A combination of the polyester-based thermoplastic elastomer and the acid-modified polyolefin resin A combination of the polyester-based thermoplastic elastomer, the acid-modified polyolefin resin and polypropylene A combination of the polyester-based thermoplastic elastomer, the acid-modified polyolefin resin and an ethylene-propylene copolymer A combination of the polystyrene-based thermoplastic elastomer and the polyolefin resin

[Other Compositions and the Properties of the Resin Material]

The resin material may contain a variety of fillers (for example, silica, calcium carbonate and clay) and a variety of additives, such as an age inhibitor, oil, a plasticizer, a coloring agent, a weather-resisting agent and a reinforcing material, as desired.

The resin material can be obtained by mixing the thermoplastic elastomer and the specific resin according to the eighth aspect of the invention, adding other resin or a variety of additives as necessary, and melting and mixing the components. The mixing ratio of the thermoplastic elastomer and the specific resin according to the eighth aspect of the invention follows the fractions described above. The resin material obtained through melting and mixing can be used in a pellet shape as necessary.

The tensile modulus of elasticity of the resin material according to the eighth aspect of the invention, which is regulated in JIS K7113:1995, is preferably from 100 MPa to 1000 MPa, more preferably from 100 MPa to 800 MPa, and particularly preferably from 100 MPa to 700 MPa. When the tensile modulus of elasticity of the resin material is from 100 MPa to 1000 MPa, fitting onto a rim can be efficiently carried out while holding the shape of the tire frame.

The tensile yield strength of the resin material according to the eighth aspect of the invention, which is regulated in JIS K7113:1995, is preferably 5 MPa or more, preferably from 5 MPa to 20 MPa, and still more preferably from 5 MPa to 17 MPa. When the tensile yield strength of the resin material is 5 MPa or more, it is possible to withstand deformation caused by a load applied to the tire while travelling and the like.

The tensile yield elongation of the resin material according to the eighth aspect of the invention, which is regulated in JIS K7113:1995, is preferably 10% or more, preferably from 10% to 70%, and still more preferably from 15% to 60%. When the tensile yield elongation of the resin material is 10% or more, it is possible to increase the elastic area and improve rim assembling properties.

The tensile fracture elongation of the resin material according to the eighth aspect of the invention, which is regulated in JIS K7113:1995, is preferably 50% or more, preferably 100% or more, still more preferably 150% or more, and particularly preferably 200% or more. When the tensile fracture elongation of the resin material is 50% or more, it is possible to improve the rim assembling properties and make the resin material have resistance to fracture caused by collision.

The deflection temperature under load (under a load of 0.45 MPa) of the resin material according to the eighth aspect of the invention, which is regulated in ISO75-2 or ASTM D648, is preferably equal to or greater than 50° C., preferably from 50° C. to 150° C., and still more preferably from 50° C. to 130° C. When the deflection temperature under load of the resin material is equal to or greater than 50° C., it is possible to suppress deformation of tread or the like in the vulcanization step.

[Resin Material as a Component of the Reinforcing Cord Layer]

The tire according to the eighth aspect of the invention may have the reinforcing cord member which is wound around the outer circumferential surface of the tire frame in the circumferential direction so as to form the reinforcing cord layer.

The "resin material as a component of the reinforcing cord layer" according to the eighth aspect are the same as the "resin material as a component of the reinforcing cord layer" according to the first aspect of the invention.

Embodiment 8-1

Hereinafter, a tier according to Embodiment 8-1 of the tire according to the eighth aspect of the invention will be described according to the drawings.

Here, the tire according to Embodiment 8-1 is the same as the above Embodiment 1-1 except for the following facts. Therefore, the same reference signs and drawings will be used in the description regarding the same drawings and members.

The tire case 17 of the embodiment is formed of a resin material containing a polyamide-based thermoplastic elastomer (UBESTA, XPA9048 manufactured by Ube Industries, Ltd.) and an acid-modified polyolefin (ADOMER QE060 manufactured by Mitsui Chemicals, Inc., a glass transition temperature 4° C.) (hereinafter referred to simply as "resin material" in the description of Embodiment 8-1). In the present embodiment, the tire case 17 is formed of a single resin material, the invention according to the eighth aspect is not limited to this configuration, and, similarly to an ordinary pneumatic rubber tire of the related art, different thermoplastic resin materials having different characteristics may be used in the respective portions (side portion 14, crown portion 16, bead portion 12, and the like) of the tire case 17. Other portions are the same as in the tire according to the above Embodiment 1-1, and the manufacturing method is the same as well.

(Effects)

In the tire 10 of the embodiment, since the tire case 17 is formed of the resin material further including the specific resin according to the eighth aspect of the invention having a glass transition temperature in the above range in addition to the thermoplastic elastomer, a favorable elastic modulus can be obtained in the tire case 17, and an increase in the rolling resistance of the tire can be suppressed.

In addition, the resin material has a high adhesion to the reinforcing cord 26, and, furthermore, is excellent in terms of fixing performances, such as weld strength. Therefore, it is possible to suppress the phenomenon in which air remains around the reinforcing cord 26 in the reinforcing cord winding process (incorporation of air). When the adhesion and weldability to the reinforcing cord 26 are high, and, furthermore, air entrance into the periphery of the reinforcing cord member is suppressed, it is possible to effectively suppress the movement of the reinforcing cord 26 due to a force applied or the like while travelling. Thereby, for example, even when a tire component member has been provided so as to cover the entire outer circumferential portion of the tire frame with the reinforcing cord member, since the movement of the reinforcing cord member is suppressed, the separation or the like of the members (including the tire frame) is suppressed, and the durability of the tire 10 is improved.

In addition, in the tire 10 of the embodiment, since the reinforcing cord 26 having a higher stiffness than the resin material is wound in a spiral shape in the circumferential direction on the outer circumferential surface of the crown portion 16 in the tire case 17 formed of the resin material, the puncture resistance, the cutting resistance and the stiffness of the tire 10 in the circumferential direction is improved. Meanwhile, the improvement of the stiffness of the tire 10 in the circumferential direction prevents the creeping in the tire case 17 formed of the thermoplastic resin material.

In addition, in the cross-sectional view of the tire case 17 in the axial direction (the cross section illustrated in FIG. 1), since at least some of the reinforcing cord 26 is embedded in the outer circumferential surface of the crown portion 16 in the tire case 17 formed of the resin material, and is adhered to the resin material, incorporation of air during manufacturing is suppressed, and the movement of the reinforcing cord 26 due to a force applied or the like while travelling is suppressed. Thereby, the separation or the like of the reinforcing cord 26, the tire case 17 and a tread 30 is suppressed, and the durability of the tire 10 is improved.

In addition, since the depth L of embedding of the reinforcing cord 26 is ⅕ of the diameter D or more as illustrated in FIG. 2, incorporation of air during manufacturing is effectively suppressed, and the movement of the reinforcing cord 26 due to a force applied or the like while travelling is further suppressed.

In addition, since the tread 30 that comes into contact with road surfaces is configured of a rubber material that has higher abrasion-resistance than the thermoplastic resin material, the abrasion resistance of the tire 10 is improved.

Furthermore, since a circular bead core 18 formed of a metallic material is embedded in the bead portion 12, similarly to a pneumatic rubber tire of the related art, the tire case 17, that is, the tire 10 is strongly held to the rim 20.

In addition, furthermore, since a sealing layer 24 made of a rubber material having higher sealing properties than the resin material is provided in a portion that comes into contact with the rim 20 of the bead portion 12, the sealing properties between the tire 10 and the rim 20 is improved. Therefore, compared to when the tire is sealed with the rim 20 using the resin material, the air leakage in the tire is further suppressed. In addition, the rim fitting properties is also improved by providing the sealing layer 24.

The above embodiment employs a configuration in which the reinforcing cord 26 is heated, and the resin material in the portion with which the heated reinforcing cord 26 comes into contact is melted or softened, but the eighth aspect of the invention is not limited to this configuration, and the reinforcing cord 26 may be embedded in the crown portion 16 after heating the outer circumferential surface of the crown portion 16, in which the reinforcing cord 26 is to be embedded, using a hot air generating apparatus without heating the reinforcing cord 26.

In addition, in Embodiment 8-1, a heater and a fan are used as the heat source of a cord heating device 59, but the invention according to the eighth aspect is not limited to this configuration, and a configuration in which the reinforcing cord 26 is directly heated using radiation heat (for example, infrared rays or the like) may be employed. In addition, the reinforcing cord-embedded portion may be melted or softened by making the heat source of the hot air generating apparatus, for example, infrared rays converge at the portion at which the reinforcing cord 26 is embedded.

Furthermore, Embodiment 8-1 employs a configuration in which the portion, in which the thermoplastic resin material having the reinforcing cord 26 embedded therein is melted or softened, is forcibly cooled using the second metal roller 64, but the eighth aspect of the invention is not limited to this configuration, and a configuration in which the portion, in which the thermoplastic resin material is melted or softened, is forcibly cooled and solidified by directly blowing cold air to the portion in which the thermoplastic resin material is melted or softened.

In addition, Embodiment 8-1 employs a configuration in which the reinforcing cord 26 is heated; however, for example, a configuration in which the outer circumference of the reinforcing cord 26 is coated with the same thermoplastic resin material as the tire case 17 may be employed, and, in this case, it is possible to effectively suppress incorporation of air during embedding in the crown portion 16 by heating the thermoplastic resin material, which is coated with the reinforcing cord 26, when winding the coated reinforcing cord around the crown portion 16 of the tire case 17.

The tire 10 of Embodiment 8-1 is a so-called tubeless tire in which an air chamber is formed between the tire 10 and the rim 20 by mounting the bead portion 12 in the rim 20, but the eighth aspect of the invention is not limited to this configuration, and the tire may have a complete tube shape.

The tire having the complete tube shape may be an aspect in which, for example, three circular-shaped tire frames are disposed in the tire width direction as illustrated in FIG. 4. FIG. 4 is a cross-sectional view of the tire according to other embodiment. As illustrated in FIG. 4, the tire 86 has the tread rubber layer 87, circular-shaped hollow tubes (tire frame) 88 which are made of the same resin material as in Embodiment 8-1, the belt (reinforcing cord) 89 and the rim 90. Three tubes 88 are disposed in series in the tire width direction of the tire 86. The tread rubber layer 87, in which the belt 89 is embedded, is adhered to the outer circumferential portions of the tubes 88. In addition, the tubes 88 are mounted on the rim 90 having recess portions that engage with the tubes 88. Meanwhile, the bead core is not provided in the tire 86.

In addition, the spiral winding of the reinforcing cord 26 facilitates the manufacturing, but a method, in which the reinforcing cord 26 is discontinuously formed in the width direction, or the like can be also considered.

Thus far, an embodiment according to the eighth aspect of the invention has been described using the embodiment, but the embodiment is simply an example, and the invention can be carried out with a variety of modifications within the scope of the purport. In addition, it is needless to say that the scope of right of the invention according to the eighth aspect is not limited to the above embodiment.

Embodiment 8-2

Next, a method of manufacturing the tire according to the eighth aspect of the invention and Embodiment 8-2 of the tire will be described according to the drawings. Similarly to the above Embodiment 8-1, the tire of the present embodiment exhibits the same cross-sectional shape as an ordinary pneumatic rubber tire of the related art.

Here, the tire according to Embodiment 8-2 is the same as the above Embodiment 1-2 except for the following facts. Therefore, the same reference signs and drawings will be used in the description regarding the same drawings and members.

In the tire of Embodiment 8-2, similarly to the above Embodiment 8-1, the tire case 17 is formed of a mixed material of a polyamide-based thermoplastic elastomer (UBESTA, XPA9048 manufactured by Ube Industries, Ltd.) and an acid-modified polyolefin (ADOMER QE060 manufactured by Mitsui Chemicals, Inc., a glass transition temperature 4° C.) (hereinafter referred to simply as "resin material" in the description of Embodiment 8-2). Other portions are the same as in the tire according to the above Embodiment 1-2, and the manufacturing method is also the same.

(Effects)

In the tire 200 of the embodiment, since the tire case 17 is formed of the resin material further including the specific resin according to the eighth aspect of the invention having a glass transition temperature in the above range in addition to the thermoplastic elastomer, a favorable elastic modulus can be obtained in the tire case 17, and an increase in the rolling resistance of the tire can be suppressed.

In the method of manufacturing the tire of the embodiment, when the tire case 17, the cushion rubber 29 and a tread rubber 30A are integrated, since the outer circumferential surface 17S of the tire case 17 has been treated to be coarse, the bonding properties (adhesion) is improved due to the anchor effect. In addition, since the resin material that forms the tire case 17 is dug out by the collision of a blasting abrasive, the wettability of a bond is improved. Thereby, a state in which the bond is uniformly coated on the outer circumferential surface 17S of the tire case 17 is held, and the bonding strength between the tire case 17 and the cushion rubber 29 can be ensured.

Particularly, even when protrusions and recesses are formed on the outer circumferential surface 17S of the tire case 17, the peripheries of the recess portions (recess walls and recess bottoms) are treated to be coarse by making the blasting abrasive collide with the recess portions (voids 28A), and the bonding strength between the tire case 17 and the cushion rubber 29 can be ensured.

Meanwhile, since the cushion rubber 29 is laminated in the coarsening-treated areas on the outer circumferential surface 17S of the tire case 17, the bonding strength between the tire case 17 and the cushion rubber 29 can be effectively ensured.

When the cushion rubber 29 has been vulcanized in the vulcanizing process, the cushion rubber 29 flows into the coarsened recesses and protrusions formed on the outer circumferential surface 17S of the tire case 17 through the coarsening treatment. In addition, when vulcanization is completed, the anchor effect is developed due to the cushion rubber 29 that has flowed into the coarsened recesses and protrusions so that the bonding strength between the tire case 17 and the cushion rubber 29 is improved.

In the tire 200 manufactured using the above method of manufacturing a tire, the bonding strength between the tire case 17 and the cushion rubber 29 is ensured, that is, the bonding strength between the tire case 17 and the tread 30 is ensured through the cushion rubber 29. Thereby, the separation between the outer circumferential surface 17S of the tire case 17 of the tire 200 and the cushion rubber 29 is suppressed while travelling and the like.

In addition, since the outer circumferential portion of the tire case 17 is configured of the reinforcing cord layer 28, the puncture resistance and the cutting resistance improve compared to a tire case having the outer circumferential portion configured of something other than the reinforcing cord layer 28.

In addition, since the reinforcing cord layer 28 is formed by winding the coated cord member 26B, the stiffness of the tire 200 in the circumferential direction is improved. The improvement of the stiffness in the circumferential direction suppresses creeping (a phenomenon in which the plastic deformation of the tire case 17 increases over time under a constant stress) in the tire case 17, and the pressure resistance with respect to the air pressure from the inside in the tire diameter direction is improved.

In the embodiment, the recesses and protrusions are configured on the outer circumferential surface 17S of the tire case 17, but the invention according to the eighth aspect is not limited thereto, and a configuration in which the outer circumferential surface 17S is formed to be flat may be employed.

In addition, in the tire case 17, the reinforcing cord layer may be formed by covering the coated cord member, which is wound around and bonded to the crown portion of the tire case, with a thermoplastic material for coating. In this case, a coated layer can be formed by discharging a thermoplastic material for coating in a molten or softened state on the reinforcing cord layer 28. In addition, the coated layer may be formed by heating an adhesive sheet into a molten or softened state without using an extruder, and attaching the adhesive sheet to the surface (outer circumferential surface) of the reinforcing cord layer 28.

The above Embodiment 8-2 employs a configuration in which partitioned case bodies (tire case half parts 17A) are bonded so as to form the tire case 17, but the eighth aspect of the invention is not limited thereto, and the tire case 17 may be integrally formed using a mold or the like.

The tire 200 of Embodiment 8-2 is a so-called tubeless tire in which an air chamber is formed between the tire 200 and the rim 20 by mounting the bead portion 12 in the rim 20, but the eighth aspect of the invention is not limited to this configuration, and the tire 200 may have, for example, a complete tube shape.

In Embodiment 8-2, the cushion rubber 29 is disposed between the tire case 17 and the tread 30, but the invention according to the eighth aspect is not limited thereto, and a configuration in which the cushion rubber 29 is not disposed may be employed.

In addition, Embodiment 8-2 employs a configuration in which the coated cord member 26B is wound around the crown portion 16 in a spiral shape, but the eighth aspect of the invention is not limited thereto, and a configuration in which the coated cord member 26B is discontinuously formed in the width direction may be employed.

Embodiment 8-2 employs a configuration in which a thermoplastic material is used as the resin material for coating 27 that forms the coated cord member 26B, and the resin material for coating 27 is heated into a molten or softened state so as to weld the coated cord member 26B on the outer circumferential surface of the crown portion 16, but the eighth aspect of the invention is not limited to this configuration, and a configuration in which the coated cord member 26B is adhered on the outer circumferential surface of the crown portion 16 using an adhesive or the like without heating the resin material for coating 27 may be employed.

In addition, a configuration in which a thermosetting resin is used as the resin material for coating 27 that forms the coated cord member 26B, and the coated cord member 26B is adhered on the outer circumferential surface of the crown portion 16 using an adhesive or the like without heating may be employed.

Furthermore, a configuration in which a thermosetting resin is used as the resin material for coating 27 that forms the coated cord member 26B and the tire case 17 is formed of a thermoplastic resin material may be employed. In this case, the coated cord member 26B may be adhered to the outer circumferential surface of the crown portion 16 using an adhesive or the like, or the coated cord member 26B may be welded on the outer circumferential surface of the crown portion 16 by heating into a molten or softened state the portion at which the coated cord member 26B of the tire case 17 is provided.

In addition, furthermore, a configuration in which a thermoplastic material is used as the resin material for coating 27 that forms the coated cord member 26B and the tire case 17 is formed of a thermoplastic resin material. In this case, the coated cord member 26B may be adhered to the outer circumferential surface of the crown portion 16 using an adhesive or the like, or the coated cord member 26B may be welded on the outer circumferential surface of the crown portion 16 by heating into a molten or softened state the portion at which the coated cord member 26B of the tire case 17 is provided, and heating the resin material for coating 27 into a molten or softened state. Meanwhile, when both the tire case 17 and the coated cord member 26B have been heated into a molten or softened state, since both are well mixed, the bonding strength is improved. In addition, when thermoplastic resin materials are used as both the resin material that forms the tire case 17 and the resin material for coating 27 that forms the coated cord member 26B, the thermoplastic resin materials are preferably the same kind of thermoplastic materials, particularly, the same thermoplastic material.

In addition, furthermore, an adhesive may be coated on the outer circumferential surface 17S of the tire case 17, on which the coarsening treatment has been carried out, after the surface of the outer circumferential surface 17S is activated using a corona treatment, a plasma treatment or the like so as to increase the hydrophilicity.

In addition, furthermore, the order for manufacturing the tire 200 is not limited to the order in Embodiment 8-1, and may be appropriately changed.

Thus far, an embodiment according to the eighth aspect of the invention has been described using the embodiment, but the embodiment is simply an example, and the invention can be carried out with a variety of modifications within the scope of the purport. In addition, it is needless to say that the scope of right of the invention according to the eighth aspect is not limited to the above embodiment.

Thus far, the specific aspects of the invention according to the eighth aspect have been described using Embodiment 8-1 and Embodiment 8-2, but the invention according to the eighth aspect is not limited to the above aspects.

Ninth Aspect of the Invention

Next, a resin material constituting as a component of a tire frame according to a ninth aspect of the invention will be described, and, subsequently, a specific embodiment of the tire according to the ninth aspect of the invention will be described using the drawings.

[Resin Material]

The tire according to the ninth aspect of the invention is a tire including at least a circular tire frame formed of a resin material, in which the resin material includes at least a first thermoplastic elastomer, a resin which is other than the first thermoplastic elastomer and has a glass transition temperature of 20° C. or lower (the specific resin according to the ninth aspect of the invention), and a second thermoplastic elastomer which is other than the first thermoplastic elastomer and includes a hard segment of the same kind as the resin. The elastic modulus of the resin (the specific resin according to the ninth aspect of the invention) is preferably larger than the elastic modulus of the first thermoplastic elastomer. In addition, the elastic modulus of the second thermoplastic elastomer is preferably smaller than the elastic modulus of the resin.

When the second thermoplastic elastomer having the above configuration is further included in addition to the first thermoplastic elastomer and the specific resin according to the ninth aspect of the invention as the resin material constituting as a component of the circular tire frame that forms the tire, the impact resistance of the tire is improved.

Hereinafter, the first thermoplastic elastomer, the specific resin according to the ninth aspect of the invention, and the second thermoplastic elastomer will be described.

[First Thermoplastic Elastomer]

The "thermoplastic elastomer" refers to a resin material including a hard segment and a soft segment in a molecule thereof as described above, and, in detail, to a resin material which is an elastic macromolecular compound and is formed of a copolymer having a polymer constituting a hard segment that is crystalline and has a high melting point or a hard segment forming a pseudo-crosslink through physical agglomeration, and a polymer constituting a segment that is non-crystalline and has a low glass transition temperature. Meanwhile, the first thermoplastic elastomer includes vulcanized rubber, such as natural rubber or synthetic rubber of the related art.

Examples of the first thermoplastic elastomer include polyamide-based thermoplastic elastomers, polyester-based thermoplastic elastomer, polyurethane-based thermoplastic elastomers, polystyrene-based thermoplastic elastomers and the like.

(Polyamide-Based Thermoplastic Elastomer)

The "polyamide-based thermoplastic elastomer" is an elastic macromolecular compound, and refers to a resin material which is formed of a copolymer having a polymer constituting a hard segment that is crystalline and has a high melting point, and a polymer constituting a soft segment that is non-crystalline and has a low glass transition temperature, and has an amid bond (—CONH—) in the main chain of the polymer constituting the hard segment.

Examples of crystalline polyamide as a component of the hard segment include aliphatic amides, such as polycaproamide (nylon-6), poly-ω-aminoheptanoic acid (nylon-7), poly-ω-aminononanoic acid (nylon-9), polyundecaneamide (nylon-11), polylauryl lactam (nylon-12), polyethylene diamine adipamide (nylon-2,6), polytetramethylene adipamide (nylon-4,6), polyhexamethylene adipamide (nylon-6,6), polyhexamethylene sebacamide (nylon-6,10), polyhexamethylene dodecamide (nylon-6,12), polyoctamethylene adipamide (nylon-8,6) and polydecamethylene adipamide (nylon-10,8); crystalline aromatic polyamides obtained through a polycondensation reaction between an aromatic diamine, such as meta-xylene diamine or para-xylene diamine, and a dicarboxylic acid, such as adipic acid, suberic acid, sebacic acid, cyclohexane dicarboxylic acid, terephthalic acid or isophthalic acid, or a derivative thereof; and the like.

Among the above, nylon-6, nylon-6,6, nylon-12 and the like are preferable, and nylon-12 is more preferable. As the "polyamide-based thermoplastic elastomer" in the present embodiment, the same polyamide-based thermoplastic elastomer as in the invention according to the above first aspect can be used.

(Polyurethane-Based Thermoplastic Elastomer)

The "polyurethane-based thermoplastic elastomer" is an elastic macromolecular compound, and refers to a resin material which is formed of a copolymer having a polymer as a component of the hard segment forming a pseudo-crosslink through physical agglomeration and a polymer constituting the soft segment that is non-crystalline and has a low glass transition temperature, and has a urethane bond in the main chain of the polymer as a component of the hard segment. The "polyurethane-based thermoplastic elastomer" in the embodiment is the same as in the above second aspect of the invention.

(Polystyrene-Based Thermoplastic Elastomer)

The "polystyrene-based thermoplastic elastomer" is an elastic macromolecular compound, and examples thereof include a material in which at least a polystyrene constitutes the hard segment, and another polymer (for example, polybutadiene, polyisoprene, polyethylene, hydrogenated polybutadiene, hydrogenated polyisoprene, or the like) constitutes the soft segment that is non-crystalline and has a low glass transition temperature. The "polyolefin-based thermoplastic elastomer" in the embodiment is the same as in according to the above second aspect of the invention.

(Polyester-Based Thermoplastic Elastomer)

Examples of the polyester-based thermoplastic elastomer include at least a material in which a polyester constitutes the hard segment that is crystalline and has a high melting point, and another polymer (for example, polyester, polyether, or the like) constitutes the soft segment that is non-crystalline and has a low glass transition temperature. The "polyester-based thermoplastic elastomer" in the embodiment is the same as in the above second aspect of the invention.

The resin material according to the ninth aspect of the invention may include two or more kinds of the first thermoplastic elastomers, but the thermoplastic resin material preferably includes one kind of the first thermoplastic elastomer from the viewpoint of controlling tire performances of a tire formed using the resin material.

Among the first thermoplastic elastomers described above, at least one selected from the polyamide-based thermoplastic elastomers, the polyester-based thermoplastic elastomer, the polyurethane-based thermoplastic elastomers and the polystyrene-based thermoplastic elastomers is preferably used, and, furthermore, the polyamide-based thermoplastic elastomer or the polyester-based thermoplastic elastomer is preferable since the polyamide-based thermoplastic elastomer or the polyester-based thermoplastic elastomer has thermal resistance and is excellent in term of tensile modulus of elasticity, tensile strength and fracture strain, the structure of the tire can be simplified compared to a rubber tire of the related art, and, consequently, reduction in weight of the tire can be realized.

Further, the glass transition temperature (Tg) of the first thermoplastic elastomer is preferably from 30° C. to 50° C., and more preferably from 25° C. to 70° C. in order to decrease the influence on the rolling resistance, that is, in order to suppress the tan δ at 30° C. to 50° C. The glass transition temperature can be measured in accordance with the same method as for the glass transition temperature in a specific resin according to the ninth aspect of the invention described below.

In addition, the elastic modulus of the first thermoplastic elastomer is lower than the elastic modulus of the specific resin according to the ninth aspect of the invention since the elastic modulus of the first thermoplastic elastomer is increased by adding the specific resin according to the ninth aspect of the invention, is preferably from 5 MPa to 700 MPa, and more preferably from 10 MPa to 500 MPa. The elastic modulus refers to the tensile modulus of elasticity regulated in JIS K7113:1995, and can be measured using, for example, a precision universal tester AUTOGRAPH manufactured by Shimadzu Corporation.

In addition, the tan δ of the first thermoplastic elastomer is preferably from 0 to 0.1, and more preferably from 0 to 0.07 in order to suppress the tan δ at 30° C. to 50° C. The tan δ can be measured using, for example, ARESIII manufactured by Rheometric Scientific, Inc. under the conditions of 30° C., 20 Hz and 1% of shear distortion.

[The Specific Resin According to the Ninth Aspect of the Invention]

The resin material includes a resin which has a glass transition temperature of 20° C. or lower and is other than the first thermoplastic elastomer (the specific resin according to the ninth aspect of the invention).

Further, the resin according to the ninth aspect of the invention refers to a thermoplastic or thermosetting resin, and does not encompass vulcanized rubber, such as natural rubber or synthetic rubber of the related art.

The glass transition temperature (Tg) is more preferably 15° C. or lower, and particularly preferably 10° C. or lower. Further, the lower limit value is not particularly limited, but the glass transition temperature is preferably equal to or greater than −200° C., and particularly preferably equal to or greater than −150° C.

When the specific resin according to the ninth aspect of the invention having a glass transition temperature of the upper limit value or less is added to the thermoplastic elastomer, and used, the resin material has a desired elastic modulus, and the tan δ can be suppressed at a low level. As a result, in the ninth aspect of the invention t, a preferable elastic modulus can be obtained, and the rolling resistance of the tire can be reduced.

Here, the glass transition temperature of the specific resin according to the ninth aspect of the invention can be measured from the temperature dependency of the dynamic loss (tan δ). For example, the glass transition temperature can be measured using, for example, ARESIII manufactured by Rheometric Scientific, Inc. under the conditions of 10 Hz and 0.2% of shear distortion. Alternatively, the glass transition temperature can be measured using a differential scanning calorimetry (DSC).

As the specific resin according to the ninth aspect of the invention, for example, among the resins listed as examples of the resin which is not modified by an acid (other resin) described below, resins satisfying the glass transition temperature (Tg) or acid-modified resins described below can be used.

Further, the specific resin according to the ninth aspect of the invention is more preferably an acid-modified resin. The "acid-modified resin" refers to a resin obtained by bonding an unsaturated compound having an acidic group, such as a carboxylic acid group, a sulfuric acid group or a phosphoric acid group, to a resin. For example, when an unsaturated carboxylic acid group (generally, maleic acid anhydride) is used as the unsaturated compound having an acidic group, an unsaturated bond portion of the unsaturated carboxylic acid is bonded (for example, graft polymerization) to an olefin-based resin.

When the acid-modified resin is used, the resin material includes a sea-island structure having a sea phase constituted of a thermoplastic elastomer and an island phase constituted of the acid-modified resin. When the interaction at the phase interface between the sea phase and the island phase is weak, the fluidity of the resin material increases and the injection moldability is excellent. Since the acid-modified resin has an acid-modified portion in a molecule thereof, the interaction with the thermoplastic elastomer is strong, compared to a resin that is not modified by an acid.

The acid-modified resin is preferably a compound having a carboxylic acid group, which is a weak acid group, from the viewpoint of suppressing the deterioration of the thermoplastic elastomer, and examples thereof include acrylic acid, methacrylic acid, itaconic acid, crotonic acid, isocrotonic acid, maleic acid, and the like.

Examples of the acid-modified resin include an acid-modified polyolefin resin and the like. Among the above, acid-modified polyethylene, acid-modified polypropylene, acid-modified ethylene-propylene copolymers, ethylene-vinyl acetate copolymers are preferable.

Examples of the acid-modified polyolefin include ADOMER QF551, QE060, LB548, NE827, QB550 and the like manufactured by Mitsui Chemicals, Inc.

The acid value of the acid-modified resin needs to exceed 0 mg ($CH_3ONa$)/g. The acid value is measured as the mass [mg] of sodium methoxide ($CH_3ONa$) used when neutralization titration is carried out on the respective acid-modified resin 1 [g] using sodium methoxide ($CH_3ONa$).

Hereinafter, the units of the acid values of the respective acid-modified resins will also be expressed using [mg ($CH_3ONa$)/g].

In the sea-island structure, there is a tendency for the island phase to become smaller as the acid value increases, and there is a tendency for the island phase to become large as the acid value decreases. By including the acid-modified resin, the island phase is finely dispersed in the thermoplastic elastomer.

Meanwhile, the island phase of the acid-modified resin finely dispersed in the resin material can be confirmed through photograph observation using SEM (scanning electron microscope).

Further, the elastic modulus of the specific resin according to the ninth aspect of the invention is higher than the elastic modulus of the thermoplastic elastomer, in order to increase the elastic modulus, is preferably 100 MPa to 3000 MPa, and more preferably 300 MPa to 2000 MPa. The elastic modulus refers to the tensile modulus of elasticity regulated in JIS K7113:1995, and can be measured using the method described in the above thermoplastic elastomer.

In addition, the tan δ of the specific resin according to the ninth aspect of the invention preferably has a peak of the tan δ at −150° C. to 20° C., and more preferably has a peak at −150° C. to 15° C. in order to decrease the tan δ of the resin material. The tan δ can be measured using the method described in the above thermoplastic elastomer.

Further, the resin material may include two or more kinds of the specific resin according to the ninth aspect of the invention.

[Second Thermoplastic Elastomer]

The resin material includes the second thermoplastic elastomer which includes a hard segment of the same kind as the resin material and is other than the first thermoplastic elastomer.

The "thermoplastic elastomer including a hard segment of the same kind as the resin" refers to a thermoplastic elastomer including a hard segment including a skeleton which is common to the skeleton constituting the main chain of the resin.

It is considered that, when the second thermoplastic elastomer includes the hard segment including a skeleton which is common to the skeleton that constitutes the main chain of the specific resin according to the ninth aspect of the invention, the affinity between the specific resin according to the ninth aspect of the invention and the hard segment of the second thermoplastic elastomer increases.

In addition, it is considered that, when the second thermoplastic elastomer is further included in addition to the first thermoplastic elastomer and the specific resin according to the ninth aspect of the invention, flexibility is given to the specific resin according to the ninth aspect of the invention, and, consequently, the impact resistance of the resin material is improved.

When the rein material contains the specific resin according to the ninth aspect and, furthermore, a resin which is not modified by an acid (other resin) described below, as the second thermoplastic elastomer, it is preferable to use a second thermoplastic elastomer including a hard segment of the same kind as the other resin, that is, the second thermoplastic elastomer including a hard segment with a skeleton which is common to the skeleton that constitutes the main chain of the other resin.

For example, when the specific resin according to the ninth aspect of the invention, which is included in the resin material, is a olefin-based resin, and the other resin is polypropylene, an olefin-based thermoplastic elastomer including polypropylene as the second thermoplastic elastomer is preferably used.

As described above, since an acid-modified polyolefin is preferably used as the specific resin according to the ninth aspect of the invention, which is included in the resin material, the second thermoplastic elastomer is preferably an olefin-based thermoplastic elastomer.

Further, the glass transition temperature (Tg) of the second thermoplastic elastomer is not particularly limited, but is preferably equal to or less than 30° C., or equal to or greater than 50° C., and more preferably equal to or less than 25° C., or equal to or greater than 70° C. in order to decrease the influence on the rolling resistance, that is, to suppress the tan δ at 30° C. to 50° C. The glass transition temperature can be measured in accordance with the same method as for the glass transition temperature in the specific resin according to the ninth aspect of the invention described above.

Here, the glass transition temperature can be measured from, for example, the temperature dependency of the dynamic loss (tan δ). For example, the glass transition temperature can be measured using, for example, ARESIII manufactured by Rheometric Scientific, Inc. under the conditions of 10 Hz and 0.2% of shear distortion. Alternatively, the glass transition temperature can be measured using a differential scanning calorimetry (DSC).

In addition, the elastic modulus of the second thermoplastic elastomer is lower than the elastic modulus of the specific resin according to the ninth aspect of the invention, is preferably from 5 MPa to 700 MPa, and more preferably from 10 MPa to 500 MPa. The elastic modulus refers to the tensile modulus of elasticity regulated in JIS K7113:1995, and can be measured using, for example, a precision universal tester AUTOGRAPH manufactured by Shimadzu Corporation.

An olefin-based thermoplastic elastomer is preferable as the second thermoplastic elastomer.

(Polyolefin-Based Thermoplastic Elastomer)

Examples of the "polyolefin-based thermoplastic elastomer" include at least a material in which a polyolefin constitutes the hard segment that is crystalline and has a high melting point, and another polymer (for example, the above polyolefin, other polyolefin or crosslinked rubber) constitutes the soft segment that is non-crystalline and has a low glass transition temperature. Examples of the polyolefin that forms the hard segment include polyethylene, polypropylene, isotactic polypropylene, polybutene, and the like. The "polyolefin-based thermoplastic elastomer" in the embodiment is the same as in the above second aspect of the invention.

As the polyolefin-based thermoplastic elastomer, for example, commercially available products such as "TAFMER" series manufactured by Mitsui Chemicals, Inc. (for example, A0550S, A1050S, A4050S, A1070S, A4070S, A35070S, A1085S, A4085S, A7090, A70090, MH7007, MH7010, XM-7070, XM-7080, BL4000, BL2481, BL3110, BL3450, P-0275, P-0375, P-0775, P-0180, P-0280, P-0480 and P-0680), "NUCREL" series manufactured by Du Pont-Mitsui Polychemicals Co., Ltd. (for example, AN4214C, AN4225C, AN42115C, N0903HC, N0908C, AN42012C, N410, N1050H, N1108C, N1110H, N1207C, N1214, AN4221C, N1525, N1560, N0200H, AN4228C, AN4213C and N035C, "ELVALOY AC" series (for example, 1125AC, 1209AC, 1218AC, 1609AC, 1820AC, 1913AC, 2112AC, 2116AC, 2615AC, 2715AC, 3117AC, 3427AC and 3717AC), "ACRIFT" series, "EVATATE" series manufactured by Sumitomo Chemical Company, Limited, "ULTRASEN" series manufactured by Tosoh Corporation, and the like, can be used.

Furthermore, as the polyolefin-based thermoplastic elastomer examples, for example, commercially available products such as "PRIME TPO" series manufactured by Prime Polymer Co., Ltd. (for example, E-2900H, F-3900H, E-2900, F-3900, J-5900, E-2910, F-3910, J-5910, E-2710, F-3710, J-5910, E-2740, F-3740, R110MP, R110E, T310E, M142E and the like) also can be used.

TPV is a polyolefin-based thermoplastic elastomer obtained by incorporating rubber, such as EPR or EPDM, and a crosslinking agent into an olefin resin, such as propylene, and carrying out crosslinking while kneading the components using a biaxial extruder. Generally incorporated add-in materials, such as oil and an antioxidant, may be incorporated into rubber.

As the polyolefin-based thermoplastic elastomer, for examples, commercially available products such as MILASTOMER (registered trademark) manufactured by Mitsui Chemicals, Inc., ESPOLEX TPE series manufactured by Sumitomo Chemical Company, Limited, THERMORUN (registered trademark) manufactured by Mitsubishi Chemical Corporation and the like can be used.

[Resin which is not Modified by Acid (Other Resin)]

When the resin material includes the acid-modified resin as the specific resin according to the ninth aspect of the invention, the resin material may further include a resin which is not modified by an acid (other resin), and which is other than the first thermoplastic elastomer and the second thermoplastic elastomer. The resin which is not modified by acid refers to a resin having an average rate of acid modification of 0 mg/g.

Further, the resin in the ninth aspect of the invention refers to a thermoplastic or thermosetting resin, and does not include vulcanized rubber, such as natural rubber or synthetic rubber of the related art.

As such, when the resin material contains the first thermoplastic elastomer, the acid-modified specific resin according to the ninth aspect of the invention, the second thermoplastic elastomer, and, furthermore, the resin which is not modified by an acid (other resin), the tensile characteristics, such as tensile elasticity and rupture strength, can be improved as the tire performances.

In addition, when the resin material does not include the acid-modified resin as the specific resin according to the ninth aspect of the invention, the resin material may include the resin which is not modified by an acid (other resin, which satisfies the conditions of the specific resin according to the ninth aspect of the invention) as the specific resin according to the ninth aspect of the invention. Further, when the thermoplastic elastomer is a polystyrene-based thermoplastic elastomer, since a polar group is not included in the polystyrene-based thermoplastic elastomer, the resin which is not modified by an acid is preferably used as the specific resin according to the ninth aspect of the invention.

Examples of the other resin include polyolefin resins and the like. Among the above, polypropylene, polyethylene, ethylene-propylene copolymers, and the like can be exemplified, and polypropylene and ethylene-propylene copolymers are preferable particularly from the viewpoint of improving the tensile characteristics, such as tensile elasticity and rupture strength.

Examples of the polypropylene and the ethylene-propylene copolymers include J-700GP (homopolymer), JP-2000GP (homopolymer), J-466HP (block polymer), J-106MG (homopolymer), J-226T (random polymer) manufactured by Prime Polymer Co., Ltd.; NOVATEC EC9EV (block polymer), Wintec WFW4 (random polymer) manufactured by Japan Polypropylene Corporation, and the like.

In addition, the tan δ of other resin preferably has a peak of the tan δ at −150° C. to 20° C., and more preferably has a peak at −150° C. to 15° C. in order to decrease the tan δ of the resin material. The tan δ can be measured using the method described in the above thermoplastic elastomer.

Further, when the resin material contains the thermoplastic elastomer, the acid-modified specific resin according to the ninth aspect of the invention, and, furthermore, the resin which is not modified by an acid (other resin), the tan δ of other resin is not particularly limited in the above range.

In addition, the elastic modulus of the other resin is higher than the elastic modulus of the thermoplastic elastomer, in order to increase the elastic modulus, is preferably from 100 MPa to 3000 MPa, and more preferably from 300 MPa to 2000 MPa. The elastic modulus refers to the tensile modulus of elasticity regulated in JIS K7113:1995, and can be measured using the method described in the above thermoplastic elastomer.

Further, the resin material may include two or more kinds of the other resin.

[Combination and Ratio]

In the resin material according to the ninth aspect of the invention, the ratio of the total amount of the specific resin according to the ninth aspect of the invention and the other resin to the first thermoplastic elastomer (the first thermoplastic elastomer:the specific resin according to the ninth aspect of the invention+the other resin [mass ratio]) is preferably from 95:5 to 55:45, and more preferably from 95:5 to 60:40 from the viewpoint of making the first thermoplastic elastomer form a sea phase in the sea-island structure.

In addition, when both the specific resin according to the ninth aspect of the invention and the other resin are included, the ratio of the other resin to the specific resin according to the ninth aspect of the invention (the specific resin according to the ninth aspect of the invention:the other resin [mass ratio]) is preferably from 100:0 to 5:95, and more preferably from 100:0 to 10:90 from the viewpoint of providing the interaction with the thermoplastic elastomer.

In addition, the ratio of the second thermoplastic elastomer to the total amount of the specific resin according to the ninth aspect of the invention and the other resin (the specific resin according to the ninth aspect of the invention+the other resin: the second thermoplastic elastomer [mass ratio]) is preferably from 95:5 to 50:50 from the viewpoint of dispersing the second thermoplastic elastomer in the specific resin according to the ninth aspect of the invention and the other resin.

Furthermore, the total content of the thermoplastic elastomer, the first thermoplastic elastomer, the specific resin according to the ninth aspect of the invention, the second thermoplastic elastomer, and the other resin in the resin material is preferably 50 mass % to 100 mass % with respect to the total mass of the resin material from the viewpoint of making the thermoplastic elastomer, the first thermoplastic elastomer, the specific resin according to the ninth aspect of the invention, the second thermoplastic elastomer, and the other resin form a sea phase in the sea-island structure.

Further, the combination of the thermoplastic elastomer, the specific resin according to the ninth aspect of the invention, and the other resin in the resin material according to the ninth aspect of the invention is preferably the following combination.

A combination of the polyamide-based thermoplastic elastomer, the acid-modified polyolefin resin and the olefin-based thermoplastic elastomer A combination of the polyamide-based thermoplastic elastomer, the acid-modified polyolefin resin, polypropylene and the olefin-based thermoplastic elastomer including polypropylene A combination of the polyamide-based thermoplastic elastomer, the acid-modified polyolefin resin, an ethylene-propylene copolymer and the olefin-based thermoplastic elastomer including polypropylene A combination of the polyester-based thermoplastic elastomer, the acid-modified polyolefin resin and the olefin-based thermoplastic elastomer A combination of the polyester-based thermoplastic elastomer, the acid-modified polyolefin resin, polypropylene and the olefin-based thermoplastic elastomer including polypropylene A combination of the polyester-based thermoplastic elastomer, the acid-modified polyolefin resin, an ethylene-propylene copolymer and the olefin-based thermoplastic elastomer including polypropylene A combination of the polystyrene-based thermoplastic elastomer, the polyolefin resin and the olefin-based thermoplastic elastomer

[Other Compositions and the Properties of the Resin Material]

The resin material may contain a variety of fillers (for example, silica, calcium carbonate and clay) and a variety of additives, such as an age inhibitor, oil, a plasticizer, a coloring agent, a weather-resisting agent and a reinforcing material, as desired.

The resin material can be obtained by mixing the first thermoplastic elastomer, the specific resin according to the ninth aspect of the invention and the second thermoplastic elastomer, adding other resin or a variety of additives as necessary, and melting and mixing the components. The mixing proportion among the first thermoplastic elastomer, the specific resin according to the ninth aspect of the invention and the second thermoplastic elastomer follows the fractions described above. The resin material obtained through melting and mixing can be used in a pellet shape as necessary.

The tensile modulus of elasticity of the resin material according to the ninth aspect of the invention, which is regulated in JIS K7113:1995, is preferably from 100 MPa to 1000 MPa, more preferably from 100 MPa to 800 MPa, and particularly preferably from 100 MPa to 700 MPa. When the tensile modulus of elasticity of the resin material is 100 MPa to 1000 MPa, fitting onto a rim can be efficiently carried out while holding the shape of the tire frame.

The tensile yield strength of the resin material according to the ninth aspect of the invention, which is regulated in JIS K7113:1995, is preferably 5 MPa or more, preferably from 5 MPa to 20 MPa, and still more preferably from 5 MPa to 17 MPa. When the tensile yield strength of the resin material is 5 MPa or more, it is possible to withstand deformation caused by a load applied to the tire while travelling and the like.

The tensile yield elongation of the resin material according to the ninth aspect of the invention, which is regulated in JIS K7113:1995, is preferably 10% or more, preferably from 10% to 70%, and still more preferably from 15% to 60%.

When the tensile yield elongation of the resin material is 10% or more, it is possible to increase the elastic area and improve fittability onto a rim.

The tensile fracture elongation of the resin material according to the ninth aspect of the invention, which is regulated in JIS K7113:1995, is preferably equal to or greater than 50%, preferably equal to or greater than 100%, still more preferably equal to or greater than 150%, and particularly preferably equal to or greater than 200%. When the tensile fracture elongation of the resin material is equal to or greater than 50%, it is possible to improve the fittability onto a rim and make the resin material resistant to fracture due to collision.

The deflection temperature under load (under a load of 0.45 MPa) of the resin material according to the ninth aspect of the invention, which is regulated in ISO75-2 or ASTM D648, is preferably equal to or greater than 50° C., preferably from 50° C. to 150° C., and still more preferably from 50° C. to 130° C. When the deflection temperature under load of the resin material is equal to or greater than 50° C., it is possible to suppress deflection in a curing step, such as treading.

[Resin Material as a Component of the Reinforcing Cord Layer]

The tire according to the ninth aspect of the invention may have the reinforcing cord member which is wound around the outer circumferential surface of the tire frame in the circumferential direction so as to form the reinforcing cord layer.

The "resin material as a component of the reinforcing cord layer" according to the ninth aspect of the invention are the same as the "resin material as a component of the reinforcing cord layer" according to the first aspect of the invention.

Embodiment 9-1

Hereinafter, a tier according to Embodiment 9-1 of the tire according to the ninth aspect of the invention will be described according to the drawings.

Here, the tire according to Embodiment 9-1 is the same as the above Embodiment 1-1 except for the following facts. Therefore, the same reference signs and drawings will be used in the description regarding the same drawings and members.

The tire case 17 of the embodiment is formed of a resin material containing a polyamide-based thermoplastic elastomer (UBESTA, XPA9048 manufactured by Ube Industries, Ltd.), an acid-modified polyolefin (ADOMER QF551 manufactured by Mitsui Chemicals, Inc., a glass transition temperature −13° C.) and an olefin-based thermoplastic elastomer including polypropylene (PRIME TPO F-3740 manufactured by Prime Polymer Co., Ltd.) (hereinafter referred to simply as "resin material" in the description of Embodiment 9-1). In the present embodiment, the tire case 17 is formed of a single kind of a resin material, the invention according to the ninth aspect is not limited to this configuration, and, similarly to an ordinary pneumatic rubber tire of the related art, different thermoplastic resin materials having different characteristics may be used in the respective portions (the side portions 14, the crown portion 16, the bead portions 12, and the like) of the tire case 17. Other portions are the same as in the tire according to the above Embodiment 1-1, and the manufacturing method is the same as well.

(Effects)

In the tire 10 of the embodiment, since the tire case 17 is formed of the resin material further including the second thermoplastic elastomer in addition to the first thermoplastic elastomer and the specific resin according to the ninth aspect of the invention, the elastic modulus of the tire case 17 can be controlled, and an increase in the rolling resistance of the tire can be suppressed.

In addition, the resin material has a high adhesion to the reinforcing cord 26, and, furthermore, is excellent in terms of fixing performances, such as weld strength. Therefore, it is possible to suppress the phenomenon in which air remains around the reinforcing cord 26 in the reinforcing cord winding step (incorporation of air). When the adhesion and weldability to the reinforcing cord 26 are high, and, furthermore, incorporation of air into the periphery of the reinforcing cord member is suppressed, it is possible to effectively suppress the movement of the reinforcing cord 26 due to, for example, a force applied while travelling. Thereby, for example, even when a tire-constituting member has been provided so as to cover the entire outer circumferential portion of the tire frame with the reinforcing cord member, since the movement of the reinforcing cord member is suppressed, the separation or the like of the members (including the tire frame) is suppressed, and the durability of the tire 10 is improved.

In addition, in the tire 10 of the embodiment, since the reinforcing cord 26 having a higher stiffness than the resin material is wound in a spiral shape in the circumferential direction on the outer circumferential surface of the crown portion 16 in the tire case 17 formed of the resin material, the puncture resistance, the cutting resistance and the stiffness of the tire 10 in the circumferential direction are improved. Meanwhile, the improvement of the stiffness of the tire 10 in the circumferential direction prevents the creeping in the tire case 17 formed of the thermoplastic resin material.

In addition, in the cross-sectional view of the tire case 17 in the axial direction (the cross section illustrated in FIG. 1), since at least some of the reinforcing cord 26 is embedded in the outer circumferential surface of the crown portion 16 in the tire case 17 formed of the resin material, and is adhered to the resin material, incorporation of air during manufacturing is suppressed, and the movement of the reinforcing cord 26 due to a force applied or the like while travelling is suppressed. Thereby, the separation or the like of the reinforcing cord 26, the tire case 17 and a tread 30 is suppressed, and the durability of the tire 10 is improved.

In addition, since the depth L of embedding of the reinforcing cord 26 is equal to or greater than 1/5 of the diameter D as illustrated in FIG. 2, incorporation of air during manufacturing is effectively suppressed, and the movement of the reinforcing cord 26 due to input power or the like while travelling is further suppressed.

In addition, since the tread 30 that comes into contact with road surfaces is constituted of a rubber material that is more abrasion-resistant than the resin material, the abrasion resistance of the tire 10 is improved.

Furthermore, since a annular bead core 18 made of a metallic material is embedded in the bead portion 12, similarly to a pneumatic rubber tire of the related art, the tire case 17, that is, the tire 10 is strongly held to the rim 20.

In addition, furthermore, since a sealing layer 24 formed of a rubber material having higher sealing properties than the resin material is provided in a portion that comes into contact with the rim 20 of the bead portion 12, the sealing properties between the tire 10 and the rim 20 is improved. Therefore, compared to when the tire is sealed with the rim 20 using the resin material, the air leakage in the tire is further suppressed. In addition, rim fitting properties also are improved when the sealing layer 24 is provided.

The above embodiment employs a configuration in which the reinforcing cord 26 is heated, and the resin material in the portion with which the heated reinforcing cord 26 comes into contact is melted or softened, but the invention according to the ninth aspect is not limited to this configuration, and the reinforcing cord 26 may be embedded in the crown portion 16 after heating the outer circumferential surface of the crown portion 16, in which the reinforcing cord 26 is to be embedded, using a hot air generating apparatus without heating the reinforcing cord 26.

In addition, in Embodiment 9-1, a heater and a fan are used as the heat source of a cord-heating device 59, but the ninth aspect of the invention is not limited to this configuration, and a configuration in which the reinforcing cord 26 is directly heated using radiation heat (for example, ultraviolet rays or the like) may be employed. In addition, the reinforcing cord-embedded portion may be melted or softened by making the heat source of the hot air generating apparatus, for example, infrared rays converge at the portion at which the reinforcing cord 26 is embedded.

Furthermore, Embodiment 9-1 employs a configuration in which the portion, in which the thermoplastic resin material having the reinforcing cord 26 embedded therein is melted or softened, is forcibly cooled using the second metal roller 64, but the ninth aspect of the invention is not limited to this configuration, and a configuration in which the portion, in which the thermoplastic resin material is melted or softened, is forcibly cooled and solidified by directly blowing cold air to the portion in which the thermoplastic resin material is melted or softened.

In addition, Embodiment 9-1 employs a configuration in which the reinforcing cord 26 is heated; however, for example, a configuration in which the outer circumference of the reinforcing cord 26 is coated with the same thermoplastic resin material as the tire case 17 may be employed, and, in this case, it is possible to effectively suppress incorporation of air during embedding in the crown portion 16 by heating the thermoplastic resin material, which is coated with the reinforcing cord 26, when winding the coated reinforcing cord around the crown portion 16 of the tire case 17.

The tire 10 of Embodiment 9-1 is a so-called tubeless tire in which an air chamber is formed between the tire 10 and the rim 20 by mounting the bead portion 12 in the rim 20, but the ninth aspect of the invention is not limited to this configuration, and the tire may have a complete tube shape.

The tire having the complete tube shape may be an embodiment in which, for example, three circular-shaped tire frames are disposed in the tire width direction as illustrated in FIG. 4. FIG. 4 is a cross-sectional view of the tire according to other embodiment. As illustrated in FIG. 4, the tire 86 has the tread rubber layer 87, circular-shaped hollow tubes (tire frame) 88 which are formed of the same resin material as in Embodiment 9-1, the belt (reinforcing cord) 89 and the rim 90. Three tubes 88 are disposed in series in the tire width direction of the tire 86. The tread rubber layer 87, in which the belt 89 is embedded, is adhered to the outer circumferential portions of the tubes 88. In addition, the tubes 88 are mounted on the rim 90 having recess portions that engage with the tubes 88. Meanwhile, the bead core is not provided in the tire 86.

In addition, the spiral winding of the reinforcing cord 26 facilitates the manufacturing, but a method, in which the reinforcing cord 26 is discontinuously formed in the width direction, or the like can be also considered.

Thus far, an embodiment according to the ninth aspect of the invention has been described using the embodiment, but the embodiment is simply an example, and the invention can be carried out with a variety of modifications within the scope of the purport. In addition, it is needless to say that the scope of right of the invention according to the ninth aspect is not limited to the above embodiment.

Embodiment 9-2

Next, a method of manufacturing the tire according to the ninth aspect of the invention and Embodiment 9-2 of the tire will be described according to the drawings. Similarly to the above Embodiment 9-1, the tire of the present embodiment exhibits almost the same cross-sectional shape as an ordinary pneumatic rubber tire of the related art.

Here, the tire according to Embodiment 9-2 is the same as the above Embodiment 1-2 except for the following facts. Therefore, the same reference signs and drawings will be used in the description regarding the same drawings and members.

In the tire of Embodiment 9-2, similarly to the above Embodiment 9-1, the tire case 17 is formed of a mixed material of a polyamide-based thermoplastic elastomer (UBESTA, XPA9048 manufactured by Ube Industries, Ltd.), an acid-modified polyolefin (ADOMER QF551 manufactured by Mitsui Chemicals, Inc., a glass transition temperature −13° C.) and an olefin-based thermoplastic elastomer including polypropylene (PRIME TPO F-3740 manufactured by Prime Polymer Co., Ltd.) (hereinafter referred to simply as "resin material" in the description of Embodiment 9-2). Other portions are the same as in the tire according to the above Embodiment 1-2, and the manufacturing method is the same as well.

(Effects)

In the tire 200 of the embodiment, since the tire case 17 is formed of the resin material further including the above second thermoplastic elastomer resin in addition to the first thermoplastic elastomer and the specific resin according to the ninth aspect of the invention, elastic modulus of the tire case 17 can be controlled, and an increase in the rolling resistance of the tire can be suppressed.

In the method of manufacturing the tire of the embodiment, when the tire case 17, a cushion rubber 29 and a tread rubber 30A are integrated, since the outer circumferential surface 17S of the tire case 17 has been treated to be coarse, the bonding properties (adhesion) is improved due to an anchor effect. In addition, since the resin material that forms the tire case 17 is dug out by the collision of a blasting abrasive, wettability of a bond is improved. Thereby, a state in which the bond is uniformly coated on the outer circumferential surface 17S of the tire case 17 is held, and the bonding strength between the tire case 17 and the cushion rubber 29 can be ensured.

Particularly, even when protrusions and recesses are formed on the outer circumferential surface 17S of the tire case 17, the peripheries of the recess portions (recess walls and recess bottoms) are treated to be coarse by making the blasting abrasive collide with the recess portions (voids 28A), and the bonding strength between the tire case 17 and the cushion rubber 29 can be ensured.

Meanwhile, since the cushion rubber 29 is laminated in the coarsening-treated areas on the outer circumferential surface 17S of the tire case 17, the bonding strength between the tire case 17 and the cushion rubber 29 can be effectively ensured.

When the cushion rubber 29 has been vulcanized in the vulcanizing step, the cushion rubber 29 flows into the coarsened recessed and protrusions formed on the outer circumferential surface 17S of the tire case 17 through the coarsening treatment. In addition, when vulcanization is completed, anchor effect is developed due to the cushion rubber 29 that has flowed into the coarsened recesses and protrusions so that the bonding strength between the tire case 17 and the cushion rubber 29 is improved.

The tire 200 manufactured using the above method of manufacturing a tire ensures the bonding strength between the tire case 17 and the cushion rubber 29, that is, ensures the bonding strength between the tire case 17 and the tread 30 through the cushion rubber 29. Thereby, the separation between the outer circumferential surface 17S of the tire case 17 of the tire 200 and the cushion rubber 29 at travelling and the like is suppressed.

In addition, since the outer circumferential portion of the tire case 17 is provided with the reinforcing cord layer 28, the puncture resistance and the cutting resistance are improved compared to a tire case having the outer circumferential portion constituted of something other than the reinforcing cord layer 28.

In addition, since the reinforcing cord layer 28 is formed by winding the coated cord member 26B, the stiffness of the tire 200 in the circumferential direction is improved. The improvement of the stiffness in the circumferential direction suppresses creeping (a phenomenon in which the plastic deformation of the tire case 17 increases over time under a constant stress) in the tire case 17, and the pressure resistance with respect to the air pressure from the inside in the tire diameter direction is improved.

In the embodiment, the recesses and protrusions are formed on the outer circumferential surface 17S of the tire case 17, but the ninth aspect of the invention is not limited thereto, and a configuration in which the outer circumferential surface 17S is formed to be flat may be employed.

In addition, in the tire case 17, the reinforcing cord layer may be formed by covering the coated cord member, which is wound around and bonded to the crown portion of the tire case, with a thermoplastic material for coating. In this case, a coated layer can be formed by discharging a thermoplastic material for coating in a molten or softened state on the reinforcing cord layer 28. In addition, the coated layer may be formed by heating an adhesive sheet into a molten or softened state without using an extruder, and attaching the adhesive sheet to the surface (outer circumferential surface) of the reinforcing cord layer 28.

The above Embodiment 9-2 employs a configuration in which partitioned case bodies (tire case half parts 17A) are bonded so as to form the tire case 17, but the invention according to the ninth aspect is not limited thereto, and the tire case 17 may be integrally formed using a mold or the like.

The tire 200 of Embodiment 9-2 is a so-called tubeless tire in which an air chamber is formed between the tire 200 and the rim 20 by mounting the bead portion 12 in the rim 20, but the ninth aspect of the invention is not limited to this configuration, and the tire 200 may have, for example, a complete tube shape.

In Embodiment 9-2, the cushion rubber 29 is disposed between the tire case 17 and the tread 30, but the ninth aspect of the invention is not limited thereto, and a configuration in which the cushion rubber 29 is not disposed may be employed.

In addition, Embodiment 9-2 employs a configuration in which the coated cord member 26B is wound around the crown portion 16 in a spiral shape, but the invention according to the ninth aspect is not limited thereto, and a configuration in which the coated cord member 26B is discontinuously formed in the width direction may be employed.

Embodiment 9-2 employs a configuration in which a resin material for coating 27 that forms a coated cord rubber 26B is used as a thermoplastic material, and the resin material for coating 27 is heated into a molten or softened state so as to weld the coated cord member 26B on the outer circumferential surface of the crown portion 16, but the ninth aspect of the invention is not limited to this configuration, and a configuration in which the coated cord member 26B is welded on the outer circumferential surface of the crown portion 16 using an adhesive or the like without heating the resin material for coating 27 may be employed.

In addition, a configuration in which the resin material for coating 27 that forms the coated cord member 26B is used as a thermosetting resin and the coated cord member 26B is welded on the outer circumferential surface of the crown portion 16 using an adhesive or the like without heating may be employed.

Furthermore, a configuration in which the resin material for coating 27 that forms the coated cord member 26B is used as a thermosetting resin, and the tire case 17 is formed of a thermoplastic resin material may be employed. In this case, the coated cord member 26B may be adhered to the outer circumferential surface of the crown portion 16 using an adhesive or the like, or the coated cord member 26B may be welded on the outer circumferential surface of the crown portion 16 by heating into a molten or softened state the portion at which the coated cord member 26B of the tire case 17 is provided.

In addition, furthermore, a configuration in which the resin material for coating 27 that forms the coated cord rubber 26B is used as a thermoplastic material and the tire case 17 is formed of a thermoplastic resin material. In this case, the coated cord member 26B may be adhered to the outer circumferential surface of the crown portion 16 using an adhesive or the like, or the coated cord member 26B may be welded on the outer circumferential surface of the crown portion 16 by heating the resin material for coating 27 into a molten or softened state, while heating into a molten or softened state the portion at which the coated cord member 26B of the tire case 17 is provided. Meanwhile, when both the tire case 17 and the coated cord member 26B have been heated into a molten or softened state, since both are well mixed, the bonding strength is improved. In addition, when thermoplastic resin materials are used as both the resin material that forms the tire case 17 and the resin material for coating 27 that forms the coated cord member 26B, the thermoplastic resin materials are preferably the same kind of thermoplastic materials, particularly, the same thermoplastic material.

In addition, furthermore, an adhesive may be coated on the outer circumferential surface 17S of the tire case 17, on which the coarsening treatment has been carried out, after the surface of the outer circumferential surface 17S is activated using a corona treatment, a plasma treatment or the like so as to increase the hydrophilicity.

In addition, furthermore, the order for manufacturing the tire 200 is not limited to the order in Embodiment 9-1, and may be appropriately changed.

Thus far, an embodiment according to the ninth aspect of the invention has been described using the embodiment, but the embodiment is simply an example, and the invention can be carried out with a variety of modifications within the scope of the purport. In addition, it is needless to say that the scope of right of the invention according to the ninth aspect is not limited to the above embodiment.

Thus far, the specific aspects of the invention according to the ninth aspect have been described using Embodiment 9-1 and Embodiment 9-2, but the invention according to the ninth aspect is not limited to the above aspects.

The Tenth Aspect of the Invention

Next, a thermoplastic resin material including a polyamide-based thermoplastic elastomer and a polyester thermoplastic elastomer, which constitutes the tire frame in the tenth aspect of the invention, and a resin material as a component of the reinforcing cord layer will be described, and, subsequently, a specific embodiment of the tire of the tenth aspect of the invention will be described using the drawings.

[Thermoplastic Resin]

A tire of the tenth aspect of the invention includes at least a circular tire frame formed of a thermoplastic resin material including a polyamide-based thermoplastic elastomer and a polyester-based thermoplastic elastomer.

Here, the "polyamide-based thermoplastic elastomer" refers to a thermoplastic resin material which is made of a copolymer including a polymer that constitutes a crystalline hard segment having a high melting point, and a polymer that constitutes a non-crystalline soft segment having a low glass transition temperature, and which has an amide bond (—CONH—) in the main chain of the polymer that constitutes the hard segment. As the "polyamide-based thermoplastic elastomer" in the present embodiment, the same polyamide-based thermoplastic elastomer as in the above first aspect of the invention can be used.

—Polyester-Based Thermoplastic Elastomer—

The "polyester-based thermoplastic elastomer" is an elastic macromolecular compound, and refers to a thermoplastic resin material made of a copolymer including a polymer that constitutes a crystalline hard segment having a high melting point, and a polymer that constitutes a non-crystalline soft segment having a low glass transition temperature, in which a polyester resin is included as the polymer that constitutes the hard segment. The "polyester-based thermoplastic elastomer" in the present embodiment is the same as in the above second aspect of the invention.

A commercially available product can be used as the polyester-based thermoplastic elastomer, and examples thereof include "HYTREL" series manufactured by Du Pont-Toray Co., Ltd. (for example, 3046, 5557, 6347, 4047, 4767), "PELPRENE series manufactured by Toyobo Co., Ltd. (for example, P30B, P40B, P40H. P55B, P70B, P150B, P250B, E450B, P150M, S1001, S2001, S5001, S6001, S9001 and the like), and the like.

The mass ratio (x:y) between the polyamide-based thermoplastic elastomer (x) and the polyester-based thermoplastic elastomer (y) in the thermoplastic resin is preferably from 95:5 to 50:50. When the mass ratio between these elastomers is from 95:5 to 50:50, the polyamide-based thermoplastic elastomer and the polyester-based thermoplastic elastomer can have the characteristics of the polyester-based thermoplastic elastomer while maintaining the characteristics of the polyamide-based thermoplastic elastomer so that the elastic modulus of the tire can be easily controlled while maintaining the weldability between the reinforcing cord member and the tire frame through the polyamide-based thermoplastic elastomer, whereby the durability of the tire is further improved, and it is possible to make a tire that is more unlikely to be deformed due to a change in temperature. The mass ratio (x:y) between the polyamide-based thermoplastic elastomer (x) and the polyester-based thermoplastic elastomer (y) is more preferably from 90:10 to 50:50.

In addition, the total content of the polyamide-based thermoplastic elastomer and the polyester-based thermoplastic elastomer in the thermoplastic resin material is not particularly limited, but is preferably 50 mass % to 100 mass % with respect to the total mass of the thermoplastic resin material. When the total content is 50 mass % or more with respect to the total mass of the thermoplastic resin material, it is possible to sufficiently develop the characteristics of the thermoplastic resin material, and it is possible to improve the heat resistance, durability and productivity of the tire.

The thermoplastic resin material may contain rubbers, thermoplastic elastomers other than the polyamide-based thermoplastic elastomer and the polyester-based thermoplastic elastomer, thermoplastic resins, a variety of fillers (for example, silica, calcium carbonate and clay) and a variety of additives, such as an age inhibitor, oil, a plasticizer, a coloring agent, a weather-resisting agent and a reinforcing material, as desired.

The thermoplastic resin material can be obtained by mixing the polyamide-based thermoplastic elastomer and the polyester-based thermoplastic elastomer, adding a variety of additives as necessary, and melting and mixing the components. The mixing ratio between the polyamide-based thermoplastic elastomer and the polyester-based thermoplastic elastomer is based on the ratio described above. The resin obtained through melting and mixing can be used in a pellet shape as necessary.

The tensile modulus of elasticity, which is defined in JIS K7113:1995, of the thermoplastic resin material according to the tenth aspect of the invention is preferably 100 MPa to 1000 MPa, more preferably 100 MPa to 800 MPa, and particularly preferably 100 MPa to 700 MPa. When the tensile modulus of elasticity of the resin material is 100 MPa to 1000 MPa, fitting onto a rim can be efficiently carried out while holding the shape of the tire frame.

The tensile yield strength, which is defined in JIS K7113: 1995, of the thermoplastic resin material according to the tenth aspect of the invention is preferably 5 MPa or more, preferably 5 MPa to 20 MPa, and still more preferably 5 MPa to 17 MPa. When the tensile yield strength of the thermoplastic resin material is 5 MPa or more, it is possible to withstand deformation caused by a load applied to the tire at the time of driving or the like.

The tensile yield elongation, which is defined in JIS K7113:1995, of the thermoplastic resin material according to the tenth aspect of the invention is preferably 10% or more, preferably 10% to 70%, and still more preferably 15% to 60%. When the tensile yield elongation of the thermoplastic resin material is 10% or more, it is possible to increase the elastic region and improve the fittability onto a rim.

The tensile elongation at break, which is defined in JIS K7113:1995, of the thermoplastic resin material according to the tenth aspect of the invention is preferably 50% or more, preferably 100% or more, still more preferably 150% or more, and particularly preferably 200% or more. When the tensile elongation at break of the resin material is 50% or more, it is possible to improve the fittability onto a rim and avoid fracture due to collision.

The deflection temperature under load (under a load of 0.45 MPa), which is defined in ISO75-2 or ASTM D648, of the thermoplastic resin material according to the tenth aspect of the invention is preferably 50° C. or more, preferably 50° C. to 150° C., and still more preferably 50° C. to 130° C. When the deflection temperature under load of the thermoplastic resin material is 50° C. or more, it is possible to suppress deformation of a tire frame even when vulcanization is carried out in the production of a tire.

[The Resin Material as a Component of the Reinforcing Cord Layer]

The tire of the tenth aspect of the invention may have a reinforcing cord member which is wound around the outer circumference of the tire frame in the circumferential direction so as to form a reinforcing cord layer.

The "resin material as a component of the reinforcing cord layer" according to the tenth aspect of the invention is the same as the "resin material as a component of the reinforcing cord layer" according to the first aspect of the invention.

Embodiment 10-1

Hereinafter, a tire according to Embodiment 10-1 of the tire of the tenth aspect of the invention will be described according to the drawings.

Here, the tire according to Embodiment 10-1 is the same as the above Embodiment 1-1 except for the following points. Therefore, the same reference numerals and drawings will be used in the description regarding the same drawings and members.

The tire case 17 of the present embodiment is formed of a thermoplastic resin material including a polyamide-based thermoplastic elastomer ("UBESTA, XPA9048X1" manufactured by Ube Industries, Ltd.) and a polyester-based thermoplastic elastomer ("HYTREL5557" manufactured by Du Pont-Toray Co., Ltd.) at a mass ratio of 75:25. In the present embodiment, the tire case 17 is formed of the thermoplastic resin material according to the tenth aspect of the invention alone, but the tenth aspect of the invention is not limited to this configuration, and, similarly to an ordinary pneumatic rubber tire of the related art, other thermoplastic resin materials having different characteristics may be used in the respective portions (the side portions 14, the crown portion 16, the bead portions 12, and the like) of the tire case 17. Other points are the same as in the tire according to the above Embodiment 1-1, and the manufacturing method is also the same.

(Effects)

In the tire 10 of the present embodiment, since the tire case 17 is formed of the thermoplastic resin material including a polyamide-based thermoplastic elastomer ("UBESTA, XPA9048X1" manufactured by Ube Industries, Ltd.) and a polyester-based thermoplastic elastomer ("HYTREL5557" manufactured by Du Pont-Toray Co., Ltd.) at a mass ratio of 75:25, thermal resistance, tensile modulus of elasticity, tensile strength and fracture strain are excellent, and the temperature dependency of the tensile yield strength is small. Furthermore, the weight is light compared to rubber of the related art. Therefore, the tire 10 of the present embodiment is excellent in terms of durability, is not easily influenced by a change in temperature, and exhibits low fuel consumption when used in an automobile.

In addition, the polyamide-based thermoplastic elastomer, which is one of the components of the thermoplastic resin material, has high adhesion properties to the reinforcing cord 26, and, furthermore, is excellent in terms of fixing performances, such as weld strength. Therefore, it is possible to suppress the phenomenon in which air remains around the reinforcing cord 26 in the reinforcing cord winding process (incorporation of air). When the adhesion properties and weldability to the reinforcing cord 26 are high, and, furthermore, incorporation of air into the periphery of the reinforcing cord member is suppressed, it is possible to effectively suppress the movement of the reinforcing cord 26 caused by a force applied thereto at the time of driving or the like. Thereby, for example, even when a tire-constituting member has been provided so as to cover the entirety of the reinforcing cord member on the outer circumference of the tire frame, since the movement of the reinforcing cord member is suppressed, the separation or the like of the members (including the tire frame) is suppressed, and the durability of the tire 10 is improved.

In addition, in the tire 10 of the present embodiment, since the reinforcing cord 26 having a higher stiffness than the thermoplastic resin material is helically wound in the circumferential direction on the outer circumferential surface of the crown portion 16 in the tire case 17 formed of the thermoplastic resin material, the puncture resistance, the cutting resistance and the stiffness of the tire 10 in the circumferential direction are improved. Meanwhile, the improvement of the stiffness of the tire 10 in the circumferential direction prevents the creeping in the tire case 17 formed of the thermoplastic resin material.

In addition, in the cross-sectional view of the tire case 17 along the axial direction (the cross section illustrated in FIG. 1), since at least a portion of the reinforcing cord 26 is embedded in the outer circumferential surface of the crown portion 16 in the tire case 17 formed of the thermoplastic resin material, and is adhered to the thermoplastic resin material, incorporation of air during manufacturing is suppressed, and the movement of the reinforcing cord 26 caused by a force applied thereto at the time of driving or the like is suppressed. Thereby, the separation or the like of the reinforcing cord 26, the tire case 17 and the tread 30 is suppressed, and the durability of the tire 10 is improved.

In addition, since the depth L of embedding of the reinforcing cord 26 is ⅕ or more of the diameter D as illustrated in FIG. 2, incorporation of air during manufacturing is effectively suppressed, and the movement of the reinforcing cord 26 caused by a force applied thereto at the time of driving or the like is further suppressed.

When the reinforcing cord layer 28 is configured to include the thermoplastic resin material as described above, since it is possible to decrease the difference in hardness between the tire case 17 and the reinforcing cord layer 28 compared to the case when the reinforcing cord 26 is fixed using cushion rubber, the reinforcing cord 26 can be further adhered and fixed to the tire case 17. Thereby, the above incorporation of air can be effectively prevented, and it is possible to effectively suppress the movement of the reinforcing cord member at the time of driving.

Furthermore, when the reinforcing cord is a steel cord, since the reinforcing cord 26 can be easily separated and collected from the thermoplastic resin material through heating when disposing of the tire, it is advantageous in terms of the recycling properties of the tire 10. In addition, the resin material generally has a low loss factor (Tan δ) compared to vulcanized rubber. Therefore, when the reinforcing cord layer includes a large amount of the resin material, it is possible to improve the rolling properties of the tire. Furthermore, the resin material having a relatively high elastic modulus compared to vulcanized rubber is advantageous in that the in-plane shear stiffness is large, and steering stability and abrasion resistance during driving with the tire are also excellent.

In addition, since the tread 30 that comes into contact with road surfaces is made of a rubber material that is more abrasion-resistant than the thermoplastic resin material, the abrasion resistance of the tire 10 is improved.

Furthermore, since an annular bead core 18 made of a metallic material is embedded in the bead portion 12, the tire case 17, that is, the tire 10 is strongly held to the rim 20 similarly to a pneumatic rubber tire of the related art.

In addition, furthermore, since a sealing layer 24 made of a rubber material having higher sealing properties than the thermoplastic resin material is provided in a portion, which comes into contact with the rim 20, of the bead portion 12, the sealing properties between the tire 10 and the rim 20 are improved. Therefore, compared to the case when sealing is carried out between the rim 20 and the thermoplastic resin material, the air leakage from the tire is further suppressed. In addition, the rim fitting properties are also improved when the sealing layer 24 is provided.

The above embodiment employs a configuration in which the reinforcing cord 26 is heated, and the thermoplastic resin material in the portion with which the heated reinforcing cord 26 comes into contact is melted or softened, but the tenth aspect of the invention is not limited to this configuration, and the reinforcing cord 26 may be embedded in the crown portion 16 after heating the outer circumferential surface of the crown portion 16, in which the reinforcing cord 26 is to be embedded, using a hot air generating apparatus without heating the reinforcing cord 26.

In addition, in Embodiment 10-1, a heater and a fan are used as the heat source of a cord heating device 59, but the tenth aspect of the invention is not limited to this configuration, and a configuration in which the reinforcing cord 26 is directly heated using radiation heat (for example, infrared rays or the like) may be employed.

Furthermore, Embodiment 10-1 employs a configuration in which the portion, in which the thermoplastic resin material having the reinforcing cord 26 embedded therein is melted or softened, is forcibly cooled using the second metal roller 64, but the tenth aspect of the invention is not limited to this configuration, and a configuration in which the portion, in which the thermoplastic resin material is melted or softened, is forcibly cooled and solidified by directly blowing cold air to the portion in which the thermoplastic resin material is melted or softened may be employed.

In addition, Embodiment 10-1 employs a configuration in which the reinforcing cord 26 is heated; however, for example, a configuration in which the outer circumference of the reinforcing cord 26 is coated with the same thermoplastic resin material as the tire case 17 may be employed, and, in this case, it is possible to effectively suppress incorporation of air during embedding in the crown portion 16 by heating the reinforcing cord 26 and the coating of the thermoplastic resin material when winding the coated reinforcing cord around the crown portion 16 of the tire case 17.

In addition, the helical winding of the reinforcing cord 26 is easy in the manufacturing, but a method, in which the reinforcing cord 26 is formed to be discontinuous in the width direction, or the like can be also considered.

The tire 10 of Embodiment 10-1 is a so-called tubeless tire in which an air chamber is formed between the tire 10 and the rim 20 by mounting the bead portion 12 on the rim 20, but the tenth aspect of the invention is not limited to this configuration, and the tire may have a complete tube shape.

Thus far, an embodiment of the tenth aspect of the invention has been described using the embodiment, but the embodiment is simply an example, and the invention can be carried out with a variety of modifications within the scope of the purport. In addition, it is needless to say that the scope of right of the tenth aspect of the invention is not limited to the above embodiment.

Embodiment 10-2

Next, the tire and the method of manufacturing the tire of the tenth aspect of the invention according to Embodiment 10-2 will be described according to the drawings. Similarly to the above Embodiment 10-1, the tire of the present embodiment exhibits substantially the same cross-sectional shape as an ordinary pneumatic rubber tire of the related art.

Here, the tire according to Embodiment 10-2 is the same as the above Embodiment 1-2 except for the following points. Therefore, the same reference numerals and drawings will be used in the description regarding the same drawings and members.

In the tire of Embodiment 10-2, similarly to the above Embodiment 10-1, the tire case 17 is formed of a thermoplastic resin material including a polyamide-based thermoplastic elastomer ("UBESTA XPA9048X1" manufactured by Ube Industries, Ltd.) and a polyester-based thermoplastic elastomer ("HYTREL5557" manufactured by Du Pont-Toray Co., Ltd.) at a mass ratio of 75:25. Other points are the same as in the tire according to the above Embodiment 1-2, and the manufacturing method is also the same.

(Effects)

In the tire 200 of present the embodiment, since the tire case 17 is formed of the thermoplastic resin material including a polyamide-based thermoplastic elastomer and a polyester-based thermoplastic, thermal resistance, tensile modulus of elasticity, tensile strength and fracture strain are excellent, and the temperature dependency of the tensile yield strength is small. Furthermore, since the tire structure can be simplified, the weight is light compared to rubber of the related art. Therefore, the tire 200 of the present embodiment is excellent in terms of durability, is not easily influenced by a change in temperature, and exhibits low fuel consumption when used in an automobile.

In addition, when the reinforcing cord layer 28 is configured to include the coated cord member 26B, since it is possible to decrease the difference in hardness between the tire case 17 and the reinforcing cord layer 28 compared to the case when the reinforcing cord 26A is simply fixed using cushion rubber 29, the coated cord member 26B can be further adhered and fixed to the tire case 17. Thereby, the above incorporation of air can be effectively prevented, and it is possible to effectively suppress the movement of the reinforcing cord member at the time of driving.

Furthermore, when the reinforcing cord is a steel cord, since the cord member 26A can be easily separated and collected from the coated cord member 26B through heating when disposing of the tire, it is advantageous in terms of the recycling properties of the tire 200. In addition, the resin material generally has a low loss factor (Tan δ) compared to vulcanized rubber. Therefore, when the reinforcing cord layer includes a large amount of the resin material, it is possible to improve the rolling properties of the tire. Furthermore, the resin material having a relatively high elastic modulus compared to vulcanized rubber is advantageous in that the in-plane shear stiffness is large, and steering stability and abrasion resistance during driving with the tire are also excellent.

In the method of manufacturing the tire of the present embodiment, when the tire case 17, the cushion rubber 29 and a tread rubber 30A are integrated, since the outer circumferential surface 17S of the tire case 17 has been subjected to a roughening treatment, the bonding properties (adhesion properties) are improved due to the anchor effect. In addition, since the resin material that forms the tire case 17 is dug up by the collision of a blasting abrasive, the wettability of a bonding agent is improved. Thereby, a state in which the bonding agent is uniformly coated on the outer circumferential surface 17S of the tire case 17 is held, and the bonding strength between the tire case 17 and the cushion rubber 29 can be ensured.

Particularly, even when protrusions and recesses are formed on the outer circumferential surface 17S of the tire case 17, the peripheries of the recess portions (recess walls and recess bottoms) are subjected to a roughening treatment by making the blasting abrasive collide with the recess portions (voids 28A), and the bonding strength between the tire case 17 and the cushion rubber 29 can be ensured.

Meanwhile, since the cushion rubber 29 is laminated in the roughening-treated areas on the outer circumferential surface 17S of the tire case 17, the bonding strength between the tire case 17 and the cushion rubber can be effectively ensured.

When the cushion rubber 29 has been vulcanized in a vulcanizing process, the cushion rubber 29 flows into the roughened recesses and protrusions formed on the outer circumferential surface 17S of the tire case 17 through the roughening treatment. In addition, when vulcanization is completed, the anchor effect is developed due to the cushion rubber 29 that has flowed into the roughened recesses and protrusions so that the bonding strength between the tire case 17 and the cushion rubber 29 is improved.

The tire 200 manufactured using the above method of manufacturing a tire ensures the bonding strength between the tire case 17 and the cushion rubber 29, that is, ensures the bonding strength between the tire case 17 and the tread 30 through the cushion rubber 29. Thereby, the separation between the outer circumferential surface 17S of the tire case 17 of the tire 200 and the cushion rubber 29 is suppressed at the time of driving or the like.

In addition, since the outer circumference of the tire case 17 is made of the reinforcing cord layer 28, the puncture resistance and the cutting resistance are improved compared to a case in which the outer circumference is made of something other than the reinforcing cord layer 28.

In addition, since the reinforcing cord layer 28 is formed by winding the coated cord member 26B, the stiffness of the tire 200 in the circumferential direction is improved. The improvement of the stiffness in the circumferential direction suppresses creeping (a phenomenon in which the plastic deformation of the tire case 17 increases over time under a constant stress) in the tire case 17, and the pressure resistance with respect to the air pressure from the inside in the tire radial direction is improved.

In the present embodiment, the recesses and protrusions are formed on the outer circumferential surface 17S of the tire case 17, but the tenth aspect of the invention is not limited thereto, and a configuration in which the outer circumferential surface 17S is formed to be flat may be employed.

In addition, in the tire case 17, the reinforcing cord layer may be formed by covering the coated cord member, which is wound around and bonded to the crown portion of the tire case, with a thermoplastic material for coating. In this case, a coating layer can be formed by discharging a thermoplastic material for coating in a molten or softened state on the reinforcing cord layer 28. In addition, the coating layer may be formed by heating a welding sheet into a molten or softened state without using an extruder, and attaching the welding sheet to the surface (outer circumferential surface) of the reinforcing cord layer 28.

The above Embodiment 10-2 employs a configuration in which case divided parts (tire case half parts 17A) are bonded so as to form the tire case 17, but the tenth aspect of the invention is not limited thereto, and the tire case 17 may be integrally formed using a mold or the like.

The tire 200 of Embodiment 10-2 is a so-called tubeless tire in which an air chamber is formed between the tire 200 and the rim 20 by mounting the bead portion 12 on the rim 20, but the tenth aspect of the invention is not limited to this configuration, and the tire 200 may have, for example, a complete tube shape.

In Embodiment 10-2, the cushion rubber 29 is disposed between the tire case 17 and the tread 30, but the tenth aspect of the invention is not limited thereto, and a configuration in which the cushion rubber 29 is not disposed may be employed.

In addition, Embodiment 10-2 employs a configuration in which the coated cord member 26B is helically wound around the crown portion 16, but the tenth aspect of the invention is not limited thereto, and a configuration in which the coated cord member 26B is wound to be discontinuous in the width direction may be employed.

Embodiment 10-2 employs a configuration in which a thermoplastic material is used as the resin material for coating 27 that forms the coated cord member 26B, and the resin material for coating 27 is heated into a molten or softened state so as to weld the coated cord member 26B on the outer circumferential surface of the crown portion 16, but the tenth aspect of the invention is not limited to this configuration, and a configuration in which the coated cord member 26B is adhered to the outer circumferential surface of the crown portion 16 using an adhesive or the like without heating the resin material for coating 27 may be employed.

In addition, a configuration in which a thermosetting resin is used as the resin material for coating 27 that forms the coated cord member 26B, and the coated cord member 26B is adhered to the outer circumferential surface of the crown portion 16 using an adhesive or the like without heating may be employed.

Furthermore, a configuration in which a thermosetting resin is used as the resin material for coating 27 that forms the coated cord member 26B, and the tire case 17 is formed of a thermoplastic resin material may be employed. In this case, the coated cord member 26B may be adhered to the outer circumferential surface of the crown portion 16 using an adhesive or the like, or the coated cord member 26B may be welded on the outer circumferential surface of the crown portion 16 by heating the portion, which is to be provided with the coated cord member 26B, of the tire case 17 into a molten or softened state.

In addition, furthermore, a configuration in which a thermoplastic material is used as the resin material for coating 27 that forms the coated cord member 26B, and the tire case 17 is formed of a thermoplastic resin material may be employed. In this case, the coated cord member 26B may be adhered to the outer circumferential surface of the crown portion 16 using an adhesive or the like, or the coated cord member 26B may be welded on the outer circumferential surface of the crown portion 16 by heating the portion, which is to be provided with the coated cord member 26B, of the tire case 17 into a molten or softened state, and heating the resin material for coating 27 into a molten or softened state. Meanwhile, when both the tire case 17 and the coated cord member 26B have been hated into a molten or softened state, since both are well mixed, the bonding strength is improved. In addition, when thermoplastic resin materials are used as both the resin material that forms the tire case 17 and the resin material for coating 27 that forms the coated cord member 26B, the thermoplastic resin materials are preferably the same kind of thermoplastic materials, particularly, the same thermoplastic material.

In addition, furthermore, an adhesive may be coated on the outer circumferential surface 17S of the tire case 17, after the surface of the outer circumferential surface 17S, on which the roughening treatment has been carried out, is activated using a corona treatment, a plasma treatment or the like so as to increase the hydrophilicity.

In addition, furthermore, the order for manufacturing the tire 200 is not limited to the order in Embodiment 10-2, and may be appropriately changed.

Thus far, an embodiment of the tenth aspect of the invention has been described using the embodiment, but the embodiment is simply an example, and the invention can be carried out with a variety of modifications within the scope of the purport. In addition, it is needless to say that the scope of right of the tenth aspect of the invention is not limited to the above embodiment.

Thus far, the specific embodiments of the tenth aspect of the invention have been described using Embodiment 10-1 and Embodiment 10-2, but the tenth aspect of the invention is not limited to the above embodiments.

The Eleventh Aspect of the Invention

Next, a thermoplastic resin material that constitutes the tire frame in the eleventh aspect of the invention will be described, and, subsequently, a specific embodiment of the tire of the eleventh aspect of the invention will be described using the drawings.

[Thermoplastic Resin Material]

The tire of the eleventh aspect of the invention is a tire including at least a circular tire frame formed of a thermoplastic resin material, in which the thermoplastic resin material contains a polyamide-based thermoplastic elastomer and at least one copolymer selected from an olefin-(meth)acrylate copolymer or a metal crosslinked product of an olefin-(meth)acrylic acid copolymer.

Since a polyamide-based thermoplastic elastomer and a specific copolymer are contained in the thermoplastic resin material according to the eleventh aspect of the invention, a tire can be obtained in which the impact resistance is excellent, and the temperature dependency of tensile yield strength is suppressed, when the thermoplastic resin material according to the eleventh aspect of the invention is applied to the tire.

Hereinafter, the thermoplastic elastomer and the specific copolymer will be described.

[Polyamide-Based Thermoplastic Elastomer]

The "polyamide-based thermoplastic elastomer" is an elastic macromolecular compound, and refers to a thermoplastic resin material which is made of a copolymer including a polymer that constitutes a crystalline hard segment having a high melting point, and a polymer that constitutes a non-crystalline soft segment having a low glass transition temperature, and which has an amide bond (—CONH—) in the main chain of the polymer that constitutes the hard segment.

Examples of crystalline polyamide that constitutes the hard segment include aliphatic polyamides, such as polycaproamide (nylon-6), poly-ω-aminoheptanoic acid (nylon-7), poly-ω-aminononanoic acid (nylon-9), polyundecaneamide (nylon-11), polylauryl lactam (nylon-12), polyethylene diamine adipamide (nylon-2,6), polytetramethylene adipamide (nylon-4,6), polyhexamethylene adipamide (nylon-6,6), polyhexamethylene sebacamide (nylon-6,10), polyhexamethylene dodecamide (nylon-6,12), polyoctamethylene adipamide (nylon-8,6) and polydecamethylene adipamide (nylon-10,8); crystalline aromatic polyamides obtained through a polycondensation reaction between an aromatic diamine, such as meta-xylene diamine or para-xylene diamine, and a dicarboxylic acid, such as adipic acid, suberic acid, sebacic acid, cyclohexane dicarboxylic acid, terephthalic acid or isophthalic acid, or a derivative thereof; and the like.

Among the above, nylon-6, nylon-6,6, nylon-12 and the like are preferable, and nylon-12 is more preferable. As the "polyamide-based thermoplastic elastomer" in the present embodiment, the same polyamide-based thermoplastic elastomer as in the above first aspect of the invention can be used.

[Specific Copolymer]

The thermoplastic resin material according to the eleventh aspect of the invention contains the specific copolymer, that is, at least one copolymer selected from an olefin-(meth) acrylate copolymer or a metal crosslinked product of an olefin-(meth)acrylic acid copolymer.

—Olefin-(Meth)Acrylate Copolymer—

The olefin-(meth)acrylate copolymer refers to a copolymer including a partial structure derived from (meth)acrylate in the repeating unit of an olefin, and may be a radical polymer, a block copolymer or a graft copolymer.

(Meth)acrylate specifically refers to an alkyl ester of (meth)acrylic acid, and examples of an alkyl group that can form an alkyl ester include a dodecyl group, an octyl group, a hexyl group, a butyl group, a propyl group, an ethyl group, a methyl group and the like, each of which is linear, branched, or cyclic. Among the above, from the viewpoint of providing hardness to the thermoplastic resin material and improving the deformation resistance, a butyl group or an ethyl group is preferable, and a butyl group is more preferable.

In addition, in the olefin-(meth)acrylate copolymer, the olefin that constitutes the repeating unit of the olefin is preferably ethylene, propylene or 1-butene, and is more preferably ethylene.

That is, the olefin-(meth)acrylate copolymer is preferably an ethylene-(meth)acrylate copolymer, more preferably an ethylene-(meth)acrylate ethyl ester copolymer or an ethylene-(meth)acrylate butyl ester copolymer, and still more preferably an ethylene-acrylate butyl ester copolymer.

The olefin-(meth)acrylate copolymer may be used solely, or may be used in combination of two or more kinds.

Metal Crosslinked Product of an olefin-(meth)acrylic acid copolymer

The metal crosslinked product of an olefin-(meth)acrylic acid copolymer is a copolymer including a partial structure derived from (meth)acrylic acid in the repeating unit of an olefin, in which —COO⁻s obtained by removing the proton ($H^+$) from (meth)acrylic acid in the repeating unit of (meth) acrylic acid are bonded (crosslinked) to each other through metal ions ($M^{n+}$; M represents metal, and n represents the valence of the metal). Such a metal crosslinked product of a copolymer is also called an ionomer. The form of the copolymer may be a radical copolymer, a block copolymer or a graft copolymer.

Examples of a metal ion that can form a crosslinking structure with $COO^-$ in (meth)acrylate include monovalent ions, such as lithium ($Li^+$), sodium ($Na^+$) and potassium ($K^+$); divalent ions, such as magnesium ($Mg^{2+}$), calcium ($Ca^{2+}$), barium ($Ba^{2+}$) and zinc ($Zn^{2+}$); trivalent ions, such as aluminum ($Al^{3+}$); and the like. Generally, a metal ion, such as lithium ($Li^+$), sodium ($Na^+$), magnesium ($Mg^{2+}$) or zinc ($Zn^{2+}$), is used; however, among the above, a zinc ion is preferable from the viewpoint of providing hardness to the thermoplastic resin material and improving deformation resistance.

In addition, in the metal crosslinked product of the olefin-(meth)acrylic acid copolymer, the olefin that constitutes the repeating unit of the olefin is preferably ethylene, propylene or 1-butene, and is more preferably ethylene.

That is, the metal crosslinked product of the olefin-(meth) acrylic acid copolymer is preferably a metal crosslinked product of an ethylene-(meth)acrylic acid copolymer, more preferably a metal crosslinked product of an ethylene-(meth) acrylic acid copolymer, and still more preferably a zinc ion-crosslinked product of an ethylene-methacrylic acid copolymer.

The metal crosslinked product of the olefin-(meth)acrylic acid copolymer may be used solely, or may be used in combination of two or more kinds.

In addition, as described above, as the specific copolymer, at least one of an olefin-(meth)acrylate copolymer or a metal crosslinked product of an olefin-(meth)acrylic acid copolymer may be used. When an olefin-(meth)acrylate copolymer and a metal crosslinked product of an olefin-(meth)acrylic acid copolymer are both used, one kind of a material may be used for each of an olefin-(meth)acrylate copolymer and a metal crosslinked product of an olefin-(meth)acrylic acid copolymer, or two or more kinds of materials may be used for either or both of the olefin-(meth)acrylate copolymer and the metal crosslinked product of an olefin-(meth)acrylic acid copolymer.

The number average molecular weight of the specific copolymer is preferably 5,000 to 10,000,000, and more preferably 7,000 to 1,000,000 for both the olefin-(meth)acrylate copolymer and the metal crosslinked product of the olefin-(meth)acrylic acid copolymer from the viewpoint of the melt moldability of the thermoplastic resin material.

The mass ratio (x:y) between the polyamide-based thermoplastic elastomer (x) and the specific copolymer (y) in the thermoplastic resin material is preferably from 95:5 to 50:50, and more preferably from 90:10 to 50:50 from the viewpoint of impact resistance.

In addition, in the thermoplastic resin material, the total content of the polyamide-based thermoplastic elastomer and the specific copolymer in the thermoplastic resin material is preferably 50 mass % to 100 mass %, and more preferably 50 mass % to 90 mass % with respect to the total mass of the thermoplastic resin material from the viewpoint of sufficiently developing the performances of the thermoplastic resin material.

The thermoplastic resin material may contain a variety of fillers (for example, silica, calcium carbonate and clay) and a variety of additives, such as an age inhibitor, oil, a plasticizer, a coloring agent, a weather-resisting agent and a reinforcing material, as desired.

The thermoplastic resin material can be obtained by mixing the polyamide-based thermoplastic elastomer and the specific copolymer, adding a variety of additives as necessary, and melting and mixing the components. The mixing ratio between the polyamide-based thermoplastic elastomer and the specific copolymer is based on the ratio described above. The thermoplastic resin material obtained through melting and mixing can be used in a pellet shape as necessary.

The tensile modulus of elasticity (in the specification, the "elastic modulus" refers to the tensile modulus of elasticity unless particularly otherwise described), which is defined in JIS K7113:1995, of the thermoplastic resin material according to the eleventh aspect of the invention is preferably 100 MPa to 1000 MPa, more preferably 100 MPa to 800 MPa, and particularly preferably 100 MPa to 700 MPa. When the tensile modulus of elasticity of the thermoplastic resin material is 100 MPa to 1000 MPa, fitting onto a rim can be efficiently carried out while holding the shape of the tire frame.

The tensile yield strength, which is defined in JIS K7113:1995, of the thermoplastic resin material according to the eleventh aspect of the invention is preferably 5 MPa or more, preferably 5 MPa to 20 MPa, and still more preferably 5 MPa to 17 MPa. When the tensile yield strength of the thermoplastic resin material is 5 MPa or more, it is possible to withstand deformation caused by a load applied to the tire at the time of driving or the like.

The tensile yield elongation, which is defined in JIS K7113:1995, of the thermoplastic resin material according to the eleventh aspect of the invention is preferably 10% or more, preferably 10% to 70%, and still more preferably 15% to 60%. When the tensile yield elongation of the thermoplastic resin material is 10% or more, it is possible to increase the elastic region and improve the fittability onto a rim.

The tensile elongation at break, which is defined in JIS K7113:1995, of the thermoplastic resin material according to the eleventh aspect of the invention is preferably 50% or more, preferably 100% or more, still more preferably 150% or more, and particularly preferably 200% or more. When the tensile elongation at break of the resin material is 50% or more, it is possible to improve the fittability onto a rim and avoid fracture due to collision.

The deflection temperature under load (under a load of 0.45 MPa), which is defined in ISO75-2 or ASTM D648, of the thermoplastic resin material according to the eleventh aspect of the invention is preferably 50° C. or more, preferably 50° C. to 150° C., and still more preferably 50° C. to 130° C. When the deflection temperature under load of the thermoplastic resin material is 50° C. or more, it is possible to suppress deformation in a vulcanization process of a tread or the like.

[The Resin Material as a Component of the Reinforcing Cord Layer]

The tire of the eleventh aspect of the invention may have the reinforcing cord member which is wound around the outer circumference of the tire frame in the circumferential direction so as to form the reinforcing cord layer.

The "resin material as a component of the reinforcing cord layer" according to the eleventh aspect of the invention is the same as the [resin material as a component of the reinforcing cord layer] according to the first aspect of the invention.

Embodiment 11-1

Hereinafter, a tire according to Embodiment 11-1 of the tire of the eleventh aspect of the invention will be described according to the drawings.

Here, the tire according to Embodiment 11-1 is the same as the above Embodiment 1-1 except for the following points. Therefore, the same reference numerals and drawings will be used in the description regarding the same drawings and members.

The tire case 17 of the present embodiment is formed of a thermoplastic resin material made of a mixed material of a polyamide-based thermoplastic elastomer ("UBESTA, XPA9055X1" manufactured by Ube Industries, Ltd.) and a Zn ionomer of an ethylene-methacrylic acid copolymer ("HIMILAN, 1855Zn" manufactured by Du Pont-Mitsui Polychemicals Co., Ltd.). In the present embodiment, the tire case 17 is formed of the thermoplastic resin material according to the eleventh aspect of the invention alone, but the eleventh aspect of the invention is not limited to this configuration, and, similarly to an ordinary pneumatic rubber tire of the related art, other thermoplastic resin materials having different characteristics may be used in the respective portions (the side portions 14, the crown portion 16, the bead portions 12, and the like) of the tire case 17. Other points are the same as in the tire according to the above Embodiment 1-1, and the manufacturing method is also the same.

The tire case 17 of the present embodiment is a pair of the mutually bonded tire case half parts (tire frame pieces) 17A that are formed of the thermoplastic resin material according to the eleventh aspect of the invention. The tire case is formed by making the circular tire case half parts 17A having the same shape face each other and bonding the parts at the tire equatorial plane portion, wherein each of the parts is integrally formed by injection molding or the like and includes one bead portion 12, one side portion 14 and a half-width crown portion 16. The thermoplastic resin material according to the eleventh aspect of the invention includes a polyamide-based thermoplastic elastomer and the specific copolymer.

Meanwhile, the tire case 17 is not limited to a tire case formed by bonding two members, and may be formed by bonding three or more members.

(Effects)

In the tire 10 of the present embodiment, since the tire case 17 is formed of the thermoplastic resin material according to the eleventh aspect of the invention, the impact resistance is excellent, and the temperature dependency of the tensile yield strength is suppressed. Furthermore, since the tire structure can be simplified, the weight is light compared to rubber of the related art. Therefore, when the tire 10 of the present embodiment is applied to an automobile, the durability is excellent, and the tire is unlikely to be deformed due to a change in temperature or the like. In addition, since the weight of the tire can be decreased, it is possible to improve the fuel consumption of an automobile in which the tire is used.

In addition, the polyamide-based thermoplastic elastomer, which is one of the components of the thermoplastic resin material, has high adhesion properties to the reinforcing cord 26, and, furthermore, is excellent in terms of fixing performances, such as weld strength. Therefore, it is possible to suppress the phenomenon in which air remains around the reinforcing cord 26 in the reinforcing cord winding process (incorporation of air). When the adhesion properties and weldability to the reinforcing cord 26 are high, and, furthermore, incorporation of air into the periphery of the reinforcing cord member is suppressed, it is possible to effectively suppress the movement of the reinforcing cord 26 caused by a force applied thereto at the time of driving or the like. Thereby, for example, even when a tire-constituting member has been provided so as to cover the entirety of the reinforcing cord member on the outer circumference of the tire frame, since the movement of the reinforcing cord member is suppressed, the separation or the like of the members (including the tire frame) is suppressed, and the durability of the tire 10 is improved.

In addition, in the tire 10 of the present embodiment, since the reinforcing cord 26 having a higher stiffness than the thermoplastic resin material is helically wound in the circumferential direction on the outer circumferential surface of the crown portion 16 in the tire case 17 formed of the thermoplastic resin material, the puncture resistance, the cutting resistance and the stiffness of the tire 10 in the circumferential direction are improved. Meanwhile, the improvement of the stiffness of the tire 10 in the circumferential direction prevents the creeping in the tire case 17 formed of the thermoplastic resin material.

In addition, in the cross-sectional view of the tire case 17 along the axial direction (the cross section illustrated in FIG. 1), since at least a portion of the reinforcing cord 26 is embedded in the outer circumferential surface of the crown portion 16 in the tire case 17 formed of the thermoplastic resin material, and is adhered to the thermoplastic resin material, incorporation of air during manufacturing is suppressed, and the movement of the reinforcing cord 26 caused by a force applied thereto at the time of driving or the like is suppressed. Thereby, the separation or the like of the reinforcing cord 26, the tire case 17 and the tread 30 is suppressed, and the durability of the tire 10 is improved.

In addition, since the depth L of embedding of the reinforcing cord 26 is ⅕ or more of the diameter D as illustrated in FIG. 2, incorporation of air during manufacturing is effectively suppressed, and the movement of the reinforcing cord 26 caused by a force applied thereto at the time of driving or the like is further suppressed.

When the reinforcing cord layer 28 is configured to include the thermoplastic resin material as described above, since it is possible to decrease the difference in hardness between the tire case 17 and the reinforcing cord layer 28 compared to the case when the reinforcing cord 26 is fixed using cushion rubber, the reinforcing cord 26 can be further adhered and fixed to the tire case 17. Thereby, the above incorporation of air can be effectively prevented, and it is possible to effectively suppress the movement of the reinforcing cord member at the time of driving.

Furthermore, when the reinforcing cord is a steel cord, since the reinforcing cord 26 can be easily separated and collected from the thermoplastic resin material through heating when disposing of the tire, it is advantageous in terms of the recycling properties of the tire 10. In addition, the resin material generally has a low loss factor (Tan δ) compared to vulcanized rubber. Therefore, when the reinforcing cord layer includes a large amount of the resin material, it is possible to improve the rolling properties of the tire. Furthermore, the resin material having a relatively high elastic modulus compared to vulcanized rubber is advantageous in that the in-plane shear stiffness is large, and steering stability and abrasion resistance during driving with the tire are also excellent.

In addition, since the tread 30 that comes into contact with road surfaces is made of a rubber material that is more abrasion-resistant than the thermoplastic resin material, the abrasion resistance of the tire 10 is improved.

Furthermore, since an annular bead core 18 made of a metallic material is embedded in the bead portion 12, the tire case 17, that is, the tire 10 is strongly held to the rim 20 similarly to a pneumatic rubber tire of the related art.

In addition, furthermore, since the sealing layer 24 made of a rubber material having higher sealing properties than the thermoplastic resin material is provided in a portion, which comes into contact with the rim 20, of the bead portion 12, the sealing properties between the tire 10 and the rim 20 are improved. Therefore, compared to the case when sealing is carried out between the rim 20 and the thermoplastic resin material, the air leakage from the tire is further suppressed. In addition, the rim fitting properties are also improved when the sealing layer 24 is provided.

The above embodiment employs a configuration in which the reinforcing cord 26 is heated, and the thermoplastic resin material in the portion with which the heated reinforcing cord 26 comes into contact is melted or softened, but the eleventh aspect of the invention is not limited to this configuration, and the reinforcing cord 26 may be embedded in the crown portion 16 after heating the outer circumferential surface of the crown portion 16, in which the reinforcing cord 26 is to be embedded, using a hot air generating apparatus without heating the reinforcing cord 26.

In addition, in Embodiment 11-1, a heater and a fan are used as the heat source of a cord heating device 59, but the eleventh aspect of the invention is not limited to this configuration, and a configuration in which the reinforcing cord 26 is directly heated using radiation heat (for example, infrared rays or the like) may be employed.

Furthermore, Embodiment 11-1 employs a configuration in which the portion, in which the thermoplastic resin material having the reinforcing cord 26 embedded therein is melted or softened, is forcibly cooled using the second metal roller 64, but the eleventh aspect of the invention is not limited to this configuration, and a configuration in which the portion, in which the thermoplastic resin material is melted or softened, is forcibly cooled and solidified by directly blowing cold air to the portion in which the thermoplastic resin material is melted or softened may be employed.

In addition, Embodiment 11-1 employs a configuration in which the reinforcing cord 26 is heated; however, for example, a configuration in which the outer circumference of the reinforcing cord 26 is coated with the same thermoplastic resin material as the tire case 17 may be employed, and, in this case, it is possible to effectively suppress incorporation of air during embedding in the crown portion 16 by heating the reinforcing cord 26 and the coating of the thermoplastic resin material when winding the coated reinforcing cord around the crown portion 16 of the tire case 17.

In addition, the helical winding of the reinforcing cord 26 is easy in the manufacturing, but a method, in which the reinforcing cord 26 is formed to be discontinuous in the width direction, or the like can be also considered.

The tire 10 of Embodiment 11-1 is a so-called tubeless tire in which an air chamber is formed between the tire 10 and the rim 20 by mounting the bead portion 12 on the rim 20, but the eleventh aspect of the invention is not limited to this configuration, and the tire may have a complete tube shape.

The tire having the complete tube shape may be a configuration in which, for example, three tire frames formed into a circular shape are disposed in the tire width direction as illustrated in FIG. 4. FIG. 4 is a cross-sectional view of the tire according to other embodiment. As illustrated in FIG. 4, the tire 86 has the tread rubber layer 87, hollow tubes (tire frame) 88 which are made of the same resin material as in Embodiment 11-1 and are formed into the circular shape, the belt (reinforcing cord) 89 and the rim 90. Three tubes 88 are disposed in series in the tire width direction of the tire 86. The tread rubber layer 87, in which the belt 89 is embedded, is adhered to the outer circumferences of the tubes 88. In addition, the tubes 88 are mounted on the rim 90 having recess portions that engage with the tubes 88. Meanwhile, the bead core is not provided in the tire 86.

Thus far, an embodiment of the eleventh aspect of the invention has been described using the embodiment, but the embodiment is simply an example, and the invention can be carried out with a variety of modifications within the scope of the purport. In addition, it is needless to say that the scope of right of the eleventh aspect of the invention is not limited to the above embodiment.

Embodiment 11-2

Next, the tire and the method of manufacturing the tire of the eleventh aspect of the invention according to Embodiment 11-2 will be described according to the drawings. Similarly to the above Embodiment 11-1, the tire of the present embodiment exhibits substantially the same cross-sectional shape as an ordinary pneumatic rubber tire of the related art. Here, the tire according to Embodiment 11-2 is the same as the above Embodiment 1-2 except for the following points. Therefore, the same reference numerals and drawings will be used in the description regarding the same drawings and members.

In the tire of Embodiment 11-2, similarly to the above Embodiment 11-1, the tire case 17 is formed of a thermoplastic resin material made of a mixed material of a polyamide-based thermoplastic elastomer ("UBESTA, XPA9055X1" manufactured by Ube Industries, Ltd.) and a Zn ionomer of an ethylene-methacrylic acid copolymer ("HIMILAN, 1855Zn" manufactured by Du Pont-Mitsui Polychemicals Co., Ltd.).

In addition, the elastic modulus of the resin material for coating 27 is preferably set in a range of 0.1 times to 10 times the elastic modulus of a resin material that forms the tire case 17. When the elastic modulus of the resin material for coating 27 is 10 times or less the elastic modulus of the thermoplastic resin material that forms the tire case 17, the crown portion does not become too hard, and fitting onto a rim can be easily carried out. In addition, when the elastic modulus of the resin material for coating 27 is 0.1 times or more the elastic modulus of the thermoplastic resin material that forms the tire case 17, the resin as a component of the reinforcing cord layer 28 does not become too soft, and the belt in-plane shear stiffness is excellent and the cornering force is improved. Meanwhile, in the present embodiment, as the resin material for coating 27, the same material as the thermoplastic resin material (in the present embodiment, a thermoplastic resin material made of a mixed material of a polyamide-based thermoplastic elastomer ("UBESTA, XPA9055X1" manufactured by Ube Industries, Ltd.) and a Zn ionomer of an ethylene-methacrylic acid copolymer ("HIMILAN, 1855Zn" manufactured by Du Pont-Mitsui Polychemicals Co., Ltd.)) is used. Other points are the same as in the tire according to the above Embodiment 1-2, and the manufacturing method is also the same.

(Effects)

In the tire 200 of the present embodiment, since the tire case 17 is formed of the thermoplastic resin material, the impact resistance is excellent, and the temperature dependency of the tensile yield strength is suppressed. Therefore, when the tire 10 of the present embodiment is applied to an automobile, the durability is excellent, and the tire is unlikely to be deformed due to a change in temperature or the like.

Furthermore, since the tire structure can be simplified, the weight is light compared to rubber of the related art. Therefore, since the weight of the tire 200 of the present embodiment can be decreased, it is possible to improve the fuel consumption of an automobile in which the tire is used.

In addition, when the reinforcing cord layer 28 is configured to include the coated cord member 26B, since it is possible to decrease the difference in hardness between the tire case 17 and the reinforcing cord layer 28 compared to the case when the reinforcing cord 26A is simply fixed using cushion rubber 29, the coated cord member 26B can be further adhered and fixed to the tire case 17. Thereby, the above incorporation of air can be effectively prevented, and it is possible to effectively suppress the movement of the reinforcing cord member at the time of driving.

Furthermore, when the reinforcing cord is a steel cord, since the cord member 26A can be easily separated and collected from the coated cord member 26B through heating when disposing of the tire, it is advantageous in terms of the recycling properties of the tire 200. In addition, the resin material generally has a low loss factor (Tan δ) compared to vulcanized rubber. Therefore, when the reinforcing cord layer includes a large amount of the resin material, it is possible to improve the rolling properties of the tire. Furthermore, the resin material having a relatively high elastic modulus compared to vulcanized rubber is advantageous in that the in-plane shear stiffness is large, and steering stability and abrasion resistance during driving with the tire are also excellent.

In the method of manufacturing the tire of the present embodiment, when the tire case 17, the cushion rubber 29 and a tread rubber 30A are integrated, since the outer circumferential surface 17S of the tire case 17 has been subjected to a roughening treatment, the bonding properties (adhesion properties) are improved due to the anchor effect. In addition, since the resin material that forms the tire case 17 is dug up by the collision of a blasting abrasive, the wettability of a bonding agent is improved. Thereby, a state in which the bonding agent is uniformly coated on the outer circumferential surface 17S of the tire case 17 is held, and the bonding strength between the tire case 17 and the cushion rubber 29 can be ensured.

Particularly, even when protrusions and recesses are formed on the outer circumferential surface 17S of the tire case 17, the peripheries of the recess portions (recess walls and recess bottoms) are subjected to a roughening treatment by making the blasting abrasive collide with the recess portions (voids 28A), and the bonding strength between the tire case 17 and the cushion rubber 29 can be ensured.

Meanwhile, since the cushion rubber 29 is laminated in the roughening-treated areas on the outer circumferential surface 17S of the tire case 17, the bonding strength between the tire case 17 and the cushion rubber can be effectively ensured.

When the cushion rubber 29 has been vulcanized in a vulcanizing process, the cushion rubber 29 flows into the roughened recesses and protrusions formed on the outer circumferential surface 17S of the tire case 17 through the roughening treatment. In addition, when vulcanization is completed, the anchor effect is developed due to the cushion rubber 29 flowing into the roughened recesses and protrusions so that the bonding strength between the tire case 17 and the cushion rubber 29 is improved.

The tire 200 manufactured using the above method of manufacturing a tire ensures the bonding strength between the tire case 17 and the cushion rubber 29, that is, ensures the bonding strength between the tire case 17 and the tread 30 through the cushion rubber 29. Thereby, the separation between the outer circumferential surface 17S of the tire case 17 of the tire 200 and the cushion rubber 29 is suppressed at the time of driving or the like.

In addition, since the outer circumference of the tire case 17 is made of the reinforcing cord layer 28, the puncture resistance and the cutting resistance are improved compared to a case in which the outer circumference is made of something other than the reinforcing cord layer 28.

In addition, since the reinforcing cord layer 28 is formed by winding the coated cord member 26B, the stiffness of the tire 200 in the circumferential direction is improved. The improvement of the stiffness in the circumferential direction suppresses creeping (a phenomenon in which the plastic deformation of the tire case 17 increases over time under a constant stress) in the tire case 17, and the pressure resistance with respect to the air pressure from the inside in the tire radial direction is improved.

In the present embodiment, the recesses and protrusions are formed on the outer circumferential surface 17S of the tire case 17, but the eleventh aspect of the invention is not limited thereto, and a configuration in which the outer circumferential surface 17S is formed to be flat may be employed.

In addition, in the tire case 17, the reinforcing cord layer may be formed by covering the coated cord member, which is wound around and bonded to the crown portion of the tire case, with a thermoplastic material for coating. In this case, a coating layer can be formed by discharging a thermoplastic material for coating in a molten or softened state on the reinforcing cord layer 28. In addition, the coating layer may be formed by heating a welding sheet into a molten or softened state without using an extruder, and attaching the welding sheet to the surface (outer circumferential surface) of the reinforcing cord layer 28.

The above Embodiment 11-2 employs a configuration in which case divided parts (tire case half parts 17A) are bonded so as to form the tire case 17, but the eleventh aspect of the invention is not limited thereto, and the tire case 17 may be integrally formed using a mold or the like.

The tire 200 of Embodiment 11-2 is a so-called tubeless tire in which an air chamber is formed between the tire 200 and the rim 20 by mounting the bead portion 12 on the rim 20, but the eleventh aspect of the invention is not limited to this configuration, and the tire 200 may have, for example, a complete tube shape (for example, the shape illustrated in FIG. 4).

In Embodiment 11-2, the cushion rubber 29 is disposed between the tire case 17 and the tread 30, but the eleventh aspect of the invention is not limited thereto, and a configuration in which the cushion rubber 29 is not disposed may be employed.

In addition, Embodiment 11-2 employs a configuration in which the coated cord member 26B is helically wound around the crown portion 16, but the eleventh aspect of the invention is not limited thereto, and a configuration in which the coated cord member 26B is wound to be discontinuous in the width direction may be employed.

Embodiment 11-2 employs a configuration in which a thermoplastic material is used as the resin material for coating 27 that forms the coated cord member 26B, and the resin material for coating 27 is heated into a molten or softened state so as to weld the coated cord member 26B on the outer circumferential surface of the crown portion 16, but the eleventh aspect of the invention is not limited to this configuration, and a configuration in which the coated cord member 26B is adhered to the outer circumferential surface of the crown portion 16 using an adhesive or the like without heating the resin material for coating 27 may be employed.

In addition, a configuration in which a thermosetting resin is used as the resin material for coating 27 that forms the coated cord member 26B, and the coated cord member 26B is adhered to the outer circumferential surface of the crown portion 16 using an adhesive or the like without heating may be employed.

Furthermore, a configuration in which a thermosetting resin is used as the resin material for coating 27 that forms the coated cord member 26B, and the tire case 17 is formed of a thermoplastic resin material may be employed. In this case, the coated cord member 26B may be adhered to the outer circumferential surface of the crown portion 16 using an adhesive or the like, or the coated cord member 26B may be welded on the outer circumferential surface of the crown portion 16 by heating the portion, which is to be provided with the coated cord member 26B, of the tire case 17 into a molten or softened state.

In addition, furthermore, a configuration in which a thermoplastic material is used as the resin material for coating 27 that forms the coated cord member 26B, and the tire case 17 is formed of a thermoplastic resin material may be employed. In this case, the coated cord member 26B may be adhered to the outer circumferential surface of the crown portion 16 using an adhesive or the like, or the coated cord member 26B may be welded on the outer circumferential surface of the crown portion 16 by heating the portion, which is to be provided with the coated cord member 26B, of the tire case 17 into a molten or softened state, and heating the resin material for coating 27 into a molten or softened state. Meanwhile, when both the tire case 17 and the coated cord member 26B have been heated into a molten or softened state, since both are well mixed, the bonding strength is improved. In addition, when thermoplastic resin materials are used as both the resin material that forms the tire case 17 and the resin material for coating 27 that forms the coated cord member 26B, the thermoplastic resin materials are preferably the same kind of thermoplastic materials, particularly, the same thermoplastic material.

In addition, furthermore, an adhesive may be coated on the outer circumferential surface 17S of the tire case 17, after the surface of the outer circumferential surface 17S, on which the roughening treatment has been carried out, is activated using a corona treatment, a plasma treatment or the like so as to increase the hydrophilicity.

In addition, furthermore, the order for manufacturing the tire 200 is not limited to the order in Embodiment 11-2, and may be appropriately changed.

Thus far, an embodiment of the eleventh aspect of the invention has been described using the embodiment, but the embodiment is simply an example, and the invention can be carried out with a variety of modifications within the scope of the purport. In addition, it is needless to say that the scope of right of the eleventh aspect of the invention is not limited to the above embodiment.

Thus far, the specific embodiments according to the eleventh aspect of the invention have been described using Embodiment 11-1 and Embodiment 11-2, but the eleventh aspect of the invention is not limited to the above embodiments.

The Twelfth Aspect of the Invention

Next, a thermoplastic resin material that constitutes the tire frame in the twelfth aspect of the invention will be described, and, subsequently, a specific embodiment of the tire of the twelfth aspect of the invention will be described using the drawings.

[Thermoplastic Resin Material]

The tire of the twelfth aspect of the invention is a tire including at least a circular tire frame formed of a thermoplastic resin material, in which the thermoplastic resin material contains a polyamide-based thermoplastic elastomer, an olefin-(meth)acrylic acid copolymer (specific copolymer) and an acid-modified copolymer formed by acid-modifying an olefin-(meth)acrylate copolymer (specific acid-modified copolymer).

Since a polyamide-based thermoplastic elastomer, the specific copolymer and the specific acid-modified copolymer are contained in the thermoplastic resin material according to the twelfth aspect of the invention, a tire can be obtained in which the impact resistance and fracture resistance are excellent when the thermoplastic resin material according to the twelfth aspect of the invention is applied to the tire.

Hereinafter, the polyamide-based thermoplastic elastomer, the specific copolymer and the specific acid-modified copolymer will be described.

(Polyamide-Based Thermoplastic Elastomer)

The "thermoplastic elastomer" is a thermoplastic resin material including a hard segment and a soft segment in the molecule as described above, and, in detail, refers to an elastic macromolecular compound, which is a thermoplastic resin material made of a copolymer including a polymer that constitutes a crystalline hard segment having a high melting point or a hard segment forming a pseudo-crosslink through physical aggregation, and a polymer that constitutes a non-crystalline soft segment having a low glass transition temperature.

In addition, the "polyamide-based thermoplastic elastomer" is an elastic macromolecular compound, and refers to a thermoplastic resin material which is made of a copolymer including a polymer that constitutes a crystalline hard segment having a high melting point, and a polymer that constitutes a non-crystalline soft segment having a low glass transition temperature, and which has an amide bond (—CONH—) in the main chain of the polymer that constitutes the hard segment.

Examples of crystalline polyamide that constitutes the hard segment include aliphatic polyamides, such as polycaproamide (nylon-6), poly-ω-aminoheptanoic acid (nylon-7), poly-ω-aminononanoic acid (nylon-9), polyundecaneamide (nylon-11), polylauryl lactam (nylon-12), polyethylene diamine adipamide (nylon-2,6), polytetramethylene adipamide (nylon-4,6), polyhexamethylene adipamide (nylon-6,6), polyhexamethylene sebacamide (nylon-6,10), polyhexamethylene dodecamide (nylon-6,12), polyoctamethylene adipamide (nylon-8,6) and polydecamethylene adipamide (nylon-10,8); crystalline aromatic polyamides obtained through a polycondensation reaction between an aromatic diamine, such as meta-xylene diamine or para-xylene diamine, and a dicarboxylic acid, such as adipic acid, suberic acid, sebacic acid, cyclohexane dicarboxylic acid, terephthalic acid or isophthalic acid, or a derivative thereof; and the like.

Among the above, nylon-6, nylon-6,6, nylon-12 and the like are preferable, and nylon-12 is more preferable. As the "polyamide-based thermoplastic elastomer" in the present embodiment, the same polyamide-based thermoplastic elastomer as in the above first aspect of the invention can be used.

[Specific Copolymer]

The thermoplastic resin material contains an olefin-(meth)acrylic acid copolymer (specific copolymer).

Here, the "olefin-(meth)acrylic acid copolymer" refers to a copolymer including a partial structure derived from (meth)acrylic acid in the repeating unit of an olefin. The "(meth)acrylic acid" refers to at least one of acrylic acid or methacrylic acid. The form of the copolymer may be a radical polymer, a block copolymer or a graft copolymer.

In the olefin-(meth)acrylic acid copolymer, the olefin that constitutes the repeating unit of the olefin is preferably ethylene, propylene or 1-butene, and is more preferably ethylene.

That is, the olefin-(meth)acrylic acid copolymer is preferably an ethylene-(meth)acrylic acid copolymer, and more preferably an ethylene-methacrylic acid copolymer.

The olefin-(meth)acrylic acid copolymer may be used solely, or may be used in combination of two or more kinds.

The number average molecular weight (Mn) of the specific copolymer is preferably 5,000 to 10,000,000, and more preferably 7,000 to 1,000,000 from the viewpoint of the melt moldability of the thermoplastic resin material.

As the olefin, an ethylene is preferable, and, furthermore, as the specific copolymer, an ethylene-methacrylic acid copolymer is preferable.

A commercially available product may be used as the specific copolymer, and examples thereof include NUCREL manufactured by Du Pont-Mitsui Polychemicals Co., Ltd. (N035C, AN42115C, and the like).

[Specific Acid-Modified Copolymer]

The thermoplastic resin material contains an acid-modified copolymer formed by acid-modifying an olefin-(meth)acrylate copolymer (specific acid-modified copolymer).

Here, the "acid-modified copolymer formed by acid-modifying an olefin-(meth)acrylate copolymer" refers to a copolymer obtained by bonding a compound having an acid group to a copolymer [that is, an olefin-(meth)acrylate copolymer] including a partial structure derived from (meth)acrylate in the repeating unit of an olefin. The "(meth)acrylate" refers to at least one of acrylate or methacrylate.

The "bonding a compound having an acid group to an olefin-(meth)acrylate copolymer" more specifically refers to bonding an unsaturated compound having an acid group, such as a carboxylic acid group, a sulfuric acid group or a phosphoric acid group, to the olefin-(meth)acrylate copolymer. Examples thereof include bonding (for example, graft polymerizing) an unsaturated bond portion in an unsaturated carboxylic acid to the olefin-(meth)acrylate copolymer when an unsaturated carboxylic acid (generally maleic anhydride) is used as the unsaturated compound having an acid group.

The compound having an acid group is preferably a compound having a carboxylic acid group (carboxy group), which is a weak acid group, from the viewpoint of suppressing the deterioration of the olefin-(meth)acrylate copolymer, and examples thereof include an acrylic acid, a methacrylic acid, an itaconic acid, a crotonic acid, an isocrotonic acid, a maleic acid, and the like.

In the olefin-(meth)acrylate copolymer, the olefin that constitutes the repeating unit of the olefin is preferably ethylene, propylene or 1-butene, and is more preferably ethylene.

That is, the olefin-(meth)acrylate copolymer is preferably an ethylene-(meth)acrylate copolymer.

Accordingly, as the specific acid-modified copolymer, an acid-modified product of an ethylene-(meth)acrylate copolymer is preferable, a carboxylic acid-modified copolymer formed by acid-modifying an ethylene-(meth)acrylate ethyl ester copolymer using a compound having a carboxylic acid group (carboxy group) is more preferable, and a carboxylic acid-modified product of an ethylene-acrylate ethyl ester copolymer is still more preferable.

The specific acid-modified copolymer may be used solely, or may be used in combination of two or more kinds.

The number average molecular weight (Mn) of the specific acid-modified copolymer is preferably 5,000 to 10,000,000, and more preferably 7,000 to 1,000,000 from the viewpoint of the melt moldability of the thermoplastic resin material.

A commercially available product may be used as the specific acid-modified copolymer, and examples thereof include HPR manufactured by Du Pont-Mitsui Polychemicals Co., Ltd. (AR2011 and the like).

The mass ratio (x:y+z) between the polyamide-based thermoplastic elastomer (x) and the specific copolymer (y) and the specific acid-modified copolymer (z) in the thermoplastic resin material is preferably from 95:5 to 50:50, and more preferably from 90:10 to 50:50 from the viewpoint of impact resistance and fracture properties.

In addition, the mass ratio (y:z) between the specific copolymer (y) and the specific acid-modified copolymer (z) in the thermoplastic resin material is preferably from 95:5 to 10:90, and more preferably from 80:20 to 20:80. Setting the mass ratio in the above range enables the sufficient development of the performances of the thermoplastic resin material, and it is possible to improve the tensile characteristics, such as tensile elasticity, breaking strength and fracture properties, as the tire performances. Meanwhile, a combination of an ethylene-methacrylic acid copolymer and an acid-modified product of an ethylene-acrylate copolymer is preferably used as the specific copolymer and the specific acid-modified copolymer.

Furthermore, in the thermoplastic resin material, the total content of the thermoplastic elastomer, the specific copolymer and the specific acid-modified copolymer in the thermoplastic resin material is preferably 50 mass % to 100 mass %, and more preferably 50 mass % to 90 mass % with respect to the total mass of the thermoplastic resin material from the viewpoint of sufficiently developing the performances of the thermoplastic resin material.

The thermoplastic resin material may contain a variety of fillers (for example, silica, calcium carbonate and clay) and a variety of additives, such as an age inhibitor, oil, a plasticizer, a coloring agent, a weather-resisting agent and a reinforcing material, as desired.

The thermoplastic resin material can be obtained by mixing the thermoplastic elastomer, the specific copolymer and the specific acid-modified copolymer, adding a variety of additives as necessary, and melting and mixing the components. The mixing ratio between the thermoplastic elastomer, the specific copolymer and the specific acid-modified copolymer is based on the ratio described above. The thermoplastic resin material obtained through melting and mixing can be used in a pellet shape as necessary.

The tensile modulus of elasticity (in the specification, the "elastic modulus" refers to the tensile modulus of elasticity unless particularly otherwise described), which is defined in JIS K7113:1995, of the thermoplastic resin material according to the twelfth aspect of the invention is preferably 100 MPa to 1000 MPa, more preferably 100 MPa to 800 MPa, and particularly preferably 100 MPa to 700 MPa. When the tensile modulus of elasticity of the thermoplastic resin material is 100 MPa to 1000 MPa, fitting onto a rim can be efficiently carried out while holding the shape of the tire frame.

The tensile yield strength, which is defined in JIS K7113:1995, of the thermoplastic resin material according to the twelfth aspect of the invention is preferably 5 MPa or more, preferably 5 MPa to 20 MPa, and still more preferably 5 MPa to 17 MPa. When the tensile yield strength of the thermoplastic resin material is 5 MPa or more, it is possible to withstand deformation caused by a load applied to the tire at the time of driving or the like.

The tensile yield elongation, which is defined in JIS K7113:1995, of the thermoplastic resin material according to the twelfth aspect of the invention is preferably 10% or more, preferably 10% to 70%, and still more preferably 15% to 60%. When the tensile yield elongation of the thermoplastic resin material is 10% or more, it is possible to increase the elastic region and improve the fittability onto a rim.

The tensile elongation at break (JIS K7113:1995), which is defined in JIS K7113:1995, of the thermoplastic resin material according to the twelfth aspect of the invention is preferably 50% or more, preferably 100% or more, still more preferably 150% or more, and particularly preferably 200% or more. When the tensile elongation at break of the thermoplastic resin material is 50% or more, it is possible to improve the fittability onto a rim and avoid fracture due to collision.

The deflection temperature under load (under a load of 0.45 MPa), which is defined in ISO75-2 or ASTM D648, of the thermoplastic resin material according to the twelfth aspect of the invention is preferably 50° C. or more, preferably 50° C. to 150° C., and still more preferably 50° C. to 130° C. When the deflection temperature under load of the thermoplastic resin material is 50° C. or more, it is possible to suppress deformation in a vulcanization process of a tread or the like.

[The Resin Material as a Component of the Reinforcing Cord Layer]

The tire of the twelfth aspect of the invention may have the reinforcing cord member which is wound around the outer circumference of the tire frame in the circumferential direction so as to form the reinforcing cord layer.

The "resin material as a component of the reinforcing cord layer" according to the twelfth aspect of the invention is the same as the [resin material as a component of the reinforcing cord layer] according to the first aspect of the invention.

Embodiment 12-1

Hereinafter, a tire according to Embodiment 12-1 of the tire of the twelfth aspect of the invention will be described according to the drawings.

Here, the tire according to Embodiment 12-1 is the same as the above Embodiment 12 except for the following points.

Therefore, the same reference numerals and drawings will be used in the description regarding the same drawings and members.

The tire case 17 of the present embodiment is formed of a thermoplastic resin material made of a mixed material of a polyamide-based thermoplastic elastomer ("UBESTA, XPA9055X1" manufactured by Ube Industries, Ltd.), the specific copolymer (an ethylene-methacrylic acid copolymer "NUCREL, N035C" manufactured by Du Pont-Mitsui Polychemicals Co., Ltd.) and the specific acid-modified copolymer (an acid-modified product of an ethylene-acrylate ethyl ester copolymer "HPR, AR2011" manufactured by Du Pont-Mitsui Polychemicals Co., Ltd.). In the present embodiment, the tire case 17 is formed of the thermoplastic resin material according to the twelfth aspect of the invention alone, but the twelfth aspect of the invention is not limited to this configuration, and, similarly to an ordinary pneumatic rubber tire of the related art, other thermoplastic resin materials having different characteristics may be used in the respective portions (the side portions 14, the crown portion 16, the bead portions 12, and the like) of the tire case 17. Other points are the same as in the tire according to the above Embodiment 12, and the manufacturing method is also the same.

(Effects)

In the tire 10 of the present embodiment, since the tire case 17 is formed of the thermoplastic resin material according to the twelfth aspect of the invention, the impact resistance and the fracture properties are excellent. Furthermore, since the tire structure can be simplified, the weight is light compared to rubber of the related art. Therefore, when the tire 10 of the present embodiment is applied to an automobile, the durability is excellent. In addition, since the weight of the tire can be decreased, it is possible to improve the fuel consumption of an automobile in which the tire is used.

In addition, the polyamide-based thermoplastic elastomer, which is one of the components of the thermoplastic resin material, has high adhesion properties to the reinforcing cord 26, and, furthermore, is excellent in terms of fixing performances, such as weld strength. Therefore, it is possible to suppress the phenomenon in which air remains around the reinforcing cord 26 in the reinforcing cord winding process (incorporation of air). When the adhesion properties and weldability to the reinforcing cord 26 are high, and, furthermore, incorporation of air into the periphery of the reinforcing cord member is suppressed, it is possible to effectively suppress the movement of the reinforcing cord 26 caused by a force applied thereto at the time of driving or the like. Thereby, for example, even when a tire-constituting member has been provided so as to cover the entirety of the reinforcing cord member on the outer circumference of the tire frame, since the movement of the reinforcing cord member is suppressed, the separation or the like of the members (including the tire frame) is suppressed, and the durability of the tire 10 is improved.

In addition, in the tire 10 of the present embodiment, since the reinforcing cord 26 having a higher stiffness than the thermoplastic resin material is helically wound in the circumferential direction on the outer circumferential surface of the crown portion 16 in the tire case 17 formed of the thermoplastic resin material, the puncture resistance, the cutting resistance and the stiffness of the tire 10 in the circumferential direction are improved. Meanwhile, the improvement of the stiffness of the tire 10 in the circumferential direction prevents the creeping in the tire case 17 formed of the thermoplastic resin material.

In addition, in the cross-sectional view of the tire case 17 along the axial direction (the cross section illustrated in FIG. 1), since at least a portion of the reinforcing cord 26 is embedded in the outer circumferential surface of the crown portion 16 in the tire case 17 formed of the thermoplastic resin material, and is adhered to the thermoplastic resin material, incorporation of air during manufacturing is suppressed, and the movement of the reinforcing cord 26 caused by a force applied thereto at the time of driving or the like is suppressed. Thereby, the separation or the like of the reinforcing cord 26, the tire case 17 and the tread 30 is suppressed, and the durability of the tire 10 is improved.

In addition, since the depth L of embedding of the reinforcing cord 26 is $\frac{1}{5}$ or more of the diameter D as illustrated in FIG. 2, incorporation of air during manufacturing is effectively suppressed, and the movement of the reinforcing cord 26 caused by a force applied thereto at the time of driving or the like is further suppressed.

When the reinforcing cord layer 28 is configured to include the thermoplastic resin material as described above, since it is possible to decrease the difference in hardness between the tire case 17 and the reinforcing cord layer 28 compared to the case when the reinforcing cord 26 is fixed using cushion rubber, the reinforcing cord 26 can be further adhered and fixed to the tire case 17. Thereby, the above incorporation of air can be effectively prevented, and it is possible to effectively suppress the movement of the reinforcing cord member at the time of driving.

Furthermore, when the reinforcing cord is a steel cord, since the reinforcing cord 26 can be easily separated and collected from the thermoplastic resin material through heating when disposing of the tire, it is advantageous in terms of the recycling properties of the tire 10. In addition, the resin material generally has a low loss factor (Tan δ) compared to vulcanized rubber. Therefore, when the reinforcing cord layer includes a large amount of the resin material, it is possible to improve the rolling properties of the tire. Furthermore, the resin material having a relatively high elastic modulus compared to vulcanized rubber is advantageous in that the in-plane shear stiffness is large, and steering stability and abrasion resistance during driving with the tire are also excellent.

In addition, since the tread 30 that comes into contact with road surfaces is made of a rubber material that is more abrasion-resistant than the thermoplastic resin material, the abrasion resistance of the tire 10 is improved.

Furthermore, since an annular bead core 18 made of a metallic material is embedded in the bead portion 12, the tire case 17, that is, the tire 10 is strongly held to the rim 20 similarly to a pneumatic rubber tire of the related art.

In addition, furthermore, since the sealing layer 24 made of a rubber material having higher sealing properties than the thermoplastic resin material is provided in a portion, which comes into contact with the rim 20, of the bead portion 12, the sealing properties between the tire 10 and the rim 20 are improved. Therefore, compared to the case when sealing is carried out between the rim 20 and the thermoplastic resin material, the air leakage from the tire is further suppressed. In addition, the rim fitting properties are also improved when the sealing layer 24 is provided.

The above embodiment employs a configuration in which the reinforcing cord 26 is heated, and the thermoplastic resin material in the portion with which the heated reinforcing cord 26 comes into contact is melted or softened, but the twelfth aspect of the invention is not limited to this configuration, and the reinforcing cord 26 may be embedded in the crown portion 16 after heating the outer circumferential surface of the crown portion 16, in which the reinforcing cord 26 is to be embedded, using a hot air generating apparatus without heating the reinforcing cord 26.

In addition, in Embodiment 12-1, a heater and a fan are used as the heat source of a cord heating device 59, but the twelfth aspect of the invention is not limited to this configuration, and a configuration in which the reinforcing cord 26 is directly heated using radiation heat (for example, infrared rays or the like) may be employed.

Furthermore, Embodiment 12-1 employs a configuration in which the portion, in which the thermoplastic resin material having the reinforcing cord 26 embedded therein is melted or softened, is forcibly cooled using the second metal roller 64, but the twelfth aspect of the invention is not limited to this configuration, and a configuration in which the portion, in which the thermoplastic resin material is melted or softened, is forcibly cooled and solidified by directly blowing cold air to the portion in which the thermoplastic resin material is melted or softened may be employed.

In addition, Embodiment 12-1 employs a configuration in which the reinforcing cord 26 is heated; however, for example, a configuration in which the outer circumference of the reinforcing cord 26 is coated with the same thermoplastic resin material as the tire case 17 may be employed, and, in this case, it is possible to effectively suppress incorporation of air during embedding in the crown portion 16 by heating the reinforcing cord 26 and the coating of the thermoplastic resin material when winding the coated reinforcing cord around the crown portion 16 of the tire case 17.

In addition, the helical winding of the reinforcing cord 26 is easy in the manufacturing, but a method, in which the reinforcing cord 26 is formed to be discontinuous in the width direction, or the like can be also considered.

The tire 10 of Embodiment 12-1 is a so-called tubeless tire in which an air chamber is formed between the tire 10 and the rim 20 by mounting the bead portion 12 on the rim 20, but the twelfth aspect of the invention is not limited to this configuration, and the tire may have a complete tube shape.

The tire having the complete tube shape may be a configuration in which, for example, three tire frames formed into a circular shape are disposed in the tire width direction as illustrated in FIG. 4. FIG. 4 is a cross-sectional view of the tire according to other embodiment. As illustrated in FIG. 4, the tire 86 has the tread rubber layer 87, hollow tubes (tire frame) 88 which are made of the same resin material as in Embodiment 12-1 and are formed into the circular shape, the belt (reinforcing cord) 89 and the rim 90. Three tubes 88 are disposed in series in the tire width direction of the tire 86. The tread rubber layer 87, in which the belt 89 is embedded, is adhered to the outer circumferences of the tubes 88. In addition, the tubes 88 are mounted on the rim 90 having recess portions that engage with the tubes 88. Meanwhile, the bead core is not provided in the tire 86.

Thus far, an embodiment of the twelfth aspect of the invention has been described using the embodiment, but the embodiment is simply an example, and the invention can be carried out with a variety of modifications within the scope of the purport. In addition, it is needless to say that the scope of right of the twelfth aspect of the invention is not limited to the above embodiment.

Embodiment 12-2

Next, the tire and the method of manufacturing the tire of the twelfth aspect of the invention according to Embodiment 12-2 will be described according to the drawings. Similarly to the above Embodiment 12-1, the tire of the present embodiment exhibits substantially the same cross-sectional shape as an ordinary pneumatic rubber tire of the related art. Here, the tire according to Embodiment 12-2 is the same as the above Embodiment 1-2 except for the following points. Therefore, the same reference numerals and drawings will be used in the description regarding the same drawings and members.

In the tire of Embodiment 12-2, similarly to the above Embodiment 12-1, the tire case 17 is formed of a thermoplastic resin material made of a mixed material of a polyamide-based thermoplastic elastomer ("UBESTA, XPA9055X1" manufactured by Ube Industries, Ltd.), the specific copolymer (an ethylene-methacrylic acid copolymer "NUCREL, N035C" manufactured by Du Pont-Mitsui Polychemicals Co., Ltd.) and the specific acid-modified copolymer (an acid-modified product of an ethylene-acrylate ethyl ester copolymer "HPR, AR2011" manufactured by Du Pont-Mitsui Polychemicals Co., Ltd.). Other points are the same as in the tire according to the above Embodiment 1-2, and the manufacturing method is also the same.

In addition, the elastic modulus of a resin material for coating 27 is preferably set in a range of 0.1 times to 10 times the elastic modulus of a resin material that forms the tire case 17. When the elastic modulus of the resin material for coating 27 is 10 times or less the elastic modulus of the thermoplastic resin material that forms the tire case 17, the crown portion does not become too hard, and fitting onto a rim can be easily carried out. In addition, when the elastic modulus of the resin material for coating 27 is 0.1 times or more the elastic modulus of the thermoplastic resin material that forms the tire case 17, the resin as a component of the reinforcing cord layer 28 does not become too soft, and the belt in-plane shear stiffness is excellent and the cornering force is improved. Meanwhile, in the present embodiment, as the resin material for coating 27, the same material as the thermoplastic resin material [in the present embodiment, a thermoplastic resin material made of a mixed material of a polyamide-based thermoplastic elastomer ("UBESTA, XPA9055X1" manufactured by Ube Industries, Ltd.), the specific copolymer (an ethylene-methacrylic acid copolymer "NUCREL, N035C" manufactured by Du Pont-Mitsui Polychemicals Co., Ltd.) and the specific acid-modified copolymer (an acid-modified product of an ethylene-acrylate ethyl ester copolymer "HPR, AR2011" manufactured by Du Pont-Mitsui Polychemicals Co., Ltd.)] is used.

(Effects)

In the tire 200 of the present embodiment, since the tire case 17 is formed of the thermoplastic resin material, the impact resistance and the fracture properties are excellent. Therefore, when the tire 10 of the present embodiment is applied to an automobile, the durability is excellent.

Furthermore, since the tire structure can be simplified, the weight is light compared to rubbers of the related art. Therefore, since the weight of the tire 200 of the present embodiment can be decreased, it is possible to improve the fuel consumption of an automobile in which the tire is used.

In addition, when the reinforcing cord layer 28 is configured to include the coated cord member 26B, since it is possible to decrease the difference in hardness between the tire case 17 and the reinforcing cord layer 28 compared to the case when the reinforcing cord 26A is simply fixed using cushion rubber 29, the coated cord member 26B can be further adhered and fixed to the tire case 17. Thereby, the above incorporation of air can be effectively prevented, and it is possible to effectively suppress the movement of the reinforcing cord member at the time of driving.

Furthermore, when the reinforcing cord is a steel cord, since the cord member 26A can be easily separated and collected from the coated cord member 26B through heating when disposing of the tire, it is advantageous in terms of the recycling properties of the tire 200. In addition, the resin material generally has a low loss factor (Tan δ) compared to vulcanized rubber. Therefore, when the reinforcing cord layer includes a large amount of the resin material, it is possible to improve the rolling properties of the tire. Furthermore, the resin material having a relatively high elastic modulus compared to vulcanized rubber is advantageous in that the in-plane shear stiffness is large, and steering stability and abrasion resistance during driving with the tire are also excellent.

In the method of manufacturing the tire of the present embodiment, when the tire case 17, the cushion rubber 29 and a tread rubber 30A are integrated, since the outer circumferential surface 17S of the tire case 17 has been subjected to a roughening treatment, the bonding properties (adhesion properties) are improved due to the anchor effect. In addition, since the resin material that forms the tire case 17 is dug up by the collision of a blasting abrasive, the wettability of a bonding agent is improved. Thereby, a state in which the bonding agent is uniformly coated on the outer circumferential surface 17S of the tire case 17 is held, and the bonding strength between the tire case 17 and the cushion rubber 29 can be ensured.

Particularly, even when protrusions and recesses are formed on the outer circumferential surface 17S of the tire case 17, the peripheries of the recess portions (recess walls and recess bottoms) are subjected to a roughening treatment by making the blasting abrasive collide with the recess portions (voids 28A), and the bonding strength between the tire case 17 and the cushion rubber 29 can be ensured.

Meanwhile, since the cushion rubber 29 is laminated in the roughening-treated areas on the outer circumferential surface 17S of the tire case 17, the bonding strength between the tire case 17 and the cushion rubber can be effectively ensured.

When the cushion rubber 29 has been vulcanized in a vulcanizing process, the cushion rubber 29 flows into the roughened recesses and protrusions formed on the outer circumferential surface 17S of the tire case 17 through the roughening treatment. In addition, when vulcanization is completed, the anchor effect is developed due to the cushion rubber 29 that has flowed into the roughened recesses and protrusions so that the bonding strength between the tire case 17 and the cushion rubber 29 is improved.

The tire 200 manufactured using the above method of manufacturing a tire ensures the bonding strength between the tire case 17 and the cushion rubber 29, that is, ensures the bonding strength between the tire case 17 and the tread 30 through the cushion rubber 29. Thereby, the separation between the outer circumferential surface 17S of the tire case 17 of the tire 200 and the cushion rubber 29 is suppressed at the time of driving or the like.

In addition, since the outer circumference of the tire case 17 is made of the reinforcing cord layer 28, the puncture resistance and the cutting resistance are improved compared to a case in which the outer circumference is made of something other than the reinforcing cord layer 28.

In addition, since the reinforcing cord layer 28 is formed by winding the coated cord member 26B, the stiffness of the tire 200 in the circumferential direction is improved. The improvement of the stiffness in the circumferential direction suppresses creeping (a phenomenon in which the plastic deformation of the tire case 17 increases over time under a constant stress) in the tire case 17, and the pressure resistance with respect to the air pressure from the inside in the tire radial direction is improved.

In the present embodiment, the recesses and protrusions are formed on the outer circumferential surface 17S of the tire case 17, but the twelfth aspect of the invention is not limited thereto, and a configuration in which the outer circumferential surface 17S is formed to be flat may be employed.

In addition, in the tire case 17, the reinforcing cord layer may be formed by covering the coated cord member, which is wound around and bonded to the crown portion of the tire case, with a thermoplastic material for coating. In this case, a coating layer can be formed by discharging a thermoplastic material for coating in a molten or softened state on the reinforcing cord layer 28. In addition, the coating layer may be formed by heating a welding sheet into a molten or softened state without using an extruder, and attaching the welding sheet to the surface (outer circumferential surface) of the reinforcing cord layer 28.

The above Embodiment 12-2 employs a configuration in which case divided parts (tire case half parts 17A) are bonded so as to form the tire case 17, but the twelfth aspect of the invention is not limited thereto, and the tire case 17 may be integrally formed using a mold or the like.

The tire 200 of Embodiment 12-2 is a so-called tubeless tire in which an air chamber is formed between the tire 200 and the rim 20 by mounting the bead portion 12 on the rim 20, but the twelfth aspect of the invention is not limited to this configuration, and the tire 200 may have, for example, a complete tube shape (for example, the shape illustrated in FIG. 4).

In Embodiment 12-2, the cushion rubber 29 is disposed between the tire case 17 and the tread 30, but the twelfth aspect of the invention is not limited thereto, and a configuration in which the cushion rubber 29 is not disposed may be employed.

In addition, Embodiment 12-2 employs a configuration in which the coated cord member 26B is helically wound around the crown portion 16, but the twelfth aspect of the invention is not limited thereto, and a configuration in which the coated cord member 26B is wound to be discontinuous in the width direction may be employed.

Embodiment 12-2 employs a configuration in which a thermoplastic material is used as the resin material for coating 27 that forms the coated cord member 26B, and the resin material for coating 27 is heated into a molten or softened state so as to weld the coated cord member 26B on the outer circumferential surface of the crown portion 16, but the twelfth aspect of the invention is not limited to this configuration, and a configuration in which the coated cord member 26B is adhered to the outer circumferential surface of the crown portion 16 using an adhesive or the like without heating the resin material for coating 27 may be employed.

In addition, a configuration in which a thermosetting resin is used as the resin material for coating 27 that forms the coated cord member 26B, and the coated cord member 26B is adhered to the outer circumferential surface of the crown portion 16 using an adhesive or the like without heating may be employed.

Furthermore, a configuration in which a thermosetting resin is used as the resin material for coating 27 that forms the coated cord member 26B, and the tire case 17 is formed of a thermoplastic resin material may be employed. In this case, the coated cord member 26B may be adhered to the outer circumferential surface of the crown portion 16 using an adhesive or the like, or the coated cord member 26B may be welded on the outer circumferential surface of the crown portion 16 by heating the portion, which is to be provided with the coated cord member 26B, of the tire case 17 into a molten or softened state.

In addition, furthermore, a configuration in which a thermoplastic material is used as the resin material for coating 27 that forms the coated cord member 26B, and the tire case 17 is formed of a thermoplastic resin material may be employed.

In this case, the coated cord member 26B may be adhered to the outer circumferential surface of the crown portion 16 using an adhesive or the like, or the coated cord member 26B may be welded on the outer circumferential surface of the crown portion 16 by heating the portion, which is to be provided with the coated cord member 26B, of the tire case 17 into a molten or softened state, and heating the resin material for coating 27 into a molten or softened state. Meanwhile, when both the tire case 17 and the coated cord member 26B have been heated into a molten or softened state, since both are well mixed, the bonding strength is improved. In addition, when thermoplastic resin materials are used as both the resin material that forms the tire case 17 and the resin material for coating 27 that forms the coated cord member 26B, the thermoplastic resin materials are preferably the same kind of thermoplastic materials, particularly, the same thermoplastic material.

In addition, furthermore, an adhesive may be coated on the outer circumferential surface 17S of the tire case 17, after the surface of the outer circumferential surface 17S, on which the roughening treatment has been carried out, is activated using a corona treatment, a plasma treatment or the like so as to increase the hydrophilicity.

In addition, furthermore, the order for manufacturing the tire 200 is not limited to the order in Embodiment 12-2, and may be appropriately changed.

Thus far, an embodiment of the twelfth aspect of the invention has been described using the embodiment, but the embodiment is simply an example, and the invention can be carried out with a variety of modifications within the scope of the purport. In addition, it is needless to say that the scope of right of the twelfth aspect of the invention is not limited to the above embodiment.

Thus far, the specific embodiments according to the twelfth aspect of the invention have been described using Embodiment 12-1 and Embodiment 12-2, but the twelfth aspect of the invention is not limited to the above embodiments.

The Thirteenth Aspect of the Invention

Next, a thermoplastic resin material including a polyamide-based thermoplastic elastomer and a rubber that constitutes the tire frame in the thirteenth aspect of the invention, and a resin material as a component of the reinforcing cord layer will be described, and, subsequently, a specific embodiment of the tire of the thirteenth aspect of the invention will be described using the drawings.

[Thermoplastic Resin Material]

The tire of the thirteenth aspect of the invention includes a circular tire frame formed of a thermoplastic resin material including at least a polyamide-based thermoplastic elastomer and a rubber.

—Polyamide-Based Thermoplastic Elastomer—

The polyamide-based thermoplastic elastomer is an elastic macromolecular compound, and refers to a thermoplastic resin material which is made of a copolymer including a polymer that constitutes a crystalline hard segment having a high melting point, and a polymer that constitutes a non-crystalline soft segment having a low glass transition temperature, and which has an amide bond (—CONH—) in the main chain of the polymer that constitutes the hard segment. As the "polyamide-based thermoplastic elastomer" in the present embodiment, the same polyamide-based thermoplastic elastomer as in the above first aspect of the invention can be used.

—Rubber—

The "rubber" is an elastic macromolecular compound.

As described above, the rubber is distinguished from the thermoplastic elastomer which is a thermoplastic resin material made of a copolymer including a polymer that constitutes a crystalline hard segment having a high melting point, and a polymer that constitutes a non-crystalline soft segment having a low glass transition temperature.

The rubber is not particularly limited, and examples thereof include natural rubber (NR), isoprene rubber (IR), butadiene rubber (BR), styrene-butadiene copolymer rubber (SBR), acrylonitrile-butadiene copolymer rubber (NBR), chloroprene rubber (CR), butyl rubber (IIR), halogenated butyl rubber (Br-IIR, Cl-IIR, and the like), ethylene-propylene-diene rubber (EPDM), and the like. NIR obtained by substituting all butadiene in the acrylonitrile-butadiene copolymer rubber with isoprene or NBIR obtained by substituting some of butadiene with isoprene may be used.

Among the above, BR, SBR, NBR, NIR and NBIR are preferable, and BR, SBR, IR and NBR are more preferable from the viewpoint of the easy control of the flexibility of the thermoplastic resin material.

From the viewpoint of increasing the elastic modulus of the rubber, fixing the diameter of dispersed rubber particles, and improving creeping, vulcanized rubber obtained by vulcanizing rubber may be used as the rubber. Rubber may be vulcanized using a known method, and examples of the method include the methods described in JP-A No. 11-048264, JP-A No. 11-029658, JP-A No. 2003-238744, and the like. The rubber is preferably grinded for miniaturization and injected when blended with the polyamide-based thermoplastic elastomer. It is particularly preferable to use dynamic crosslinking in which the rubber is dispersed and crosslinked (vulcanized) while kneading the polyamide-based thermoplastic elastomer and the rubber.

The rubber may be vulcanized by, for example, arbitrarily mixing a reinforcing material, such as carbon black, a filler, a vulcanizing agent, a vulcanization accelerator, a fatty acid or a salt thereof, a metallic oxide, a process oil, an age inhibitor, and the like with the rubber, kneading the components using a Banbury mixer, and then heating the components at 120° C. to 235° C.

As the vulcanizing agent, a known vulcanizing agent, for example, sulfur, an organic peroxide, a resin vulcanizing agent, or the like is used.

As the vulcanization accelerator, a known vulcanization accelerator, for example, aldehyde, ammonia, amine, guanidine, thiourea, thiasol, sulfenamide, thiuram, dithiocarbamate, xanthate, or the like is used.

Examples of the fatty acid include stearic acid, palmitic acid, myristic acid, lauric acid and the like, and the above may be blended in a salt state, such as zinc stearate. Among the above, a stearic acid is preferable.

In addition, examples of the metallic oxide include zinc oxide (ZnO), iron oxide, magnesium oxide, and the like, and, among the above, zinc oxide is preferable.

As the process oil, any of aromatic-based, naphthene-based, and paraffin-based process oil may be used.

Examples of the age inhibitor include an amine-ketone-based inhibitor, an imidazole-based inhibitor, an amine-based inhibitor, a phenol-based inhibitor, a sulfur-based inhibitor, a phosphorous-based inhibitor and the like.

The mass ratio (x:y) between the polyamide-based thermoplastic elastomer (x) and the rubber (y) in the thermoplastic resin [when the thermoplastic resin includes a thermoplastic elastomer other than the polyamide-based thermoplastic elastomer, the mass ratio (x:y') between the polyamide-based thermoplastic elastomer (x) and the total amount (y') of the rubber and the thermoplastic elastomer other than the polyamide-based thermoplastic elastomer] is preferably from 95:5 to 50:50. When the mass ratio between these elastomers is from 95:5 to 50:50, the polyamide-based thermoplastic elastomer and the rubber can have the characteristics of the rubber while maintaining the characteristics of the polyamide-based thermoplastic elastomer so that the elastic modulus of the tire can be easily controlled while maintaining the weldability between the reinforcing cord member and the tire frame through the polyamide-based thermoplastic elastomer, whereby the durability of the tire is further improved. The (x:y) and the (x:y') are both more preferably from 90:10 to 50:50.

—Thermoplastic Elastomer Having a High Affinity for Rubber—

The thermoplastic resin material may include a thermoplastic elastomer having a high affinity for rubber. Hereinafter, the thermoplastic elastomer having a high affinity for rubber will also be called the "rubber affinity thermoplastic elastomer".

When the thermoplastic resin material further includes the rubber affinity thermoplastic elastomer, it is possible to finely disperse the rubber in the thermoplastic resin material. Furthermore, it is considered that, due to the interaction between the polyamide-based thermoplastic elastomer and the acid-modified portion, the tensile strength is improved, ductile fracture occurs even in the case of fracturing, and brittle fracture or lamellar fracture is not easily caused. The occurrence of ductile fracture, brittle fracture and lamellar fracture can be checked by visually observing the fractured surface of the thermoplastic resin material.

Here, the "high affinity for rubber" refers to a state in which the molecular skeleton of the rubber and the molecular skeleton of the thermoplastic elastomer are similar so that the rubber is incorporated into the dispersed particles of the thermoplastic elastomer or the thermoplastic elastomer is incorporated into the dispersed particles of the rubber when the thermoplastic elastomer is mixed together with the rubber.

However, not all the thermoplastic elastomer and the rubber in the thermoplastic resin material need to be in the above state, and the thermoplastic elastomer and the rubber in the thermoplastic resin material may be partially in the above state.

For example, when the skeleton that constitutes the main chain of the polymer that constitutes the hard segment or the soft segment in the thermoplastic elastomer is similar to the skeleton that constitutes the main chain of the rubber molecules, the thermoplastic elastomer and the rubber are considered to have high affinities for each other. Specifically, with respect to styrene-butadiene copolymer rubber (SBR), examples of the rubber affinity thermoplastic elastomer include a polystyrene-based thermoplastic elastomer (particularly SEBS). In addition, with respect to butadiene rubber (BR) and ethylene-propylene-diene rubber (EPDM), examples of the rubber affinity thermoplastic elastomer include a polyolefin-based thermoplastic elastomer.

In addition, the rubber affinity thermoplastic elastomer is preferably an acid-modified thermoplastic elastomer in which an acid group (for example, a carboxy group) is introduced into some of the thermoplastic elastomer particles. When the rubber affinity thermoplastic elastomer is acid-modified, it is possible to further improve the fine dispersion of the rubber due to the interaction between the polyamide-based thermoplastic elastomer and the acid-modified portions in the thermoplastic resin material.

The rubber affinity thermoplastic elastomer is not particularly limited as long as it is a thermoplastic elastomer other than the polyamide-based thermoplastic elastomer and has a high affinity for the rubber, and examples thereof include polyolefin-based thermoplastic elastomers, polystyrene-based thermoplastic elastomers, polyester-based thermoplastic elastomers, polyurethane-based thermoplastic elastomers and the like. Polyolefin-based thermoplastic elastomers and styrene-based thermoplastic thermoplastic elastomers are preferable.

Next, polyolefin-based thermoplastic elastomers, polystyrene-based thermoplastic elastomers, polyester-based thermoplastic elastomers, and polyurethane-based thermoplastic elastomers, which can constitute the rubber affinity thermoplastic elastomer, will be described.

(Polyolefin-Based Thermoplastic Elastomer)

The "polyolefin-based thermoplastic elastomer" is an elastic macromolecular compound, and refers to a thermoplastic resin material made of a copolymer including a polymer that constitutes a crystalline hard segment having a high melting point, and a polymer that constitutes a non-crystalline soft segment having a low glass transition temperature, in which the polymer that constitutes the hard segment is a polyolefin, such as polypropylene or polyethylene. The "polyolefin-based thermoplastic elastomer" in the present embodiment is the same as in the above second aspect of the invention.

(Polystyrene-Based Thermoplastic Elastomer)

The polystyrene-based thermoplastic elastomer is an elastic macromolecular compound, and refers to a thermoplastic resin material made of a copolymer including a polymer that constitutes the hard segment, and a polymer that constitutes a non-crystalline soft segment having a low glass transition temperature, in which the polymer that constitutes the hard segment includes polystyrene. The "polystyrene-based thermoplastic elastomer" in the present embodiment is the same as in the above second aspect of the invention.

(Polyester-Based Thermoplastic Elastomer)

The polyester-based thermoplastic elastomer in the thirteenth aspect of the invention is an elastic macromolecular compound, and refers to a thermoplastic resin material made of a copolymer including a polymer that constitutes a crystalline hard segment having a high melting point, and a polymer that constitutes a non-crystalline soft segment having a low glass transition temperature, in which the polymer that constitutes the hard segment includes a polyethylene resin. The "polyester-based thermoplastic elastomer" in the present embodiment is the same as in the above second aspect of the invention.

(Polyurethane-Based Thermoplastic Elastomer)

Examples of the polyurethane-based thermoplastic elastomer include a material in which at least a polyurethane constitutes a hard segment forming a pseudo crosslink through physical aggregation, and another polymer constitutes the non-crystalline soft segment having a low glass transition temperature. The "polyurethane-based thermoplastic elastomer" in the present embodiment is the same as in the above second aspect of invention.

The mass ratio (z:y) between the rubber affinity thermoplastic elastomer (z) and the rubber (y) in the thermoplastic resin material according to the thirteenth aspect of the invention is preferably from 95:5 to 0:100, and more preferably from 90:10 to 0:100.

In addition, the total content of the polyamide-based thermoplastic elastomer and the rubber (the polyamide-based thermoplastic elastomer, the rubber and the rubber affinity thermoplastic elastomer when the thermoplastic resin material includes the rubber affinity thermoplastic elastomer) in the thermoplastic resin material is not particularly limited, but is preferably 50 mass % to 100 mass % with respect to the total amount of the thermoplastic resin material. When the total content is 50 mass % or more with respect to the total amount of the thermoplastic resin material, it is possible to sufficiently develop the characteristics of the thermoplastic resin material.

The thermoplastic resin material may contain a thermoplastic elastomer other than the polyamide-based thermoplastic elastomer, a thermoplastic resin, a variety of fillers (for example, silica, calcium carbonate and clay) and a variety of additives, such as an age inhibitor, oil, a plasticizer, a coloring agent, a weather-resisting agent and a reinforcing material, as desired.

In order to obtain the thermoplastic resin material, the polyamide-based thermoplastic elastomer, the rubber, the rubber affinity thermoplastic elastomer as necessary, the additives, and the like, which are described above, may be mixed so as to obtain the above amount ratio, and kneaded.

The mixing and kneading of the respective components can be carried out using a LABOPLASTOMILL 50MR biaxial extruder manufactured by Toyo Seiki Seisaku-sho, Ltd.

Finely ground vulcanized rubber may be injected into the biaxial extruder, or the rubber may be vulcanized while kneading a vulcanizing agent and the like with the rubber using a Banbury or the like, and then kneading with the thermoplastic elastomer in the biaxial extruder. The rubber is preferably vulcanized while kneading the rubber with the thermoplastic elastomer in the biaxial extruder.

—The Characteristics of the Thermoplastic Resin Material—

The tensile modulus of elasticity, which is defined in JIS K7113:1995, of the thermoplastic resin material according to the thirteenth aspect of the invention is preferably 100 MPa to 1000 MPa, more preferably 100 MPa to 800 MPa, and particularly preferably 100 MPa to 700 MPa. When the tensile modulus of elasticity of the thermoplastic resin material is 100 MPa to 1000 MPa, fitting onto a rim can be efficiently carried out while holding the shape of the tire frame.

The tensile yield strength, which is defined in JIS K7113: 1995, of the thermoplastic resin material according to the thirteenth aspect of the invention is preferably 5 MPa or more, preferably 5 MPa to 20 MPa, and still more preferably 5 MPa to 17 MPa. When the tensile yield strength of the thermoplastic resin material is 5 MPa or more, it is possible to withstand deformation caused by a load applied to the tire at the time of driving or the like.

The tensile yield elongation, which is defined in JIS K7113:1995, of the thermoplastic resin material according to the thirteenth aspect of the invention is preferably 10% or more, preferably 10% to 70%, and still more preferably 15% to 60%. When the tensile yield elongation of the thermoplastic resin material is 10% or more, it is possible to increase the elastic region and improve the fittability onto a rim.

The tensile elongation at break, which is defined in JIS K7113:1995, of the thermoplastic resin material according to the thirteenth aspect of the invention is preferably 50% or more, preferably 100% or more, still more preferably 150% or more, and particularly preferably 200% or more. When the tensile elongation at break of the resin material is 50% or more, it is possible to improve the fittability onto a rim and avoid fracture due to collision.

The deflection temperature under load (under a load of 0.45 MPa), which is defined in ISO75-2 or ASTM D648, of the thermoplastic resin material according to the thirteenth aspect of the invention is preferably 50° C. or more, preferably 50° C. to 150° C., and still more preferably 50° C. to 130° C. When the deflection temperature under load of the thermoplastic resin material is 50° C. or more, it is possible to suppress deformation of a tire frame even when vulcanization is carried out in the production of a tire.

[The Resin Material as a Component of the Reinforcing Cord Layer]

The tire of the thirteenth aspect of the invention may have the reinforcing cord member which is wound around the outer circumference of the tire frame in the circumferential direction so as to form the reinforcing cord layer.

The "resin material as a component of the reinforcing cord layer" according to the thirteenth aspect of the invention is the same as the [resin material as a component of the reinforcing cord layer] according to the first aspect of the invention.

Embodiment 13-1

Hereinafter, a tire according to Embodiment 13-1 of the tire of the thirteenth aspect of the invention will be described according to the drawings.

Here, the tire according to Embodiment 13-1 is the same as the above Embodiment 13 except for the following points. Therefore, the same reference numerals and drawings will be used in the description regarding the same drawings and members.

The tire case 17 of the present embodiment is formed of a thermoplastic resin material including a polyamide-based thermoplastic elastomer ("UBESTA XPA9055X1" manufactured by Ube Industries, Ltd.) and butadiene rubber (BR) at a mass ratio of 70:30. In the present embodiment, the tire case 17 is formed of the thermoplastic resin material according to the thirteenth aspect of the invention alone, but the thirteenth aspect of the invention is not limited to this configuration, and, similarly to an ordinary pneumatic rubber tire of the related art, other thermoplastic resin materials having different characteristics may be used in the respective portions (the side portions 14, the crown portion 16, the bead portions 12, and the like) of the tire case 17. Other points are the same as in the tire according to the above Embodiment 13, and the manufacturing method is also the same.

(Effects)

In the tire 10 of the present embodiment, since the tire case 17 is formed of the thermoplastic resin material including a polyamide-based thermoplastic elastomer ("UBESTA XPA9055X1" manufactured by Ube Industries, Ltd.) and butadiene rubber (BR) at a mass ratio of 70:30, the impact resistance, tensile modulus of elasticity and tensile strength are excellent. Therefore, the tire 10 of the present embodiment is excellent in terms of durability. Furthermore, since the weight is light compared to rubber of the related art, it is possible to decrease the tan δ. Therefore, since the weight of the tire 10 of the present embodiment can be decreased, and the rolling resistance is also suppressed, it is possible to improve the fuel consumption of an automobile in which the tire is used.

In addition, the polyamide-based thermoplastic elastomer, which is one of the components of the thermoplastic resin material, has high adhesion properties to the reinforcing cord 26, and, furthermore, is excellent in terms of fixing performances, such as weld strength. Therefore, it is possible to suppress the phenomenon in which air remains around the reinforcing cord 26 in the reinforcing cord winding process (incorporation of air). When the adhesion properties and weldability to the reinforcing cord 26 are high, and, furthermore, incorporation of air into the periphery of the reinforcing cord member is suppressed, it is possible to effectively suppress the movement of the reinforcing cord 26 caused by a force applied thereto at the time of driving or the like. Thereby, for example, even when a tire-constituting member has been provided so as to cover the entirety of the reinforcing cord member on the outer circumference of the tire frame, since the movement of the reinforcing cord member is suppressed, the separation or the like of the members (including the tire frame) is suppressed, and the durability of the tire 10 is improved.

In addition, in the tire 10 of the present embodiment, since the reinforcing cord 26 having a higher stiffness than the thermoplastic resin material is helically wound in the circumferential direction on the outer circumferential surface of the crown portion 16 in the tire case 17 formed of the thermoplastic resin material, the puncture resistance, the cutting resistance and the stiffness of the tire 10 in the circumferential direction are improved. Meanwhile, the improvement of the stiffness of the tire 10 in the circumferential direction prevents the creeping in the tire case 17 formed of the thermoplastic resin material.

In addition, in the cross-sectional view of the tire case 17 along the axial direction (the cross section illustrated in FIG. 1), since at least a portion of the reinforcing cord 26 is embedded in the outer circumferential surface of the crown portion 16 in the tire case 17 formed of the thermoplastic resin material, and is adhered to the thermoplastic resin material, incorporation of air during manufacturing is suppressed, and the movement of the reinforcing cord 26 caused by a force applied thereto at the time of driving or the like is suppressed. Thereby, the separation or the like of the reinforcing cord 26, the tire case 17 and the tread 30 is suppressed, and the durability of the tire 10 is improved.

In addition, since the depth L of embedding of the reinforcing cord 26 is ⅕ or more of the diameter D as illustrated in FIG. 2, incorporation of air during manufacturing is effectively suppressed, and the movement of the reinforcing cord 26 caused by a force applied thereto at the time of driving or the like is further suppressed.

When the reinforcing cord layer 28 is configured to include the thermoplastic resin material as described above, since it is possible to decrease the difference in hardness between the tire case 17 and the reinforcing cord layer 28 compared to the case when the reinforcing cord 26 is fixed using cushion rubber, the reinforcing cord 26 can be further adhered and fixed to the tire case 17. Thereby, the above incorporation of air can be effectively prevented, and it is possible to effectively suppress the movement of the reinforcing cord member at the time of driving.

Furthermore, when the reinforcing cord member is a steel cord, since the reinforcing cord 26 can be easily separated and collected from the thermoplastic resin material through heating when disposing of the tire, it is advantageous in terms of the recycling properties of the tire 10. In addition, the resin material generally has a low loss factor (Tan δ) compared to vulcanized rubber. Therefore, when the reinforcing cord layer includes a large amount of the resin material, it is possible to improve the rolling properties of the tire. Furthermore, the resin material having a relatively high elastic modulus compared to vulcanized rubber is advantageous in that the in-plane shear stiffness is large, and steering stability and abrasion resistance during driving with the tire are also excellent.

In addition, since the tread 30 that comes into contact with road surfaces is made of a rubber material that is more abrasion-resistant than the thermoplastic resin material, the abrasion resistance of the tire 10 is improved.

Furthermore, since an annular bead core 18 made of a metallic material is embedded in the bead portion 12, the tire case 17, that is, the tire 10 is strongly held to the rim 20 similarly to a pneumatic rubber tire of the related art.

In addition, furthermore, since the sealing layer 24 made of a rubber material having higher sealing properties than the thermoplastic resin material is provided in a portion, which comes into contact with the rim 20, of the bead portion 12, the sealing properties between the tire 10 and the rim 20 are improved. Therefore, compared to the case when sealing is carried out between the rim 20 and the thermoplastic resin material, the air leakage from the tire is further suppressed. In addition, the rim fitting properties are also improved when the sealing layer 24 is provided.

The above embodiment employs a configuration in which the reinforcing cord 26 is heated, and the thermoplastic resin material in the portion with which the heated reinforcing cord 26 comes into contact is melted or softened, but the thirteenth aspect of the invention is not limited to this configuration, and the reinforcing cord 26 may be embedded in the crown portion 16 after heating the outer circumferential surface of the crown portion 16, in which the reinforcing cord 26 is to be embedded, using a hot air generating apparatus without heating the reinforcing cord 26.

In addition, in Embodiment 13-1, a heater and a fan are used as the heat source of a cord heating device 59, but the thirteenth aspect of the invention is not limited to this configuration, and a configuration in which the reinforcing cord 26 is directly heated using radiation heat (for example, infrared rays or the like) may be employed.

Furthermore, Embodiment 13-1 employs a configuration in which the portion, in which the thermoplastic resin material having the reinforcing cord 26 embedded therein is melted or softened, is forcibly cooled using the second metal roller 64, but the thirteenth aspect of the invention is not limited to this configuration, and a configuration in which the portion, in which the thermoplastic resin material is melted or softened, is forcibly cooled and solidified by directly blowing cold air to the portion in which the thermoplastic resin material is melted or softened may be employed.

In addition, Embodiment 13-1 employs a configuration in which the reinforcing cord 26 is heated; however, for example, a configuration in which the outer circumference of the reinforcing cord 26 is coated with the same thermoplastic resin material as the tire case 17 may be employed, and, in this case, it is possible to effectively suppress incorporation of air during embedding in the crown portion 16 by heating the reinforcing cord 26 and the coating of the thermoplastic resin material when winding the coated reinforcing cord around the crown portion 16 of the tire case 17.

In addition, the helical winding of the reinforcing cord 26 is easy in the manufacturing, but a method, in which the reinforcing cord 26 is formed to be discontinuous in the width direction, or the like can be also considered.

The tire 10 of Embodiment 13-1 is a so-called tubeless tire in which an air chamber is formed between the tire 10 and the rim 20 by mounting the bead portion 12 on the rim 20, but the thirteenth aspect of the invention is not limited to this configuration, and the tire may have a complete tube shape.

Thus far, an embodiment of the thirteenth aspect of the invention has been described using the embodiment, but the embodiment is simply an example, and the invention can be carried out with a variety of modifications within the scope of the purport. In addition, it is needless to say that the scope of right of the thirteenth aspect of the invention is not limited to the above embodiment.

Embodiment 13-2

Next, the tire and the method of manufacturing the tire of the thirteenth aspect of the invention according to Embodiment 13-2 will be described according to the drawings. Similarly to the above Embodiment 13-1, the tire of the present embodiment exhibits substantially the same cross-sectional shape as an ordinary pneumatic rubber tire of the related art. Here, the tire according to Embodiment 13-2 is the same as the above Embodiment 13 except for the following points. Therefore, the same reference numerals and drawings will be used in the description regarding the same drawings and members.

In the tire of Embodiment 13-2, similarly to the above Embodiment 13-1, the tire case 17 is formed of a thermoplastic resin material including a polyamide-based thermoplastic elastomer ("UBESTA XPA9055X1" manufactured by Ube Industries, Ltd.) and butadiene rubber (BR) at a mass ratio of 70:30. Other points are the same as in the tire according to the above Embodiment 13, and the manufacturing method is also the same.

In addition, the elastic modulus of a resin material for coating 27 is preferably set in a range of 0.1 times to 10 times the elastic modulus of a resin material that forms the tire case 17. When the elastic modulus of the resin material for coating 27 is 10 times or less the elastic modulus of the thermoplastic resin material that forms the tire case 17, the crown portion does not become too hard, and fitting onto a rim can be easily carried out. In addition, when the elastic modulus of the resin material for coating 27 is 0.1 times or more the elastic modulus of the thermoplastic resin material that forms the tire case 17, the resin that constitutes the reinforcing cord layer 28 does not become too soft, and the belt in-plane shear stiffness is excellent and the cornering force is improved. Meanwhile, in the present embodiment, as the resin material for coating 27, the same material as the thermoplastic resin material (in the present embodiment, a thermoplastic resin material including a polyamide-based thermoplastic elastomer ("UBESTA XPA9055X1" manufactured by Ube Industries, Ltd.) and butadiene rubber (BR) at a mass ratio of 70:30) is used.

(Effects)

In the tire 200 of the present embodiment, since the tire case 17 is formed of the thermoplastic resin material including the polyamide-based thermoplastic elastomer and the rubber at a mass ratio of 70:30, the impact resistance is excellent, and, furthermore, the tensile modulus of elasticity and tensile strength are also excellent. Therefore, the tire 10 of the present embodiment is excellent in terms of durability. Furthermore, since the weight is light compared to rubber of the related art, it is possible to decrease the tan δ. Therefore, since the weight of the tire 200 of the present embodiment can be decreased, and the rolling resistance is also suppressed, it is possible to improve the fuel consumption of an automobile in which the tire is used.

In addition, when the reinforcing cord layer 28 is configured to include the coated cord member 26B, since it is possible to decrease the difference in hardness between the tire case 17 and the reinforcing cord layer 28 compared to the case when the reinforcing cord 26A is simply fixed using cushion rubber 29, the coated cord member 26B can be further adhered and fixed to the tire case 17. Thereby, the above incorporation of air can be effectively prevented, and it is possible to effectively suppress the movement of the reinforcing cord member at the time of driving.

Furthermore, when the reinforcing cord member is a steel cord, since the cord member 26A can be easily separated and collected from the coated cord member 26B through heating when disposing of the tire, it is advantageous in terms of the recycling properties of the tire 200. In addition, the resin material generally has a low loss factor (Tan δ) compared to vulcanized rubber. Therefore, when the reinforcing cord layer includes a large amount of the resin material, it is possible to improve the rolling properties of the tire. Furthermore, the resin material having a relatively high elastic modulus compared to vulcanized rubber is advantageous in that the in-plane shear stiffness is large, and steering stability and abrasion resistance during driving with the tire are also excellent.

In the method of manufacturing the tire of the present embodiment, when the tire case 17, the cushion rubber 29 and a tread rubber 30A are integrated, since the outer circumferential surface 17S of the tire case 17 has been subjected to a roughening treatment, the bonding properties (adhesion properties) are improved due to the anchor effect. In addition, since the resin material that forms the tire case 17 is dug up by the collision of a blasting abrasive, the wettability of a bonding agent is improved. Thereby, a state in which the bonding agent is uniformly coated on the outer circumferential surface 17S of the tire case 17 is held, and the bonding strength between the tire case 17 and the cushion rubber 29 can be ensured.

Particularly, even when protrusions and recesses are formed on the outer circumferential surface 17S of the tire case 17, the peripheries of the recess portions (recess walls and recess bottoms) are subjected to a roughening treatment by making the blasting abrasive collide with the recess portions (voids 28A), and the bonding strength between the tire case 17 and the cushion rubber 29 can be ensured.

Meanwhile, since the cushion rubber 29 is laminated in the roughening-treated areas on the outer circumferential surface 17S of the tire case 17, the bonding strength between the tire case 17 and the cushion rubber can be effectively ensured.

When the cushion rubber 29 has been vulcanized in a vulcanizing process, the cushion rubber 29 flows into the roughened recesses and protrusions formed on the outer circumferential surface 17S of the tire case 17 through the roughening treatment. In addition, when vulcanization is completed, the anchor effect is developed due to the cushion rubber 29 that has flowed into the roughened recesses and protrusions so that the bonding strength between the tire case 17 and the cushion rubber 29 is improved.

The tire 200 manufactured using the above method of manufacturing a tire ensures the bonding strength between the tire case 17 and the cushion rubber 29, that is, ensures the bonding strength between the tire case 17 and the tread 30 through the cushion rubber 29. Thereby, the separation between the outer circumferential surface 17S of the tire case 17 of the tire 200 and the cushion rubber 29 is suppressed at the time of driving or the like.

In addition, since the outer circumference of the tire case 17 is made of the reinforcing cord layer 28, the puncture resistance and the cutting resistance are improved compared to a case in which the outer circumference is made of something other than the reinforcing cord layer 28.

In addition, since the reinforcing cord layer 28 is formed by winding the coated cord member 26B, the stiffness of the tire 200 in the circumferential direction is improved. The improvement of the stiffness in the circumferential direction suppresses creeping (a phenomenon in which the plastic deformation of the tire case 17 increases over time under a constant stress) in the tire case 17, and the pressure resistance with respect to the air pressure from the inside in the tire radial direction is improved.

In the present embodiment, the recesses and protrusions are formed on the outer circumferential surface 17S of the tire case 17, but the thirteenth aspect of the invention is not limited thereto, and a configuration in which the outer circumferential surface 17S is formed to be flat may be employed.

In addition, in the tire case 17, the reinforcing cord layer may be formed by covering the coated cord member, which is wound around and bonded to the crown portion of the tire case, with a thermoplastic material for coating. In this case, a coating layer can be formed by discharging a thermoplastic material for coating in a molten or softened state on the reinforcing cord layer 28. In addition, the coating layer may be formed by heating a welding sheet into a molten or softened state without using an extruder, and attaching the welding sheet to the surface (outer circumferential surface) of the reinforcing cord layer 28.

The above Embodiment 13-2 employs a configuration in which case divided parts (tire case half parts 17A) are bonded so as to form the tire case 17, but the thirteenth aspect of the invention is not limited thereto, and the tire case 17 may be integrally formed using a mold or the like.

The tire 200 of Embodiment 13-2 is a so-called tubeless tire in which an air chamber is formed between the tire 200 and the rim 20 by mounting the bead portion 12 on the rim 20, but the thirteenth aspect of the invention is not limited to this configuration, and the tire 200 may have, for example, a complete tube shape.

In Embodiment 13-2, the cushion rubber 29 is disposed between the tire case 17 and the tread 30, but the thirteenth aspect of the invention is not limited thereto, and a configuration in which the cushion rubber 29 is not disposed may be employed.

In addition, Embodiment 13-2 employs a configuration in which the coated cord member 26B is helically wound around the crown portion 16, but the thirteenth aspect of the invention is not limited thereto, and a configuration in which the coated cord member 26B is wound to be discontinuous in the width direction may be employed.

Embodiment 13-2 employs a configuration in which a thermoplastic material is used as the resin material for coating 27 that forms the coated cord member 26B, and the resin material for coating 27 is heated into a molten or softened state so as to weld the coated cord member 26B on the outer circumferential surface of the crown portion 16, but the thirteenth aspect of the invention is not limited to this configuration, and a configuration in which the coated cord member 26B is adhered to the outer circumferential surface of the crown portion 16 using an adhesive or the like without heating the resin material for coating 27 may be employed.

In addition, a configuration in which a thermosetting resin is used as the resin material for coating 27 that forms the coated cord member 26B, and the coated cord member 26B is adhered to the outer circumferential surface of the crown portion 16 using an adhesive or the like without heating may be employed.

Furthermore, a configuration in which a thermosetting resin is used as the resin material for coating 27 that forms the coated cord member 26B, and the tire case 17 is formed of a thermoplastic resin material may be employed. In this case, the coated cord member 26B may be adhered to the outer circumferential surface of the crown portion 16 using an adhesive or the like, or the coated cord member 26B may be welded on the outer circumferential surface of the crown portion 16 by heating the portion, which is to be provided with the coated cord member 26B, of the tire case 17 into a molten or softened state.

In addition, furthermore, a configuration in which a thermoplastic material is used as the resin material for coating 27 that forms the coated cord member 26B, and the tire case 17 is formed of a thermoplastic resin material may be employed. In this case, the coated cord member 26B may be adhered to the outer circumferential surface of the crown portion 16 using an adhesive or the like, or the coated cord member 26B may be welded on the outer circumferential surface of the crown portion 16 by heating the portion, which is to be provided with the coated cord member 26B, of the tire case 17 into a molten or softened state, and heating the resin material for coating 27 into a molten or softened state. Meanwhile, when both the tire case 17 and the coated cord member 26B have been heated into a molten or softened state, since both are well mixed, the bonding strength is improved. In addition, when thermoplastic resin materials are used as both the resin material that forms the tire case 17 and the resin material for coating 27 that forms the coated cord member 26B, the thermoplastic resin materials are preferably the same kind of thermoplastic materials, particularly, the same thermoplastic material.

In addition, furthermore, an adhesive may be coated on the outer circumferential surface 17S of the tire case 17, after the surface of the outer circumferential surface 17S, on which the roughening treatment has been carried out, is activated using a corona treatment, a plasma treatment or the like so as to increase the hydrophilicity.

In addition, furthermore, the order for manufacturing the tire 200 is not limited to the order in Embodiment 13-2, and may be appropriately changed.

Thus far, an embodiment of the thirteenth aspect of the invention has been described using the embodiment, but the embodiment is simply an example, and the invention can be carried out with a variety of modifications within the scope of the purport. In addition, it is needless to say that the scope of right of the thirteenth aspect of the invention is not limited to the above embodiment.

Thus far, the specific embodiments according to the thirteenth aspect of the invention have been described using Embodiment 13-1 and Embodiment 13-2, but the thirteenth aspect of the invention is not limited to the above embodiments.

The tire of the first aspect of the invention may be configured as follows: as described in Embodiment 1-1.

(1-1-1) The tire of the first aspect of the invention may be configured so that at least a part of the reinforcing cord member is embedded in the outer circumference of the tire frame formed of the thermoplastic resin material in the cross-sectional view along the axial direction of the tire frame.

When a part of the reinforcing cord member is embedded in the outer circumference of the tire frame as such, a phenomenon in which air remains in the area around the cord during winding of the reinforcing cord member (incorporation of air) may further be suppressed. When incorporation of air into the area around the reinforcing cord member is suppressed, movement of the reinforcing cord member due to, for example, a force applied during running is suppressed. Accordingly, for example, in the case where the tire-constituting member is provided on the outer circumference of the tire frame to cover the entire reinforcing cord member, since the movement of the reinforcing cord member is suppressed, an occurrence of peeling and the like between the members (including the tire frame) is suppressed. Accordingly, durability is enhanced.

(1-1-2) The tire of the first aspect of the invention may be provided with a tread formed of a material having higher wear resistance than the thermoplastic resin material on the outer side in the radial direction of the reinforcing cord layer.

By having a configuration in which the tread that comes into contact with the road surface is formed of the material having higher wear resistance than the thermoplastic resin material as such, the wear resistance of the tire may further be enhanced.

(1-1-3) In the tire of the first aspect of the invention, ⅕ or more of the diameter of the reinforcing cord member may be embedded in the outer circumference of the tire frame along the circumferential direction in the cross-sectional view along the axial direction of the tire frame.

When ⅕ or more of the diameter of the reinforcing cord member is embedded in the outer circumference of the tire frame in the cross-sectional view along the axial direction of the tire frame, incorporation of air into the area around the reinforcing cord member may be effectively suppressed, and thus movement of the reinforcing cord member due to, for example, a force applied during running may further be suppressed.

(1-1-4) The tire of the first aspect of the invention may be configured so that the tire frame includes, on the inner side in the radial direction, a bead portion that comes into contact with a bead seat and a rim flange of a rim, and an annular bead core formed of a metal material is embedded in the bead portion.

By providing the bead portion which is a part for fitting onto the rim in the tire frame, and moreover, by embedding the annular bead core made of the metal material in the bead portion as such, the tire frame (that is, tire) may be firmly held on the rim, similarly to conventional pneumatic tires made of rubber.

(1-1-5) The tire of the first aspect of the invention may be provided with a sealing portion made of a material having higher sealing properties (adhesion to the rim) than the thermoplastic resin material, in a part where the bead portion comes into contact with the rim.

By providing the seal portion made of the material having higher sealing properties than the thermoplastic resin material in the part where the tire frame and the rim come into contact with each other as such, adhesion between the tire (the tire frame) and the rim may be enhanced. Accordingly, compared to a case where only the rim and the thermoplastic resin material are used, leakage of air in the tire may further be suppressed. In addition, by providing the sealing portion, fitting onto the rim of the tire may be enhanced.

(1-1-6) The tire of the first aspect of the invention may be manufactured according to the manufacturing method that includes: a tire frame piece forming step of forming a tire frame piece for constituting a portion of the circular tire frame, using a thermoplastic resin material including at least a polyamide-based thermoplastic elastomer; a tire frame piece bonding step of forming the tire frame by fusing two or more of the tire frame pieces, which make a pair, by applying heat to the bonding surfaces of the tire frame pieces; and a reinforcing cord member winding step of winding the reinforcing cord member around the outer circumference of the tire frame in the circumferential direction to form a reinforcing cord layer.

In the manufacturing method, the tire frame pieces of the circular tire frame may be formed of the thermoplastic resin material including the polyamide-based thermoplastic elastomer. The melting point of the polyamide-based thermoplastic elastomer may be set to about 100° C. to 250° C., and thus the fusing step of the tire frame pieces needs not to be performed at, for example, a temperature equal to or higher than 300° C. and the fusing step may be performed at a relatively low temperature. Since the fusing step is able to be performed at the relatively low temperature as such, productivity of the tire may be enhanced in terms of energy utilization rate and the like. In addition, when the tire frame pieces in which the polyamide-based thermoplastic elastomer is used are fused to form the tire frame, the bonding strength between the tire frame pieces is sufficient, and the performance of the frame itself is not deteriorated due to the temperature during fusing. Therefore, durability at the time of driving such as puncture resistance and wear resistance of the manufactured tire may be enhanced.

(1-1-7) The manufacturing method of the tire may be configured so that, in the tire frame piece bonding step, the bonding surface of the tire frame piece is heated to a temperature equal to or higher than the melting point (for example, the melting point +10° C. to +150° C.) of the thermoplastic resin material that forms the tire frame piece.

When the bonding surface of the divided body is heated to a temperature equal to or higher than the melting point of the thermoplastic resin material that forms the tire frame piece as such, fusing between the tire frame pieces may be sufficiently performed. Therefore, productivity of the tire may be enhanced while enhancing durability of the tire.

(1-1-8) The manufacturing method of the tire may be configured so that, in the reinforcing cord member winding step, the reinforcing cord member is wound around the outer circumference of the tire frame in a manner such that at least a part of the reinforcing cord member is embedded while melting or softening the outer circumference of the tire frame formed in the tire frame piece bonding step.

By winding the reinforcing cord member around the outer circumference in a manner such that at least a part of the reinforcing cord member is embedded in the outer circumference of the tire frame while melting or softening the outer circumference of the tire frame as such, the at least a part of the reinforcing cord member which is embedded and the melted or softened thermoplastic resin material may be welded. Accordingly, incorporation of air between the outer circumference of the tire frame and the reinforcing cord member in the cross-sectional view along the axial direction of the tire frame may further be suppressed. In addition, when the part in which the reinforcing cord member is embedded is cooled and solidified, the fixed condition of the reinforcing cord member embedded in the tire frame is enhanced.

(1-1-9) The manufacturing method of the tire may be configured so that, in the reinforcing cord member winding step, ⅕ or more of the diameter of the reinforcing cord may be embedded in the outer circumference of the tire frame in the cross-sectional view along the axial direction of the tire frame.

When ⅕ or more of the diameter of the reinforcing cord member is embedded in the outer circumference of the tire frame in the cross-sectional view along the axial direction of the tire frame, incorporation of air into the area around the reinforcing cord during manufacturing may be effectively suppressed, and moreover, the embedded reinforcing cord member may become less likely to be caused to come out of the tire frame.

(1-1-10) The manufacturing method of the tire may be configured so that, in the reinforcing cord member winding step, the heated reinforcing cord member is embedded in the tire frame.

By embedding the reinforcing cord member in the tire frame while heating the reinforcing cord member in the reinforcing cord winding step as such, when the heated reinforcing cord member comes into contact with the outer circumference of the tire frame, the contact part is melted or softened. Therefore, it becomes easy to embed the reinforcing cord member in the outer circumference of the tire frame.

(1-1-11) The manufacturing method of the tire may be configured so that, in the cord member winding step, the part of the outer circumference of the tire frame for embedding the reinforcing cord member is heated.

By heating the part of the outer circumference of the tire frame for embedding the reinforcing cord member as such, the heated part of the tire frame is melted or softened. Therefore, it becomes easy to embed the reinforcing cord member.

(1-1-12) The manufacturing method of the tire may be configured so that, in the cord member winding step, the reinforcing cord member is wound in a spiral shape in the circumferential direction of the outer circumference of the tire frame while pressing the reinforcing cord member against the outer circumference of the tire frame.

When the reinforcing cord member is wound in the spiral shape while pressing the reinforcing cord member against the outer circumference of the tire frame as such, the depth of embedding the reinforcing cord member in the outer circumference of the tire frame may be adjusted.

(1-1-13) The manufacturing method may be configured so that, in the cord member winding step, after winding the reinforcing cord member around the tire frame, the melted or softened part of the outer circumference of the tire frame is cooled.

By forcibly cooling the melted or softened part of the outer circumference of the tire frame after embedding the reinforcing cord member as such, the melted or softened part of the outer circumference of the tire frame may be more quickly and rapidly cooled and solidified than natural cooling. By cooling the outer circumference of the tire more quickly than natural cooling, deformation of the outer circumference of the tire frame may be suppressed, and movement of the reinforcing cord member may be suppressed.

The tire of the first aspect of the invention may be configured as follows as described in Embodiment 1-2.

(1-2-1) The tire of the first aspect of the invention may be configured such that the manufacturing method further includes: the roughening treatment step of performing the roughening treatment on the outer circumferential surface of the tire frame by allowing a particle-shaped blasting abrasive to collide with the outer circumferential surface of the tire frame; and a superposing step of superposing a tire-constituting rubber member on the outer circumferential surface which has been subjected to the roughening treatment, via a bonding agent.

When the roughening treatment step is provided as such, the particle-shaped blasting abrasive collides with the outer circumferential surface of the circular tire frame formed using the thermoplastic resin material that includes the polyamide-based thermoplastic elastomer, and thus minute roughened unevenness is formed on the outer circumferential surface. The treatment of forming minute roughened unevenness by allowing the blasting abrasive to collide with the outer circumferential surface of the tire frame is referred to as a roughening treatment. Thereafter, the tire-constituting rubber member is superposed on the outer circumferential surface which has been subjected to the roughening treatment, via the bonding agent. Here, when the tire frame and the tire-constituting rubber member are integrated into each other, since the outer circumferential surface of the tire frame has been subjected to the roughening treatment, bonding properties (adhesiveness) are enhanced due to the anchor effect. In addition, since the resin material that forms the tire frame is ploughed due to collision of the blasting abrasive, wettability of the outer circumferential surface is enhanced. Accordingly, the outer circumferential surface of the tire frame is held in a state of being uniformly coated with the bonding agent, and thus the bonding strength between the tire frame and the tire-constituting rubber member may be ensured.

(1-2-2) In the tire of the first aspect of the invention, at least a part of the outer circumferential surface of the tire frame may be an uneven portion, and the uneven portion may be subjected to the roughening treatment in the roughening treatment step.

Even if at least a part of the outer circumferential surface of the tire frame is the uneven portion as such, by allowing the blasting abrasive to collide with the uneven portion, the area around a recess (walls at the recess, the bottom of the recess) is subjected to the roughening treatment, and thus the bonding strength between the tire frame and the tire-constituting rubber member may be ensured.

(1-2-3) The tire of the first aspect of the invention may be configured such that the outer circumference of the tire frame is configured to have a reinforcing layer that constitutes the uneven portion at the outer circumferential surface, and the reinforcing layer may be configured such that a coated cord member formed by coating the reinforcing cord with a resin material of the same kind as or different from the resin material for forming a tire frame is wound in the circumferential direction of the tire frame.

By configuring the outer circumference of the tire frame to have the reinforcing layer formed by winding the coated cord member in the circumferential direction of the tire frame as such, the rigidity of the tire frame in the circumferential direction may be enhanced.

(1-2-4) In the tire of the first aspect of the invention, a thermoplastic resin material may be used as the resin material that is a component of the coated cord member.

By using a thermoplastic material having thermoplasticity as the resin material that is a component of the coated cord member as such, compared to a case of using a thermosetting material as the resin material, the tire is easily manufactured and is easily recycled.

(1-2-5) The tire of the first aspect of the present invention may be configured so that, in the roughening treatment step, an area wider than the area for superposing the tire-constituting rubber member is subjected to the roughening treatment.

When the area wider than the area for superposing the tire-constituting rubber member is subjected to the roughening treatment in the roughening treatment step, the bonding strength between the tire frame and the tire-constituting rubber member may be reliably ensured.

(1-2-6) The tire of the first aspect of the invention may be configured so that, in the roughening treatment step, the outer circumferential surface is subjected to the roughening treatment to have an arithmetic mean roughness Ra of 0.05 mm or greater.

When the outer circumferential surface of the tire frame is subjected to the roughening treatment to have an arithmetic mean roughness Ra of 0.05 mm or greater in the roughening treatment step as such, in a case where, for example, an unvulcanized or semi-vulcanized tire-constituting rubber member is superposed on the outer circumferential surface which has been subjected to the roughening treatment, via the bonding agent, and is vulcanized, rubber of the tire-constituting rubber member may be caused to flow to the bottom of the roughened uneven portion formed by the roughening treatment. When the rubber of the tire-constituting rubber member flows to the bottom of the roughened uneven portion, a sufficient anchor effect is exhibited between the outer circumferential surface and the tire-constituting rubber member, and the bonding strength between the tire frame and the tire-constituting rubber member may be enhanced.

(1-2-7) In the tire of the first aspect of the invention, rubber in the unvulcanized or semi-vulcanized state may be used as the tire-constituting rubber member.

In the case where the rubber in the unvulcanized or semi-vulcanized state is used as the tire-constituting rubber member as such, the rubber flows to the roughened uneven portion formed on the outer circumferential surface of the tire frame by the roughening treatment when the tire-constituting rubber member is vulcanized. In addition, when vulcanization is completed, the anchor effect is exhibited by the (vulcanized) rubber that has flowed to the roughened uneven portion, and thus the bonding strength between the tire frame and the tire-constituting rubber member may be enhanced.

"Vulcanized" is referred to as a state in which the degree of vulcanization has reached the degree needed for a final product, and the "semi-vulcanized state" is referred to as a state in which the degree of vulcanization is higher than that of the unvulcanized state but has not reached the degree needed for a final product.

(1-2-8) The tire of the first aspect of the invention may be configured to include: a circular tire frame that is formed using the thermoplastic resin material including a polyamide-based thermoplastic elastomer and has the outer circumferential surface subjected to the roughening treatment by allowing a particle-shaped blasting abrasive to collide with the outer circumferential surface; and a tire-constituting rubber member superposed on the outer circumferential surface which has been subjected to the roughening treatment, via a bonding agent.

When the circular tire frame which has been subjected to the roughening treatment is used as such, the bonding strength between the tire frame and the tire-constituting rubber member may be enhanced by the anchor effect. In addition, since the outer circumferential surface has been subjected to the roughening treatment, excellent wettability of the bonding agent is provided. Accordingly, the bonding agent is held in the state of being uniformly applied onto the outer circumferential surface of the tire frame, the bonding strength between the tire frame and the tire-constituting rubber member is ensured, and thus peeling between the tire frame and the tire-constituting rubber member may be suppressed.

The tire of the second aspect of the invention may be configured as follows as described in Embodiment 2-1.

(2-1-1) The tire of the second aspect of the invention may be configured so that at least a part of the reinforcing cord member is embedded in the outer circumference of the tire frame formed of the thermoplastic resin material in the cross-sectional view along the axial direction of the tire frame.

When a part of the reinforcing cord member is embedded in the outer circumference of the tire frame as such, a phenomenon in which air remains in the portion around the cord during winding of the reinforcing cord member (incorporation of air) may further be suppressed. When incorporation of air into the area around the reinforcing cord member is suppressed, movement of the reinforcing cord member due to, for example, a force applied during running is suppressed. Accordingly, for example, in the case where the tire-constituting member is provided on the outer circumference of the tire frame to cover the entire reinforcing cord member, since the movement of the reinforcing cord member is suppressed, an occurrence of peeling and the like between the members (including the tire frame) is suppressed, and durability is enhanced.

(2-1-2) The tire of the second aspect of the invention may be provided with a tread formed of a material having higher wear resistance than the thermoplastic resin material on the outer side in the radial direction of the reinforcing cord layer.

By having a configuration in which the tread that comes into contact with the road surface is formed of the material having higher wear resistance than the thermoplastic resin material as such, the wear resistance of the tire may further be enhanced.

(2-1-3) In the tire of the second aspect of the invention, ⅕ or more of the diameter of the reinforcing cord member may be embedded in the outer circumference of the tire frame along the circumferential direction in the cross-sectional view along the axial direction of the tire frame.

When ⅕ or more of the diameter of the reinforcing cord member is embedded in the outer circumference of the tire frame in the cross-sectional view along the axial direction of the tire frame, incorporation of air into the area around the reinforcing cord member may be effectively suppressed, and thus movement of the reinforcing cord member due to, for example, a force applied during running may further be suppressed.

(2-1-4) The tire of the second aspect of the invention may be configured so that the tire frame includes, on the inner side in the radial direction, a bead portion that comes into contact with a bead seat and a rim flange of a rim, and an annular bead core formed of a metal material is embedded in the bead portion.

By providing the bead portion which is a part for fitting onto the rim in the tire frame, and moreover, by embedding the annular bead core formed of the metal material in the bead portion as such, the tire frame (that is, tire) may be firmly held on the rim, similarly to conventional pneumatic tires made of rubber.

(2-1-5) The tire of the second aspect of the invention may be provided with a sealing portion made of a material having higher sealing properties (adhesion to the rim) than the thermoplastic resin material, in a part where the bead portion comes into contact with the rim.

By providing the sealing portion made of the material having higher sealing properties than the thermoplastic resin material in the part where the tire frame and the rim come into contact with each other as such, adhesion between the tire (the tire frame) and the rim may be enhanced. Accordingly, compared to a case where only the rim and the thermoplastic resin material are used, leakage of air in the tire may further be suppressed. In addition, by providing the sealing portion, fittability onto the rim of the tire may be enhanced.

(2-1-6) The tire of the second aspect of the invention may be manufactured according to a manufacturing method that includes: a tire frame piece forming step of forming a tire frame piece for constituting a part of a circular tire frame, using a thermoplastic resin material including at least a polyamide-based thermoplastic elastomer and another elastomer; the tire frame piece bonding step of forming the tire frame by fusing two or more tire frame pieces, which form a pair by applying heat to the bonding surfaces of the tire frame pieces; and a reinforcing cord member winding step of winding a reinforcing cord member around the outer circumference of the tire frame in the circumferential direction to form a reinforcing cord layer.

In the manufacturing method, the tire frame pieces of the circular tire frame may be formed of the thermoplastic resin material including a polyamide-based thermoplastic elastomer and another r elastomer. The melting point of the thermoplastic resin material may be set to about 100° C. to 250° C., and thus the fusing step of the tire frame pieces at needs not to be performed at, for example, equal to or higher than 300° C., and the fusing step may be performed at a relatively low temperature. Since the fusing step is able to be performed at the relatively low temperature as such, deterioration of the resin may be prevented, and productivity of the tire may be enhanced in terms of energy utilization rate and the like. In addition, when the tire frame pieces in which a polyamide-based thermoplastic elastomer is used are fused to form a tire frame, the bonding strength between the tire frame pieces is sufficient, and the performance of the frame itself is not deteriorated due to the temperature during fusing. Therefore, durability at the time of driving such as puncture resistance and wear resistance of the manufactured tire may be enhanced.

(2-1-7) The manufacturing method may be configured so that, in the tire frame piece bonding step, the bonding surface of the tire frame piece is heated to a temperature equal to or higher than the melting point (for example, the melting point +10° C. to +150° C.) of the thermoplastic resin material that forms the tire frame piece.

When the bonding surface of the divided body is heated to a temperature equal to or higher than the melting point of the thermoplastic resin material that forms the tire frame piece as such, fusing between the tire frame pieces may be sufficiently performed. Therefore, productivity of the tire may be enhanced while enhancing durability of the tire.

(2-1-8) The manufacturing method of the tire may be configured so that, in the reinforcing cord member winding step, the reinforcing cord member is wound around the outer circumference of the tire frame in a manner such that at least a part of the reinforcing cord member is embedded while melting or softening the outer circumference of the tire frame formed in the tire frame piece bonding step.

By winding the reinforcing cord member around the outer circumference of the tire frame in a manner such that at least a part of the reinforcing member is embedded in the outer circumference while melting and softening the outer circumference of the tire frame as such, the at least the part of the reinforcing cord member which is embedded and the melted or softened thermoplastic resin material may be welded. Accordingly, incorporation of air between the outer circumference of the tire frame and the reinforcing cord member in the cross-sectional view along the axial direction of the tire frame may further be suppressed. In addition, when the part in which the reinforcing cord member is embedded is cooled and solidified, the fixed condition of the reinforcing cord member embedded in the tire frame is enhanced.

(2-1-9) The manufacturing method of the tire may be configured so that, in the reinforcing cord member winding step, ⅕ or more of the diameter of the reinforcing cord may be embedded in the outer circumference of the tire frame in the cross-sectional view along the axial direction of the tire frame.

When ⅕ or more of the diameter of the reinforcing cord member is embedded in the outer circumference of the tire frame in the cross-sectional view along the axial direction of the tire frame, incorporation of air into the area around the reinforcing cord during manufacturing may be effectively suppressed, and moreover, the embedded reinforcing cord member may become less likely to be caused to come out of the tire frame.

(2-1-10) The manufacturing method of the tire may be configured so that, in the reinforcing cord member winding step, the heated reinforcing cord member is embedded in the tire frame.

By embedding the reinforcing cord member in the tire frame while heating the reinforcing cord member in the reinforcing cord winding step as such, when the heated reinforcing cord member comes into contact with the outer circumference of the tire frame, the contact part of is melted or softened. Therefore, it becomes easy to embed the reinforcing cord member in the outer circumference of the tire frame.

(2-1-11) The manufacturing method of the tire may be configured so that, in the cord member winding step, the part of the outer circumference of the tire frame for embedding the reinforcing cord member is heated.

By heating the part of the outer circumference of the tire frame in which the reinforcing cord member is embedded as such, the heated part of the tire frame is melted or softened. Therefore, it becomes easy to embed the reinforcing cord member.

(2-1-12) The manufacturing method of the tire may be configured so that, in the cord member winding step, the reinforcing cord member is wound in a spiral shape in the circumferential direction of the outer circumference of the tire frame while pressing the reinforcing cord member against the outer circumference of the tire frame.

When the reinforcing cord member is wound in the spiral shape while pressing the reinforcing cord member against the outer circumference of the tire frame as such, the depth of embedding the reinforcing cord member in the outer circumference of the tire frame may be adjusted.

(2-1-13) According to the manufacturing method, it may be configured so that, in the cord member winding step, after winding the reinforcing cord member around the tire frame, the melted or softened part of the outer circumference of the tire frame is cooled.

By forcibly cooling the melted or softened part of the outer circumference of the tire frame after embedding the reinforcing cord member as such, the melted or softened part of the outer circumference of the tire frame may be more quickly and rapidly cooled and solidified than natural cooling. By cooling the outer circumference of the tire more quickly than natural cooling, deformation of the outer circumference of the tire frame may be suppressed, and movement of the reinforcing cord member may be suppressed.

The tire of the second aspect of the invention may be configured as follows as described in Embodiment 2-2.

(2-2-1) The tire of the second aspect of the invention may be configured so that the manufacturing method further includes: a roughening treatment step of performing the roughening treatment on the outer circumferential surface of the tire frame by allowing a particle-shaped blasting abrasive to collide with the outer circumferential surface of the tire frame; and a superposing step of superposing a tire-constituting rubber member on the outer circumferential surface which has been subjected to the roughening treatment, via a bonding agent.

When the roughening treatment step is provided as such, the particle-shaped blasting abrasive collides with the outer circumferential surface of the circular tire frame formed by using the thermoplastic resin material including a polyamide-based thermoplastic elastomer and another elastomer, and thus minute roughened unevenness is formed on the outer circumferential surface. The treatment of forming minute roughened unevenness by allowing the particle-shaped blasting abrasive to collide with the outer circumferential surface of the tire frame is referred to as the roughening treatment. Thereafter, the tire-constituting rubber member is superposed on the outer circumferential surface which has been subjected to the roughening treatment, via the bonding agent. Here, when the tire frame and the tire-constituting rubber member are integrated into each other, since the outer circumferential surface of the tire frame has been subjected to the roughening treatment, bonding properties (adhesiveness) are enhanced due to the anchor effect. In addition, since the resin material that forms the tire frame is ploughed due to collision of the blasting abrasive, wettability of the outer circumferential surface is enhanced. Accordingly, the outer circumferential surface of the tire frame is held in a state of being uniformly coated with the bonding agent, and thus the bonding strength between the tire frame and the tire-constituting rubber member may be ensured.

(2-2-2) In the tire of the second aspect of the invention, at least a part of the outer circumferential surface of the tire frame may be an uneven portion, and the uneven portion may be subjected to the roughening treatment in the roughening treatment step.

Even if at least a part of the outer circumferential surface of the tire frame is the uneven portion as such, by allowing abrasion material to collide with the uneven portion, the area around a recess (walls at the recess, the bottom of the recess) is subjected to the roughening treatment, and thus the bonding strength between the tire frame and the tire-constituting rubber member may be ensured.

(2-2-3) The tire of the second aspect of the invention may be configured such that the outer circumference of the tire frame is configured to have a reinforcing layer that constitutes the uneven portion at the outer circumferential surface, and the reinforcing layer may be configured such that a coated cord member formed by coating the reinforcing cord with a resin material of the same kind as or different from the resin material for forming the tire frame is wound in the circumferential direction of the tire frame.

By configuring the outer circumference of the tire frame to have the reinforcing layer formed by winding the coated cord member in the circumferential direction of the tire frame as such, the rigidity of the tire frame in the circumferential direction may be enhanced.

(2-2-4) In the tire of the second aspect of the invention, a thermoplastic resin material may be used as the resin material for forming the coated cord member.

By using a thermoplastic material having thermoplasticity as the resin material that is a component of the coated cord member as such, compared to a case of using a thermosetting material as the resin material, the tire is easily manufactured and is easily recycled.

(2-2-5) The tire of the second aspect of the invention may be configured so that, in the roughening treatment step, an area wider than the area for superposing the tire-constituting rubber member is subjected to the roughening treatment.

When the area wider than the area for superposing the tire-constituting rubber member is subjected to the roughening treatment in the roughening treatment step, the bonding strength between the tire frame and the tire-constituting rubber member may be reliably ensured.

(2-2-6) The tire of the second aspect of the invention may be configured so that, in the roughening treatment step, the outer circumferential surface is subjected to the roughening treatment to have an arithmetic mean roughness Ra of 0.05 mm or greater.

When the outer circumferential surface of the tire frame is subjected to the roughening treatment to have an arithmetic mean roughness Ra of 0.05 mm or greater in the roughening treatment step as such, in a case where the tire-constituting rubber member, for example, in an unvulcanized or semi-vulcanized state is superposed on the outer circumferential surface which has been subjected to the roughening treatment, via the bonding agent, and is vulcanized, rubber of the tire-constituting rubber member may be caused to flow to the bottom of the roughened uneven portion formed by the roughening treatment. When the rubber of the tire-constituting rubber member flows to the bottom of the roughened uneven portion, a sufficient anchor effect is exhibited between the outer circumferential surface and the tire-constituting rubber member, and the bonding strength between the tire frame and the tire-constituting rubber member may be enhanced.

(2-2-7) In the tire of the second aspect of the invention, a rubber in the unvulcanized or semi-vulcanized state may be used as the tire-constituting rubber member.

In the case where the rubber in the unvulcanized or semi-vulcanized state is used as the tire-constituting rubber member as such, the rubber flows to the roughened uneven portion formed on the outer circumferential surface of the tire frame by the roughening treatment when the tire-constituting rubber member is vulcanized. In addition, when vulcanization is completed, the anchor effect is exhibited by the (vulcanized) rubber that has flowed to the roughened uneven portion, and thus the bonding strength between the tire frame and the tire-constituting rubber member may be enhanced.

"Vulcanized" is referred to as a state in which the degree of vulcanization has reached the degree needed for a final product, and the "semi-vulcanized state" is referred to as a state in which the degree of vulcanization is a higher than that of the unvulcanized state but has not reached the degree needed for a final product.

(2-2-8) The tire of the second aspect of the invention may be configured to include: a circular tire frame that is formed using a thermoplastic resin material including a polyamide-based thermoplastic elastomer and another elastomer, and has the outer circumferential surface which has been subjected to the roughening treatment by allowing a particle-shaped blasting abrasive to collide with the outer circumferential surface; and a tire-constituting rubber member superposed on the outer circumferential surface that has been subjected to the roughening treatment, via a bonding agent.

When the circular tire frame which has been subjected to the roughening treatment is used as such, the bonding strength between the tire frame and the tire-constituting rubber member may be enhanced by the anchor effect. In addition, since the outer circumferential surface has been subjected to the roughening treatment, excellent wettability of the bonding agent is provided. Accordingly, the bonding agent is held in the state of being uniformly applied onto the outer circumferential surface of the tire frame, the bonding strength between the tire frame and the tire-constituting rubber member is ensured, and thus peeling between the tire frame and the tire-constituting rubber member may be suppressed.

The tire of the third aspect of the invention may be configured as follows as described in Embodiment 3-1.

(3-1-1) The tire of the third aspect of the invention may be configured so that at least a part of the reinforcing cord member is embedded in the outer circumference of the tire frame formed of a thermoplastic resin material in the third aspect of the invention in the cross-sectional view along the axial direction of the tire frame.

When a part of the reinforcing cord member is embedded in the outer circumference of the tire frame as such, a phenomenon in which air remains in the area around the cord during winding of the reinforcing cord member (incorporation of air) may further be suppressed. When incorporation of air into the area around the reinforcing cord member is suppressed, movement of the reinforcing cord member due to, a force applied during running is suppressed. Accordingly, for example, in the case where a tire-constituting member is provided on the outer circumference of the tire frame to cover the entire reinforcing cord member, since the movement of the reinforcing cord member is suppressed, an occurrence of peeling and the like between the members (including the tire frame) is suppressed, and durability is enhanced.

(3-1-2) The tire of the third aspect of the invention may be provided with a tread formed of a material having higher wear resistance than the thermoplastic resin material on the outer side in the radial direction of the reinforcing cord layer.

By having a configuration in which the tread that comes into contact with the road surface of the material having higher wear resistance than the thermoplastic resin material as such, the wear resistance of the tire may further be enhanced.

(3-1-3) In the tire of the third aspect of the invention, 1/5 or more of the diameter of the reinforcing cord member may be embedded in the outer circumference of the tire frame along the circumferential direction in the cross-sectional view along the axial direction of the tire frame.

When 1/5 or more of the diameter of the reinforcing cord member is embedded in the outer circumference of the tire frame in the cross-sectional view along the axial direction of the tire frame, incorporation of air into the area around the reinforcing cord member may be effectively suppressed, and thus movement of the reinforcing cord member due to, for example, a force applied during running may further be suppressed.

(3-1-4) The tire of the third aspect of the invention may be configured so that the tire frame includes, on the inner side in the radial direction, a bead portion that comes into contact with a bead seat and a rim flange of a rim, and an annular bead core made of a metal material is embedded in the bead portion.

By providing the bead portion which is a part for fitting onto the rim in the tire frame, and moreover, by embedding the annular bead core made of the metal material in the bead portion as such, the tire frame (that is, tire) may be firmly held on the rim, similarly to conventional pneumatic tires made of rubber.

(3-1-5) The tire of the third aspect of the invention may be provided with a sealing portion made of a material having higher sealing properties (adhesion to the rim) than the thermoplastic resin material, in a part where the bead portion comes into contact with the rim.

By providing the sealing portion made of the material having higher sealing properties than the thermoplastic resin material in the part where the tire frame and the rim come into contact with each other as such, adhesion between the tire (the tire frame) and the rim may be enhanced. Accordingly, compared to a case where only the rim and the thermoplastic resin material are used, leakage of air in the tire may further be suppressed. In addition, by providing the sealing portion, fittability onto the rim of the tire may be enhanced.

(3-1-6) The manufacturing method of the tire of the third aspect of the invention may include: a tire frame piece forming step of forming a tire frame piece for constituting a part of the circular tire frame using the thermoplastic resin material including at least a polyamide-based thermoplastic elastomer, and an acid-modified elastomer obtained by acid-modifying a thermoplastic elastomer other than the polyamide-based thermoplastic elastomer, or a mixture of a thermoplastic elastomer other than the polyamide-based thermoplastic elastomer and an acid-modified elastomer obtained by acid-modifying the elastomer other than the polyamide-based thermoplastic elastomer; a tire frame piece bonding step of forming a tire frame by fusing two or more tire frame pieces, which make a pair, by applying heat to the bonding surfaces of the tire frame pieces; and a reinforcing cord member winding step of winding a reinforcing cord member around the outer circumference of the tire frame in the circumferential direction to form a reinforcing cord layer.

(3-1-7) The manufacturing method of the tire may be configured so that, in the tire frame piece bonding step, the bonding surface of the tire frame piece is heated to a temperature equal to or higher than the melting point of the thermoplastic resin material that forms the tire frame piece.

When the bonding surface of the divided body is heated to the temperature equal to or higher than the melting point of the thermoplastic resin material that forms the tire frame piece as such, fusing between the tire frame pieces may be sufficiently performed. Therefore, productivity of the tire may be enhanced while enhancing durability of the tire.

(3-1-8) The manufacturing method of the tire may be configured so that, in the reinforcing cord member winding step, the reinforcing cord member is wound around the outer circumference of the tire frame in a manner such that at least a part of the reinforcing cord member is embedded while melting or softening the outer circumference of the tire frame formed in the tire frame piece bonding step.

By winding the reinforcing cord member around the outer circumference of the tire frame in a manner such that at least a part of the reinforcing cord member is embedded while melting and softening the outer circumference of the tire frame as such, the at least a part of the reinforcing cord member which is embedded and the melted or softened thermoplastic resin material may be welded. Accordingly, incorporation of air between the outer circumference of the tire frame and the reinforcing cord member in the cross-sectional view along the axial direction of the tire frame may further be suppressed. In addition, when the part in which the reinforcing cord member is embedded is cooled and solidified, the fixed condition of the reinforcing cord member embedded in the tire frame is enhanced.

(3-1-9) The manufacturing method of the tire may be configured so that, in the reinforcing cord member winding step, 1/5 or more of the diameter of the reinforcing cord may be embedded in the outer circumference of the tire frame in the cross-sectional view along the axial direction of the tire frame.

When 1/5 or more of the diameter of the reinforcing cord member is embedded in the outer circumference of the tire frame in the cross-sectional view along the axial direction of the tire frame, incorporation of air into the area around the reinforcing cord during manufacturing may be effectively suppressed, and moreover, the embedded reinforcing cord member may become less likely to be caused to come out of the tire frame.

(3-1-10) The manufacturing method of the tire may be configured so that, in the reinforcing cord member winding step, the heated reinforcing cord member is embedded in the tire frame.

By embedding the reinforcing cord member in the tire frame while heating in the reinforcing cord member in the reinforcing cord winding step as such, when the heated reinforcing cord member that comes into contact with the outer circumference of the tire frame, the contact part is melted or softened. Therefore, it becomes easy to embed the reinforcing cord member in the outer circumference of the tire frame.

(3-1-11) The manufacturing method of the tire may be configured so that, in the cord member winding step, the part of the outer circumference of the tire frame for embedding the reinforcing cord member is heated.

By heating the part of the outer circumference of the tire frame for embedding the reinforcing cord member as such, the heated part of the tire frame is melted or softened. Therefore, it becomes easy to embed the reinforcing cord member.

(3-1-12) The manufacturing method of the tire may be configured so that, in the cord member winding step, the reinforcing cord member is wound in a spiral shape in the circumferential direction of the outer circumference of the tire frame while pressing the reinforcing cord member against the outer circumference of the tire frame.

When the reinforcing cord member is wound in the spiral shape while pressing the reinforcing cord member against the outer circumference of the tire frame as such, the depth of embedding the reinforcing cord member in the outer circumference of the tire frame may be adjusted.

(3-1-13) According to the manufacturing method, it may be configured such that, in the cord member winding step, after winding the reinforcing cord member around the tire frame, the melted or softened part of the outer circumference of the tire frame is cooled.

By forcibly cooling the melted or softened part of the outer circumference of the tire frame after embedding the reinforcing cord member as such, the melted or softened part of the outer circumference of the tire frame may be more quickly and rapidly cooled and solidified than natural cooling. By cooling the outer circumference of the tire more quickly than natural cooling, deformation of the outer circumference of the tire frame may be suppressed, and movement of the reinforcing cord member may be suppressed.

The tire of the third aspect of the invention may be configured as follows as described in Embodiment 3-2.

(3-2-1) The tire of the third aspect of the invention may be configured so that the manufacturing method further includes: a roughening treatment step of performing the roughening treatment on the outer circumferential surface of the tire frame by allowing a particle-shaped blasting abrasive to collide with the outer circumferential surface of the tire frame; and a superposing step of superposing a tire-constituting rubber member on the outer circumferential surface which has been subjected to the roughening treatment, via a bonding agent.

When the roughening treatment step is provided as such, the particle-shaped blasting abrasive collides with the outer circumferential surface of the circular tire frame formed by using the thermoplastic resin material, and thus minute roughened unevenness is formed on the outer circumferential surface. The treatment of forming minute roughened unevenness by allowing the blasting abrasive to collide with the outer circumferential surface of the tire frame is referred to as the roughening treatment. Thereafter, the tire-constituting rubber member is superposed on the outer circumferential surface which has been subjected to the roughening treatment, via the bonding agent. Here, when the tire frame and the tire-constituting rubber member are integrated into each other, since the outer circumferential surface of the tire frame has been subjected to the roughening treatment, bonding properties (adhesiveness) are enhanced due to the anchor effect. In addition, since the resin material that forms the tire frame is ploughed due to collision of the blasting abrasive, wettability of the outer circumferential surface is enhanced. Accordingly, the outer circumferential surface of the tire frame is held in a state of being uniformly coated with the bonding agent, and thus the bonding strength between the tire frame and the tire-constituting rubber member may be ensured.

(3-2-2) In the tire of the third aspect of the invention, at least a part of the outer circumferential surface of the tire frame may be an uneven portion, and the uneven portion may be subjected to the roughening treatment in the roughening treatment step.

Even if at least a part of the outer circumferential surface of the tire frame is the uneven portion as such, by allowing the blasting abrasive to collide with the uneven portion, the area around a recess (walls at the recess, the bottom of the recess) is subjected to the roughening treatment, and thus the bonding strength between the tire frame and the tire-constituting rubber member may be ensured.

(3-2-3) The tire of the third aspect of the invention may be configured such that the outer circumference of the tire frame is configured to have a reinforcing layer that constitutes the uneven portion at the outer circumferential surface, and the reinforcing layer may be configured such that a coated cord member formed by coating a reinforcing cord with a resin material of the same kind as or different from the resin material that forms the tire frame is wound in the circumferential direction of the tire frame.

By configuring the outer circumference of the tire frame to have the reinforcing layer formed by winding the coated cord member in the circumferential direction of the tire frame as such, the rigidity of the tire frame in the circumferential direction may be enhanced.

(3-2-4) In the tire of the third aspect of the invention, a thermoplastic resin material may be used as the resin material that is a component of the coated cord member.

By using the thermoplastic material having thermoplasticity as the resin material that is a component of the coated cord member as such, compared to a case of using a thermosetting material as the resin material, the tire is easily manufactured and is easily recycled.

(3-2-5) The tire of the third aspect of the invention may be configured so that, in the roughening treatment step, an area wider than the area for superposing the tire-constituting rubber member is subjected to the roughening treatment.

When the area wider than the area for superposing the tire-constituting rubber member is subjected to the roughening treatment in the roughening treatment step, the bonding strength between the tire frame and the tire-constituting rubber member may be reliably ensured.

(3-2-6) The tire of the third aspect of the invention may be configured so that, in the roughening treatment step, the outer circumferential surface is subjected to the roughening treatment to have an arithmetic mean roughness Ra of 0.05 mm or greater.

When the outer circumferential surface of the tire frame is subjected to the roughening treatment to have an arithmetic mean roughness Ra of 0.05 mm or greater in the roughening treatment step as such, in a case where the tire-constituting rubber member, for example, in an unvulcanized or semi-vulcanized state is superposed on the outer circumferential surface which has been subjected to the roughening treatment, via the bonding agent, and then is vulcanized, rubber of the tire-constituting rubber member may be caused to flow to the bottom of the roughened uneven portion formed by the roughening treatment. When the rubber of the tire-constituting rubber member flows to the bottom of the roughened uneven portion, a sufficient anchor effect is exhibited between the outer circumferential surface and the tire-constituting rubber member, and the bonding strength between the tire frame and the tire-constituting rubber member may be enhanced.

(3-2-7) In the tire of the third aspect of the invention, a rubber in the unvulcanized or semi-vulcanized state may be used as the tire-constituting rubber member.

In the case where the rubber in the unvulcanized or semi-vulcanized state is used as the tire-constituting rubber member as such, the rubber flows to the roughened uneven portion formed on the outer circumferential surface of the tire frame by the roughening treatment when the tire-constituting rubber member is vulcanized. In addition, when vulcanization is completed, the anchor effect is exhibited by the (vulcanized) rubber that has flowed to the roughened uneven portion, and thus the bonding strength between the tire frame and the tire-constituting rubber member may be enhanced.

"Vulcanized" is referred to as a state in which the degree of vulcanization has reached the degree needed for a final product, and the "semi-vulcanized state" is referred to as a state in which the degree of vulcanization is higher than the unvulcanized state but has not reached the degree needed for a final product.

(3-2-9) The tire of the third aspect of the invention may be configured to include: a circular tire frame that is formed using a thermoplastic resin material in the third aspect of the invention and has the outer circumferential surface which has been subjected to the roughening treatment by allowing a particle-shaped blasting abrasive to collide with the outer circumferential surface; and a tire-constituting rubber member superposed on the outer circumferential surface which has been subjected to the roughening treatment, via the bonding agent.

When the circular tire frame which has been subjected to the roughening treatment is used as such, the bonding strength between the tire frame and the tire-constituting rubber member may be enhanced by the anchor effect. In addition, since the outer circumferential surface has been subjected to the roughening treatment, excellent wettability of the bonding agent is provided. Accordingly, the bonding agent is held in the state of being uniformly applied onto the outer circumferential surface of the tire frame, the bonding strength between the tire frame and the tire-constituting rubber member is ensured, and thus peeling between the tire frame and the tire-constituting rubber member may be suppressed.

The tire of the fourth aspect of the invention may be configured as follows as described in Embodiment 4-1.

(4-1-1) The tire of the fourth aspect of the invention may be configured so that at least a part of the reinforcing cord member is embedded in the outer circumference of the tire frame formed of the thermoplastic resin material in the cross-sectional view along the axial direction of the tire frame.

When a part of the reinforcing cord member is embedded in the outer circumference of the tire frame as such, a phenomenon in which air remains in the area around the cord during winding of the reinforcing cord member (incorporation of air) may further be suppressed. When incorporation of air into the area around the reinforcing cord member is suppressed, movement of the reinforcing cord member due to, for example, a force applied during running is suppressed. Accordingly, for example, in the case where the tire-constituting member is provided in the outer circumference of the tire frame to cover the entire reinforcing cord member, since the movement of the reinforcing cord member is suppressed, an occurrence of peeling and the like between the members (including the tire frame) is suppressed, and durability is enhanced.

(4-1-2) The tire of the fourth aspect of the invention may be provided with a tread formed of a material having higher wear resistance than the thermoplastic resin material on the outer side in the radial direction of the reinforcing cord layer.

By having configuration in which the tread that comes into contact with the road surface is formed of the material having higher wear resistance than the thermoplastic resin material as such, the wear resistance of the tire may further be enhanced.

(4-1-3) In the tire of the fourth aspect of the invention, ⅕ or more of the diameter of the reinforcing cord member may be embedded in the outer circumference of the tire frame along the circumferential direction in the cross-sectional view along the axial direction of the tire frame.

When ⅕ or more of the diameter of the reinforcing cord member is embedded in the outer circumference of the tire frame in the cross-sectional view along the axial direction of the tire frame, incorporation of air into the area around the reinforcing cord member may be effectively suppressed, and thus movement of the reinforcing cord member due to, for example, a force applied during running may further be suppressed.

(4-1-4) The tire of the fourth aspect of the invention may be configured so that the tire frame includes, on the inner side in the radial direction, a bead portion that comes into contact with a bead seat and a rim flange of a rim, and a annular bead core made of the metal material is embedded in the bead portion.

By providing the bead portion which is a part for fitting onto the rim in the tire frame, and moreover, by embedding the annular bead core made of a metal material in the bead portion as such, the tire frame (that is, tire) may be firmly held on the rim, similarly to conventional pneumatic tires made of rubber.

(4-1-5) The tire of the fourth aspect of the invention may be provided with a sealing portion made of a material having higher sealing properties (adhesion to the rim) than the thermoplastic resin material, in a part where the bead portion comes into contact with the rim.

By providing the sealing portion made of the material having higher sealing properties than the thermoplastic resin material in the part where the tire frame and the rim come into contact with each other as such, adhesion between the tire (the tire frame) and the rim may be enhanced. Accordingly, compared to a case where only the rim and the thermoplastic resin material are used, leakage of air in the tire may further be suppressed. In addition, by providing the sealing portion, fittability onto the rim of the tire may be enhanced.

(4-1-6) The tire of the fourth aspect of the invention may be manufactured according to the manufacturing method that includes: a tire frame piece forming step of forming a tire frame piece for constituting a part of the circular tire frame using at least the thermoplastic resin material; a tire frame piece bonding step of forming a tire frame by fusing two or more tire frame pieces, which form a pair, by applying heat to the bonding surfaces of the tire frame pieces; and a reinforcing cord member winding step of winding a reinforcing cord member around the outer circumference of the tire frame in the circumferential direction to form a reinforcing cord layer.

(4-1-7) The manufacturing method may be configured so that, in the tire frame piece bonding step, the bonding surface of the tire frame piece is heated to a temperature equal to or higher than the melting point (for example, the melting point +10° C. to +150° C.) of the thermoplastic resin material that forms the tire frame piece.

When the bonding surface of the divided body is heated to a temperature equal to or higher than the melting point of the thermoplastic resin material that forms the tire frame piece as such, fusing between the tire frame pieces may be sufficiently performed. Therefore, productivity of the tire may be enhanced while enhancing durability of the tire.

(4-1-8) The manufacturing method of the tire may be configured so that, in the reinforcing cord member winding step, the reinforcing cord member is wound around the outer circumference of the tire frame in a manner such that at least a part of the reinforcing cord member is embedded while melting or softening the outer circumference of the tire frame formed in the tire frame piece bonding step.

By winding the reinforcing cord member around the outer circumference of the tire frame in a manner such that at least a part of the reinforcing cord member is embedded while melting and softening the outer circumference of the tire frame as such, the at least a part of the reinforcing cord member which is embedded and the melted or softened thermoplastic resin material may be welded. Accordingly, incorporation of air between the outer circumference of the tire frame and the reinforcing cord member in the cross-sectional view along the axial direction of the tire frame may further be suppressed. In addition, when the part in which the reinforcing cord member is embedded is cooled and solidified, the fixed condition of the reinforcing cord member embedded in the tire frame is enhanced.

(4-1-9) The manufacturing method of the tire may be configured so that, in the reinforcing cord member winding step, ⅕ or more of the diameter of the reinforcing cord may be embedded in the outer circumference of the tire frame in the cross-sectional view along the axial direction of the tire frame.

When ⅕ or more of the diameter of the reinforcing cord member is embedded in the outer circumference of the tire frame in the cross-sectional view along the axial direction of the tire frame, incorporation of air into the area around the reinforcing cord during manufacturing may be effectively suppressed, and moreover, the embedded reinforcing cord member may become less likely to be caused to come out of the tire frame.

(4-1-10) The manufacturing method of the tire may be configured so that, in the reinforcing cord member winding step, the heated reinforcing cord member is embedded in the tire frame.

By embedding the reinforcing cord member in the tire frame while heating the reinforcing cord member in the reinforcing cord winding step as such, when the heated reinforcing cord member comes into contact with the outer circumference of the tire frame, the contact part is melted or softened. Therefore, it becomes easy to embed the reinforcing cord member in the outer circumference of the tire frame.

(4-1-11) The manufacturing method of the tire may be configured so that, in the cord member winding step, the part of the outer circumference of the tire frame for embedding the reinforcing cord member is heated.

By heating the part of the outer circumference of the tire frame for embedding the reinforcing cord member as such, the heated part of the tire frame is melted or softened. Therefore, it becomes easy to embed the reinforcing cord member.

(4-1-12) The manufacturing method of the tire may be configured so that, in the cord member winding step, the reinforcing cord member is wound in a spiral shape in the circumferential direction of the outer circumference of the tire frame while pressing the reinforcing cord member against the outer circumference of the tire frame.

When the reinforcing cord member is wound in the spiral shape while pressing the reinforcing cord member against the outer circumference of the tire frame as such, the width of embedding the reinforcing cord member in the outer circumference of the tire frame may be adjusted.

(4-1-13) According to the manufacturing method, it may be configured so that, in the cord member winding step, after winding the reinforcing cord member around the tire frame, the melted or softened part of the outer circumference of the tire frame is cooled.

By forcibly cooling the melted or softened part of the outer circumference of the tire frame after embedding the reinforcing cord member as such, the melted or softened part of the outer circumference of the tire frame may be more quickly and rapidly cooled and solidified than natural cooling. By cooling the outer circumference of the tire more quickly than natural cooling, deformation of the outer circumference of the tire frame may be suppressed, and movement of the reinforcing cord member may be suppressed.

The tire of the fourth aspect of the invention may be configured as follows as described in Embodiment 4-2.

(4-2-1) The tire of the fourth aspect of the invention may be configured so that the manufacturing method further includes: a roughening treatment step of performing the roughening treatment on the outer circumferential surface of the tire frame by allowing a particle-shaped blasting abrasive to collide with the outer circumferential surface of the tire frame; and a superposing step of superposing a tire-constituting rubber member on the outer circumferential surface which has been subjected to the roughening treatment, via a bonding agent.

When the roughening treatment step is provided as such, the particle-shaped blasint abrasive collides with the outer circumferential surface of the circular tire frame formed using the thermoplastic resin material, and thus minute roughened unevenness is formed on the outer circumferential surface. The treatment of forming minute roughened unevenness by allowing the blasting abrasive to collide with the outer circumferential surface of the tire frame is referred to as the roughening treatment. Thereafter, the tire-constituting rubber member is superposed on the outer circumferential surface which has been subjected to the roughening treatment, via the bonding agent. Here, when the tire frame and the tire-constituting rubber member are integrated into each other, since the outer circumferential surface of the tire frame has been subjected to the roughening treatment, bonding properties (adhesiveness) are enhanced due to the anchor effect. In addition, since the thermoplastic resin material that forms the tire frame is ploughed due to collision of the blasting abrasive, wettability of the outer circumferential surface is enhanced. Accordingly, the outer circumferential surface of the tire frame is held in a state of being uniformly coated with the bonding agent, and thus the bonding strength between the tire frame and the tire-constituting rubber member may be ensured.

(4-2-2) In the tire of the fourth aspect of the invention, at least a part of the outer circumferential surface of the tire frame may be an uneven portion, and the uneven portion may be subjected to the roughening treatment in the roughening treatment step.

Even if at least a part of the outer circumferential surface of the tire frame is the uneven portion as such, by allowing the blasting abrasive to collide with the uneven portion, the area around a recess (walls at the recess, the bottom of the recess) is subjected to the roughening treatment, and thus the bonding strength between the tire frame and the tire-constituting rubber member may be ensured.

(4-2-3) In the tire of the fourth aspect of the invention, the outer circumference of the tire frame is configured to have a reinforcing layer that constitutes the uneven portion at the outer circumferential surface, and the reinforcing layer may be configured so that a coated cord member formed by coating the reinforcing cord with a resin material of the same kind as or different from the resin material that forms the tire frame is wound in the circumferential direction of the tire frame.

By configuring the outer circumference of the tire frame to have the reinforcing layer formed by winding the coated cord member in the circumferential direction of the tire frame as such, the rigidity of the tire frame in the circumferential direction may be enhanced.

(4-2-4) In the tire of the fourth aspect of the invention, a thermoplastic resin material may be used as the resin material that is a component of the coated cord member.

By using the thermoplastic material having thermoplasticity as the resin material that is a component of the coated cord member as such, compared to a case of using a thermosetting material as the resin material, the tire is easily manufactured and is easily recycled.

(4-2-5) The tire of the fourth aspect of the invention may be configured so that, in the roughening treatment step, an area wider than the area for superposing the tire-constituting rubber member is subjected to the roughening treatment.

When the area wider than the area for superposing the tire-constituting rubber member is subjected to the roughening treatment in the roughening treatment step, the bonding strength between the tire frame and the tire-constituting rubber member may be reliably ensured.

(4-2-6) The tire of the fourth aspect of the invention may be configured so that, in the roughening treatment step, the outer circumferential surface is subjected to the roughening treatment to have an arithmetic mean roughness Ra of 0.05 mm or greater.

When the outer circumferential surface of the tire frame is subjected to the roughening treatment to have an arithmetic mean roughness Ra of 0.05 mm or greater in the roughening treatment step as such, in a case where the tire-constituting rubber member, for example, in an unvulcanized or semi-vulcanized state is superposed on the outer circumferential surface which has been subjected to the roughening treatment, via the bonding agent, and is vulcanized, rubber of the tire-constituting rubber member may be caused to flow to the bottom of the roughened uneven portion formed by the roughening treatment. When the rubber of the tire-constituting rubber member flows to the bottom of the roughened uneven portion, a sufficient anchor effect is exhibited between the outer circumferential surface and the tire-constituting rubber member, and the bonding strength between the tire frame and the tire-constituting rubber member may be enhanced.

(4-2-7) In the tire of the fourth aspect of the invention, a rubber in the unvulcanized or semi-vulcanized state may be used as the tire-constituting rubber member.

In the case where the rubber in the unvulcanized or semi-vulcanized state is used as the tire-constituting rubber member as such, the rubber flows to the roughened uneven portion formed on the outer circumferential surface of the tire frame by the roughening treatment when the tire-constituting rubber member is vulcanized. In addition, when vulcanization is completed, the anchor effect is exhibited by the (vulcanized) rubber that has flowed to the roughened uneven portion, and thus the bonding strength between the tire frame and the tire-constituting rubber member may be enhanced.

"Vulcanized" is referred to as a state in which the degree of vulcanization reaches the degree needed for a final product, and the "semi-vulcanized state" is referred to as a state in which the vulcanization degree is higher than the degree of the unvulcanized state but has not reached the degree needed for a final product.

(4-2-8) The tire of the fourth aspect of the invention may be configured to include: a circular tire frame that is formed using a resin material and has the outer circumferential surface which has been subjected to the roughening treatment by allowing a particle-shaped blasting abrasive to collide with on the outer circumferential surface; and a tire-constituting rubber member superposed on the outer circumferential surface which has been subjected to the roughening treatment, via the bonding agent.

When the circular tire frame which has been subjected to the roughening treatment is used as such, the bonding strength between the tire frame and the tire-constituting rubber member may be enhanced by the anchor effect. In addition, since the outer circumferential surface has been subjected to the roughening treatment, excellent wettability of the bonding agent is provided. Accordingly, the bonding agent is held in the state of being uniformly applied onto the outer circumferential surface of the tire frame, the bonding strength between the tire frame and the tire-constituting rubber member is ensured, and thus peeling between the tire frame and the tire-constituting rubber member may be suppressed.

While the specific modes of the fourth aspect of the invention are described using Embodiment 4-1 and Embodiment 4-2, the fourth aspect of the invention is not limited to the above-described modes.

The tire of the fifth aspect of the invention may be configured as follows as described in Embodiment 5-1.

(5-1-1) The tire of the fifth aspect of the invention may be configured so that at least a part of the reinforcing cord member is embedded in the outer circumference of the tire frame formed of the thermoplastic resin material in the cross-sectional view along the axial direction of the tire frame.

When a part of the reinforcing cord member is embedded in the outer circumference of the tire frame as such, a phenomenon in which air remains in the area around the cord during winding of the reinforcing cord member (incorporation of air) may further be suppressed. When incorporation of air into the area around the reinforcing cord member is suppressed, movement of the reinforcing cord member due to, for example, a force applied during running is suppressed. Accordingly, for example, in the case where the tire-constituting member is provided in the outer circumference of the tire frame to cover the entire reinforcing cord member, since the movement of the reinforcing cord member is suppressed, an occurrence of peeling and the like between the members (including the tire frame) is suppressed, and durability is enhanced.

(5-1-2) The tire of the fifth aspect of the invention may be provided with a tread formed of a material having higher wear resistance than the thermoplastic resin material on the outer side in the radial direction of the reinforcing cord layer.

By having a configuration in which the tread that comes into contact with the road surface is formed of the material having higher wear resistance than the thermoplastic resin material as such, the wear resistance of the tire may further be enhanced.

(5-1-3) In the tire of the fifth aspect of the invention, ⅕ or more of the diameter of the reinforcing cord member may be embedded in the outer circumference of the tire frame along the circumferential direction in the cross-sectional view along the axial direction of the tire frame.

When ⅕ or more of the diameter of the reinforcing cord member is embedded in the outer circumference of the tire frame in the cross-sectional view along the axial direction of the tire frame, incorporation of air into the area around the reinforcing cord member may be effectively suppressed, and thus movement of the reinforcing cord member due to, for example, a force applied during running may further be suppressed.

(5-1-4) The tire of the fifth aspect of the invention may be configured so that the tire frame includes, on the inner side in the radial direction, a bead portion that comes into contact with a bead seat and a rim flange of a rim, and a annular bead core made of a metal material is embedded in the bead portion.

By providing the bead portion which is a part for fitting onto the rim in the tire frame, and moreover, by embedding the annular bead core made of a metal material in the bead portion as such, the tire frame (that is, tire) may be firmly held on the rim, similarly to conventional pneumatic tires made of rubber.

(5-1-5) The tire of the fifth aspect of the invention may be provided with a sealing portion made of a material having higher sealing properties (adhesion to the rim) than the thermoplastic resin material, in a part where the bead portion comes into contact with the rim.

By providing the sealing portion made of the material having higher sealing properties than the thermoplastic resin material in the part where the tire frame and the rim come into contact with each other as such, adhesion between the tire (the tire frame) and the rim may be enhanced. Accordingly, compared to a case where only the rim and the thermoplastic resin material are used, leakage of air in the tire may further be suppressed. In addition, by providing the sealing portion, fittability onto the rim of the tire may be enhanced.

(5-1-6) The tire of the fifth aspect of the invention may be manufactured according to a manufacturing method that includes: a tire frame piece forming step of forming a tire frame piece for constituting a part of the circular tire frame using at least a thermoplastic resin material; a tire frame piece bonding step of forming a tire frame by fusing two or more tire frame pieces, which make a pair, by applying heat to the bonding surfaces of the tire frame pieces; and a reinforcing cord member winding step of winding a reinforcing cord member around the outer circumference of the tire frame in the circumferential direction to form a reinforcing cord layer.

(5-1-7) The manufacturing method may be configured so that, in the tire frame piece bonding step, the bonding surface of the tire frame piece is heated to a temperature equal to or higher than the melting point (for example, the melting point +10° C. to +150° C.) of the thermoplastic resin material that forms the tire frame piece.

When the bonding surface of the divided body is heated to a temperature equal to or higher than the melting point of the thermoplastic resin material that forms the tire frame piece as such, fusing between the tire frame pieces may be sufficiently performed. Therefore, productivity of the tire may be enhanced while enhancing durability of the tire.

(5-1-8) The manufacturing method of the tire may be configured so that, in the reinforcing cord member winding step, the reinforcing cord member is wound around the outer circumference of the tire frame in a manner such that at least a part of the reinforcing cord member is embedded while melting or softening the outer circumference of the tire frame formed in the tire frame piece bonding step.

By winding the reinforcing cord member around the outer circumference of the tire frame in a manner such that at least a part of the reinforcing cord member is embedded while melting and softening the outer circumference of the tire frame as such, the at least a part of the reinforcing cord member which is embedded and the melted or softened thermoplastic resin material may be welded. Accordingly, incorporation of air between the outer circumference of the tire frame and the reinforcing cord member in the cross-sectional view along the axial direction of the tire frame may further be suppressed. In addition, when the part in which the reinforcing cord member is embedded is cooled and solidified, the fixed condition of the reinforcing cord member embedded in the tire frame is enhanced.

(5-1-9) The manufacturing method of the tire may be configured so that, in the reinforcing cord member winding step, ⅕ or more of the diameter of the reinforcing cord member may be embedded in the outer circumference of the tire frame in the cross-sectional view along the axial direction of the tire frame.

When ⅕ or more of the diameter of the reinforcing cord member is embedded in the outer circumference of the tire frame in the cross-sectional view along the axial direction of the tire frame, incorporation of air into the area around the reinforcing cord during manufacturing may be effectively suppressed, and moreover, the embedded reinforcing cord member may become less likely to be caused to come out of the tire frame.

(5-1-10) The manufacturing method of the tire may be configured so that, in the reinforcing cord member winding step, the heated reinforcing cord member is embedded in the tire frame.

By embedding the reinforcing cord member in the tire frame while heating the reinforcing cord member in the reinforcing cord winding step as such, when the heated reinforcing cord member comes into contact with the outer circumference of the tire frame, the contact part is melted or softened. Therefore, it becomes easy to embed the reinforcing cord member in the outer circumference of the tire frame.

(5-1-11) The manufacturing method of the tire may be configured so that, in the cord member winding step, the part of the outer circumference of the tire frame in which the reinforcing cord member is embedded is heated.

By heating the part of the outer circumference of the tire frame for embedding the reinforcing cord member as such, the heated part of the tire frame is melted or softened. Therefore, it becomes easy to embed the reinforcing cord member.

(5-1-12) The manufacturing method of the tire may be configured so that, in the cord member winding step, the reinforcing cord member is wound in a spiral shape in the circumferential direction of the outer circumference of the tire frame while pressing the reinforcing cord member against the outer circumference of the tire frame.

When the reinforcing cord member is wound in the spiral shape while pressing the reinforcing cord member against the outer circumference of the tire frame as such, the depth of embedding the reinforcing cord member in the outer circumference of the tire frame may be adjusted.

(5-1-13) According to the manufacturing method, it may be configured so that, in the cord member winding step, after winding the reinforcing cord member around the tire frame, the melted or softened part of the outer circumference of the tire frame is cooled.

By forcibly cooling the melted or softened part of the outer circumference of the tire frame after embedding the reinforcing cord member as such, the melted or softened part of the outer circumference of the tire frame may be more quickly and rapidly cooled and solidified than natural cooling. By cooling the outer circumference of the tire more quickly than natural cooling, deformation of the outer circumference of the tire frame may be suppressed, and movement of the reinforcing cord member may be suppressed.

The tire of the fifth aspect of the invention may be configured as follows as described in Embodiment 5-2.

(5-2-1) The tire of the fifth aspect of the invention may be configured such that the manufacturing method further includes: a roughening treatment step of performing the roughening treatment on the outer circumferential surface of the tire frame by allowing a particle-shaped blasting abrasive to collide with the outer circumferential surface of the tire frame; and a superposing step of superposing a tire-constituting rubber member on the outer circumferential surface which has been subjected to the roughening treatment, via a bonding agent.

When the roughening treatment step is provided as such, the particle-shaped blasting abrasive collides with the outer circumferential surface of the circular tire frame formed using the thermoplastic resin material, and thus minute roughened unevenness is formed on the outer circumferential surface. The treatment of forming minute roughened unevenness by allowing the blasting abrasive to collide with the outer circumferential surface of the tire frame is referred to as the roughening treatment. Thereafter, the tire-constituting rubber member is superposed on the outer circumferential surface which has been subjected to the roughening treatment, via the bonding agent. Here, when the tire frame and the tire-constituting rubber member are integrated into each other, since the outer circumferential surface of the tire frame has been subjected to the roughening treatment, bonding properties (bonding properties) are enhanced due to the anchor effect. In addition, since the resin material that forms the tire frame is ploughed due to collision of the blasting abrasive, wettability of the outer circumferential surface is enhanced. Accordingly, the outer circumferential surface of the tire frame is held in a state of being uniformly coated with the bonding agent, and thus the bonding strength between the tire frame and the tire-constituting rubber member may be ensured.

(5-2-2) In the tire of the fifth aspect of the invention, at least a part of the outer circumferential surface of the tire frame may be an uneven portion, and the uneven portion may be subjected to the roughening treatment in the roughening treatment step.

Even if at least a part of the outer circumferential surface of the tire frame is the uneven portion as such, by allowing the blasting abrasive to collide with the uneven portion, the area around a recess (walls at the recess, the bottom of the recess) is subjected to the roughening treatment, and thus the bonding strength between the tire frame and the tire-constituting rubber member may be ensured.

(5-2-3) The fifth aspect of the invention may be configured such that the outer circumference of the tire frame is configured to have a reinforcing layer that constitutes the uneven portion at the outer circumferential surface, and the reinforcing layer may be configured such that a coated cord member formed by coating a reinforcing cord with a resin material of the same kind as or a different from the resin material that forms the tire frame is wound in the circumferential direction of the tire frame.

By configuring the outer circumference of the tire frame to have the reinforcing layer formed by winding the coated cord member in the circumferential direction of the tire frame as such, the rigidity of the tire frame in the circumferential direction may be enhanced.

(5-2-4) In the tire of the fifth aspect of the invention, a thermoplastic resin material may be used as the resin material that is a component of the coated cord member.

By using the thermoplastic material having thermoplasticity as the resin material that is a component of the coated cord member as such, compared to a case of using a thermosetting material as the resin material, the tire is easily manufactured and is easily recycled.

(5-2-5) The tire of the fifth aspect of the invention may be configured so that, in the roughening treatment step, an area wider than the area for superposing the tire-constituting rubber member is subjected to the roughening treatment.

When the area wider than the area for superposing the tire-constituting rubber member is subjected to the roughening treatment in the roughening treatment step, the bonding strength between the tire frame and the tire-constituting rubber member may be reliably ensured.

(5-2-6) The tire of the fifth aspect of the invention may be configured so that, in the roughening treatment step, the outer circumferential surface is subjected to the roughening treatment to have an arithmetic mean roughness Ra of 0.05 mm or greater.

When the outer circumferential surface of the tire frame is subjected to the roughening treatment to have an arithmetic mean roughness Ra of 0.05 mm or greater in the roughening treatment step as such, in a case where the tire-constituting rubber member, for example, in an unvulcanized or semi-vulcanized state is superposed on the outer circumferential surface which has been subjected to the roughening treatment, via the bonding agent, and is vulcanized, rubber of the tire-constituting rubber member may be caused to flow to the bottom of the roughened uneven portion formed by the roughening treatment. When the rubber of the tire-constituting rubber member flows to the bottom of the roughened uneven portion, a sufficient anchor effect is exhibited between the outer circumferential surface and the tire-constituting rubber member, and the bonding strength between the tire frame and the tire-constituting rubber member may be enhanced.

(5-2-7) In the tire of the fifth aspect of the invention, a rubber in the unvulcanized or semi-vulcanized state may be used as the tire-constituting rubber member.

In the case where the rubber in the unvulcanized or semi-vulcanized state is used as the tire-constituting rubber member as such, the rubber flows to the roughened uneven portion formed on the outer circumferential surface of the tire frame by the roughening treatment when the tire-constituting rubber member is vulcanized. In addition, when vulcanization is completed, the anchor effect is exhibited by the (vulcanized) rubber that has flowed to the roughened uneven portion, and thus the bonding strength between the tire frame and the tire-constituting rubber member may be enhanced.

"Vulcanized" is referred to as a state in which the degree of vulcanization reaches the degree needed for a final product, and the "semi-vulcanized state" is referred to as a state in which the vulcanization degree is higher than the unvulcanized state but has not reached the degree needed for a final product.

(5-2-8) The tire of the fifth aspect of the invention may be configured to include: a circular tire frame that is formed using the resin material and has the outer circumferential surface which has been subjected to the roughening treatment by allowing a particle-shaped blasting abrasive to collide with the outer circumferential surface; and a tire-constituting rubber member superposed on the outer circumferential surface which has been subjected to the roughening treatment, via the bonding agent.

When the circular tire frame which has been subjected to the roughening treatment is used as such, the bonding strength between the tire frame and the tire-constituting rubber member may be enhanced by the anchor effect. In addition, since the outer circumferential surface has been subjected to the roughening treatment, excellent wettability of the bonding agent is provided. Accordingly, the bonding agent is held in the state of being uniformly applied onto the outer circumferential surface of the tire frame, the bonding strength between the tire frame and the tire-constituting rubber member is ensured, and thus peeling between the tire frame and the tire-constituting rubber member may be suppressed.

While the specific modes of the fifth aspect of the invention have been described using Embodiment 5-1 and Embodiment 5-2, the fifth aspect of the invention is not limited to the above-described modes.

The tire of the sixth aspect of the invention may be configured as follows as described in Embodiment 6-1.

(6-1-1) The tire of the sixth aspect of the invention may be configured so that at least a part of the reinforcing cord member is embedded in the outer circumference of the tire frame formed of the thermoplastic resin material in the cross-sectional view along the axial direction of the tire frame.

When a part of the reinforcing cord member is embedded in the outer circumference of the tire frame as such, a phenomenon in which air remains in the area around the cord during winding of the reinforcing cord member (incorporation of air) may further be suppressed. When incorporation of air into the area around the reinforcing cord member is suppressed, movement of the reinforcing cord member due to, for example, a force applied during running is suppressed. Accordingly, for example, in the case where the tire-constituting member is provided on the outer circumference of the tire frame to cover the entire reinforcing cord member, since the movement of the reinforcing cord member is suppressed, an occurrence of peeling and the like between the members (including the tire frame) is suppressed, and durability is enhanced.

(6-1-2) The tire of the sixth aspect of the invention may be provided with a tread formed of a material having higher wear resistance than the thermoplastic resin material on the outer side in the radial direction of the reinforcing cord layer.

By having a configuration in which the tread that comes into contact with the road surface is formed of a material having higher wear resistance than the thermoplastic resin material as such, the wear resistance of the tire may further be enhanced.

(6-1-3) In the tire of the sixth aspect of the invention, $\frac{1}{5}$ or more of the diameter of the reinforcing cord member may be embedded in the outer circumference of the tire frame along the circumferential direction in the cross-sectional view along the axial direction of the tire frame.

When $\frac{1}{5}$ or more of the diameter of the reinforcing cord member is embedded in the outer circumference of the tire frame in the cross-sectional view along the axial direction of the tire frame, incorporation of air into the area around the reinforcing cord member may be effectively suppressed, and thus movement of the reinforcing cord member due to, for example, a force applied during running may further be suppressed.

(6-1-4) The tire of the sixth aspect of the invention may be configured so that the tire frame includes, on the inner side in the radial direction, a bead portion that comes into contact with a bead seat and a rim flange of a rim, and an annular bead core made of a metal material is embedded in the bead portion.

By providing the bead portion which is a part for fitting onto the rim in the tire frame, and moreover, by embedding the annular bead core made of the metal material in the bead portion as such, the tire frame (that is, tire) may be firmly held on the rim, similarly to conventional pneumatic tires made of rubber.

(6-1-5) The tire of the sixth aspect of the invention may be provided with a sealing portion made of a material having higher sealing properties (adhesion to the rim) than the thermoplastic resin material, in a part where the bead portion comes into contact with the rim.

By providing the sealing portion made of the material having higher sealing properties than the thermoplastic resin material in the part where the tire frame and the rim come into contact with each other as such, adhesion between the tire (the tire frame) and the rim may be enhanced. Accordingly, compared to a case where only the rim and the thermoplastic resin material are used, leakage of air in the tire may further be suppressed. In addition, by providing the sealing portion, fittability onto the rim of the tire may be enhanced.

(6-1-6) The tire of the sixth aspect of the invention may be manufactured according to a manufacturing method that includes: a tire frame piece forming step of forming a tire frame piece for constituting a part of a circular tire frame using at least a thermoplastic resin material; a tire frame piece bonding step of forming a tire frame by fusing two or more tire frame pieces, which make a pair, by applying heat to the bonding surfaces of the tire frame pieces; and a reinforcing cord member winding step of winding a reinforcing cord member around the outer circumference of the tire frame in the circumferential direction to form a reinforcing cord layer.

(6-1-7) The manufacturing method may be configured so that, in the tire frame piece bonding step, the bonding surface of the tire frame piece is heated to a temperature equal to or higher than the melting point (for example, the melting point +10° C. to +150° C.) of the thermoplastic resin material that forms the tire frame piece.

When the bonding surface of the divided body is heated to a temperature equal to or higher than the melting point of the thermoplastic resin material that forms the tire frame piece as such, fusing between the tire frame pieces may be sufficiently performed. Therefore, productivity of the tire may be enhanced while enhancing durability of the tire.

(6-1-8) The manufacturing method of the tire may be configured so that, in the reinforcing cord member winding step, the reinforcing cord member is wound around the outer circumference of the tire frame in a manner such that at least a part of the reinforcing cord member is embedded while melting or softening the outer circumference of the tire frame formed in the tire frame piece bonding step.

By winding the reinforcing cord member around the outer circumference of the tire frame in a manner such that at least a part of the reinforcing cord member is embedded while melting and softening the outer circumference of the tire frame as such, the at least a part of the reinforcing cord member which is embedded and the melted or softened thermoplastic resin material may be welded. Accordingly, incorporation of air between the outer circumference of the tire frame and the reinforcing cord member in the cross-sectional view along the axial direction of the tire frame may further be suppressed. In addition, when the part in which the reinforcing cord member is embedded is cooled and solidified, the fixed condition of the reinforcing cord member embedded in the tire frame is enhanced.

(6-1-9) The manufacturing method of the tire may be configured so that, in the reinforcing cord member winding step, $\frac{1}{5}$ or more of the diameter of the reinforcing cord may be embedded in the outer circumference of the tire frame in the cross-sectional view along the axial direction of the tire frame.

When $\frac{1}{5}$ or more of the diameter of the reinforcing cord member is embedded in the outer circumference of the tire frame in the cross-sectional view along the axial direction of the tire frame, incorporation of air into the area around the reinforcing cord during manufacturing may be effectively suppressed, and moreover, the embedded reinforcing cord member may become less likely to be caused to come out of the tire frame.

(6-1-10) The manufacturing method of the tire may be configured so that, in the reinforcing cord member winding step, the heated reinforcing cord member is embedded in the tire frame.

By embedding the reinforcing cord member in the tire frame while heating the reinforcing cord member in the reinforcing cord winding step as such, when the heated reinforcing cord member comes into contact with the outer circumference of the tire frame, the contact part is melted or softened. Therefore, it becomes easy to embed the reinforcing cord member in the outer circumference of the tire frame.

(6-1-11) The manufacturing method of the tire may be configured so that, in the cord member winding step, the part of the outer circumference of the tire frame for embedding the reinforcing cord member is heated.

By heating the part of the outer circumference of the tire frame for embedding the reinforcing cord member as such, the heated part of the tire frame is melted or softened. Therefore, it becomes easy to embed the reinforcing cord member.

(6-1-12) The manufacturing method of the tire may be configured so that, in the cord member winding step, the reinforcing cord member is wound in a spiral shape in the circumferential direction of the outer circumference of the tire frame while pressing the reinforcing cord member against the outer circumference of the tire frame.

When the reinforcing cord member is wound in the spiral shape while pressing the reinforcing cord member against the outer circumference of the tire frame as such, the depth of embedding the reinforcing cord member in the outer circumference of the tire frame may be adjusted.

(6-1-13) According to the manufacturing method, it may be configured so that, in the cord member winding step, after winding the reinforcing cord member around the tire frame, the melted or softened part of the outer circumference of the tire frame is cooled.

By forcibly cooling the melted or softened part of the outer circumference of the tire frame after embedding the reinforcing cord member as such, the melted or softened part of the outer circumference of the tire frame may be more quickly and rapidly cooled and solidified than natural cooling. By cooling the outer circumference of the tire more quickly than natural cooling, deformation of the outer circumference of the tire frame may be suppressed, and movement of the reinforcing cord member may be suppressed.

The tire of the sixth aspect of the invention may be configured as follows as described in Embodiment 6-2.

(6-2-1) The tire of the sixth aspect of the invention may be configured so that the manufacturing method further includes: a roughening treatment step of performing the roughening treatment on the outer circumferential surface of the tire frame by allowing a particle-shaped blasting abrasive to collide with the outer circumferential surface of the tire frame; and a superposing step of superposing a tire-constituting rubber member on the outer circumferential surface which has been subjected to the roughening treatment, via a bonding agent.

When the roughening treatment step is provided as such, the particle-shaped blastinb abrasive collides with the outer circumferential surface of the circular tire frame formed using the thermoplastic resin material, and thus minute roughened unevenness is formed on the outer circumferential surface. The treatment of forming minute roughened unevenness by allowing the blasting abrasive to collide with the outer circumferential surface of the tire frame is referred to as the roughening treatment. Thereafter, the tire-constituting rubber member is superposed on the outer circumferential surface subjected to the roughening treatment, via the bonding agent. Here, when the tire frame and the tire-constituting rubber member are integrated into each other, since the outer circumferential surface of the tire frame has been subjected to the roughening treatment, bonding properties (adhesiveness) are enhanced due to the anchor effect. In addition, since the thermoplastic resin material that forms the tire frame is ploughed due to collision of the blasting abrasive, wettability of the outer circumferential surface is enhanced. Accordingly, the outer circumferential surface of the tire frame is held in a state of being uniformly coated with the bonding agent, and thus the bonding strength between the tire frame and the tire-constituting rubber member may be ensured.

(6-2-2) In the tire of the sixth aspect of the invention, at least a part of the outer circumferential surface of the tire frame may be an uneven portion, and the uneven portion may be subjected to the roughening treatment in the roughening treatment step.

Even if at least a part of the outer circumferential surface of the tire frame is the uneven portion as such, by allowing the blasting abrasive to collide with the uneven portion, the area around a recess (walls at the recess, the bottom of the recess) is subjected to the roughening treatment, and thus the bonding strength between the tire frame and the tire-constituting rubber member may be ensured.

(6-2-3) In the tire of the sixth aspect of the invention, the outer circumference of the tire frame is configured to have a reinforcing layer that constitutes the uneven portion at the outer circumferential surface, and the reinforcing layer may be configured so that a coated cord member formed by coating a reinforcing cord with a resin material of the same kind as or different from the resin material that forms the tire frame is wound in the circumferential direction of the tire frame.

By configuring the outer circumference of the tire frame to have the reinforcing layer formed by winding the coated cord member in the circumferential direction of the tire frame as such, the rigidity of the tire frame in the circumferential direction may be enhanced.

(6-2-4) In the tire of the sixth aspect of the invention, a thermoplastic resin material may be used as the resin material that is a component of the coated cord member.

By using the thermoplastic material having thermoplasticity as the resin material that is a component of the coated cord member as such, compared to a case of using a thermosetting material as the resin material, the tire is easily manufactured and is easily recycled.

(6-2-5) The tire of the sixth aspect of the invention may be configured so that, in the roughening treatment step, an area wider than the area for superposing the tire-constituting rubber member is subjected to the roughening treatment.

When the area wider than the area for superposing the tire-constituting rubber member is subjected to the roughening treatment in the roughening treatment step, the bonding strength between the tire frame and the tire-constituting rubber member may be reliably ensured.

(6-2-6) The tire of the sixth aspect of the invention may be configured so that, in the roughening treatment step, the outer circumferential surface is subjected to the roughening treatment to have an arithmetic mean roughness Ra of 0.05 mm or greater.

When the outer circumferential surface of the tire frame is subjected to the roughening treatment to have an arithmetic mean roughness Ra of 0.05 mm or greater in the roughening treatment step as such, in a case where the tire-constituting rubber member, for example, in an unvulcanized or semi-vulcanized state is superposed on the outer circumferential surface which has been subjected to the roughening treatment, via the bonding agent, and is vulcanized, rubber of the tire-constituting rubber member may be caused to flow to the bottom of the roughened uneven portion formed by the roughening treatment. When the rubber of the tire-constituting rubber member flows to the bottom of the roughened uneven portion, a sufficient anchor effect is exhibited between the outer circumferential surface and the tire-constituting rubber member, and the bonding strength between the tire frame and the tire-constituting rubber member may be enhanced.

(6-2-7) In the tire of the sixth aspect of the invention, a rubber in the unvulcanized or semi-vulcanized state may be used as the tire-constituting rubber member.

In the case where the rubber in the unvulcanized or semi-vulcanized state is used as the tire-constituting rubber member as such, the rubber flows to the roughened uneven portion formed on the outer circumferential surface of the tire frame by the roughening treatment when the tire-constituting rubber member is vulcanized. In addition, when vulcanization is completed, the anchor effect is exhibited by the (vulcanized) rubber that has flowed to the roughened uneven portion, and thus the bonding strength between the tire frame and the tire-constituting rubber member may be enhanced.

"Vulcanized" is referred to as a state in which the degree of vulcanization reaches the degree needed for a final product, and the "semi-vulcanized state" is referred to as a state in which the vulcanization degree is higher than the unvulcanized state but has not reached the degree needed for a final product."

(6-2-8) The tire of the sixth aspect of the invention may be configured to include: a circular tire frame that is formed using the resin material and has the outer circumferential surface which has been subjected to the roughening treatment by allowing a particle-shaped blasting abrasive to collide with the outer circumferential surface; and a tire-constituting rubber member superposed on the outer circumferential surface which has been subjected to the roughening treatment, via the bonding agent.

When the circular tire frame subjected to the roughening treatment is used as such, the bonding strength between the tire frame and the tire-constituting rubber member may be enhanced by the anchor effect. In addition, since the outer circumferential surface has been subjected to the roughening treatment, excellent wettability of the bonding agent is provided. Accordingly, the bonding agent is held in the state of being uniformly applied onto the outer circumferential surface of the tire frame, the bonding strength between the tire frame and the tire-constituting rubber member is ensured, and thus peeling between the tire frame and the tire-constituting rubber member may be suppressed.

While the specific modes of the sixth aspect of the invention are described using Embodiment 6-1 and Embodiment 6-2, the sixth aspect of the invention is not limited to the above-described modes.

The tire of the seventh aspect of the invention may be configured as follows as described in Embodiment 7-1.

(7-1-1) The tire of the seventh aspect of the invention may be configured so that at least a part of the reinforcing cord member is embedded in the outer circumference of the tire frame formed of a thermoplastic resin material in the present invention in the seventh aspect in the cross-sectional view along the axial direction of the tire frame.

When a part of the reinforcing cord member is embedded in the outer circumference of the tire frame as such, a phenomenon in which air remains in the area around the cord during winding of the reinforcing cord member (incorporation of air) may further be suppressed. When incorporation of air into the area around the reinforcing cord member is suppressed, movement of the reinforcing cord member due to, for example, a force applied during running is suppressed. Accordingly, for example, in the case where the tire-constituting member is provided on the outer circumference of the tire frame to cover the entire reinforcing cord member, since the movement of the reinforcing cord member is suppressed, an occurrence of peeling and the like between the members (including the tire frame) is suppressed, and durability is enhanced.

(7-1-2) The tire of the seventh aspect of the invention may be provided with a tread formed of a material having higher wear resistance than the thermoplastic resin material on the outer side in the radial direction of the reinforcing cord layer.

By having a configuration in which the tread that comes into contact with the road surface is formed of the material having higher wear resistance than the thermoplastic resin material as such, the wear resistance of the tire may further be enhanced.

(7-1-3) In the tire of the seventh aspect of the invention, ⅕ or more of the diameter of the reinforcing cord member may be embedded in the outer circumference of the tire frame along the circumferential direction in the cross-sectional view along the axial direction of the tire frame.

When ⅕ or more of the diameter of the reinforcing cord member is embedded in the outer circumference of the tire frame in the cross-sectional view along the axial direction of the tire frame, incorporation of air into the area around the reinforcing cord member may be effectively suppressed, and thus movement of the reinforcing cord member due to, for example, a force applied during running may further be suppressed.

(7-1-4) The tire of the seventh aspect of the invention may be configured so that the tire frame includes, on the inner side in the radial direction, a bead portion that comes into contact with a bead seat and a rim flange of a rim, and an annular bead core made of a metal material is embedded in the bead portion.

By providing the bead portion which is a part for fitting onto the rim in the tire frame, and moreover, by embedding the annular bead core made of the metal material in the bead portion as such, the tire frame (that is, tire) may be firmly held on the rim, similarly to conventional pneumatic tires made of rubber.

(7-1-5) The tire of the seventh aspect of the invention may be provided with a sealing portion made of a material having higher sealing properties (adhesion to the rim) than the thermoplastic resin material, in a part where the bead portion comes into contact with the rim.

By providing the sealing portion made of the material having higher sealing properties than the thermoplastic resin material in the part where the tire frame and the rim come into contact with each other as such, adhesion between the tire (the tire frame) and the rim may be enhanced. Accordingly, compared to a case where only the rim and the thermoplastic resin material are used, leakage of air in the tire may further be suppressed. In addition, by providing the sealing portion, fittability onto the rim of the tire may be enhanced.

(7-1-6) The manufacturing method of the tire of the seventh aspect of the invention may include: a tire frame piece forming step of forming a tire frame pieces for constituting a part of the circular tire frame using a thermoplastic resin material that includes a mixed material of at least a polyamide-based thermoplastic elastomer (for example, "UBESTA, XPA9055X1" made by Ube Industries, Ltd.) and a polyamide-based thermoplastic resin (for example, "UBESTA, 3014U" made by Ube Industries, Ltd.); a tire frame piece bonding step of forming a tire frame by fusing two or more tire frame pieces, which make a pair, by applying heat to the bonding surfaces of the tire frame pieces; and a reinforcing cord member winding step of winding a reinforcing cord member around the outer circumference of the tire frame in the circumferential direction to form the reinforcing cord layer.

(7-1-7) The manufacturing method of the tire may be configured so that, in the tire frame piece bonding step, the bonding surface of the tire frame piece is heated to a temperature equal to or higher than the melting point of the thermoplastic resin material that forms the tire frame piece.

When the bonding surface of the divided body is heated to a temperature equal to or higher than the melting point of the thermoplastic resin material that forms the tire frame piece as such, fusing between the tire frame pieces may be sufficiently performed. Therefore, productivity of the tire may be enhanced while enhancing durability of the tire.

(7-1-8) The manufacturing method of the tire may be configured so that, in the reinforcing cord member winding step, the reinforcing cord member is wound around the outer circumference of the tire frame in a manner such that at least a part of the reinforcing cord member is embedded while melting or softening the outer circumference of the tire frame formed in the tire frame piece bonding step.

By winding the reinforcing cord member around the outer circumference of the tire frame in a manner such that at least a part of the reinforcing cord member is embedded while melting and softening the outer circumference of the tire frame as such, at least the part of the reinforcing cord member which is embedded and the melted or softened thermoplastic resin material may be welded. Accordingly, incorporation of air between the outer circumference of the tire frame and the reinforcing cord member in the cross-sectional view along the axial direction of the tire frame may further be suppressed. In addition, when the part in which the reinforcing cord member is embedded is cooled and solidified, the fixed condition of the reinforcing cord member embedded in the tire frame is enhanced.

(7-1-9) The manufacturing method of the tire may be configured so that, in the reinforcing cord member winding step, ⅕ or more of the diameter of the reinforcing cord may be embedded in the outer circumference of the tire frame in the cross-sectional view along the axial direction of the tire frame.

When ⅕ or more of the diameter of the reinforcing cord member is embedded in the outer circumference of the tire frame in the cross-sectional view along the axial direction of the tire frame, incorporation of air into the area around the reinforcing cord during manufacturing may be effectively suppressed, and moreover, the embedded reinforcing cord member may become less likely to be caused to come out of the tire frame.

(7-1-10) The manufacturing method of the tire may be configured so that, in the reinforcing cord member winding step, the heated reinforcing cord member is embedded in the tire frame.

By embedding the reinforcing cord member in the tire frame while heating the reinforcing cord member in the reinforcing cord winding step as such, when the heated reinforcing cord member comes into contact with the outer circumference of the tire frame, the contact part is melted or softened. Therefore, it becomes easy to embed the reinforcing cord member in the outer circumference of the tire frame.

(7-1-11) The manufacturing method of the tire may be configured so that, in the cord member winding step, the part of the outer circumference of the tire frame for embedding the reinforcing cord member is heated.

By heating the part of the outer circumference of the tire frame for embedding the reinforcing cord member as such, the heated part of the tire frame is melted or softened. Therefore, it becomes easy to embed the reinforcing cord member.

(7-1-12) The manufacturing method of the tire may be configured so that, in the cord member winding step, the reinforcing cord member is wound in a spiral shape in the circumferential direction of the outer circumference of the tire frame while pressing the reinforcing cord member against the outer circumference of the tire frame.

When the reinforcing cord member is wound in the spiral shape while pressing the reinforcing cord member against the outer circumference of the tire frame as such, the depth of embedding the reinforcing cord member in the outer circumference of the tire frame may be adjusted.

(7-1-13) According to the manufacturing method, it may be configured such that, in the cord member winding step, after winding the reinforcing cord member around the tire frame, the melted or softened part of the outer circumference of the tire frame is cooled.

By forcibly cooling the melted or softened part of the outer circumference of the tire frame after embedding the reinforcing cord member as such, the melted or softened part of the outer circumference of the tire frame may be more quickly and rapidly cooled and solidified than natural cooling. By cooling the outer circumference of the tire more quickly than natural cooling, deformation of the outer circumference of the tire frame may be suppressed, and movement of the reinforcing cord member may be suppressed.

The tire of the seventh aspect of the invention may be configured as follows as described in Embodiment 7-2.

(7-2-1) The tire of the seventh aspect of the invention may be configured so that the manufacturing method further includes: a roughening treatment step of performing the roughening treatment on the outer circumferential surface of the tire frame by allowing a particle-shaped blasting abrasive to collide with the outer circumferential surface of the tire frame; and a superposing step of superposing a tire-constituting rubber member on the outer circumferential surface which has been subjected to the roughening treatment, via a bonding agent.

When the roughening treatment step is provided as such, the particle-shaped blasting abrasive collides with the outer circumferential surface of the circular tire frame formed using a thermoplastic resin material, and thus minute roughened unevenness is formed on the outer circumferential surface. The treatment of forming minute roughened unevenness by allowing the blasting abrasive to collide with the outer circumferential surface of the tire frame is referred to as the roughening treatment. Thereafter, the tire-constituting rubber member is superposed on the outer circumferential surface which has been subjected to the roughening treatment, via the bonding agent. Here, when the tire frame and the tire-constituting rubber member are integrated into each other, since the outer circumferential surface of the tire frame has been subjected to the roughening treatment, bonding properties (adhesiveness) are enhanced due to the anchor effect. In addition, since the resin material that forms the tire frame is ploughed due to collision of the blasting abrasive, wettability of the outer circumferential surface is enhanced. Accordingly, the outer circumferential surface of the tire frame is held in a state of being uniformly coated with the bonding agent, and thus the bonding strength between the tire frame and the tire-constituting rubber member may be ensured.

(7-2-2) In the tire of the seventh aspect of the invention, at least a part of the outer circumferential surface of the tire frame may be an uneven portion, and the uneven portion may be subjected to the roughening treatment in the roughening treatment step.

Even if at least a part of the outer circumferential surface of the tire frame is the uneven portion as such, by allowing the blasting abrasive to collide with the uneven portion, the area around a recess (walls at the recess, the bottom of the recess)

is subjected to the roughening treatment, and thus the bonding strength between the tire frame and the tire-constituting rubber member may be ensured.

(7-2-3) In the tire of the seventh aspect of the invention, the outer circumference of the tire frame is configured to have a reinforcing layer that constitutes the uneven portion at the outer circumferential surface, and the reinforcing layer may be configured such that a coated cord member formed by coating a reinforcing cord with a resin material of the same kind as or different from the resin material that forms the tire frame, is wound in the circumferential direction of the tire frame.

By configuring the outer circumference of the tire frame to have the reinforcing layer formed by winding the coated cord member in the circumferential direction of the tire frame as such, the rigidity of the tire frame in the circumferential direction may be enhanced.

(7-2-4) In the tire of the seventh aspect of the invention, a thermoplastic resin material may be used as the resin material that is a component of the coated cord member.

By using the thermoplastic material having thermoplasticity as the resin material that is a component of the coated cord member as such, compared to a case of using a thermosetting material as the resin material, the tire is easily manufactured and is easily recycled.

(7-2-5) The tire of the seventh aspect of the invention may be configured so that, in the roughening treatment step, an area wider than the area for superposing the tire-constituting rubber member is subjected to the roughening treatment.

When the area wider than the area for superposing the tire-constituting rubber member is subjected to the roughening treatment in the roughening treatment step, the bonding strength between the tire frame and the tire-constituting rubber member may be reliably ensured.

(7-2-6) The tire of the seventh aspect of the invention may be configured so that, in the roughening treatment step, the outer circumferential surface is subjected to the roughening treatment to have an arithmetic mean roughness Ra of 0.05 mm or greater.

When the outer circumferential surface of the tire frame is subjected to the roughening treatment to have an arithmetic mean roughness Ra of 0.05 mm or greater in the roughening treatment step as such, in a case where the tire-constituting rubber member, for example, in an unvulcanized or semi-vulcanized state is superposed on the outer circumferential surface which has been subjected to the roughening treatment, via the bonding agent, and is vulcanized, rubber of the tire-constituting rubber member may be caused to flow to the bottom of the roughened uneven portion formed by the roughening treatment. When the rubber of the tire-constituting rubber member flows to the bottom of the roughened uneven portion, a sufficient anchor effect is exhibited between the outer circumferential surface and the tire-constituting rubber member, and the bonding strength between the tire frame and the tire-constituting rubber member may be enhanced.

(7-2-7) In the tire of the seventh aspect of the invention, a rubber in the unvulcanized or semi-vulcanized state may be used as the tire-constituting rubber member.

In the case where the rubber in the unvulcanized or semi-vulcanized state is used as the tire-constituting rubber member as such, the rubber flows to the roughened uneven portion formed on the outer circumferential surface of the tire frame by the roughening treatment when the tire-constituting rubber member is vulcanized. In addition, when vulcanization is completed, the anchor effect is exhibited by the (vulcanized) rubber that has flowed to the roughened uneven portion, and thus the bonding strength between the tire frame and the tire-constituting rubber member may be enhanced.

"Vulcanized" is referred to as a state in which the degree of vulcanization reaches the degree needed for a final product, and the "semi-vulcanized state" is referred to as a state in which the vulcanization degree is higher than the unvulcanized state but has not reached the degree needed for a final product.

(7-2-8) The tire of the seventh aspect of the invention may be configured to include: a circular tire frame that is formed using the thermoplastic resin material in the seventh aspect of the present invention and has the outer circumferential surface which has been subjected to the roughening treatment by allowing a particle-shaped blasting abrasive to collide with the outer circumferential surface; and a tire-constituting rubber member superposed on the outer circumferential surface which has been subjected to the roughening treatment, via a bonding agent.

When the circular tire frame which has been subjected to the roughening treatment is used as such, the bonding strength between the tire frame and the tire-constituting rubber member may be enhanced by the anchor effect. In addition, since the outer circumferential surface has been subjected to the roughening treatment, excellent wettability of the bonding agent is provided. Accordingly, the bonding agent is held in the state of being uniformly applied onto the outer circumferential surface of the tire frame, the bonding strength between the tire frame and the tire-constituting rubber member is ensured, and thus peeling between the tire frame and the tire-constituting rubber member may be suppressed.

The tire of the eighth aspect of the invention may be configured as follows as described in Embodiment 8-1.

(8-1-1) The tire of the eighth aspect of the invention may be configured so that at least a part of the reinforcing cord member is embedded in the outer circumference of the tire frame formed of the thermoplastic resin material in the cross-sectional view along the axial direction of the tire frame.

When a part of the reinforcing cord member is embedded in the outer circumference of the tire frame as such, a phenomenon in which air remains in the area around the cord during winding of the reinforcing cord member (incorporation of air) may further be suppressed. When incorporation of air into the area around the reinforcing cord member is suppressed, movement of the reinforcing cord member due to, for example, a force applied during running is suppressed. Accordingly, for example, in the case where the tire-constituting member is provided in the outer circumference of the tire frame to cover the entire reinforcing cord member, since the movement of the reinforcing cord member is suppressed, an occurrence of peeling and the like between the members (including the tire frame) is suppressed, and durability is enhanced.

(8-1-2) The tire of the eighth aspect of the invention may be provided with a tread formed of a material having higher wear resistance than the thermoplastic resin material on the outer side in the radial direction of the reinforcing cord layer.

By having a configuration in which the tread that comes into contact with the road surface is formed of the material having higher wear resistance than the thermoplastic resin material as such, the wear resistance of the tire may further be enhanced.

(8-1-3) In the tire of the eighth aspect of the invention, ⅕ or more of the diameter of the reinforcing cord member may be embedded in the outer circumference of the tire frame along the circumferential direction in the cross-sectional view along the axial direction of the tire frame.

When ⅕ or more of the diameter of the reinforcing cord member is embedded in the outer circumference of the tire frame in the cross-sectional view along the axial direction of the tire frame, incorporation of air into the area around the reinforcing cord member may be effectively suppressed, and thus movement of the reinforcing cord member due to, for example, a force applied during running may further be suppressed.

(8-1-4) The tire of the eighth aspect of the invention may be configured so that the tire frame includes, on the inner side in the radial direction, a bead portion that comes into contact with a bead seat and a rim flange of a rim, and an annular bead core made of a metal material is embedded in the bead portion.

By providing the bead portion which is a part for fitting onto the rim in the tire frame, and moreover, by embedding the annular bead core made of a metal material in the bead portion as such, the tire frame (that is, tire) may be firmly held on the rim, similarly to conventional pneumatic tires made of rubber.

(8-1-5) The tire of the eighth aspect of the invention may be provided with a sealing portion made of a material having higher sealing properties (adhesion to the rim) than the thermoplastic resin material, in a part where the bead portion comes into contact with the rim.

By providing the sealing portion made of the material having higher sealing properties than the thermoplastic resin material in the part where the tire frame and the rim come into contact with each other as such, adhesion between the tire (the tire frame) and the rim may be enhanced. Accordingly, compared to a case where only the rim and the thermoplastic resin material are used, leakage of air in the tire may further be suppressed. In addition, by providing the sealing portion, fittability onto the rim of the tire may be enhanced.

(8-1-6) The tire of the eighth aspect of the invention may be manufactured according to a manufacturing method that includes: a tire frame piece forming step of forming a tire frame piece for constituting a part of the circular tire frame using at least a resin material; a tire frame piece bonding step of forming a tire by fusing two or more tire frame pieces, which make a pair, by applying heat to the bonding surfaces of the tire frame pieces; and a reinforcing cord member winding step of winding a reinforcing cord layer around the outer circumference of the tire frame in the circumferential direction to form a reinforcing cord layer.

(8-1-7) The manufacturing method of the tire may be configured so that, in the tire frame piece bonding step, the bonding surface of the tire frame piece is heated to a temperature equal to or higher than the melting point (for example, the melting point +10° C. to +150° C.) of the thermoplastic resin material that forms the tire frame piece.

When the bonding surface of the divided body is heated to a temperature equal to or higher than the melting point of the thermoplastic resin material that forms the tire frame piece as such, fusing between the tire frame pieces may be sufficiently performed. Therefore, productivity of the tire may be enhanced while enhancing durability of the tire.

(8-1-8) The manufacturing method of the tire may be configured so that, in the reinforcing cord member winding step, the reinforcing cord member is wound around the outer circumference of the tire frame in a manner such that at least a part of the reinforcing cord member is embedded while melting or softening the outer circumference of the tire frame formed in the tire frame piece bonding step.

By winding the reinforcing cord member around the outer circumference of the tire frame in a manner such that at least a part of the reinforcing cord member is embedded while melting and softening the outer circumference of the tire frame as such, the at least a part of the reinforcing cord member which is embedded and the melted or softened thermoplastic resin material may be welded. Accordingly, incorporation of air between the outer circumference of the tire frame and the reinforcing cord member in the cross-sectional view along the axial direction of the tire frame may further be suppressed. In addition, when the part in which the reinforcing cord member is embedded is cooled and solidified, the fixed condition of the reinforcing cord member embedded in the tire frame is enhanced.

(8-1-9) The manufacturing method of the tire may be configured so that, in the reinforcing cord member winding step, ⅕ or more of the diameter of the reinforcing cord may be embedded in the outer circumference of the tire frame in the cross-sectional view along the axial direction of the tire frame.

When ⅕ or more of the diameter of the reinforcing cord member is embedded in the outer circumference of the tire frame in the cross-sectional view along the axial direction of the tire frame, incorporation of air into the area around the reinforcing cord during manufacturing may be effectively suppressed, and moreover, the embedded reinforcing cord member may become less likely to be caused to come out of the tire frame.

(8-1-10) The manufacturing method of the tire may be configured so that, in the reinforcing cord member winding step, the heated reinforcing cord member is embedded in the tire frame.

By embedding the reinforcing cord member in the tire frame while heating the reinforcing cord member in the reinforcing cord winding step as such, when the heated reinforcing cord member comes into contact with the outer circumference of the tire frame, the contact part is melted or softened. Therefore, it becomes easy to embed the reinforcing cord member in the outer circumference of the tire frame.

(8-1-11) The manufacturing method of the tire may be configured so that, in the cord member winding step, the part of the outer circumference of the tire frame for embedding the reinforcing cord member is heated.

By heating the part of the outer circumference of the tire frame for embedding the reinforcing cord member as such, the heated part of the tire frame is melted or softened. Therefore, it becomes easy to embed the reinforcing cord member.

(8-1-12) The manufacturing method of the tire may be configured so that, in the cord member winding step, the reinforcing cord member is wound in a spiral shape in the circumferential direction of the outer circumference of the tire frame while adjusting the tension of the reinforcing cord member to be a predetermined value.

By winding the reinforcing cord member in the spiral shape around the outer circumference of the tire frame while adjusting the tension of the reinforcing cord member to be a predetermined value as such, the depth of embedding the reinforcing cord member in the outer circumference of the tire frame may be adjusted, and moreover, meandering of the reinforcing cord member during winding thereof may be suppressed.

(8-1-13) The manufacturing method of the tire may be configured so that, in the cord member winding step, the reinforcing cord member is wound in a spiral shape in the circumferential direction of the outer circumference of the tire frame while pressing the reinforcing cord member against the outer circumference of the tire frame.

When the reinforcing cord member is wound in the spiral shape while pressing the reinforcing cord member against the outer circumference of the tire frame as such, the depth of embedding the reinforcing cord member in the outer circumference of the tire frame may be adjusted.

(8-1-14) According to the manufacturing method, it may be configured such that, in the cord member winding step, after winding the reinforcing cord member around the tire frame, the melted or softened part of the outer circumference of the tire frame is cooled.

By forcibly cooling the melted or softened part of the outer circumference of the tire frame after embedding the reinforcing cord member as such, the melted or softened part of the outer circumference of the tire frame may be more quickly and rapidly cooled and solidified than natural cooling. By cooling the outer circumference of the tire more quickly than natural cooling, deformation of the outer circumference of the tire frame may be suppressed, and movement of the reinforcing cord member may be suppressed.

The tire of the eighth aspect of the invention may be configured as follows as described in Embodiment 8-2.

(8-2-1) The tire of the eighth aspect of the invention may be configured such that the manufacturing method further includes: a roughening treatment step of performing the roughening treatment on the outer circumferential surface of the tire frame by allowing a particle-shaped blasting abrasive to collide with the outer circumferential surface of the tire frame; and a superposing step of superposing a tire-constituting rubber member on the outer circumferential surface which has been subjected to the roughening treatment, via a bonding agent.

When the roughening treatment step is provided as such, the particle-shaped blasting abrasive collides with the outer circumferential surface of the circular tire frame formed by using the resin material, and thus minute roughened unevenness is formed on the outer circumferential surface. The treatment of forming minute roughened unevenness by allowing the blasting abrasive to collide with the outer circumferential surface of the tire frame is referred to as the roughening treatment. Thereafter, the tire-constituting rubber member is superposed on the outer circumferential surface which has been subjected to the roughening treatment, via the bonding agent. Here, when the tire frame and the tire-constituting rubber member are integrated into each other, since the outer circumferential surface of the tire frame has been subjected to the roughening treatment, bonding properties (adhesiveness) are enhanced due to the anchor effect. In addition, since the resin material that forms the tire frame is ploughed due to collision of the blasting abrasive, wettability of the outer circumferential surface is enhanced. Accordingly, the outer circumferential surface of the tire frame is held in a state of being uniformly coated with the bonding agent, and thus the bonding strength between the tire frame and the tire-constituting rubber member may be ensured.

(8-2-2) In the tire of the eighth aspect of the invention, at least a part of the outer circumferential surface of the tire frame may be an uneven portion, and the uneven portion may be subjected to the roughening treatment in the roughening treatment step.

Even if at least a part of the outer circumferential surface of the tire frame is the uneven portion as such, by allowing the blasting abrasive to collide with the uneven portion, the area around a recess (walls at the recess, the bottom of the recess) is subjected to the roughening treatment, and thus the bonding strength between the tire frame and the tire-constituting rubber member may be ensured.

(8-2-3) In the tire of the eighth aspect of the invention, the outer circumference of the tire frame is configured to have a reinforcing layer that constitutes the uneven portion at the outer circumferential surface, and the reinforcing layer may be configured such that a coated cord member formed by coating the reinforcing cord with a resin material of the same kind as or different from the resin material that forms the tire frame is wound in the circumferential direction of the tire frame.

By configuring the outer circumference of the tire frame to have the reinforcing layer formed by winding the coated cord member in the circumferential direction of the tire frame as such, the rigidity of the tire frame in the circumferential direction may be enhanced.

(8-2-4) In the tire of the eighth aspect of the invention, a thermoplastic resin material may be used as the resin material that is a component of the coated cord member.

By using the thermoplastic material having thermoplasticity as the resin material that is a component of the coated cord member as such, compared to a case of using a thermosetting material as the resin material, the tire is easily manufactured and is easily recycled.

(8-2-5) The tire of the eighth aspect of the invention may be configured so that, in the roughening treatment step, an area wider than the area for superposing the tire-constituting rubber member is subjected to the roughening treatment.

When the area wider than the area for superposing the tire-constituting rubber member is subjected to the roughening treatment in the roughening treatment step, the bonding strength between the tire frame and the tire-constituting rubber member may be reliably ensured.

(8-2-6) The tire of the eighth aspect of the invention may be configured so that, in the roughening treatment step, the outer circumferential surface is subjected to the roughening treatment to have an arithmetic mean roughness Ra of 0.05 mm or greater.

When the outer circumferential surface of the tire frame is subjected to the roughening treatment to have an arithmetic mean roughness Ra of 0.05 mm or greater in the roughening treatment step as such, in a case where the tire-constituting rubber member, for example, in an unvulcanized or semi-vulcanized state is superposed on the outer circumferential surface which has been subjected to the roughening treatment, via the bonding agent, and is vulcanized, rubber of the tire-constituting rubber member may be caused to flow to the bottom of the roughened uneven portion formed by the roughening treatment. When the rubber of the tire-constituting rubber member flows to the bottom of the roughened uneven portion, a sufficient anchor effect is exhibited between the outer circumferential surface and the tire-constituting rubber member, and the bonding strength between the tire frame and the tire-constituting rubber member may be enhanced.

(8-2-7) In the tire of the eighth aspect of the invention, the blasting abrasive may be configured to use a material that is vaporized into a gas from a solid in the air.

When the material that is vaporized into a gas from a solid in the air is used as the blasting abrasive, after the roughening treatment of the outer circumferential surface of the tire frame, the blasting abrasive is vaporized into a gas from a solid in the air, and thus the blasting abrasive does not remain on the outer circumferential surface of the tire frame. Accordingly, an operation of removing the blasting abrasive that remains on the outer circumferential surface of the tire frame, and the like are not necessary, and complexity of the operation may be improved.

(8-2-8) In the tire of the eighth aspect of the invention, a rubber in the unvulcanized or semi-vulcanized state may be used as the tire-constituting rubber member.

In the case where the rubber in the unvulcanized or semi-vulcanized state is used as the tire-constituting rubber member as such, the rubber flows to the roughened uneven portion formed on the outer circumferential surface of the tire frame by the roughening treatment when the tire-constituting rubber member is vulcanized. In addition, when vulcanization is completed, the anchor effect is exhibited by the (vulcanized) rubber that has flowed to the roughened uneven portion, and thus the bonding strength between the tire frame and the tire-constituting rubber member may be enhanced.

"Vulcanized" is referred to as a state in which the degree of vulcanization reaches the degree needed for a final product, and the "semi-vulcanized state" is referred to as a state in which the vulcanization degree is higher than the unvulcanized state but has not reached the degree needed for a final product.

(8-2-9) The tire of the eighth aspect of the invention may be configured to include: a circular tire frame that is formed using a resin material and has the outer circumferential surface which has been subjected to the roughening treatment by allowing a particle-shaped blasting abrasive to collide with the outer circumferential surface; and a tire-constituting rubber member superposed on the outer circumferential surface which has been subjected to the roughening treatment, via the bonding agent.

When the circular tire frame which has been subjected to the roughening treatment is used as such, the bonding strength between the tire frame and the tire-constituting rubber member may be enhanced by the anchor effect. In addition, since the outer circumferential surface has been subjected to the roughening treatment, excellent wettability of the bonding agent is provided. Accordingly, the bonding agent is held in the state of being uniformly applied onto the outer circumferential surface of the tire frame, the bonding strength between the tire frame and the tire-constituting rubber member is ensured, and thus peeling between the tire frame and the tire-constituting rubber member may be suppressed.

The tire of the ninth aspect of the invention may be configured as follows as described in Embodiment 9-1.

(9-1-1) The tire of the ninth aspect of the invention may be configured so that at least a part of the reinforcing cord member is embedded in the outer circumference of the tire frame formed of the thermoplastic resin material in the cross-sectional view along the axial direction of the tire frame.

When a part of the reinforcing cord member is embedded in the outer circumference of the tire frame as such, a phenomenon in which air remains in the area around the cord during winding of the reinforcing cord member (incorporation of air) may further be suppressed. When incorporation of air into the area around the reinforcing cord member is suppressed, movement of the reinforcing cord member due to, for example, a force applied during running is suppressed. Accordingly, for example, in the case where the tire-constituting member is provided on the outer circumference of the tire frame to cover the entire reinforcing cord member, since the movement of the reinforcing cord member is suppressed, an occurrence of peeling and the like between the members (including the tire frame) is suppressed, and durability is enhanced.

(9-1-2) The tire of the ninth aspect of the invention may be provided with a tread formed of a material having higher wear resistance than the thermoplastic resin material, on the outer side in the radial direction of the reinforcing cord layer.

By having a configuration in which the tread that comes into contact with the road surface is formed of the material having higher wear resistance than the thermoplastic resin material as such, the wear resistance of the tire may further be enhanced.

(9-1-3) In the tire of the ninth aspect of the invention, ⅕ or more of the diameter of the reinforcing cord member may be embedded in the outer circumference of the tire frame along the circumferential direction in the cross-sectional view along the axial direction of the tire frame.

When ⅕ or more of the diameter of the reinforcing cord member is embedded in the outer circumference of the tire frame in the cross-sectional view along the axial direction of the tire frame, incorporation of air into the area around the reinforcing cord member may be effectively suppressed, and thus movement of the reinforcing cord member due to, for example, a force applied during running may further be suppressed.

(9-1-4) The tire of the ninth aspect of the invention may be configured so that the tire frame includes, on the inner side in the radial direction, a bead portion that comes into contact with a bead seat and a rim flange of a rim, and an annular bead core made of a metal material is embedded in the bead portion.

By providing the bead portion which is a part for fitting onto the rim in the tire frame, and moreover, by embedding the annular bead core made of the metal material in the bead portion as such, the tire frame (that is, tire) may be firmly held on the rim, similarly to conventional pneumatic tires made of rubber.

(9-1-5) The tire of the ninth aspect of the invention may be provided with a sealing portion made of a material having higher sealing properties (adhesion to the rim) than the thermoplastic resin material, in a part where the bead portion comes into contact with the rim.

By providing the sealing portion made of the material having higher sealing properties than the thermoplastic resin material in the part where the tire frame and the rim come into contact with each other as such, adhesion between the tire (the tire frame) and the rim may be enhanced. Accordingly, compared to a case where only the rim and the thermoplastic resin material are used, leakage of air in the tire may further be suppressed. In addition, by providing the sealing portion, fittability onto the rim of the tire may be enhanced.

(9-1-6) The tire of the ninth aspect of the invention may be manufactured according to a manufacturing method that includes: a tire frame piece forming step of forming a tire frame piece for constituting a part of the circular tire frame using at least a resin material; the tire frame piece bonding step of forming a tire frame by fusing two or more tire frame pieces, which make a pair, by applying heat to the bonding surfaces of the tire frame pieces to form the tire frame; and a reinforcing cord member winding step of winding a reinforcing cord member around the outer circumference of the tire frame in the circumferential direction to form a reinforcing cord layer.

(9-1-7) The manufacturing method of the tire may be configured so that, in the tire frame piece bonding step, the bonding surface of the tire frame piece is heated to a temperature equal to or higher than the melting point (for example, the melting point +10° C. to +150° C.) of the thermoplastic resin material that forms the tire frame piece.

When the bonding surface of the divided body is heated to a temperature equal to or higher than the melting point of the thermoplastic resin material that forms the tire frame piece as such, fusing between the tire frame pieces may be sufficiently performed. Therefore, productivity of the tire may be enhanced while enhancing durability of the tire.

(9-1-8) The manufacturing method of the tire may be configured so that, in the reinforcing cord member winding step, the reinforcing cord member is wound around the outer circumference of the tire frame in a manner such that at least a part of the reinforcing cord member is embedded while melting or softening the outer circumference of the tire frame formed in the tire frame piece bonding step.

By winding the reinforcing cord member around the outer circumference of the tire frame in manner such that at least a part of the reinforcing cord member is embedded while melting and softening the outer circumference of the tire frame as such, the at least a part of the reinforcing cord member which is embedded and the melted or softened thermoplastic resin material may be welded. Accordingly, incorporation of air between the outer circumference of the tire frame and the reinforcing cord member in the cross-sectional view along the axial direction of the tire frame may further be suppressed. In addition, when the part in which the reinforcing cord member is embedded is cooled and solidified, the fixed condition of the reinforcing cord member embedded in the tire frame is enhanced.

(9-1-9) The manufacturing method of the tire may be configured so that, in the reinforcing cord member winding step, 1/5 or more of the diameter of the reinforcing cord may be embedded in the outer circumference of the tire frame in the cross-sectional view along the axial direction of the tire frame.

When 1/5 or more of the diameter of the reinforcing cord member is embedded in the outer circumference of the tire frame in the cross-sectional view along the axial direction of the tire frame, incorporation of air into the area around the reinforcing cord during manufacturing may be effectively suppressed, and moreover, the embedded reinforcing cord member may become less likely to be caused to come out of the tire frame.

(9-1-10) The manufacturing method of the tire may be configured so that, in the reinforcing cord member winding step, the heated reinforcing cord member is embedded in the tire frame.

By embedding the reinforcing cord member in the tire frame while heating the reinforcing cord member in the reinforcing cord winding step as such, when the heated reinforcing cord member comes into contact with the outer circumference of the tire frame, the contact part is melted or softened. Therefore, it becomes easy to embed the reinforcing cord member in the outer circumference of the tire frame.

(9-1-11) The manufacturing method of the tire may be configured so that, in the cord member winding step, the part of the outer circumference of the tire frame for embedding the reinforcing cord member is heated.

By heating the part of the outer circumference of the tire frame for embedding the reinforcing cord member as such, the heated part of the tire frame is melted or softened. Therefore, it becomes easy to embed the reinforcing cord member.

(9-1-12) The manufacturing method of the tire may be configured so that, in the cord member winding step, the reinforcing cord member is wound in a spiral shape in the circumferential direction of the outer circumference of the tire frame while adjusting the tension of the reinforcing cord member to be a predetermined value.

By winding the reinforcing cord member in the spiral shape around the outer circumference of the tire frame while adjusting the tension of the reinforcing cord member to be a predetermined value as such, the depth of embedding the reinforcing cord member in the outer circumference of the tire frame may be adjusted, and moreover, meandering of the reinforcing cord member during winding thereof may be suppressed.

(9-1-13) The manufacturing method of the tire may be configured so that, in the cord member winding step, the reinforcing cord member is wound in a spiral shape in the circumferential direction of the outer circumference of the tire frame while pressing the reinforcing cord member against the outer circumference of the tire frame.

When the reinforcing cord member is wound in the spiral shape while pressing the reinforcing cord member against the outer circumference of the tire frame as such, the depth of embedding the reinforcing cord member in the outer circumference of the tire frame may be adjusted.

(9-1-14) According to the manufacturing method, it may be configured such that, in the cord member winding step, after winding the reinforcing cord member around the tire frame, the melted or softened part of the outer circumference of the tire frame is cooled.

By forcibly cooling the melted or softened part of the outer circumference of the tire frame after embedding the reinforcing cord member as such, the melted or softened part of the outer circumference of the tire frame may be more quickly and rapidly cooled and solidified than natural cooling. By cooling the outer circumference of the tire more quickly than natural cooling, deformation of the outer circumference of the tire frame may be suppressed, and movement of the reinforcing cord member may be suppressed.

The tire of the ninth aspect of the invention may be configured as follows as described in Embodiment 9-2.

(9-2-1) The tire of the ninth aspect of the invention may be configured such that the manufacturing method further includes: a roughening treatment step of performing the roughening treatment on the outer circumferential surface of the tire frame by allowing a particle-shaped blasting abrasive to collide with the outer circumferential surface of the tire frame; and a superposing step of superposing a tire-constituting rubber member on the outer circumferential surface which has been subjected to the roughening treatment, via a bonding agent.

When the roughening treatment step is provided as such, the particle-shaped blasting abrasive collides with the outer circumferential surface of the circular tire frame formed using the resin material, and thus minute roughened unevenness is formed on the outer circumferential surface. The treatment of forming minute roughened unevenness by allowing the blasting abrasive to collide with the outer circumferential surface of the tire frame is referred to as the roughening treatment. Thereafter, the tire-constituting rubber member is superposed on the outer circumferential surface which has been subjected to the roughening treatment, via the bonding agent. Here, when the tire frame and the tire-constituting rubber member are integrated into each other, since the outer circumferential surface of the tire frame has been subjected to the roughening treatment, bonding properties (bonding properties) are enhanced due to the anchor effect. In addition, since the resin material that forms the tire frame is ploughed due to collision of the blasting abrasive, wettability of the outer circumferential surface is enhanced. Accordingly, the outer circumferential surface of the tire frame is held in a state of being uniformly coated with the bonding agent, and thus the bonding strength between the tire frame and the tire-constituting rubber member may be ensured.

(9-2-2) In the tire of the ninth aspect of the invention, at least a part of the outer circumferential surface of the tire frame may be an uneven portion, and the uneven portion may be subjected to the roughening treatment in the roughening treatment step.

Even if at least a part of the outer circumferential surface of the tire frame is the uneven portion as such, by allowing the blasting abrasive to collide with the uneven portion, the area around a recess (walls at the recess, the bottom of the recess)

is subjected to the roughening treatment, and thus the bonding strength between the tire frame and the tire-constituting rubber member may be ensured.

(9-2-3) In the tire of the ninth aspect of the invention, the outer circumference of the tire frame is configured to have a reinforcing layer that constitutes the uneven portion at the outer circumferential surface, and the reinforcing layer may be configured such that a coated cord member formed by coating the reinforcing cord with a resin material of the same kind as or different from the resin material that forms the tire frame is wound in the circumferential direction of the tire frame.

By configuring the outer circumference of the tire frame to have the reinforcing layer formed by winding the coated cord member in the circumferential direction of the tire frame as such, the rigidity of the tire frame in the circumferential direction may be enhanced.

(9-2-4) In the tire of the ninth aspect of the invention, a thermoplastic resin material may be used as the resin material that is a component of the coated cord member.

By using the thermoplastic material having thermoplasticity as the resin material that is a component of the coated cord member as such, compared to a case of using a thermosetting material as the resin material, the tire is easily manufactured and is easily recycled.

(9-2-5) The tire of the ninth aspect of the invention may be configured so that, in the roughening treatment step, an area wider than the area for superposing the tire-constituting rubber member is subjected to the roughening treatment.

When the area wider than the area for superposing the tire-constituting rubber member is subjected to the roughening treatment in the roughening treatment step, the bonding strength between the tire frame and the tire-constituting rubber member may be reliably ensured.

(9-2-6) The tire of the ninth aspect of the invention may be configured so that, in the roughening treatment step, the outer circumferential surface is subjected to the roughening treatment to have an arithmetic mean roughness Ra of 0.05 mm or greater.

When the outer circumferential surface of the tire frame is subjected to the roughening treatment to have an arithmetic mean roughness Ra of 0.05 mm or greater in the roughening treatment step as such, in a case where the tire-constituting rubber member, for example, in an unvulcanized or semi-vulcanized state is superposed on the outer circumferential surface which has been subjected to the roughening treatment, via the bonding agent, and is vulcanized, rubber of the tire-constituting rubber member may be caused to flow to the bottom of the roughened uneven portion formed by the roughening treatment. When the rubber of the tire-constituting rubber member flows to the bottom of the roughened uneven portion, a sufficient anchor effect is exhibited between the outer circumferential surface and the tire-constituting rubber member, and the bonding strength between the tire frame and the tire-constituting rubber member may be enhanced.

(9-2-7) In the tire of the ninth aspect of the invention, the blasting abrasive may be configured to use a material that is vaporized into a gas from a solid in the air.

When the material that is vaporized into a gas from a solid in the air is used as the blasting abrasive, after the roughening treatment of the outer circumferential surface of the tire frame, the blasting abrasive is vaporized into a gas from a solid in the air, and thus the blasting abrasive does not remain on the outer circumferential surface of the tire frame. Accordingly, an operation of removing the blasting abrasive that remains on the outer circumferential surface of the tire frame, and the like are not necessary, and complexity of the operation may be improved.

(9-2-8) In the tire of the ninth aspect of the invention, a rubber in the unvulcanized or semi-vulcanized state may be used as the tire-constituting rubber member.

In the case where the rubber in the unvulcanized or semi-vulcanized state is used as the tire-constituting rubber member as such, the rubber flows to the roughened uneven portion formed on the outer circumferential surface of the tire frame by the roughening treatment when the tire-constituting rubber member is vulcanized. In addition, when vulcanization is completed, the anchor effect is exhibited by the (vulcanized) rubber that has flowed to the roughened uneven portion, and thus the bonding strength between the tire frame and the tire-constituting rubber member may be enhanced.

"Vulcanized" is referred to as a state in which the degree of vulcanization reaches the degree needed for a final product, and the "semi-vulcanized state" is referred to as a state in which the vulcanization degree is higher than the unvulcanized state but has not reached the degree needed for a final product.

(9-2-9) The tire of the ninth aspect of the invention may be configured to include: a circular tire frame that is formed using a resin material and has the outer circumferential surface which has been subjected to the roughening treatment by allowing a particle-shaped blasting abrasive to collide with the outer circumferential surface; and a tire-constituting rubber member superposed on the outer circumferential surface which has been subjected to the roughening treatment, via the bonding agent.

When the circular tire frame which has been subjected to the roughening treatment is used as such, the bonding strength between the tire frame and the tire-constituting rubber member may be enhanced by the anchor effect. In addition, since the outer circumferential surface has been subjected to the roughening treatment, excellent wettability of the bonding agent is provided. Accordingly, the bonding agent is held in the state of being uniformly applied onto the outer circumferential surface of the tire frame, the bonding strength between the tire frame and the tire-constituting rubber member is ensured, and thus peeling between the tire frame and the tire-constituting rubber member may be suppressed.

The tire of the tenth aspect of the invention may be configured as follows as described in Embodiment 10-1.

(10-1-1) The tire of the tenth aspect of the invention may be configured so that at least a part of the reinforcing cord member is embedded in the outer circumference of the tire frame formed of a thermoplastic resin material in the tenth aspect of the invention in the cross-sectional view along the axial direction of the tire frame.

When a part of the reinforcing cord member is embedded in the outer circumference of the tire frame as such, a phenomenon in which air remains in the area around the cord during winding of the reinforcing cord member (incorporation of air) may further be suppressed. When incorporation of air into the area around the reinforcing cord member is suppressed, movement of the reinforcing cord member due to, for example, a force applied during running is suppressed. Accordingly, for example, in the case where the tire-constituting member is provided in the outer circumference of the tire frame to cover the entire reinforcing cord member, since the movement of the reinforcing cord member is suppressed, an occurrence of peeling and the like between the members (including the tire frame) is suppressed, and durability is enhanced.

(10-1-2) The tire of the tenth aspect of the invention may be provided with a tread formed of a material having higher wear resistance than the thermoplastic resin material, on the outer side in the radial direction of the reinforcing cord layer.

By having a configuration in which the tread that comes into contact with the road surface is formed of the material having higher wear resistance than the thermoplastic resin material as such, the wear resistance of the tire may further be enhanced.

(10-1-3) In the tire of the tenth aspect of the invention, ⅕ or more of the diameter of the reinforcing cord member may be embedded in the outer circumference of the tire frame along the circumferential direction in the cross-sectional view along the axial direction of the tire frame.

When ⅕ or more of the diameter of the reinforcing cord member is embedded in the outer circumference of the tire frame in the cross-sectional view along the axial direction of the tire frame, incorporation of air into the area around the reinforcing cord member may be effectively suppressed, and thus movement of the reinforcing cord member due to, for example, a force applied during running may further be suppressed.

(10-1-4) The tire of the tenth aspect of the invention may be configured so that the tire frame includes, on the inner side in the radial direction, a bead portion that comes into contact with a bead seat and a rim flange of a rim, and an annular bead core made of a metal material is embedded in the bead portion.

By providing the bead portion which is a part for fitting onto the rim in the tire frame, and moreover, by embedding the annular bead core made of the metal material in the bead portion as such, the tire frame (that is, tire) may be firmly held on the rim, similarly to conventional pneumatic tires made of rubber.

(10-1-5) The tire of the tenth aspect of the invention may be provided with a sealing portion made of a material having higher sealing properties (adhesion to the rim) than the thermoplastic resin material, in a part where the bead portion comes into contact with the rim.

By providing the sealing portion made of the material having higher sealing properties than the thermoplastic resin material in the part where the tire frame and the rim come into contact with each other as such, adhesion between the tire (the tire frame) and the rim may be enhanced. Accordingly, compared to a case where only the rim and the thermoplastic resin material are used, leakage of air in the tire may further be suppressed. In addition, by providing the sealing portion, fittability onto the rim of the tire may be enhanced.

(10-1-6) The manufacturing method of the tire of the tenth aspect of the invention may include: a tire frame piece forming step of forming a tire frame piece for constituting a part of the circular tire frame using a thermoplastic resin material including at least a polyamide-based thermoplastic elastomer and a polyester-based thermoplastic elastomer; a tire frame piece bonding step of forming a tire frame by fusing two or more tire frame pieces, which make a pair, by applying heat to the bonding surfaces of the tire frame pieces; and a reinforcing cord member winding step of winding a reinforcing cord member around the outer circumference of the tire frame in the circumferential direction to form a reinforcing cord layer.

(10-1-7) The manufacturing method of the tire may be configured so that, in the tire frame piece bonding step, the bonding surface of the tire frame piece is heated to a temperature equal to or higher than the melting point of the thermoplastic resin material that forms the tire frame piece.

When the bonding surface of the divided body is heated to a temperature equal to or higher than the melting point of the thermoplastic resin material that forms the tire frame piece as such, fusing between the tire frame pieces may be sufficiently performed. Therefore, productivity of the tire may be enhanced while enhancing durability of the tire.

(10-1-8) The manufacturing method of the tire may be configured so that, in the reinforcing cord member winding step, the reinforcing cord member is wound around the outer circumference of the tire frame in a manner such that at least a part of the reinforcing cord member is embedded while melting or softening the outer circumference of the tire frame formed in the tire frame piece bonding step.

By winding the reinforcing cord member around the outer circumference of the tire frame in a manner such that at least a part of the reinforcing cord member is embedded while melting and softening the outer circumference of the tire frame as such, the at least a part of the reinforcing cord member which is embedded and the melted or softened thermoplastic resin material may be welded. Accordingly, incorporation of air between the outer circumference of the tire frame and the reinforcing cord member may further be suppressed in the cross-sectional view along the axial direction of the tire frame. In addition, when the part in which the reinforcing cord member is embedded is cooled and solidified, the fixed condition of the reinforcing cord member embedded in the tire frame is enhanced.

(10-1-9) The manufacturing method of the tire may be configured so that, in the reinforcing cord member winding step, ⅕ or more of the diameter of the reinforcing cord may be embedded in the outer circumference of the tire frame in the cross-sectional view along the axial direction of the tire frame.

When ⅕ or more of the diameter of the reinforcing cord member is embedded in the outer circumference of the tire frame in the cross-sectional view along the axial direction of the tire frame, incorporation of air into the area around the reinforcing cord during manufacturing may be effectively suppressed, and moreover, the embedded reinforcing cord member may become less likely to be caused to come out of the tire frame.

(10-1-10) The manufacturing method of the tire may be configured so that, in the reinforcing cord member winding step, the heated reinforcing cord member is embedded in the tire frame.

When embedding the reinforcing cord member in the tire frame while heating the reinforcing cord member in the reinforcing cord winding step as such, when the heated reinforcing cord member comes into contact with the outer circumference of the tire frame, the contact part is melted or softened. Therefore, it becomes easy to embed the reinforcing cord member in the outer circumference of the tire frame.

(10-1-11) The manufacturing method of the tire may be configured so that, in the cord member winding step, the part of the outer circumference of the tire frame for embedding the reinforcing cord member is heated.

By heating the part of the outer circumference of the tire frame for embedding the reinforcing cord member as such, the heated part of the tire frame is melted or softened. Therefore, it becomes easy to embed the reinforcing cord member.

(10-1-12) The manufacturing method of the tire may be configured so that, in the cord member winding step, the reinforcing cord member is wound in a spiral shape in the circumferential direction of the outer circumference of the tire frame while pressing the reinforcing cord member against the outer circumference of the tire frame.

When the reinforcing cord member is wound in the spiral shape while pressing the reinforcing cord member against the outer circumference of the tire frame as such, the depth of embedding the reinforcing cord member in the outer circumference of the tire frame may be adjusted.

(10-1-13) According to the manufacturing method, it may be configured such that, in the cord member winding step, after winding the reinforcing cord member around the tire frame, the melted or softened part of the outer circumference of the tire frame is cooled.

By forcibly cooling the melted or softened part of the outer circumference of the tire frame after embedding the reinforcing cord member as such, the melted or softened part of the outer circumference of the tire frame may be more quickly and rapidly cooled and solidified than natural cooling. By cooling the outer circumference of the tire more quickly than natural cooling, deformation of the outer circumference of the tire frame may be suppressed, and movement of the reinforcing cord member may be suppressed.

The tire of the tenth aspect of the invention may be configured as follows as described in Embodiment 10-2.

(10-2-1) The tire of the tenth aspect of the invention may be configured such that the manufacturing method further includes: a roughening treatment step of performing the roughening treatment on the outer circumferential surface of the tire frame by allowing a particle-shaped blasting abrasive to collide with the outer circumferential surface of the tire frame; and a superposing step of superposing a tire-constituting rubber member on the outer circumferential surface which has been subjected to the roughening treatment, via a bonding agent.

When the roughening treatment step is provided as such, the particle-shaped blasting abrasive collides with the outer circumferential surface of the circular tire frame formed by using the thermoplastic resin material, and thus minute roughened unevenness is formed on the outer circumferential surface. The treatment of forming minute roughened unevenness by allowing the blasting abrasive to collide with the outer circumferential surface of the tire frame is referred to as the roughening treatment. Thereafter, the tire-constituting rubber member is superposed on the outer circumferential surface which has been subjected to the roughening treatment, via the bonding agent. Here, when the tire frame and the tire-constituting rubber member are integrated into each other, since the outer circumferential surface of the tire frame has been subjected to the roughening treatment, bonding properties (bonding properties) are enhanced due to the anchor effect. In addition, since the resin material that forms the tire frame is ploughed due to collision of the blasting abrasive, wettability of the outer circumferential surface is enhanced. Accordingly, the outer circumferential surface of the tire frame is held in a state of being uniformly coated with the bonding agent, and thus the bonding strength between the tire frame and the tire-constituting rubber member may be ensured.

(10-2-2) In the tire of the tenth aspect of the invention, at least a part of the outer circumferential surface of the tire frame may be an uneven portion, and the uneven portion may be subjected to the roughening treatment in the roughening treatment step.

Even if at least a part of the outer circumferential surface of the tire frame is the uneven portion as such, by allowing the blasting abrasive to collide with the uneven portion, the area around a recess (walls at the recess, the bottom of the recess) is subjected to the roughening treatment, and thus the bonding strength between the tire frame and the tire-constituting rubber member may be ensured.

(10-2-3) In the tire of the tenth aspect of the invention, the outer circumference of the tire frame is configured to have a reinforcing layer that constitutes the uneven portion at the outer circumferential surface, and the reinforcing layer may be configured such that a coated cord member formed by coating the reinforcing cord with a resin material of the same kind as or different from the resin material that forms the tire frame is wound in the circumferential direction of the tire frame.

By configuring the outer circumference of the tire frame to have the reinforcing layer formed by winding the coated cord member in the circumferential direction of the tire frame as such, the rigidity of the tire frame in the circumferential direction may be enhanced.

(10-2-4) The tire of the tenth aspect of the invention may use a thermoplastic resin material as the resin material that is a component of the coated cord member.

By using the thermoplastic material having thermoplasticity as the resin material that is a component of the coated cord member as such, compared to a case of using a thermosetting material as the resin material, the tire is easily manufactured and is easily recycled.

(10-2-5) The tire of the tenth aspect of the invention may be configured so that, in the roughening treatment step, an area wider than the area for superposing the tire-constituting rubber member is subjected to the roughening treatment.

When the area wider than the area for superposing the tire-constituting rubber member is subjected to the roughening treatment in the roughening treatment step, the bonding strength between the tire frame and the tire-constituting rubber member may be reliably ensured.

(10-2-6) The tire of the tenth aspect of the invention may be configured so that, in the roughening treatment step, the outer circumferential surface is subjected to the roughening treatment to have an arithmetic mean roughness Ra of 0.05 mm or greater.

When the outer circumferential surface of the tire frame is subjected to the roughening treatment to have an arithmetic mean roughness Ra of 0.05 mm or greater in the roughening treatment step as such, in a case where the tire-constituting rubber member, for example, in an unvulcanized or semi-vulcanized state is superposed on the outer circumferential surface which has been subjected to the roughening treatment, via the bonding agent, and is vulcanized, rubber of the tire-constituting rubber member may be caused to flow to the bottom of the roughened uneven portion formed by the roughening treatment. When the rubber of the tire-constituting rubber member flows to the bottom of the roughened uneven portion, a sufficient anchor effect is exhibited between the outer circumferential surface and the tire-constituting rubber member, and the bonding strength between the tire frame and the tire-constituting rubber member may be enhanced.

(10-2-7) In the tire of the tenth aspect of the invention, a rubber in the unvulcanized or semi-vulcanized state may be used as the tire-constituting rubber member.

In the case where the rubber in the unvulcanized or semi-vulcanized state is used as the tire-constituting rubber member as such, the rubber flows to the roughened uneven portion formed on the outer circumferential surface of the tire frame by the roughening treatment when the tire-constituting rubber member is vulcanized. In addition, when vulcanization is completed, the anchor effect is exhibited by the (vulcanized) rubber that has flowed to the roughened uneven portion, and thus the bonding strength between the tire frame and the tire-constituting rubber member may be enhanced.

"Vulcanized" is referred to as a state in which the degree of vulcanization reaches the degree needed for a final product, and the "semi-vulcanized state" is referred to as a state in which the vulcanization degree is higher than the unvulcanized state but has not reached the degree needed for a final product.

(10-2-8) The tire of the tenth aspect of the invention may be configured to include: a circular tire frame that is formed using the thermoplastic resin material in the tenth aspect of the invention and has the outer circumferential surface which has been subjected to the roughening treatment by allowing a particle-shaped blasting abrasive to collide with the outer circumferential surface; and a tire-constituting rubber member superposed on the outer circumferential surface which has been subjected to the roughening treatment, via the bonding agent.

When the circular tire frame which has been subjected to the roughening treatment is used as such, the bonding strength between the tire frame and the tire-constituting rubber member may be enhanced by the anchor effect. In addition, since the outer circumferential surface has been subjected to the roughening treatment, excellent wettability of the bonding agent is provided. Accordingly, the bonding agent is held in the state of being uniformly applied onto the outer circumferential surface of the tire frame, the bonding strength between the tire frame and the tire-constituting rubber member is ensured, and thus peeling between the tire frame and the tire-constituting rubber member may be suppressed.

The tire of the eleventh aspect of the invention may be configured as follows as described in the Embodiment 11-1.

(11-1-1) The tire of the eleventh aspect of the invention may be configured so that at least a part of the reinforcing cord member is embedded in the outer circumference of the tire frame formed of a thermoplastic resin material in the present invention in the eleventh aspect in the cross-sectional view along the axial direction of the tire frame.

When a part of the reinforcing cord member is embedded in the outer circumference of the tire frame as such, a phenomenon in which air remains in the area around the cord during winding of the reinforcing cord member (incorporation of air) may further be suppressed. When incorporation of air into the area around the reinforcing cord member is suppressed, movement of the reinforcing cord member due to, for example, a force applied during running is suppressed. Accordingly, for example, in the case where the tire-constituting member is provided on the outer circumference of the tire frame to cover the entire reinforcing cord member, since the movement of the reinforcing cord member is suppressed, an occurrence of peeling and the like between the members (including the tire frame) is suppressed, and durability is enhanced.

(11-1-2) The tire of the eleventh aspect of the invention may be provided with a tread formed of a material having higher wear resistance than the thermoplastic resin material, on the outer side in the radial direction of the reinforcing cord layer.

By having a configuration in which the tread that comes into contact with the road surface is formed of the material having higher wear resistance than the thermoplastic resin material as such, the wear resistance of the tire may further be enhanced.

(11-1-3) In the tire of the eleventh aspect of the invention, $\frac{1}{5}$ or more of the diameter of the reinforcing cord member may be embedded in the outer circumference of the tire frame along the circumferential direction in the cross-sectional view along the axial direction of the tire frame.

When $\frac{1}{5}$ or more of the diameter of the reinforcing cord member is embedded in the outer circumference of the tire frame in the cross-sectional view along the axial direction of the tire frame, incorporation of air into the area around the reinforcing cord member may be effectively suppressed, and thus movement of the reinforcing cord member due to, for example, a force applied during running may further be suppressed.

(11-1-4) The tire of the eleventh aspect of the invention may be configured so that the tire frame includes, on the inner side in the radial direction, a bead portion that comes into contact with a bead seat and a rim flange of a rim, and an annular bead core made of a metal material is embedded in the bead portion.

By providing the bead portion which is a part for fitting onto the rim in the tire frame, and moreover, by embedding the annular bead core made of the metal material in the bead portion as such, the tire frame (that is, tire) may be firmly held on the rim, similarly to conventional pneumatic tires made of rubber.

(11-1-5) The tire of the eleventh aspect of the invention may be provided with a sealing portion made of a material having higher sealing properties (adhesion to the rim) than the thermoplastic resin material, in a part where the bead portion comes into contact with the rim.

By providing the sealing portion made of the material having higher sealing properties than the thermoplastic resin material in the part where the tire frame and the rim come into contact with each other as such, adhesion between the tire (the tire frame) and the rim may be enhanced. Accordingly, compared to a case where only the rim and the thermoplastic resin material are used, leakage of air in the tire may further be suppressed. In addition, by providing the sealing portion, fittability onto the rim of the tire may be enhanced.

(11-1-6) The manufacturing method of the tire of the eleventh aspect of the invention may include: a tire frame piece forming step of forming a tire frame piece for constituting a part of the circular tire frame using a thermoplastic resin material including at least a mixed material of a polyamide-based thermoplastic elastomer and a specific copolymer; a tire frame piece bonding step of forming a tire frame by fusing two or more tire frame pieces, which make a pair, by applying heat to the bonding surfaces of the tire frame pieces; and a reinforcing cord member winding step of winding a reinforcing cord member around the outer circumference of the tire frame in the circumferential direction to form a reinforcing cord layer.

As the thermoplastic resin material, specifically, for example, a mixed material of a polyamide-based thermoplastic elastomer "UBESTA, XPA9055X1" manufactured by Ube Industries, Ltd. and a Zn ionomer of an ethylene-methacrylic acid copolymer "HIMILAN, 1855Zn" manufactured by Du Pont-Mitsui Polychemicals Co., Ltd. may be used.

(11-1-7) The manufacturing method of the tire may be configured so that, in the tire frame piece bonding step, the bonding surface of the tire frame piece is heated to a temperature equal to or higher than the melting point of the thermoplastic resin material that forms the tire frame piece.

When the bonding surface of the divided body is heated to a temperature equal to or higher than the melting point of the thermoplastic resin material that forms the tire frame piece as such, fusing between the tire frame pieces may be sufficiently performed. Therefore, productivity of the tire may be enhanced while enhancing durability of the tire.

(11-1-8) The manufacturing method of the tire may be configured so that, in the reinforcing cord member winding step, the reinforcing cord member is wound around the outer circumference of the tire frame in a manner such that at least a part of the reinforcing cord member is embedded while melting or softening the outer circumference of the tire frame formed in the tire frame piece bonding step.

By winding the reinforcing cord member around the outer circumference of the tire frame in a manner such that at least a part of the reinforcing cord member is embedded while melting and softening the outer circumference of the tire frame as such, the at least a part of the reinforcing cord member which is embedded and the melted or softened thermoplastic resin material may be welded. Accordingly, incorporation of air between the outer circumference of the tire frame and the reinforcing cord member in the cross-sectional view along the axial direction of the tire frame may further be suppressed. In addition, when the part in which the reinforcing cord member is embedded is cooled and solidified, the fixed condition of the reinforcing cord member embedded in the tire frame is enhanced.

(11-1-9) The manufacturing method of the tire may be configured so that, in the reinforcing cord member winding step, 1/5 or more of the diameter of the reinforcing cord may be embedded in the outer circumference of the tire frame in the cross-sectional view along the axial direction of the tire frame.

When 1/5 or more of the diameter of the reinforcing cord member is embedded in the outer circumference of the tire frame in the cross-sectional view along the axial direction of the tire frame, incorporation of air into the area around the reinforcing cord during manufacturing may be effectively suppressed, and moreover, the embedded reinforcing cord member may become less likely to be caused to come out of the tire frame.

(11-1-10) The manufacturing method of the tire may be configured so that, in the reinforcing cord member winding step, the heated reinforcing cord member is embedded in the tire frame.

By embedding the reinforcing cord member while heating the reinforcing cord member in the reinforcing cord winding step as such, when the heated reinforcing cord member comes into contact with the outer circumference of the tire frame, the contact part is melted or softened. Therefore, it becomes easy to embed the reinforcing cord member in the outer circumference of the tire frame.

(11-1-11) The manufacturing method of the tire may be configured so that, in the cord member winding step, the part of the outer circumference of the tire frame for embedding the reinforcing cord member is heated.

By heating the part of the outer circumference of the tire frame for embedding the reinforcing cord member as such, the heated part of the tire frame is melted or softened. Therefore, it becomes easy to embed the reinforcing cord member.

(11-1-12) The manufacturing method of the tire may be configured so that, in the cord member winding step, the reinforcing cord member is wound in a spiral shape in the circumferential direction of the outer circumference of the tire frame while pressing the reinforcing cord member against the outer circumference of the tire frame.

When the reinforcing cord member is wound in the spiral shape while pressing the reinforcing cord member against the outer circumference of the tire frame as such, the depth of embedding the reinforcing cord member in the outer circumference of the tire frame may be adjusted.

(11-1-13) According to the manufacturing method, it may be configured such that, in the cord member winding step, after winding the reinforcing cord member around the tire frame, the melted or softened part of the outer circumference of the tire frame is cooled.

By forcibly cooling the melted or softened part of the outer circumference of the tire frame after embedding the reinforcing cord member as such, the melted or softened part of the outer circumference of the tire frame may be more quickly and rapidly cooled and solidified than natural cooling. By cooling the outer circumference of the tire more quickly than natural cooling, deformation of the outer circumference of the tire frame may be suppressed, and movement of the reinforcing cord member may be suppressed.

The tire of the eleventh aspect of the invention may be configured as follows as described in Embodiment 11-2.

(11-2-1) The tire of the eleventh aspect of the invention may be configured such that the manufacturing method further includes: a roughening treatment step of performing the roughening treatment on the outer circumferential surface of the tire frame by allowing a particle-shaped blasting abrasive to collide with the outer circumferential surface of the tire frame; and a superposing step of superposing a tire-constituting rubber member on the outer circumferential surface which has been subjected to the roughening treatment, via a bonding agent.

When the roughening treatment step is provided as such, the particle-shaped blasting abrasive collides with the outer circumferential surface of the circular tire frame formed using the thermoplastic resin material, and thus minute roughened unevenness is formed on the outer circumferential surface. The treatment of forming minute roughened unevenness by allowing the blasting abrasive to collide with the outer circumferential surface of the tire frame is referred to as the roughening treatment. Thereafter, the tire-constituting rubber member is superposed on the outer circumferential surface which has been subjected to the roughening treatment, via the bonding agent. Here, when the tire frame and the tire-constituting rubber member are integrated into each other, since the outer circumferential surface of the tire frame has been subjected to the roughening treatment, bonding properties (bonding properties) are enhanced due to the anchor effect. In addition, since the resin material that forms the tire frame is ploughed due to collision of the blasting abrasive, wettability of the outer circumferential surface is enhanced. Accordingly, the outer circumferential surface of the tire frame is held in a state of being uniformly coated with the bonding agent, and thus the bonding strength between the tire frame and the tire-constituting rubber member may be ensured.

(11-2-2) In the tire of the eleventh aspect of the invention, at least a part of the outer circumferential surface of the tire frame may be an uneven portion, and the uneven portion may be subjected to the roughening treatment in the roughening treatment step.

Even if at least a part of the outer circumferential surface of the tire frame is the uneven portion as such, by allowing the blasting abrasive to collide with the uneven portion, the area around a recess (walls at the recess, the bottom of the recess) is subjected to the roughening treatment, and thus the bonding strength between the tire frame and the tire-constituting rubber member may be ensured.

(11-2-3) In the tire of the eleventh aspect of the invention, the outer circumference of the tire frame is configured to have a reinforcing layer that constitutes the uneven portion at the outer circumferential surface, and the reinforcing layer may be configured such that a coated cord member formed by coating the reinforcing cord with a resin material of the same kind as or different from the resin material that forms the tire frame is wound in the circumferential direction of the tire frame.

By configuring the outer circumference of the tire frame to have the reinforcing layer formed by winding the coated cord member in the circumferential direction of the tire frame as such, the rigidity of the tire frame in the circumferential direction may be enhanced.

(11-2-4) In the tire of the eleventh aspect of the invention, a thermoplastic resin material may be used as the resin material that is a component of the coated cord member.

By using the thermoplastic material having thermoplasticity as the resin material that is a component of the coated cord member as such, compared to a case of using a thermosetting material as the resin material, the tire is easily manufactured and is easily recycled.

(11-2-5) The tire of the eleventh aspect of the invention may be configured so that, in the roughening treatment step, an area wider than the area for superposing the tire-constituting rubber member is subjected to the roughening treatment.

When the area wider than the area for superposing the tire-constituting rubber member is subjected to the roughening treatment in the roughening treatment step, the bonding strength between the tire frame and the tire-constituting rubber member may be reliably ensured.

(11-2-6) The tire of the eleventh aspect of the invention may be configured so that, in the roughening treatment step, the outer circumferential surface is subjected to the roughening treatment to have an arithmetic mean roughness Ra of 0.05 mm or greater.

When the outer circumferential surface of the tire frame is subjected to the roughening treatment to have an arithmetic mean roughness Ra of 0.05 mm or greater in the roughening treatment step as such, in a case where the tire-constituting rubber member, for example, in an unvulcanized or semi-vulcanized state is superposed on the outer circumferential surface which has been subjected to the roughening treatment, via the bonding agent, and is vulcanized, rubber of the tire-constituting rubber member may be caused to flow to the bottom of the roughened uneven portion formed by the roughening treatment. When the rubber of the tire-constituting rubber member flows to the bottom of the roughened uneven portion, a sufficient anchor effect is exhibited between the outer circumferential surface and the tire-constituting rubber member, and the bonding strength between the tire frame and the tire-constituting rubber member may be enhanced.

(11-2-7) In the tire of the eleventh aspect of the invention, a rubber in the unvulcanized or semi-vulcanized state may be as the tire-constituting rubber member.

In the case where the rubber in the unvulcanized or semi-vulcanized state is used as the tire-constituting rubber member as such, the rubber flows to the roughened uneven portion formed on the outer circumferential surface of the tire frame by the roughening treatment when the tire-constituting rubber member is vulcanized. In addition, when vulcanization is completed, the anchor effect is exhibited by the (vulcanized) rubber that has flowed to the roughened uneven portion, and thus the bonding strength between the tire frame and the tire-constituting rubber member may be enhanced.

"Vulcanized" is referred to as a state in which the degree of vulcanization reaches the degree needed for a final product, and the "semi-vulcanized state" is referred to as a state in which the vulcanization degree is higher than the unvulcanized state but has not reached the degree needed for a final product.

(11-2-8) The tire of the eleventh aspect of the invention may be configured to include: a circular tire frame that is formed by using the thermoplastic resin material in the eleventh aspect the invention and has the outer circumferential surface which has been subjected to the roughening treatment by allowing a particle-shaped blasting abrasive to collide with on the outer circumferential surface; and the tire-constituting rubber member superposed on the outer circumferential surface which has been subjected to the roughening treatment via the bonding agent.

When the circular tire frame which has been subjected to the roughening treatment is used as such, the bonding strength between the tire frame and the tire-constituting rubber member may be enhanced by the anchor effect. In addition, since the outer circumferential surface has been subjected to the roughening treatment, excellent wettability of the bonding agent is provided. Accordingly, the bonding agent is held in the state of being uniformly applied onto the outer circumferential surface of the tire frame, the bonding strength between the tire frame and the tire-constituting rubber member is ensured, and thus peeling between the tire frame and the tire-constituting rubber member may be suppressed.

The tire of the twelfth aspect of the invention may be configured as follows as described in Embodiment 12-1.

(12-1-1) The tire of the twelfth aspect of the invention may be configured so that at least a part of the reinforcing cord member is embedded in the outer circumference of the tire frame formed of a thermoplastic resin material in the twelfth aspect of the invention in the cross-sectional view along the axial direction of the tire frame.

When a part of the reinforcing cord member is embedded in the outer circumference of the tire frame as such, a phenomenon in which air remains in the area around the cord during winding of the reinforcing cord member (incorporation of air) may further be suppressed. When incorporation of air into the area around the reinforcing cord member is suppressed, movement of the reinforcing cord member due to, for example, a force applied during running is suppressed. Accordingly, for example, in the case where the tire-constituting member is provided in the outer circumference of the tire frame to cover the entire reinforcing cord member, since the movement of the reinforcing cord member is suppressed, an occurrence of peeling and the like between the members (including the tire frame) is suppressed, and durability is enhanced.

(12-1-2) The tire of the twelfth aspect of the invention may be provided with a tread formed of a material having higher wear resistance than the thermoplastic resin material, on the outer side in the radial direction of the reinforcing cord layer.

By having a configuration in which the tread that comes into contact with the road surface is formed of the material having higher wear resistance than the thermoplastic resin material as such, the wear resistance of the tire may further be enhanced.

(12-1-3) In the tire of the twelfth aspect of the invention, ⅕ or more of the diameter of the reinforcing cord member may be embedded in the outer circumference of the tire frame along the circumferential direction in the cross-sectional view along the axial direction of the tire frame.

When ⅕ or more of the diameter of the reinforcing cord member is embedded in the outer circumference of the tire frame in the cross-sectional view along the axial direction of the tire frame, incorporation of air into the area around the reinforcing cord member may be effectively suppressed, and thus movement of the reinforcing cord member due to, for example, a force applied during running may further be suppressed.

(12-1-4) The tire of the twelfth aspect of the invention may be configured so that the tire frame includes, on the inner side in the radial direction, a bead portion that comes into contact with a bead seat and a rim flange of a rim, and an annular bead core made of a metal material is embedded in the bead portion.

By providing the bead portion which is a part for fitting onto the rim in the tire frame, and moreover, by embedding the annular bead core made of the metal material in the bead portion as such, the tire frame (that is, tire) may be firmly held on the rim, similarly to conventional pneumatic tires made of rubber.

(12-1-5) The tire of the twelfth aspect of the invention may be provided with a sealing portion made of a material having higher sealing properties (adhesion to the rim) than the thermoplastic resin material, in a part where the bead portion comes into contact with the rim.

By providing the sealing portion made of the material having higher sealing properties than the thermoplastic resin material in the part where the tire frame and the rim come into contact with each other as such, adhesion between the tire (the tire frame) and the rim may be enhanced. Accordingly, compared to a case where only the rim and the thermoplastic resin material are used, leakage of air in the tire may further be suppressed. In addition, by providing the sealing portion, fittability onto the rim of the tire may be enhanced.

(12-1-6) The manufacturing method of the tire of the twelfth aspect of the invention may include: a tire frame piece forming step of forming a tire frame piece for constituting a part of the circular tire frame using a thermoplastic resin material including at least a polyamide-based thermoplastic elastomer (for example, "UBESTA, XPA9055X1" manufactured by Ube Industries, Ltd.), a specific copolymer (for example, an ethylene-methacrylic acid copolymer "NUCREL N035C" manufactured by Du Pont-Mitsui Polychemicals Co., Ltd.), and a specific acid-modified copolymer (for example, an acid-modified product of an ethylene-acrylate ethyl ester copolymer "HPR, AR2011" manufactured by Du Pont-Mitsui Polychemicals Co., Ltd.); a tire frame piece bonding step of forming a tire frame by fusing two or more tire frame pieces, which make a pair, by applying heat to the bonding surfaces of the tire frame pieces; and a reinforcing cord member winding step of winding a reinforcing cord member around the outer circumference of the tire frame in the circumferential direction to form a reinforcing cord layer.

As described above, the thermoplastic resin material including a polyamide-based thermoplastic elastomer, a specific copolymer, and a specific acid-modified copolymer has excellent liquidity, and thus injection molding may be easily performed. Therefore, when a tire frame piece for constituting a part of the circular tire frame is formed using the thermoplastic resin material in the twelfth aspect of the invention, in the case where the tire frame piece is formed by injection molding, the tire frame piece may be effectively formed, resulting in excellent productivity of the tire.

(12-1-7) The manufacturing method of the tire may be configured so that, in the tire frame piece bonding step, the bonding surface of the tire frame piece is heated to a temperature equal to or higher than the melting point of the thermoplastic resin material that forms the tire frame piece.

When the bonding surface of the divided body is heated to a temperature equal to or higher than the melting point of the thermoplastic resin material that forms the tire frame piece as such, fusing between the tire frame pieces may be sufficiently performed. Therefore, productivity of the tire may be enhanced while enhancing durability of the tire.

(12-1-8) The manufacturing method of the tire may be configured so that, in the reinforcing cord member winding step, the reinforcing cord member is wound around the outer circumference of the tire frame in a manner such that at least a part of the reinforcing cord member is embedded while melting or softening the outer circumference of the tire frame formed in the tire frame piece bonding step.

By winding the reinforcing cord member around the outer circumference of the tire frame in a manner such that at least a part of the reinforcing cord member is embedded while melting and softening the outer circumference of the tire frame as such, the at least a part of the reinforcing cord member which is embedded and the melted or softened thermoplastic resin material may be welded. Accordingly, incorporation of air between the outer circumference of the tire frame and the reinforcing cord member in the cross-sectional view along the axial direction of the tire frame may further be suppressed. In addition, when the part in which the reinforcing cord member is embedded is cooled and solidified, the fixed condition of the reinforcing cord member embedded in the tire frame is enhanced.

(12-1-9) The manufacturing method of the tire may be configured so that, in the reinforcing cord member winding step, ⅕ or more of the diameter of the reinforcing cord may be embedded in the outer circumference of the tire frame in the cross-sectional view along the axial direction of the tire frame.

When ⅕ or more of the diameter of the reinforcing cord member is embedded in the outer circumference of the tire frame in the cross-sectional view along the axial direction of the tire frame, incorporation of air into the area around the reinforcing cord during manufacturing may be effectively suppressed, and moreover, the embedded reinforcing cord member may become less likely to be caused to come out of the tire frame.

(12-1-10) The manufacturing method of the tire may be configured so that, in the reinforcing cord member winding step, the heated reinforcing cord member is embedded in the tire frame.

By embedding the reinforcing cord member in the tire frame while heating the reinforcing cord member in the reinforcing cord winding step as such, when the heated reinforcing cord member comes into contact with the outer circumference of the tire frame, the contact part is melted or softened. Therefore, it becomes easy to embed the reinforcing cord member in the outer circumference of the tire frame.

(12-1-11) The manufacturing method of the tire may be configured so that, in the cord member winding step, the part of the outer circumference of the tire frame for embedding the reinforcing cord member is heated.

By heating the part of the outer circumference of the tire frame for embedding the reinforcing cord member as such, the heated part of the tire frame is melted or softened. Therefore, it becomes easy to embed the reinforcing cord member.

(12-1-12) The manufacturing method of the tire may be configured so that, in the cord member winding step, the reinforcing cord member is wound in a spiral shape in the circumferential direction of the outer circumference of the tire frame while pressing the reinforcing cord member against the outer circumference of the tire frame.

When the reinforcing cord member is wound in the spiral shape while pressing the reinforcing cord member against the outer circumference of the tire frame as such, the depth of embedding the reinforcing cord member in the outer circumference of the tire frame may be adjusted.

(12-1-13) According to the manufacturing method, the configuration in which, in the cord member winding step, after winding the reinforcing cord member around the tire frame, the melted or softened part of the outer circumference of the tire frame is cooled.

By forcibly cooling the melted or softened part of the outer circumference of the tire frame after embedding the reinforcing cord member as such, the melted or softened part of the outer circumference of the tire frame may be more quickly and rapidly cooled and solidified than natural cooling. By cooling the outer circumference of the tire more quickly than natural cooling, deformation of the outer circumference of the tire frame may be suppressed, and movement of the reinforcing cord member may be suppressed.

The tire of the twelfth aspect of the invention may be configured as follows as described in Embodiment 12-2.

(12-2-1) The tire of the twelfth aspect of the invention may be configured such that the manufacturing method further includes: a roughening treatment step of performing the roughening treatment on the outer circumferential surface of the tire frame by allowing a particle-shaped blasting abrasive to collide with the outer circumferential surface of the tire frame; and a superposing step of superposing a tire-constituting rubber member on the outer circumferential surface which has been subjected to the roughening treatment, via a bonding agent.

When the roughening treatment step is provided as such, the particle-shaped blasting abrasive collides with the outer circumferential surface of the circular tire frame formed by using the thermoplastic resin material, and thus minute roughened unevenness is formed on the outer circumferential surface. The treatment of forming minute roughened unevenness by allowing the blasting abrasive to collide with the outer circumferential surface of the tire frame is referred to as the roughening treatment. Thereafter, the tire-constituting rubber member is superposed on the outer circumferential surface which has been subjected to the roughening treatment, via the bonding agent. Here, when the tire frame and the tire-constituting rubber member are integrated into each other, since the outer circumferential surface of the tire frame is subjected to the roughening treatment, bonding properties (adhesiveness) are enhanced due to the anchor effect. In addition, since the resin material that forms the tire frame is ploughed due to collision of the blasting abrasive, wettability of the outer circumferential surface is enhanced. Accordingly, the outer circumferential surface of the tire frame is held in a state of being uniformly coated with the bonding agent, and thus the bonding strength between the tire frame and the tire-constituting rubber member may be ensured.

(12-2-2) In the tire of the twelfth aspect of the invention, at least a part of the outer circumferential surface of the tire frame may be an uneven portion, and the uneven portion may be subjected to the roughening treatment in the roughening treatment step.

Even if at least a part of the outer circumferential surface of the tire frame is the uneven portion as such, by allowing the blasting abrasive to collide with the uneven portion, the area around a recess (walls at the recess, the bottom of the recess) is subjected to the roughening treatment, and thus the bonding strength between the tire frame and the tire-constituting rubber member may be ensured.

(12-2-3) In the tire of the twelfth aspect of the invention, the outer circumference of the tire frame is configured to have a reinforcing layer that constitutes the uneven portion at the outer circumferential surface, and the reinforcing layer may be configured such that a coated cord member formed by coating the reinforcing cord with a resin material of the same kind as or different from the resin material that forms the tire frame is wound in the circumferential direction of the tire frame.

By configuring the outer circumference of the tire frame to have the reinforcing layer formed by winding the coated cord member in the circumferential direction of the tire frame as such, the rigidity of the tire frame in the circumferential direction may be enhanced.

(12-2-4) In the tire of the twelfth aspect of the invention, a thermoplastic resin material may be used as the resin material that is a component of the coated cord member.

By using the thermoplastic material having thermoplasticity as the resin material that is a component of the coated cord member as such, compared to a case of using a thermosetting material as the resin material, the tire is easily manufactured and is easily recycled.

(12-2-5) The tire of the twelfth aspect of the invention may be configured so that, in the roughening treatment step, an area wider than the area for superposing the tire-constituting rubber member is subjected to the roughening treatment.

When the area wider than the area for superposing the tire-constituting rubber member is subjected to the roughening treatment in the roughening treatment step, the bonding strength between the tire frame and the tire-constituting rubber member may be reliably ensured.

(12-2-6) The tire of the twelfth aspect of the invention may be configured so that, in the roughening treatment step, the outer circumferential surface is subjected to the roughening treatment to have an arithmetic mean roughness Ra of 0.05 mm or greater.

When the outer circumferential surface of the tire frame is subjected to the roughening treatment to have an arithmetic mean roughness Ra of 0.05 mm or greater in the roughening treatment step as such, in a case where the tire-constituting rubber member, for example, in an unvulcanized or semi-vulcanized state is superposed on the outer circumferential surface which has been subjected to the roughening treatment, via the bonding agent, and is vulcanized, rubber of the tire-constituting rubber member may be caused to flow to the bottom of the roughened uneven portion formed by the roughening treatment. When the rubber of the tire-constituting rubber member flows to the bottom of the roughened uneven portion, a sufficient anchor effect is exhibited between the outer circumferential surface and the tire-constituting rubber member, and the bonding strength between the tire frame and the tire-constituting rubber member may be enhanced.

(12-2-7) In the tire of the twelfth aspect of the invention, a rubber in the unvulcanized or semi-vulcanized state may be used as the tire-constituting rubber member.

In the case where the rubber in the unvulcanized or semi-vulcanized state is used as the tire-constituting rubber member as such, the rubber flows to the roughened uneven portion formed on the outer circumferential surface of the tire frame by the roughening treatment when the tire-constituting rubber member is vulcanized. In addition, when vulcanization is completed, the anchor effect is exhibited by the (vulcanized) rubber that has flowed to the roughened uneven portion, and thus the bonding strength between the tire frame and the tire-constituting rubber member may be enhanced.

"Vulcanized" is referred to as a state in which the degree of vulcanization reaches the degree needed for a final product, and the "semi-vulcanized state" is referred to as a state in which the vulcanization degree is higher than the unvulcanized state but has not reached the degree needed for a final product.

(12-2-8) The tire of the twelfth aspect of the invention may be configured to include: a circular tire frame that is formed by using the thermoplastic resin material in the twelfth aspect of the invention and has the outer circumferential surface which has been subjected to the roughening treatment by allowing a particle-shaped blasting abrasive to collide with the outer circumferential surface; and a tire-constituting rubber member superposed on the outer circumferential surface which has been subjected to the roughening treatment, via a bonding agent.

When the circular tire frame which has been subjected to the roughening treatment is used as such, the bonding strength between the tire frame and the tire-constituting rubber member may be enhanced by the anchor effect. In addition, since the outer circumferential surface has been subjected to the roughening treatment, excellent wettability of the bonding agent is provided. Accordingly, the bonding agent is held in the state of being uniformly applied onto the outer circumferential surface of the tire frame, the bonding strength between the tire frame and the tire-constituting rubber member is ensured, and thus peeling between the tire frame and the tire-constituting rubber member may be suppressed.

The tire of the thirteenth aspect of the invention may be configured as follows as described in Embodiment 13-1.

(13-1-1) The tire of the thirteenth aspect of the invention may be configured so that at least a part of the reinforcing cord member is embedded in the outer circumference of the tire frame formed of a thermoplastic resin material in the thirteenth aspect of the invention in the cross-sectional view along the axial direction of the tire frame.

When a part of the reinforcing cord member is embedded in the outer circumference of the tire frame as such, a phenomenon in which air remains in the area around the cord during winding of the reinforcing cord member (incorporation of air) may further be suppressed. When incorporation of air into the area around the reinforcing cord member is suppressed, movement of the reinforcing cord member due to, for example, a force applied during running is suppressed. Accordingly, for example, in the case where the tire-constituting member is provided in the outer circumference of the tire frame to cover the entire reinforcing cord member, since the movement of the reinforcing cord member is suppressed, an occurrence of peeling and the like between the members (including the tire frame) is suppressed, and durability is enhanced.

(13-1-2) The tire of the thirteenth aspect of the invention may be provided with a tread formed of a material having higher wear resistance than the thermoplastic resin material, on the outer side in the radial direction of the reinforcing cord layer.

By having a configuration in which the tread that comes into contact with the road surface is formed of the material having higher wear resistance than the thermoplastic resin material as such, the wear resistance of the tire may further be enhanced.

(13-1-3) In the tire of the thirteenth aspect of the invention, ⅕ or more of the diameter of the reinforcing cord member may be embedded in the outer circumference of the tire frame along the circumferential direction in the cross-sectional view along the axial direction of the tire frame.

When ⅕ or more of the diameter of the reinforcing cord member is embedded in the outer circumference of the tire frame in the cross-sectional view along the axial direction of the tire frame, incorporation of air into the area around the reinforcing cord member may be effectively suppressed, and thus movement of the reinforcing cord member due to, for example, a force applied during running may further be suppressed.

(13-1-4) The tire of the thirteenth aspect of the invention may be configured so that the tire frame includes, on the inner side in the radial direction, a bead portion that comes into contact with a bead seat and a rim flange of a rim, and an annular bead core made of a metal material is embedded in the bead portion.

By providing the bead portion which is a part for fitting onto the rim in the tire frame, and moreover, by embedding the annular bead core made of the metal material in the bead portion as such, the tire frame (that is, tire) may be firmly held on the rim, similarly to conventional pneumatic tires made of rubber.

(13-1-5) The tire of the thirteenth aspect of the invention may be provided with a sealing portion made of a material having higher sealing properties (adhesion to the rim) than the thermoplastic resin material, in a part where the bead portion comes into contact with the rim.

By providing the sealing portion made of the material having higher sealing properties than the thermoplastic resin material in the part where the tire frame and the rim come into contact with each other as such, adhesion between the tire (the tire frame) and the rim may be enhanced. Accordingly, compared to a case where only the rim and the thermoplastic resin material are used, leakage of air in the tire may further be suppressed. In addition, by providing the sealing portion, fittability onto the rim of the tire may be enhanced.

(13-1-6) The manufacturing method of the tire of the thirteenth aspect of the invention may include: a tire frame piece forming step of forming a tire frame piece for constituting a part of the circular tire frame using a thermoplastic resin material including at least a polyamide-based thermoplastic elastomer and a rubber; a tire frame piece bonding step of forming a tire frame by fusing two or more tire frame pieces, which make a pair, by applying heat to the bonding surfaces of the tire frame pieces; and a reinforcing cord member winding step of winding a reinforcing cord member around the outer circumference of the tire frame in the circumferential direction to form a reinforcing cord layer.

(13-1-7) The manufacturing method of the tire may be configured so that, in the tire frame piece bonding step, the bonding surface of the tire frame piece is heated to a temperature equal to or higher than the melting point of the thermoplastic resin material that forms the tire frame piece.

When the bonding surface of the divided body is heated to a temperature equal to or higher than the melting point of the thermoplastic resin material that forms the tire frame piece as such, fusing between the tire frame pieces may be sufficiently performed. Therefore, productivity of the tire may be enhanced while enhancing durability of the tire.

(13-1-8) The manufacturing method of the tire may be configured so that, in the reinforcing cord member winding step, the reinforcing cord member is wound around the outer circumference of the tire frame in a manner such that at least a part of the reinforcing cord member is embedded while melting or softening the outer circumference of the tire frame formed in the tire frame piece bonding step.

By winding the reinforcing cord member around the outer circumference of the tire frame in a manner such that at least a part of the reinforcing cord member is embedded while melting and softening the outer circumference of the tire frame as such, the at least a part of the reinforcing cord member which is embedded and the melted or softened thermoplastic resin material may be welded. Accordingly, incorporation of air between the outer circumference of the tire frame and the reinforcing cord member in the cross-sectional view along the axial direction of the tire frame may further be suppressed. In addition, when the part in which the reinforcing cord member is embedded is cooled and solidified, the fixed condition of the reinforcing cord member embedded in the tire frame is enhanced.

(13-1-9) The manufacturing method of the tire may be configured so that, in the reinforcing cord member winding step, ⅕ or more of the diameter of the reinforcing cord may be embedded in the outer circumference of the tire frame in the cross-sectional view along the axial direction of the tire frame.

When ⅕ or more of the diameter of the reinforcing cord member is embedded in the outer circumference of the tire frame in the cross-sectional view along the axial direction of the tire frame, incorporation of air into the area around the reinforcing cord during manufacturing may be effectively suppressed, and moreover, the embedded reinforcing cord member may become less likely to be caused to come out of the tire frame.

(13-1-10) The manufacturing method of the tire may be configured so that, in the reinforcing cord member winding step, the heated reinforcing cord member is embedded in the tire frame.

By embedding the reinforcing cord member in the tire frame while heating the reinforcing cord member in the reinforcing cord winding step as such, when the heated reinforcing cord member comes into contact with the outer circumference of the tire frame, the contact part is melted or softened. Therefore, it becomes easy to embed the reinforcing cord member in the outer circumference of the tire frame.

(13-1-11) The manufacturing method of the tire may be configured so that, in the cord member winding step, the part of the outer circumference of the tire frame for embedding the reinforcing cord member is heated.

By heating the part of the outer circumference of the tire frame for embedding the reinforcing cord member as such, the heated part of the tire frame is melted or softened. Therefore, it becomes easy to embed the reinforcing cord member.

(13-1-12) The manufacturing method of the tire may be configured so that, in the cord member winding step, the reinforcing cord member is wound in a spiral shape in the circumferential direction of the outer circumference of the tire frame while pressing the reinforcing cord member against the outer circumference of the tire frame.

When the reinforcing cord member is wound in the spiral shape while pressing the reinforcing cord member against the outer circumference of the tire frame as such, the depth of embedding the reinforcing cord member in the outer circumference of the tire frame may be adjusted.

(13-1-13) According to the manufacturing method, it may be configured such that, in the cord member winding step, after winding the reinforcing cord member around the tire frame, the melted or softened part of the outer circumference of the tire frame is cooled.

By forcibly cooling the melted or softened part of the outer circumference of the tire frame after embedding the reinforcing cord member as such, the melted or softened part of the outer circumference of the tire frame may be more quickly and rapidly cooled and solidified than natural cooling. By cooling the outer circumference of the tire more quickly than natural cooling, deformation of the outer circumference of the tire frame may be suppressed, and movement of the reinforcing cord member may be suppressed.

The tire of the thirteenth aspect of the invention may be configured as follows as described in Embodiment 13-2.

(13-2-1) The tire of the thirteenth aspect of the invention may be configured such that the manufacturing method further includes: a roughening treatment step of performing the roughening treatment on the outer circumferential surface of the tire frame by allowing a particle-shaped blasting abrasive to collide with the outer circumferential surface of the tire frame; and a superposing step of superposing a tire-constituting rubber member on the outer circumferential surface which has been subjected to the roughening treatment, via a bonding agent.

When the roughening treatment step is provided as such, the particle-shaped blasting abrasive collides with the outer circumferential surface of the circular tire frame formed by using the thermoplastic resin material, and thus minute roughened unevenness is formed on the outer circumferential surface. The treatment of forming minute roughened unevenness by allowing the blasting abrasive to collide with the outer circumferential surface of the tire frame is referred to as the roughening treatment. Thereafter, the tire-constituting rubber member is superposed on the outer circumferential surface which has been subjected to the roughening treatment, via the bonding agent. Here, when the tire frame and the tire-constituting rubber member are integrated into each other, since the outer circumferential surface of the tire frame has been subjected to the roughening treatment, bonding properties (bonding properties) are enhanced due to the anchor effect. In addition, since the resin material that forms the tire frame is ploughed due to collision of the blasting abrasive, wettability of the outer circumferential surface is enhanced. Accordingly, the outer circumferential surface of the tire frame is held in a state of being uniformly coated with the bonding agent, and thus the bonding strength between the tire frame and the tire-constituting rubber member may be ensured.

(13-2-2) In the tire of the thirteenth aspect of the invention, at least a part of the outer circumferential surface of the tire frame may be an uneven portion, and the uneven portion may be subjected to the roughening treatment in the roughening treatment step.

Even if at least a part of the outer circumferential surface of the tire frame is the uneven portion as such, by allowing the blasting abrasive to collide with the uneven portion, the area around a recess (walls at the recess, the bottom of the recess) is subjected to the roughening treatment, and thus the bonding strength between the tire frame and the tire-constituting rubber member may be ensured.

(13-2-3) In the tire of the thirteenth aspect of the invention, the outer circumference of the tire frame is configured to have a reinforcing layer that constitutes the uneven portion at the outer circumferential surface, and the reinforcing layer may be configured such that a coated cord member formed by coating the reinforcing cord with a resin material of the same kind as or different from the resin material that forms the tire frame is wound in the circumferential direction of the tire frame.

By configuring the outer circumference of the tire frame to have the reinforcing layer formed by winding the coated cord member in the circumferential direction of the tire frame as such, the rigidity of the tire frame in the circumferential direction may be enhanced.

(13-2-4) In the tire of the thirteenth aspect of the invention, a thermoplastic resin material may be used as the resin material that is a component of the coated cord member.

By using the thermoplastic material having thermoplasticity as the resin material that is a component of the coated cord member as such, compared to a case of using a thermosetting material as the resin material, the tire is easily manufactured and is easily recycled.

(13-2-5) The tire of the thirteenth aspect of the invention may be configured so that, in the roughening treatment step, an area wider than the area for superposing the tire-constituting rubber member is subjected to the roughening treatment.

When the area wider than the area for superposing the tire-constituting rubber member is subjected to the roughening treatment in the roughening treatment step, the bonding strength between the tire frame and the tire-constituting rubber member may be reliably ensured.

(13-2-6) The tire of the thirteenth aspect of the invention may be configured so that, in the roughening treatment step, the outer circumferential surface is subjected to the roughening treatment to have an arithmetic mean roughness Ra of 0.05 mm or greater.

When the outer circumferential surface of the tire frame is subjected to the roughening treatment to have an arithmetic mean roughness Ra of 0.05 mm or greater in the roughening treatment step as such, in a case where the tire-constituting rubber member, for example, in an unvulcanized or semi-vulcanized state is superposed on the outer circumferential surface which has been subjected to the roughening treatment, via the bonding agent, and is vulcanized, rubber of the tire-constituting rubber member may be caused to flow to the bottom of the roughened uneven portion formed by the roughening treatment. When the rubber of the tire-constituting rubber member flows to the bottom of the roughened uneven portion, a sufficient anchor effect is exhibited between the outer circumferential surface and the tire-constituting rubber member, and the bonding strength between the tire frame and the tire-constituting rubber member may be enhanced.

(13-2-7) In the tire of the thirteenth aspect of the invention, a rubber in the unvulcanized or semi-vulcanized state may be used as the tire-constituting rubber member.

In the case where the rubber in the unvulcanized or semi-vulcanized state is used as the tire-constituting rubber member as such, the rubber flows to the roughened uneven portion formed on the outer circumferential surface of the tire frame by the roughening treatment when the tire-constituting rubber member is vulcanized. In addition, when vulcanization is completed, the anchor effect is exhibited by the (vulcanized) rubber that has flowed to the roughened uneven portion, and thus the bonding strength between the tire frame and the tire-constituting rubber member may be enhanced.

"Vulcanized" is referred to as a state in which the degree of vulcanization reaches the degree needed for a final product, and the "semi-vulcanized state" is referred to as a state in which the vulcanization degree is higher than the unvulcanized state but has not reached the degree needed for a final product.

(13-2-8) The tire of the thirteenth aspect of the invention may be configured to include: a circular tire frame that is formed using the thermoplastic resin material in the thirteenth aspect of the invention and has the outer circumferential surface which has been subjected to the roughening treatment by allowing a particle-shaped blasting abrasive to collide with the outer circumferential surface; and a tire-constituting rubber member superposed on the outer circumferential surface which has been subjected to the roughening treatment, via a bonding agent.

When the circular tire frame which has been subjected to the roughening treatment is used as such, the bonding strength between the tire frame and the tire-constituting rubber member may be enhanced by the anchor effect. In addition, since the outer circumferential surface has been subjected to the roughening treatment, excellent wettability of the bonding agent is provided. Accordingly, the bonding agent is held in the state of being uniformly applied onto the outer circumferential surface of the tire frame, the bonding strength between the tire frame and the tire-constituting rubber member is ensured, and thus peeling between the tire frame and the tire-constituting rubber member may be suppressed.

EXAMPLES

Example According to First Aspect of the Present Invention

Hereinafter, the first aspect of the present invention is described in more detail using Examples. However, the first aspect of the present invention is not limited thereto.

First, tires of the Examples and the Comparative Example were formed according to Embodiment 1-2 described above. Here, as for the material that forms the tire case, materials described in the following Table 1-1 were used. In addition, evaluation of physical properties of the material and evaluation of bonding property and tire performance of the material with respect to each of the Examples and the Comparative Example was carried out in accordance with the following. In Comparative Example 1-1, since the tire case pieces were not sufficiently bonded to each other, the tire could not be manufactured.

<<Evaluations>>

<Tensile Characteristics>

First, regarding each of the Examples and the Comparative Example, a sample was produced by injection-molding of each thermoplastic resin material that was used for the tire case using a mold of 127 mm×12.7 mm (length×width) and 1.6 mm (thickness). Here, the sample of each Example was injection-molded at 225° C., and the sample of the Comparative Example was injection-molded at 320° C. The mold temperature was from 50° C. to 70° C. in the Examples, and was 130° C. in the Comparative Example. Further, each of the samples was punched out, whereby dumbbell-shaped test pieces (No. 5 type test pieces) defined in JISK6251:1993 were produced.

Subsequently, by using SHIMADZU AUTOGRAPH AGS-J (5 KN) manufactured by Shimadzu Corporation and setting a tensile rate to 200 mm/min, tensile modulus of elasticity, tensile strength, and elongation at break of the test pieces were measured.

The results are shown in the following Table 1-1.

<Bonding Property>

Regarding each of the Examples and the Comparative Example, each thermoplastic resin material that was used for the tire case was heated using a heat gradient testing machine ("Type-HG-100" manufactured by Toyo Seiki Kogyo Co., Ltd.) at from 150° C. to 250° C. and at a pressing pressure of 1 kgf/cm$^2$ at an interval of 10° C. for 60 seconds, whereby bonding samples having a seal size of 10 mm×25 mm were produced.

With respect to each of the produced bonding samples, by using Shimadzu Autograph AGS-J (5 KN) manufactured by Shimadzu Corporation and setting a tensile rate to 50 mm/min, a 180° peel test was performed to measure the bonding area ratio of each of the bonding samples.

The results are shown in the following Table 1-1.

<Tire Evaluation>

—Manufacturability—

Regarding manufacturability, injection molding temperatures when the tire case was injection-molded are shown in Table 1-1.

—Tire Driving Property—

A high-speed performance test was performed on the tire of each of the Examples and the Comparative Example obtained according to Embodiment 1-2 described above, on the basis of JIS D4230:1999 (high-speed performance test B). The results are shown in the following Table 1-1.

—Shape Retention Property—

During the above high-speed performance test, the tire width before and after running was measured and compared to calculate a deformation ratio (%). The results are shown in the following Table 1-1.

TABLE 1-1

|  |  | Example 1-1 | Example 1-2 | Example 1-3 | Comparative Example 1-1 |
|---|---|---|---|---|---|
| Tire case |  | Resin kind | PAE | PAE | PAE | PPS |
|  | Product name | UBESTA | UBESTA | UBESTA | FORTRON |
|  | Grade | 9048X1 | 9055X1 | 9063X1 | 022A9 |
|  | Melting point (° C.) | 154 | 162 | 174 | 279 |
| Evaluation | Tensile characteristics | Tensile modulus of elasticity (MPa) | 183 | 303 | 626 | >1000 |
|  |  | Tensile strength (MPa) | 32 | 41 | 44 | 79 |
|  |  | Elongation at break (%) | 400 | 350 | 250 | 20 |
|  | Bonding property [bonding area ratio (%)] | 160° C. | 0 | 0 | 0 | 0 |
|  |  | 170° C. | 0 | 0 | 0 | 0 |
|  |  | 180° C. | 0 | 0 | 0 | 0 |
|  |  | 190° C. | 50 | 0 | 0 | 0 |
|  |  | 200° C. | 100 | 70 | 0 | 0 |
|  |  | 210° C. | 100 | 100 | 0 | 0 |
|  |  | 220° C. | 100 | 100 | 10 | 0 |
|  |  | 230° C. | 100 | 100 | 100 | 0 |
|  |  | 240° C. | 100 | 100 | 100 | 0 |
|  |  | 250° C. | 100 | 100 | 100 | 0 |
|  | Manufacturability | Injection molding property (° C.) | 250 | 250 | 250 | 340 |
|  | Running performance | Tire running property | Completion | Completion | Completion | — |
|  |  | Shape retention property (%) | <1% | 0 | 0 | — |

PAE: polyamide-based thermoplastic elastomer
PPS: Polyphenylene sulfide resin
UBESTA: manufactured by Ube Industries, Ltd.
FORTRON: manufactured by Polyplastics Co., Ltd.

As seen from Table 1-1, in the Examples in which the polyamide-based elastomer was used, all of the tensile modulus of elasticity, the tensile strength, and the breaking elongation of the tire case had a good value for the performance required for a tire. In contrast, in the tire case of Comparative Example 1-1, the tensile modulus of elasticity was overly high, and moreover, good results could not be obtained with respect to the breaking elongation.

In addition, regarding bonding property, it is seen that 100% bonding could be made at from around 200° C. to 230° C. In contrast, the melting point of PPS used in Comparative Example 1-1 was so high that bonding of the tire case could not sufficiently be made at 250° C.

Furthermore, in Examples 1-1 to 1-3, the injection molding temperature was about 250° C. and therefore injection molding property was excellent, and running performance including tire running property and shape retention property was sufficient.

Examples According to Second Aspect of the Present Invention

Hereinafter, the second aspect of the present invention is described in more detail using Examples. However, the second aspect of the present invention is not limited thereto.

First, tires of the Examples and the Comparative Examples were formed according to Embodiment 2-2 described above. Here, as for the material(s) that forms the tire case, materials described in the following Table 2-1 were used. In addition, evaluation of the physical properties of the material and evaluation of bonding property and tire performance of the material with respect to each of the Examples and the Comparative Examples was carried out in accordance with the following.

<Production of Test Pieces>
1. Polyamide-based thermoplastic elastomer
UBESTA, XPA9055X1 (PAE1) manufactured by Ube Industries, Ltd.
UBESTA, XPA9063X1 (PAE2) manufactured by Ube Industries, Ltd.
2. Polyurethane-based thermoplastic elastomer
1) ELASTOLLAN, ET680 (ester-based) (TPU1) manufactured by BASF
2) ELASTOLLAN, ET880 (ether-based) (TPU2) manufactured by BASF
3) ELASTOLLAN, ET690 (ester-based) (TPU3) manufactured by BASF
4) ELASTOLLAN, ET890 (ether-based) (TPU4) manufactured by BASF
3. Polystyrene-based thermoplastic elastomer
1) TUFTEC, H1052 (TPS1) manufactured by Asahi Kasei Corporation
4. α-polyolefin-based thermoplastic elastomer
1) TOUGHMER, MH7007 (TPO1) manufactured by Mitsui Chemicals, Inc.
2) TOUGHMER, MH7010 (TPO2) manufactured by Mitsui Chemicals, Inc.
3) TOUGHMER, A4050S (TPO3) manufactured by Mitsui Chemicals, Inc.
4) TOUGHMER, A1050S (TPO4) manufactured by Mitsui Chemicals, Inc.
5) TOUGHMER, P275 (TPO5) manufactured by Mitsui Chemicals, Inc.
6) NUCREL, N035C (TPO6) manufactured by Du Pont-Toray Co., Ltd.
7) NUCREL, AN42115C (TPO7) manufactured by Du Pont-Toray Co., Ltd.
5. Polyester-based thermoplastic elastomer
1) HYTREL, 3046 (TPC) manufactured by Du Pont-Toray Co., Ltd.

The elastomers were mixed in a composition (in terms of mass) shown in Table 2-1 and were kneaded by a twin-screw extruder "LABOPLASTOMILL 50 MR" manufactured by Toyo Seiki Seisaku-sho, Ltd. to obtain pellets. In Comparative Examples 2-1 and 2-2, a mixed system was not used, and pellets of polyamide-based thermoplastic elastomers were provided.

Subsequently, injection molding was performed using "SE30D" manufactured by Sumitomo Heavy Industries, Ltd. at a molding temperature of from 200° C. to 225° C. and using a mold of 12.7 mm×127 mm and having a thickness of 1.6 mm at a mold temperature of from 50° C. to 70° C., whereby samples of 12.7 mm×12.7 mm and having a thickness of 1.6 mm were obtained.

Each of the samples was punched out, whereby dumbbell-shaped test pieces (No. 5 type test pieces) defined in JISK6251:1993 were produced.

<Evaluations of Tensile Strength, Elongation at Break, and Tensile Modulus of Elasticity>

By using Shimadzu Autograph AGS-J (5 KN) manufactured by Shimadzu Corporation and setting a tensile rate to 200 mm/min, tensile modulus of elasticity, tensile strength, and elongation at break of each of the test pieces were measured. The results are shown in the following Table 2-1.

TABLE 2-1

| | | Example | | | | | | | | | | | | | | | Comparative Example | |
|---|---|---|---|---|---|---|---|---|---|---|---|---|---|---|---|---|---|---|
| | | 2-1 | 2-2 | 2-3 | 2-4 | 2-5 | 2-6 | 2-7 | 2-8 | 2-9 | 2-10 | 2-11 | 2-12 | 2-13 | 2-14 | 2-15 | 2-1 | 2-2 |
| Tire case | Polyamide elastomer | PAE1 75 mass % | PAE1 75 mass % | PAE1 75 mass % | PAE1 75 mass % | PAE2 75 mass % | PAE2 75 mass % | PAE1 70 mass % | PAE1 70 mass % | PAE1 70 mass % | PAE1 70 mass % | PAE1 70 mass % | PAE1 70 mass % | PAE1 70 mass % | PAE1 70 mass % | PAE1 75 mass % | PAE1 100 mass % | PAE2 100 mass % |
| | other monomers | TPU1 25 mass % | TPU2 25 mass % | TPU3 25 mass % | TPU4 25 mass % | TPU1 25 mass % | TPU2 25 mass % | TPS1 30 mass % | TPO1 30 mass % | TPO2 30 mass % | TPO3 30 mass % | TPO4 30 mass % | TPO5 30 mass % | TPO6 30 mass % | TPO7 30 mass % | TPC1 25 mass % | — | — |
| Evaluation | Tensile strength (MPa) | 22 | 13 | 26 | 16 | 26 | 22 | 23 | 29 | 33 | 21 | 20 | 23 | 27 | 36 | 37 | 41 | 44 |
| | Elongation at break (%) | 200 | 140 | 180 | 130 | 130 | 85 | 405 | 285 | 235 | 260 | 250 | 270 | 320 | 445 | 345 | 350 | 250 |
| | Tensile modulus of elasticity (MPa) | 244 | 178 | 232 | 205 | 532 | 485 | 178 | 181 | 173 | 181 | 164 | 184 | 238 | 266 | 256 | 303 | 626 |

The tires formed according to the Examples had excellent running performance such as impact resistance and durability. In addition, as seen from the results of Table 2-1, it is understood that elastic modulus is low in the Examples compared to Comparative Examples in which the same kind of polyamide-based thermoplastic elastomer was singly used. That is, it is understood that by using other elastomers in combination with the polyamide-based thermoplastic elastomer, the elastic modulus of the thermoplastic resin material that forms the tire case was controlled.

<Evaluation of Pull-Out Property of Reinforcing Cord>

With respect to Examples 2-1 and 2-2 and Comparative Example 2-1, a pull-out property of the reinforcing cord was evaluated as follows.

First, φ0.8 mm of a brass-plated wire and φ0.96 mm of a bronze wire were washed with water, and were baked at 110° C. for 5 minutes. Next, for Examples 2-1 and 2-2 and Comparative Example 2-1, the thermoplastic resin materials were injection-molded with a mold in which each of the aforementioned wires was inserted to produce samples having φ10 mm. Here, as the injection molding machine, "ROBOSHOT α-15C" manufactured by FANUC Corporation was used. In the formation of the sample, each of the samples was produced having embodiment lengths of 20 mm, 40 mm, or 60 mm of wire.

As for the pull-out property of the wire from the samples, the pull-out force (unit: N) at the time of pulling-out was measured at 5 mm/min using "AG-5 KNK" manufactured by Shimadzu Corporation.

The results are shown in the following Table 2-2.

Here, as for the material that forms the tire case, materials described in the following Table 3-1 were used. In addition, test pieces each of 12.7 mm×127 mm and having a thickness of 1.6 mm and having the same component compositions as those of the tire cases formed under the same conditions as in the Examples and the Comparative Examples were prepared, and evaluations of injection molding property, tensile strength, elongation at break, and breaking state were performed. The results are shown in the following Table 3-1. In addition, the production method of each of the test pieces, the evaluation method, and the evaluation conditions are as follows.

<Production of Test Pieces>

1. Polyamide-based thermoplastic elastomer
   UBESTA, XPA9055X1 manufactured by Ube Industries, Ltd.
2. α-olefin-based thermoplastic elastomer
   1) TOUGHMER, MA8510 manufactured by Mitsui Chemicals, Inc.
   2) TOUGHMER, MH7007 manufactured by Mitsui Chemicals, Inc.
   3) TOUGHMER, MH7010 manufactured by Mitsui Chemicals, Inc.
   4) TOUGHMER, MH7020 manufactured by Mitsui Chemicals, Inc.
   5) TOUGHMER, A1050S manufactured by Mitsui Chemicals, Inc.
3. Styrene-based thermoplastic elastomer [fully-hydrogenated type (SEBS)]
   1) TUFTEC, H1041 manufactured by Asahi Kasei Corporation
   2) TUFTEC, M1931 manufactured by Asahi Kasei Corporation The thermoplastic elastomers were mixed in a composition (in terms of mass) shown in Table 3-1 and were kneaded by

TABLE 2-2

| | | φ0.8 mm brass-plated wire | | | | φ0.96 mm bronze wire | | | |
|---|---|---|---|---|---|---|---|---|---|
| | Resin kind | 10 | 20 | 40 | 60 | 10 | 20 | 40 | 60 |
| Example 2-1 | PAE1 75 mass % / TPU1 25 mass % | — | 455.7 | 877.4 | 938.0 | — | 442.1 | 1162.3 | 1099.6 |
| Example 2-2 | PAE1 75 mass % / TPU2 25 mass % | — | 291.7 | 484.1 | 551.0 | — | 348.8 | 935.3 | 986.3 |
| Comparative example 2-1 | PAE1 100% | 39.5 | 63.8 | 65.0 | 76.7 | 40.9 | 149.7 | 174.4 | 211.1 |

As shown in Table 2-2, it is understood that in Examples 2-1 and 2-2 in which the polyurethane-based thermoplastic elastomer was used in combination, the pull-out property of the wire cord were significantly enhanced compared to Comparative Example 2-1 in which the polyamide-based thermoplastic elastomer was singly used.

Examples According to Third Aspect of the Present Invention

Hereinafter, the third aspect of the present invention is described in more detail using Examples. However, the third aspect of the present invention is not limited thereto.

First, tires of the Examples and the Comparative Examples were formed according to Embodiment 3-1 described above.

the twin-screw extruder "LABOPLASTOMILL 50 MR" manufactured by Toyo Seiki Seisaku-sho, Ltd. to obtain pellets. In Comparative Example 3-1, a mixed system was not used, and pellets of polyamide-based thermoplastic elastomer were provided.

Using each of the prepared pellets of the Examples and the Comparative Example, injection molding was performed under the following conditions to obtain test pieces.

For the injection molding, SE30D manufactured by Sumitomo Heavy Industries, Ltd. was used, the molding temperature was set to from 200° C. to 235° C. and the mold temperature was set to from 70° C. to 80° C., and a mold of 12.7 mm×127 mm and having a thickness of 1.6 mm was used.

Regarding the injection molding using each of the pellets in Examples 3-6 and 3-8, the injection molding could not be performed under the above conditions. Therefore each of the pellets in Examples 3-6 and 3-8 was pressurized at 12 MPa for 5 minutes using an electrothermal press manufactured by Kodaira Seisakusho Co., Ltd., to obtain a molded product of 200 mm×200 mm and having a thickness of 2 mm.

Measurement of Acid Value of Thermoplastic Resin Material

The acid value of the thermoplastic resin material was calculated based on the above equation (1) or equation (2) from the mass [mg] of sodium methoxide ($CH_3ONa$) used when neutralization titration was performed on each of the elastomers used in the Examples and the Comparative Examples using sodium methoxide ($CH_3ONa$). The results are shown in Table 3-1.

<Evaluation Method>

1. Evaluation of Fluidity [MFR (g/10 minutes, 230° C.)] and Evaluation of Injection Molding Property A load of 21.18 N, 49.03 N, or 98.07 N was applied to each of the pellets of the Examples and the Comparative Examples based on ASTM A1238 (B method) using a semi-auto melt indexer 2A type manufactured by Toyo Seiki Seisaku-sho, Ltd. to measure fluidity (MFR). Measurement was started from a small load (21.18 N), and in a case in which MFR could not be measured under this condition, a higher load was applied for measurement. After starting measurement, those for which measurement did not start even after 3 minutes elapsed were indicated by "-" in Table 3-1.

In addition, evaluation of injection molding property under the conditions of a molding temperature of from 200° C. to 235° C. and a mold temperature of from 70° C. to 80° C. was performed using the above described SE30D manufactured by Sumitomo Heavy Industries, Ltd., and the results are shown in Table 3-1. Those that could not be injection-molded under the corresponding conditions were indicated by O, and those that could be injection-molded under the corresponding conditions were indicated by Δ, in Table 3-1.

2. Evaluations of Tensile Strength, Elongation at Break, Tensile Modulus of Elasticity, and Breaking State The test pieces obtained by the injection molding were punched out, whereby dumbbell-shaped test pieces (No. 5 type test pieces) defined in JISK6251-1993 were produced.

By using Shimadzu Autograph AGS-J (5 KN) manufactured by Shimadzu Corporation and pulling the dumbbell-shaped test pieces at a tensile rate of 200 mm/min, tensile strength, elongation at break, tensile modulus of elasticity, and breaking state of the test pieces were examined.

The breaking state was evaluated by visually observing a cross-section of the test piece based on the following evaluation criteria.

—Evaluation Criteria—
O: the test piece was broken due to ductile fracture.
Δ: the test piece was broken due to laminar-shaped fracture.
X: the test piece was broken due to brittle fracture.

2. SEM Photograph Observation

Figure 7:
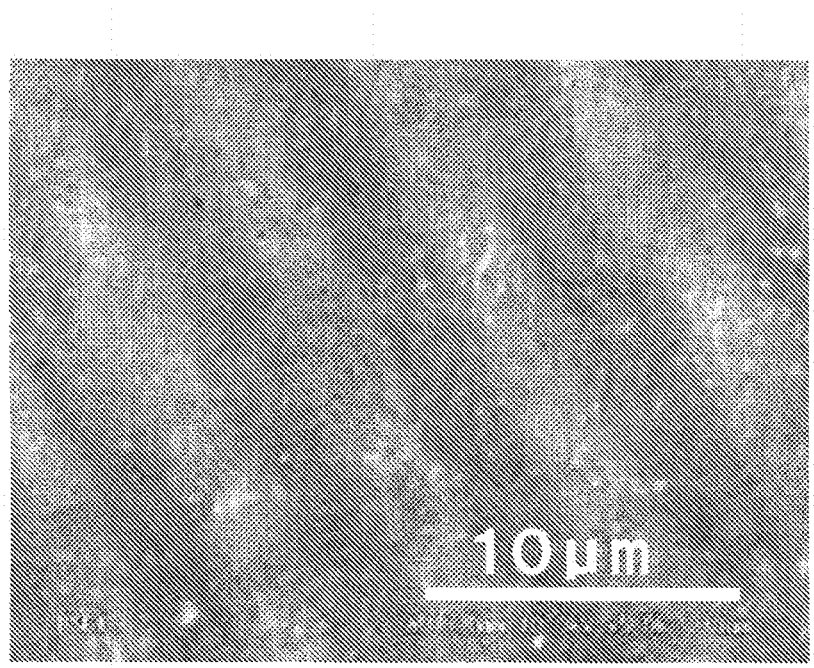
FIG. 7 relates to the third aspect of the present invention, and is a SEM photograph of a sample piece according Example 3-1 made of a thermoplastic resin.
Figure 8:
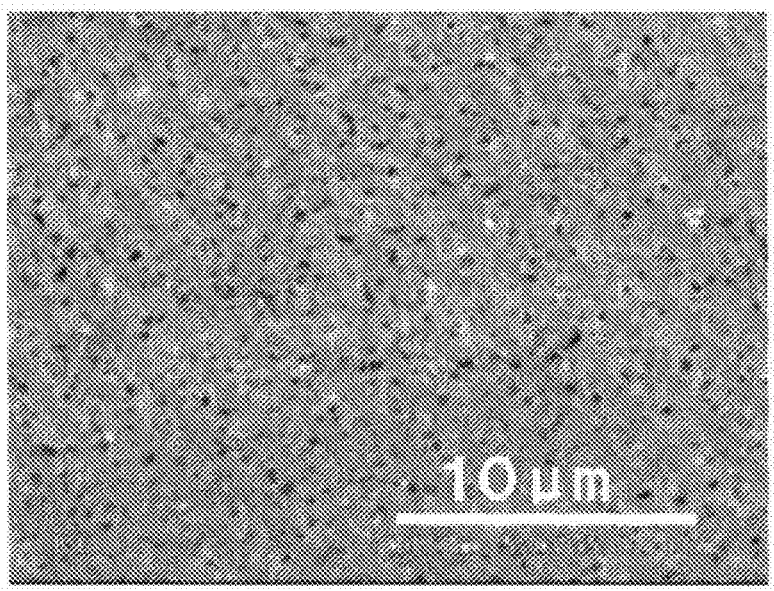
FIG. 8 relates to the third aspect of the present invention, and is a SEM photograph of a sample piece according Example 3-8 made of a thermoplastic resin material.
Figure 9:
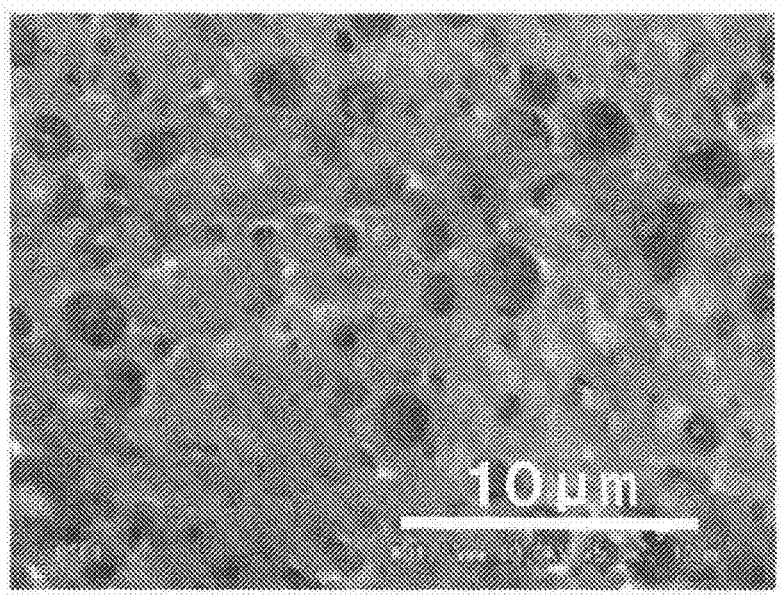
FIG. 9 relates to the third aspect of the present invention, and is a SEM photograph of a sample piece according Comparative Example 3-3 made of a thermoplastic resin material in the third aspect of the present invention.

Cross-sections of the test pieces of Examples 3-1 and 3-8 and Comparative Example 3-3 were observed with a scanning electron microscope S-4300 manufactured by Hitachi, Ltd., and the obtained SEM photographs are respectively shown in FIGS. 7, 8 and 9.

TABLE 3-1

| | | | Comparative Example | | | Example | | | | | | | |
|---|---|---|---|---|---|---|---|---|---|---|---|---|---|
| | | | 3-1 | 3-2 | 3-3 | 3-1 | 3-2 | 3-3 | 3-4 | 3-5 | 3-6 | 3-7 | 3-8 |
| Polyamide elastomer | UBESTA | XPA 9055X | 100 | 70 | 70 | 70 | 70 | 70 | 70 | 70 | 70 | 70 | 70 |
| α-olefin-based elastomer | TOUGH-MER | MA8510 | | | | 30 | | | | | | | |
| | | MH7007 | | | | | 30 | | | | | | |
| | | MH7010 | | | | | | 30 | 15 | 20 | | | |
| | | MH7020 | | | | | | | | | 30 | | |
| | | A1050S | | 30 | | | | | 15 | 10 | | | |
| Styrene-based elastomer (SEBS) | TUFTEC | H1041 | | | 30 | | | | | | | 15 | |
| | | M1913 | | | | | | | | | | 15 | 30 |
| Acid value of thermoplastic resin [mg-$CH_3ONa$/g] | | | 0 | 0 | 0 | 1.11 | 0.78 | 1.11 | 0.56 | 0.74 | 2.22 | 1.5 | 3 |
| Evaluation | MFR load 21.18N | | 20.1 | 14.62 | 26.63 | — | — | — | — | — | — | — | — |
| | MFR load 49.03N | | | | | | 4.12 | | 8.97 | 4.19 | — | — | — |
| | MFR load 98.07N | | | | | 8.23 | | 5.43 | | | — | — | — |
| | Injection molding property | | O | O | O | O | O | O | O | O | Δ | O | Δ |
| | Tensile strength [MPa] | | 41 | 20 | 32 | 33 | 29 | 33 | 34 | 31 | 35 | 36 | 32 |
| | Elongation at break [%] | | 350 | 250 | 425 | 265 | 285 | 275 | 325 | 275 | 475 | 300 | 425 |
| | Tensile modulus of elasticity [MPa] | | 303 | 164 | 227 | 198 | 181 | 173 | 195 | 194 | 156 | 254 | 227 |
| | Breaking state | | O | Δ | Δ | O | O | O | O | O | O | O | O |

As seen from Table 3-1, the test pieces described in Examples 3-1 to 3-8 were able to achieve both reduction in tensile modulus of elasticity and fracture property. Therefore, it is apparent that the tire manufactured using the tire case formed using the same thermoplastic resin materials as those of the test pieces described in Examples 3-1 to 3-8 could achieve both reduction in tensile modulus of elasticity and fracture property. Therefore, it is assumed that a vehicle configured using such a tire has good ride quality and even when tire is damaged, the tire is less likely to burst and break.

In addition, a high-speed performance test was performed on each of the tires formed in the Examples and the Comparative Examples based on JIS D4230-1999 (high-speed performance test B), and all of the tires completed the course and there was no problem in safety during running.

In addition, from the SEM photographs (FIGS. 7 and 8) of the test pieces used in Examples 3-1 and 3-8, it is understood that the island phase of the acid-modified part of the acid-modified elastomer was finely dispersed in the resin. In contrast, referring to the SEM photograph (FIG. 9) of the test piece used in Comparative Example 3-3, it is understood that the large dark phase (polystyrene-based thermoplastic elastomer) was present in the pale matrix (polyamide-based thermoplastic elastomer). It is considered that the polystyrene-based thermoplastic elastomer used in Comparative Example 3-3 was not acid-modified, was difficult to be mixed with the polystyrene-based thermoplastic elastomer, and therefore had not equaled the Examples in terms of fracture property.

As such, it was proved from the SEM photographs that the test pieces used in Examples 3-1 and 3-8 had excellent tensile elasticity and fracture property.

Examples According to Fourth Aspect of the Present Invention

Hereinafter, the fourth aspect of the present invention is described in more detail using Examples. However, the fourth aspect of the present invention is not limited thereto.

First, tires of the Examples and the Comparative Examples were formed according to Embodiment 4-1 described above. Here, as for the material that forms the tire case, materials described in the following Table 4-1 were used.

In addition, test pieces each having the same component compositions as those of the tire cases formed under the same conditions as in the Examples and the Comparative Examples were prepared, and the evaluations of tensile strength, elongation at break, tensile modulus of elasticity, breaking state, and tan δ were performed. The production method of each of the test pieces, each of the evaluation methods, and the evaluation conditions are as follows.

[Production of Pellets]
<Thermoplastic Elastomer or Thermoplastic Resin for Comparison>
(1) Polyamide-based thermoplastic elastomer
1) UBESTA XPA9048X1 manufactured by Ube Industries, Ltd.
2) UBESTA XPA9055X1 manufactured by Ube Industries, Ltd.
(2) Polyester-based thermoplastic elastomer
1) HYTREL 5557 manufactured by Du Pont-Toray Co., Ltd.
(3) Thermoplastic resin for comparison
1) SBR1500 manufactured by JSR Corporation
<Specific Needle-Shaped Crystal Particles>
(1) Magnesium sulfate particles (whisker)
1) "MOS-HIGE", fiber length: 1.0 μm to 3.0 μm, fiber diameter: 0.5 μm to 1.0 μm, manufactured by Ube Material Industries, Ltd.
<Particles for Comparison>
(1) Carbon black ("#78", spherical concatenated fine particles, manufactured by Asahi Carbon Co., Ltd.)

The materials selected from the materials described above were introduced into a twin-screw extruder "LABOPLASTOMILL 50 MR" manufactured by Toyo Seiki Seisaku-sho, Ltd. at the composition shown in Table 4-1 (in terms of mass) and were kneaded under the following kneading conditions to obtain pellets. In Comparative Examples 4-1 to 4-3, kneading was not performed, and pellets of each of thermoplastic elastomers were prepared.

—Kneading Conditions—
screw revolutions: 100 rpm
screw length (L)/screw diameter (D): 45
kneading temperature: 200° C.
kneading time: 12 minutes

[Production of Resin Plate]
A resin plate having a thickness of 2 mm, a width of 30 mm, and a length of 100 mm was molded using the obtained pellets as a molding material by setting a molding temperature (cylinder temperature) to 180° C. to 230° C. and a mold temperature to 60° C., with an injection molding machine (an injection molding machine SE30D manufactured by Sumitomo Heavy Industries, Ltd.).

[1. Evaluations of Tensile Strength and Tensile Modulus of Elasticity]
(1) Production of Test Pieces
The dumbbell-shaped test pieces (No. 5 type test pieces) defined in JISK6251-1993 were punched out from the produced resin plates, to produce test pieces for evaluation.
(2) Evaluation
The obtained dumbbell-shaped test pieces were pulled at a tensile rate of 200 mm/min using Shimadzu Autograph AGS-J (5 KN) manufactured by Shimadzu Corporation, to evaluate tensile modulus of elasticity and tensile strength of the test pieces. Tensile modulus of elasticity and tensile strength in both cases in which the test pieces for evaluation were heated to 30° C. and 80° C. were evaluated. Heating of the test pieces was performed by controlling temperature using a temperature control chamber in a viscoelasticity measurement device.

The results are shown in Table 4-1.

[2. Measurement of Tan δ]
(1) Production of Test Pieces
The produced resin plates were punched so as to have circular shapes having a diameter of 6 mm, to produce test pieces for evaluation.
(2) Evaluation
Regarding the produced test pieces for evaluation, by using a dynamic viscoelasticity measurement test machine "ARES III" manufactured by Rheometric Scientific, Inc., a loss tangent (tan δ) was measured at a temperature of 30° C., a measurement frequency of 35 Hz, and a dynamic strain of 1%.

The results are shown in Table 4-1.

TABLE 4-1

| | | | | | Example 4-1 | Example 4-2 | Example 4-3 | Example 4-4 | Example 4-5 | Example 4-6 |
|---|---|---|---|---|---|---|---|---|---|---|
| Thermoplastic resin material | Thermoplastic elastomer or resin for comparison | Polyamide-based elastomer | UBESTA | XPA 9048X1 | 100 | | 100 | | | |
| | | | | XPA 9055X1 | | 100 | | 100 | | |
| | | Polyester-based elastomer | HYTREL | 5557 | | | | | 100 | |

TABLE 4-1-continued

| | | | | | | | | | | |
|---|---|---|---|---|---|---|---|---|---|---|
| | | Polystyrene-based elastomer | SEBS | H1062 | | | | | | 100 |
| | | Styrene-butadiene rubber | SBR | 1500 | | | | | | |
| | Specific needle-shaped crystal particles | Magnesium sulfate whisker | | | 0.5 | 0.5 | 1 | 1 | 1 | 1 |
| | Particles for comparison | Carbon black | | | | | | | | |
| Evaluation | Tensile modulus of elasticity (MPa) 30° C. | | | | 224 | 335 | 245 | 384 | 285 | 121 |
| | Tensile strength (MPa) 30° C. | | | | 33 | 37 | 34 | 38 | 32 | 28 |
| | Tensile modulus of elasticity (MPa) 80° C. | | | | 120 | 208 | 125 | 215 | 162 | 102 |
| | Tensile strength (MPa) 80° C. | | | | 18 | 19 | 18 | 21 | 16 | 18 |
| | Loss factor (tan δ) | | | | 0.055 | 0.1 | 0.054 | 0.11 | 0.06 | 0.07 |

| | | | | | Comparative Example 4-1 | Comparative Example 4-2 | Comparative Example 4-3 | Comparative Example 4-4 |
|---|---|---|---|---|---|---|---|---|
| Thermoplastic resin material | Thermoplastic elastomer or resin for comparison | Polyamide-based elastomer | UBESTA | XPA 9048X1 | 100 | | | |
| | | | | XPA 9055X1 | | 100 | | |
| | | Polyester-based elastomer | HYTREL | 5557 | | | 100 | |
| | | Polystyrene-based elastomer | SEBS | H1062 | | | | 100 |
| | | Styrene-butadiene rubber | SBR | 1500 | | | | |
| | Specific needle-shaped crystal particles | Magnesium sulfate whisker | | | 0 | 0 | 0 | 0 |
| | Particles for comparison | Carbon black | | | | | | |
| Evaluation | Tensile modulus of elasticity (MPa) 30° C. | | | | 198 | 299 | 210 | 68 |
| | Tensile strength (MPa) 30° C. | | | | 32 | 34 | 30 | 24 |
| | Tensile modulus of elasticity (MPa) 80° C. | | | | 105 | 158 | 123 | 44 |
| | Tensile strength (MPa) 80° C. | | | | 18 | 22 | 19 | 14 |
| | Loss factor (tan δ) | | | | 0.055 | 0.11 | 0.05 | 0.06 |

| | | | | | | Comparative Example 4-5 | Comparative Example 4-6 | Comparative Example 4-7 |
|---|---|---|---|---|---|---|---|---|
| | Thermoplastic resin material | Thermoplastic elastomer or resin for comparison | Polyamide-based elastomer | UBESTA | XPA 9048X1 | 100 | 100 | |
| | | | | | XPA 9055X1 | | | |
| | | | Polyester-based elastomer | HYTREL | 5557 | | | |
| | | | Polystyrene-based elastomer | SEBS | H1062 | | | |
| | | | Styrene-butadiene rubber | SBR | 1500 | | | 100 |
| | | Specific needle-shaped crystal particles | Magnesium sulfate whisker | | | | | |
| | | Particles for comparison | Carbon black | | | 15 | 1 | 15 |
| | Evaluation | Tensile modulus of elasticity (MPa) 30° C. | | | | 543 | 174 | 421 |
| | | Tensile strength (MPa) 30° C. | | | | 45 | 14 | 31 |
| | | Tensile modulus of elasticity (MPa) 80° C. | | | | 268 | 88 | 198 |
| | | Tensile strength (MPa) 80° C. | | | | 27 | 9 | 14 |
| | | Loss factor (tan δ) | | | | 0.16 | 0.08 | 0.22 |

As shown in Table 4-1, it is understood that in each of the test pieces of the Examples, all the evaluations of tensile modulus of elasticity, tensile strength, and loss factor (tan δ) were good compared to each of the test pieces of the Comparative Examples.

Therefore, it is understood that the tires produced using the same thermoplastic resin materials as those of the test pieces described in the Examples has excellent steering stability and suppressed rolling resistance, and that a vehicle equipped with the tire has excellent steering stability and exhibits low fuel consumption.

In addition, a drum running test was performed on each of the tires formed using the thermoplastic resin materials of each of the Examples and the Comparative Examples, and all of the tires had no problems in stability during running.

Examples According to Fifth Aspect of the Present Invention

Hereinafter, the fifth aspect of the present invention is described in more detail using Examples. However, the fifth aspect of the present invention is not limited thereto.

First, tires of the Examples and Comparative the Examples were formed according to Embodiment 5-2 described above. Here, as for the material that forms the tire case, materials described in the following Table 5-1 were used. Evaluations of physical properties and tire performance with respect to each of the Examples and the Comparative Examples were performed as follows.

Each of the samples was punched out, whereby dumbbell-shaped test pieces (No. 5 type test pieces) defined in JISK6251:1993 were produced.

Subsequently, by using Shimadzu Autograph AGS-J (5 KN) manufactured by Shimadzu Corporation and setting a tensile rate to 200 mm/min, tensile modulus of elasticity at 30° C. and 80° C. and tan δ of each of the dumbbell-shaped test pieces were measured. The results are shown in Table 5-1.

TABLE 5-1

|  |  | Example 5-1 | Example 5-2 | Example 5-3 | Example 5-4 | Comparative Example 5-1 | Comparative Example 5-2 | Comparative Example 5-3 |
|---|---|---|---|---|---|---|---|---|
| Tire case | Thermoplastic elastomer | PA-A | PA-B | PA-A | PA-A | PA-A | PA-B | PA-A |
|  | Tg/° C. of hard polymer | 41 | 41 | 41 | 41 | 41 | 41 | 41 |
|  | Tensile modulus of elasticity/Mpa | 198 | 299 | 198 | 198 | 198 | 299 | 198 |
|  | Loss factor (tanδ) | 0.06 | 0.1 | 0.06 | 0.06 | 0.06 | 0.1 | 0.06 |
|  | Specific resin | PPE | PPE | ABS | AES | — | — | PP |
|  | Tg/° C. | 210 | 210 | 118 | 127 | — | — | 0 |
|  | Tensile modulus of elasticity/Mpa | 1150 | 1150 | 1373 | 1665 | — | — | 1200 |
|  | Loss factor (tanδ) | 0.03 | 0.03 | 0.1 | 0.06 | — | — | 0.12 |
|  | Mass ratio (X + Y)/Z | 85/15 | 88/12 | 70/30 | 70/30 | — | — | 85/15 |
| Evaluation | Tensile modulus of elasticity/30° C. | 225 | 334 | 369 | 355 | 198 | 299 | 181 |
|  | Tensile modulus of elasticity/80° C. | 106 | 121 | 183 | 175 | 89 | 158 | 78 |
|  | Tensile strength/Mpa | 48 | 62 | 19 | 17 | 39 | 54 | 23 |
|  | Loss factor (tanδ) | 0.05 | 0.09 | 0.06 | 0.06 | 0.06 | 0.1 | 0.14 |

* In Table 5-1, "mass ratio(x + y)/z" represents the mass ratio of the total amount of the hard segment of the thermoplastic elastomer and the specific resin according to the fifth aspect of the present invention to the total amount of the soft segment.

[Production of Pellets]

Regarding the resin materials used for the tire case in each of the Examples and the Comparative Examples, the materials were mixed in a composition (in terms of mass) shown in Table 5-1. Subsequently, the resin materials were kneaded (a mixing temperature of 230° C. and a kneading time period of 3 minutes) with a twin-screw extruder "LABOPLASTOMILL 50 MR" manufactured by Toyo Seiki Seisaku-sho, Ltd. to obtain pellets. In some of the Comparative Examples, a mixed system was not used, and pellets of polyamide-based thermoplastic elastomers were provided.

<Evaluations of Loss Factor (Tan δ) and Tensile Modulus of Elasticity>

Injection molding was performed using the produced pellets with SE30D manufactured by Sumitomo Heavy Industries, Ltd. at a molding temperature of from 180° C. to 260° C. and at a mold temperature of from 50° C. to 70° C., to obtain samples each of 100 mm×30 mm and having a thickness of 2.0 mm.

Description of the abbreviations in the above Table 5-1 is provided as follows.

PA-A: polyamide-based thermoplastic elastomer ("UBESTA XPA9048X1" manufactured by Ube Industries, Ltd., a polyamide-content ratio of 40% by weight)

PA-B: polyamide-based thermoplastic elastomer ("UBESTA XPA9055X1" manufactured by Ube Industries, Ltd., a polyamide-content ratio of 50% by weight)

PPE: polyphenylene ether ("XYRON 200H" manufactured by Asahi Kasei Chemicals Corporation)

PP: polypropylene ("NOVATEC BC3H" manufactured by Japan Polypropylene Corporation)

ABS: acrylonitrile/butadiene/styrene copolymer ("TECHNO ABS 170" manufactured by Technopolymer Co., Ltd.)

AES: acrylonitrile/ethylene/styrene copolymer ("W245" manufactured by Technopolymer Co., Ltd.)

As seen from Table 5-1, it is understood that, the materials for the tire case of Examples 5-1 to 5-4 had improved tensile modulus of elasticity while low loss factor (tan δ) was maintained, compared to those of the Comparative Examples. In addition, it is understood that, in the materials for the tire case of Examples 5-1 to 5-4, the tensile moduli of elasticity at 30° C. were higher than those in Comparative Example 5-1 or 5-2 in which the same thermoplastic elastomers were used, and the tensile moduli of elasticity at 80° C. in Examples 5-1, 5-3, and 5-4 were higher than that in Comparative Example 5-1, whereby heat resistance was improved.

In addition, in Comparative Example 5-3 in which the resin (polypropylene: "NOVATEC BC3H" manufactured by Japan Polypropylene Corporation) having a lower glass-transition temperature than the glass-transition temperature of the hard segment (polyamide 12) of PA-A was used, the tensile modulus of elasticity was not improved compared to Example 5-1, and heat resistance was low.

Moreover, the tires in the Examples had small rolling resistance and excellent heat resistance.

Examples According to Sixth Aspect of the Present Invention

Hereinafter, the sixth aspect of the present invention is described in more detail using Examples. However, the sixth aspect of the present invention is not limited thereto.

First, tires of the Examples and the Comparative Examples were formed according to Embodiment 6-1 described above. Here, as for the material that forms the tire case, materials described in the following Table 6-1 were used.

In addition, test pieces having the same component compositions as those of the tire cases formed under the same conditions as in the Examples and the Comparative Examples were prepared, and the evaluations of tensile strength, elongation at break, tensile modulus of elasticity, breaking state, and tan δ were performed. The production method of each of the test pieces, each of the evaluation methods, and the evaluation conditions are as follows.

[Production of Pellets]
<Thermoplastic Elastomer>
(1) Polyamide-based thermoplastic elastomer
1) UBESTA XPA9055X1 manufactured by Ube Industries, Ltd.
2) UBESTA XPA9048X1 manufactured by Ube Industries, Ltd.
(2) Polyester-based thermoplastic elastomer
1) HYTREL 3046 manufactured by Du Pont-Toray Co., Ltd.
<Antistatic Material>
(1) Carbon black ("HAF", manufactured by Asahi Carbon Co., Ltd.)
(2) Phosphoester-based ion conductive agent ("ELENITE AB-100" manufactured by Takamatsu Oil & Fat Co., Ltd.)

The materials selected from the materials described above were introduced into a twin-screw extruder manufactured by Technovel Corporation at the composition (in terms of mass) shown in Table 6-1 and were kneaded under the following kneading conditions to obtain pellets. In Comparative Examples 6-1 to 6-3, kneading was not performed, and pellets of each of thermoplastic elastomers were provided.

—Kneading Conditions—
screw revolutions: 100 rpm
screw length (L)/screw diameter (D): 45
kneading temperature: 200° C.
kneading time: 12 minutes

[Production of Resin Plates]
Heat-pressing was performed using the obtained pellets as molding materials and using an electrothermal press manufactured by Kodaira Seisakusho Co., Ltd. by heating at 230° C. and 12 MPa for 5 minutes, to produce a resin plate having a length of 80 mm, a width of 40 mm, and a thickness of 2 mm.

[1. Measurement of Volume Resistivity]
As the resin plates obtained as above as test pieces for evaluation, volume resistivity was measured using a resistivity meter "HIRESTA UP MCP-HT450 type" manufactured by Mitsubishi Chemical Analytech Co., Ltd. according to JIS K6911:(in 1995).

The volume resistivity that is equal to or less than $10^{10}$ Ω·cm is not a practically problematic level for the tire to exhibit antistatic performance.

The results are shown in Table 6-1.

[2. Evaluations of Tensile Strength, Elongation at Break, Tensile Modulus of Elasticity, and Fracture Property]
(1) Production of Test Pieces
The dumbbell-shaped test pieces (No. 5 type test pieces) defined in JISK6251-1993 were punched out from the produced resin plates, to produce test pieces for evaluation.

(2) Evaluation
By pulling the obtained dumbbell-shaped test pieces at a tensile rate of 200 mm/min using Shimadzu Autograph AGS-J (5 KN) manufactured by Shimadzu Corporation, tensile strength, elongation at break, tensile modulus of elasticity, and breaking state (fracture property) of the test pieces were examined.

The results are shown in Table 6-1.

The fracture property was evaluated by visually observing a breaking state of a cross-section of the test piece based on the following evaluation criteria.
—Evaluation Criteria—
O: the test piece was broken due to ductile fracture.
Δ: the test piece was broken due to laminar-shaped fracture.
x: the test piece was broken due to brittle fracture.

[2. Measurement of Tan δ]
(1) Production of Test Pieces
The produced resin plates were punched out so as to have circular shapes having a diameter of 6 mm, to produce test pieces for evaluation.

(2) Evaluation
Regarding the produced test pieces for evaluation, by using a dynamic viscoelasticity measurement test machine "ARES III" manufactured by Rheometric Scientific, Inc., a loss tangent (tan δ) was measured at a temperature of 30° C., a measurement frequency of 35 Hz, and a dynamic strain of 1%.

The results are shown in Table 6-1.

TABLE 6-1

|  |  |  |  |  | Example 6-1 | Example 6-2 | Example 6-3 | Example 6-4 | Example 6-5 | Example 6-6 |
| --- | --- | --- | --- | --- | --- | --- | --- | --- | --- | --- |
| Thermo-plastic resin material | Thermo-plastic elastomer | Polyamide elastomer | UBESTA | XPA 9055X1 |  |  | 100 | 100 |  |  |
|  |  |  |  | XPA 9048X1 | 100 | 100 |  |  | 100 | 100 |

TABLE 6-1-continued

|  |  |  |  |  |  |  |  |  |  |  |
|---|---|---|---|---|---|---|---|---|---|---|
|  | Antistatic material | Polyester elastomer | HYTREL | 5557 |  |  |  |  |  |  |
|  |  | Carbon black |  | HAF |  |  |  |  | 5 | 10 |
|  |  | Phospho-ester-based ion conductive agent | ELENITE | AB-100 | 5 | 10 | 5 | 10 |  |  |
| Evaluation | Volume resistivity (Ω · cm) |  |  |  | $3.7 \times 10^9$ | $6.3 \times 10^8$ | $2.1 \times 10^9$ | $6.5 \times 10^8$ | $4.5 \times 10^9$ | $2.1 \times 10^7$ |
|  | Tensile modulus of elasticity (MPa) |  |  |  | 201 | 195 | 299 | 305 | 224 | 238 |
|  | Tensile strength (MPa) |  |  |  | 28 | 27 | 32 | 31 | 34 | 36 |
|  | Elongation at break (%) |  |  |  | 480 | 510 | 520 | 550 | 380 | 360 |
|  | Fracture property |  |  |  | O | O | O | O | O | O |
|  | tanδ |  |  |  | 0.059 | 0.061 | 0.1 | 0.11 | 0.078 | 0.16 |

|  |  |  |  |  | Example 6-7 | Comparative Example 6-1 | Comparative Example 6-2 | Comparative Example 6-3 |
|---|---|---|---|---|---|---|---|---|
| Thermoplastic resin material | Thermoplastic elastomer | Polyamide elastomer | UBESTA | XPA 9055X1 |  |  | 100 |  |
|  |  |  |  | XPA 9048X1 |  | 100 |  |  |
|  | Antistatic material | Polyester elastomer | HYTREL | 5557 | 100 |  |  | 100 |
|  |  | Carbon black |  | HAF |  | 0 | 0 | 0 |
|  |  | Phospho-ester-based ion conductive agent | ELENITE | AB-100 | 10 | 0 | 0 | 0 |
| Evaluation | Volume resistivity (Ω · cm) |  |  |  | $8.8 \times 10^8$ | $3.1 \times 10^{12}$ | $6.3 \times 10^{11}$ | $2.2 \times 10^{11}$ |
|  | Tensile modulus of elasticity (MPa) |  |  |  | 128 | 203 | 302 | 131 |
|  | Tensile strength (MPa) |  |  |  | 29 | 33 | 34 | 33 |
|  | Elongation at break (%) |  |  |  | 430 | 460 | 520 | 410 |
|  | Fracture property |  |  |  | O | O | O | O |
|  | tanδ |  |  |  | 0.12 | 0.06 | 0.1 | 0.14 |

As shown in Table 6-1, from each of the test pieces of the Examples having a volume resistivity being in a range of from $1.0 \times 10^6$ to $1.0 \times 10^{10}$ compared to each of the test pieces of the Comparative Examples, it is understood that the tire produced using the same thermoplastic resin materials as those of the test pieces has excellent antistatic performance.

In addition, in each of the test pieces of Examples 6-1 to 6-7, the volume resistivity thereof was in a range of from $1.0 \times 10^6$ to $1.0 \times 10^{10}$, and tan δ was also maintained at a low level. Therefore, the tire produced using the same thermoplastic resin materials as those of the test pieces described in Examples 6-1 to 6-7 has excellent antistatic performance, and suppressed the rolling resistance. Therefore, it is perceived that a vehicle including such a tire suppresses more effectively generation of discharge caused by electrification and adhesion of fine dust or the like to the surface of the tire, has excellent steering stability, and exhibits low fuel consumption.

In addition, a drum running test was performed on each of the tires formed using the thermoplastic resin materials of each of the Examples and the Comparative Examples, and all of the tires had no problems in stability during running.

Examples According to Seventh Aspect of the Present Invention

Hereinafter, the seventh aspect of the present invention is described in more detail using Examples. However, the seventh aspect of the present invention is not limited thereto.

First, tires of the Examples and the Comparative Examples were formed according to Embodiment 7-1 described above. Here, as for the material that forms the tire case, materials described in the following Tables 7-1 and 7-2 were used. Test pieces each of 12.7 mm×127 mm and having the same component compositions as those of the tire cases formed under the same conditions as in the Examples and the Comparative Examples and were produced, and injection molding property, tensile strength, elongation at break, tensile modulus of elasticity, and breaking state were evaluated. The production method of each of the test pieces, the evaluation method, and the evaluation conditions are as follows.

<Production of Test Pieces>

A-1. Polyamide-based thermoplastic elastomer
1) UBESTA, XPA9040X1 manufactured by Ube Industries, Ltd.
2) UBESTA, XPA9048X1 manufactured by Ube Industries, Ltd.
3) UBESTA, XPA9055X1 manufactured by Ube Industries, Ltd.
4) UBESTA, XPA9063X1 manufactured by Ube Industries, Ltd.

A-2. Polyamide-based thermoplastic resin (the same kind of resin as the hard segment of A-1)
1) UBESTA, 3014U manufactured by Ube Industries, Ltd.
2) UBESTA, 3020U manufactured by Ube Industries, Ltd.

B-1) Polyester-based thermoplastic elastomer
1) HYTREL 3046 manufactured by Du Pont-Toray Co., Ltd.
2) HYTREL 5557 manufactured by Du Pont-Toray Co., Ltd.
3) HYTREL 6347 manufactured by Du Pont-Toray Co., Ltd.
4) HYTREL 7247 manufactured by Du Pont-Toray Co., Ltd.
5) HYTREL 2751 manufactured by Du Pont-Toray Co., Ltd.

B-2) Polybutylene terephthalate-based thermoplastic resin (the same kind of resin as the hard segment of B-1)
1) DURANEX 2000 manufactured by Polyplastics Co., Ltd.
2) DURANEX 2002 manufactured by Polyplastics Co., Ltd.

—Elastic Modulus of Particular Resin According to Seventh Aspect of the Present Invention—

Various kinds of resin described in A-2 and B-2 were injection-molded with a mold of 12.7 mm×127 mm and having a thickness of 1.6 mm to produce samples.

By using Shimadzu Autograph AGS-J (5 KN) manufactured by Shimadzu Corporation and pulling the obtained samples at a tensile rate of 1 mm/min, tensile modulus of elasticity of the sheet was examined, and the following results were obtained.

A-2)
1) UBESTA, 3014U, manufactured by Ube Industries, Ltd., elastic modulus=1100 MPa
2) UBESTA, 3020U, manufactured by Ube Industries, Ltd., elastic modulus=1000 MPa B-2)
1) DURANEX, 2000 manufactured by Polyplastics Co., Ltd., elastic modulus=1100 MPa
2) DURANEX, 2002 manufactured by Polyplastics Co., Ltd., elastic modulus=1250 MPa The thermoplastic elastomers and the resins were mixed in a composition (in terms of mass) shown in Tables 7-1 and 7-2 and were kneaded with a twin-screw extruder LABOPLASTOMILL 50 MR manufactured by Toyo Seiki Seisaku-sho, Ltd. to obtain pellets. In Comparative Examples 7-1 to 7-9, a mixed system was not used, and pellets of thermoplastic elastomers shown in Tables 7-1 and 7-2 were provided.

Using each of the prepared pellets of the Examples and the Comparative Examples, injection molding was performed under the following conditions to obtain test pieces.

For the injection molding, SE30D manufactured by Sumitomo Heavy Industries, Ltd. was used, the molding temperature was set to from 200° C. to 235° C. and the mold temperature was set to from 50° C. to 70° C., and a mold of 12.7 mm×127 mm and having a thickness of 1.6 mm was used.

<Evaluation Method>

1. Evaluations of Tensile Strength, Elongation at Break, and Tensile Modulus of Elasticity The test pieces obtained by the injection molding were punched out, whereby dumbbell-shaped test pieces (No. 5 type test pieces) defined in JISK6251:1993 were produced.

By using Shimadzu Autograph AGS-J (5 KN) manufactured by Shimadzu Corporation and pulling the obtained dumbbell-shaped test pieces at a tensile rate of 200 mm/min, tensile strength, elongation at break, and tensile modulus of elasticity of the test pieces were examined.

2. Measurement of Tan δ

By using a dynamic viscoelasticity measurement test machine "ARES III" manufactured by Rheometric Scientific, Inc., a loss tangent (tan δ) was measured at a temperature of 30° C., a measurement frequency of 20 Hz, and a dynamic strain of 1%.

The tensile strength, the elongation at break, the tensile modulus of elasticity, and the tan δ of the test pieces of the Examples and the Comparative Examples are shown in Tables 7-1 and 7-2.

3. Relationship Between Elastic Modulus (Tensile Modulus of Elasticity) and Tan δ

Figure 11:
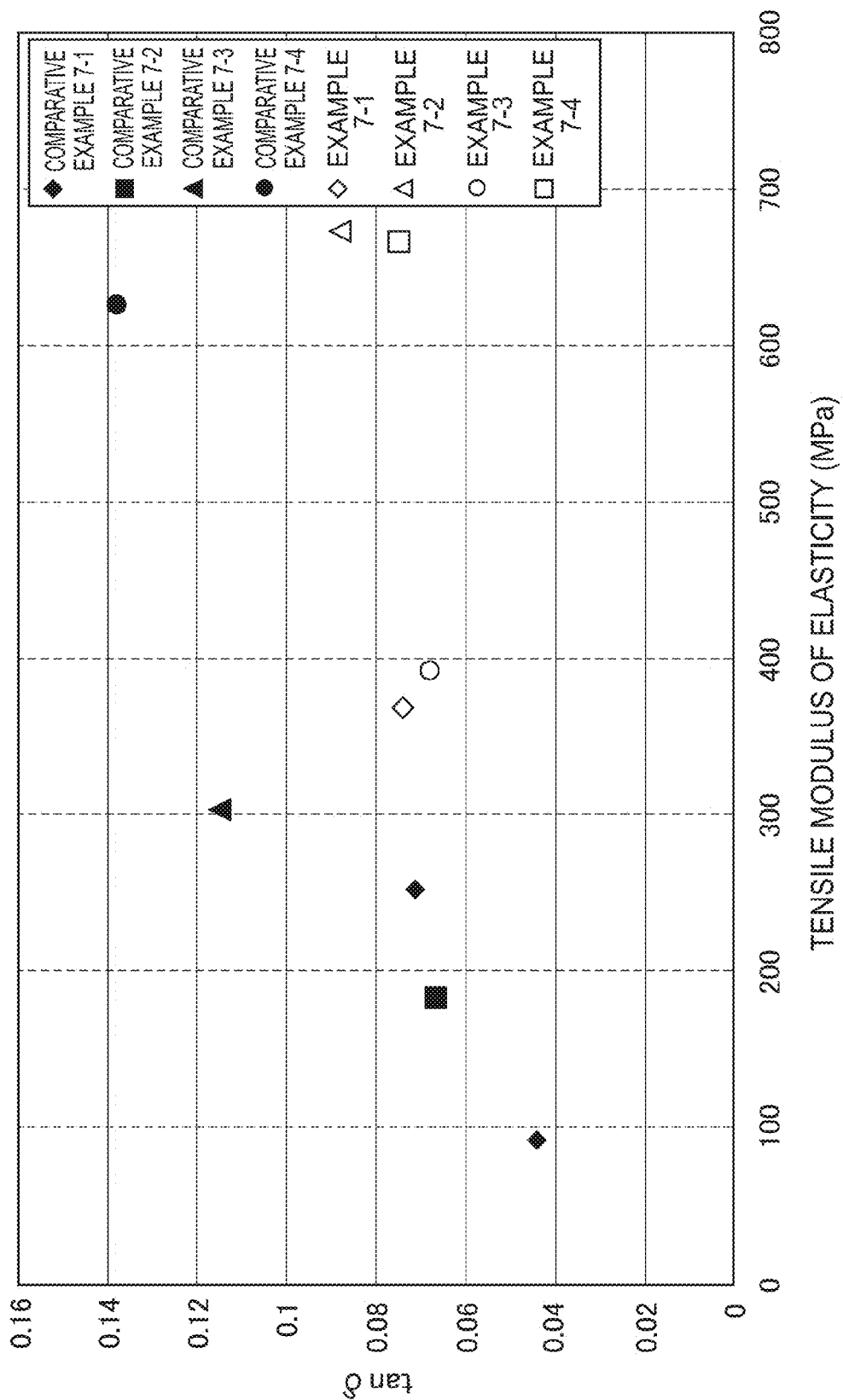
FIG. 11 relates to the seventh aspect of the present invention, and is a graph in which a relationship between a tensile modulus of elasticity and tan δ in each sample piece according to examples and comparative examples made of a thermoplastic resin material is plotted.

The relationship between the tensile modulus of elasticity and tan δ of the test pieces of Examples 7-1 to 7-4 and Comparative Examples 7-1 to 7-4 was plotted in FIG. 11. In addition, the relationship between the tensile modulus of elasticity and tan δ of the test pieces of Examples 7-5 to 7-8 and Comparative Examples 7-5 to 7-9 was plotted in FIG. 12.

TABLE 7-1

| | | | | Example | | | | Comparative Example | | | |
|---|---|---|---|---|---|---|---|---|---|---|---|
| | | | | 7-1 | 7-2 | 7-3 | 7-4 | 7-1 | 7-2 | 7-3 | 7-4 |
| A-1 | Polyamide-based elastomer | UBESTA | XPA 9040X1 | | | | | 100 | | | |
| | | | XPA 9048X1 | 75 | 50 | 75 | 50 | | 100 | | |
| | | | XPA 9055X1 | | | | | | | 100 | |
| | | | XPA 9063X1 | | | | | | | | 100 |
| A-2 | Nylon 12 | UBESTA | 3014U | 25 | 50 | | | | | | |
| | | | 3020U | | | 25 | 50 | | | | |
| Evaluation | | Tensile strength (MPa) | | 33 | 40 | 31 | 37 | 27 | 32 | 41 | 44 |
| | | Elongation at break (%) | | 360 | 360 | 340 | 280 | 610 | 400 | 350 | 250 |
| | | Tensile modulus of elasticity (MPa) | | 368 | 672 | 392 | 666 | 91 | 183 | 303 | 626 |
| | | tanδ | | 0.074 | 0.088 | 0.068 | 0.075 | 0.044 | 0.067 | 0.121 | 0.138 |

TABLE 7-2

| | | | | Example | | | | Comparative Example | | | | |
|---|---|---|---|---|---|---|---|---|---|---|---|---|
| | | | | 7-5 | 7-6 | 7-7 | 7-8 | 7-5 | 7-6 | 7-7 | 7-8 | 7-9 |
| B-1 | Polyester-based elastomer | HYTREL | 3046 | 75 | 50 | 75 | 50 | 100 | | | | |
| | | | 5557 | | | | | | 100 | | | |
| | | | 6347 | | | | | | | 100 | | |

TABLE 7-2-continued

|  |  |  |  | Example | | | | Comparative Example | | | | |
| --- | --- | --- | --- | --- | --- | --- | --- | --- | --- | --- | --- | --- |
|  |  |  |  | 7-5 | 7-6 | 7-7 | 7-8 | 7-5 | 7-6 | 7-7 | 7-8 | 7-9 |
|  |  |  | 7247 |  |  |  |  |  |  |  | 100 |  |
|  |  |  | 2751 |  |  |  |  |  |  |  |  | 100 |
| B-2 | Polyester | DURANEX | 2000 | 25 | 50 |  |  |  |  |  |  |  |
|  | resin |  | 2002 |  |  | 25 | 50 |  |  |  |  |  |
| Evaluation |  | Tensile strength (MPa) |  | 18 | 27 | 15 | 22 | 17 | 26 | 27 | 33 | 37 |
|  |  | Elongation at break (%) |  | 465 | 365 | 430 | 310 | 800< | 370 | 310 | 310 | 320 |
|  |  | Tensile modulus of elasticity (MPa) |  | 171 | 680 | 90 | 594 | 19 | 211 | 414 | 549 | 1110 |
|  |  | tanδ |  | 0.054 | 0.057 | 0.051 | 0.061 | 0.046 | 0.072 | 0.136 | 0.147 | 0.283 |

As seen from Table 7-1, in the test pieces described in Examples 7-1 to 7-4, even when the tensile modulus of elasticity is increased to 368 to 672, tan δ that is the index representing the rolling resistance of the tire is from around 0.07 and is 0.088 at the maximum, and increase in the rolling resistance is suppressed. Similarly, in the test pieces of Examples 7-5 to 7-8, even when the tensile modulus of elasticity is increased, increase in the tan δ is suppressed.

Figure 12:
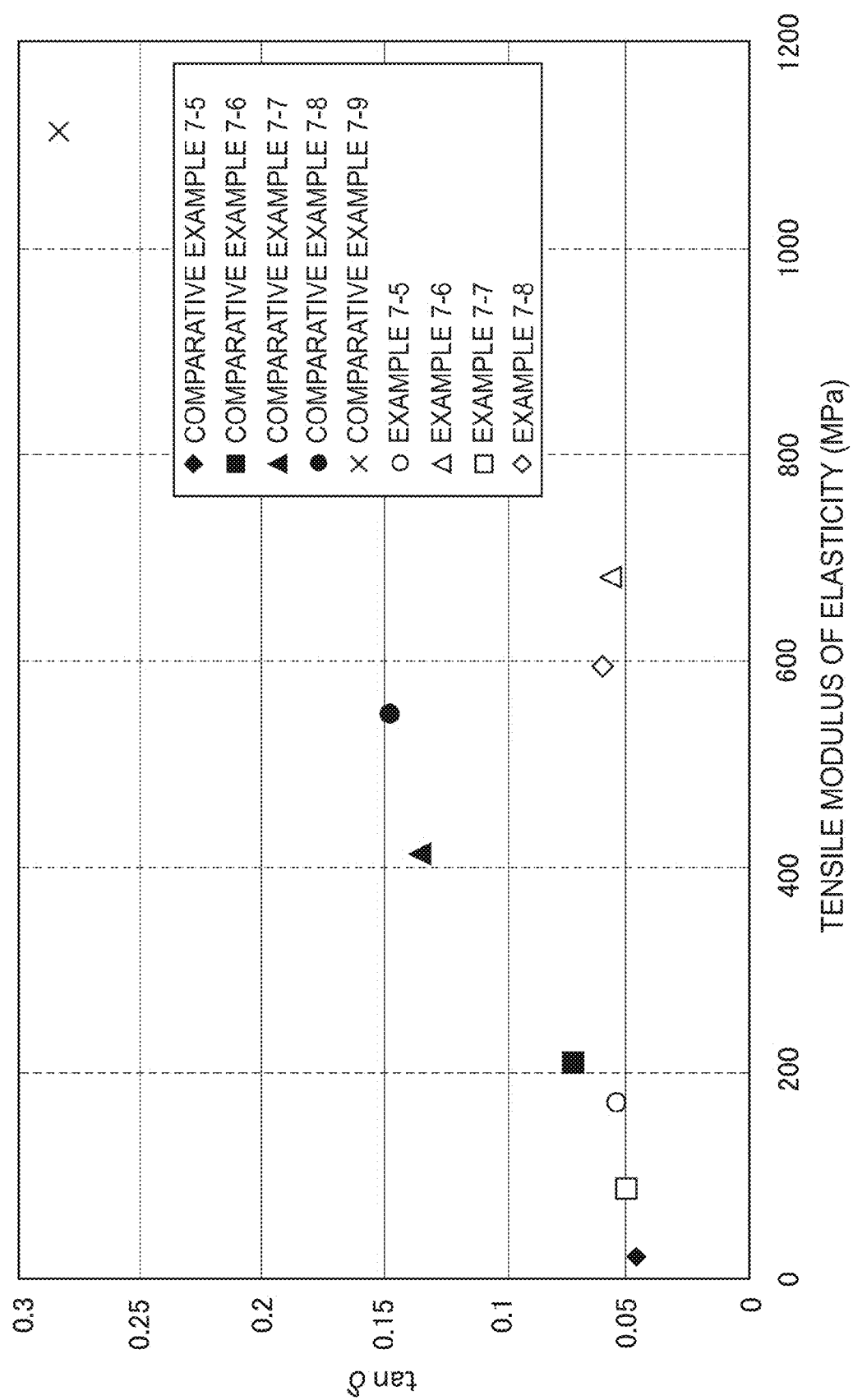
FIG. 12 relates to the seventh aspect of the present invention, and is a graph in which a relationship between a tensile modulus of elasticity and tan δ in each sample piece according to the examples and the comparative examples made of a thermoplastic resin material is plotted.

This is also understood from FIGS. 11 and 12. In FIGS. 11 and 12, tan δ with respect to tensile modulus of elasticity is plotted. As shown in FIG. 11, it is understood that a regression line (not shown) perceived from the plot of Comparative Examples 7-1 to 7-4 has a great slope, and tan δ thereof is increased as the tensile modulus of elasticity is increased, while a regression line (not shown) perceived from the plot of Examples 7-1 to 7-4 has a small slope, and tan δ thereof is less likely to increase even when the tensile modulus of elasticity is increased. Similar cases are confirmed from each of the plots of Comparative Examples 7-5 to 7-9 and Examples 7-5 to 7-8 shown in Table 7-2.

Therefore, it is apparent that the tire manufactured using the tire case formed using the same thermoplastic resin materials as those of the test pieces of Examples 7-1 to 7-8 is able to suppress increase in rolling resistance even when the tensile modulus of elasticity is increased. Therefore, it is assumed that a vehicle configured using such a tire has good fuel efficiency.

In addition, a drum running test was performed on each of the tires formed using the thermoplastic resin materials of each of the Examples and the Comparative Examples, and all of the tires had no problems in stability during running.

Examples According to Eighth Aspect of the Present Invention

Hereinafter, the eighth aspect of the present invention is described in more detail using Examples. However, the eighth aspect of the present invention is not limited thereto.

First, tires of the Examples and the Comparative Examples were formed according to Embodiment 8-1 described above. Here, as for the material that forms the tire case, materials described in the following Tables 8-1 and 8-2 were used. Test pieces each of 12.7 mm×127 mm and having the same component compositions as those of the tire cases formed under the same conditions as in the Examples and the Comparative Examples were prepared, and tensile strength, elongation at break, tensile modulus of elasticity, and breaking state were evaluated. The results are shown in Tables 8-1 and 8-2. The production method of each of the test pieces, the evaluation method, and the evaluation conditions are as follows.

<Production of Test Pieces>
1. Polyamide-based thermoplastic elastomer
1) UBESTA, XPA9040 manufactured by Ube Industries, Ltd.
   (a glass-transition temperature of equal to or less than −40° C., an elastic modulus of 91 MPa)
2) UBESTA, XPA9048 manufactured by Ube Industries, Ltd.
   (a glass-transition temperature of −6° C., an elastic modulus of 183 MPa)
3) UBESTA, XPA9055 manufactured by Ube Industries, Ltd.
   (a glass-transition temperature of 8° C., an elastic modulus of 303 MPa)
4) UBESTA, XPA9063 manufactured by Ube Industries, Ltd.
   (a glass-transition temperature of 14° C., an elastic modulus of 626 MPa)
2. Polyester-based thermoplastic elastomer
1) HYTREL, 3046 manufactured by Du Pont-Toray Co., Ltd.
   (a glass-transition temperature of −38° C., an elastic modulus of 19 MPa)
2) HYTREL, 5557 manufactured by Du Pont-Toray Co., Ltd.
   (a glass-transition temperature of −19° C., an elastic modulus of 211 MPa)
3) HYTREL, 6347 manufactured by Du Pont-Toray Co., Ltd.
   (a glass-transition temperature of 9° C., an elastic modulus of 414 MPa)
4) HYTREL, 7247 manufactured by Du Pont-Toray Co., Ltd.
   (a glass-transition temperature of 21° C., an elastic modulus of 549 MPa)
3. Acid-modified polyolefin
1) ADMER QF551 manufactured by Mitsui Chemicals, Inc.
   (a glass-transition temperature of −13° C., an elastic modulus of 694 MPa)
2) ADMER QE060 manufactured by Mitsui Chemicals, Inc.
   (a glass-transition temperature of 4° C., an elastic modulus of 875 MPa)
4. Polypropylene, ethylene-propylene copolymer
1) J-700 GP (homopolymer) manufactured by Prime Polymer Co., Ltd.
   (a glass-transition temperature of 32° C., an elastic modulus of 1244 MPa)

2) NOVATEC EC9EV (block polymer) manufactured by Japan Polypropylene Corporation
   (a glass-transition temperature of 15° C., an elastic modulus of 1176 MPa)
3) WINTEC WFW4 (random polymer) manufactured by Japan Polypropylene Corporation
   (a glass-transition temperature of 6° C., an elastic modulus of 762 MPa)

The thermoplastic elastomers were mixed in a composition (in terms of mass) shown in Tables 8-1 and 8-2 and were kneaded with a twin-screw extruder LABOPLASTOMILL 50 MR manufactured by Toyo Seiki Seisaku-sho, Ltd. to obtain pellets. In Comparative Examples 8-1 to 8-8, a mixed system was not used, and pellets of polyamide-based thermoplastic elastomers and polyester-based thermoplastic elastomers were provided.

Using each of the prepared pellets of the Examples and the Comparative Examples, injection molding was performed under the following conditions to obtain test pieces.

For the injection molding, SE30D manufactured by Sumitomo Heavy Industries, Ltd. was used, the molding temperature was set to from 200° C. to 225° C. and the mold temperature was set to from 50° C. to 70° C., and a mold of 12.7 mm×127 mm and having a thickness of 1.6 mm was used.

<Evaluation Method>

1. Evaluations of Tensile Strength, Elongation at Break, Tensile Modulus of Elasticity, and Breaking State Using the test pieces obtained as above, tensile strength, elongation at break, tensile modulus of elasticity, and breaking state were evaluated as follows.

By using Shimadzu Autograph AGS-J (5 KN) manufactured by Shimadzu Corporation, using JIS 5 type dumbbells, and pulling the test pieces at a tensile rate of 200 mm/min, tensile strength, elongation at break, tensile modulus of elasticity, and breaking state of the test pieces were examined.

2. Measurement of Tan δ

In addition, with respect to the test pieces obtained as above, by using ARESIII manufactured by Rheometric Scientific, Inc., tan δ was measured under conditions of at 30° C., 20 Hz, and a shear strain of 1%.

TABLE 8-1

| | Comparative Example | | | | Example | | | | | | | | |
|---|---|---|---|---|---|---|---|---|---|---|---|---|---|
| | 8-1 | 8-2 | 8-3 | 8-4 | 8-1 | 8-2 | 8-3 | 8-4 | 8-5 | 8-6 | 8-7 | 8-8 | 8-9 |
| Polyamide-based elastomer | | | | | | | | | | | | | |
| UBESTA XPA9040 | 100 | | | | | | | | | | | | |
| UBESTA XPA9048 | | 100 | | | 70 | 70 | 70 | 70 | 70 | 70 | 70 | 70 | 70 |
| UBESTA XPA9055 | | | 100 | | | | | | | | | | |
| UBESTA XPA9063 | | | | 100 | | | | | | | | | |
| Acid-modified olefin | | | | | | | | | | | | | |
| QF551 | | | | | 30 | 15 | | 15 | 5 | 15 | 15 | | |
| QE060 | | | | | | | 30 | | | | | 15 | 15 |
| Polypropylene, ethylene-propylene copolymer | | | | | | | | | | | | | |
| J-700GP | | | | | | 15 | | 15 | | | | | |
| NOVATEC EC9EV | | | | | | | | | 25 | 15 | | 15 | |
| WINTEC WFW4 | | | | | | | | | | | 15 | | 15 |
| Evaluation | | | | | | | | | | | | | |
| Tensile strength (MPa) | 27 | 32 | 41 | 44 | 37 | 44 | 43 | 47 | 31 | 43 | 39 | 43 | 41 |
| Elongation at break (%) | 610 | 400 | 350 | 250 | 545 | 585 | 555 | 615 | 505 | 565 | 570 | 565 | 550 |
| Tensile modulus of elasticity (MPa) | 91 | 183 | 303 | 626 | 346 | 500 | 430 | 546 | 409 | 389 | 349 | 400 | 394 |
| tan δ (30° C., 20 Hz, 1%) | 0.044 | 0.066 | 0.116 | 0.138 | 0.077 | 0.082 | 0.076 | 0.1 | 0.087 | 0.085 | 0.089 | 0.089 | 0.097 |

TABLE 8-2

| | Comparative Example | | | | Example | | | | | | |
|---|---|---|---|---|---|---|---|---|---|---|---|
| | 8-5 | 8-6 | 8-7 | 8-8 | 8-10 | 8-11 | 8-12 | 8-13 | 8-14 | 8-15 | 8-16 |
| Polyester-based elastomer | | | | | | | | | | | |
| HYTREL 3046 | 100 | | | | 70 | 60 | 70 | 70 | 70 | 70 | 70 |
| HYTREL 5557 | | 100 | | | | | | | | | |
| HYTREL 6347 | | | 100 | | | | | | | | |
| HYTREL 7247 | | | | 100 | | | | | | | |
| Acid-modified olefin | | | | | | | | | | | |
| QF551 | | | | | 30 | | | | | | |
| QE060 | | | | | | 40 | 30 | 15 | 5 | 15 | 15 |

TABLE 8-2-continued

| | Comparative Example | | | | Example | | | | | | |
|---|---|---|---|---|---|---|---|---|---|---|---|
| | 8-5 | 8-6 | 8-7 | 8-8 | 8-10 | 8-11 | 8-12 | 8-13 | 8-14 | 8-15 | 8-16 |
| Polypropylene, ethylene-propylene copolymer | | | | | | | | | | | |
| J-700GP | | | | | | | | 15 | | | |
| NOVATEC EC9EV | | | | | | | | | 25 | 15 | |
| WINTEC WFW4 | | | | | | | | | | | 15 |
| Evaluation | | | | | | | | | | | |
| Tensile strength (MPa) | 17 | 26 | 27 | 33 | 13 | 14 | 13 | 12 | 14 | 15 | 13 |
| Elongation at break (%) | 800< | 370 | 310 | 310 | 480 | 500 | 485 | 210 | 95 | 350 | 495 |
| Tensile modulus of elasticity (MPa) | 19 | 211 | 414 | 549 | 110 | 280 | 156 | 233 | 257 | 227 | 142 |
| tanδ (30° C., 20 Hz, 1%) | 0.046 | 0.072 | 0.136 | 0.147 | 0.056 | 0.06 | 0.053 | 0.067 | 0.058 | 0.061 | 0.063 |

As seen from Tables 8-1 and 8-2, in the test pieces of the Examples, tensile modulus of elasticity could be in a preferable range while suppressing increase in tan δ, compared to the Comparative Examples. Therefore, it is apparent that the tire manufactured using the tire case formed using the same resin materials as those of the test pieces of the Examples obtains suitable tensile modulus of elasticity and is able to suppress increase in rolling resistance. Therefore, it is assumed that a vehicle configured using such a tire has good ride quality.

In addition, a drum running test was performed on each of the tires formed according to the Examples and the Comparative Examples, and all of the tires had no problems in stability during running.

Examples According to Ninth Aspect of the Present Invention

Hereinafter, the ninth aspect of the present invention is described in more detail using Examples. However, the ninth aspect of the present invention is not limited thereto.

First, tires of the Examples and the Comparative Examples were formed according to Embodiment 9-1 described above. Here, as for the material that forms the tire case, materials described in the following Table 9-1 were used. Test pieces each of 12.7 mm×127 mm having the same component compositions as those of the tire cases formed under the same conditions as in the Examples and the Comparative Examples were prepared, and tensile strength, elongation at break, tensile modulus of elasticity, and breaking state were evaluated. The results are shown in Table 9-1. The production method of each of the test pieces, the evaluation method, and the evaluation conditions are as follows.

<Production of Test Pieces>

1. Polyamide-based thermoplastic elastomer
   1) UBESTA, XPA9048 manufactured by Ube Industries, Ltd.
      (a glass-transition temperature of −6° C., an elastic modulus of 183 MPa)

2. Polyester-based thermoplastic elastomer
   1) HYTREL 3046 manufactured by Du Pont-Toray Co., Ltd.
      (a glass-transition temperature of −38° C., an elastic modulus of 19 MPa)

3. Acid-modified polyolefin
   1) ADMER QF551 manufactured by Mitsui Chemicals, Inc.
      (a glass-transition temperature of −13° C., an elastic modulus of 694 MPa)
   2) ADMER QE060 manufactured by Mitsui Chemicals, Inc.
      (a glass-transition temperature of 4° C., an elastic modulus of 875 MPa)

4. Olefin-based thermoplastic elastomer including polypropylene
   1) PRIME TPO E-2900 (homopolymer) manufactured by Prime Polymer Co., Ltd.
      (an elastic modulus of 665 MPa)
   2) PRIME TPO F-3740 (random polymer) manufactured by Prime Polymer Co., Ltd.
      (an elastic modulus of 332 MPa)
   3) PRIME TPO M142E (block polymer) manufactured by Prime Polymer Co., Ltd.
      (an elastic modulus of 39 MPa)
   4) MILASTOMER-8032 NS (PP/EPDM) manufactured by Mitsui Chemicals, Inc.
      (an elastic modulus of 39 MPa)
   5) MILASTOMER-7030 NS (PP/EPDM) manufactured by Mitsui Chemicals, Inc.
      (an elastic modulus of 6.8 MPa)

The thermoplastic elastomers were mixed in a composition (in terms of mass) shown in Table 9-1 and were kneaded with a twin-screw extruder LABOPLASTOMILL 50 MR manufactured by Toyo Seiki Seisaku-sho, Ltd. to obtain pellets.

Using each of the prepared pellets of the Examples and the Comparative Examples, injection molding was performed under the following conditions to obtain test pieces.

For the injection molding, SE30D manufactured by Sumitomo Heavy Industries, Ltd. was used, the molding temperature was set to from 200° C. to 235° C. and the mold temperature was set to from 50° C. to 70° C., and a mold of 12.7 mm×127 mm and having a thickness of 1.6 mm was used.

<Evaluation Method>

1. Evaluations of Tensile Strength, Elongation at Break, Tensile Modulus of Elasticity, and Breaking State Using the test pieces obtained as above, tensile strength, elongation at break, tensile modulus of elasticity, and breaking state were evaluated as follows.

By using Shimadzu Autograph AGS-J (5 KN) manufactured by Shimadzu Corporation, using JIS 5 type dumbbells, and pulling the test pieces at a tensile rate of 200 mm/min, tensile strength, elongation at break, tensile modulus of elasticity, and breaking state of the test pieces were examined.

TABLE 9-1

| | Comparative Example 9-1 | Example 9-1 | 9-2 | 9-3 | 9-4 | 9-5 | Comparative Example 9-2 | Example 9-6 |
|---|---|---|---|---|---|---|---|---|
| Polyamide-based thermoplastic elastomer | | | | | | | | |
| UBESTA XPA9048 | 70 | 70 | 70 | 70 | 70 | 70 | | |
| Polyester-based thermoplastic elastomer | | | | | | | | |
| HYTREL 3046 | | | | | | | 70 | 70 |
| Acid-modified olefin | | | | | | | | |
| QF551 | 30 | 15 | 15 | 15 | 15 | 15 | 30 | 15 |
| Olefin-based thermoplastic elastomer including polypropylene | | | | | | | | |
| PRIME TPO E-2900 | | 15 | | | | | | 15 |
| PRIME TPO F-3740 | | | 15 | | | | | |
| PRIME TPO M142E | | | | 15 | | | | |
| MILASTOMER 8032NS | | | | | 15 | | | |
| MILASTOMER 7030NS | | | | | | 15 | | |
| Evaluation | | | | | | | | |
| Tensile strength (MPa) | 37 | 42 | 39 | 31 | 32 | 30 | 14 | 11 |
| Elongation at break (%) | 545 | 610 | 575 | 500 | 525 | 520 | 500 | 340 |
| Tensile modulus of elasticity (MPa) | 346 | 340 | 287 | 211 | 200 | 191 | 280 | 110 |

As seen from Table 9-1, it is apparent that the test pieces of Examples 9-1 to 9-6 had better impact resistance than the Comparative Example. More specifically, it is considered that when the specific resin according to the ninth aspect of the present invention, the other resin and the second thermoplastic elastomer have a hard segment with a skeleton that is common to the skeleton constituting the main chain of the specific resin according to the ninth aspect of the present invention, the second thermoplastic elastomer is dispersed in the specific resin according to the ninth aspect of the present invention. Accordingly, it is considered that the elastic modulus of the specific resin phase according to the ninth aspect of the present invention is reduced, and impact resistance is increased; therefore, it is considered that the entire viscoelasticity of the resin material is reduced and impact resistance is excellent.

In addition, a drum running test was performed on each of the tires formed according to the Examples and the Comparative Examples, and all of the tires had no problems in stability during running.

Examples According to Tenth Aspect of the Present Invention

Hereinafter, the tenth aspect of the present invention is described in more detail using Examples. However, the tenth aspect of the present invention is not limited thereto.

First, tires of the Examples and the Comparative Examples were formed according to Embodiment 10-2 described above. Here, as for the material that forms the tire case, materials described in the following Table 10-1 were used. Regarding each of the Examples and the Comparative Examples, tire performance was examined from evaluation of physical properties of the materials.

<Production of Test Pieces>
1. Polyamide-based thermoplastic elastomer
  1) UBESTA, XPA 9048 X1 manufactured by Ube Industries, Ltd.
  2) UBESTA, XPA 9055 X1 manufactured by Ube Industries, Ltd.
2. Polyester-based thermoplastic elastomer
  1) HYTREL, 5557 manufactured by Du Pont-Toray Co., Ltd.
  2) HYTREL, 6347 manufactured by Du Pont-Toray Co., Ltd.
  3) HYTREL, 3046 manufactured by Du Pont-Toray Co., Ltd.

[Production of Pellets]

The elastomers were mixed in a composition (in terms of mass) shown in Table 10-1 and were kneaded by a twin-screw extruder LABOPLASTOMILL 50 MR manufactured by Toyo Seiki Seisaku-sho, Ltd. to obtain pellets. In Comparative Examples 10-1 to 10-3, a mixed system was not used, and pellets of polyamide-based thermoplastic elastomers or polyester-based thermoplastic elastomers were provided.

<Evaluations of Tensile Strength, Elongation at Break, Tensile Modulus of Elasticity, and Tensile Yield Strength>

Injection molding was performed on the produced pellets using SE30D manufactured by Sumitomo Heavy Industries, Ltd. by setting a molding temperature to from 200° C. to 235° C., setting a mold temperature to from 50° C. to 70° C., and using a mold of 12.7 mm×127 mm and having a thickness of 1.6 mm to obtain samples.

Each of the samples was punched out, whereby dumbbell-shaped test pieces (No. 5 type test pieces) defined in JISK6251:1993 were produced.

Next, by using Shimadzu Autograph AGS-J (5 KN) manufactured by Shimadzu Corporation and setting a tensile rate to 200 mm/min, tensile modulus of elasticity, tensile strength, and elongation at break of each of the dumbbell-shaped test pieces were measured.

Regarding the tensile yield strength, tensile yield strengths at 23° C., 85° C., and 105° C. were measured. Here, tensile yield strengths at 23° C. were measured using Shimadzu Autograph AGS-J (5 KN) manufactured by Shimadzu Corporation, and tensile yield strengths at 85° C. and 105° C. were measured using Shimadzu Autograph AGS-100 KN manufactured by Shimadzu Corporation. The tensile rate was set to 200 mm/min at any temperature.

The results are shown in the following Table 10-1.

Figure 13:
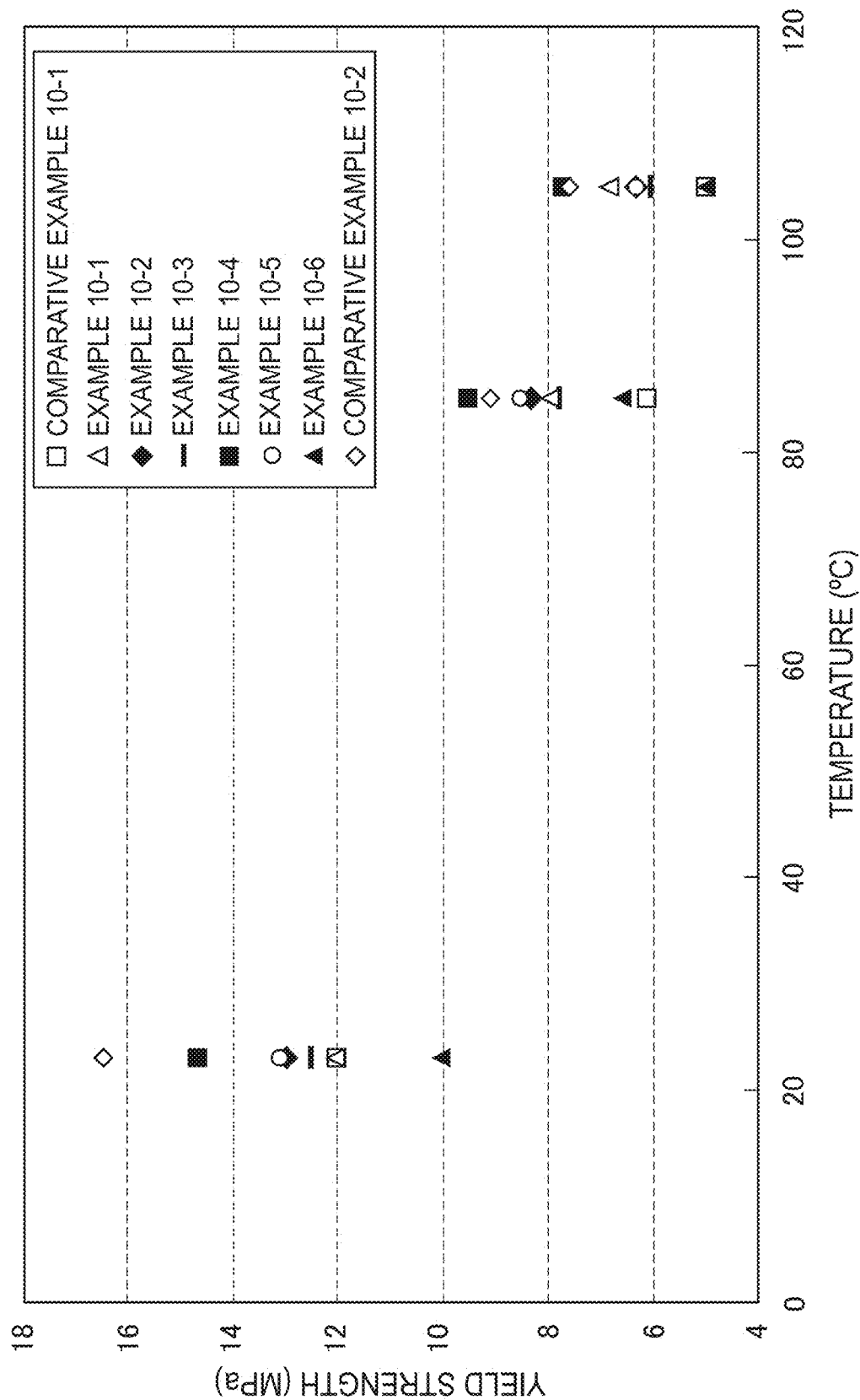
FIG. 13 relates to the tenth aspect of the present invention, and is a graph in which a relationship between a tensile yield strength and a temperature in each sample piece used in the examples and the comparative examples is plotted.

In addition, the relationship between the tensile yield strengths at 23° C., 85° C., and 105° C. and temperatures of Examples 10-1 to 10-6 and Comparative Examples 10-1 and 10-2 is shown in FIG. 13. In addition, the slope, the intercept, and the coefficient of determination (R2) of the regression lines (yield strength-temperature lines) perceived from the plot of the temperatures with respect to the tensile yield strengths at 23° C., 85° C., and 105° C. of Examples 10-1 to 10-6 and Comparative Examples 10-1 and 10-2 are shown in Table 10-1.

<Deflection Temperature Under Load>

Injection molding was performed using the produced pellets and using SE30D manufactured by Sumitomo Heavy Industries, Ltd. by setting a molding temperature to from 200° C. to 235° C., setting a mold temperature to from 50° C. to 70° C., and using a mold having a multi-purpose test piece shape (JIS K7139, ISO-3167) to obtain multi-purpose test piece-shaped samples (JIS K7139, ISO-3167) having a thickness of 4 mm.

The obtained multi-purpose test pieces were cut and processed to have shapes of 127 mm×10 mm and having a thickness of 4 mm, the deflection temperature under load (ASTM D648) under a load of 0.45 MPa was measured using a HDT/VSPT test device (manufactured by Ueshima Seisakusho Co., Ltd.)

The measurement conditions are as follows.

The test piece was supported at two points of a span between support points of 100 mm, a load of 0.46 MPa was applied to the center part between the support points, the periphery of the test piece was filled with a silicon oil, and temperature was increased at a rate of temperature increase of 120° C./hr. Temperature when the deformation amount of the test piece had reached 0.2% was measured. The results are shown in Table 10-1.

TABLE 10-1

|  | Comparative Example 10-1 | Example 10-1 | Example 10-2 | Example 10-3 | Example 10-4 | Example 10-5 | Example 10-6 | Comparative Example 10-2 | Comparative Example 10-3 |
|---|---|---|---|---|---|---|---|---|---|
| Polyamide-based elastomer |  |  |  |  |  |  |  |  |  |
| 1) UBESTA XPA 9048 | 100 | 75 | 50 | 75 | 50 |  |  |  |  |
| 2) UBESTA XPA 9055 |  |  |  |  |  | 75 | 55 | 100 |  |
| Polyester-based elastomer |  |  |  |  |  |  |  |  |  |
| 1) HYTREL 5557 |  | 25 | 50 |  |  |  |  |  | 100 |
| 2) HYTREL 6347 |  |  |  | 25 | 50 |  |  |  |  |
| 3) HYTREL 3046 |  |  |  |  |  | 25 | 45 |  |  |
| Tensile properties |  |  |  |  |  |  |  |  |  |
| 1) Tensile strength (MPa) | 32 | 37 | 36 | 37 | 40 | 37 | 33 | 41 | 26 |
| 2) Elongation at break (%) | 400 | 510 | 470 | 510 | 465 | 345 | 295 | 350 | 370 |
| 3) Tensile modulus of elasticity (MPa) | 183 | 193 | 186 | 220 | 277 | 256 | 172 | 303 | 211 |
| Yield strength temperature dependence |  |  |  |  |  |  |  |  |  |
| 1) Tensile yield strength (MPa) |  |  |  |  |  |  |  |  |  |
| (23° C.) | 12 | 12 | 13 | 12.5 | 14.7 | 13.1 | 10 | 16.5 | 15 |
| (85° C.) | 6.1 | 7.9 | 8.3 | 7.8 | 9.5 | 8.5 | 6.5 | 9.1 | 9.5 |
| (105° C.) | 5 | 6.8 | 6.3 | 6 | 7.7 | 6.3 | 4.9 | 7.6 | 8.4 |
| 2) Yield strength-temperature line |  |  |  |  |  |  |  |  |  |
| slope | 0.0877 | 0.0641 | 0.0803 | 0.0784 | 0.085 | 0.0809 | 0.0608 | 0.1111 | 0.0824 |
| intercept | 13.926 | 13.448 | 14.902 | 14.336 | 16.66 | 15.041 | 11.452 | 18.955 | 16.82 |
| R2 | 0.992 | 0.9988 | 0.9965 | 0.9987 | 0.9998 | 0.9925 | 0.9943 | 0.9939 | 0.9936 |
| Thermal deformation temperature |  |  |  |  |  |  |  |  |  |
| Deflection temperature under load (° C.) | 58 | 59 | 64 | 58 | 73 | 66 | 58 | 78 | 104 |

As seen from Table 10-1 and FIG. 13, it is understood that in the test pieces produced in each of the Examples, compared to the test pieces produced in the Comparative Examples, tensile properties were excellent, temperature dependence of tensile yield strength was small, and thus deflection temperature under load was high. This indicates that the tire manufactured using the tire case formed using the same thermoplastic resin materials as those of the test pieces of the Examples has durability and is less likely to be affected by changes in temperature environment.

Examples According to Eleventh Aspect of the Present Invention

Hereinafter, the eleventh aspect of the present invention is described in more detail using Examples. However, the eleventh aspect of the present invention is not limited thereto.

First, tires of the Examples and the Comparative Examples were formed according to Embodiment 11-2 described above. Here, as for the material that forms the tire case, materials described in the following Table 11-1 were used. Regarding each of the Examples and the Comparative Examples, tire performance was examined from evaluation of physical properties of the materials.

<Production of Test Pieces>

1. Polyamide-based thermoplastic elastomer
   1) UBESTA, XPA 9055X1 manufactured by Ube Industries, Ltd.
2. Ethylene-methacrylic acid copolymer (for the Comparative Examples)
   1) NUCREL, N035C manufactured by Du Pont-Mitsui Polychemicals Co., Ltd.
   2) NUCREL, AN42115C manufactured by Du Pont-Mitsui Polychemicals Co., Ltd.
3. Ethylene-acrylate copolymer (specific copolymer)
   1) ELVALOY, 3427AC manufactured by Du Pont-Mitsui Polychemicals Co., Ltd.
   2) ELVALOY, 3717AC manufactured by Du Pont-Mitsui Polychemicals Co., Ltd.
4. Metal cross-linked body of ethylene-methacrylic acid copolymer (specific copolymer: ionomer)
   1) HIMILAN, 1855Zn manufactured by Du Pont-Mitsui Polychemicals Co., Ltd.

[Production of Pellets]

The elastomers and each of the copolymers were mixed in a composition (in terms of mass) shown in Table 11-1 and were kneaded by a twin-screw extruder LABOPLASTOMILL 50 MR manufactured by Toyo Seiki Seisaku-sho, Ltd. to obtain pellets. In Comparative Example 11-1, a mixed system was not used, and pellets of polyamide-based thermoplastic elastomers were provided.

<Evaluations of Tensile Strength, Elongation at Break, Tensile Modulus of Elasticity, and Tensile Yield Strength>

Injection molding was performed using the prepared pellets and using SE30D manufactured by Sumitomo Heavy Industries, Ltd. by setting a molding temperature to from 200° C. to 240° C., setting a mold temperature to from 40° C. to 70° C., and using a mold of 12.7 mm×127 mm and having a thickness of 1.6 mm, to obtain test pieces.

Each of the test pieces was punched out, whereby dumbbell-shaped test pieces (No. 5 type test pieces) defined in JISK6251-1993 were prepared.

Next, by using Shimadzu Autograph AGS-J (5 KN) manufactured by Shimadzu Corporation and setting a tensile rate to 200 mm/min, tensile modulus of elasticity, tensile strength, and elongation at break of each of the dumbbell-shaped test pieces were measured.

Regarding the tensile yield strength, tensile yield strengths at 23° C., 85° C., and 105° C. were measured. Here, tensile yield strengths at 23° C. were measured using Shimadzu Autograph AGS-J (5 KN) manufactured by Shimadzu Corporation, and tensile yield strengths at 85° C. and 105° C. were measured using Shimadzu Autograph AGS-100 KN manufactured by Shimadzu Corporation. The tensile rate was set to 200 mm/min at any temperature.

The results are shown in the following Table 11-1.

Figure 14:
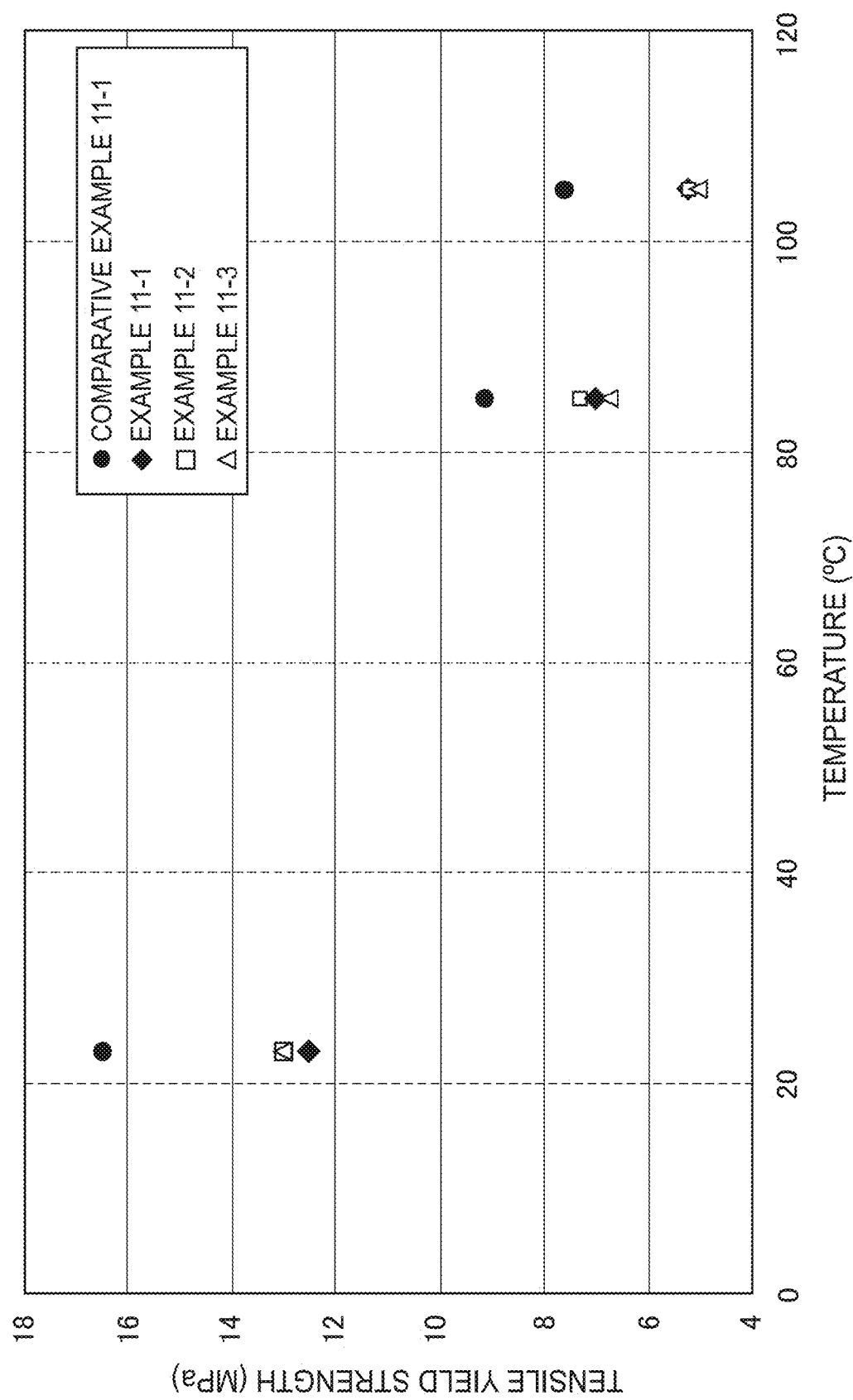
FIG. 14 relates to the tenth aspect of the present invention, and is a graph in which a relationship between a tensile yield strength and a temperature in each sample piece used in the examples and the comparative examples is plotted.

In addition, the relationship between the tensile yield strengths at 23° C., 85° C., and 105° C. and temperatures of Examples 11-1 to 11-3 and Comparative Example 11-1 is shown in FIG. 14. In addition, the slope, the intercept, and the coefficient of determination (R2) of the regression lines (yield strength-temperature lines) perceived from the plot of the temperatures with respect to the tensile yield strengths at 23° C., 85° C., and 105° C. of Examples 11-1 to 11-3 and Comparative Example 11-1 are shown in Table 11-1.

TABLE 11-1

|  | Comparative Example 11-1 | Comparative Example 11-2 | Comparative Example 11-3 | Example 11-1 | Example 11-2 | Example 11-3 |
|---|---|---|---|---|---|---|
| Polyamide-based elastomer | | | | | | |
| 1) UBESTA XPA 9055X1 | 100 | 70 | 70 | 70 | 70 | 70 |
| Ethylene-acrylic acid copolymer | | | | | | |
| 1) NUCREL N035C | | 30 | | | | |
| 2) NUCREL AN42115C | | | 30 | | | |
| Ethylene-acrylate copolymer | | | | | | |
| 1) ELVALOY 3427AC | | | | 30 | | |
| 2) ELVALOY 3717AC | | | | | 30 | |
| Ionomer of ethylene-methacrylic acid copolymer | | | | | | |
| 1) HIMILAN 1855Zn | | | | | | 30 |
| Tensile properties | | | | | | |
| 1) Tensile strength (MPa) | 41 | 27 | 36 | 22 | 29 | 30 |
| 2) Elongation at break (%) | 350 | 320 | 445 | 250 | 400 | 260 |
| 3) Tensile modulus of elasticity (MPa) | 303 | 238 | 266 | 208 | 222 | 253 |
| Yield strength temperature dependence | | | | | | |

TABLE 11-1-continued

|  | Comparative Example 11-1 | Comparative Example 11-2 | Comparative Example 11-3 | Example 11-1 | Example 11-2 | Example 11-3 |
|---|---|---|---|---|---|---|
| 1) Tensile yield strength (MPa) | | | | | | |
| (23° C.) | 16.5 | 13 | 13.2 | 12.5 | 13 | 13 |
| (85° C.) | 9.1 | 6.5 | 6.7 | 7 | 7.3 | 6.7 |
| (105° C.) | 7.6 | 4 | 4.2 | 5.2 | 5.2 | 5 |
| 2) Yield strength-temperature line | | | | | | |
| slope | 18.955 | 15.543 | 15.743 | 14.549 | 15.2 | 15.228 |
| intercept | 0.1111 | 0.1085 | 0.1086 | 0.0889 | 0.0944 | 0.0985 |
| R2 | 0.9939 | 0.9987 | 0.9987 | 1 | 0.9993 | 0.9989 |

As seen from Table 11-1 and FIG. 14, it is understood that in the test pieces produced in each of the Examples, compared to the test pieces produced in Comparative Example 11-1, the slope of the yield strength-temperature line was small, tensile properties were excellent, and temperature dependence of tensile yield strength was small. This indicates that the tire manufactured using the tire case formed using the same thermoplastic resin materials as those of the test pieces of the Examples has durability and is less likely to be affected by changes in temperature environment. In addition, it is perceived that in the test pieces produced in each of the Examples, compared to the test pieces produced in the Comparative Examples, elastic modulus is low, flexibility is provided, and impact resistance is excellent.

In addition, a drum running test was performed on each of the tires formed using the thermoplastic resin materials of each of the Examples and the Comparative Examples, and all of the tires had no problems in stability during running.

Examples According to Twelfth Aspect of the Present Invention

Hereinafter, the twelfth aspect of the present invention is described in more detail using Examples. However, the twelfth aspect of the present invention is not limited thereto.

First, tires of the Examples and the Comparative Examples were formed according to Embodiment 12-2 described above. Here, as for the material that forms the tire case, materials described in the following Table 12-1 were used. Regarding each of the Examples and the Comparative Examples, tire performance was examined from evaluation of physical properties of the materials.

<Production of Test Pieces>
1. Polyamide-based thermoplastic elastomer
    UBESTA, XPA 9055X1 manufactured by Ube Industries, Ltd.
2. Ethylene-methacrylic acid copolymer (specific copolymer)
    NUCREL, N035C manufactured by Du Pont-Mitsui Polychemicals Co., Ltd.
    NUCREL, AN42115C manufactured by Du Pont-Mitsui Polychemicals Co., Ltd.
3. Ethylene-acrylate ethyl ester copolymer (specific acid-modified copolymer)
    HPR, AR2011 manufactured by Du Pont-Mitsui Polychemicals Co., Ltd.
[Production of Pellets]

The elastomers and the ethylene-acrylate copolymers were mixed in a composition (in terms of mass) shown in Table 12-1 and were kneaded by a twin-screw extruder LABO-PLASTOMILL 50 MR manufactured by Toyo Seiki Seisaku-sho, Ltd. to obtain pellets. In Comparative Example 12-1, a mixed system was not used, and pellets of polyamide-based thermoplastic elastomers were provided.

<1. Evaluations of Tensile Strength, Elongation at Break, Tensile Modulus of Elasticity, and Breaking State>

Injection molding was performed using the prepared pellets and using SE30D manufactured by Sumitomo Heavy Industries, Ltd. by setting a molding temperature to from 200° C. to 240° C., setting a mold temperature to from 50° C. to 70° C., and using a mold of 12.7 mm×127 mm and having a thickness of 1.6 mm, to obtain test pieces.

Each of the test pieces was punched out, whereby dumbbell-shaped test pieces (No. 5 type test pieces) defined in JISK6251-1993 were prepared.

Regarding the pellets in Comparative Example 12-2, the injection molding could not be performed under the above-mentioned injection molding conditions. Therefore, by using an electrothermal press manufactured by Kodaira Seisakusho Co., Ltd., thermal pressing was performed by heating the pellets at 200° C. and 12 MPa for 5 minutes to obtain test pieces each of 120 mm×120 mm and having a thickness of 2 mm.

Next, by using Shimadzu Autograph AGS-J (5 KN) manufactured by Shimadzu Corporation and setting a tensile rate to 200 mm/min, tensile modulus of elasticity, tensile strength, elongation at break, and breaking state of each of the dumbbell-shaped test pieces were examined. The results are shown in Table 12-1.

The breaking state was evaluated by visually observing a cross-section of the test piece based on the following evaluation criteria.

—Evaluation Criteria—

O: the test piece was broken due to ductile fracture.

Δ: the test piece was broken due to laminar-shaped fracture.

x: the test piece was broken due to brittle fracture.

<2. Evaluation of Fluidity [MFR (g/10 min, 230° C.)]>

A load of 21.18 N, 49.03 N, or 98.07 N was applied to each of the pellets of the Examples and the Comparative Examples using a semi-auto melt indexer 2A type manufactured by Toyo Seiki Seisaku-sho, Ltd. based on the ASTM A1238 (B method) to measure fluidity (MFR). The results are shown in Table 12-1. Measurement was started from a small load (21.18 N), and in a case in which MFR could not be measured under this condition, a higher load was applied for measurement. After starting measurement, those for which measurement did not start even after 3 minutes elapsed were indicated by "-" in the table.

TABLE 12-1

|  | Comparative Example 12-1 | Comparative Example 12-2 | Comparative Example 12-3 | Comparative Example 12-4 | Example 12-1 | Example 12-2 |
|---|---|---|---|---|---|---|
| Polyamide-based thermoplastic elastomer |  |  |  |  |  |  |
| UBESTA XPA 9055X1 | 100 | 70 | 70 | 70 | 70 | 70 |
| Acid-modified body of ethylene-acrylate copolymer |  |  |  |  |  |  |
| HPR AR2011 Ethylene-methacrylic acid copolymer |  | 30 |  |  | 15 | 10 |
| NUCREL N035C |  |  | 30 |  | 15 | 20 |
| NUCREL AN42115C |  |  |  | 30 |  |  |
| Tensile properties |  |  |  |  |  |  |
| 1) Tensile strength (MPa) | 41 | 17 | 27 | 36 | 29 | 35 |
| 2) Elongation at break (%) | 350 | 225 | 320 | 445 | 210 | 290 |
| 3) Tensile modulus of elasticity (MPa) | 303 | 180 | 238 | 266 | 239 | 258 |
| 4) Breaking state | O | O | O~Δ | Δ | O | O |
| Fluidity |  |  |  |  |  |  |
| MFR load 21.18N | 20.1 | — | 18.87 | 27.73 | — | — |
| MFR load 49.03N |  | — |  |  | — | 4.18 |
| MFR load 98.07N |  | — |  |  | 8.22 |  |

As seen from Table 12-1, regarding the test pieces produced in each of the Examples, compared to the test pieces produced in the Comparative Examples, elastic modulus was small, and flexibility was provided. Therefore, it is perceived that when a tire is formed using the same thermoplastic resin materials as those of the test pieces, the tire has excellent impact resistance. Moreover, from the evaluation results of the breaking states, the test pieces produced in the Examples were subjected to ductile fracture. Therefore, it is assumed that the tire formed using the same thermoplastic resin materials as those of the test pieces is less likely to burst and break even when the tire is damaged, and thus fracture property is excellent.

In addition, all the test pieces produced in each of the Examples had excellent fluidity. Therefore, it is perceived that when the same thermoplastic resin materials as those of the test piece are used, injection molding is performed easily, tires may be efficiently manufactured, and productivity of tires may be enhanced.

In addition, a drum running test was performed on each of the tires formed using the thermoplastic resin materials having the same composition as that of each of the test pieces of the Examples and the Comparative Examples, and all of the tires had no problems in stability during running.

Examples According to Thirteenth Aspect of the Present Invention

Hereinafter, the thirteenth aspect of the present invention is described in more detail using Examples. However, the thirteenth aspect of the present invention is not limited thereto.

First, tires of the Examples and the Comparative Examples were formed according to Embodiment 13-2 described above. Here, as for the material that forms the tire case, materials described in the following Table 13-1 and 13-2 were used. Regarding each of the Examples and the Comparative Examples, tire performance was examined from evaluation of physical properties of the materials.

[Production of Test Pieces]

1. Polyamide-based thermoplastic elastomer

UBESTA, XPA 9055X1 manufactured by Ube Industries, Ltd.

2. Rubber

1) Butadiene rubber (BR)

2) Styrene-butadiene copolymer rubber

3) Acrylonitrile-butadiene copolymer rubber (NBR)

BR, SBR, and NBR were all extruded with a single-screw extruder to form pellets and used.

3. Rubber-affinity thermoplastic elastomer

1) Acid-modified α-olefin-based thermoplastic elastomer

TOUGHMER, MH7010 manufactured by Mitsui Chemicals, Inc.

2) Acid-modified hydrogenated polystyrene-based thermoplastic elastomer (SEBS)

TUFTEC, M1913 manufactured by Asahi Kasei Corporation

4) Vulcanized rubber (DV1 to DV3)

After, using each of the rubbers of BR, SBR, and NBR, the kinds and amounts of components shown in the following Table 13-1 were mixed and were kneaded with a Banbury mixer to form sheet shapes, using two rolls, and the resultants were extruded using a single-screw extruder to form pellets for use.

In addition, the obtained rubber was cross-linked during kneading with the polyamide-based thermoplastic elastomer in the twin-screw extruder.

TABLE 13-1

| Compounding ingredient | DV1 | DV2 | DV3 |
|---|---|---|---|
| BR | 100 | | |
| SBR | | 100 | |
| NBR | | | 100 |
| Normal sulfur (5% oil treated) | 0.525 | 0.525 | 0.525 |
| N-N'-diphenyl methane bismaleimide | 2 | 2 | 2 |
| Accelerator CZ | 1.5 | 1.5 | 1.5 |
| Accelerator TS | 1 | 1 | 1 |
| stearic acid | 2 | 2 | 2 |
| Zinc oxide II (ZnO) | 5 | 5 | 5 |

Details of normal sulfur, accelerator CZ, and accelerator TS in Table 13-1 are as follows.

Normal sulfur . . . normal sulfur manufactured by Tsurumi Chemical Industry Co., Ltd.

Vulcanization accelerator CZ . . . "NOCCELER CZ" manufactured by Ouchi Shinko Chemical Industrial Co., Ltd.

(N-cyclohexyl-2-benzothiazolesulfenamide)

Accelerator TS . . . "NOCCELER TS" manufactured by Ouchi Shinko Chemical Industrial Co., Ltd.

(tetramethylthiuram monosulfide)

1. Evaluations of Tensile Strength, Elongation at Break, and Tensile Modulus of Elasticity Injection molding was performed using the produced pellets and using SE30D manufactured by Sumitomo Heavy Industries, Ltd. by setting a molding temperature to from 200° C. to 235° C., setting a mold temperature to from 50° C. to 70° C., and using a mold of 12.7 mm×127 mm and having a thickness of 1.6 mm, to obtain test pieces.

Each of the test pieces was punched out, whereby dumbbell-shaped test pieces (No. 5 type test pieces) defined in JISK6251:1993 were prepared.

Next, by using Shimadzu Autograph AGS-J (5 KN) manufactured by Shimadzu Corporation and setting a tensile rate to 200 mm/min, tensile modulus of elasticity, tensile strength, and elongation at break of each of the dumbbell-shaped test pieces were measured.

The results are shown in the following Table 13-2.

2. Measurement of Tan δ

By using a dynamic viscoelasticity measurement test machine "ARES III" manufactured by Rheometric Scientific, Inc., a loss tangent (tan δ) was measured at a temperature of 30° C., a measurement frequency of 20 Hz, and a dynamic strain of 1%.

The tensile strength, the elongation at break, the tensile modulus of elasticity, and the tan δ of the test pieces of the Examples and the Comparative Examples are shown in Table 13-2.

TABLE 13-2

| | Comparative Example 13-1 | Example 13-1 | Example 13-2 | Example 13-3 | Example 13-4 | Example 13-5 | Example 13-6 | Example 13-7 | Example 13-8 |
|---|---|---|---|---|---|---|---|---|---|
| Polyamide-based thermoplastic elastomer | | | | | | | | | |
| UBESTA XPA 9055X1 | 100 | 70 | 70 | 70 | 70 | 70 | 70 | 70 | 70 |
| Rubber | | | | | | | | | |
| BR | | 30 | 15 | | | | | | |
| SBR | | | | 30 | 15 | | | | |
| NBR | | | | | | 30 | | | |
| Rubber-affinity thermoplastic elastomer | | | | | | | | | |
| Acid-modified α-olefin | | | 15 | | | | | | |
| Acid-modified SEBS | | | | | 15 | | | | |
| Vulcanized rubber | | | | | | | | | |
| DV1 | | | | | | | 30 | | |
| DV2 | | | | | | | | 30 | |
| DV3 | | | | | | | | | 30 |
| Tensile properties | | | | | | | | | |
| Tensile strength (MPa) | 41 | 25 | 33 | 25 | 31 | 26 | 29 | 28 | 33 |
| Elongation at break (%) | 350 | 320 | 325 | 330 | 260 | 325 | 295 | 315 | 320 |
| Tensile modulus of elasticity (MPa) | 303 | 224 | 216 | 193 | 199 | 201 | 241 | 209 | 221 |
| tan δ | 0.121 | 0.091 | 0.089 | 0.097 | 0.107 | 0.102 | 0.106 | 0.116 | 0.108 |

[Production of Pellets of Thermoplastic Resin Material]

The elastomers were mixed in a composition (in terms of mass) shown in Table 13-2 and were kneaded by a twin-screw extruder LABOPLASTOMILL 50 MR manufactured by Toyo Seiki Seisaku-sho, Ltd. to obtain pellets. In Comparative Example 13-1, a mixed system was not used, and pellets of polyamide-based thermoplastic elastomers were provided.

As seen from Table 13-2, it is understood that in the test pieces produced in each of the Examples, compared to the test pieces produced in the Comparative Examples, tensile modulus of elasticity was low, and sufficient flexibility was provided. This indicates that the tire manufactured using the tire case formed using the same thermoplastic resin materials as those of the test pieces described in the Examples has excellent impact resistance and has durability, for example, the tire is less likely to break even when the tire comes into contact with a curb. In addition, all the test pieces of the Examples have lower tan δ than those of the test pieces of the Comparative Examples. Therefore, it is perceived that the rolling resistance of the tire produced using the same thermoplastic resin materials as those of the test pieces described in the Examples is suppressed, and when the tire is applied to a vehicle, low fuel consumption may be exhibited.

In addition, a drum running test was performed on each of the tires formed using the thermoplastic resin materials of each of the Examples and the Comparative Examples, and all of the tires had no problems in stability during running.

The following invention is included in the first aspect of the present invention.

[1-1] A tire including at least a circular tire frame formed of a thermoplastic resin material,
the tire including a reinforcing cord member that is wound around the outer circumference of the tire frame in the circumferential direction to form a reinforcing cord layer, and
the thermoplastic resin material including at least a polyamide-based thermoplastic elastomer.

[1-2] The tire as described in [1-1], wherein the reinforcing cord layer is configured to include a resin material.

[1-3] The tire as described in [1-1] or [1-2], wherein the melting point of the thermoplastic resin material including the polyamide-based thermoplastic elastomer is 100° C. to 250° C.

[1-4] The tire as described in any one of [1-1] to [1-3], wherein the content ratio of the polyamide-based thermoplastic elastomer in the thermoplastic resin material is 50 mass % to 100 mass %.

The following invention is included in the second aspect of the present invention.

[2-1] A tire including at least a circular tire frame formed of a thermoplastic resin material,
the tire including reinforcing a cord member that is wound around the outer circumference of the tire frame in the circumferential direction to form a reinforcing cord layer, and
the thermoplastic resin material including at least a polyamide-based thermoplastic elastomer and an elastomer other than the polyamide-based thermoplastic elastomer.

[2-2] The tire as described in [2-1], wherein the reinforcing cord layer is configured to include a resin material.

[2-3] The tire as described in [2-1] or [2-2], wherein the mass ratio (x:y) of the polyamide-based thermoplastic elastomer (x) and the other elastomer (y) in the thermoplastic resin is from 95:5 to 60:40.

[2-4] The tire as described in any one of [2-1] to [2-3], wherein the other elastomer is any one selected from a polyurethane-based thermoplastic elastomer, a polyolefin-based thermoplastic elastomer, a polystyrene-based thermoplastic elastomer, or a polyester-based thermoplastic elastomer.

The following invention is included in the third aspect of the present invention.

[3-1] A tire including at least a circular tire frame formed of a thermoplastic resin material,
the thermoplastic resin material including a polyamide-based thermoplastic elastomer and an acid-modified elastomer obtained by acid-modifying a thermoplastic elastomer other than the polyamide-based thermoplastic elastomer, or a mixture of a thermoplastic elastomer other than the polyamide-based thermoplastic elastomer and an acid-modified elastomer obtained by acid-modifying the elastomer other than the polyamide-based thermoplastic elastomer.

[3-2] The tire as described in [3-1], wherein the acid value of the thermoplastic resin material is equal to or greater than 0.1 mg-$CH_3ONa/g$ but less than 2.2 mg-$CH_3ONa/g$.

[3-3] The tire as described in [3-1] or [3-2], wherein the ratio of the mass of the polyamide-based thermoplastic elastomer and the total mass of the thermoplastic elastomer other than the polyamide-based thermoplastic elastomer and the acid-modified elastomer (the mass of the polyamide-based thermoplastic elastomer:the total mass of the acid-modified elastomer and the thermoplastic elastomer other than the polyamide-based thermoplastic elastomer) in the thermoplastic resin material is from 90:10 to 60:40.

[3-4] The tire as described in any one of [3-1] to [3-3], wherein the content of the polyamide-based thermoplastic elastomer in the thermoplastic resin material is 55 mass % to 95 mass %.

[3-5] A method for producing a tire, the method including:
a tire frame piece forming step of forming a tire frame piece for constituting a portion of a circular tire frame, using a thermoplastic resin material including at least: a polyamide-based thermoplastic elastomer; and an acid-modified elastomer obtained by acid-modifying a thermoplastic elastomer other than the polyamide-based thermoplastic elastomer, or a mixture of a thermoplastic elastomer other than the polyamide-based thermoplastic elastomer and an acid-modified elastomer obtained by acid-modifying the elastomer other than the polyamide-based thermoplastic elastomer; and
a tire frame piece bonding step of forming the timer frame by fusing two or more of the tire frame pieces, which make a pair, by applying heat to bonding sections of the tire frame pieces.

[3-6] The method for producing a tire as described in [3-5], wherein the acid value of the thermoplastic resin material is equal to or greater than 0.1 mg-$CH_3ONa/g$ but less than 2.2 mg-$CH_3ONa/g$.

[3-7] The method for producing a tire as described in [3-6], wherein the tire frame piece forming step includes a step of injection molding using the thermoplastic resin material.

The following invention is included in the fourth aspect of the present invention.

[4-1] A tire including a circular tire frame formed of a thermoplastic resin material,
the thermoplastic resin material including a thermoplastic elastomer including a hard segment and a soft segment in a molecule thereof, and needle-shaped crystal grains having a fiber length of 1 μm to 500 μm and a fiber diameter of 0.01 μm to 10.0 μm.

[4-2] The tire as described in [4-1], wherein the content of the needle-shaped crystal grains relative to the total mass of the thermoplastic resin material is in the range of 0.1 mass % to 10 mass %.

[4-3] The tire as described in [4-1] or [4-2], wherein the needle-shaped crystal grains are inorganic particles selected from the group consisting of metal oxides, metal nitrides, metal carbonates, metal silicates, metal titanates, metal sulfates, and metal borates.

[4-4] The tire as described in any one of [4-1] to [4-3], wherein the thermoplastic elastomer is a thermoplastic elastomer selected from a polyamide-based thermoplastic elastomer, a polyester-based thermoplastic elastomer, or a polystyrene-based thermoplastic elastomer.

The following invention is included in the fifth aspect of the present invention.

[5-1] A tire including at least a circular tire frame formed of a resin material,
the resin material including a thermoplastic elastomer including a hard segment and a soft segment in a molecule thereof, and a resin having a glass transition temperature that is higher than the glass transition temperature of the hard segment.

[5-2] The tire as described in [5-2], wherein the resin has a glass transition temperature that is higher, by 20° C. or more, than the glass transition temperature of the hard segment of the thermoplastic elastomer.

[5-3] The tire as described in [5-1] or [5-2], wherein a mass ratio (x+y:z) of the soft segment (z) of the thermoplastic elastomer with respect to the total (x+y) of the hard segment (x) of the thermoplastic elastomer and the resin (y) is 10:90 to 90:10.

[5-4] The tire as described in any one of [5-1] to [5-3], wherein the thermoplastic elastomer is at least one selected from a polyamide-based thermoplastic elastomer or a polyester-based elastomer.

[5-5] The tire as described in any one of [5-1] to [5-4], wherein the resin is at least one selected from polyphenylene ether, polyphenylene sulfide, polyethylene terephthalate, polybutylene terephthalate, polyethylene naphthalate, polybutylene naphthalate, polytrimethylene terephthalate, polycarbonate or polyarylate.

The following invention is included in the sixth aspect of the present invention.

[6-1] A tire including a circular tire frame formed of a thermoplastic resin material,
the tire frame having a volume resistivity in the range of $1.0 \times 10^6$ to $1.0 \times 10^{10}$.

[6-2] The tire as described in [6-1], wherein the tire frame contains an antistatic material.

[6-3] The tire as described in [6-1] or [6-2], wherein the thermoplastic resin material includes a thermoplastic elastomer.

[6-4] The tire as described in [6-2] or [6-3], wherein the antistatic material is a phosphoric acid ester-based ion conductor.

The following invention is included in the seventh aspect of the present invention.

[7-1] A tire including at least a circular tire frame formed of a thermoplastic resin material,
the thermoplastic resin material including a thermoplastic elastomer including a hard segment and a soft segment in a molecule thereof, and a resin which is other than the thermoplastic elastomer and is of the same kind as the hard segment.

[7-2] The tire as described in [7-1], wherein the elastic modulus of the resin is 100 MPa or greater.

[7-3] The tire as described in [7-1] or [7-2], wherein the mass ratio of the thermoplastic elastomer and the resin (thermoplastic elastomer:resin) is from 95:5 to 50:50.

[7-4] The tire as described in any one of [7-1] to [7-3], wherein the content of the thermoplastic elastomer in the thermoplastic resin material is 50 mass % to 95 mass %.

[7-5] The tire as described in any one of [7-1] to [7-4], wherein the thermoplastic elastomer is a polyamide-based thermoplastic elastomer, and the resin is a polyamide-based resin.

The following inventions are included in the present invention related to the eighth aspect.

[8-1] A tire including at least a circular tire frame formed of a resin material,
the resin material including at least a thermoplastic elastomer, and a resin which is other than the thermoplastic elastomer, has a glass transition temperature of 20° C. or lower and has an elastic modulus larger than the elastic modulus of the thermoplastic elastomer.

[8-2] The tire as described in [8-1], wherein the resin is an acid-modified resin.

[8-3] The tire as described in [8-2], wherein the acid-modified resin is at least one selected from acid-modified polyolefin resins.

[8-4] The tire as described in [8-2] or [8-3], wherein the resin material further includes a resin which is other than the thermoplastic elastomer and is not acid-modified.

[8-5] The tire as described in [8-4], wherein the resin that is not acid-modified is at least one selected from polyolefin resins.

[8-6] The tire as described in [8-1], wherein the resin is a resin that is not acid-modified.

[8-7] The tire as described in [8-6], wherein the resin that is not acid-modified is at least one selected from polyolefin resins.

[8-8] The tire as described in any one of [8-1] to [8-7], wherein the thermoplastic elastomer is at least one selected from a polyamide-based thermoplastic elastomer, a polyester-based thermoplastic elastomer, a polystyrene-based thermoplastic elastomer or a polyurethane-based thermoplastic elastomer.

The following invention is included in the ninth aspect of the present invention.

[9-1] A tire including at least a circular tire frame formed of a resin material,
the resin material including at least a first thermoplastic elastomer, a resin which is other than the first thermoplastic elastomer and has a glass transition temperature of 20° C. or lower, and a second thermoplastic elastomer which is other than the first thermoplastic elastomer and has a hard segment of the same kind as the resin.

[9-2] The tire as described in [9-1], wherein the resin is an acid-modified resin.

[9-3] The tire as described in [9-2], wherein the acid-modified resin is at least one selected from acid-modified polyolefin resins.

[9-4] The tire as described in [9-3], wherein the second thermoplastic elastomer is an olefin-based thermoplastic elastomer.

[9-5] The tire as described in any one of [9-2] to [9-4], wherein the resin material further includes a resin that is other than the first thermoplastic elastomer and the second thermoplastic elastomer and is not acid-modified.

[9-6] The tire as described in [9-5], wherein the resin that is not acid-modified is at least one selected from olefin resins.

[9-7] The tire as described in [9-6], wherein the acid-modified resin is an acid-modified polyolefin resin, the resin that is not acid-modified is polypropylene, and the second thermoplastic elastomer is an olefin-based thermoplastic elastomer containing polypropylene.

[9-8] The tire as described in any one of [9-1] to [9-7], wherein the first thermoplastic elastomer is at least one selected from a polyamide-based thermoplastic elastomer, a polyester-based thermoplastic elastomer, a polyurethane-based thermoplastic elastomer, or a polystyrene-based thermoplastic elastomer.

The following invention is included in the tenth aspect of the present invention.

[10-1] A tire including at least a circular tire frame formed of a thermoplastic resin material,
the tire including a reinforcing cord member that is wound around the outer circumference of the tire frame in a circumferential direction to form a reinforcing cord layer, and
the thermoplastic resin material including at least a polyamide-based thermoplastic elastomer and a polyester-based thermoplastic elastomer.

[10-2] The tire as described in [10-1], wherein the reinforcing cord layer is configured to include a resin material.

[10-3] The tire as described in [10-1] or [10-2], wherein the mass ratio (x:y) of the polyamide-based thermoplastic elastomer (x) and the polyester thermoplastic elastomer (y) in the thermoplastic resin is from 95:5 to 50:50.

[10-4] The tire as described in any one of [10-1] to [10-3], wherein the total content of the polyamide-based thermoplastic elastomer and the polyester-based thermoplastic elastomer in the thermoplastic resin material is 50 mass % to 100 mass %.

The following invention is included in the eleventh aspect of the present invention.

[11-1] The tire of the present invention is a tire including at least a circular tire frame formed of a thermoplastic resin material,
the thermoplastic resin material including a polyamide-based thermoplastic elastomer and at least one copolymer of an olefin-(meth)acrylate copolymer or a metal crosslinked product of an olefin-(meth)acrylic acid copolymer.

[11-2] The tire as described in [11-1], wherein the mass ratio (x:y) of the polyamide-based thermoplastic elastomer (x) and the copolymer (y) is from 95:5 to 50:50.

[11-3] The tire as described in [11-1] or [11-2], wherein the total content of the polyamide-based thermoplastic elastomer and the copolymer in the thermoplastic resin material is 50 mass % to 100 mass %.

[11-4] The tire as described in any one of [11-1] to [11-3], wherein the olefin-(meth)acrylate copolymer is an ethylene-(meth)acrylate copolymer.

[11-5] The tire as described in any one of [11-1] to [11-4], wherein the metal crosslinked product of the olefin-(meth)acrylic acid copolymer is a metal crosslinked product of an ethylene-(meth)acrylic acid copolymer.

The following invention is included in the twelfth aspect of the present invention.

[12-1] A tire including at least a circular tire frame formed of a thermoplastic resin material,
the thermoplastic resin material including a polyamide-based thermoplastic elastomer, an olefin-(meth)acrylic acid copolymer, and an acid-modified copolymer obtained by acid-modifying an olefin-(meth)acrylate copolymer.

[12-2] The tire as described in [12-1], wherein the mass ratio (x:y+z) of the polyamide-based thermoplastic elastomer (x), the olefin-(meth)acrylic acid copolymer (y), and the acid-modified copolymer (z) is from 95:5 to 50:50.

[12-3] The tire as described in [12-1] or [12-2], wherein the total content of the polyamide-based thermoplastic elastomer, the olefin-(meth)acrylic acid copolymer, and the acid-modified copolymer in the thermoplastic resin material is 50 mass % to 100 mass %.

[12-4] The tire as described in any one of [12-1] to [12-3], wherein the olefin-(meth)acrylic acid copolymer is an ethylene-(meth)acrylic acid copolymer, and the acid-modified copolymer is an acid-modified copolymer obtained by acid-modifying an ethylene-(meth)acrylate copolymer.

[12-5] A method for producing a tire, the method including:
a tire frame piece forming step of forming a tire frame piece for constituting a portion of a circular tire frame, using a thermoplastic resin material including at least a polyamide-based thermoplastic elastomer, an olefin-(meth)acrylic acid copolymer, and an acid-modified copolymer obtained by acid-modifying an olefin-(meth)acrylate copolymer; and
a tire frame piece bonding step of forming the tire frame by fusing two or more of the tire frame pieces, which make a pair, by applying heat to bonding sections of the tire frame pieces.

[12-6] The method for producing a tire as described in [12-5], wherein the olefin-(meth)acrylic acid copolymer is an ethylene-(meth)acrylic acid copolymer, and the acid-modified copolymer is an acid-modified copolymer obtained by acid-modifying an ethylene-(meth)acrylate copolymer.

The following invention is included in the thirteenth aspect of the present invention related to the thirteenth aspect.

[13-1] A tire including at least a circular tire frame formed of a thermoplastic resin material,
the tire including a reinforcing cord member that is wound around the outer circumference of the tire frame in the circumferential direction to form a reinforcing cord layer, and
the thermoplastic resin material including at least a polyamide-based thermoplastic elastomer and a rubber.

[13-2] The tire as described in [13-1], wherein the thermoplastic resin material further includes a thermoplastic elastomer having high affinity for the rubber.

[13-3] The tire as described in [13-1] or [13-2], wherein the reinforcing cord layer is configured to include a resin material.

[13-4] The tire as described in any one of [13-1] to [13-3], wherein the mass ratio (x:y) of the polyamide-based thermoplastic elastomer (x) and the rubber (y) in the thermoplastic resin material is from 95:5 to 50:50.

[13-5] The tire as described in [13-2] or [13-3], wherein the mass ratio (x:y+z) of the polyamide-based thermoplastic elastomer (x), the rubber (y), and the thermoplastic elastomer having high affinity for the rubber (z) in the thermoplastic resin material is from 95:5 to 50:50.

[13-6] The tire as described in any one of [13-1] to [13-4], wherein the total content of the polyamide-based thermoplastic elastomer and the rubber in the thermoplastic resin material is 50 mass % to 100 mass %.

[13-7] The tire as described in [13-2], [13-3] or [13-5], wherein the total content of the polyamide-based thermoplastic elastomer, the rubber, and the thermoplastic elastomer having high affinity for the rubber in the thermoplastic resin material is 50 mass % to 100 mass %.

The disclosures of Japanese Patent Application Nos. 2010-188918, 2010-188919, 2010-188922, 2010-188902, 2010-188923, 2010-188901, 2010-203676, 2010-188900, 2010-188915, 2010-188903, 2010-203732, 2010-258041, 2010-258040, and 2011-183311 are incorporated herein by reference.

All publications, patent applications, and technical standards mentioned in this specification are herein incorporated by reference to the same extent as if each individual publication, patent application, or technical standard was specifically and individually indicated to be incorporated by reference.

The invention claimed is:

1. A tire comprising at least a circular tire frame formed of a thermoplastic resin material, wherein the tire frame has a bead portion contacting a rim that is separately provided with the tire frame,
the tire including a resin coated reinforcing cord member and a tread provided on the circular tire frame in this order, the resin coated reinforcing cord member forming a reinforcing cord layer wherein the resin coated reinforcing cord member is wound around an outer circumferences of the tire frame,
the thermoplastic resin material including at least a polyamide-based thermoplastic elastomer,
the content ratio of the polyamide-based thermoplastic elastomer in the thermoplastic resin material is 50% by mass to 100% by mass with respect to the total amount of the thermoplastic resin material;
the content of the resin material in the reinforcing cord layer is 20 mass % or more relative to the total amount of the materials that constitute the reinforcing cord layer excluding the reinforcing cord; and the resin coated reinforcing cord member in the reinforcing cord layer is a cord member that is coated with a resin material of the same kind as the thermoplastic resin material that forms the tire frame; and the tread is formed of a rubber, and the cord member does not directly come in contact with the rubber.

2. The tire according to claim 1, wherein the resin coated reinforcing cord member is covered by a resin material over 20% or more of the surface.

3. The tire according to claim 1, wherein the resin material of the resin coated reinforcing cord member is a resin other than vulcanized rubbers.

4. A tire comprising at least a circular tire frame formed of a thermoplastic resin material, wherein the tire frame has a bead portion contacting a rim that is separately provided with the tire frame, the tire including a resin coated reinforcing cord member and a tread provided on the circular tire frame in this order, the resin coated reinforcing cord member forming a reinforcing cord layer wherein the resin coated reinforcing cord member is wound around an outer circumference of the tire frame, the thermoplastic resin material including at least a polyamide-based thermoplastic elastomer and an elastomer other than the polyamide-based thermoplastic elastomer, the total content of the polyamide-based thermoplastic elastomer and the elastomer other than the polyamide-based thermoplastic elastomer in the thermoplastic resin material is 50% by mass to 100% by mass with respect to the total amount of the thermoplastic resin material;

the content of the resin material in the reinforcing cord layer is 20 mass % or more relative to the total amount of the materials that constitute the reinforcing cord layer excluding the reinforcing cord; and the resin coated reinforcing cord member in the reinforcing cord layer is a cord member that is coated with a resin material of the same kind as the thermoplastic resin material that forms the tire frame; and the tread is formed of a rubber, and the cord member does not directly come in contact with the rubber.

5. A tire comprising at least a circular tire frame formed of a thermoplastic resin material, wherein the tire frame has a bead portion contacting a rim that is separately provided with the tire frame, the tire including a resin coated reinforcing cord member and a tread provided on the circular tire frame in this order, the resin coated reinforcing cord member forming a reinforcing cord layer wherein the resin coated reinforcing cord member is wound around an outer circumference of the tire frame, the thermoplastic resin material including at least a polyamide-based thermoplastic elastomer and a polyester-based thermoplastic elastomer, the total content of the polyamide-based thermoplastic elastomer and the polyester-based thermoplastic elastomer in the thermoplastic resin material is 50 mass % to 100 mass % with respect to the total mass of the thermoplastic resin material;

the content of the resin material in the reinforcing cord layer is 20 mass % or more relative to the total amount of the materials that constitute the reinforcing cord layer excluding the reinforcing cord; and the resin coated reinforcing cord member in the reinforcing cord layer is a cord member that is coated with a resin material of the same kind as the thermoplastic resin material that forms the tire frame; and the tread is formed of a rubber, and the cord member does not directly come in contact with the rubber.

6. A tire comprising at least a circular tire frame formed of a thermoplastic resin material, wherein the tire frame has a bead portion contacting a rim that is separately provided with the tire frame, the tire including a resin coated reinforcing cord member and a tread provided on the circular tire frame in this order, the resin coated reinforcing cord member forming a reinforcing cord layer wherein the resin coated reinforcing cord member is wound around an outer circumference of the tire frame, the thermoplastic resin material including at least a polyamide-based thermoplastic elastomer and a rubber, the total content of the polyamide-based thermoplastic elastomer and the rubber in the thermoplastic resin material is 50 mass % to 100 mass % with respect to the total amount of the thermoplastic resin material;

the content of the resin material in the reinforcing cord layer is 20 mass % or more relative to the total amount of the materials that constitute the reinforcing cord layer excluding the reinforcing cord; and the resin coated reinforcing cord member in the reinforcing cord layer is a cord member that is coated with a resin material of the same kind as the thermoplastic resin material that forms the tire frame; and the tread is formed of a rubber, and the cord member does not directly come in contact with the rubber.

* * * * *